US007996295B1

(12) United States Patent
Gosko

(10) Patent No.: US 7,996,295 B1
(45) Date of Patent: Aug. 9, 2011

(54) DATA STRUCTURE FOR USE IN AN AUTOMATED ORDER ENTRY SYSTEM

(75) Inventor: Theresa M. Gosko, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1500 days.

(21) Appl. No.: 09/592,741

(22) Filed: Jun. 13, 2000

(51) Int. Cl.
*G06Q 40/00* (2006.01)
*G06F 17/60* (2006.01)

(52) U.S. Cl. .......... 705/37; 705/77

(58) Field of Classification Search .......... 705/27, 705/37
See application file for complete search history.

(56) References Cited

U.S. PATENT DOCUMENTS

| | | | | |
|---|---|---|---|---|
| 4,959,686 | A * | 9/1990 | Spallone et al. | 705/27 |
| 4,972,318 | A | 11/1990 | Brown et al. | 364/403 |
| 5,319,542 | A | 6/1994 | King, Jr. et al. | 364/401 |
| 5,325,304 | A | 6/1994 | Aoki | 364/468 |
| 5,465,290 | A | 11/1995 | Hampton et al. | 379/67 |
| 5,611,051 | A | 3/1997 | Pirelli | 395/210 |
| 5,699,526 | A * | 12/1997 | Siefert | 705/27 |
| 5,712,989 | A | 1/1998 | Johnson et al. | 395/228 |
| 5,765,143 | A | 6/1998 | Sheldon et al. | 705/28 |
| 5,819,107 | A | 10/1998 | Lichtman et al. | 395/828 |
| 5,825,651 | A | 10/1998 | Gupta et al. | 364/468.09 |
| 5,870,717 | A | 2/1999 | Wiecha | 705/26 |
| 5,870,719 | A | 2/1999 | Maritzen et al. | 705/26 |
| 5,940,807 | A * | 8/1999 | Purcell | 705/26 |
| 5,946,663 | A | 8/1999 | Tanaka et al. | 705/8 |
| 5,963,919 | A | 10/1999 | Brinkley et al. | 705/28 |
| 5,983,200 | A | 11/1999 | Slotznick | 705/26 |
| 6,014,637 | A | 1/2000 | Fell et al. | 705/26 |
| 6,023,683 | A * | 2/2000 | Johnson et al. | 705/26 |
| 6,052,670 | A * | 4/2000 | Johnson | 705/27 |
| 6,052,785 | A * | 4/2000 | Lin et al. | 726/5 |
| 6,055,516 | A * | 4/2000 | Johnson et al. | 705/27 |
| 6,115,641 | A | 9/2000 | Brown et al. | 700/102 |
| 6,117,180 | A | 9/2000 | Dave et al. | 703/20 |
| 6,119,102 | A | 9/2000 | Rush et al. | 705/29 |
| 6,167,383 | A | 12/2000 | Henson | 705/26 |
| 6,253,188 | B1 * | 6/2001 | Witek et al. | 705/14 |
| 6,272,472 | B1 * | 8/2001 | Danneels et al. | 705/27 |
| 6,292,784 | B1 | 9/2001 | Martin et al. | 705/11 |
| 6,313,768 | B1 * | 11/2001 | Allen | 341/78 |
| 6,314,415 | B1 | 11/2001 | Mukherjee | 706/47 |
| 6,317,648 | B1 | 11/2001 | Sleep | 700/216 |

(Continued)

FOREIGN PATENT DOCUMENTS

WO WO 97/44749 * 11/1997

OTHER PUBLICATIONS

White, Ron, How Computers Work, Millennium Ed. Que Corporation, Sep. 1999.*

(Continued)

*Primary Examiner* — Garcia Ade
(74) *Attorney, Agent, or Firm* — Hamilton & Terrile, LLP; Stephen A. Terrile

(57) ABSTRACT

Data structures for transferring catalog and system order information between a manufacturer and a customer are shown. The data structures are configured to allow custom systems to be automatically ordered. These data structures advantageously allow a manufacturer and customer to electronically order systems, and specifically, non-commodity systems, quickly and easily.

13 Claims, 270 Drawing Sheets

U.S. PATENT DOCUMENTS

| | | | | |
|---|---|---|---|---|
| 6,324,522 | B2 * | 11/2001 | Peterson et al. | 705/28 |
| 6,336,114 | B1 * | 1/2002 | Garrison | 707/9 |
| 6,366,914 | B1 | 4/2002 | Stern | 707/10 |
| 6,408,303 | B1 | 6/2002 | Richards | 707/102 |
| 6,408,311 | B1 * | 6/2002 | Baisley et al. | 707/203 |
| 6,415,195 | B1 | 7/2002 | Gleditsch et al. | 700/99 |
| 6,427,091 | B1 | 7/2002 | Davis et al. | 700/115 |
| 6,442,748 | B1 | 8/2002 | Bowman-Amuah | 717/3 |
| 6,487,623 | B1 | 11/2002 | Emerson et al. | 710/302 |
| 6,502,102 | B1 * | 12/2002 | Haswell et al. | 707/102 |
| 6,542,912 | B2 | 4/2003 | Meltzer et al. | 707/501.1 |
| 6,601,071 | B1 * | 7/2003 | Bowker et al. | 707/102 |
| 6,611,843 | B1 * | 8/2003 | Jacobs | 707/102 |
| 6,826,726 | B2 * | 11/2004 | Hsing et al. | 715/513 |
| 6,871,187 | B1 * | 3/2005 | Gosko | 705/26 |
| 2002/0073106 | A1 * | 6/2002 | Parker et al. | 707/200 |
| 2004/0139070 | A1 * | 7/2004 | Dysart et al. | 707/3 |

OTHER PUBLICATIONS

Derfler, Frank J. et. al. How Networks Work, Millennium Ed., Que Corporation, Jan. 2000.*
Gralla, Preston, How the Internet Works, Millennium Ed., Que Corporation, Aug. 1999.*
Bragg, Steven M., Accounting Best Practices, John Wiley and Sons, Inc., 1999.*
Gavron, Jacquelyn, et. al., How to Use Micosoft Windows NT 4 Workstation, Macmillian Computer Publishing, USA, 1996.*
Muller, Nathan J., Desktop Encyclopedia of the Internet, Artech House, Inc., 1998.*
Dobler, Donald W. And Burt, David N., Purchasing and Supply Management, Text & Cases, 6th Ed., The McGraw-Hill Companies, Inc., 1996.*
Danish, Sherif & Gannon, Patrick, Building Database-Driven Web Catalogs, McGraw-Hill Companies, Inc., 1998.*
Greene, James H., Editor-in-Chief, Production and Inventory Control Handbook, 3rd Ed., The McGraw-Hill Companies, Inc., 1997.*
Sokol, Phyllis K., EDI, the Competative Edge, Multiscience Press, Inc., 1989.*
Borland's Paradox for Windows User's Guide, Borland International, Inc, 1994.*
Geller, Scott "Come, and they will build it!" Manufacturing Systems; Wheaton; Jun. 1999.

* cited by examiner

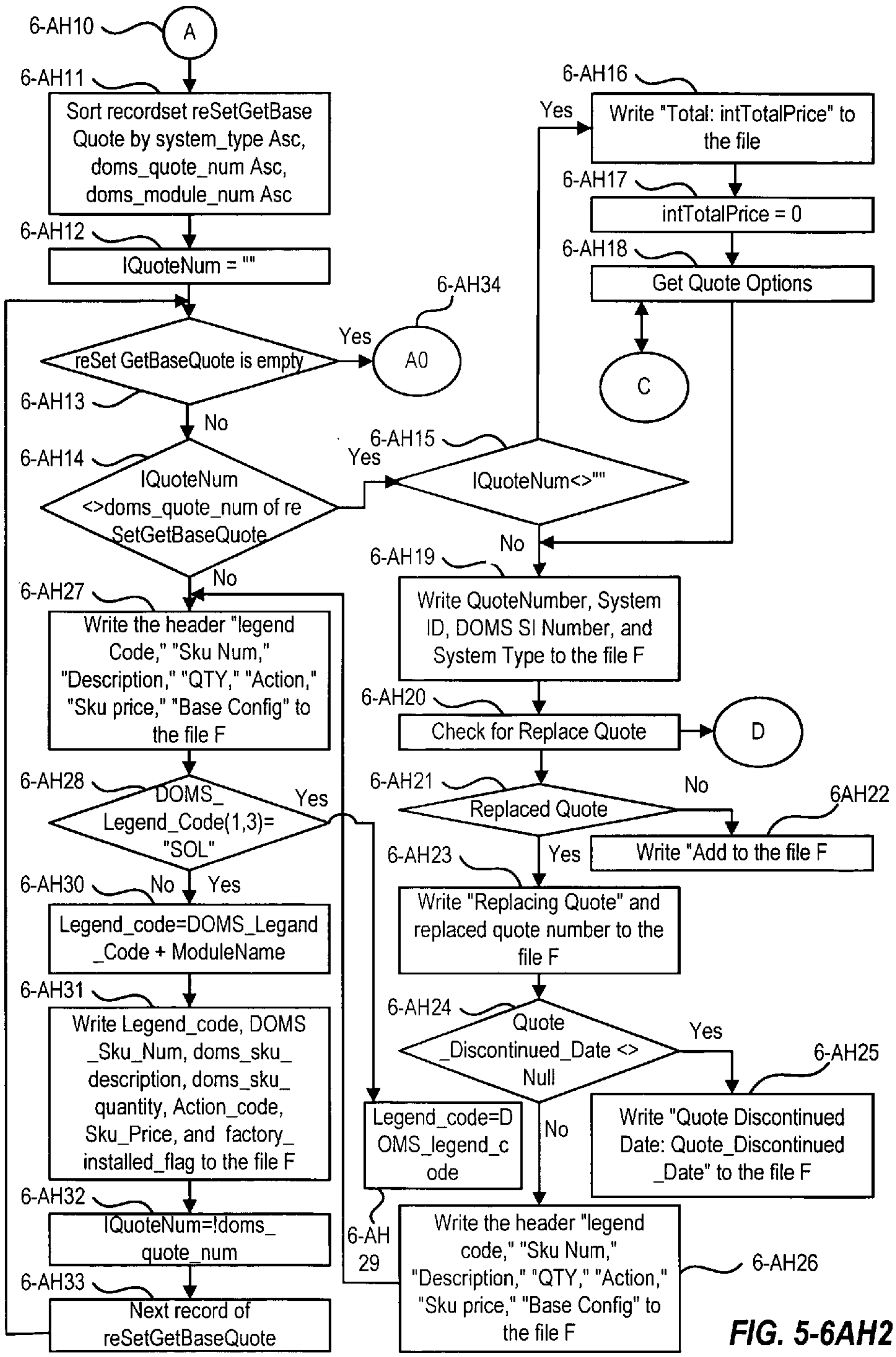
FIG. 5-6AH2

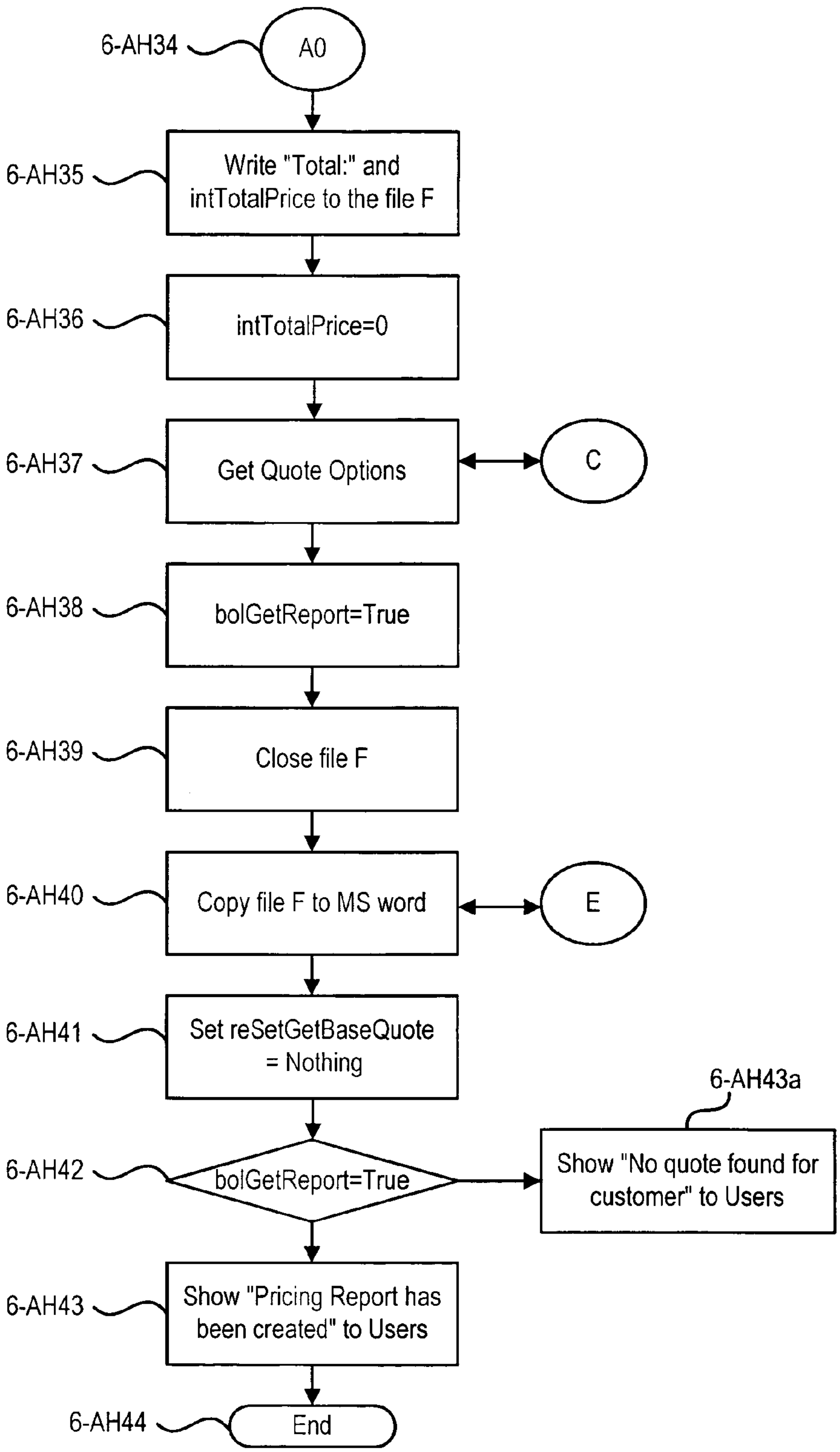
FIG. 5-6AH3

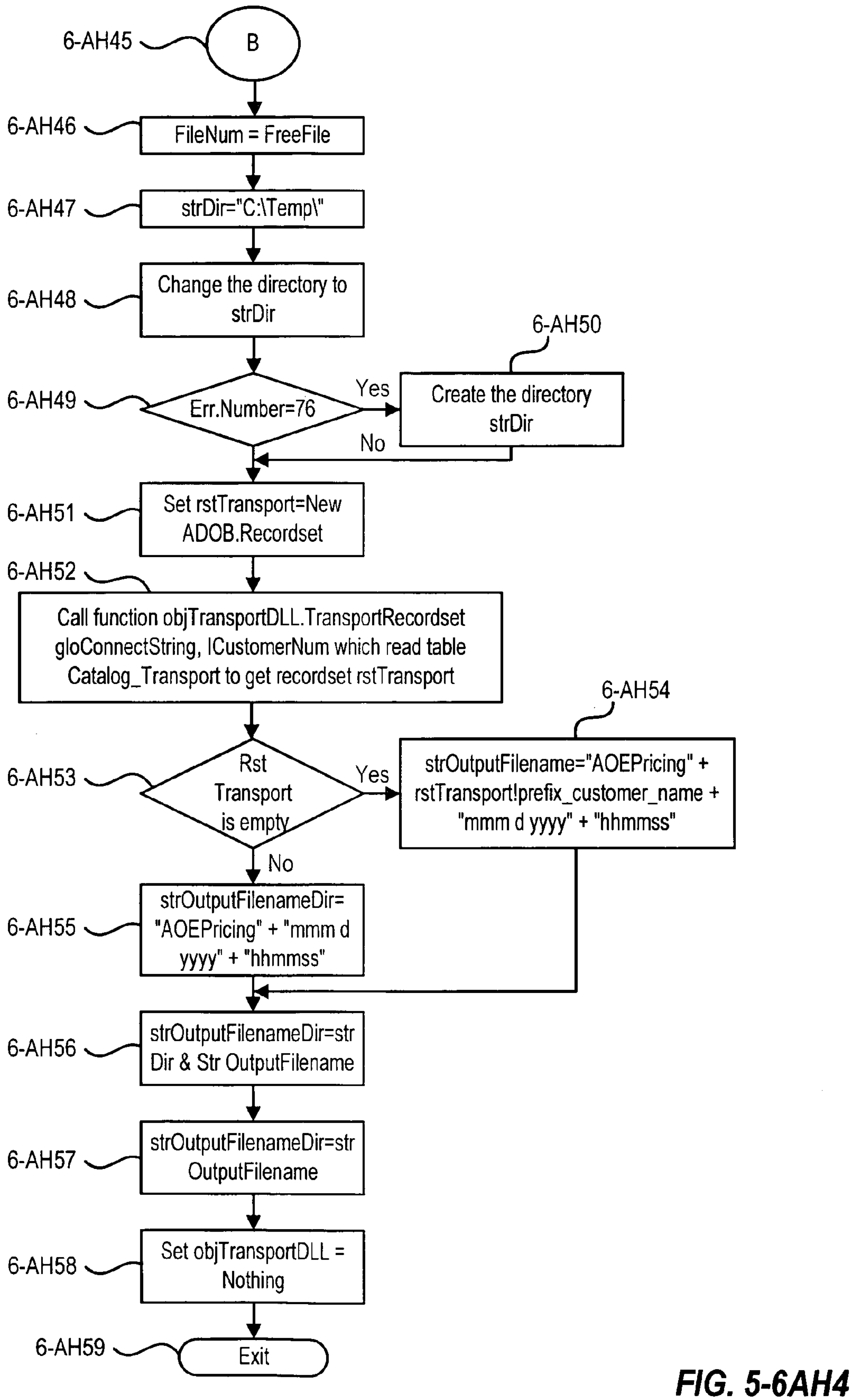
FIG. 5-6AH4

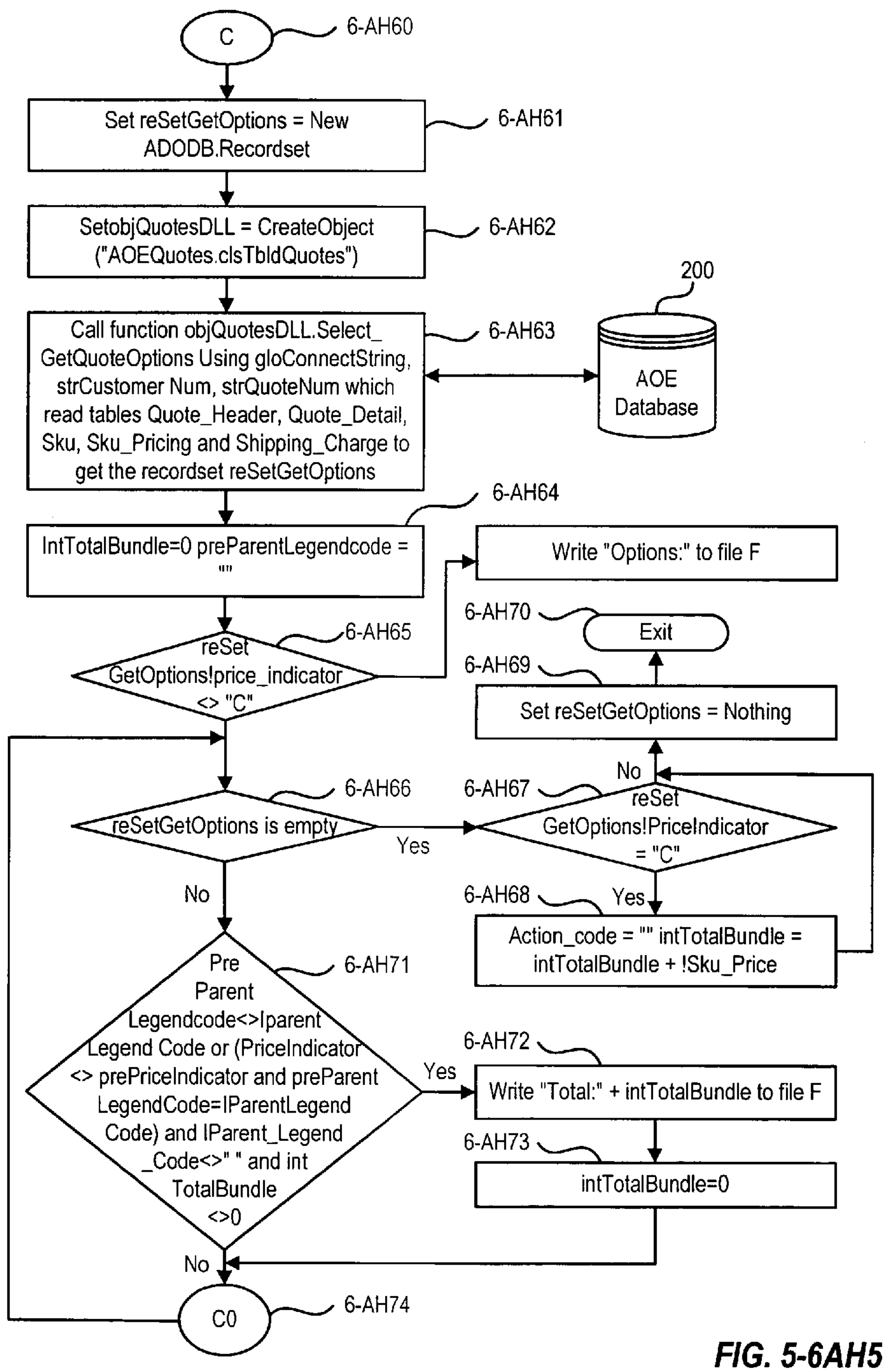
*FIG. 5-6AH5*

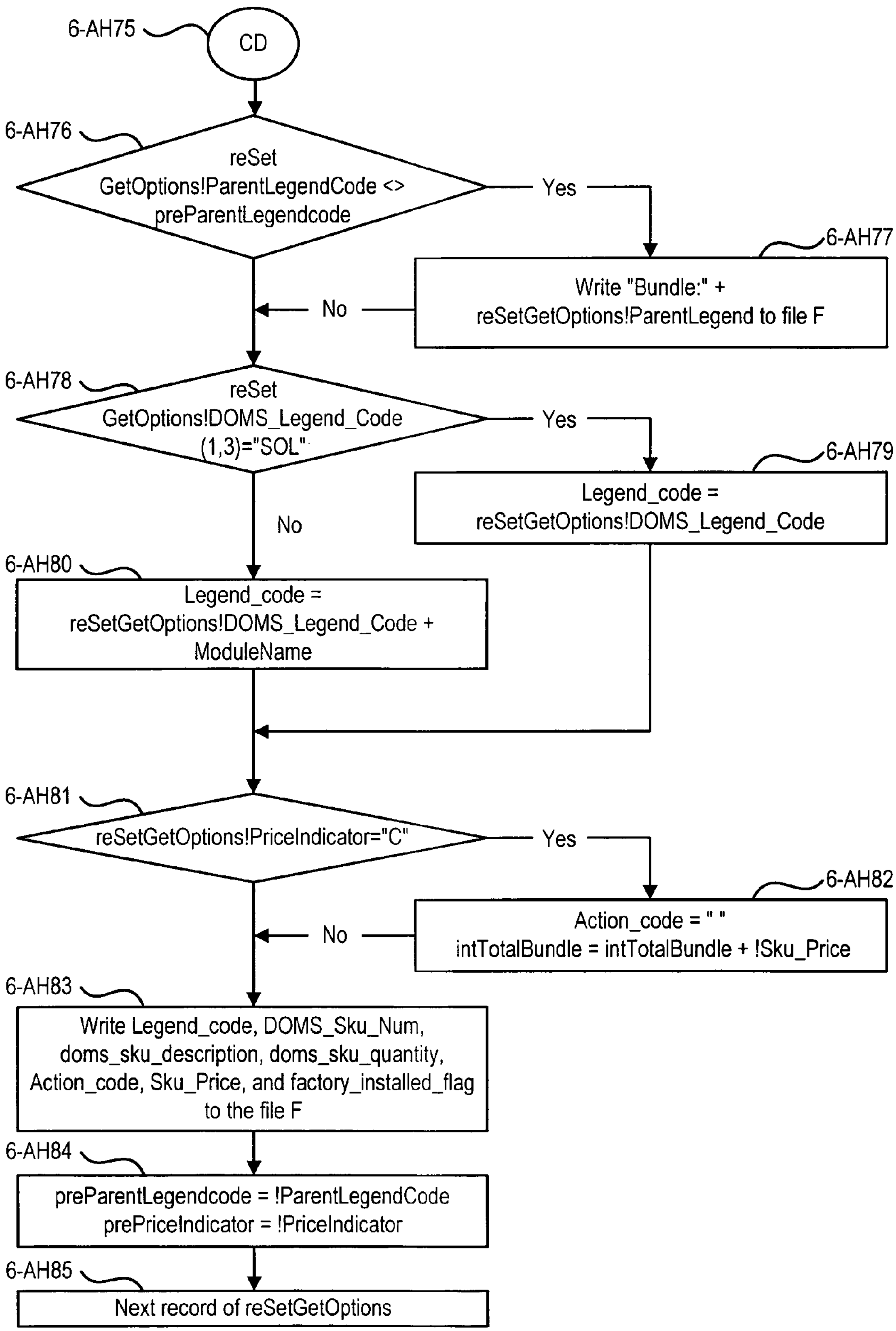
*FIG. 5-6AH6*

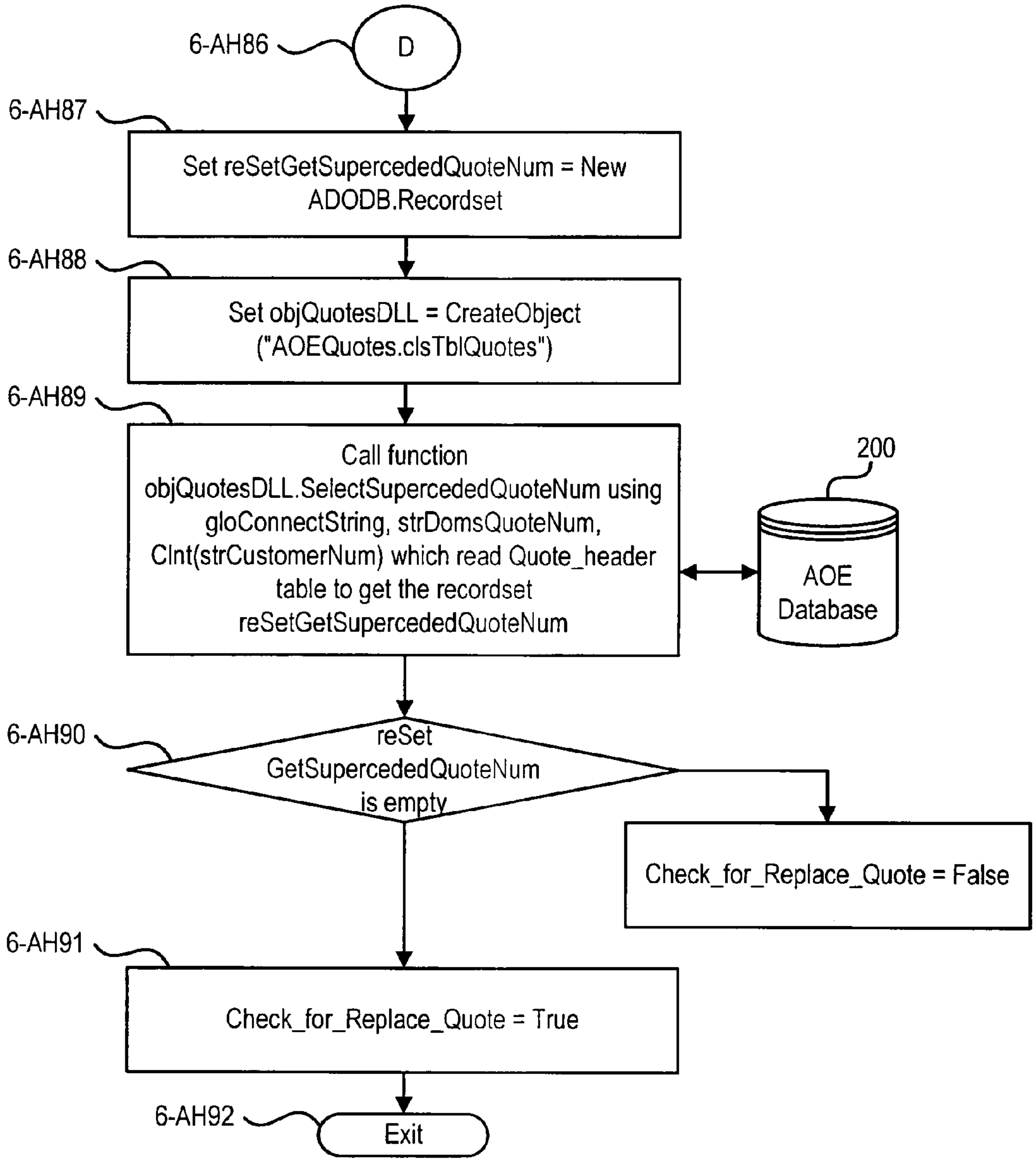
FIG. 5-6AH7

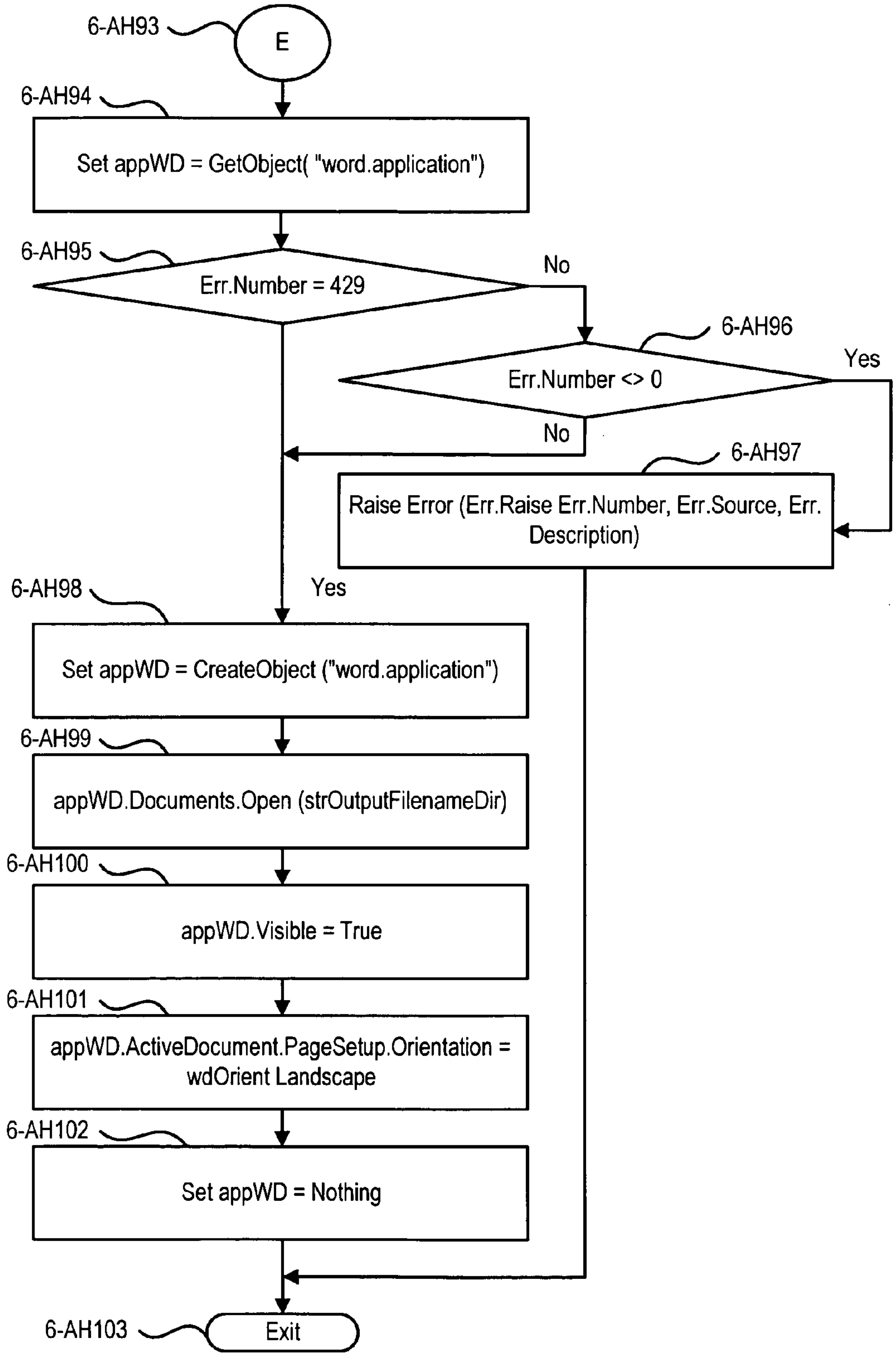
*FIG. 5-6AH8*

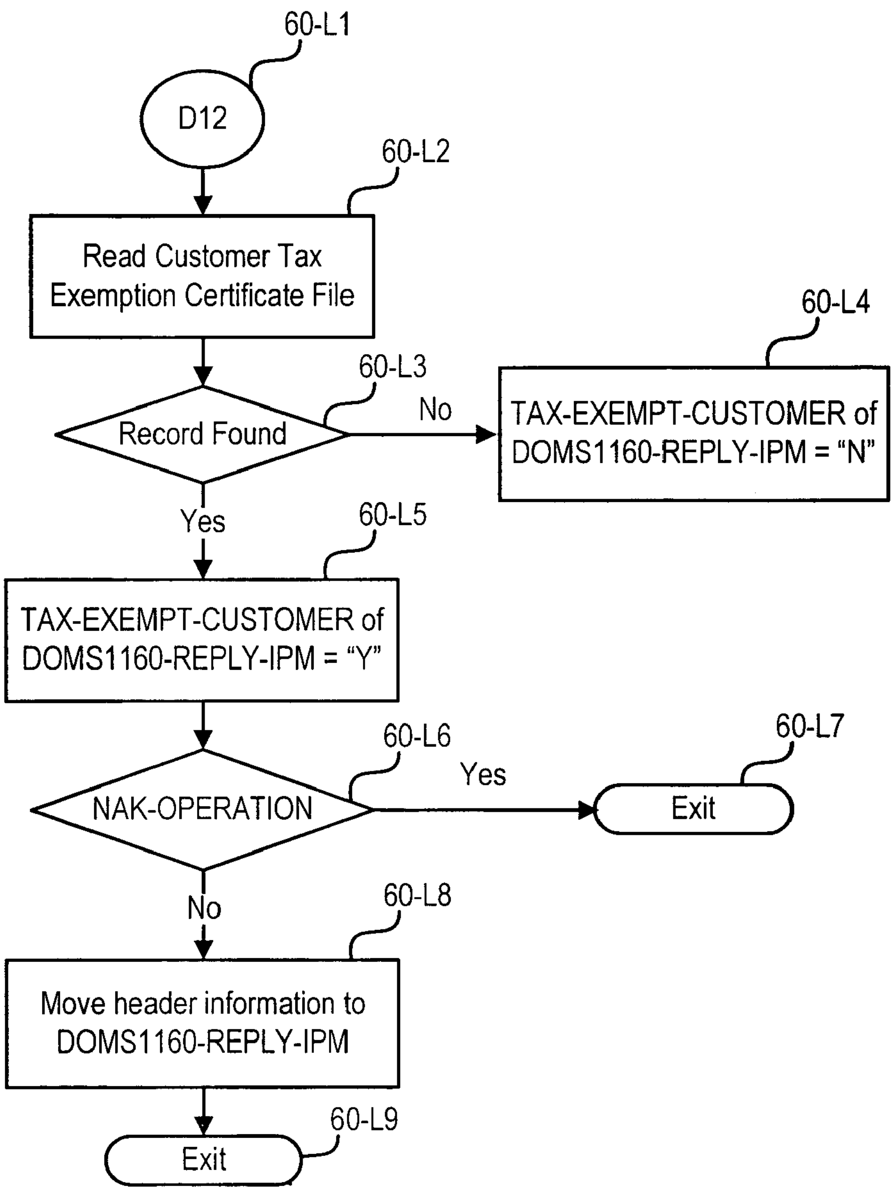
FIG. 6-L

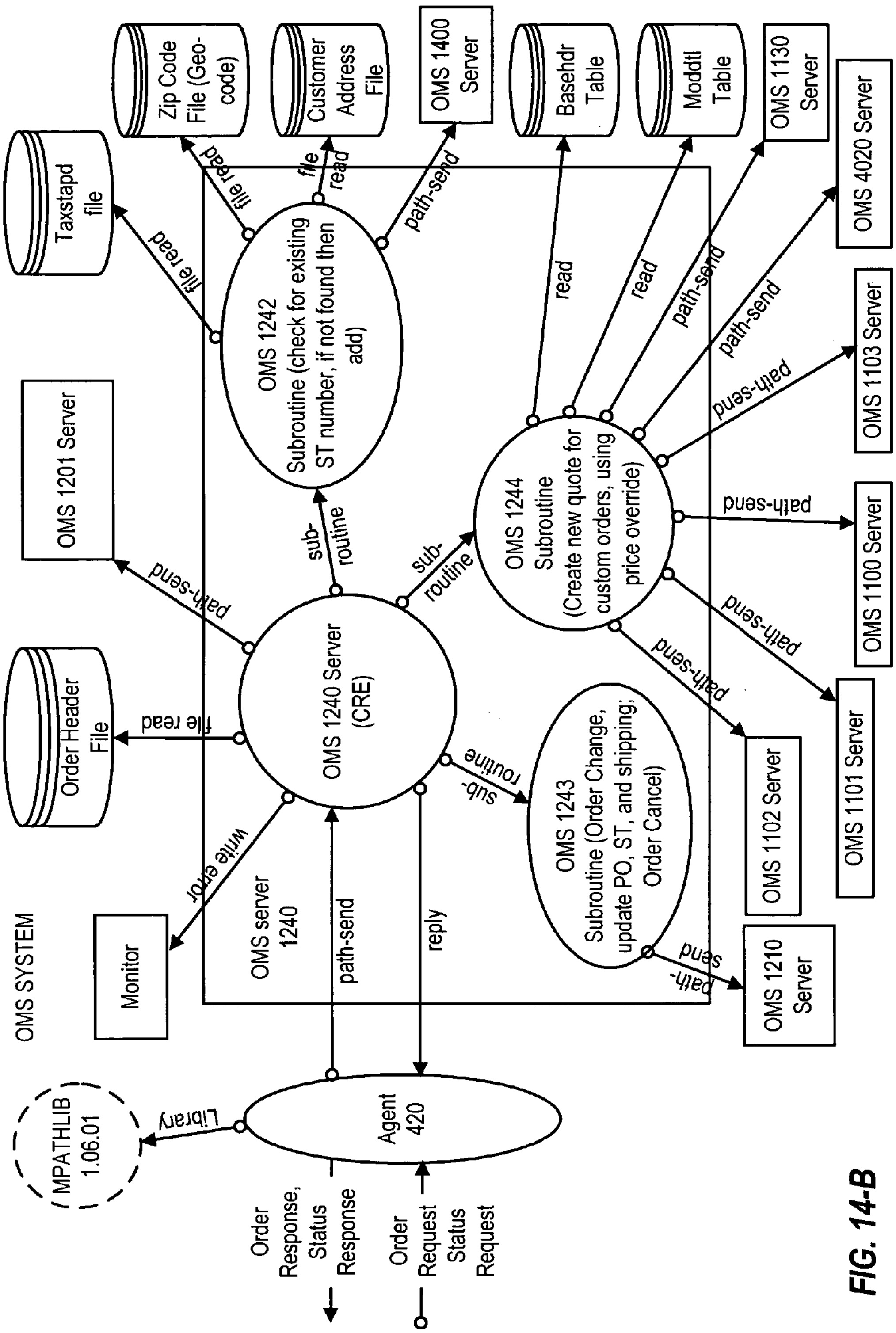
FIG. 14-B

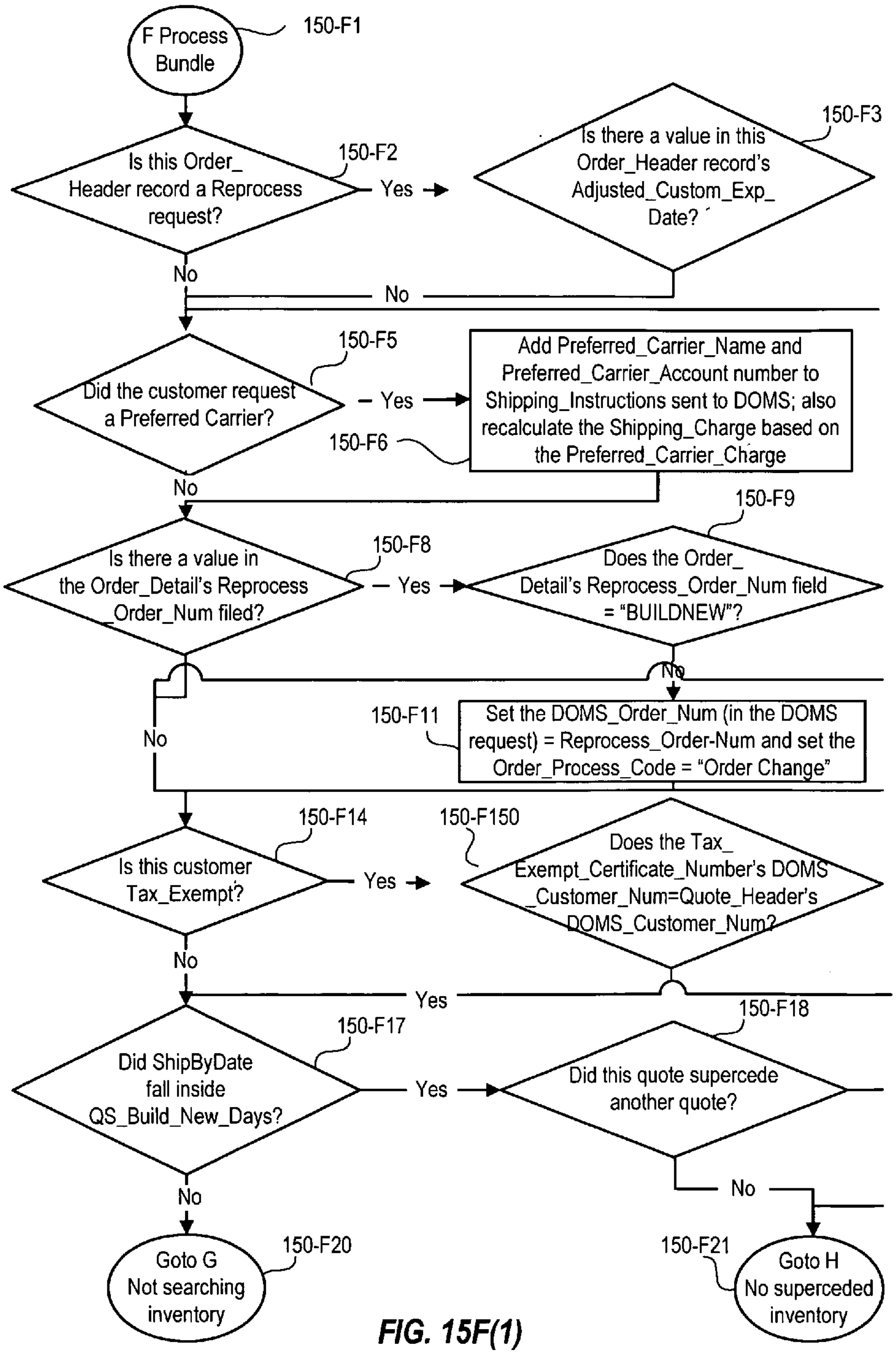
*FIG. 15F(1)*

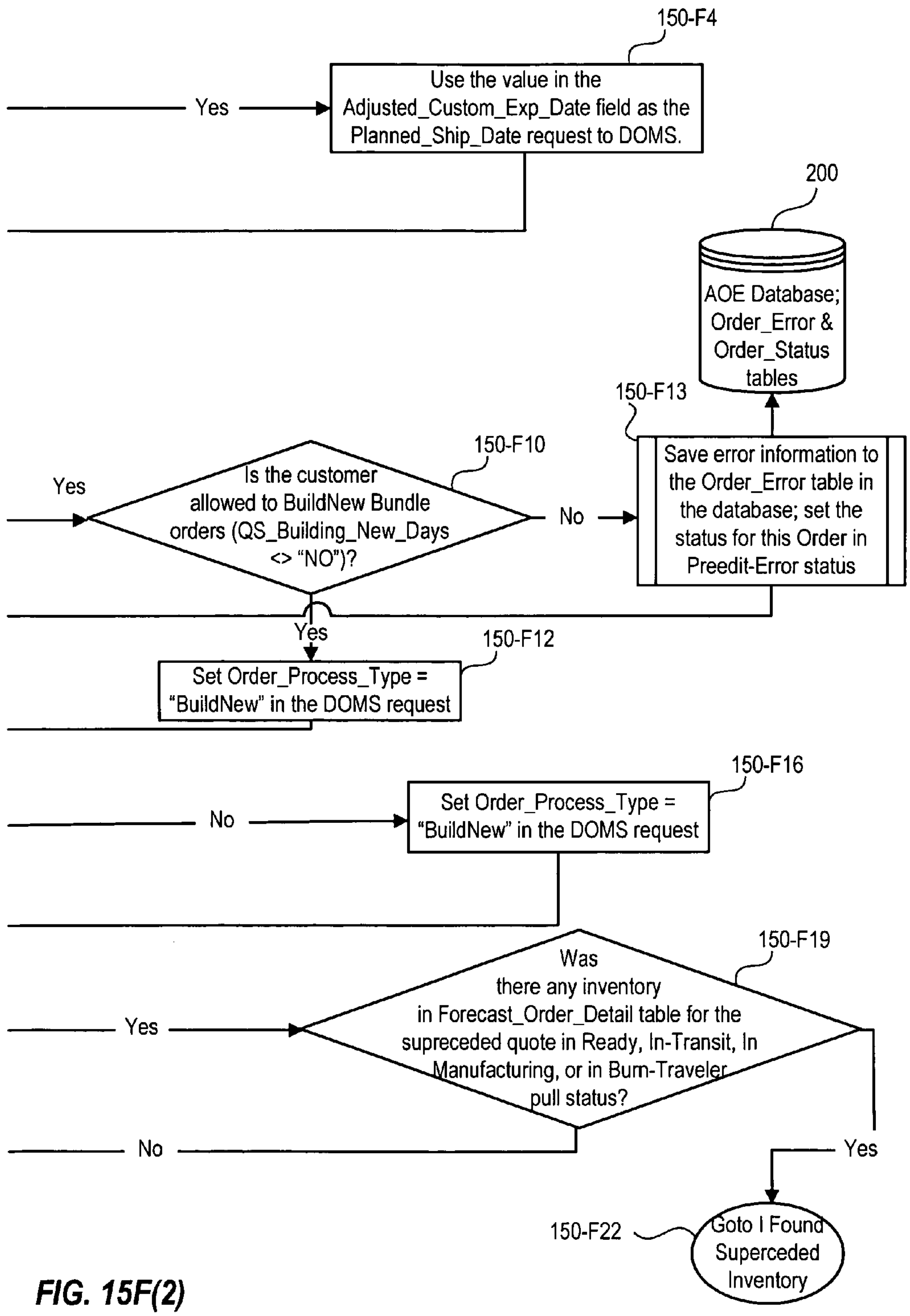
FIG. 15F(2)

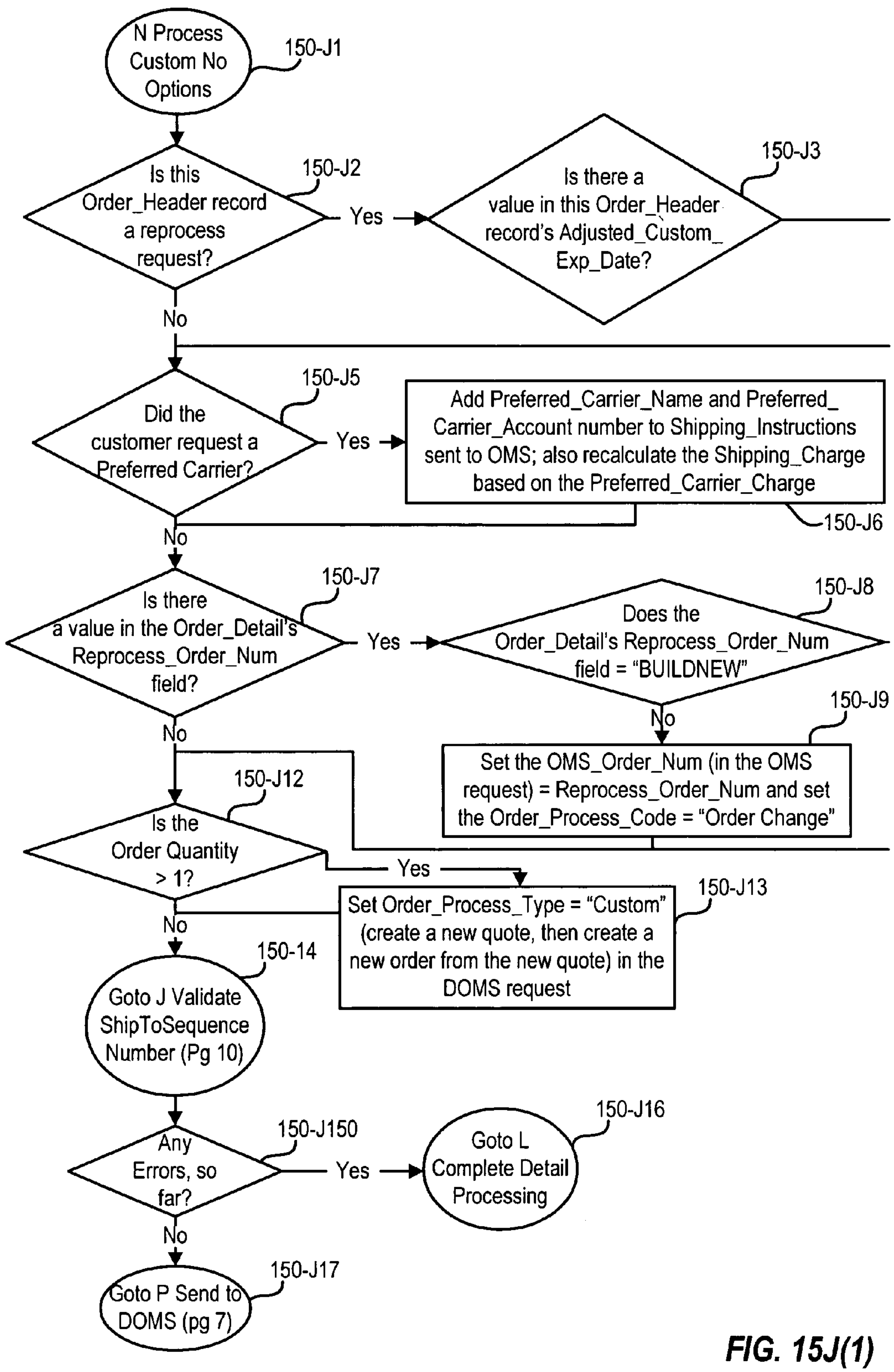
FIG. 15J(1)

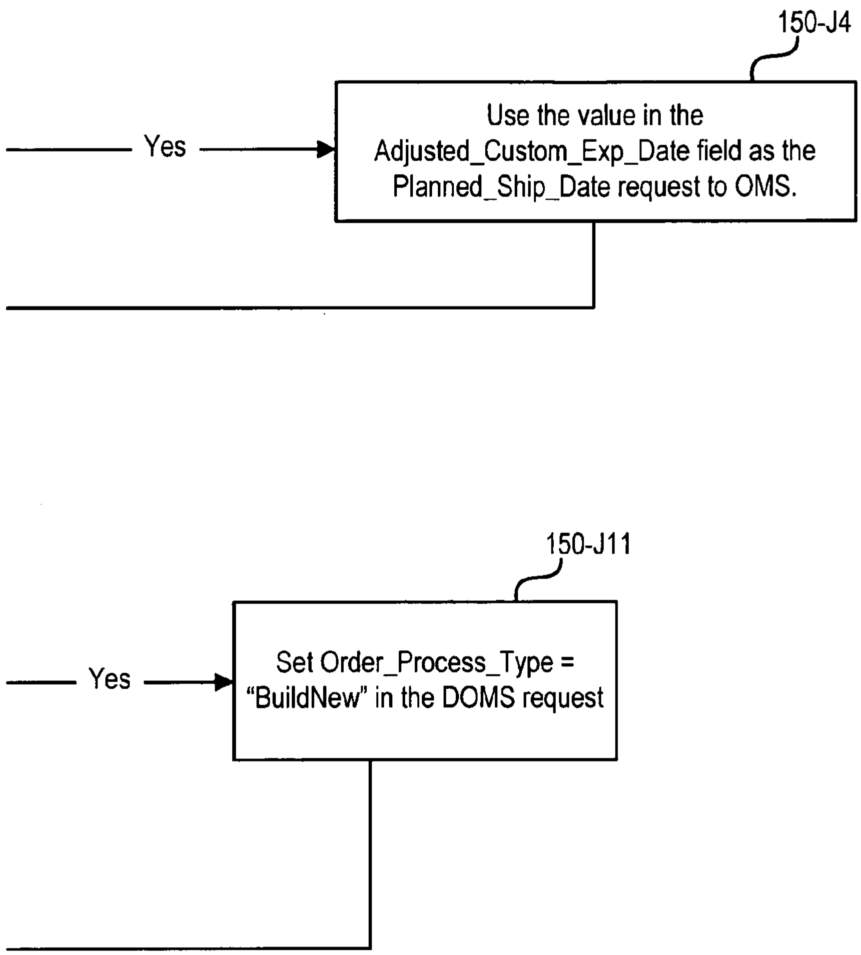
FIG. 15J(2)

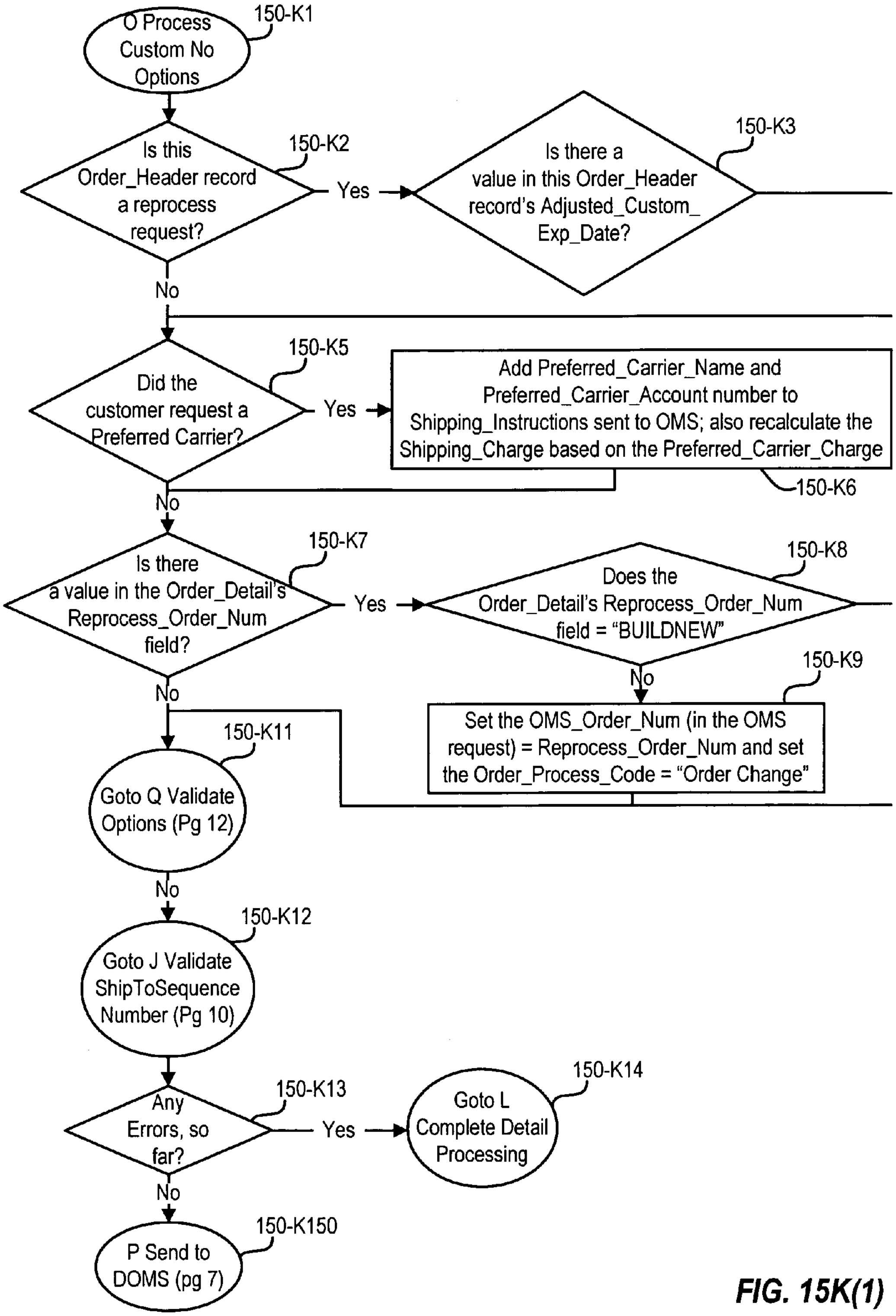
FIG. 15K(1)

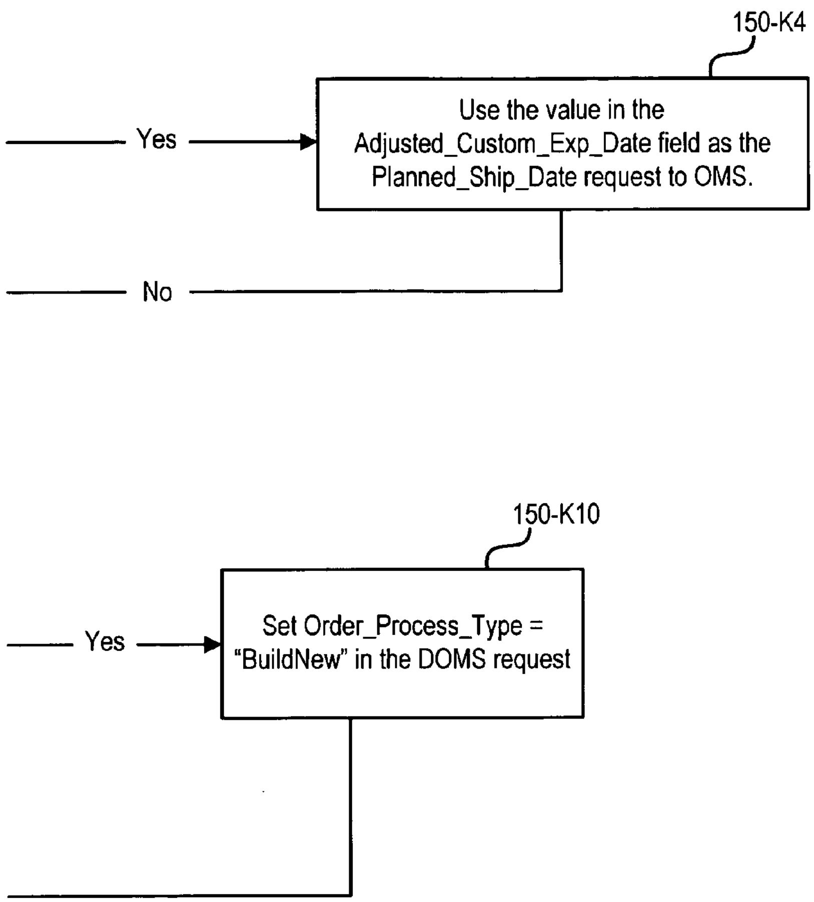
FIG. 15K(2)

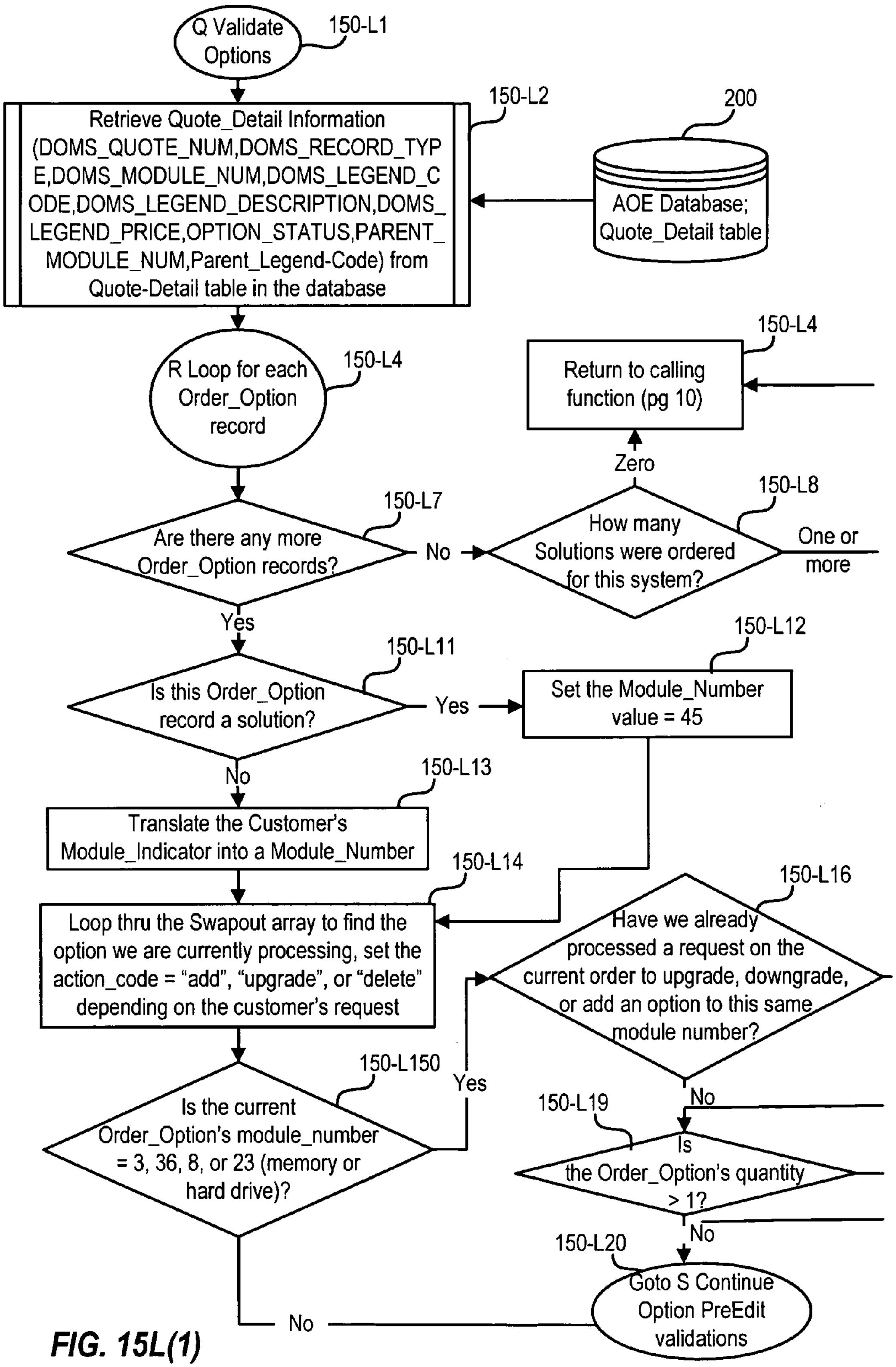
FIG. 15L(1)

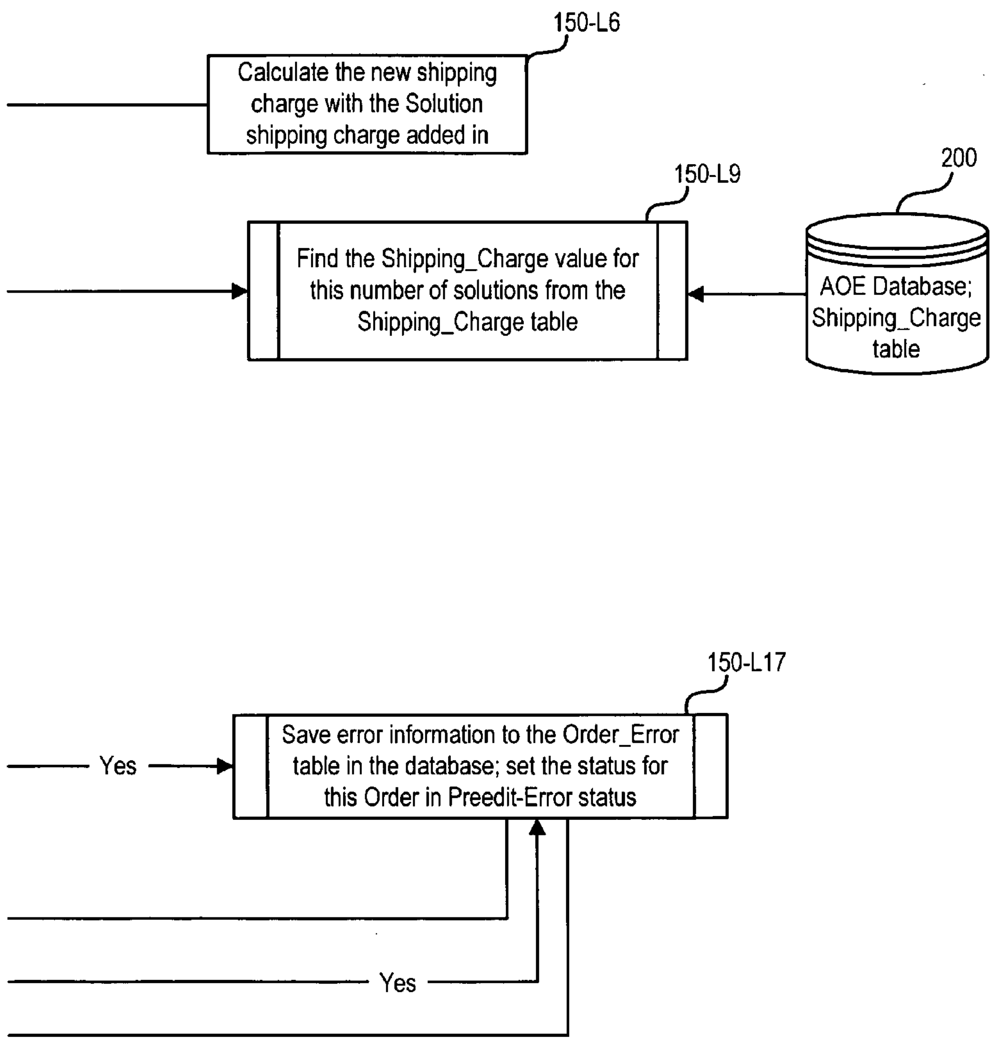
*FIG. 15L(2)*

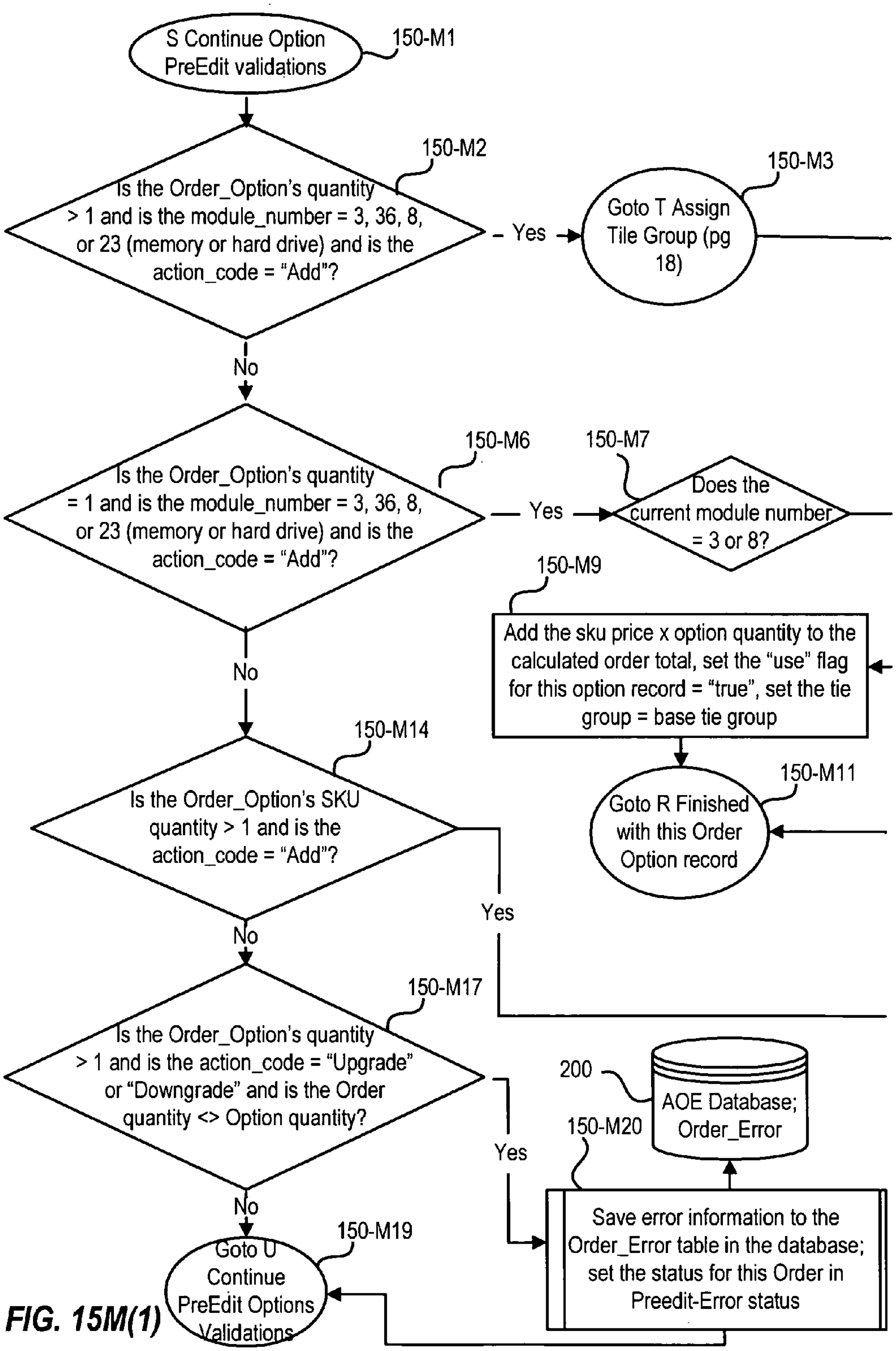
FIG. 15M(1)

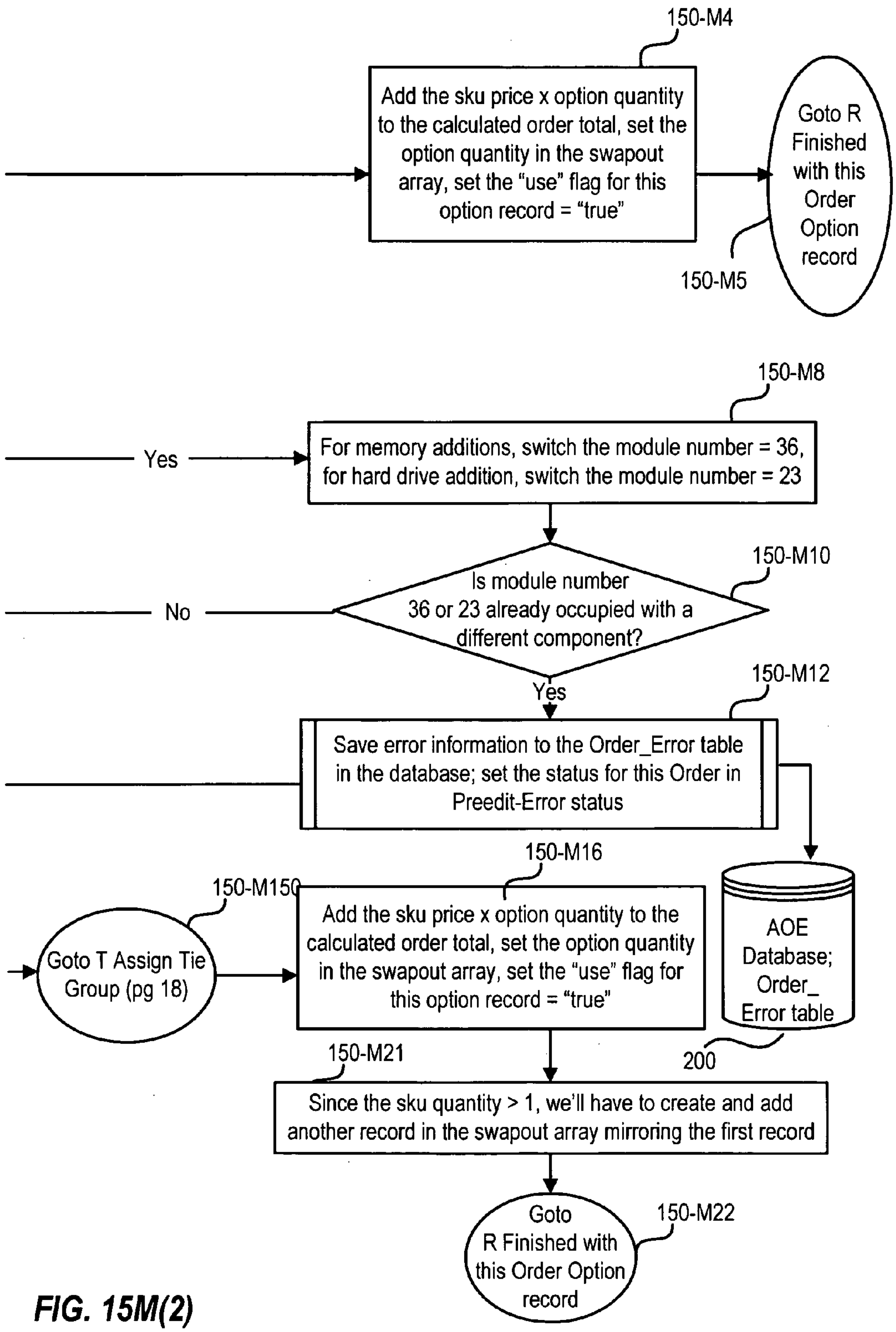
*FIG. 15M(2)*

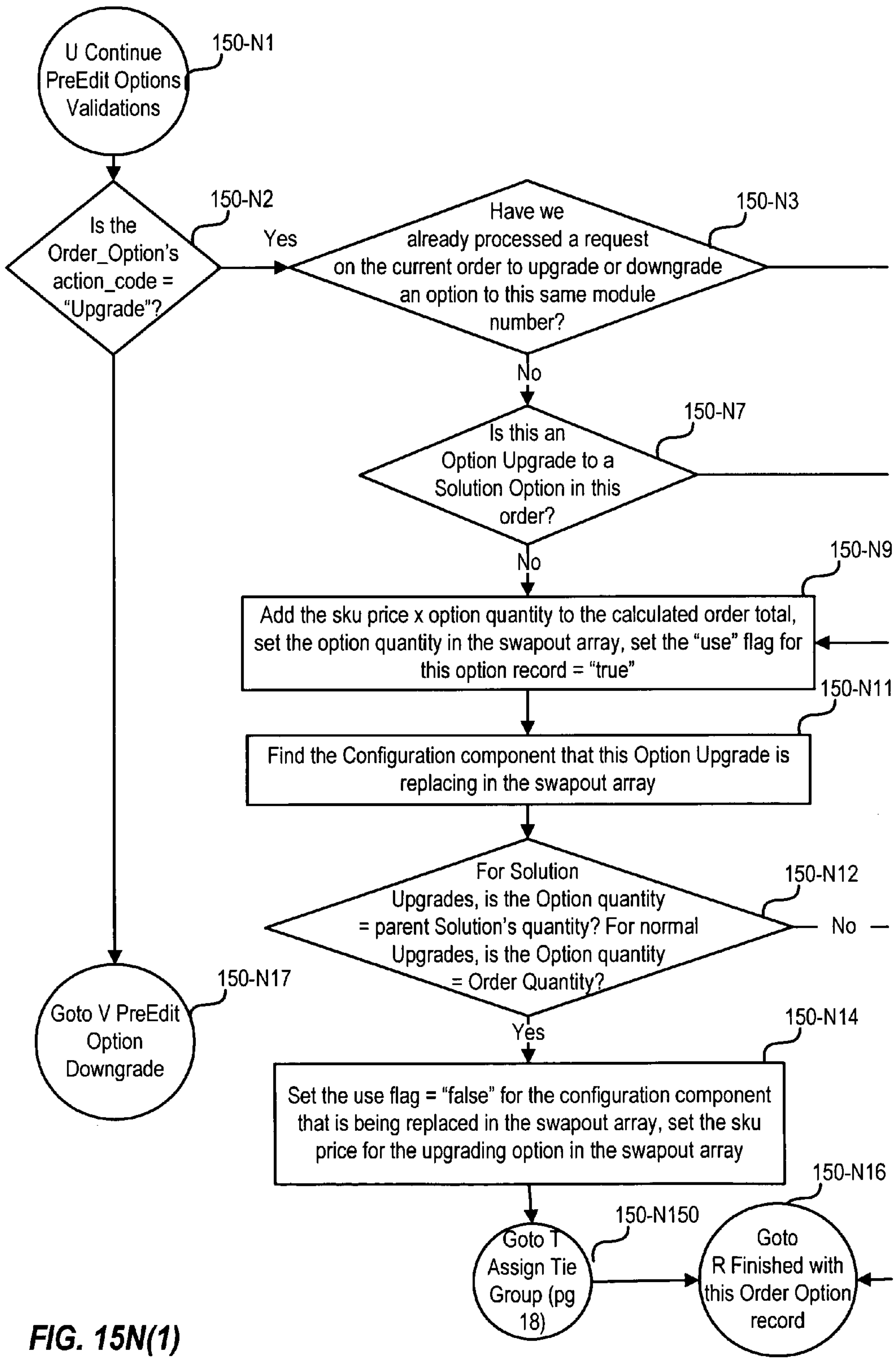
FIG. 15N(1)

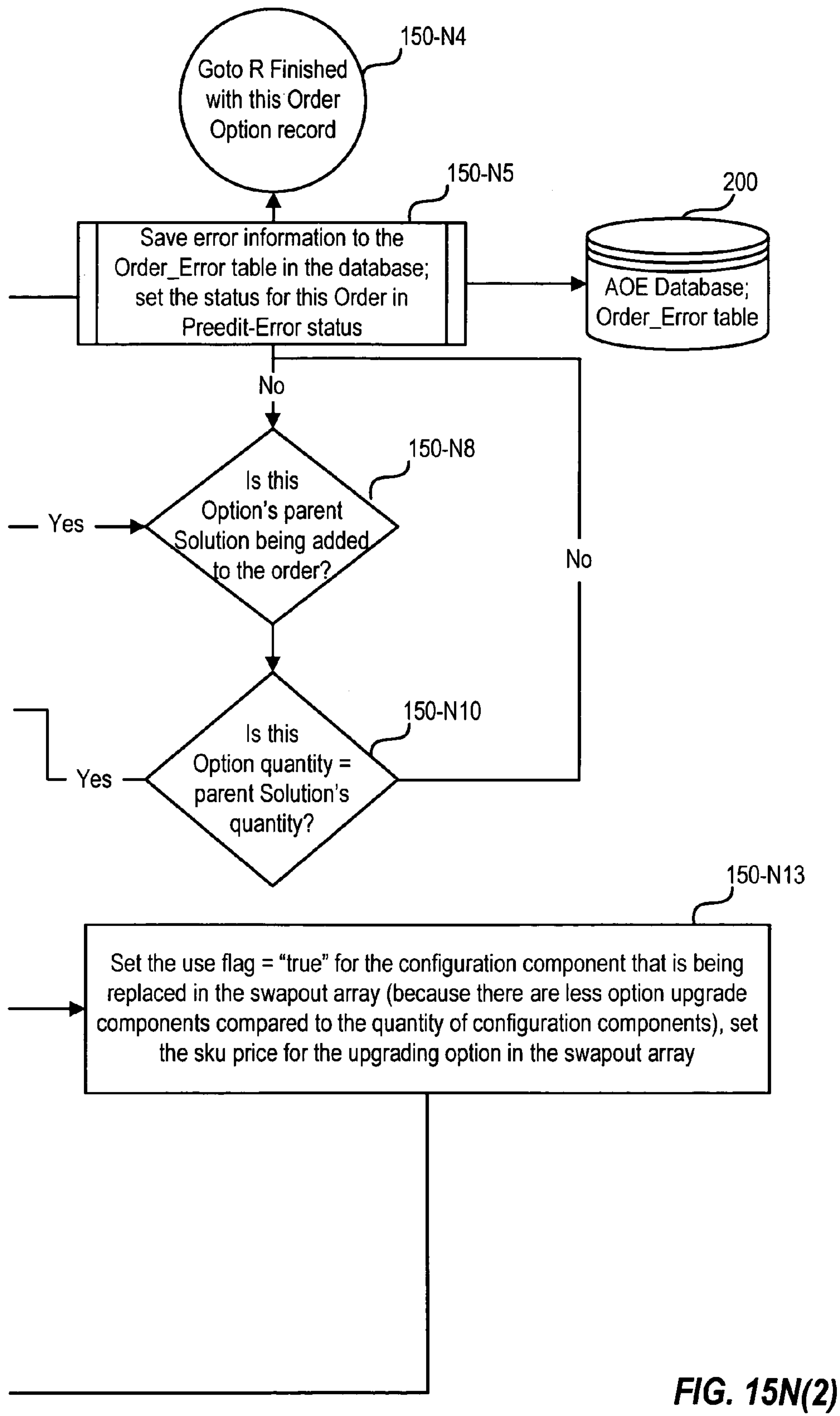
FIG. 15N(2)

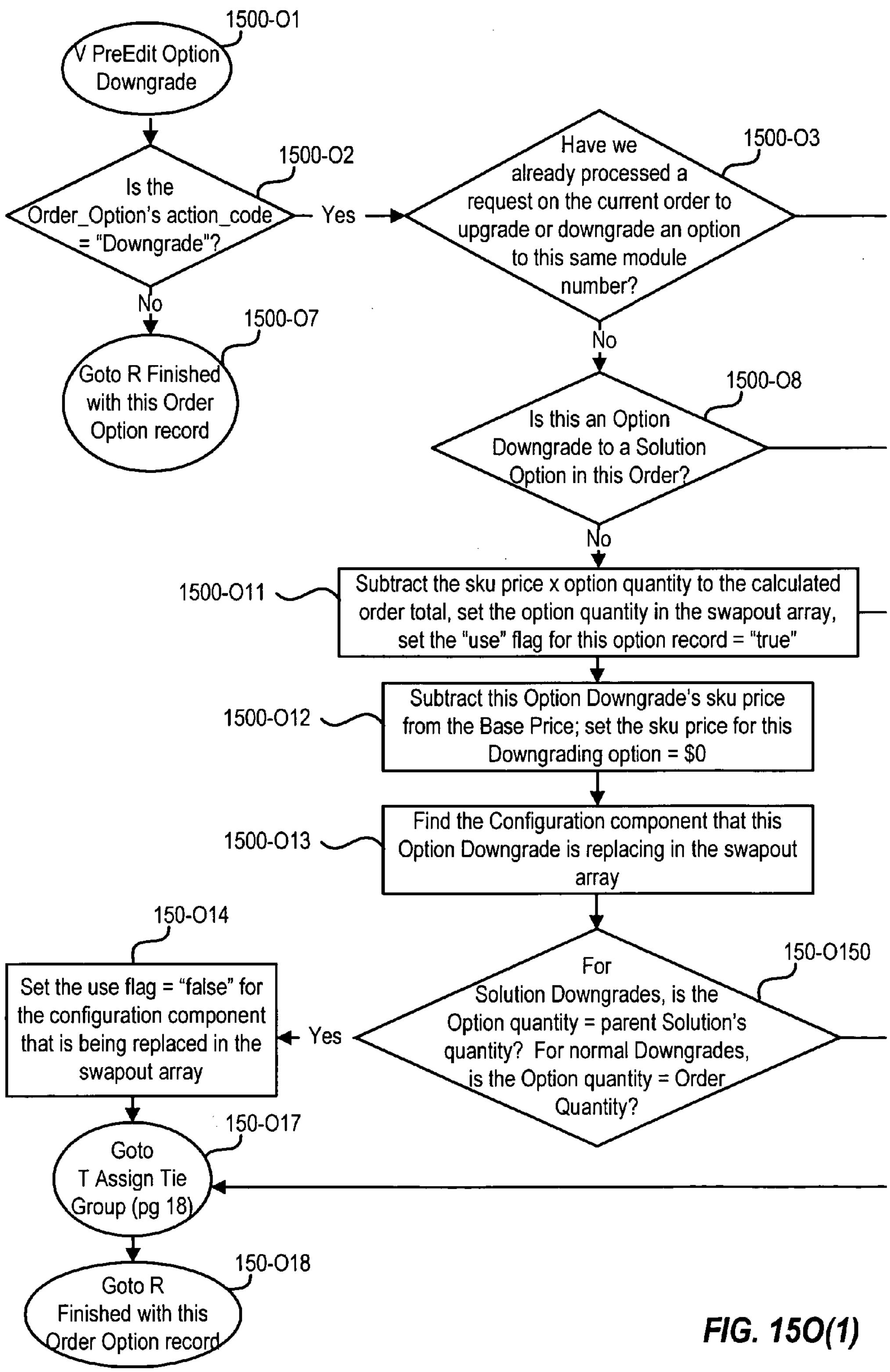
FIG. 15O(1)

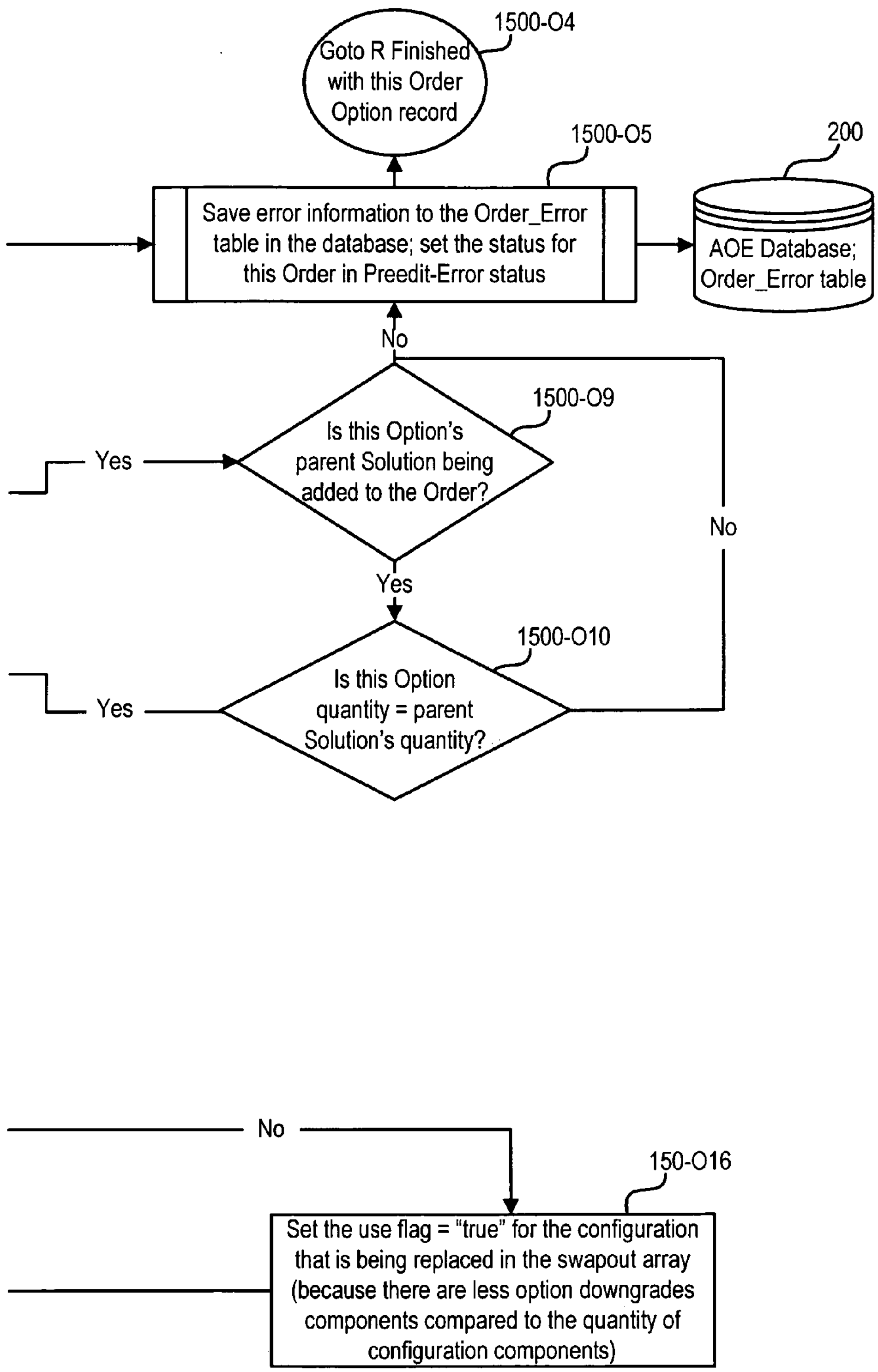
FIG. 15O(2)

DATA STRUCTURE FOR USE IN AN AUTOMATED ORDER ENTRY SYSTEM

This application relates to application Ser. No. 09/593,109, filed on even date herewith, entitled "Data Structure for use in an Automatic Order Entry System" and naming Theresa M. Gosko, Joyce Sham, Reynaldo Ortega, Joy Fang and Emil Harsa, as inventors, the application being incorporated herein by reference in its entirety.

This application relates to application Ser. No. 09/593,110, filed on even date herewith, entitled "A System and Method for an Automated Inventory Process" and naming Theresa M. Gosko, Joyce Sham, Reynaldo Ortega, Joy Fang and Emil Harsa, as inventors, the application being incorporated herein by reference in its entirety.

This application relates to application Ser. No. 09/593,112, filed on even date herewith, entitled "An Automated Configuration Catalog" and naming Theresa M. Gosko, as inventor, the application being incorporated herein by reference in its entirety.

This application relates to application Ser. No. 09/592,739, filed on even date herewith, entitled "Translator for Use in an Automatic Order Entry System" and naming Theresa M. Gosko, as inventor, the application being incorporated herein by reference in its entirety.

This application relates to application Ser. No. 09/593,727, filed on even date herewith, entitled "A Customer-Hosted Automated Configuration Catalog" and naming Theresa M. Gosko, as inventor, the application being incorporated herein by reference in its entirety.

This application relates to application Ser. No. 09/593,590, filed on even date herewith, entitled "A Translation System for Configuration Data" and naming Theresa M. Gosko, and Joy Fang, as inventors, the application being incorporated herein by reference in its entirety.

BACKGROUND OF THE INVENTION

1. Field of the Invention

The present invention relates to automated order entry systems and more particularly to data structures for use in automated order entry systems.

2. Description of the Related Art

Electronic commerce, or e-commerce includes the transfer of orders or other sales communications, credit information, electronic "funds", and digital products. Electronic commerce provides speed and convenience to many types of commercial activities. Interest in electronic commerce has heightened with the advent of widely accessible communication systems such as the Internet. Other types of electronic commerce include direct telephone line connections, interactive cable or television services, facsimile services, local and wide area network communications and the like. Electronic data communications technologies, particularly the Internet, have greatly enhanced marketing and retail opportunities and activities.

Electronic commerce has not been fully realized. There is a need to incorporate electronic communications technologies to synchronize customer interactions with businesses. More specifically, electronic commerce capabilities need to be expanded to synchronize business relationships with customers. For example, present electronic commerce businesses do not provide customers with the capability of configuring non-commodity items such as services and configuration options that permit a customer to create a product and order the product so created. Additionally, electronic commerce presently fails to provide cohesive, integrated manufacturing processes that automate customer relationships.

SUMMARY OF THE INVENTION

In accordance with the present invention, data structures for transferring catalog and system order information between a manufacturer and a customer are shown. The data structures are configured to allow custom systems to be automatically ordered. These data structures advantageously allow a manufacturer and customer to electronically order systems, and specifically, non-commodity systems, quickly and easily.

More specifically, in one aspect the invention relates to a data structure for providing a catalog from a manufacturer to a customer. The catalog includes a catalog header portion, a system identification portion and a system type indicator. The system identification portion includes a system type indicator which indicates whether a system is a bundled system or a custom system.

In another aspect the invention relates to a data structure for acknowledging receipt a catalog by a customer to a manufacturer. The data structure includes an acknowledgement header portion and an acknowledgement detail portion. The acknowledgement header portion includes a reference identification element which references a catalog containing custom systems.

In another aspect the invention relates to a data structure for providing an order from a customer to a manufacturer using a catalog that includes custom systems. The data structure includes an order header portion, an order detail portion and an option detail portion. The order detail portion includes information about a specific configuration for the order. The option detail portion includes information allowing ordering of a custom system.

In another aspect the invention relates to a data structure for acknowledging receipt an order by a customer to a manufacturer. The data structure includes an acknowledgement header portion and an acknowledgement detail portion. The acknowledgement header portion includes a reference identification element referencing a custom order.

BRIEF DESCRIPTION OF THE DRAWINGS

The present invention may be better understood, and its numbers objects, features and advantages made apparent to those skilled in the art by referencing the accompanying drawings. The use of the same reference number throughout the several figures designates a like or similar element.

FIGS. 4A-1A through 4A-1E illustrates a single flow diagram illustrating catalog acknowledgment module 405 shown in FIG. 4A.

FIGS. 4A-2A through 4A-D is a single flow diagram illustrating status update module 406 shown in FIG. 4A.

FIG. 4B is a block diagram of a catalog process of a manufacturer including server applications in accordance with an embodiment of the invention.

FIGS. 5-3 is a logic flow diagram for the software module "Catalog Maintenance" shown in FIG. 5.

FIGS. 5-4 is a logic flow diagram for the software module "Customer Email Addresses" shown in FIG. 5.

FIGS. 5-5 is a logic flow diagram for the software module "Catalog Transport" shown in FIG. 5.

FIGS. 5-6A through FIGS. 5-6F are logic flow diagrams for the software modules "Quote List" and "Create Catalog" shown in FIG. 5.

FIGS. 5-6AA through FIGS. 5-6AH-8 are logic flow diagrams for the software modules for creating reports via the graphical user interface in accordance with module **506*a* shown in FIG. 5**.

FIGS. 5-7A through FIGS. 5-7C are logic flow diagrams for the software module "Quote Header Editor" shown in FIG. 5.

FIGS. 5-8A through FIGS. 5-8K are logic flow diagrams for the software module "Add Quote" shown in FIG. 5.

FIGS. 5-9 is a logic flow diagram for the software module "Catalog file history" shown as module 509 in FIG. 5.

FIGS. 5-10A through FIGS. 5-610B are logic flow diagrams for the software module "Catalog Compare" shown in FIG. 5.

FIGS. 5-11A through FIGS. 5-11G are logic flow diagrams for the software module "SKU Detail" and "Add Customer Solution" shown in FIG. 5

FIGS. 5-12 is a logic flow diagram for the software module "Quote Detail" shown in FIG. 5.

FIGS. 5-13 is a flow diagram for module "Quote Status" 513 shown in FIG. 5.

FIGS. 5-15A through FIGS. 5-15E are logic flow diagrams for the software modules "Quote Replace" and "Quote Copy" shown in FIG. 5.

FIGS. 5-17A through FIGS. 5-17C are logic flow diagrams for the software module "Catalog Extract" and the software module "Catalog Compare" shown in FIG. 5

FIGS. 5-18 is a logic flow diagram for the software module "Legend Detail" shown in FIG. 5.

FIGS. 5-19A and 5-19B are logic flow diagrams for the software module "Add Customer Kit" shown in FIG. 5.

FIGS. 5-21 is a logic flow diagram for the software module "Delete Customer Kit" shown in FIG. 5.

FIGS. 5-22A and 5-22B are logic flow diagrams for the software module "Delete Custom Solution" shown in FIG. 5.

FIG. 6 is a block diagram illustrating a method for a translation process in accordance with an embodiment of the present invention.

FIGS. 6A through 6BB are logic flow diagrams for a translation process in accordance with an embodiment of the invention.

FIGS. 7A and 7B show a block diagram of an inventory process.

FIG. 8 is block diagram for a graphical user interface showing software modules of an inventory process.

FIG. 9 is a logic flow diagram for a "Stocking Maintenance" software module shown in FIG. 8.

FIGS. 10, 10-1A, 10-1B, and 10-2 are logic flow diagrams for a "Quote List" software module shown in FIG. 8.

FIGS. 10-3 is a logic flow diagram for the "Stocking Order Header" software module shown in FIG. 8.

FIGS. 10-4 and 10-5 represents a logic flow diagram for the "Stocking Order Detail List" software module shown in FIG. 8.

FIGS. 10-6A and 10-6B are logic flow diagrams for the "Stocking Order Detail Change" software module shown in FIG. 8.

FIGS. 10-7 is a logic flow diagram for the "Stocking Order Inventory" software module shown in FIG. 8.

FIGS. 10-8 is a logic flow diagram for the "Stocking Order Available Inventory" software module shown in FIG. 8.

FIGS. 11-1A through 11-1D show a logic flow diagram for a batch program "Stocking Order Router" shown in FIG. 7A.

FIG. 12 is a logic flow diagram of a batch program for providing a stocking order status update.

FIG. 13 is a block diagram illustrating a method in accordance with an inventory process in accordance with an embodiment of the invention.

FIG. 14 is a block diagram illustrating a method in accordance with an embodiment of the invention.

FIGS. 14A, 14B, and 14C illustrate block diagrams of an order process in accordance with an embodiment of the invention.

FIGS. 15A through 15S is a logic flow diagram for Order Processor 14A-15 shown in FIG. 14A.

FIG. 16 is a block diagram of a method for translating data between disparate platforms in accordance with an embodiment of the invention.

FIGS. 17-1 through 17-24 a logic flow diagram for OMS server 1240 in accordance with an order process and method for translating data is shown.

FIGS. 19A through 19K show a logic flow diagram for a batch program for an automated order change process in accordance with an embodiment of the invention.

FIGS. 22A through 22F is a logic flow diagram for a server program for order tracking in accordance with an embodiment of the invention.

FIG. 23 is a logic flow diagram of a graphical user interface for an order process in accordance with an embodiment of the invention.

FIGS. 23-3A through 23-3D represent a logic flow diagram for an Order Files module in FIG. 23.

FIGS. 23-4A and 23-4B are logic flow diagrams illustrating the Shipping Charge module in FIG. 23.

FIGS. 23-5A and 23-5B are logic flow diagrams illustrating the Email List module in FIG. 23. FIGS. 23-6A through 23-6C are logic flow diagrams illustrating the Advance Shipment Notice module in FIG. 23.

FIGS. 23-7 is a logic flow diagram illustrating the Order Maintenance module in FIG. 23.

FIGS. 23-8A through 23-8H are logic flow diagrams illustrating the Tax Exempt Customer module in FIG. 23.

FIGS. 23-9A through 23-9E are logic flow diagrams illustrating the Manual Order Entry module in FIG. 23.

FIGS. 23-10A and 23-10B are logic flow diagrams illustrating Order Summary module in FIG. 23.

FIGS. 23-11A through 23-11J are logic flow diagrams illustrating the View Pending Order module in FIG. 23.

FIGS. 23-12 is a logic flow diagram illustrating the Non-Working Day module in FIG. 23.

FIGS. 23-13 is logic flow diagram illustrating the Order Transport in FIG. 23.

FIGS. 23-15A and 23-15B are logic flow diagrams illustrating the Order Information module in FIG. 23.

FIGS. 23-17A through 17C are logic flow diagrams illustrating the Order Detail Information module in FIG. 23.

FIGS. 23-18 is a logic flow diagram illustrating the Order Change/Cancel Information module in FIG. 23.

FIGS. 23-19A, 23-19B, 23-20, 23-21, 23-22, 23-23 and 24-24 are logic flow diagrams illustrating the Reports module in FIG. 23.

DETAILED DESCRIPTION

In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are shown in block diagram form in order to avoid unnecessarily obscuring the present invention.

Figure 1:
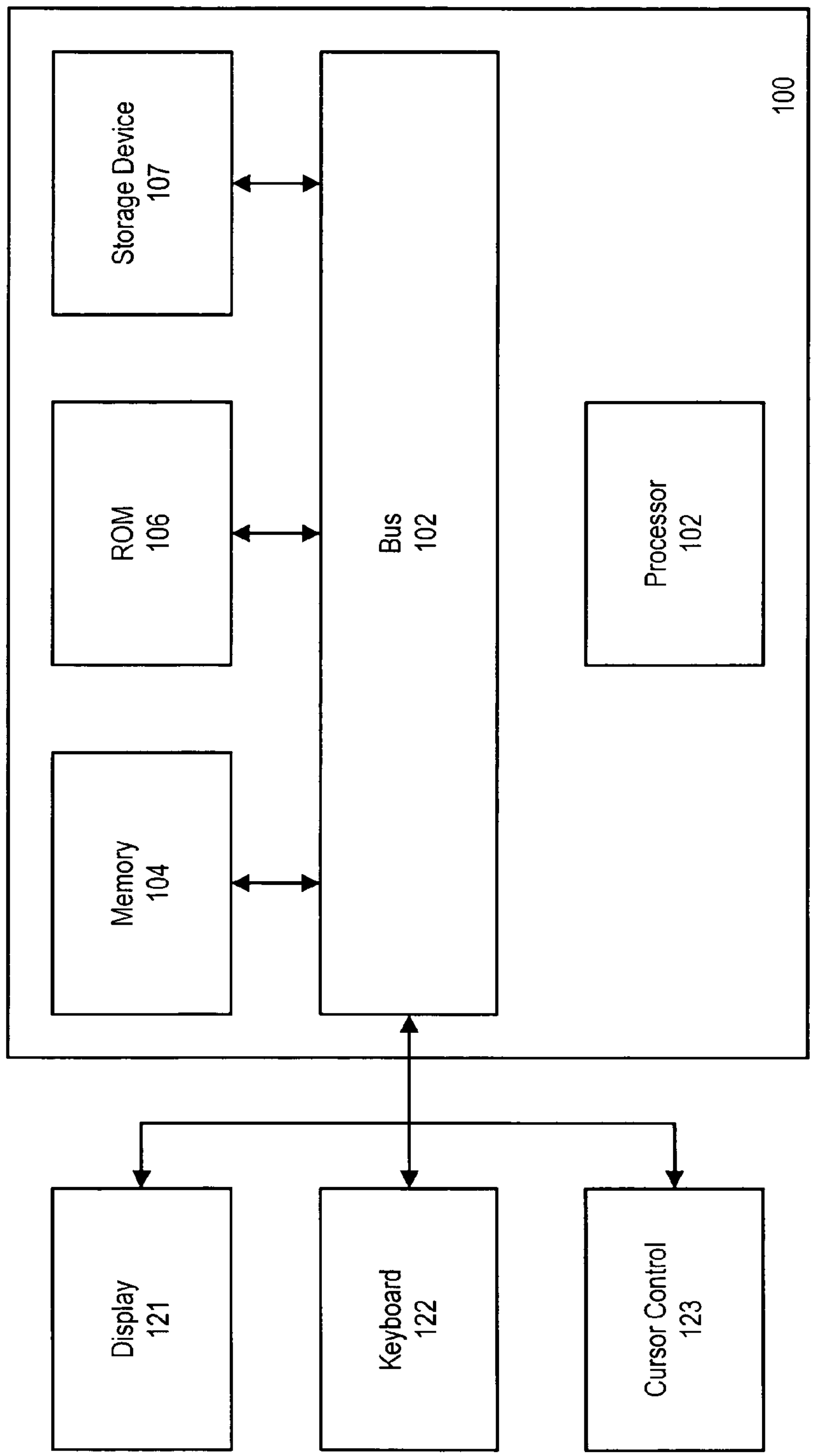
FIG. 1 is a block diagram of a computer system in accordance with an embodiment of the invention.

FIG. 1 illustrates a block diagram of a computer system 100 upon which an embodiment of the present invention may be implemented. Computer system 100 includes a bus 101 or other communication mechanism for communicating information, and a processor 102 coupled to bus 101 for processing information. Computer system 100 further comprises a memory dynamic storage 104 coupled to bus 101 for storing information and instructions to be executed by processor 102. Computer system 100 also includes a read only memory (ROM) and/or other static storage device 106 coupled to bus 101 for storing static information and instructions for processor 102. A data storage device 107, such as a magnetic disk or optical disk, is coupled to bus 101 for storing information and instructions.

Computer system 100 may also be coupled via bus 101 to a display device 121, such as a cathode ray tube (CRT), for displaying information to a computer user. Optionally, computer system 100 operates as a computer server or as a computer system coupled to a computer server. An input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Figure 2:
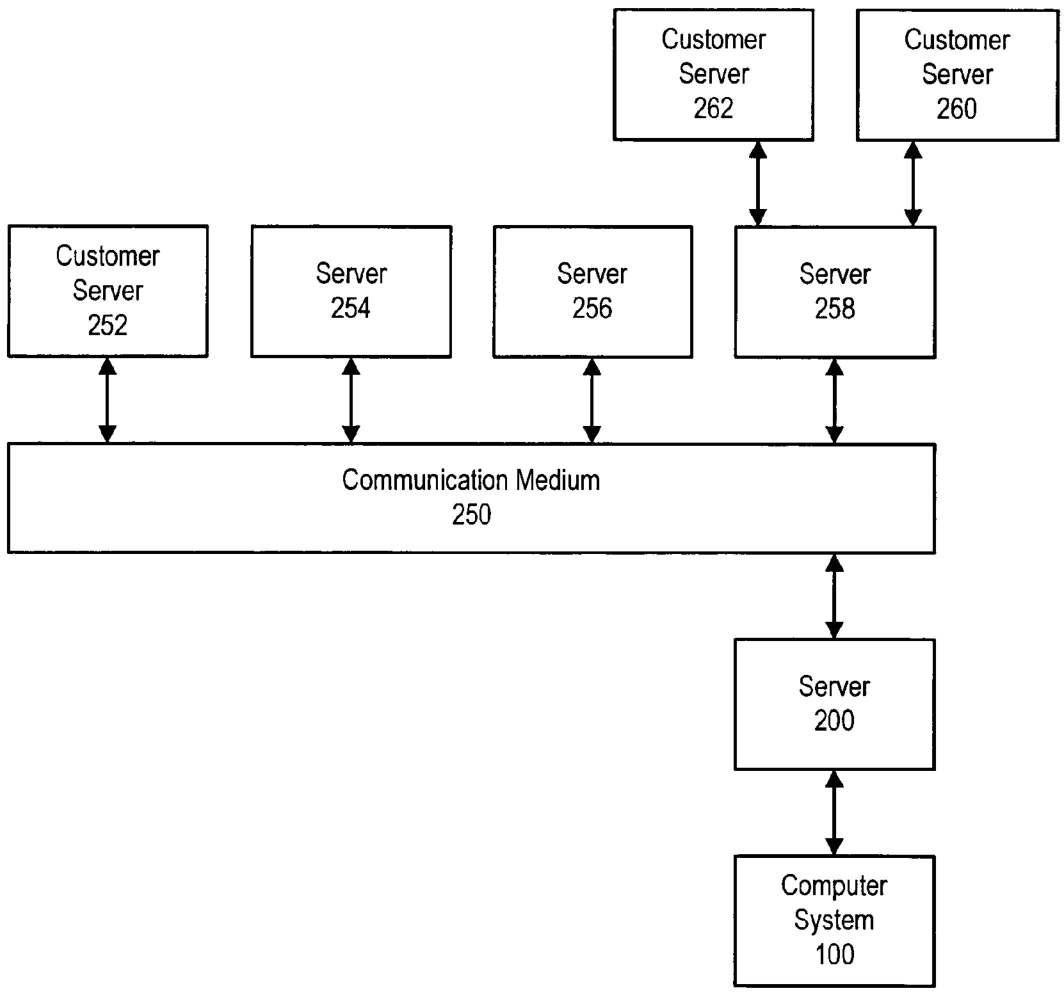
FIG. 2 is a block diagram of a computer server network including a communication medium in accordance with an embodiment of the invention.
Figure 3A:
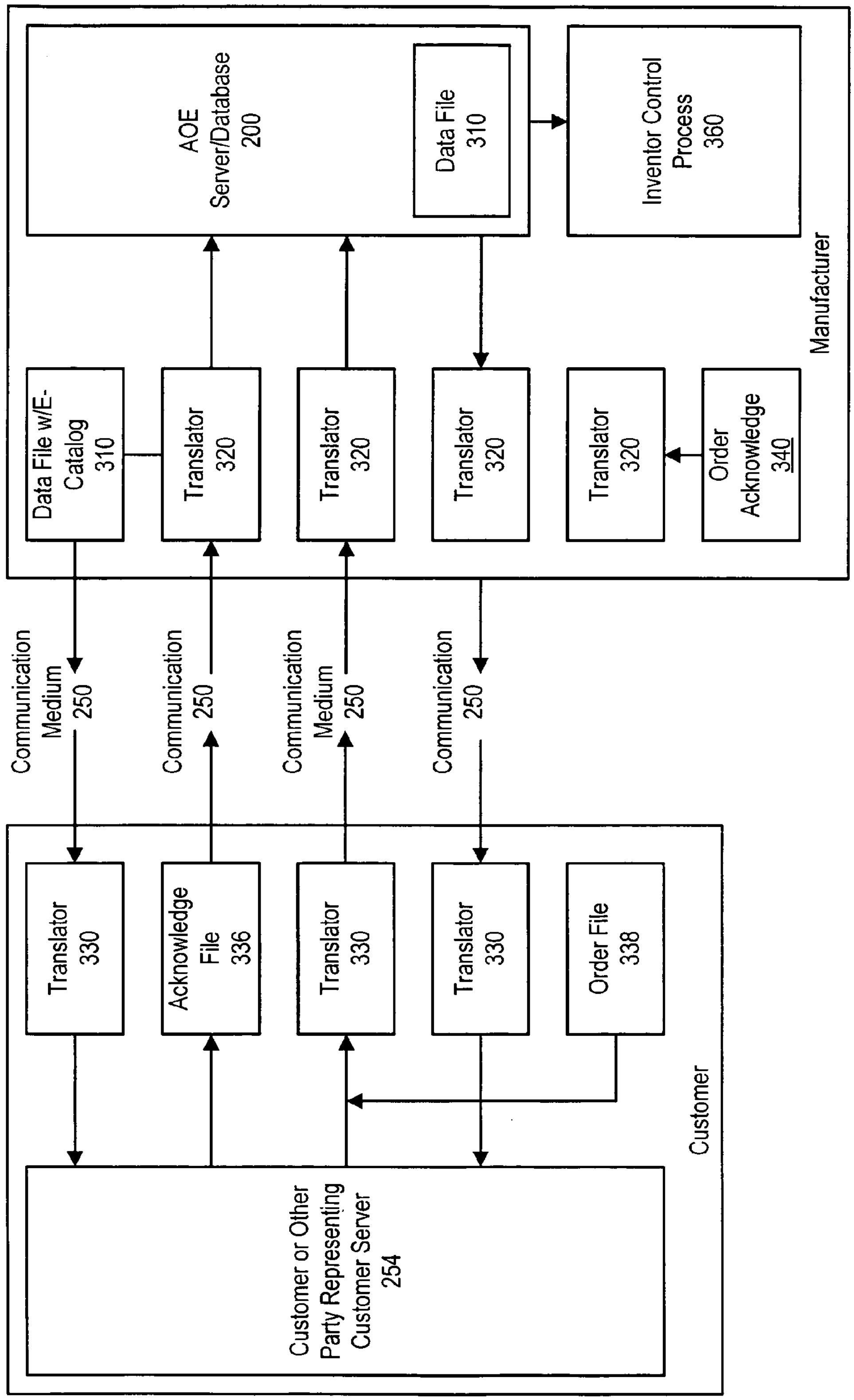
FIG. 3A is a block diagram of an automated order entry process in accordance with several embodiments of the invention.
Figure 3B:
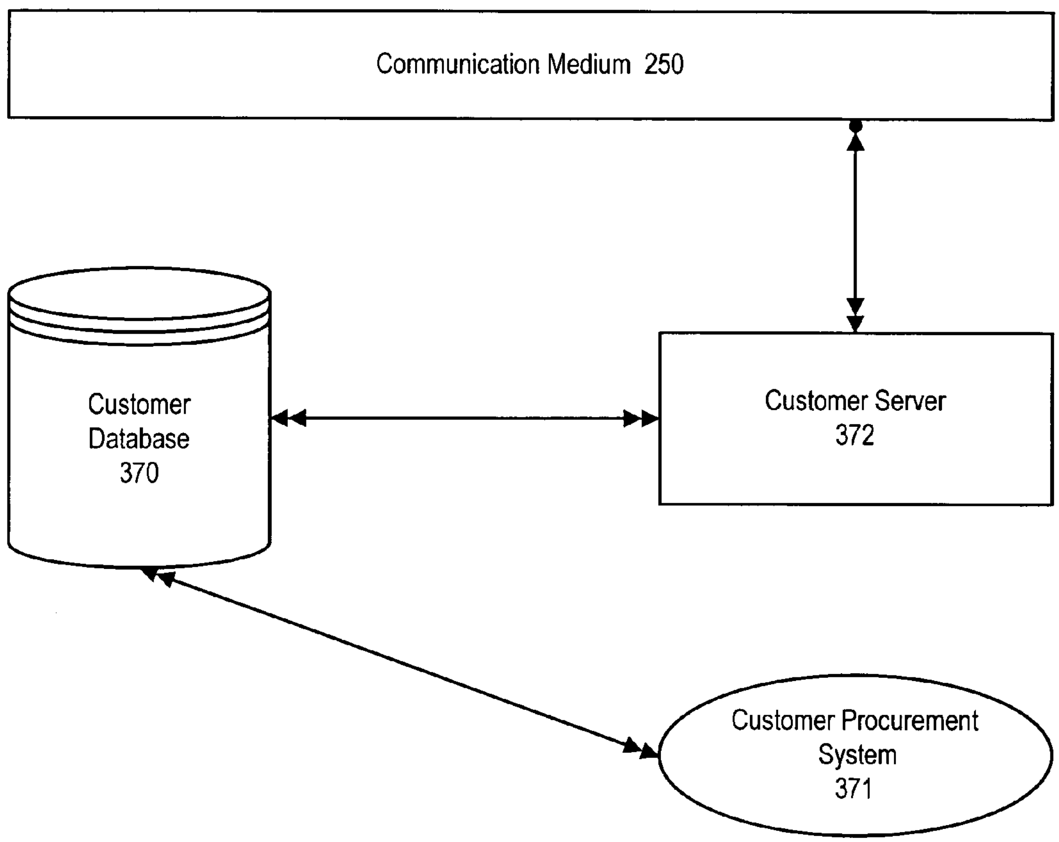
FIG. 3B is a block diagram of an automated order entry process from a customer perspective in accordance with several embodiments of the invention.
Figure 4A:
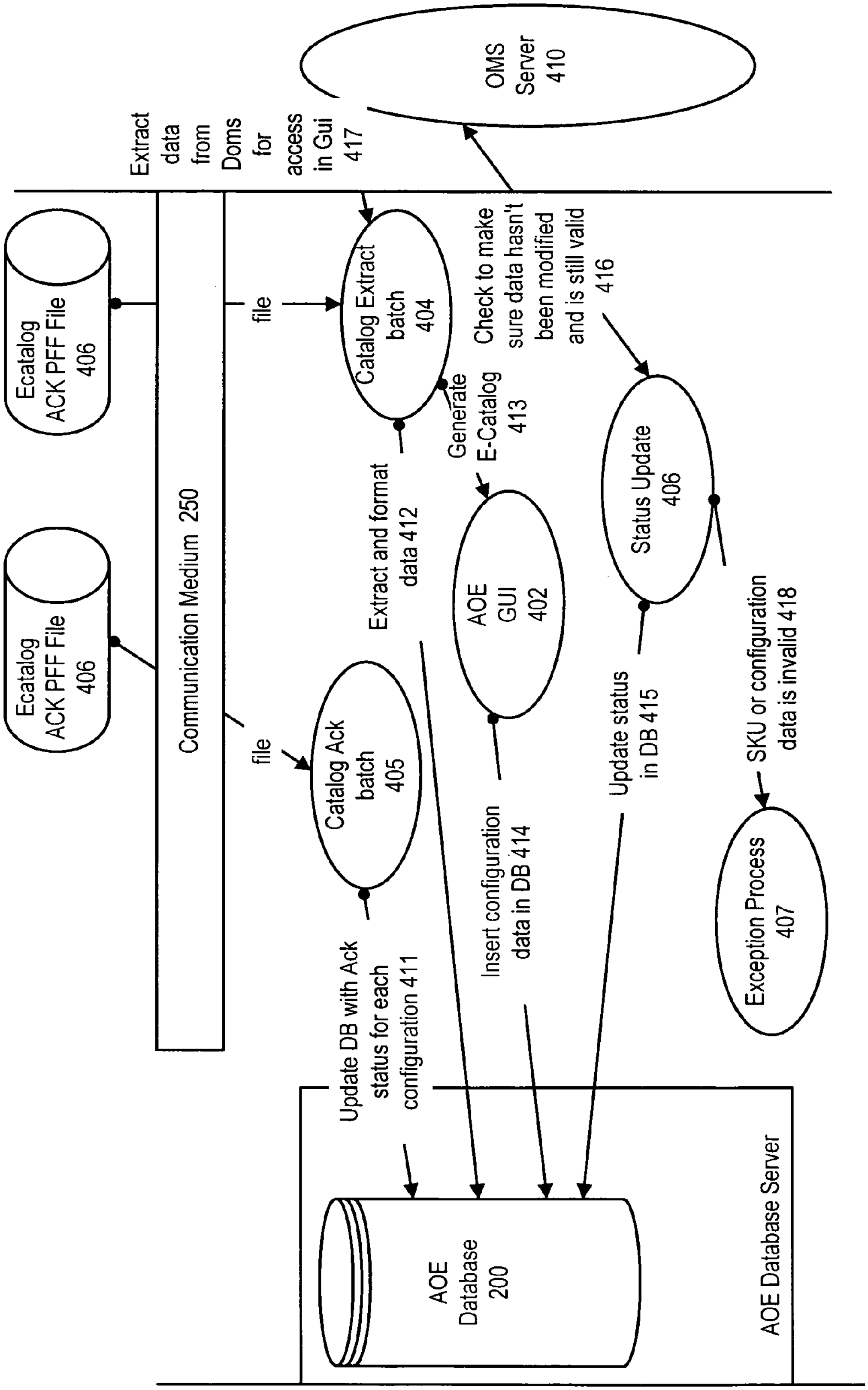
FIG. 4A is a block diagram of a catalog process of a manufacturer in accordance with an embodiment of the invention.
Figure 4B:
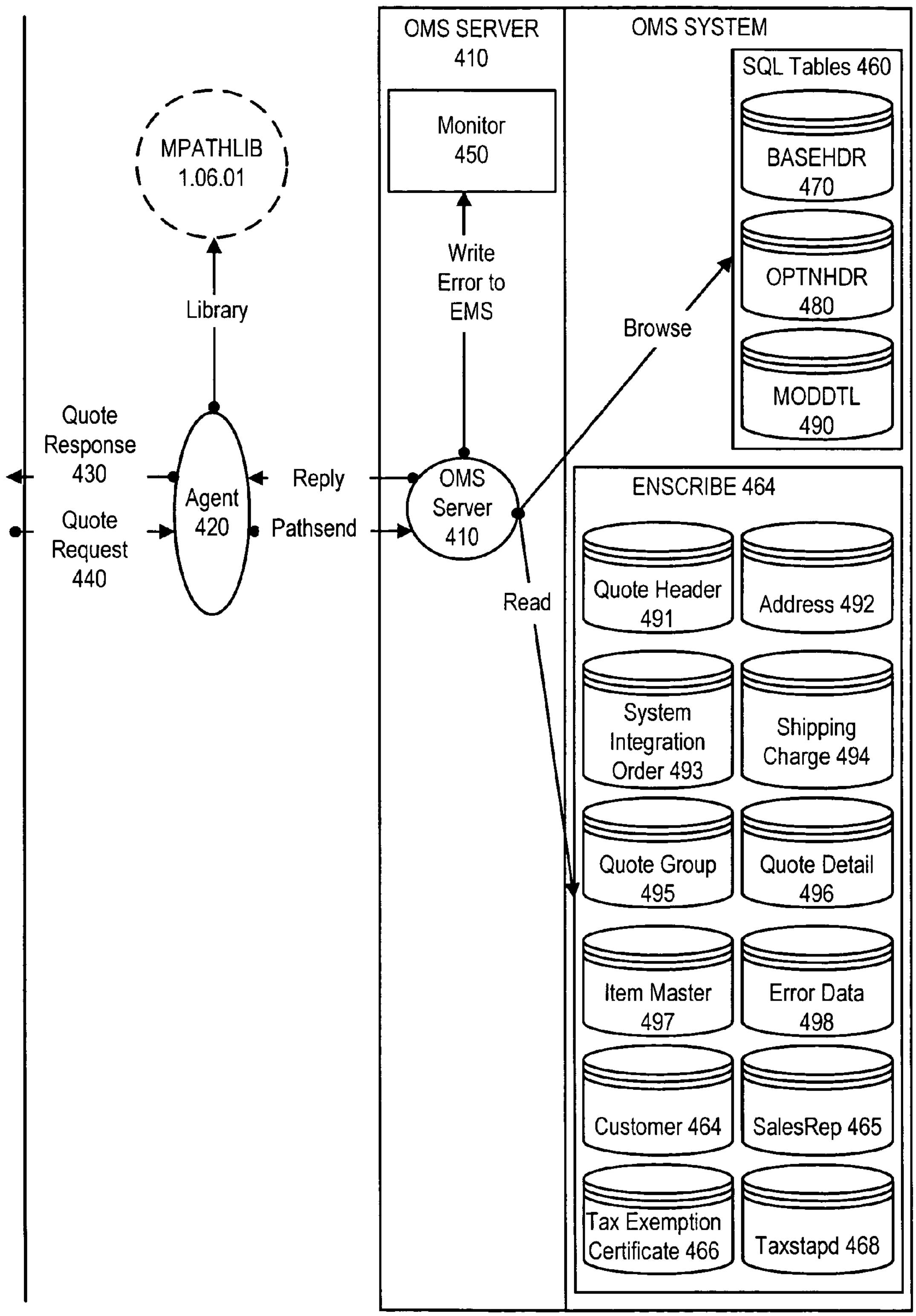
Figures 1A, 4A:
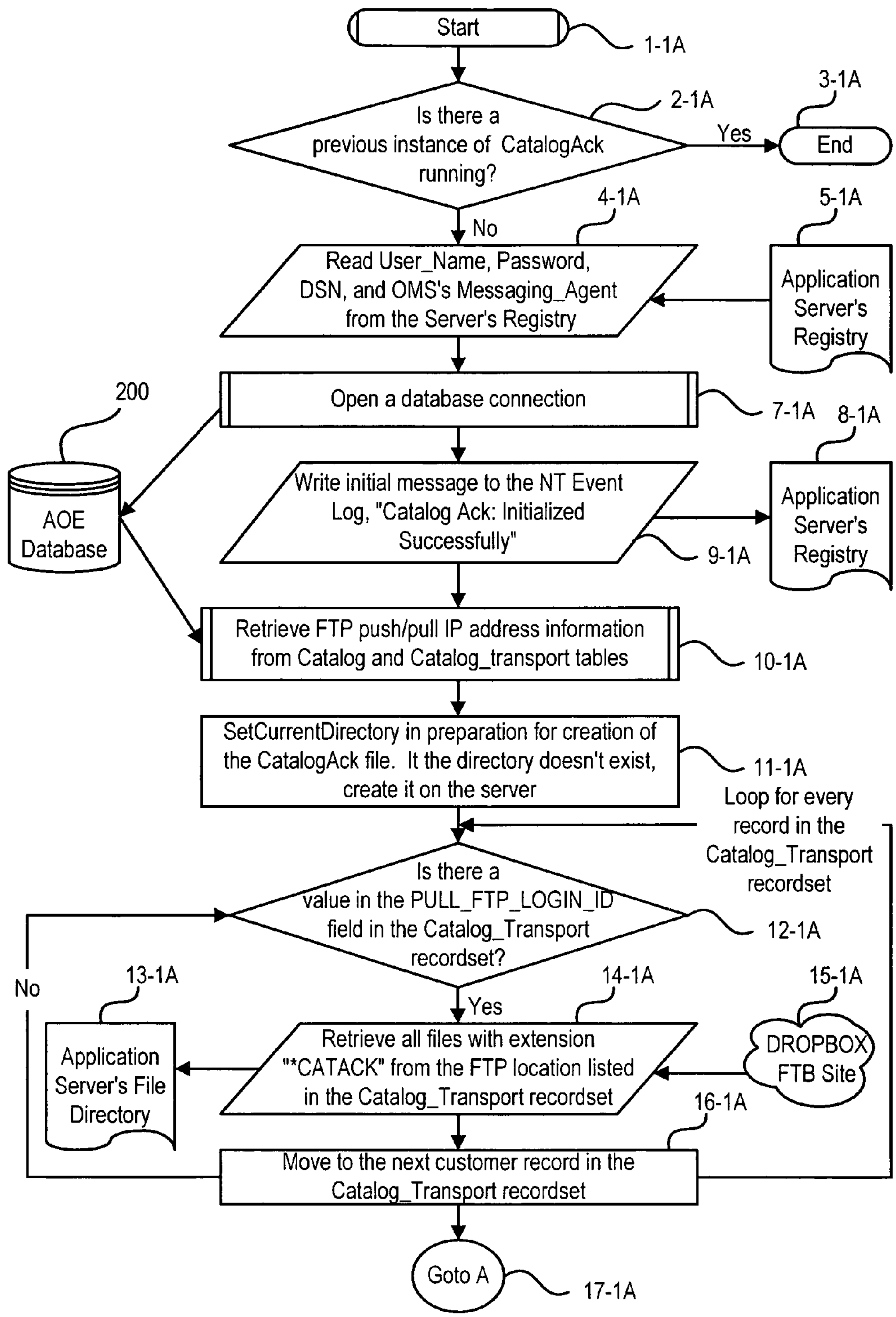
Figures 1B, 4A:
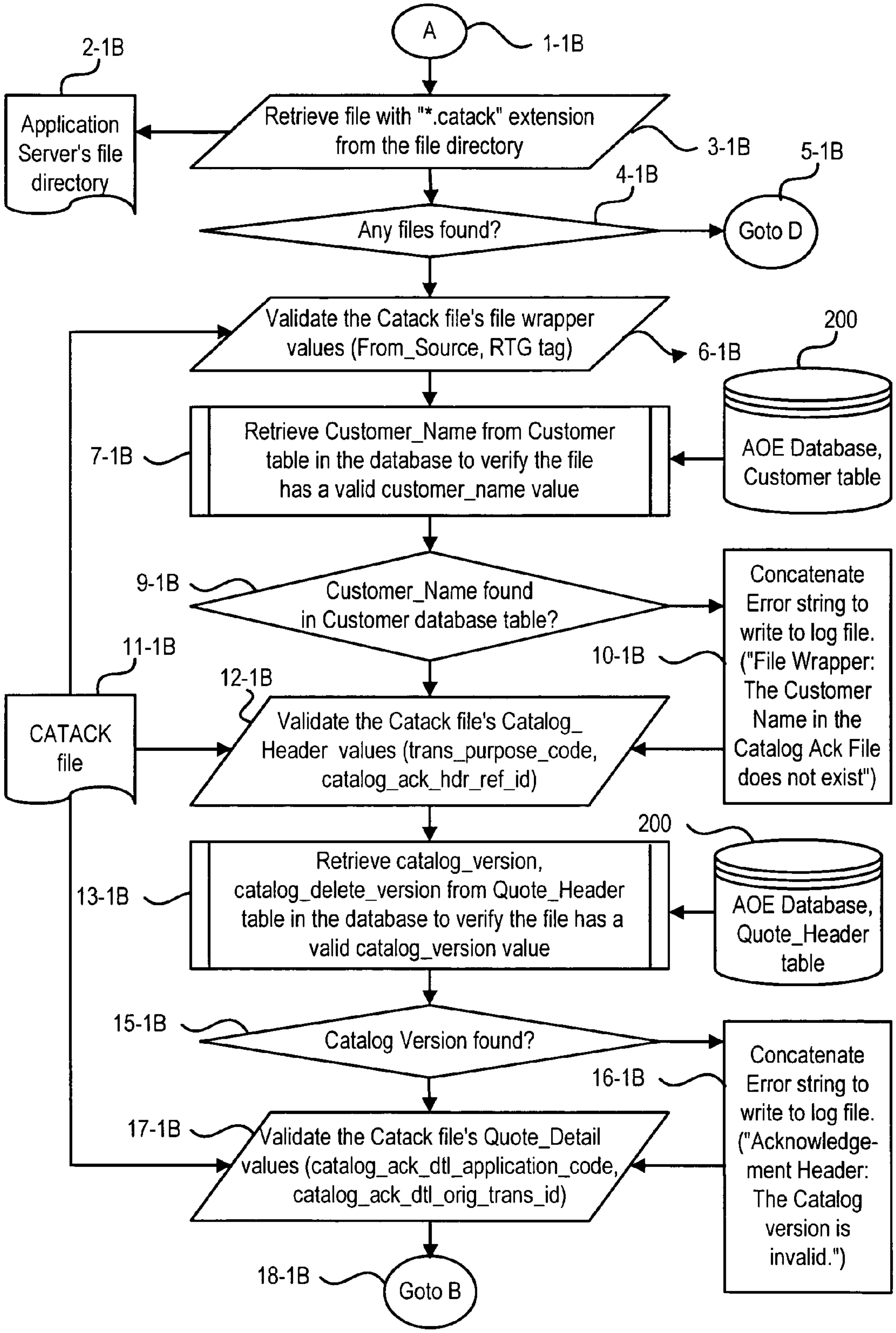
Figures 1C, 4A:
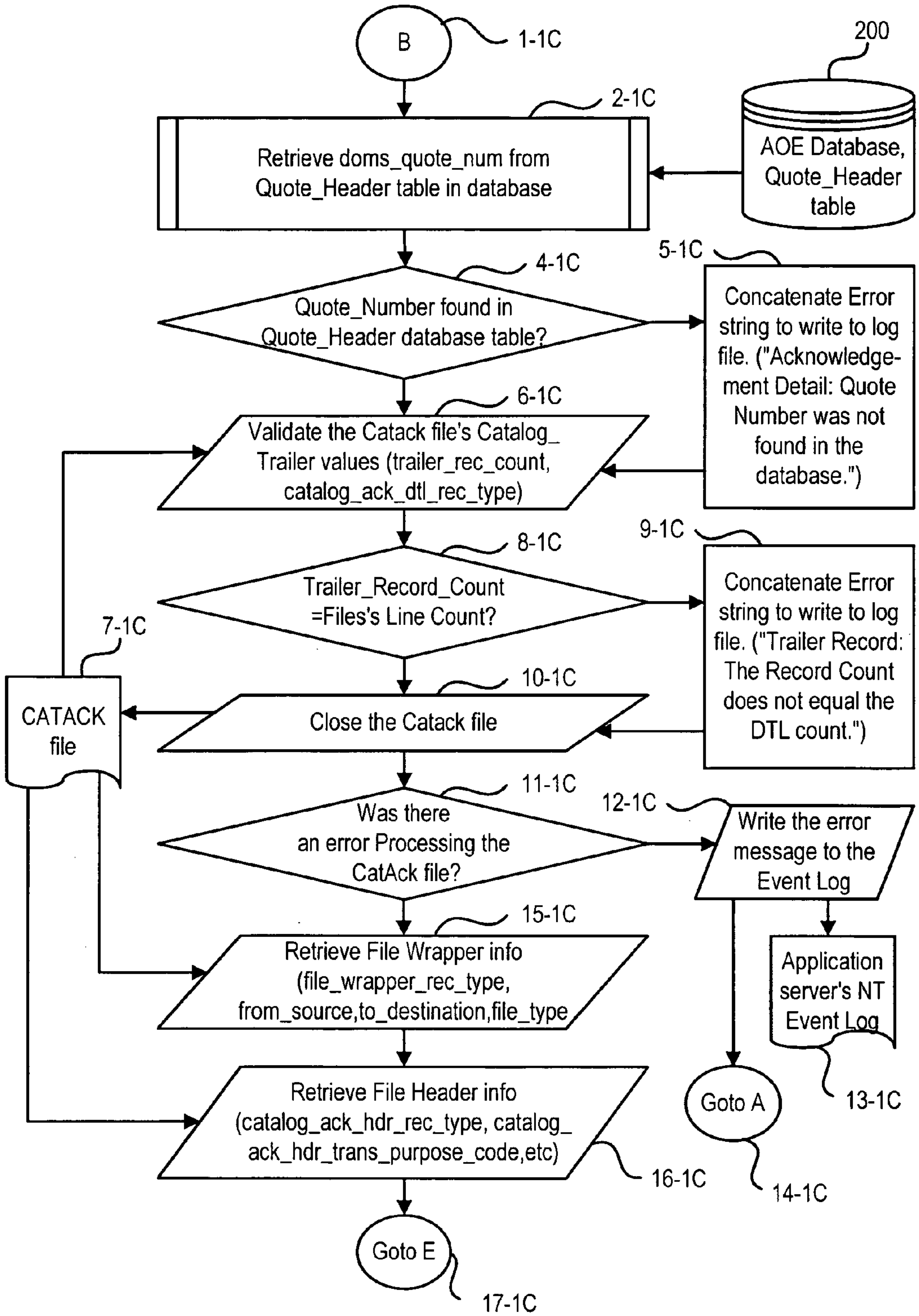
Figures 1D, 4A:
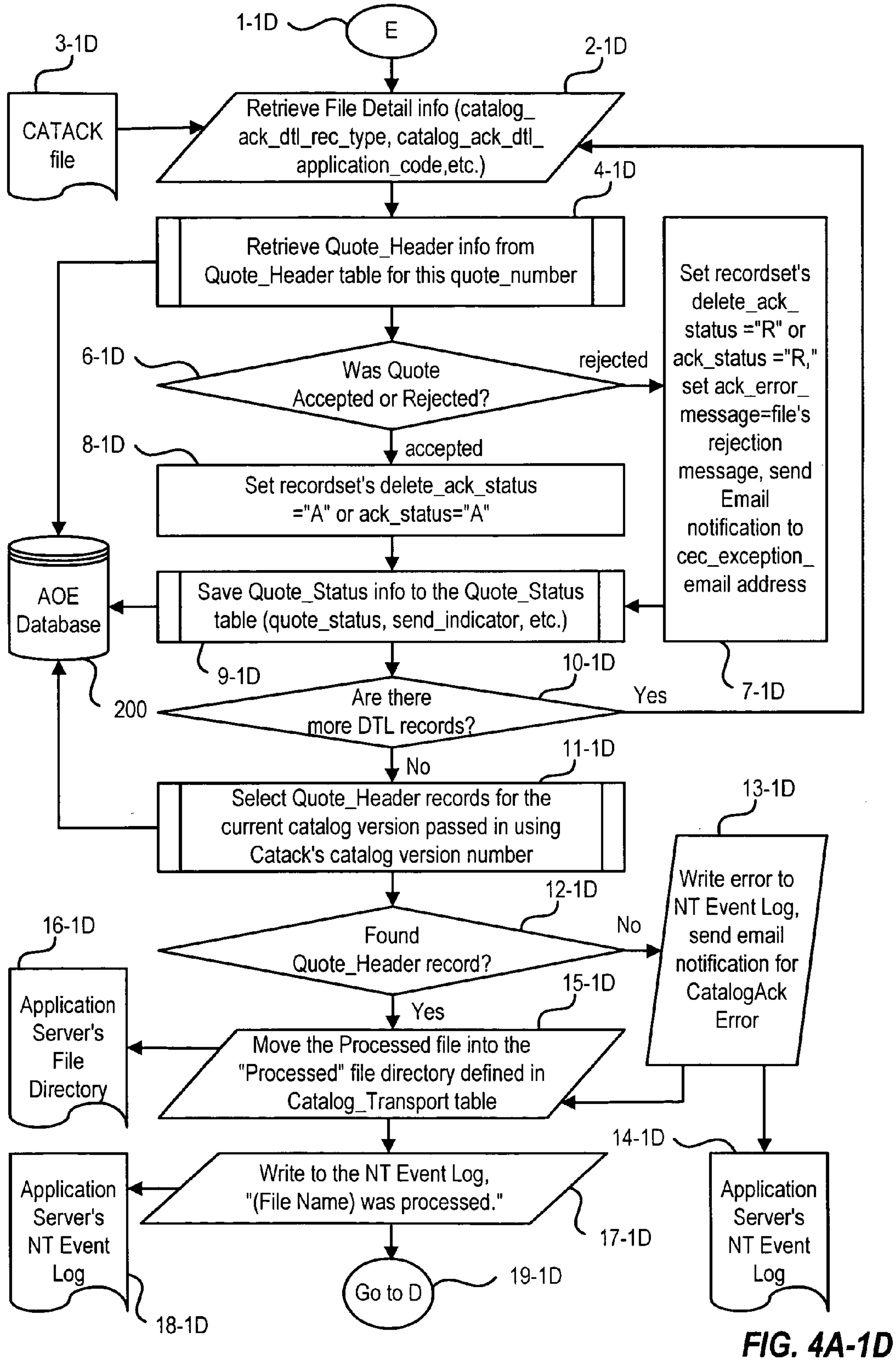
Figures 1E, 4A:
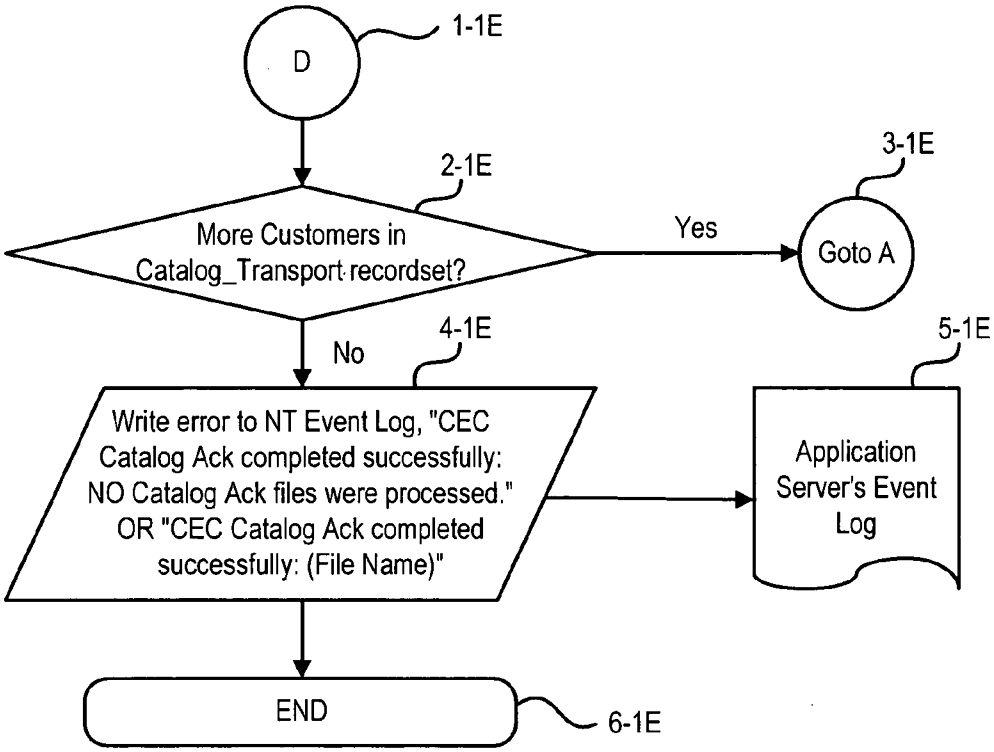
Figures 2A, 4A:
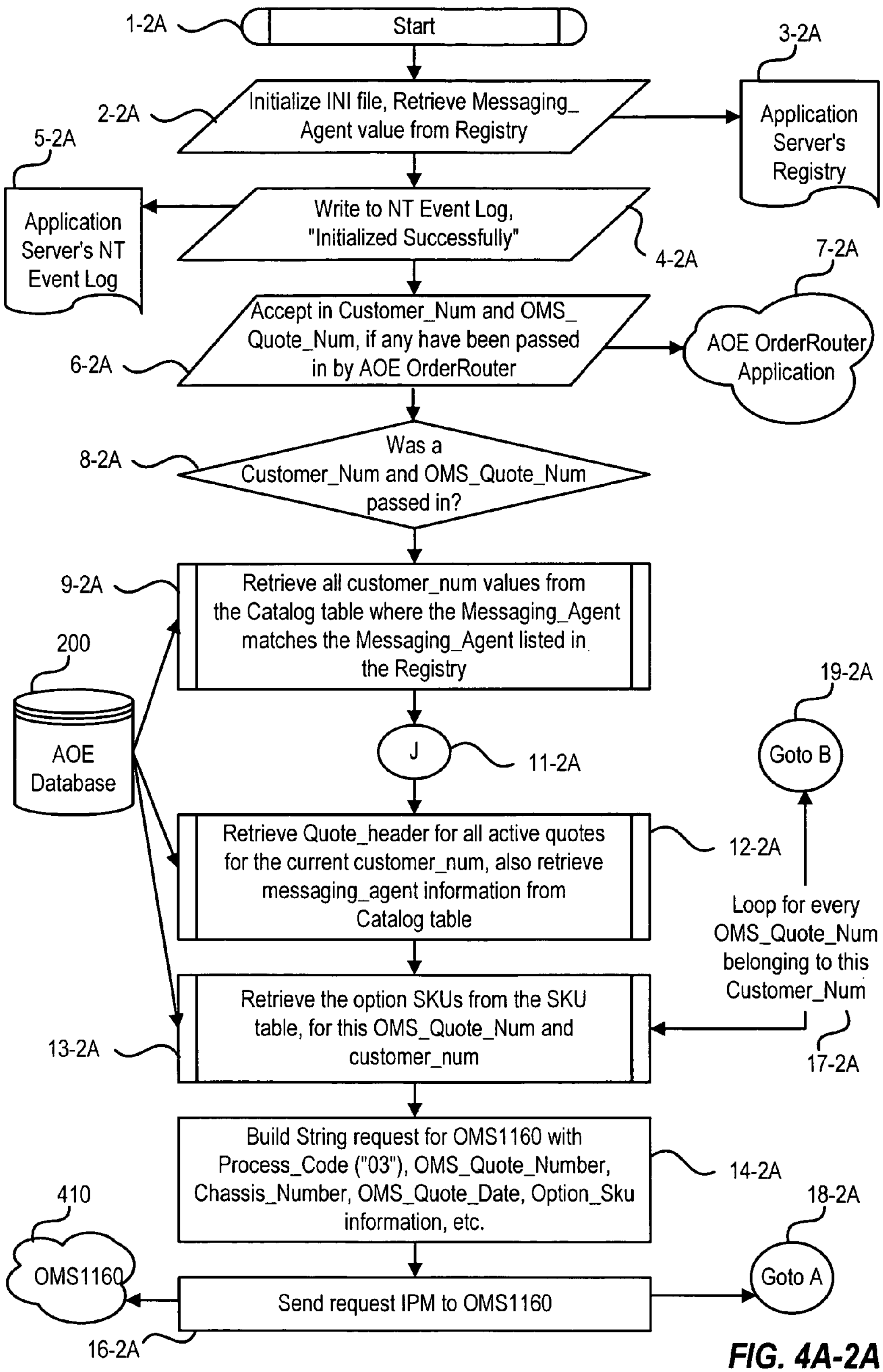
Figures 2B, 4A:
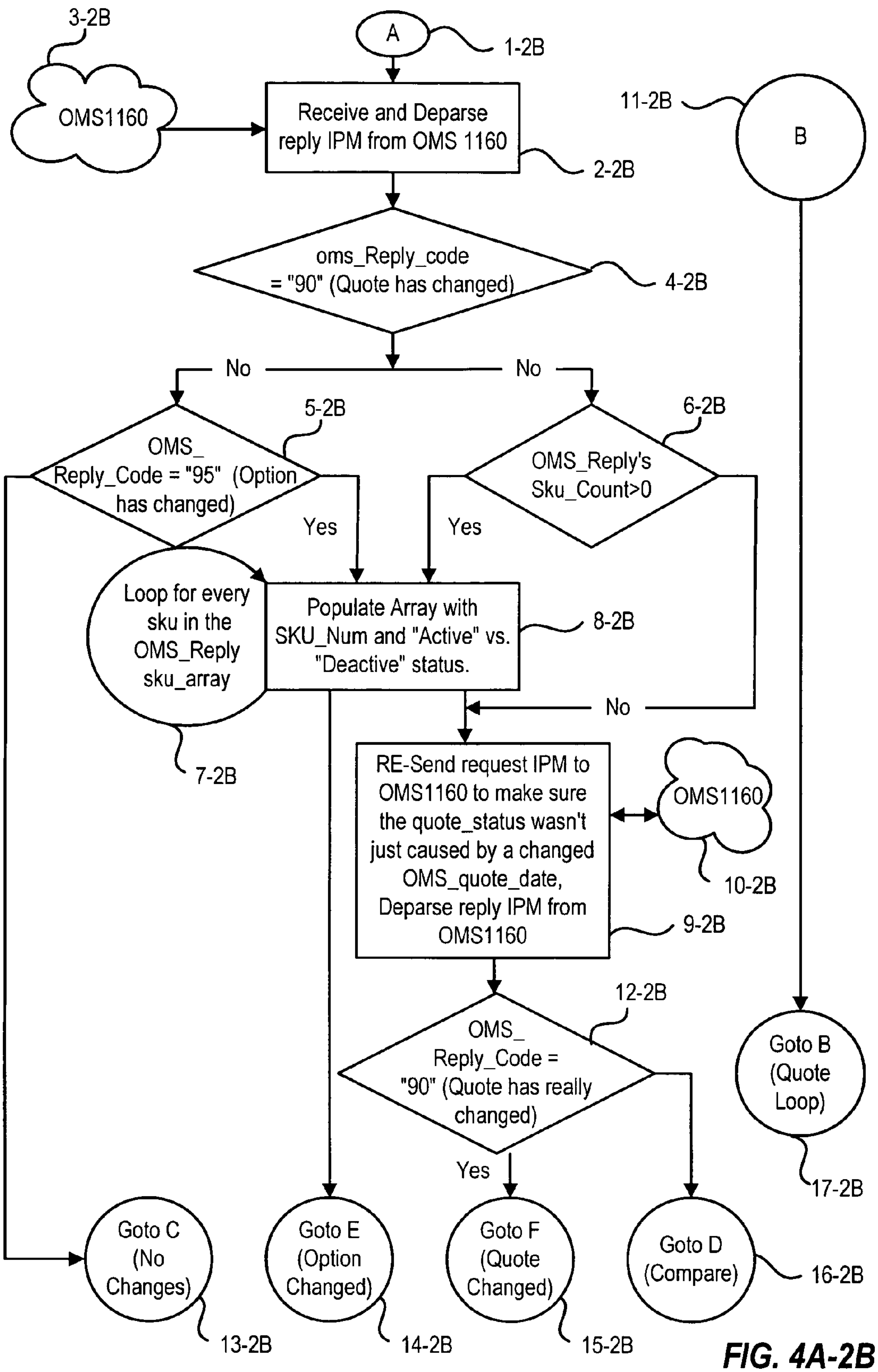
Figures 2C, 4A:
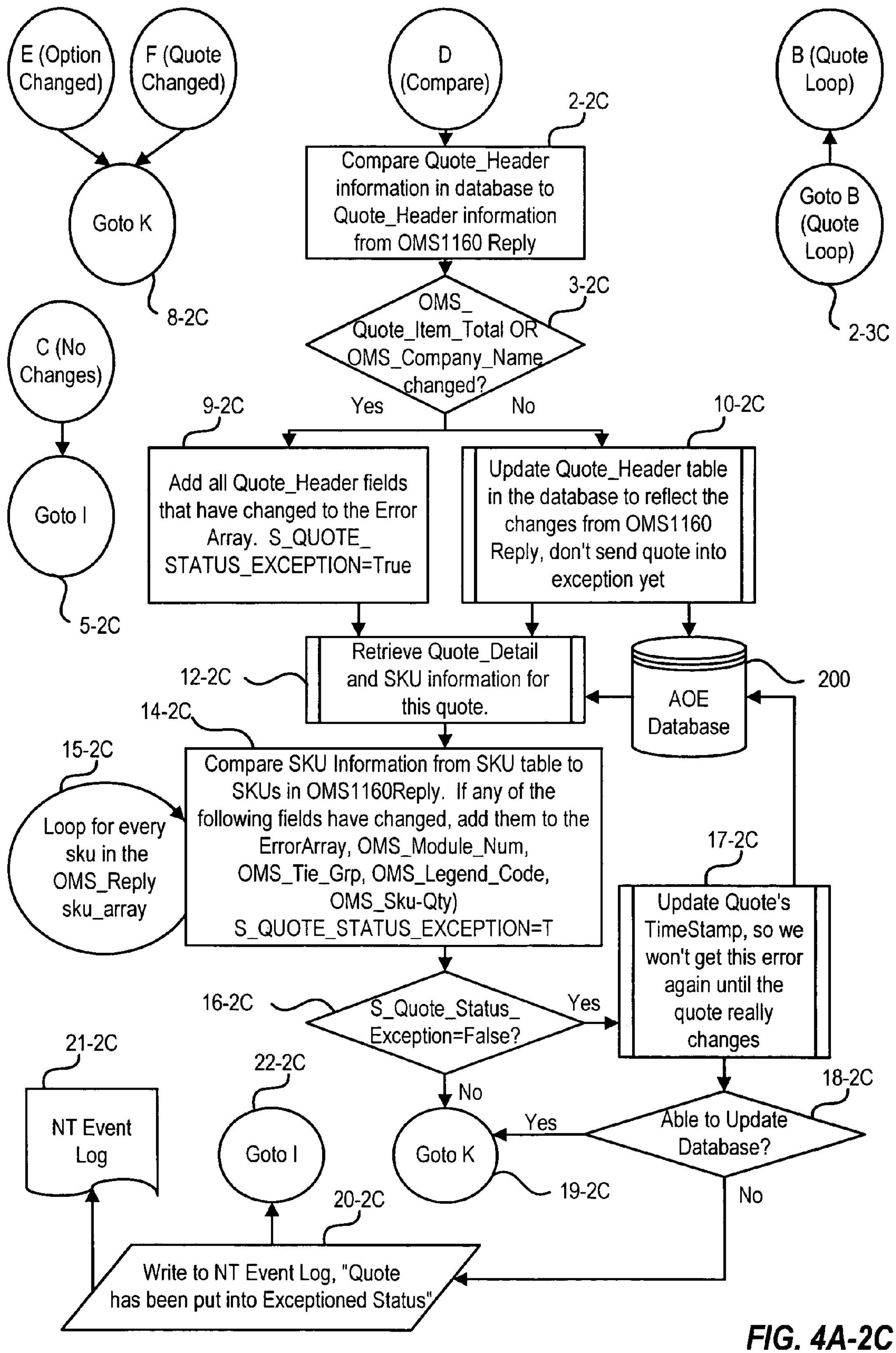
Figures 2D, 4A:
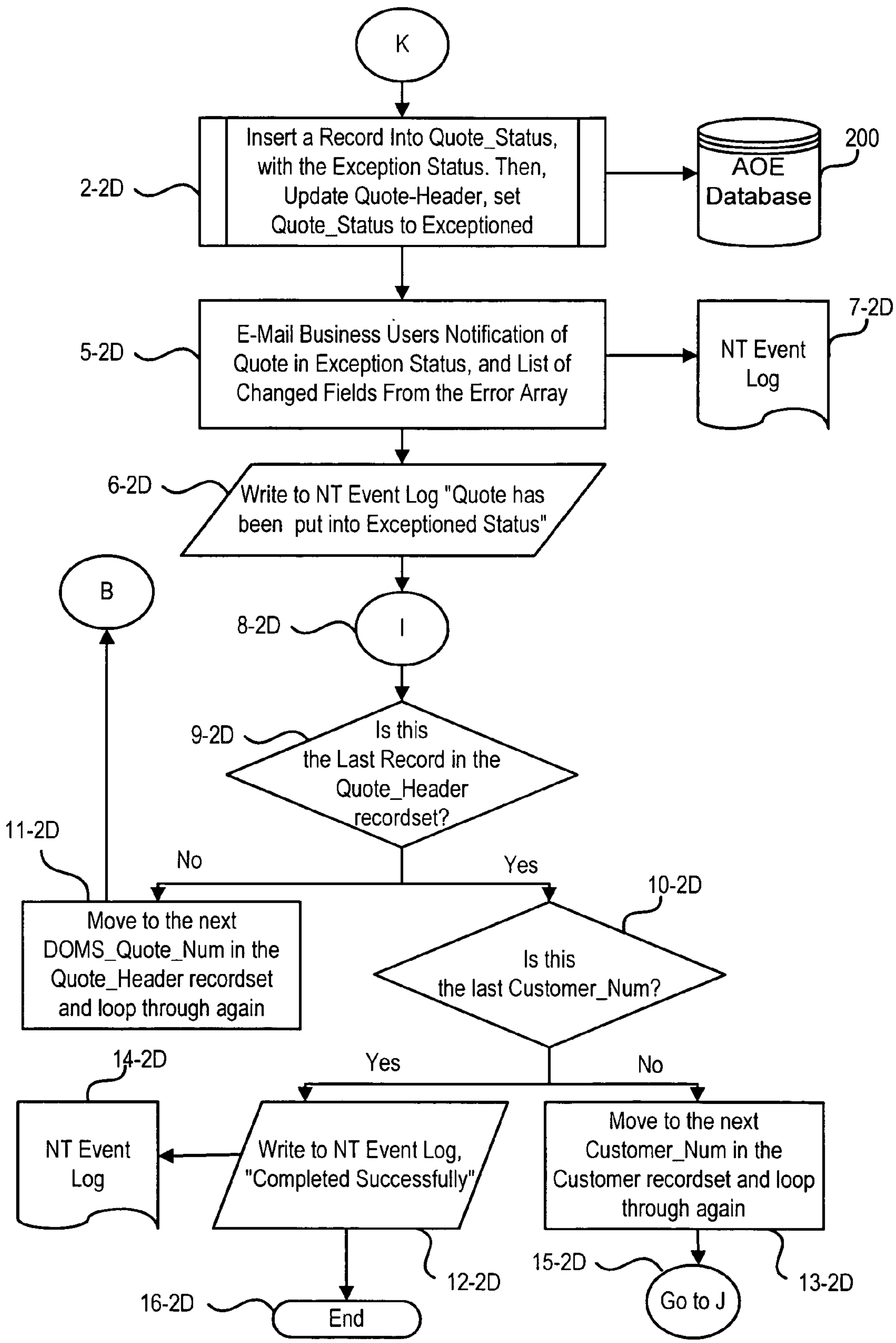

Referring now to FIG. 2, computer system 100 is shown coupled to communication medium 250, which may be a multi-point network, a point-to-point communications link, etc. any of type of circuit-style network link capable of transferring data. Communication medium 250 may be an X0.25 circuit, a physical type of line, such as a T1 or E1 line, or an electronic industry association (EIA) 232 (RS-232) serial line. In addition, communication medium 250 may utilize a fiber optic cable, twisted pair conductors, coaxial cable, or a wireless communication system, such as a microwave communication system. Coupled to communication medium 250 is database server 200, which, according to an embodiment of the present invention, provides data across communication medium 250 to a plurality of servers, shown as servers 252, 254, 256 and 258. In an embodiment of the invention, servers 252, 254, 256 and 258 each represent servers of a customer or a third party in communication with customers via communication medium 250. For example, server 258 is shown further coupled to customer server 260 and customer server 262.

Overview

Figure 5:
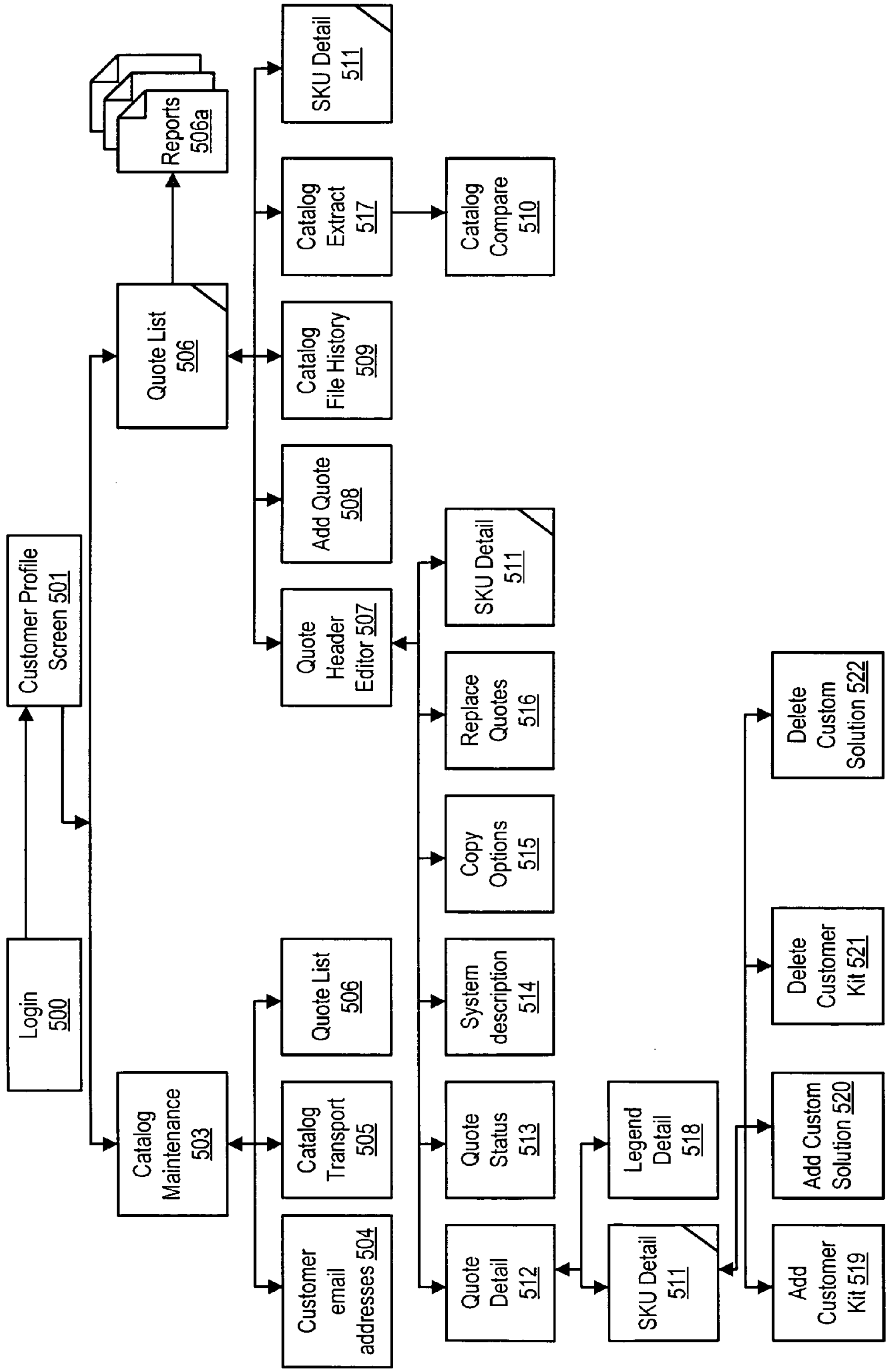
FIG. 5 is a flow diagram of software modules for a catalog process showing a graphical user interface of a manufacturer in accordance with an embodiment of the invention.
Figures 3, 5:
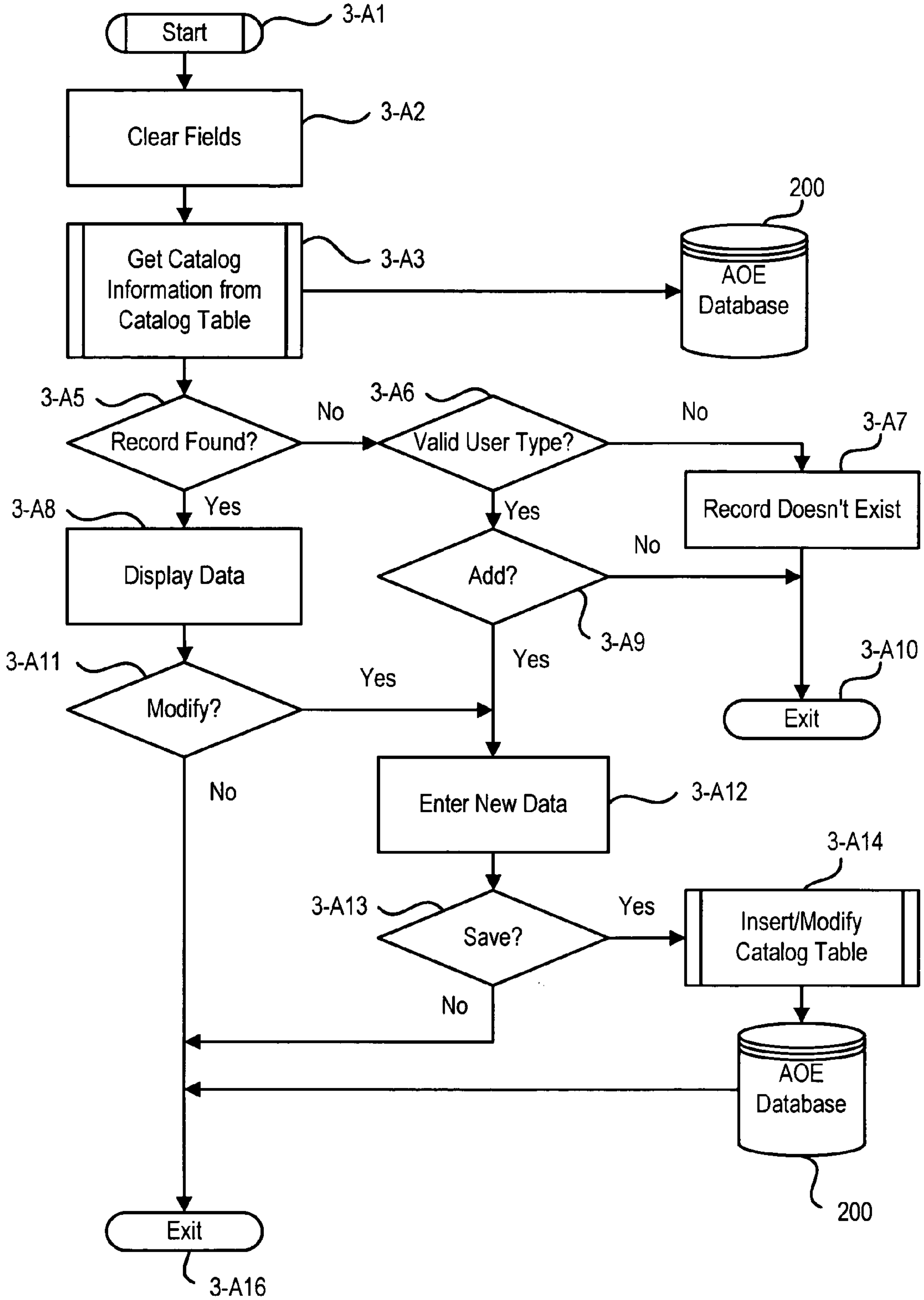

The present invention is related to the use of computer systems and servers to facilitate and automate a manufacturing process, the process, hereinafter referred to as an Automated Order Entry (AoE) process, is outlined in FIG. 3. Referring to FIG. 3, the manufacturing process is shown including communication with customers via the communication medium 250 and server 200. The AoE process first includes creation of a data file 310 for transport via the communication medium 250. The data file 310 includes an electronic catalog suited for one or more customers. The catalog allows customers (as well as suppliers or third parties) to host the data and configure both commodity and non-commodity products and services, as explained in further detail below. The term “customer” or “customer hosted” includes third parties acting on behalf of a customer, supplier or manufacturer and hosting on behalf of the customer, supplier or manufacturer FIG. 3 shows a data file 310 including an electronic catalog transmitted from server 200 to a customer server 254. The data file is in a structured data format which is one of a proprietary format (PFF), EDI (Electronic Data Interchange) format, an SGML (Structured General Markup Language), such as XML (eXtensible Markup Language) or HTML, or another format familiar to persons of ordinary skill in the art. Data file 310 is in an industry supported communication protocol. For example, the data optionally may be configured to be transferred via a “value added network type protocol,” or be configured for a direct connection with a customer via a T1 line, such as a direct “pipe” line, or be configured for a TCP/IP protocol. The data file 310 is optionally first translated in translator 320 to an industry standard format, such as Electronic Data Interchange (EDI), or, if not translated, transmitted in a proprietary format to customer server 254. The customer server receives data file 310 and acknowledges non-commodity or commodity product in the data file 310 using acknowledgement file 336.

The AoE process continues on the customer server 254, wherein the data file enables the customer to host data file 310 and create orders, including internal purchase orders and files for transport to the manufacturer server 200. The customer transmits the order file 338 via communication medium 250 to manufacturer server 200. The order file 338 is optionally translated via translator 330 to an industry standard format prior to transmitting the order file 338 via the communication medium 250. The manufacturer receives either a proprietary file format or an industry standard format order file 338. If the order file 338 is in an industry standard format, the order file is first translated in translator 320. The manufacturer acknowledges the order file 338, process the order file 338, thereby validating the order via order acknowledgement file 340. Acknowledgement file 340 is transmitted via communication medium 250 to customer server 254, and is optionally translated into an industry standard format in translator 320, and translated into a proprietary file format by the customer in translator 330.

The AoE process further includes an inventory control process by which appropriate data feeds inventory control process 360. In one embodiment, the catalog acknowledgement file 336, indicates whether the data file including the electronic catalog 310 was ‘accepted’ by the customer. If accepted, the data file 310 is made available by AoE server 200 within the AoE process to the inventory control process 360 to ensure appropriate inventory levels for products included in the electronic catalog that fall within a predetermined category of products. In another embodiment, the acknowledgement file 336 is not required to begin the inventory control process. For example, customers that lack the capability to send acknowledgment files. Such customers optionally may acknowledge and verify data files by other methods, such as a telephone call. Accordingly, in another embodiment, the inventory control process begins upon creation of the catalog or at other appropriate junctions within the manufacturing process. For example, certain catalogs include products that can be "bundled" as pre-built components, and other catalogs include products that are non-commodity type configurable products. Yet other catalogs include a mixture of both types of products. Each of these types of catalogs may be made available to the inventory control process.

Figures 4, 5:
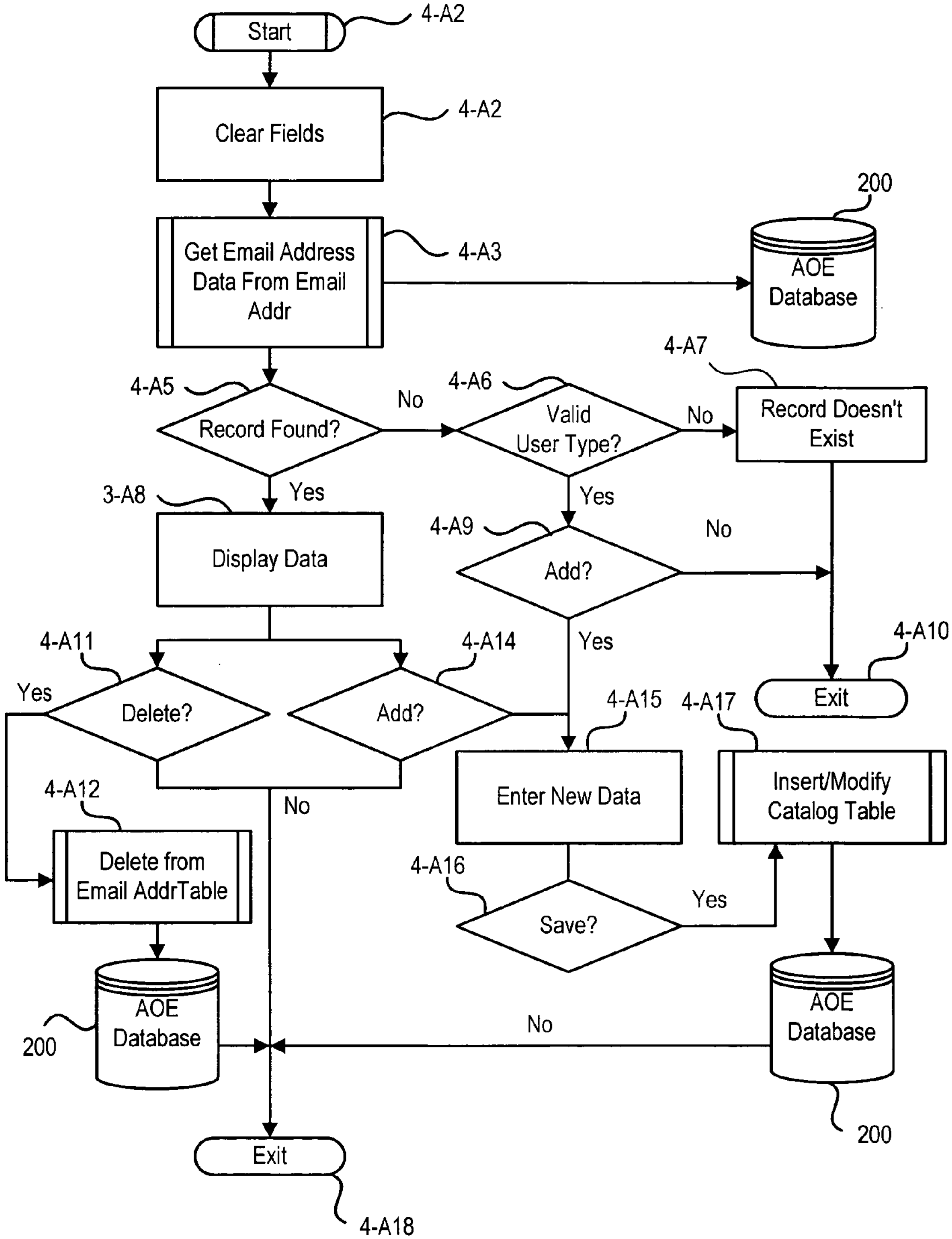
Figure 5:
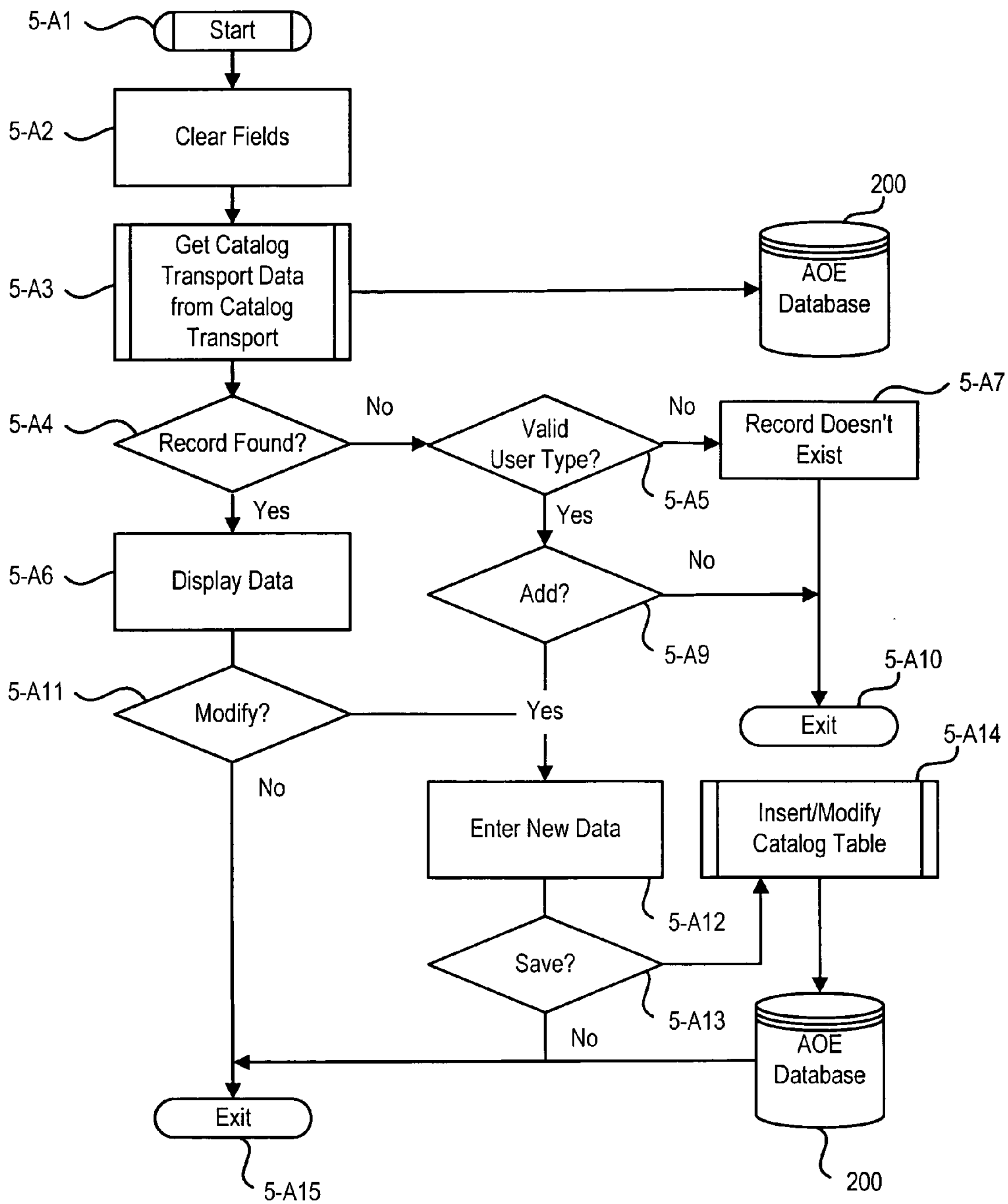
Figures 5, 6, 6A:
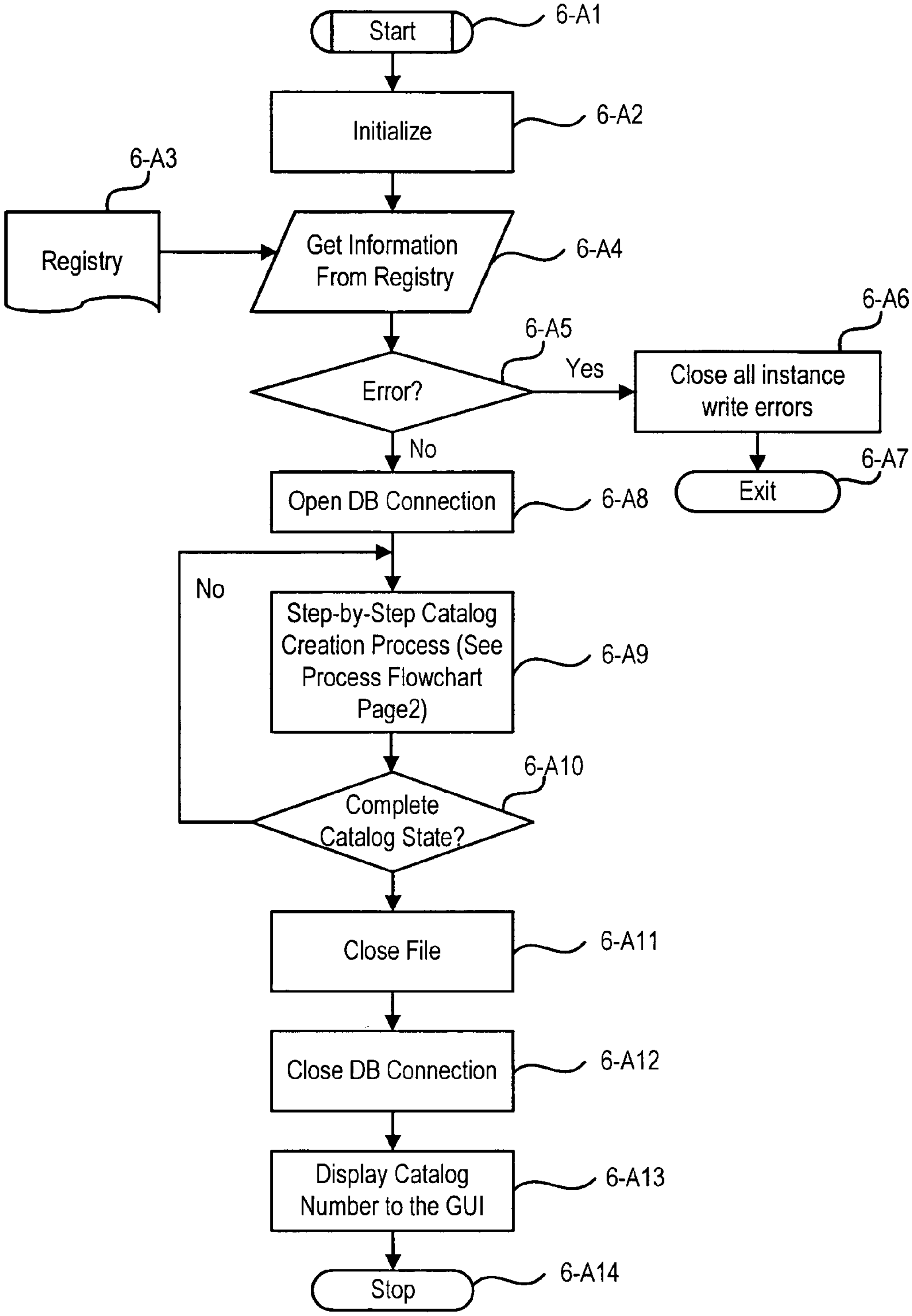
Figures 5, 6, 6B:
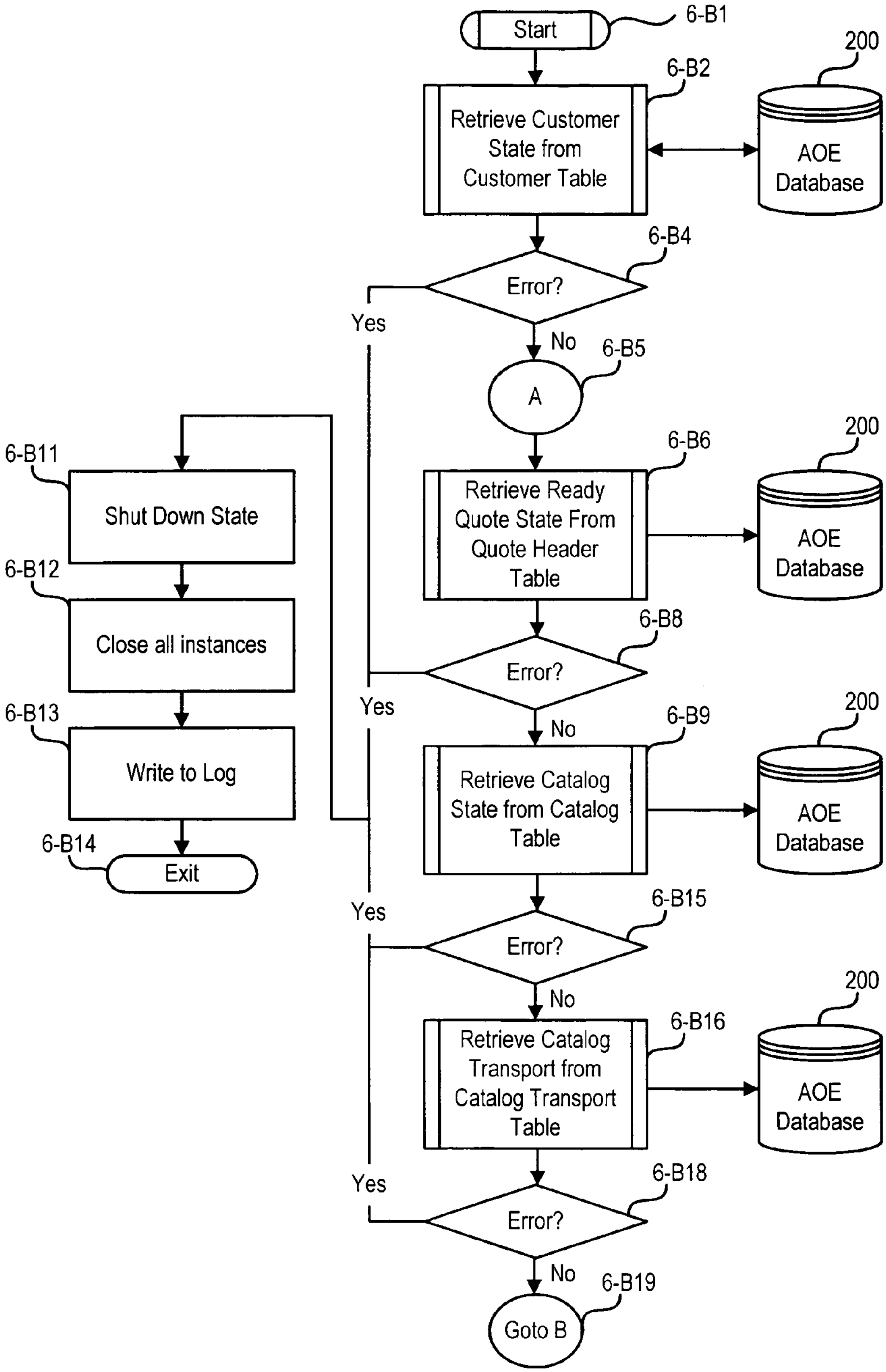
Figures 5, 6, 6C:
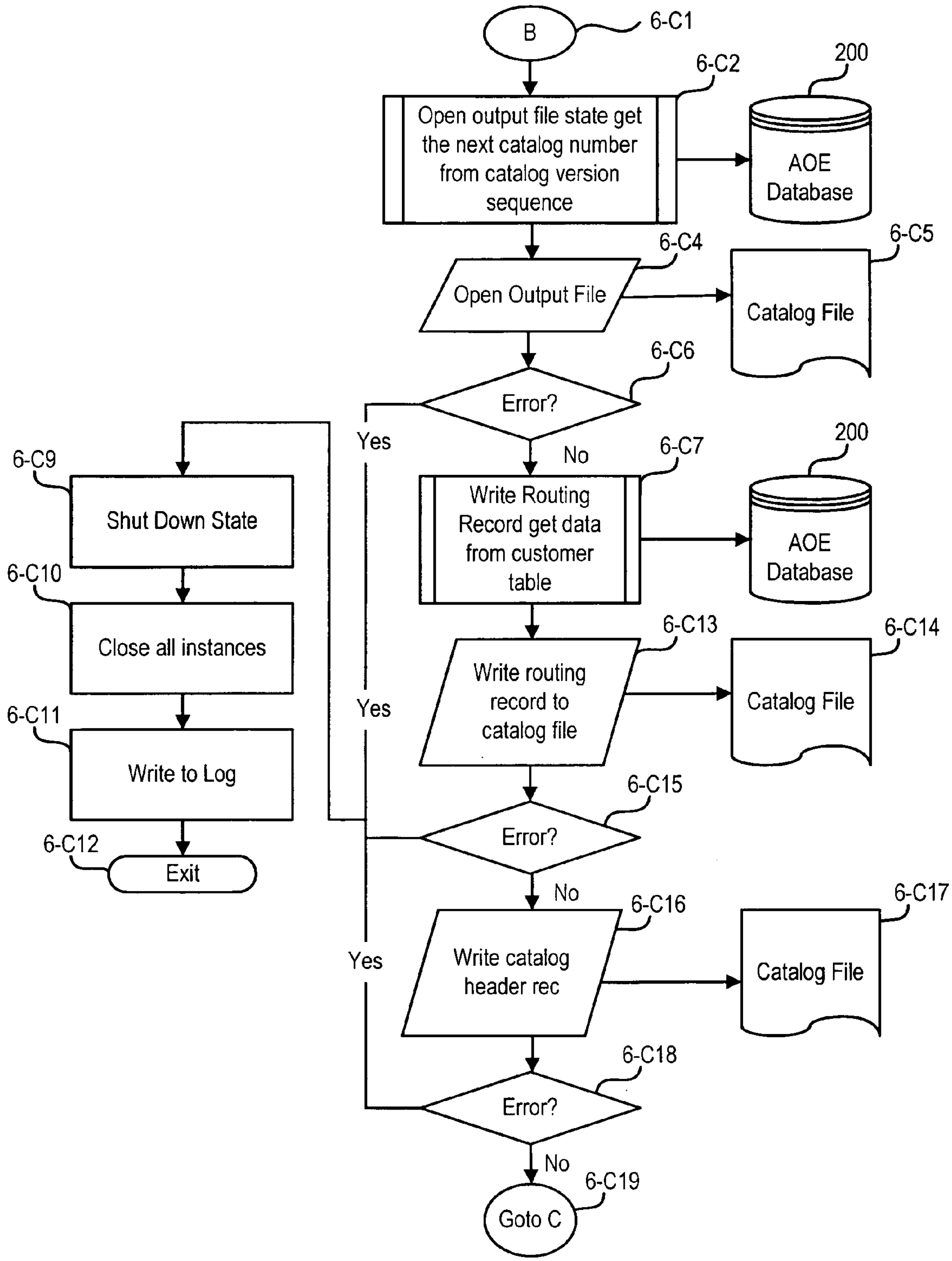
Figures 5, 6, 6D:
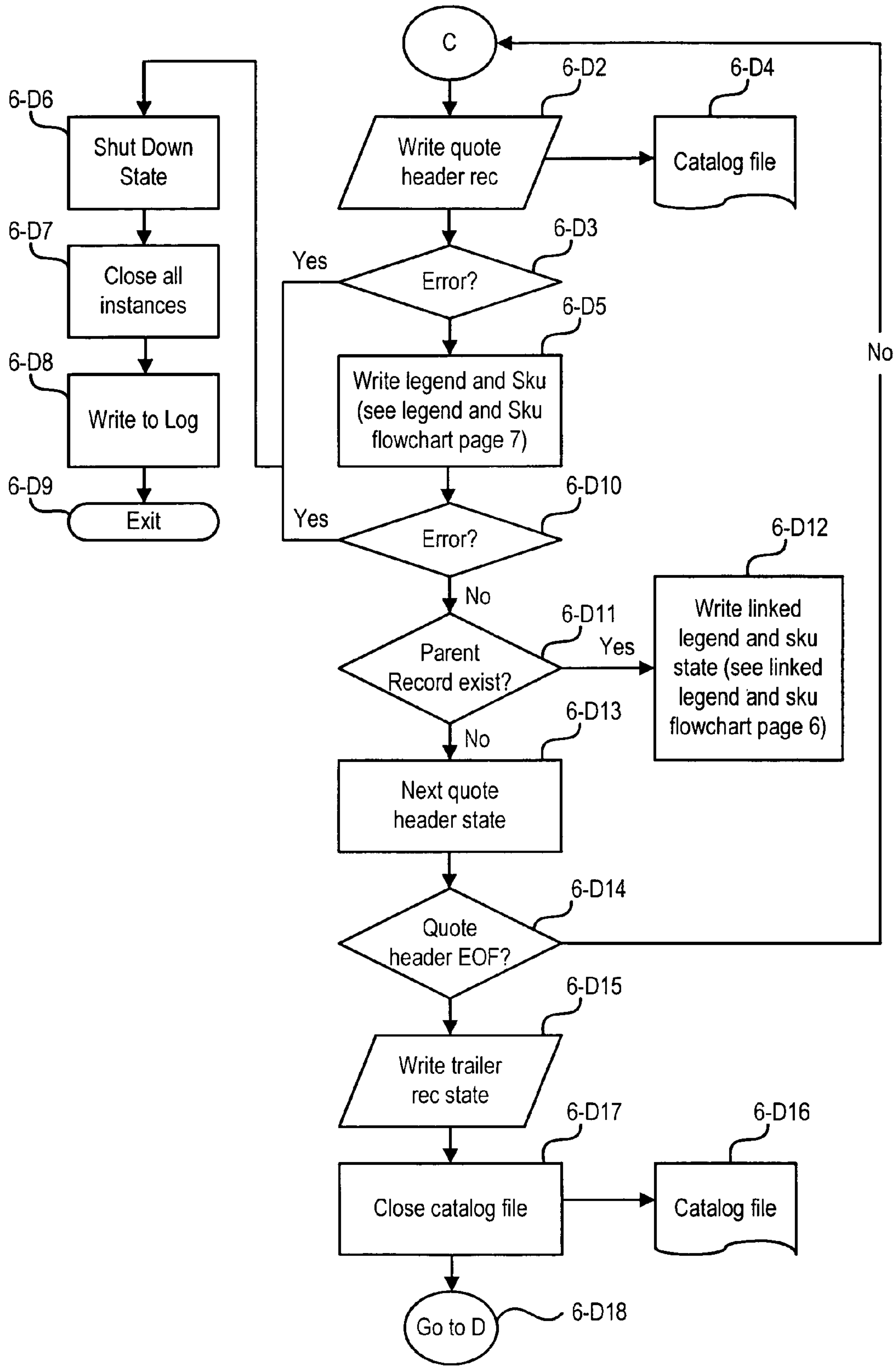
Figures 5, 6, 6E:
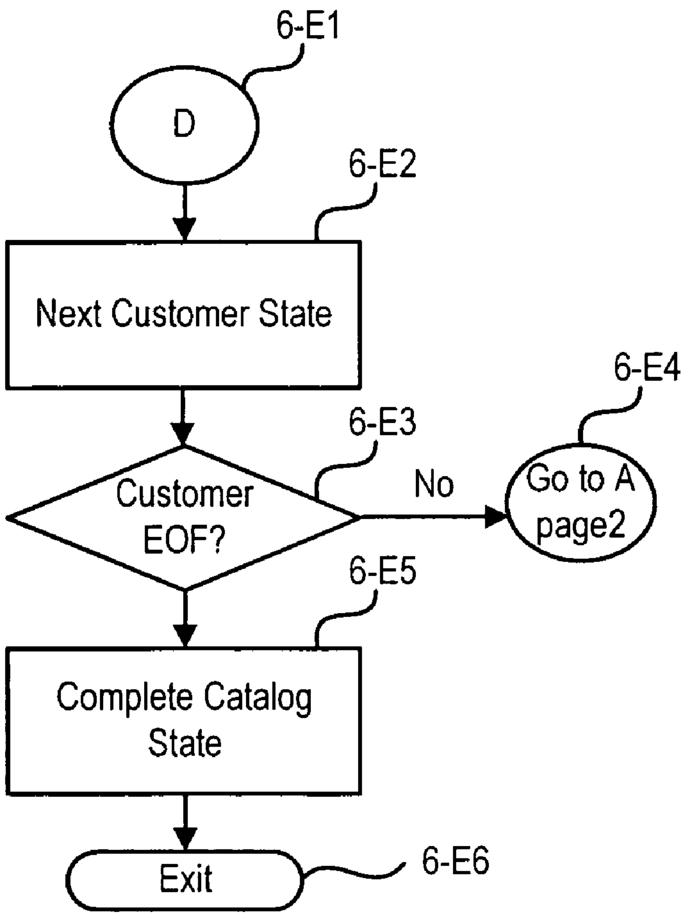
Figures 5, 6, 6F:
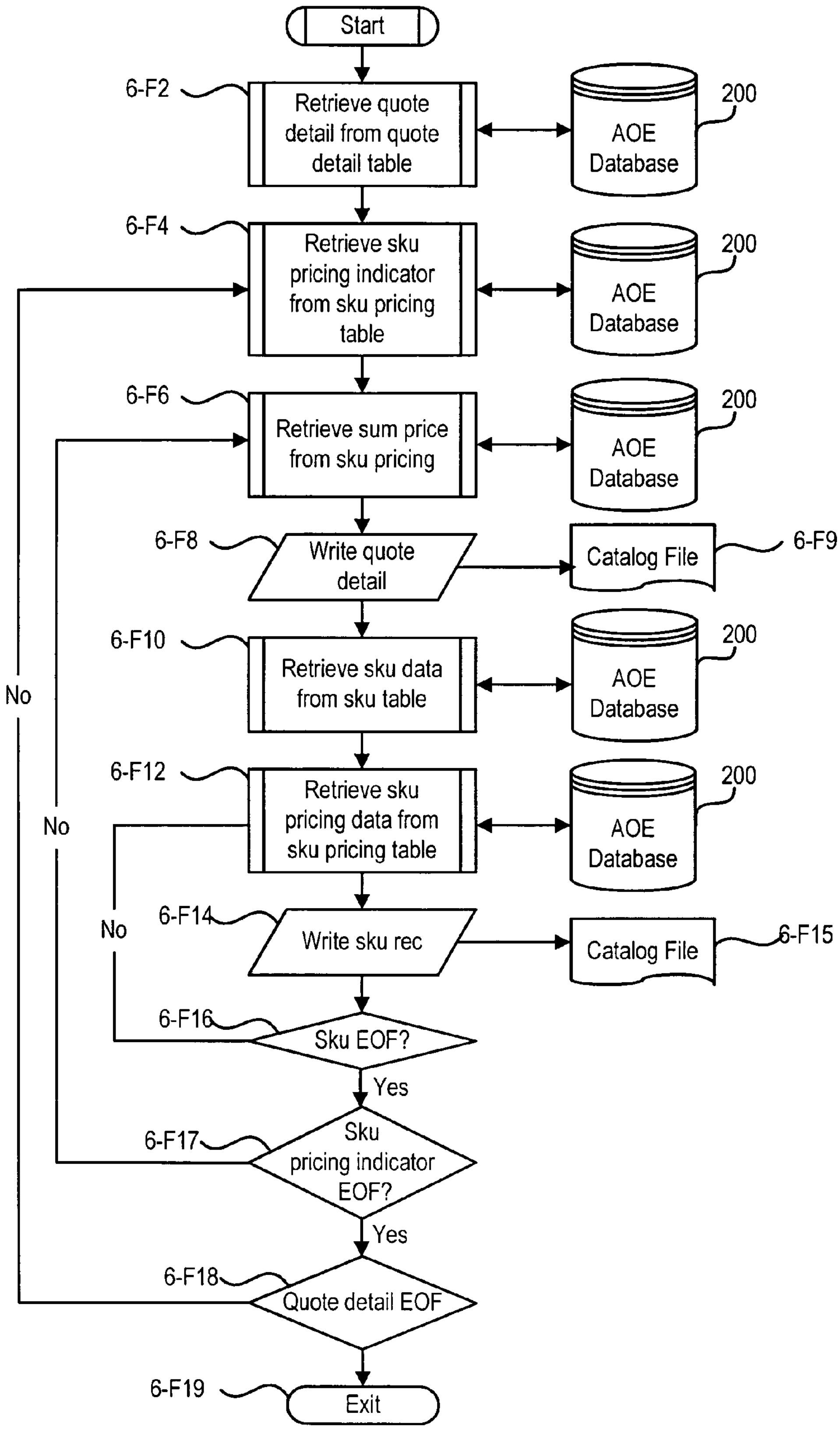
Figures 5, 6, 6A:
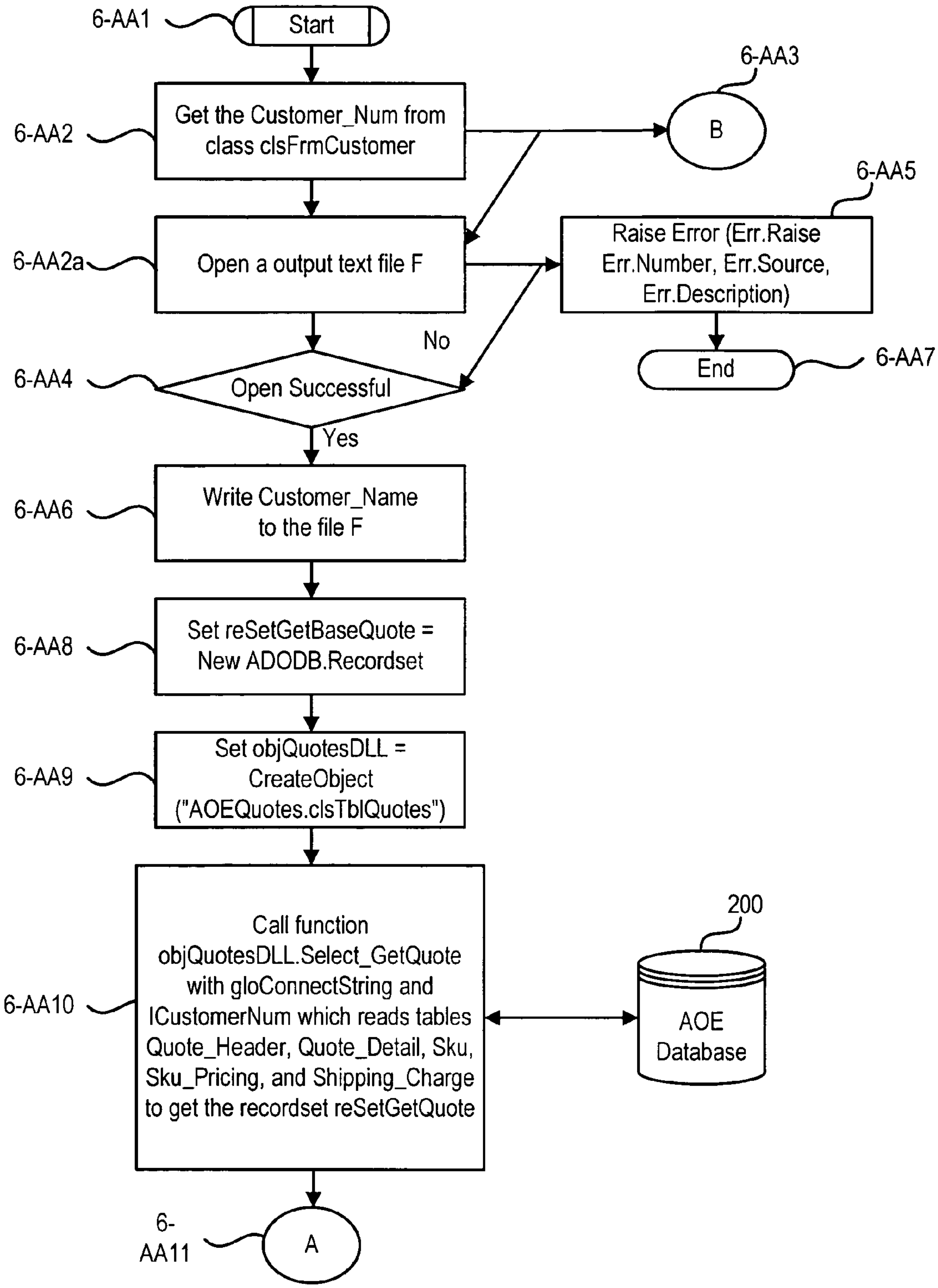
Figures 5, 6, 6A:
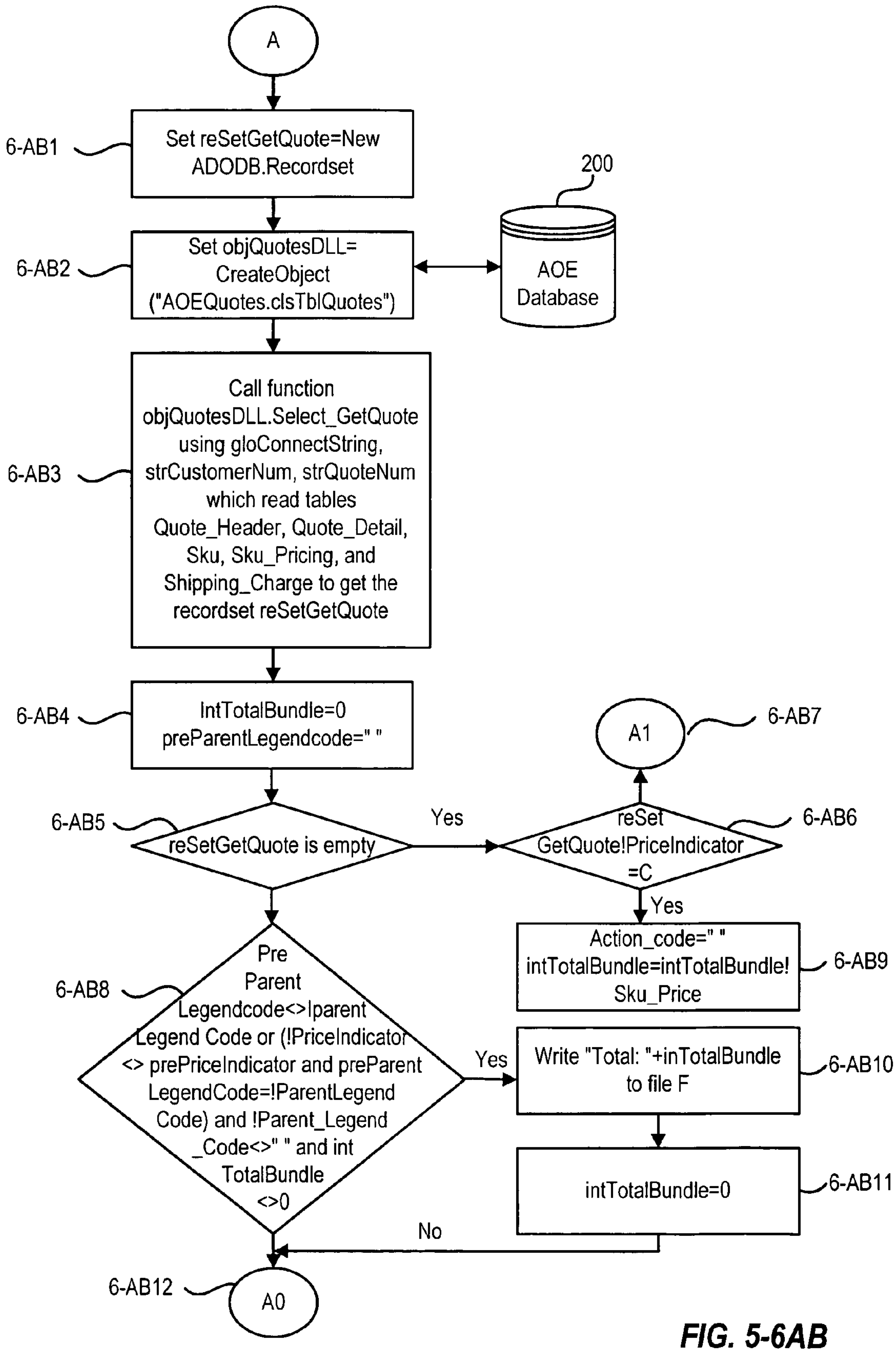
Figures 5, 6, 6A:
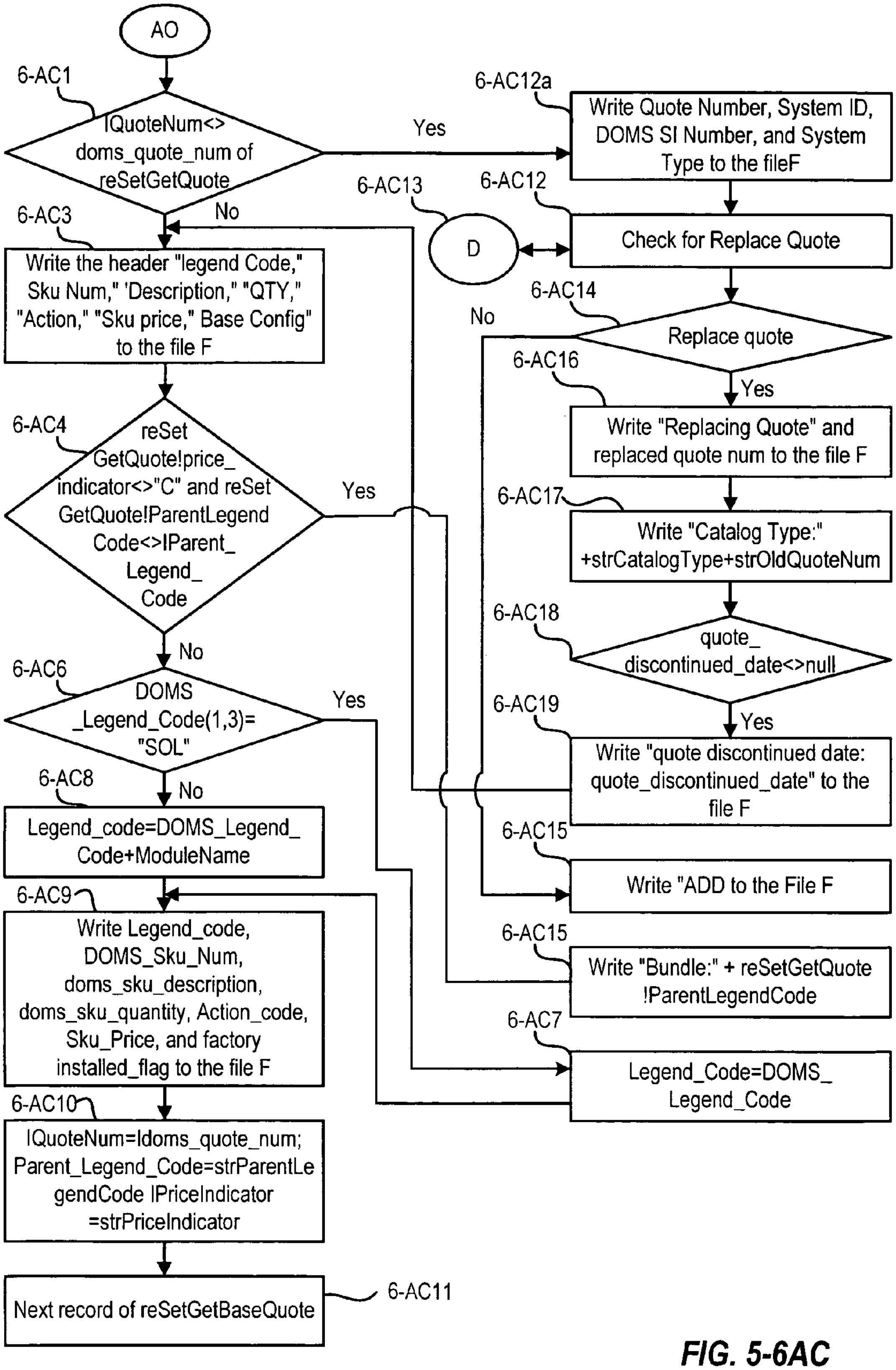
Figures 5, 6, 6A:
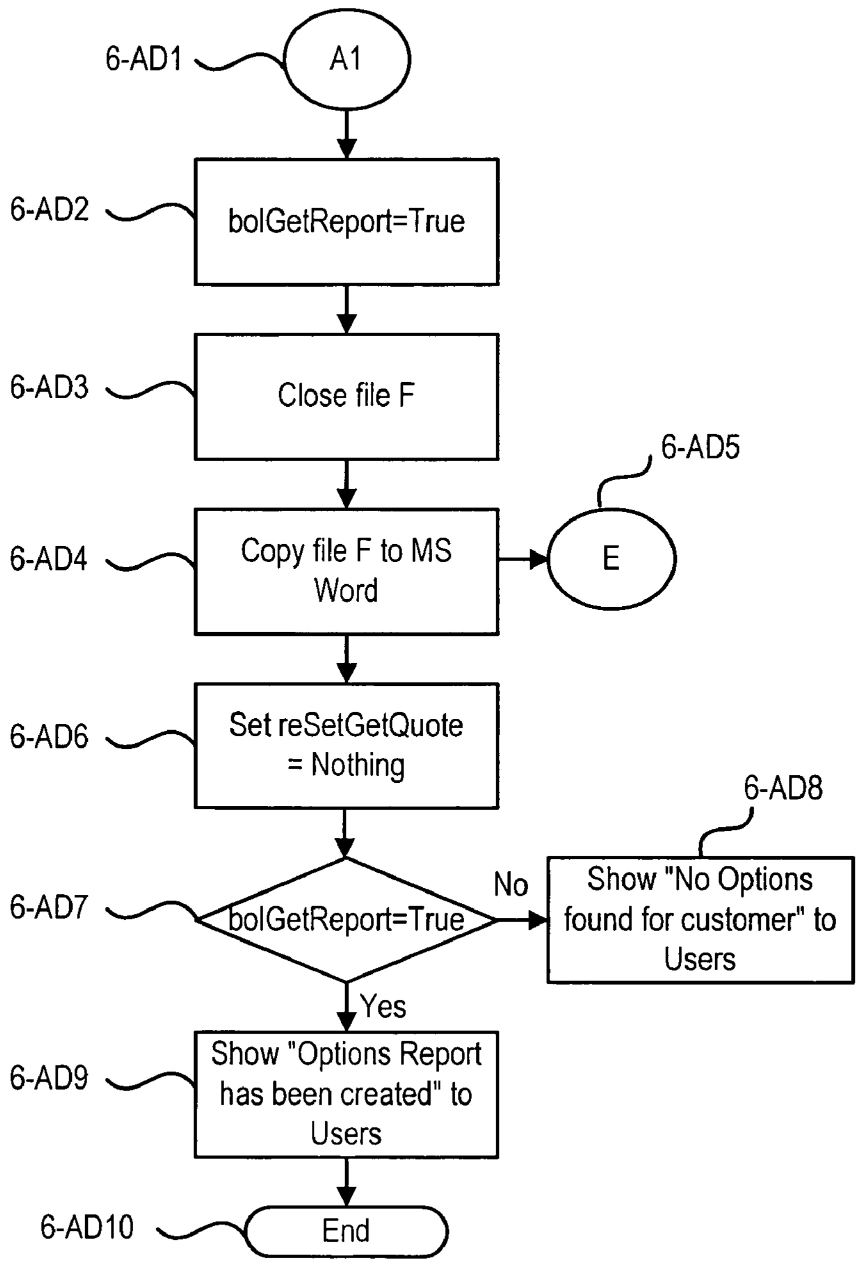
Figures 5, 6, 6A:
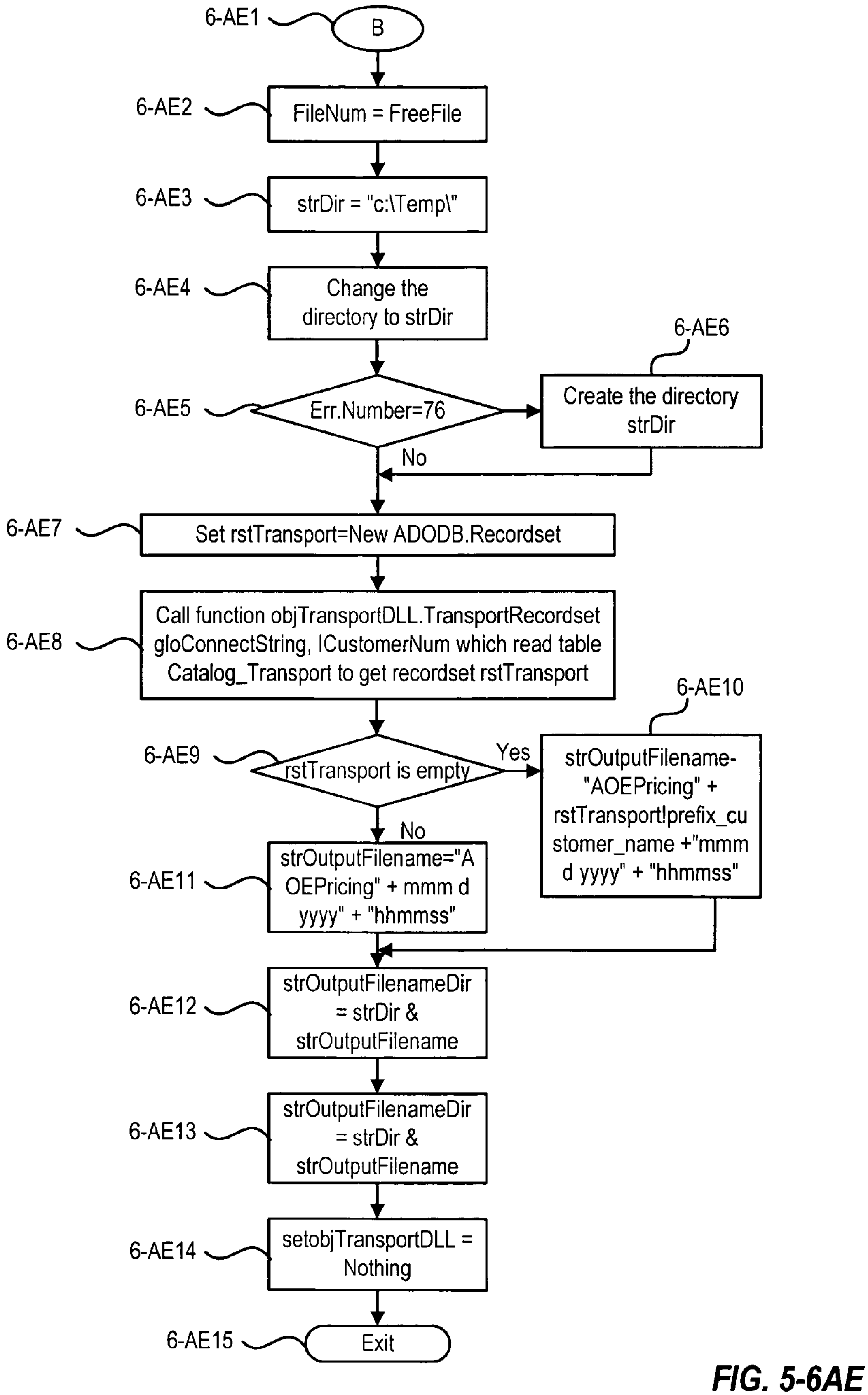
Figures 5, 6, 6A:
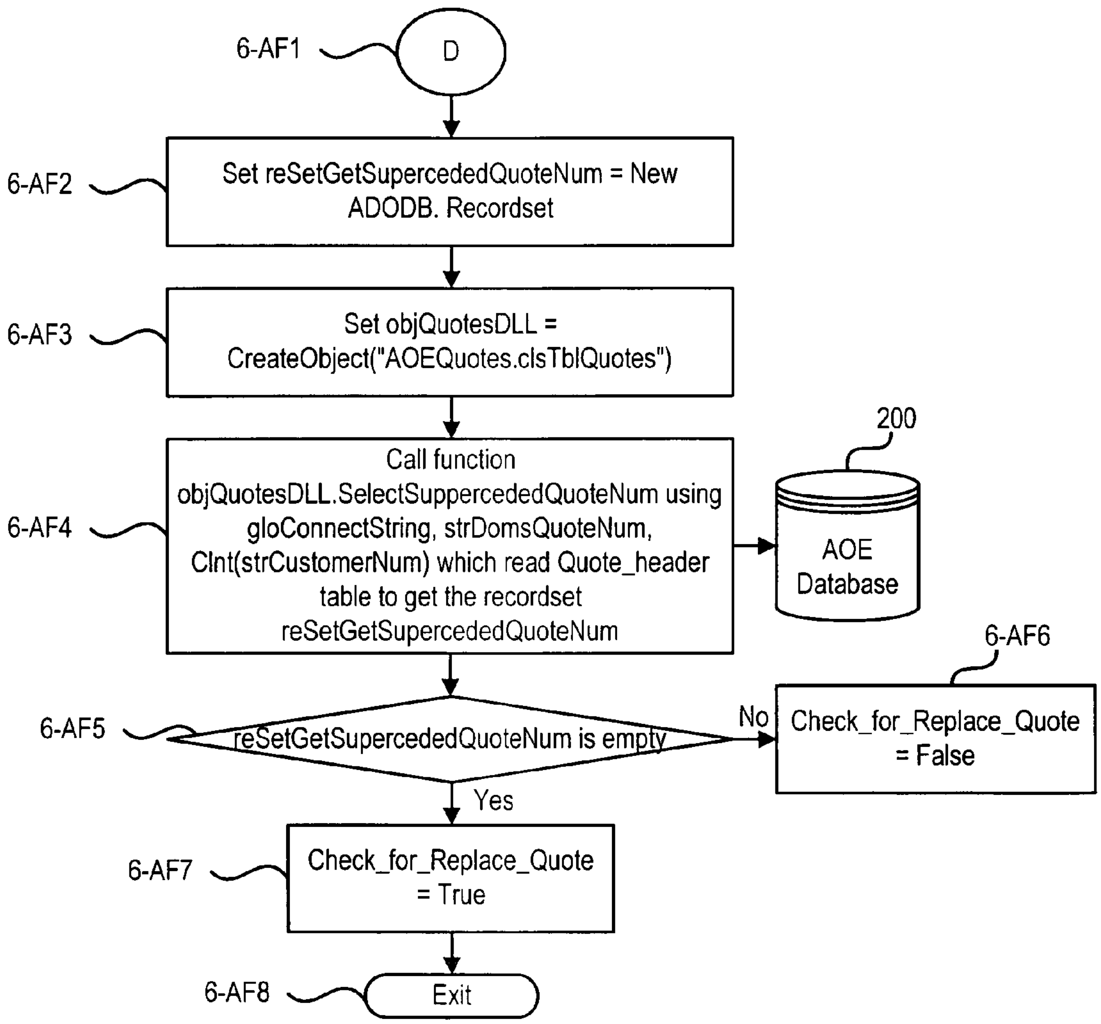
Figures 5, 6, 6A:
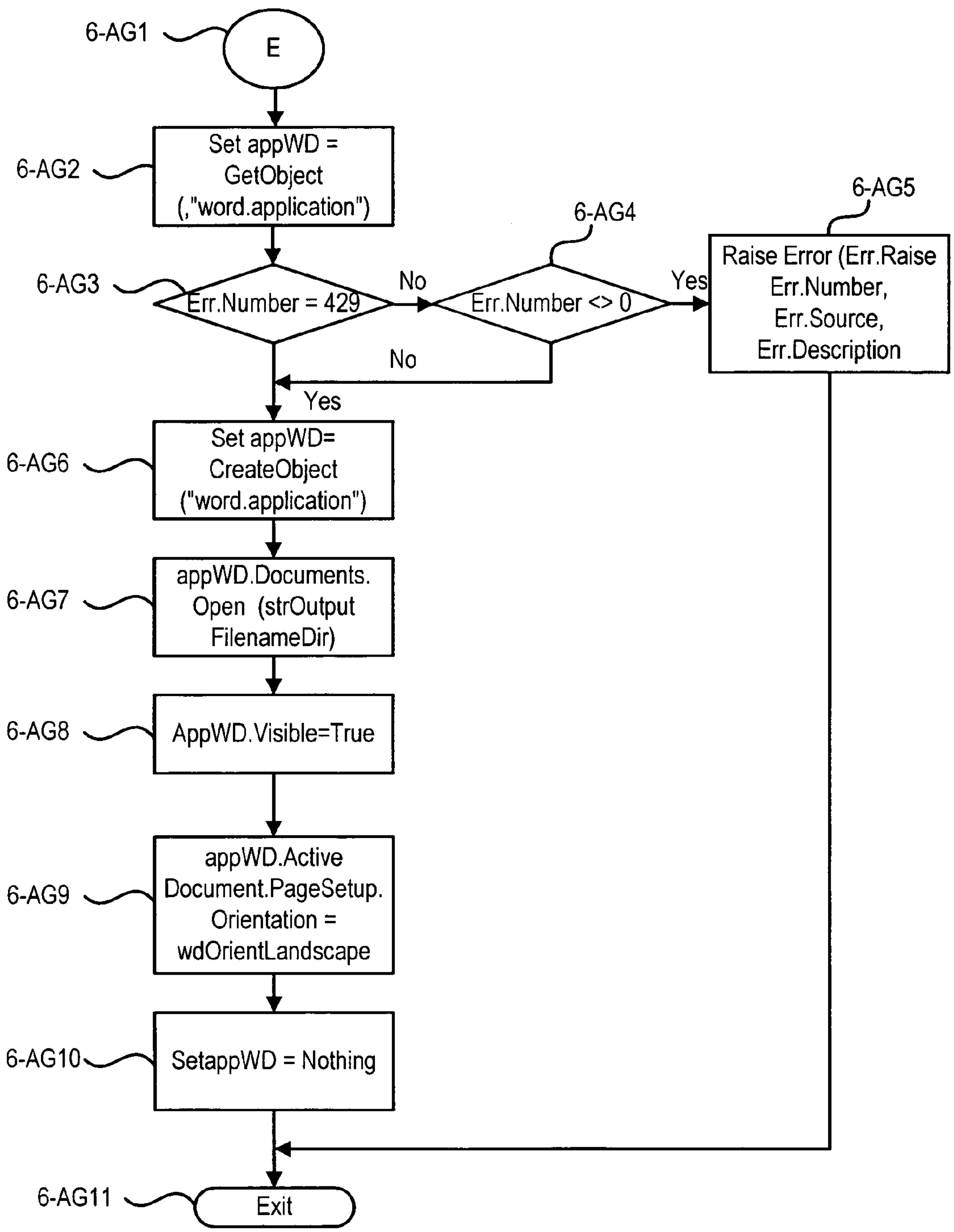
Figures 5, 6, 6A:
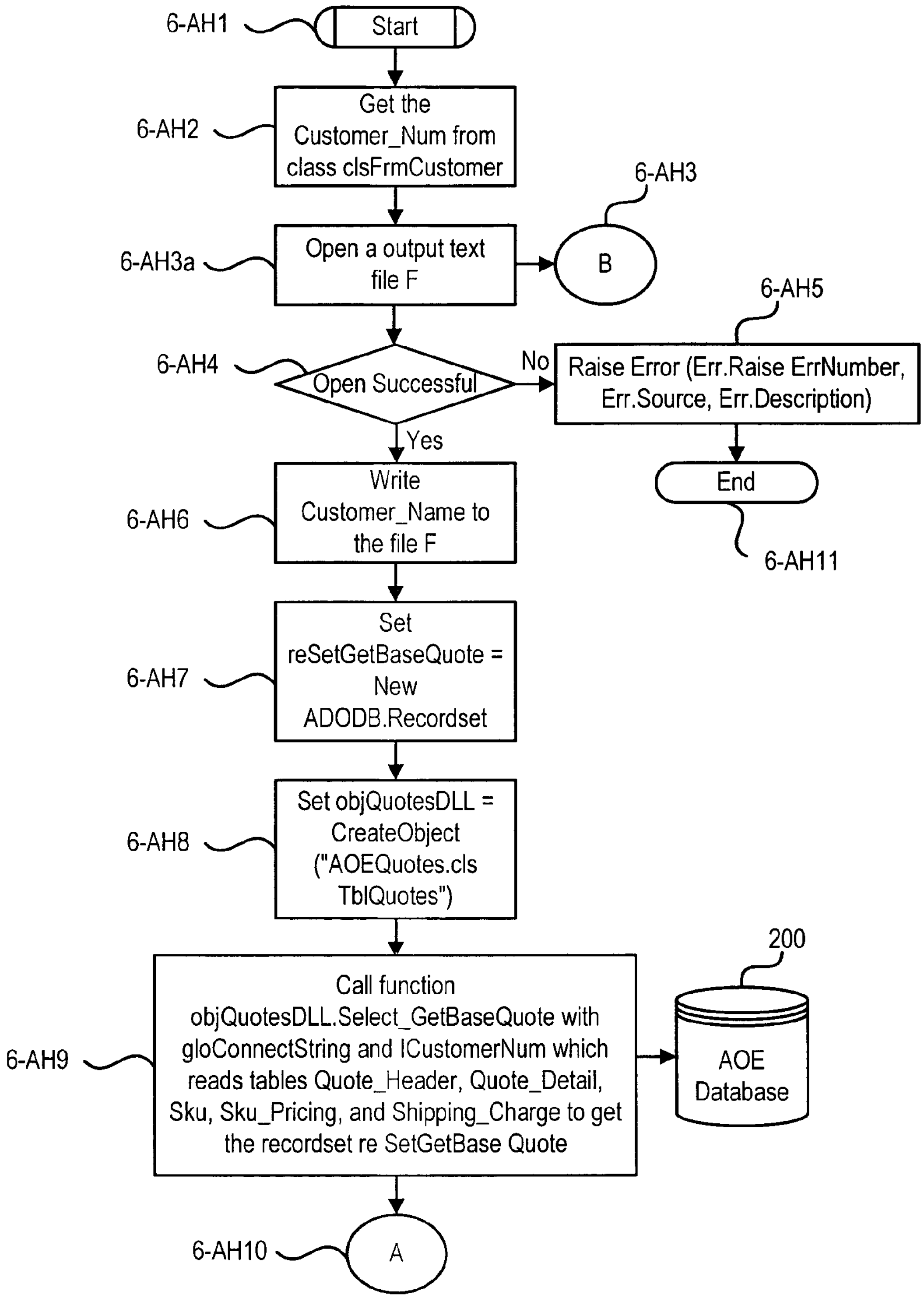
Figures 5, 6, 7, 7A:
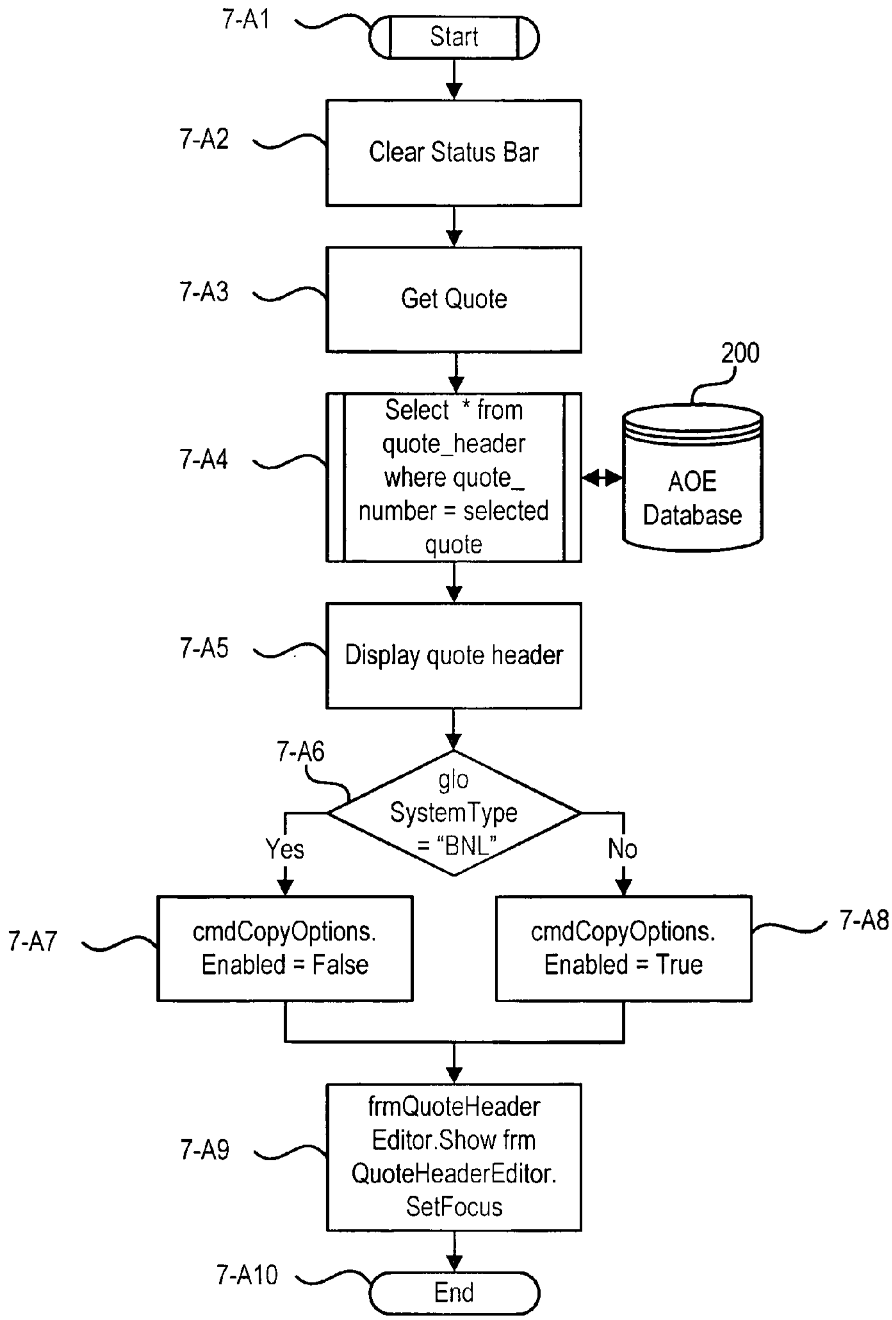
Figures 5, 6, 7, 7B:
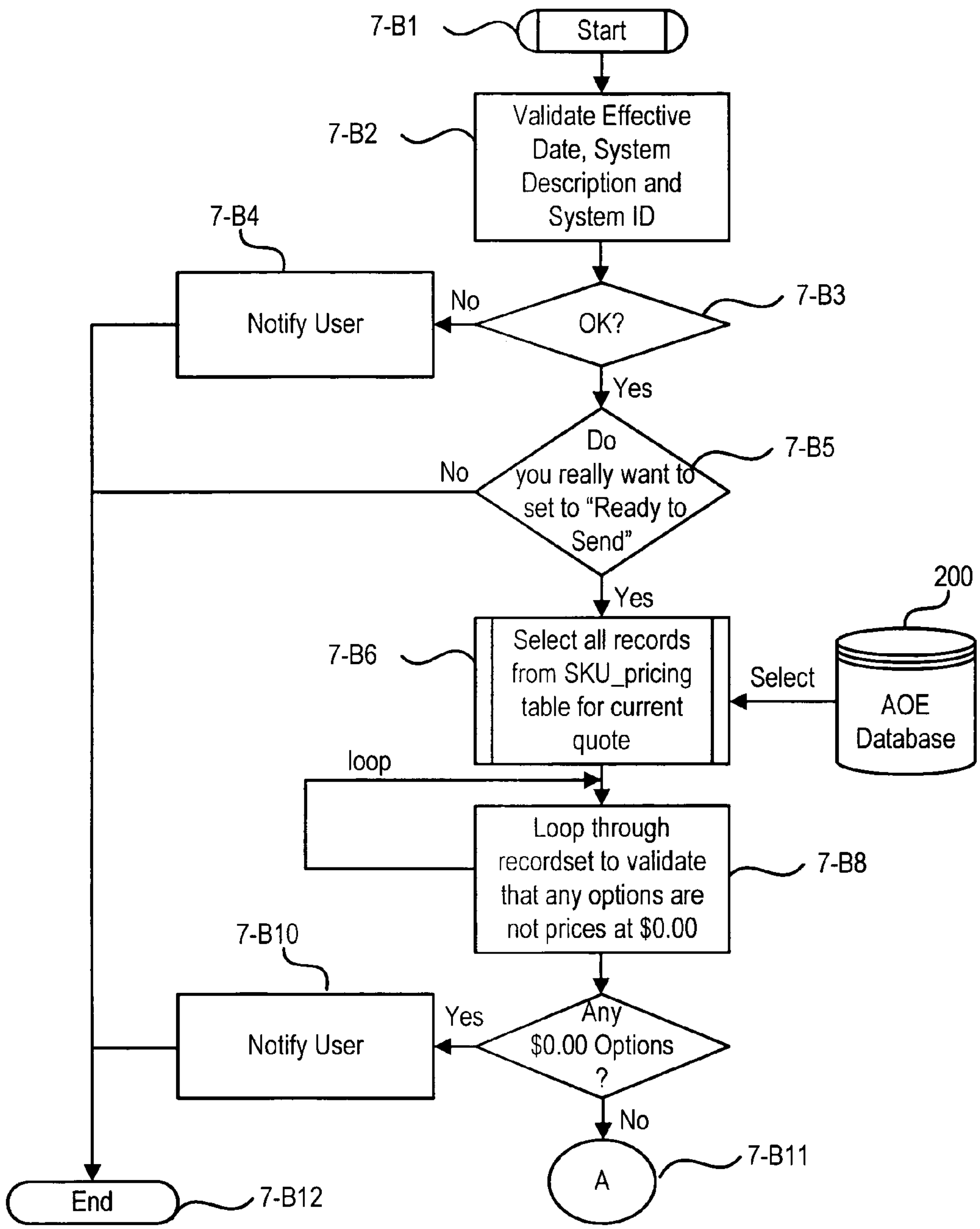
Figures 5, 6, 7, 7C:
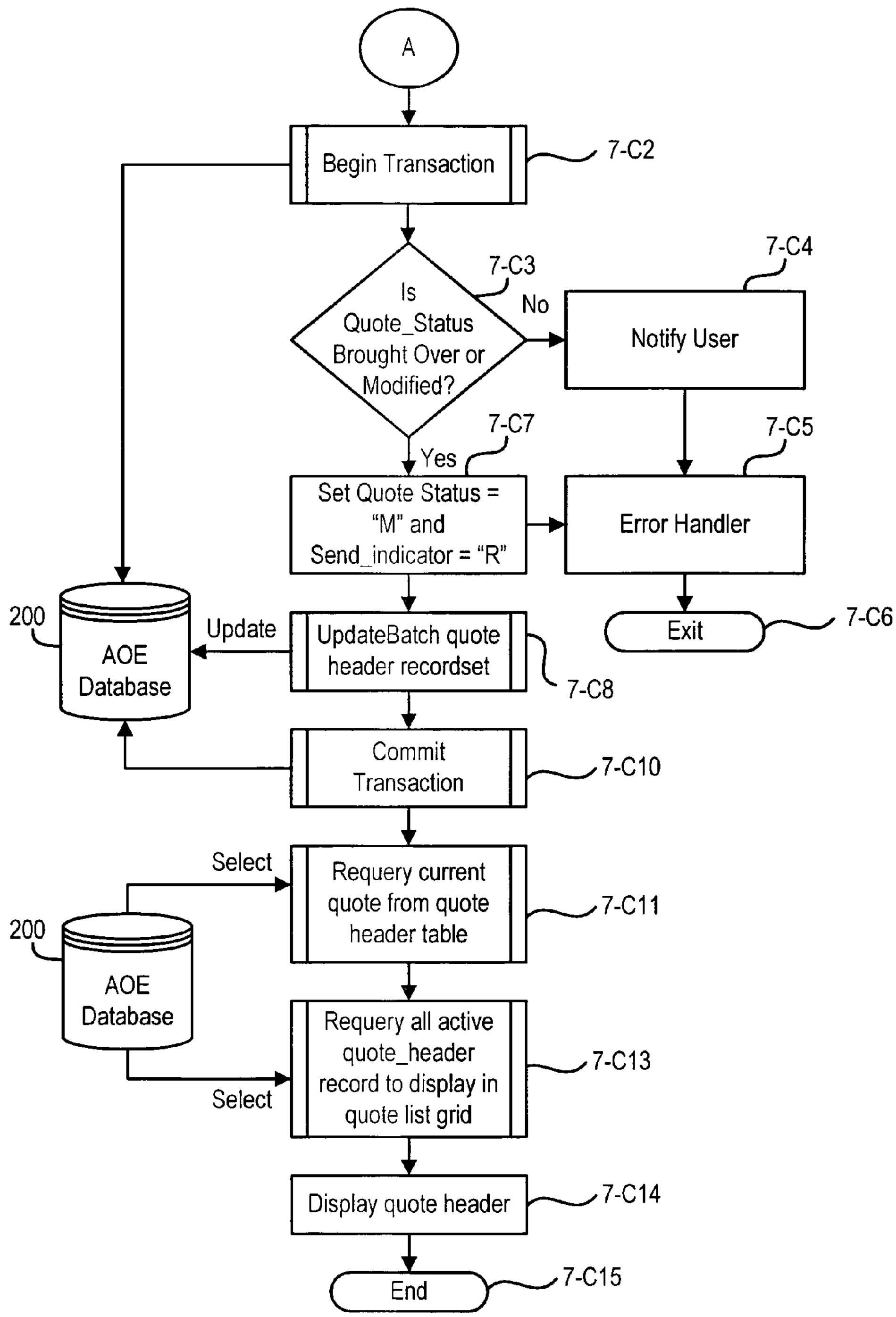
Figures 5, 6, 7, 8, 8A:
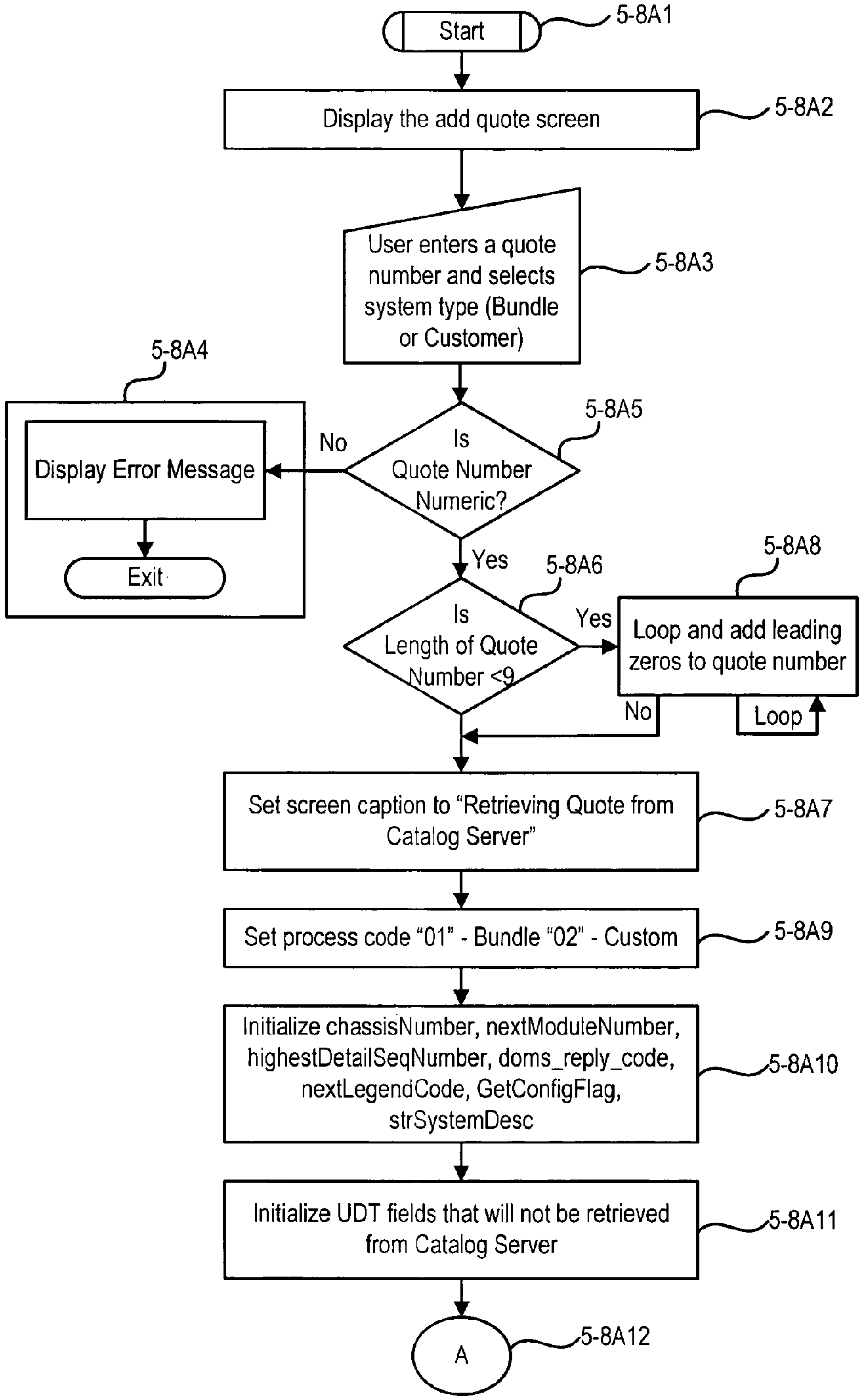
Figures 5, 6, 7, 8, 8B:
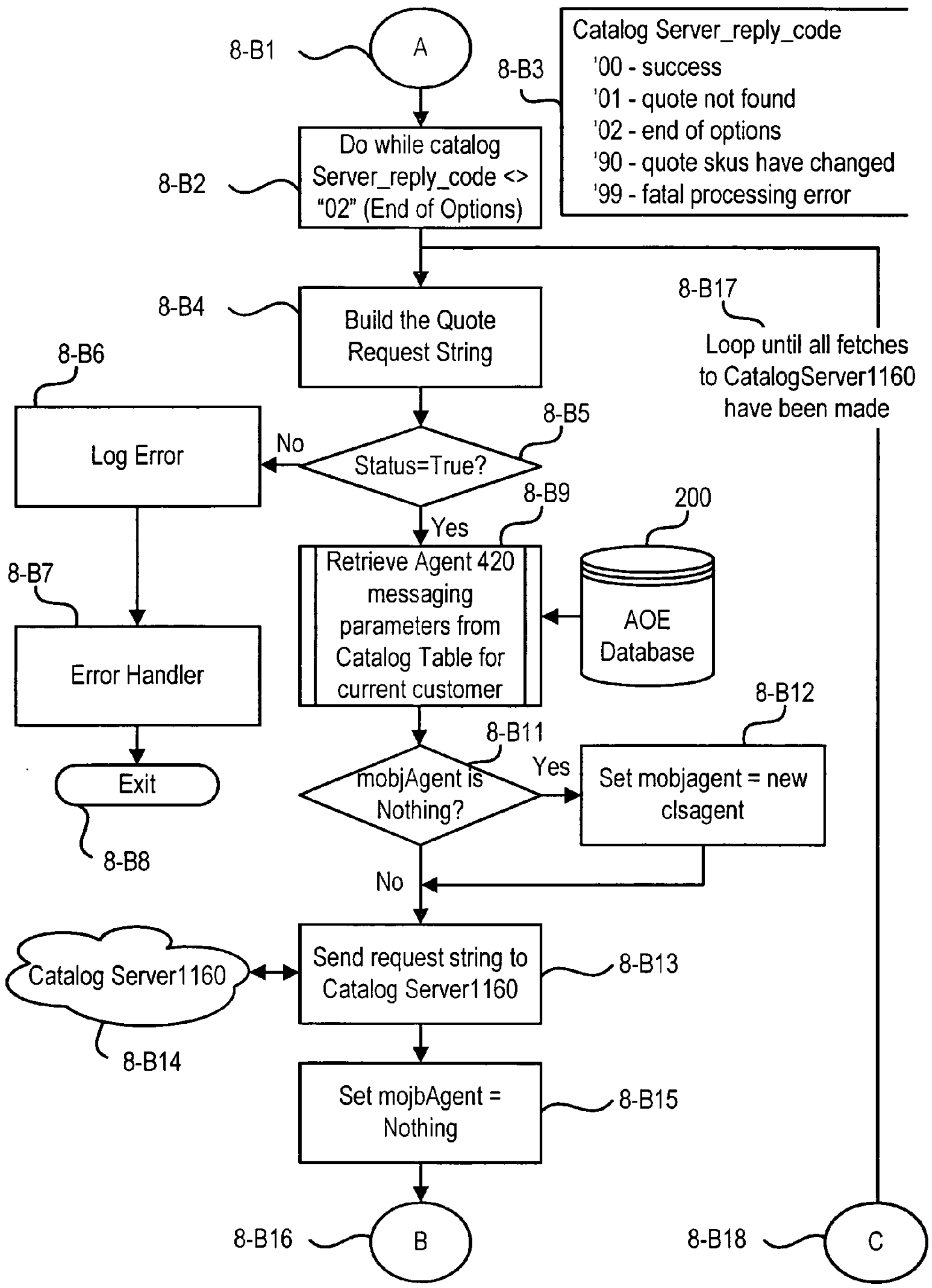
Figures 5, 6, 7, 8, 8C:
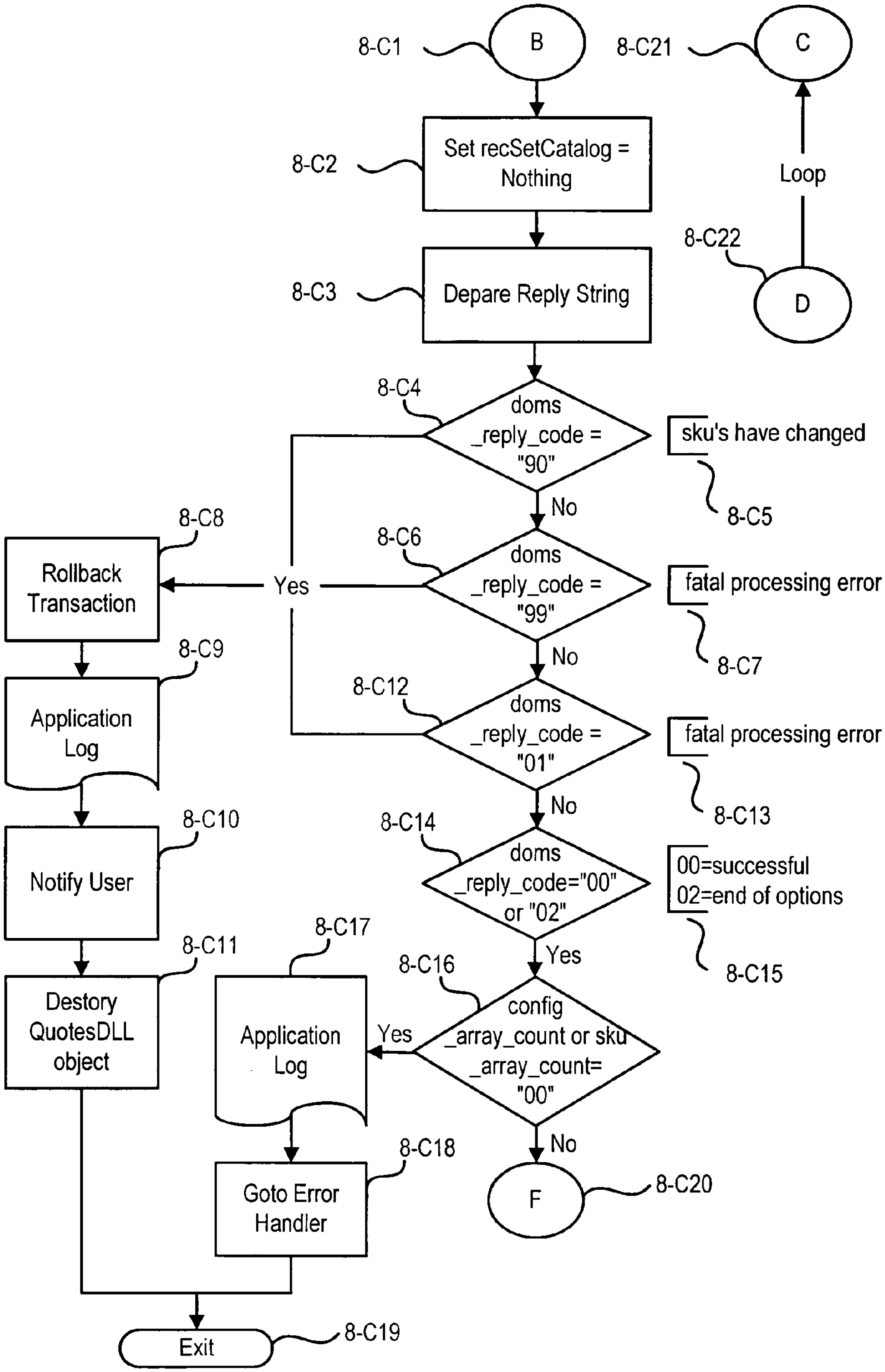
Figures 5, 6, 7, 8, 8D:
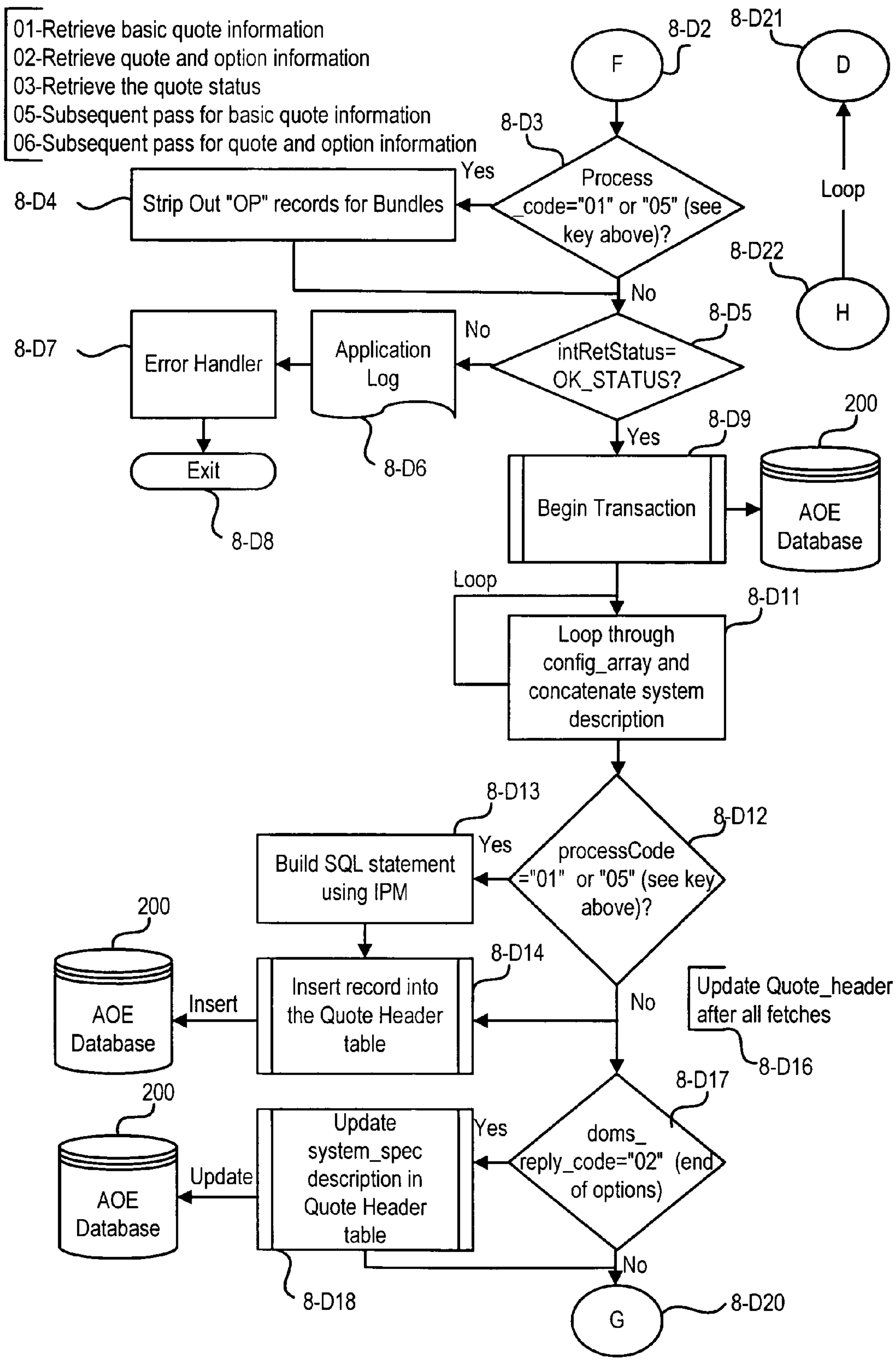
Figures 5, 6, 7, 8, 8E:
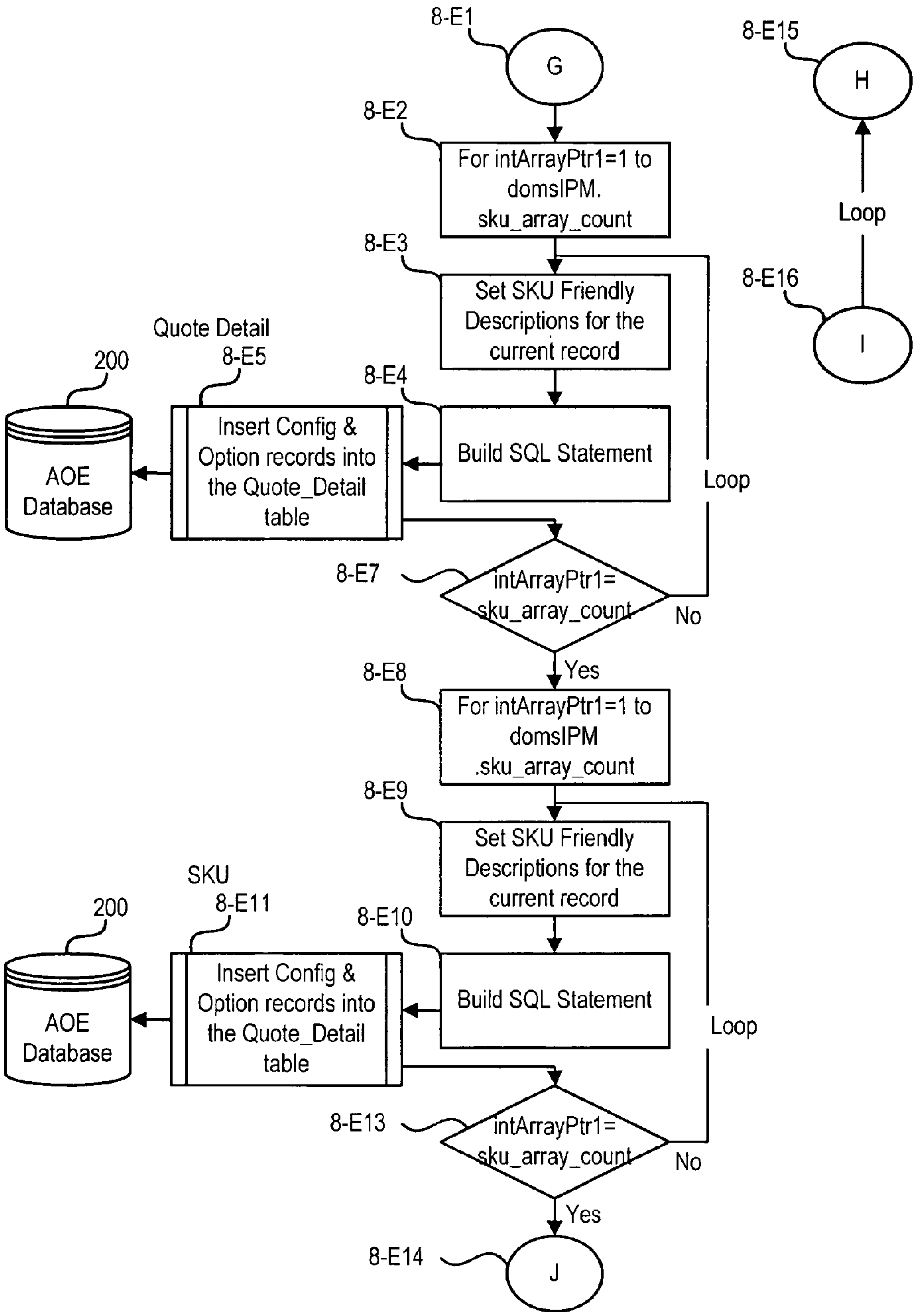
Figures 5, 6, 7, 8, 8F:
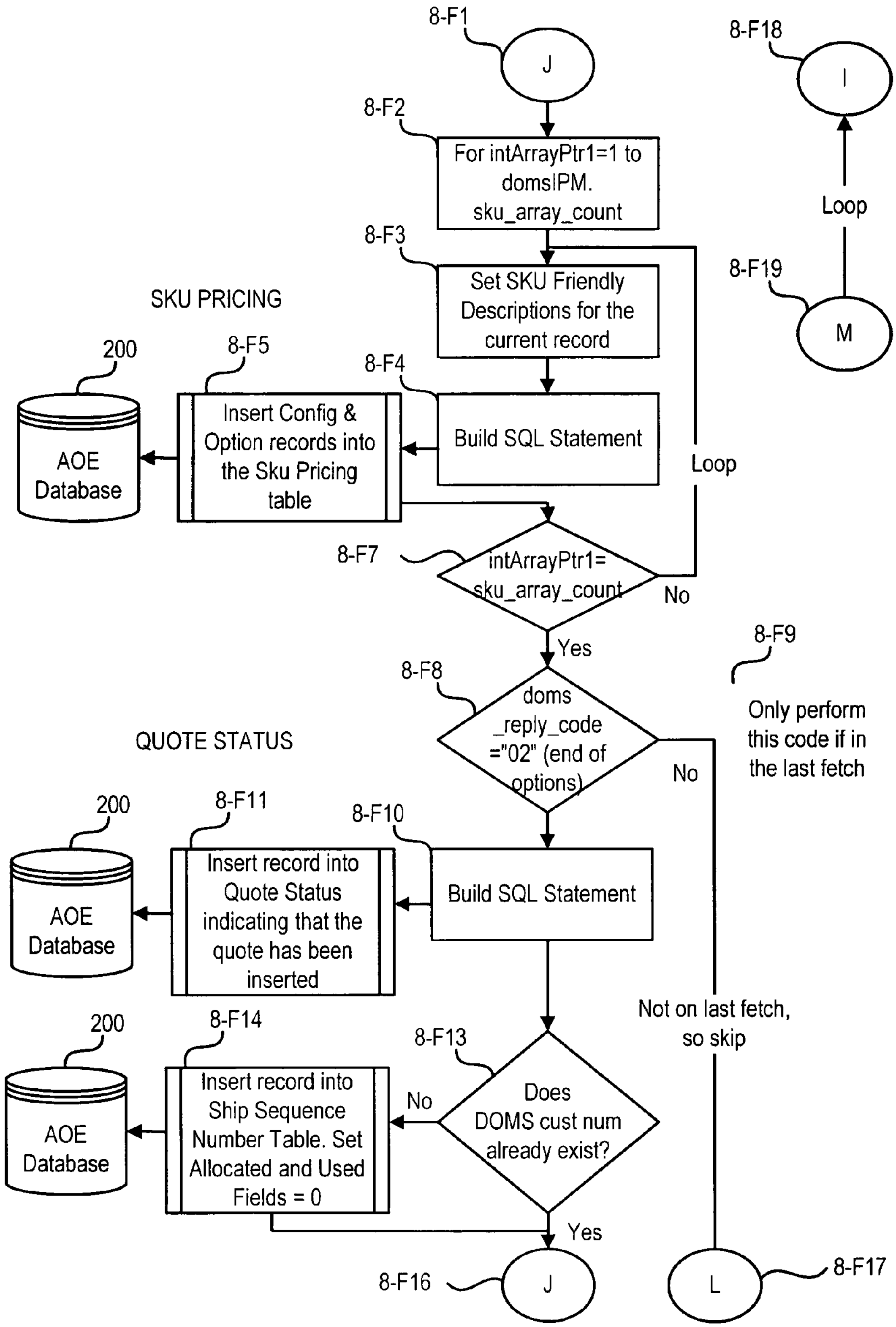
Figures 5, 6, 7, 8, 8G:
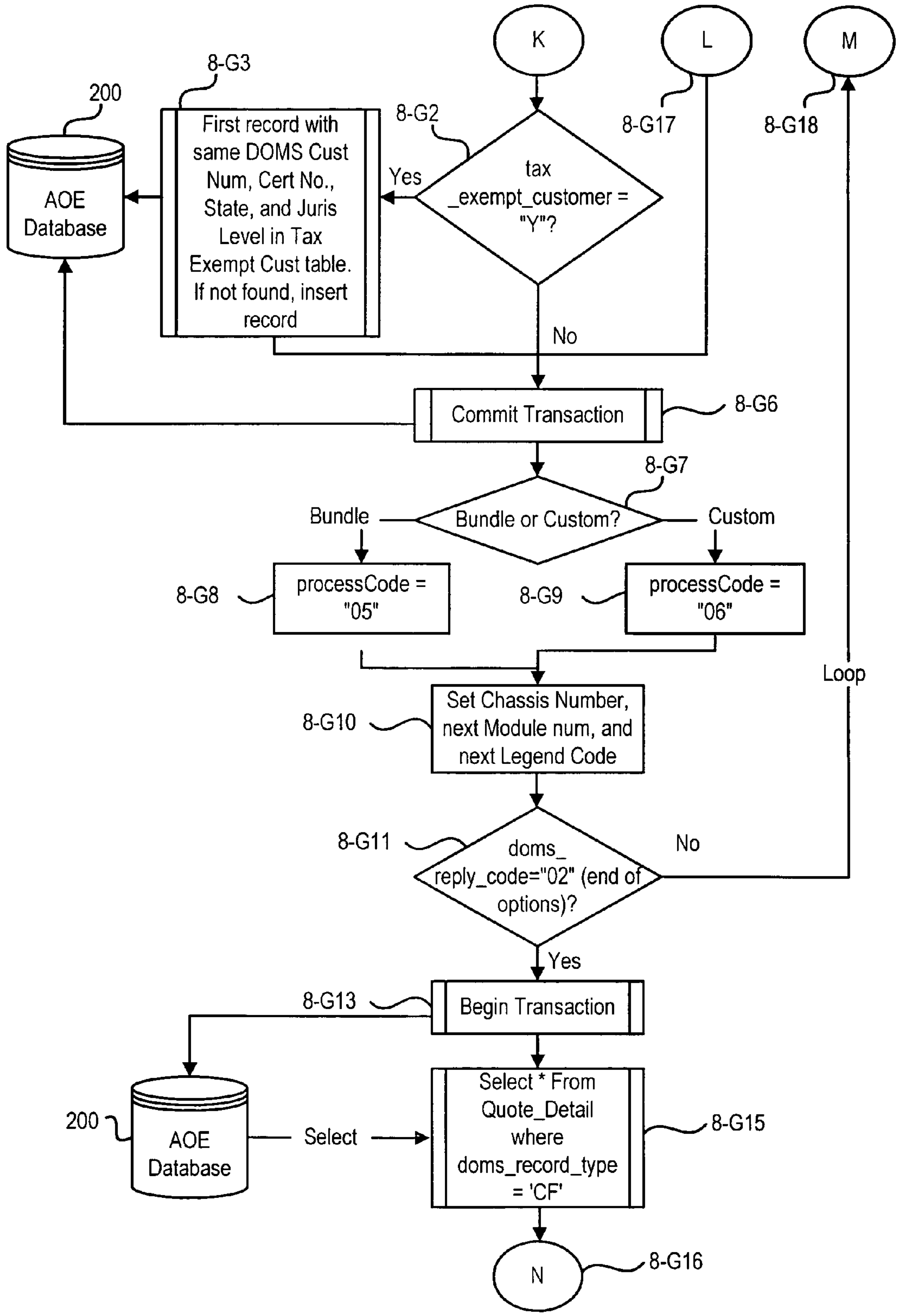
Figures 5, 6, 7, 8, 8H:
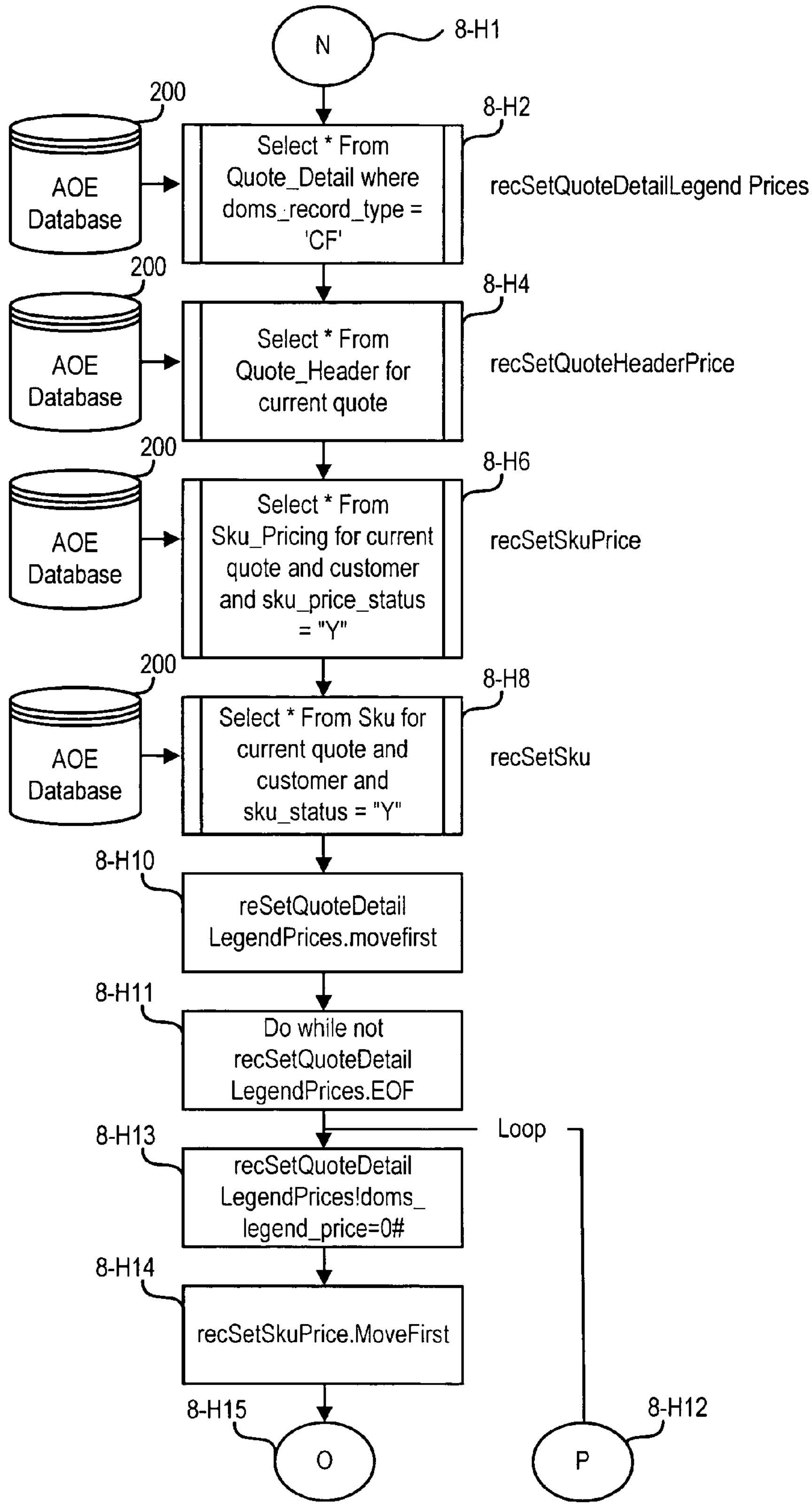
Figures 5, 6, 7, 8, 8I:
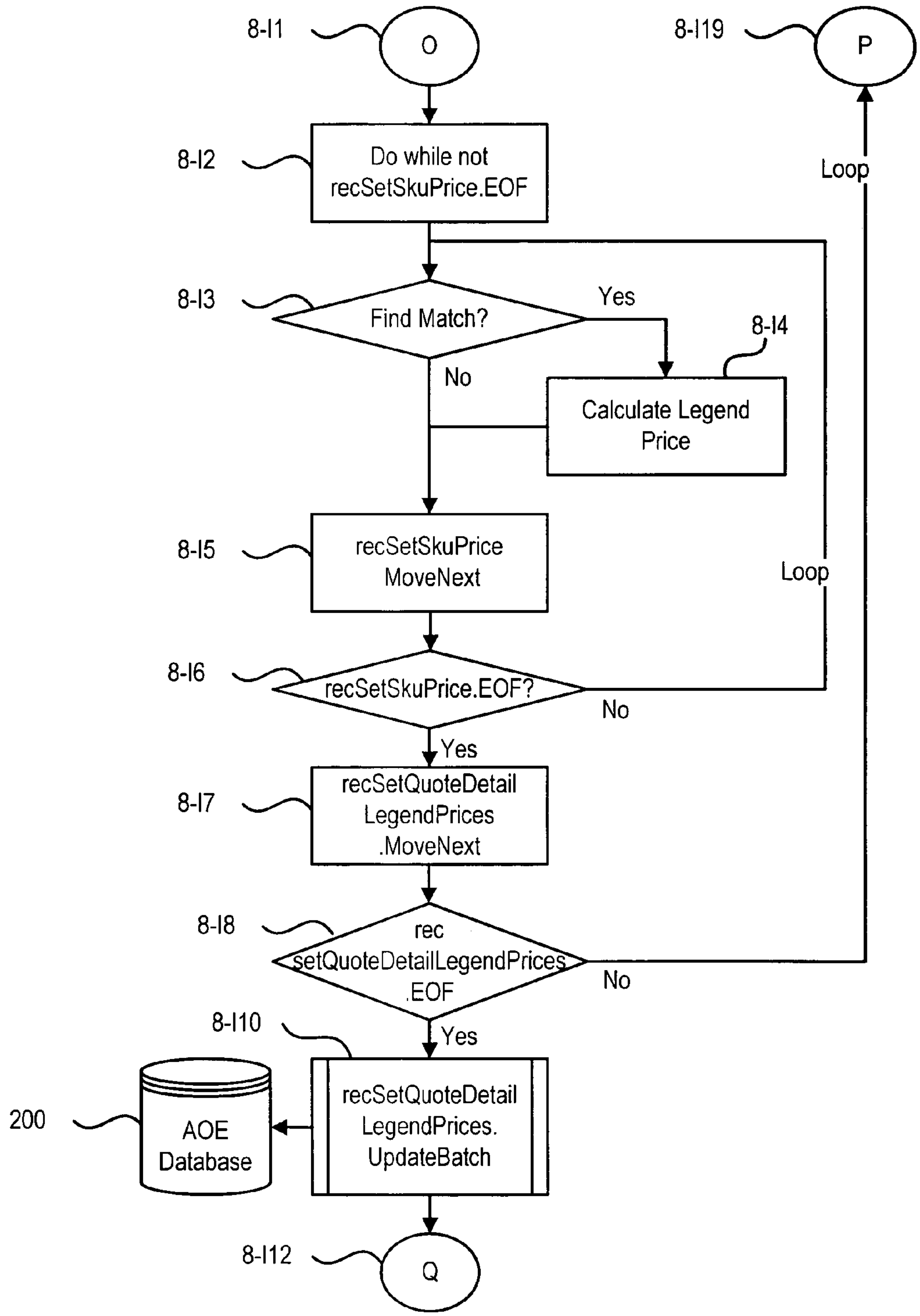
Figures 5, 6, 7, 8, 8J:
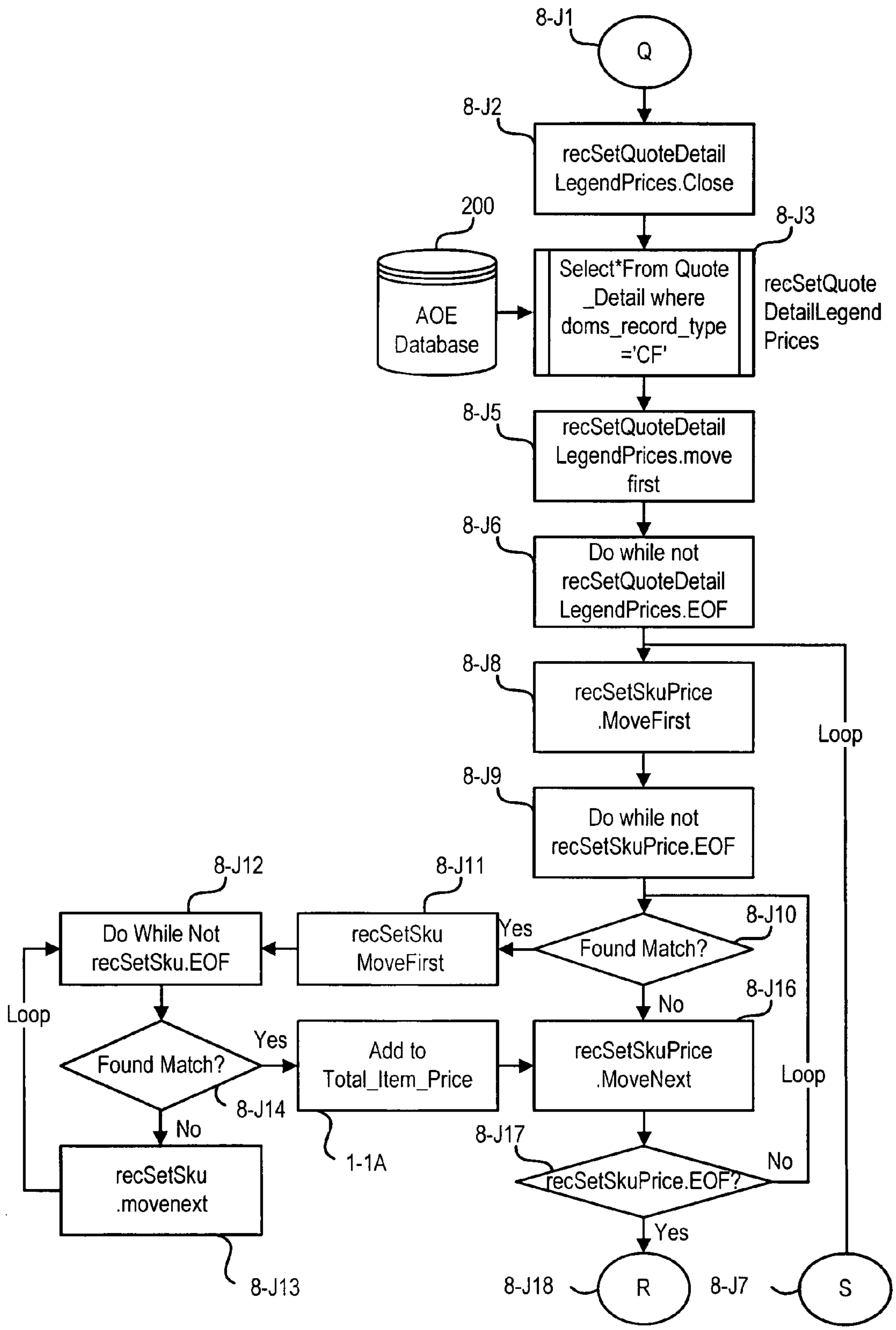
Figures 5, 6, 7, 8, 8K:
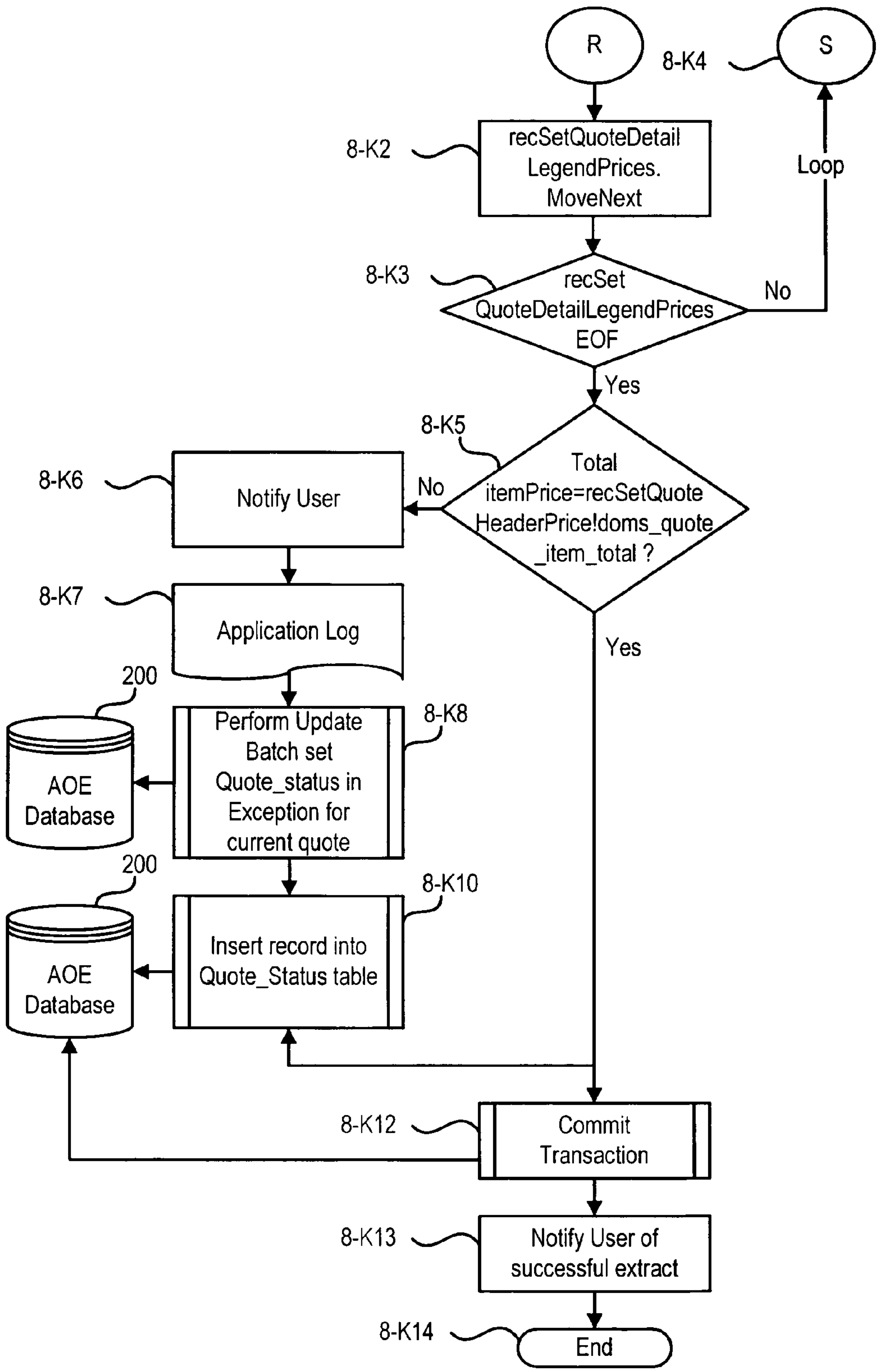
Figures 5, 6, 7, 8, 9:
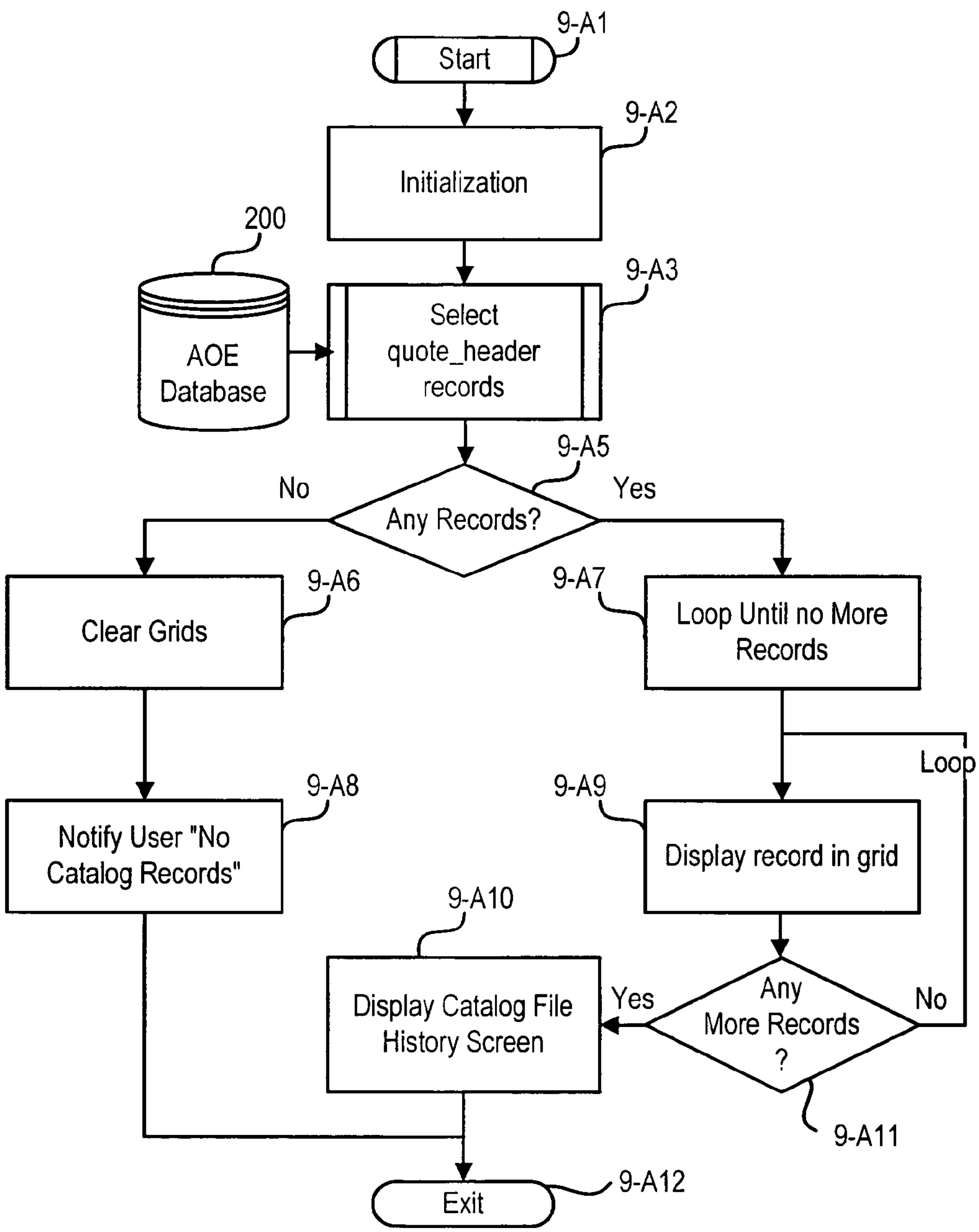
Figures 5, 6, 7, 8, 9, 10, 10A:
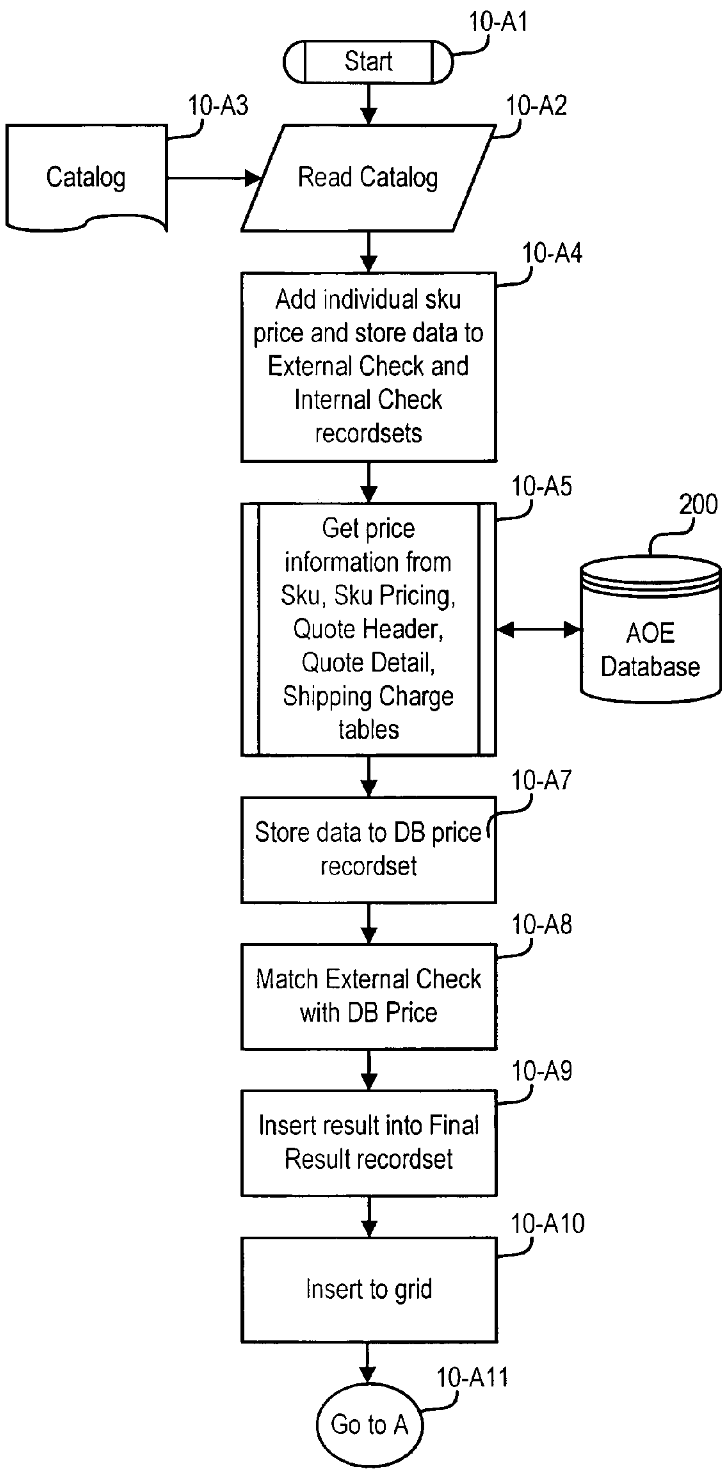
Figures 5, 6, 7, 8, 9, 10, 10B:
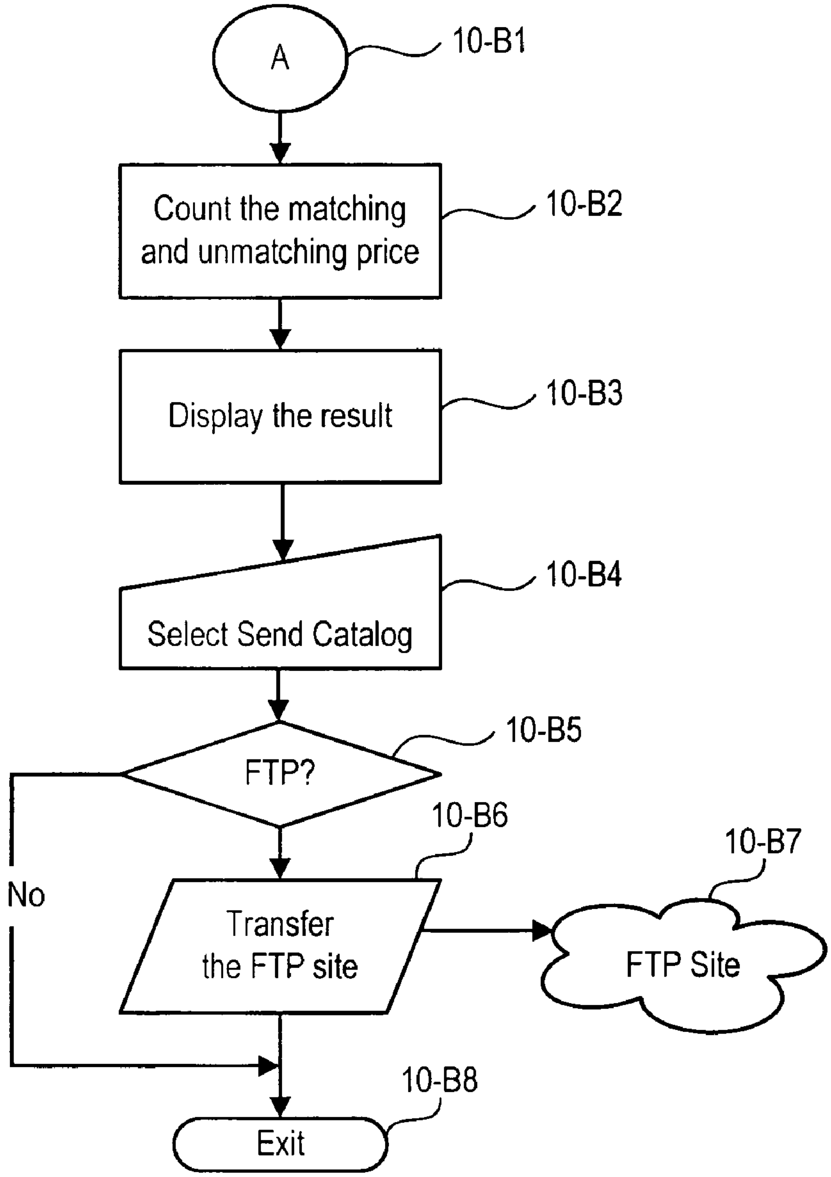
Figures 5, 6, 7, 8, 9, 10, 11, 11A:
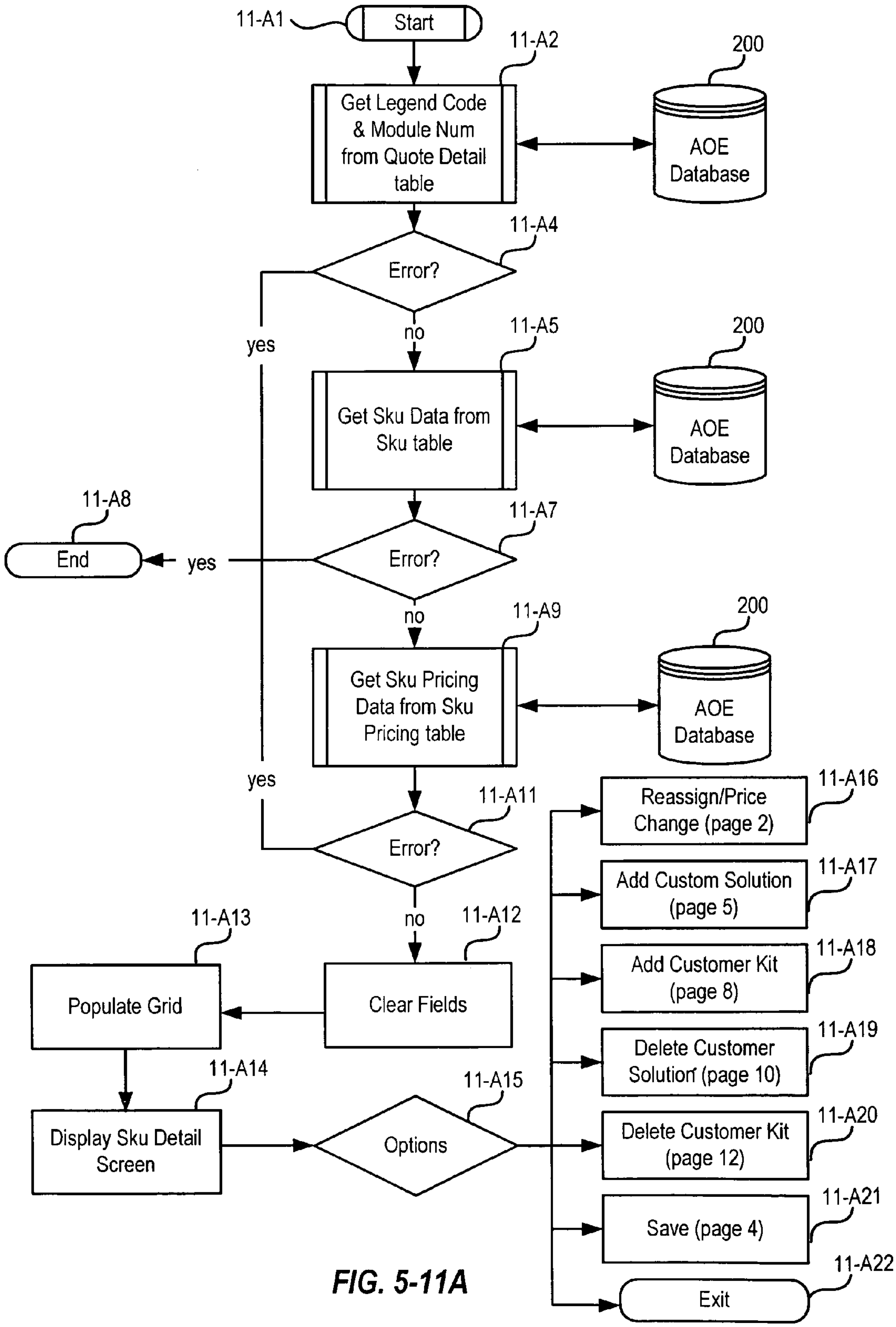
Figures 5, 6, 7, 8, 9, 10, 11, 11B:
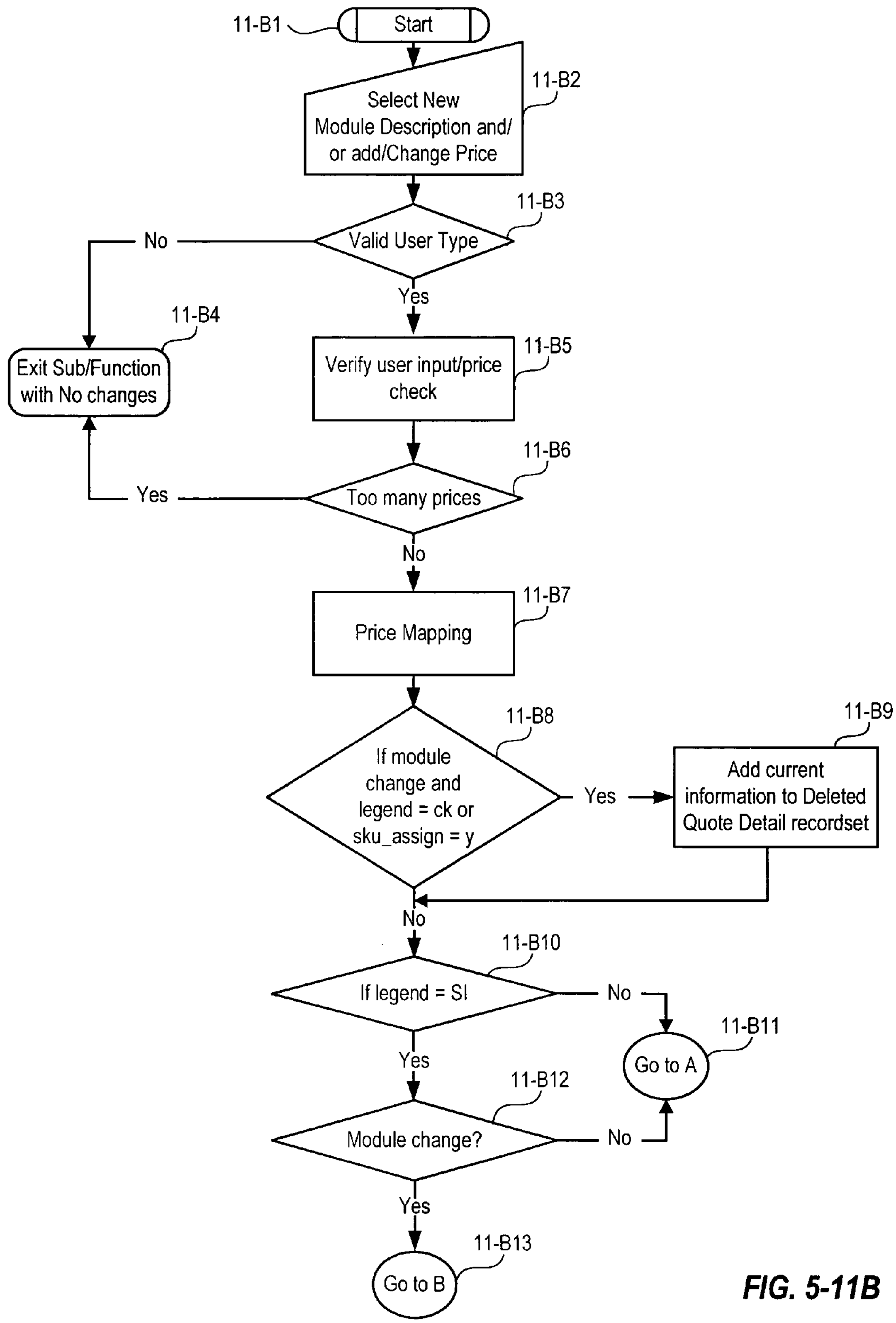
Figures 5, 6, 7, 8, 9, 10, 11, 11C:
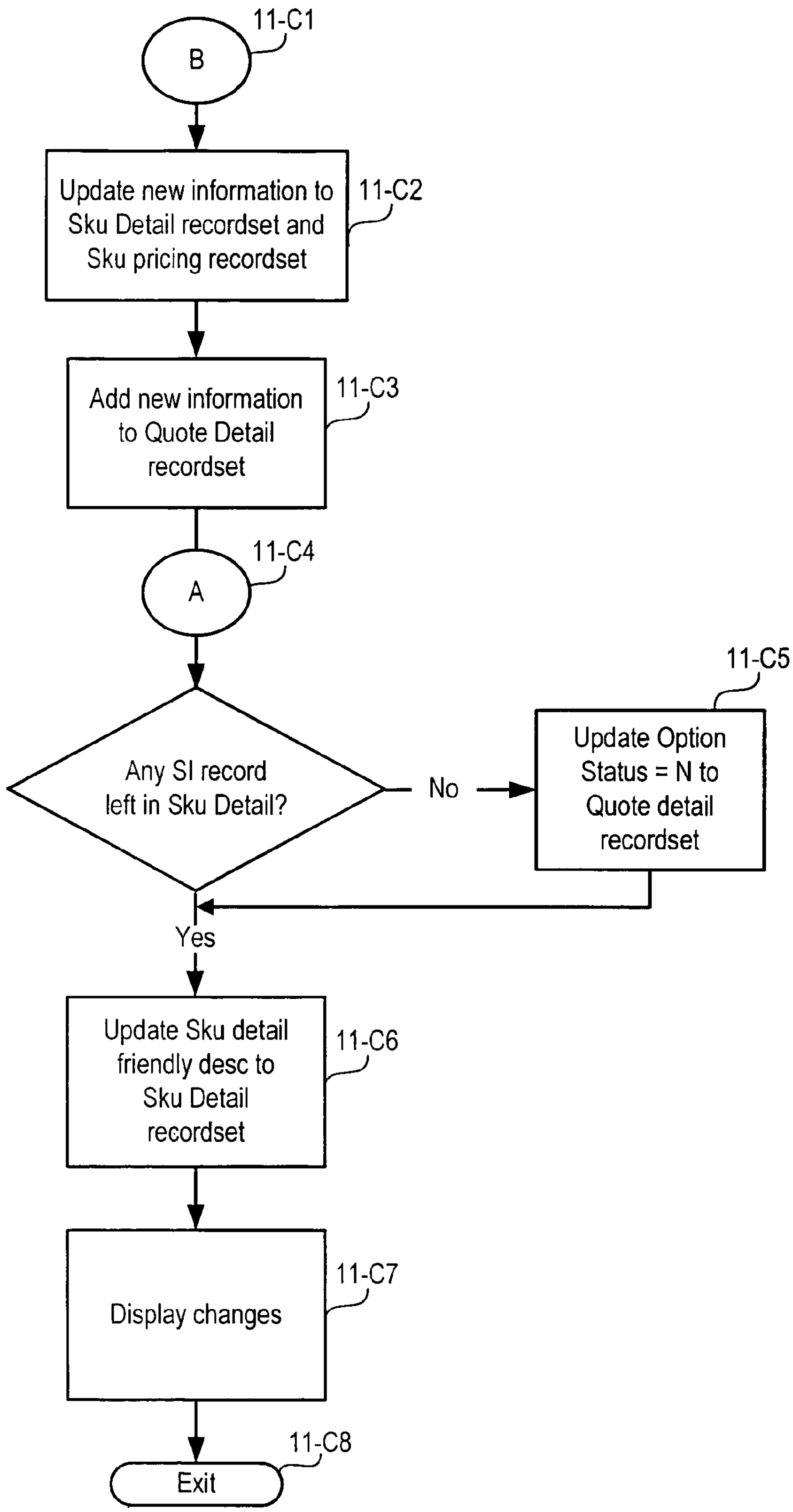
Figures 5, 6, 7, 8, 9, 10, 11, 11D:
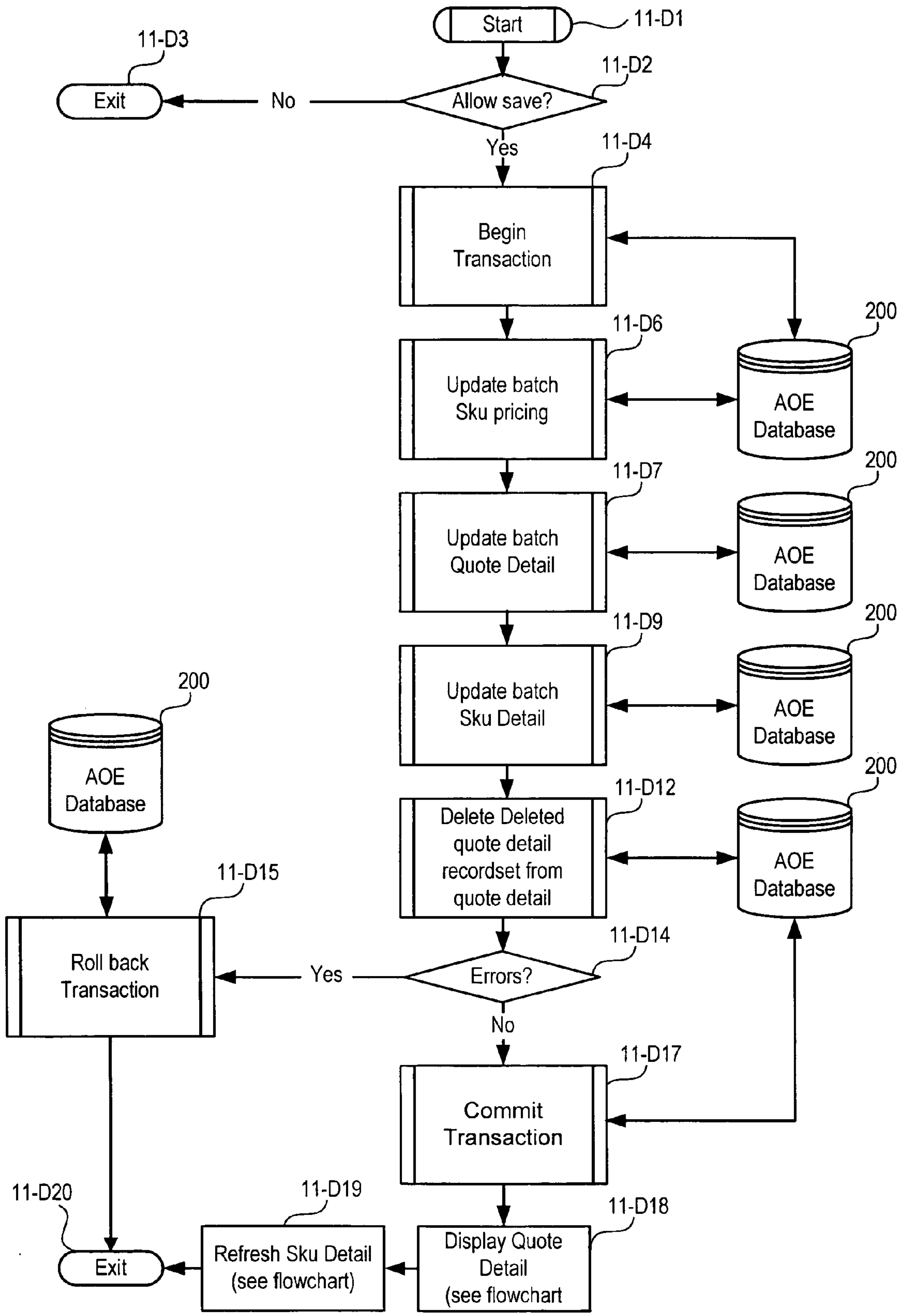
Figures 5, 6, 7, 8, 9, 10, 11, 11E:
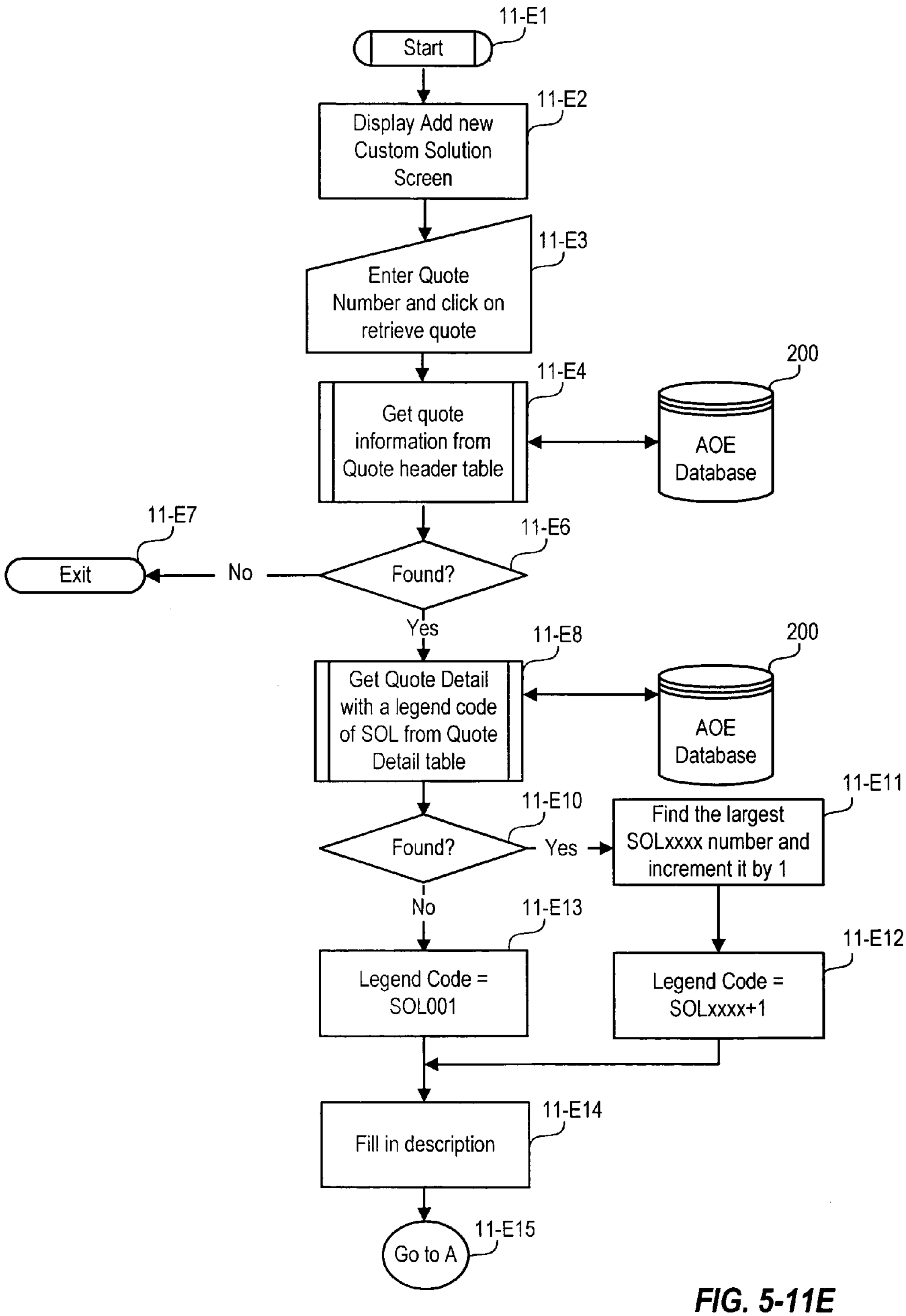
Figures 5, 6, 7, 8, 9, 10, 11, 11F:
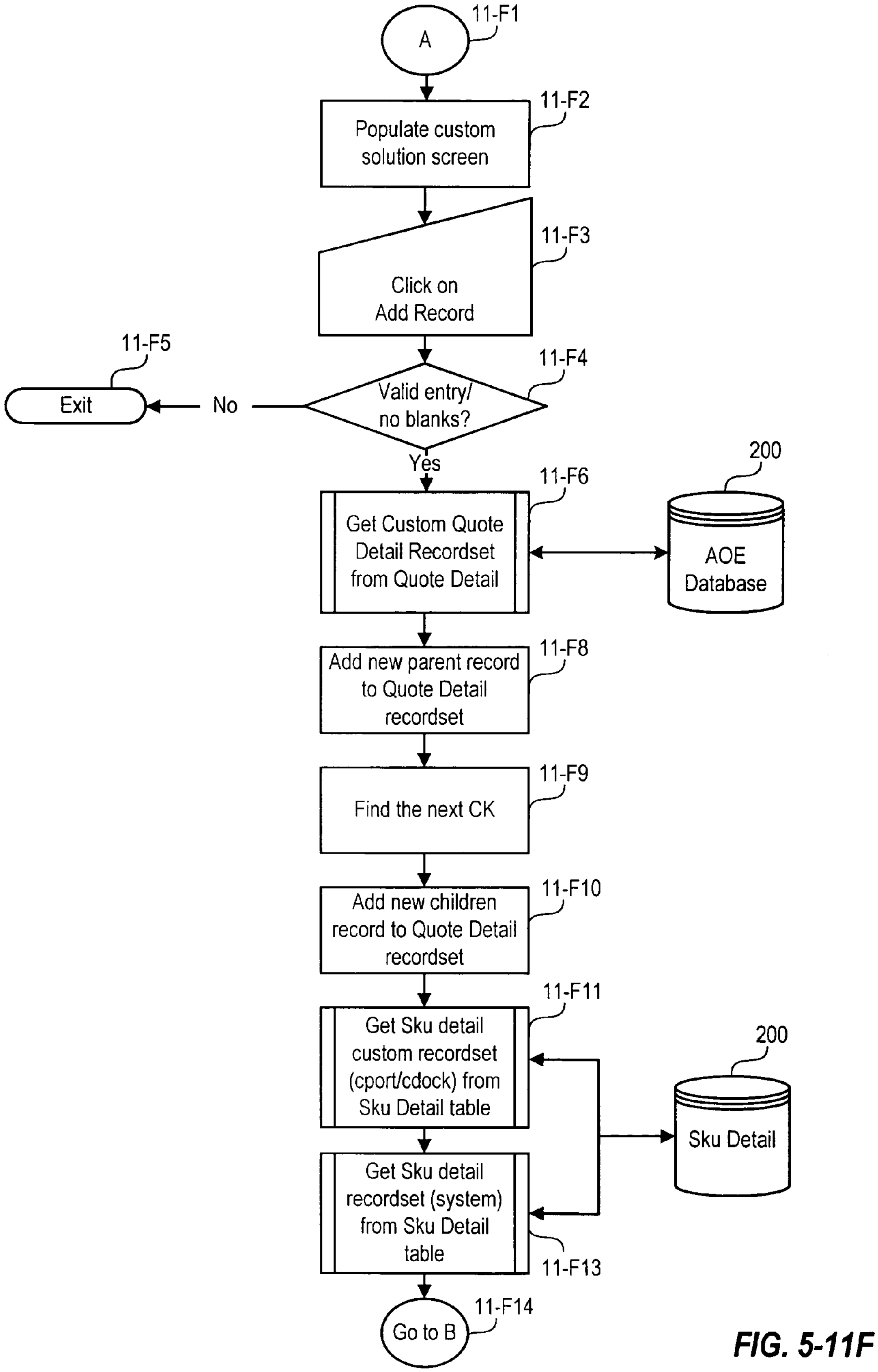
Figures 5, 6, 7, 8, 9, 10, 11, 11G:
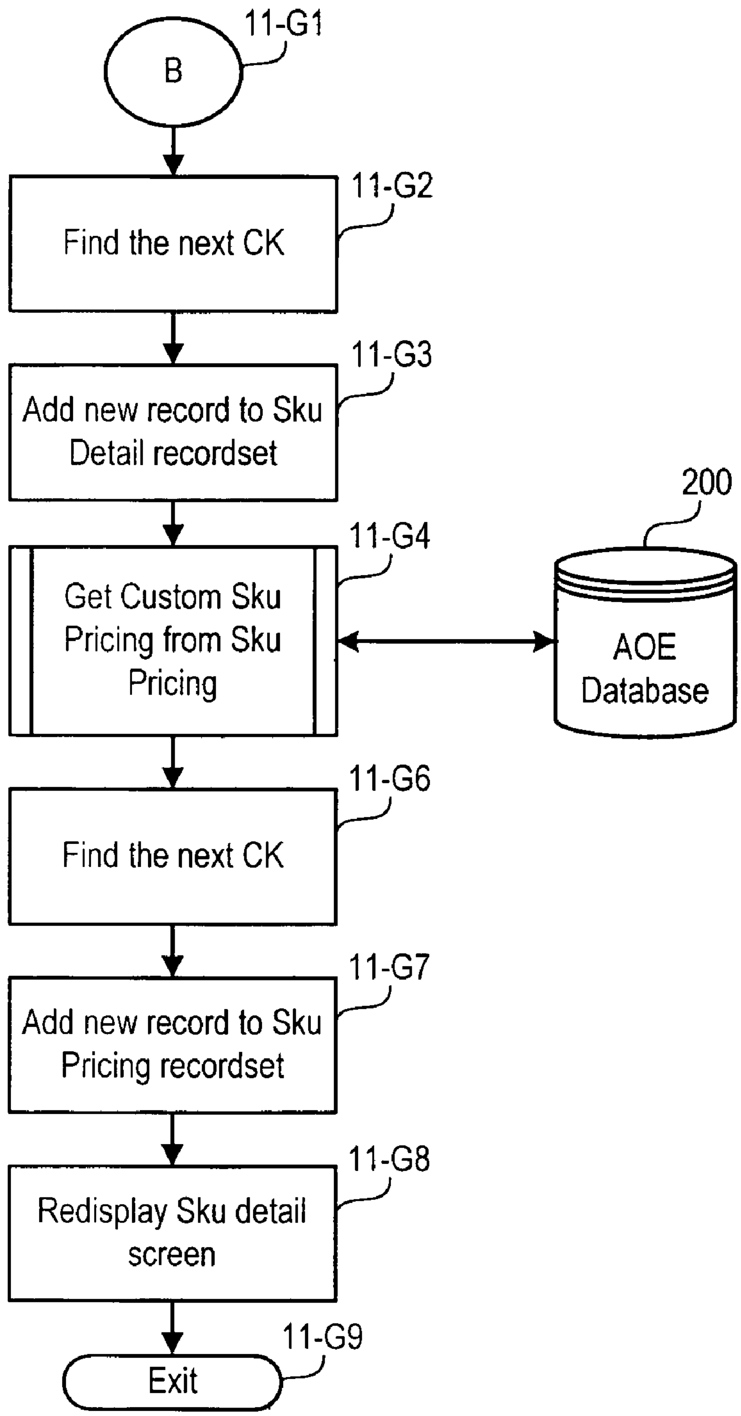
Figures 5, 6, 7, 8, 9, 10, 11, 12:
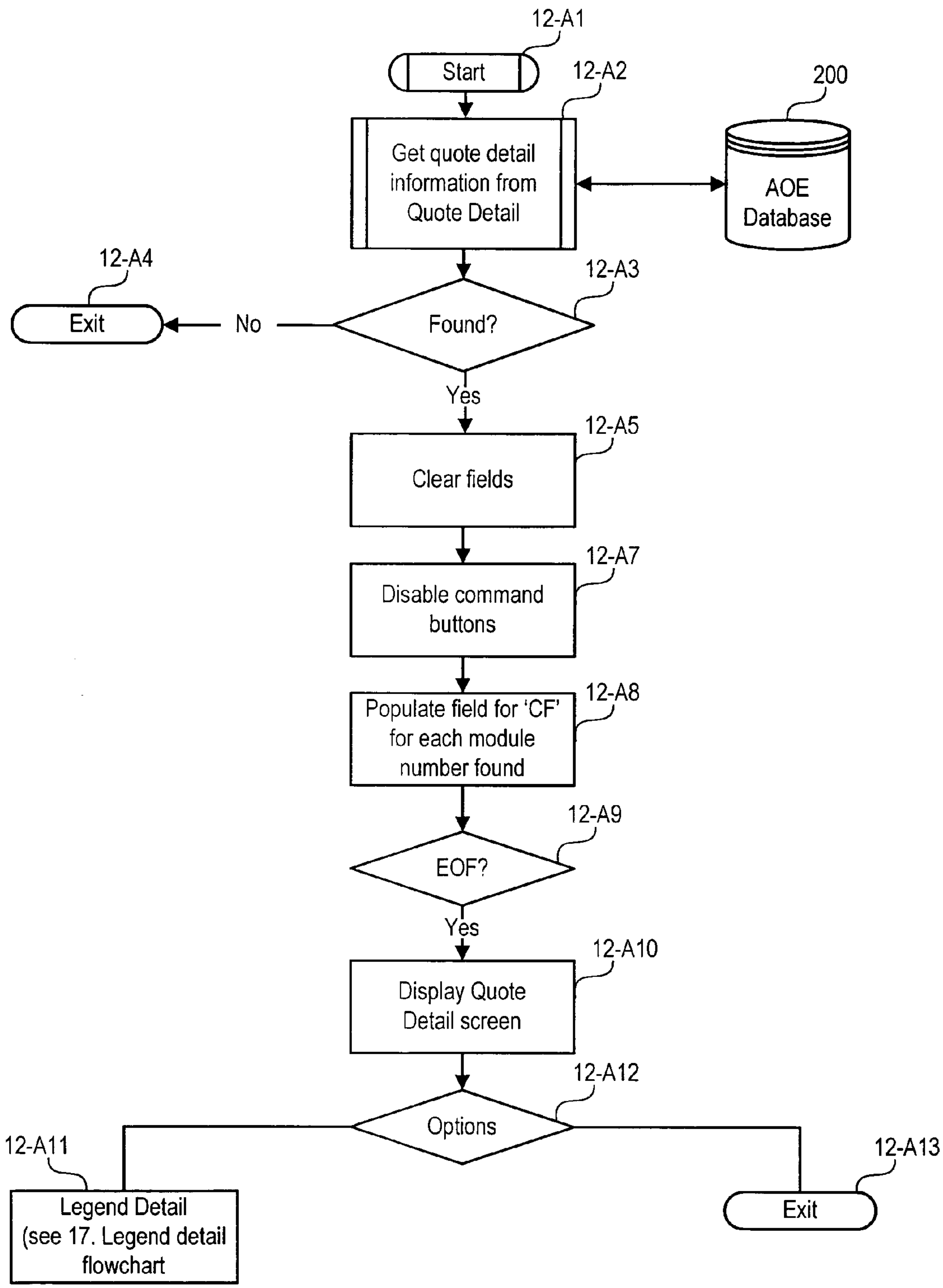
Figures 5, 6, 7, 8, 9, 10, 11, 12, 13:
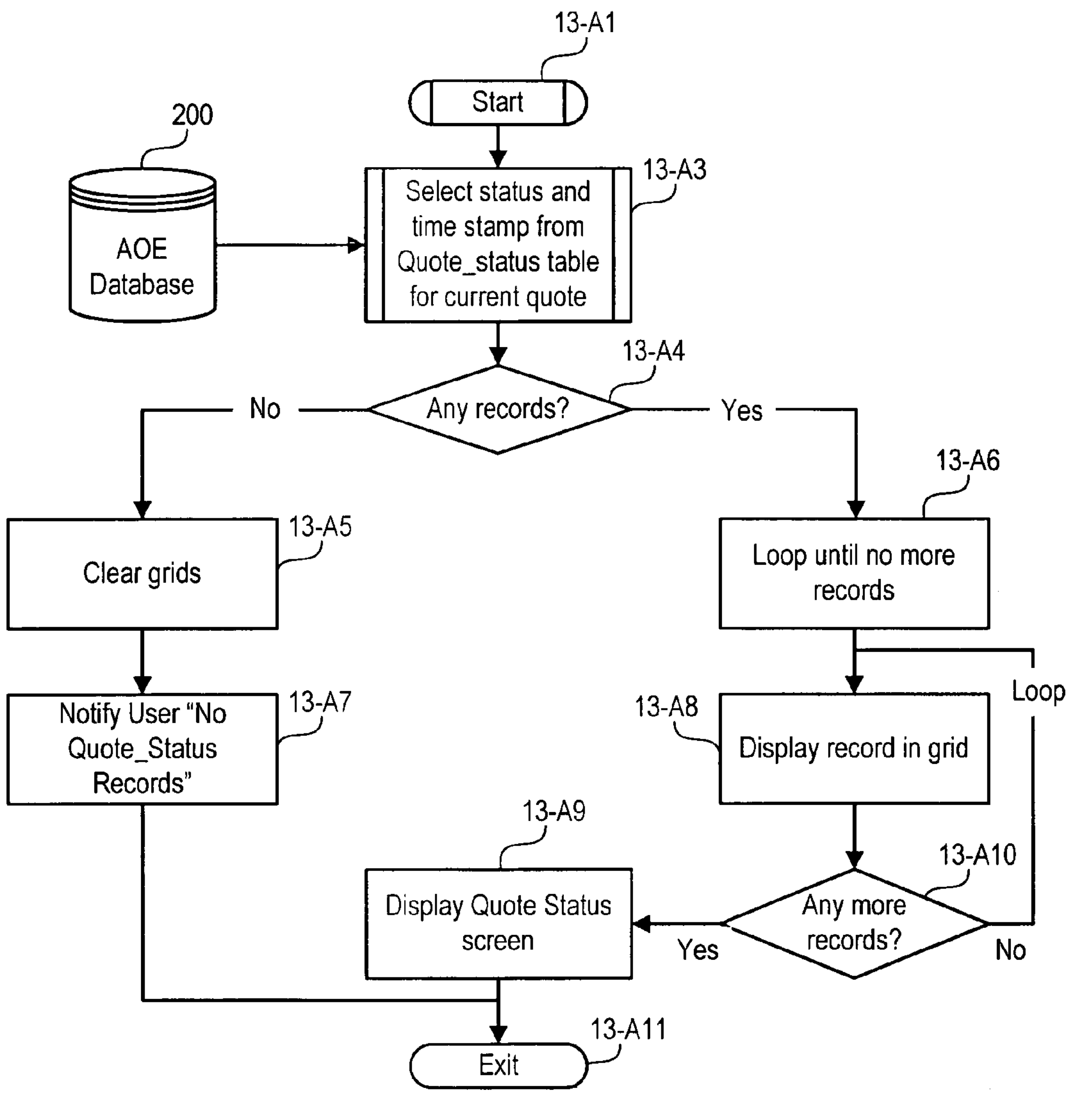
Figures 5, 6, 7, 8, 9, 10, 11, 12, 13, 14, 15, 15A:
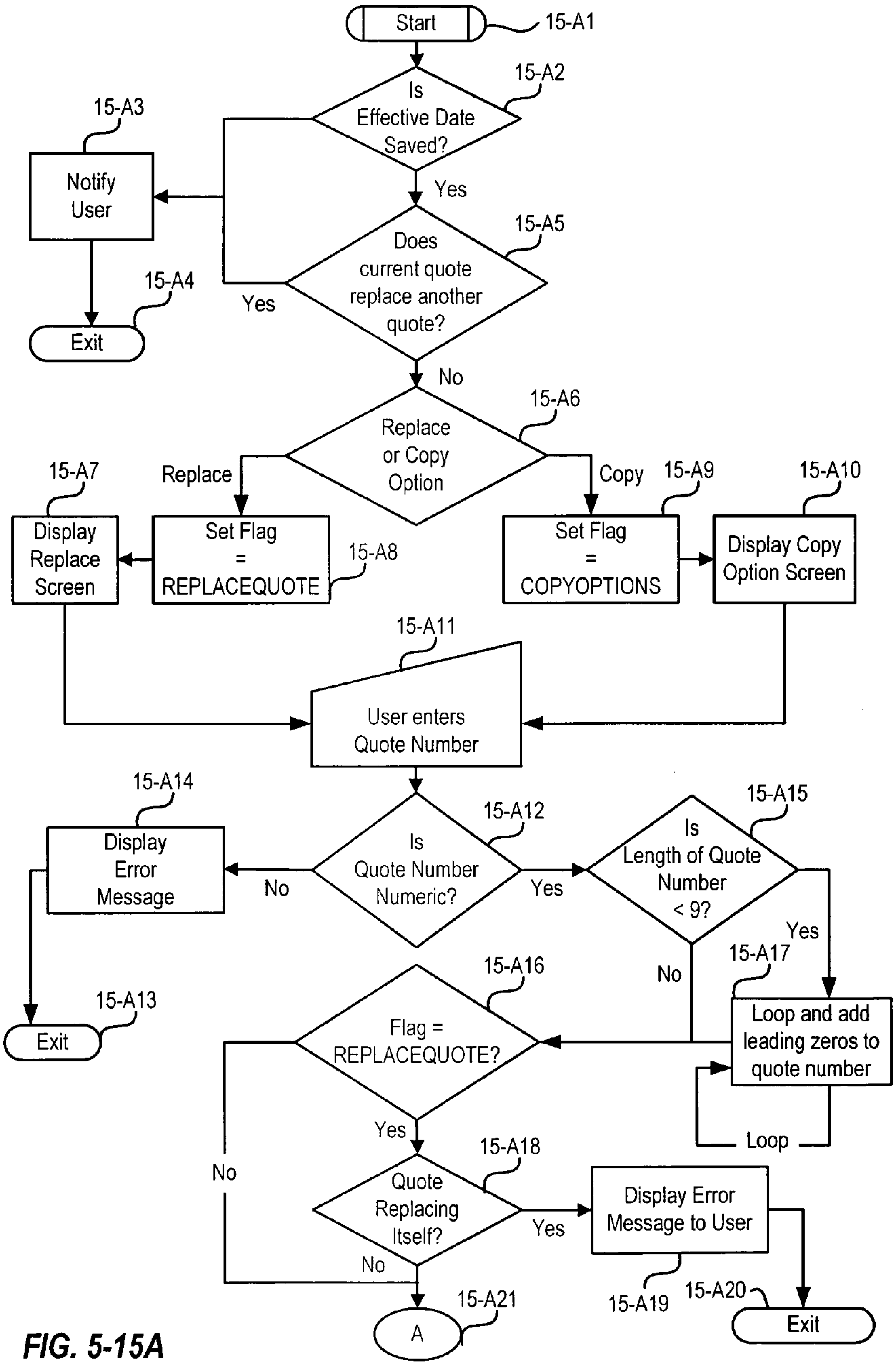
Figures 5, 6, 7, 8, 9, 10, 11, 12, 13, 14, 15, 15B:
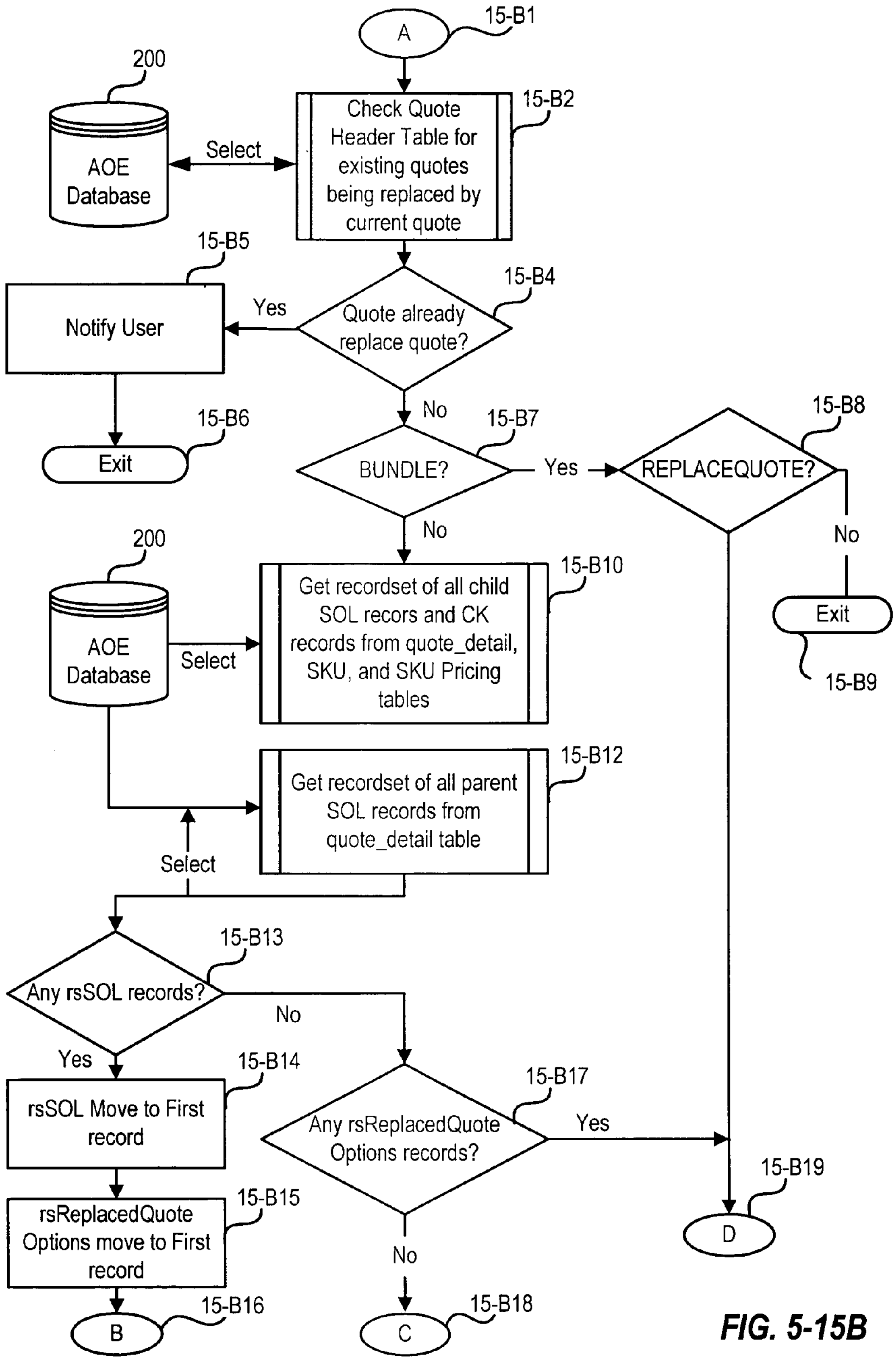
Figures 5, 6, 7, 8, 9, 10, 11, 12, 13, 14, 15, 15C:
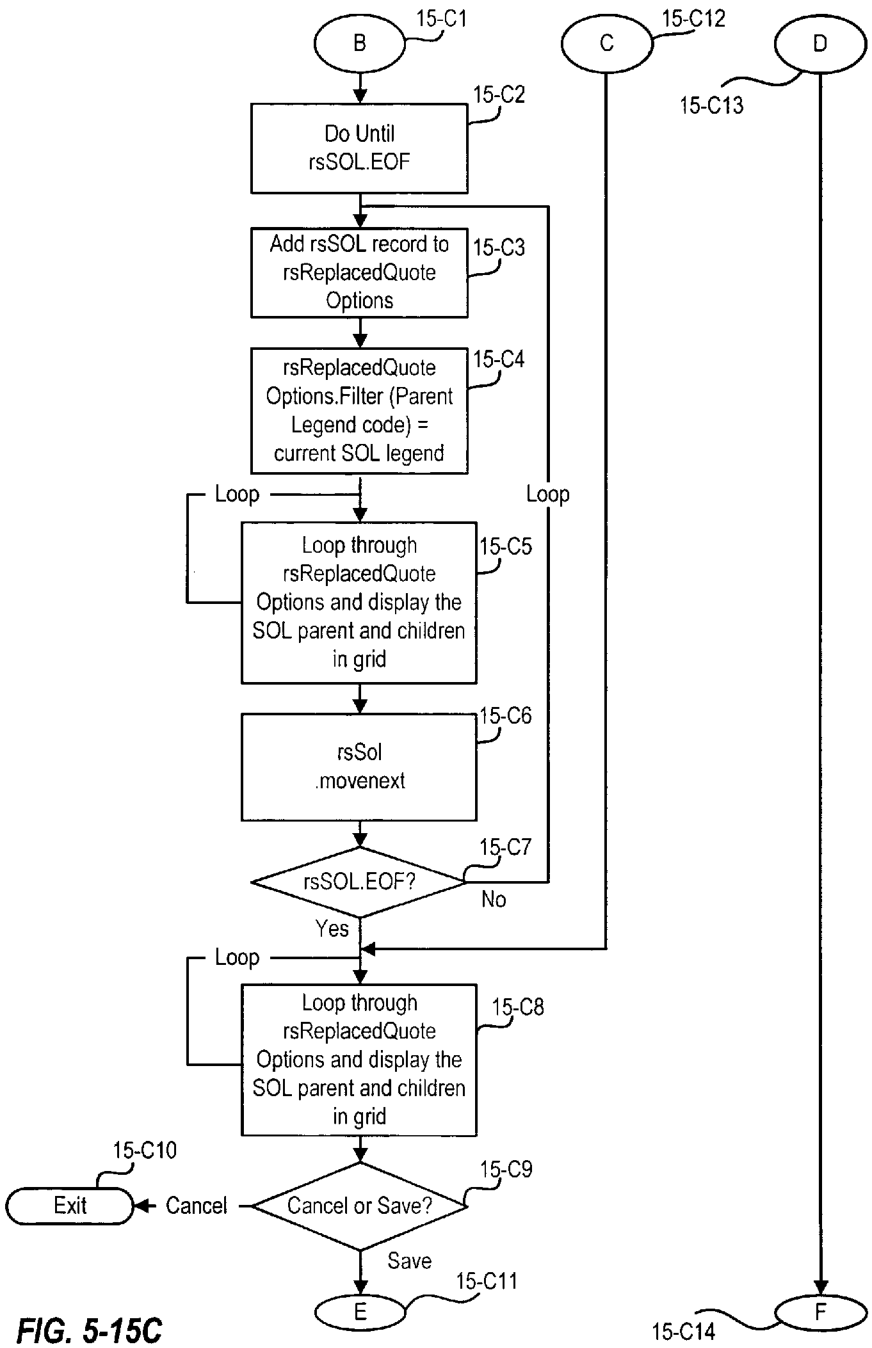
Figures 5, 6, 7, 8, 9, 10, 11, 12, 13, 14, 15, 15D:
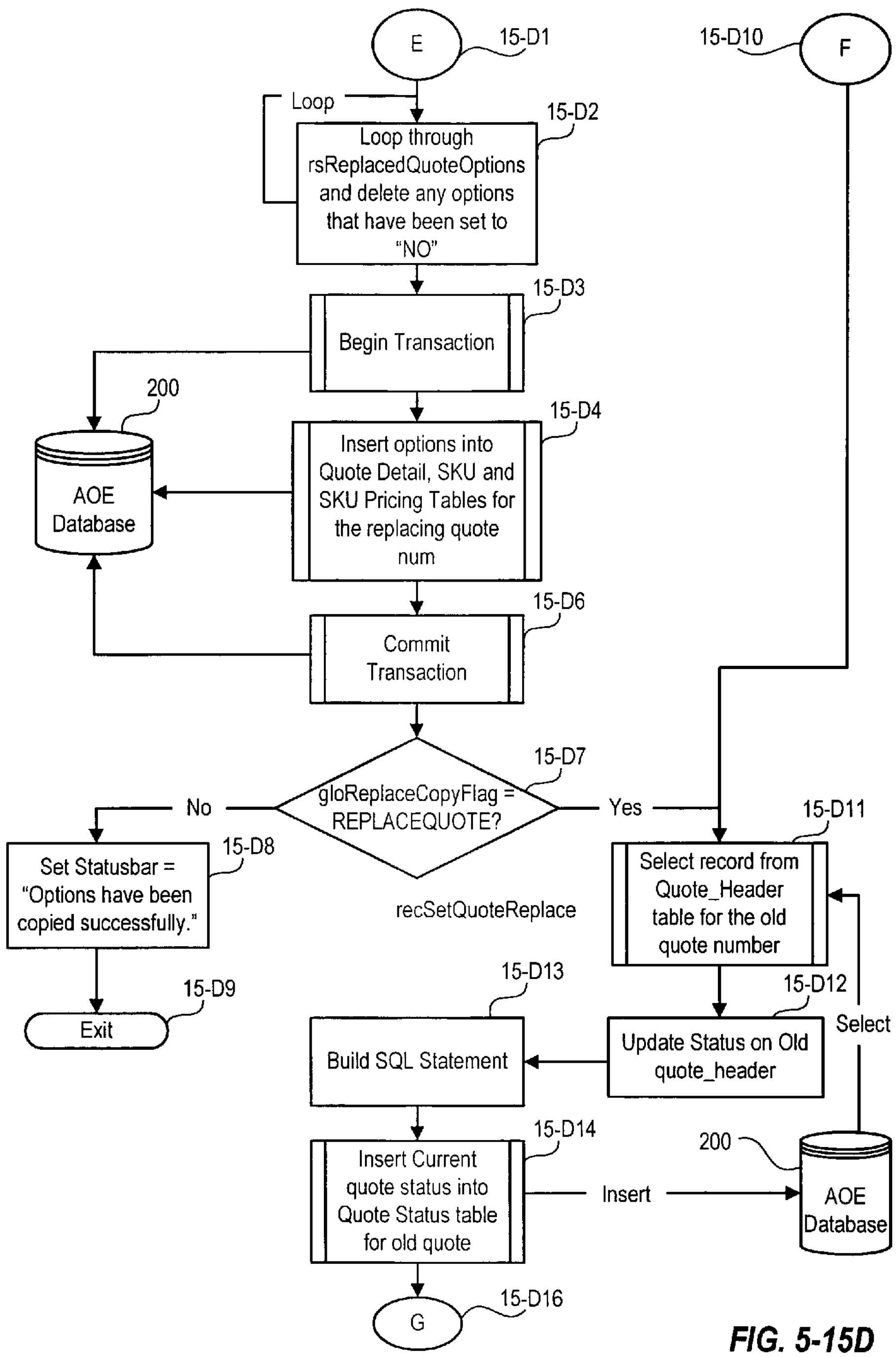
Figures 5, 6, 7, 8, 9, 10, 11, 12, 13, 14, 15, 15E:
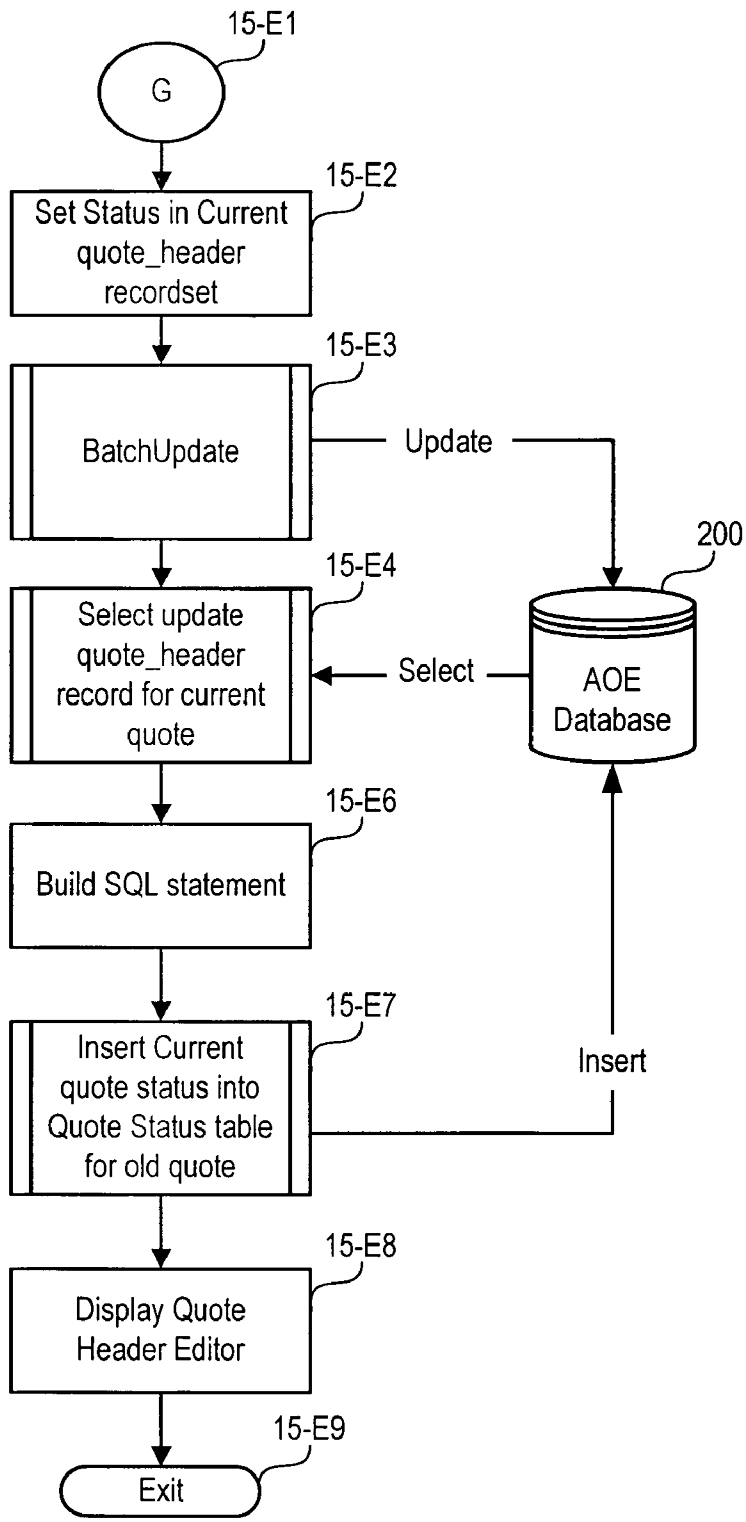
Figures 5, 6, 7, 8, 9, 10, 11, 12, 13, 14, 15, 16, 17, 17A:
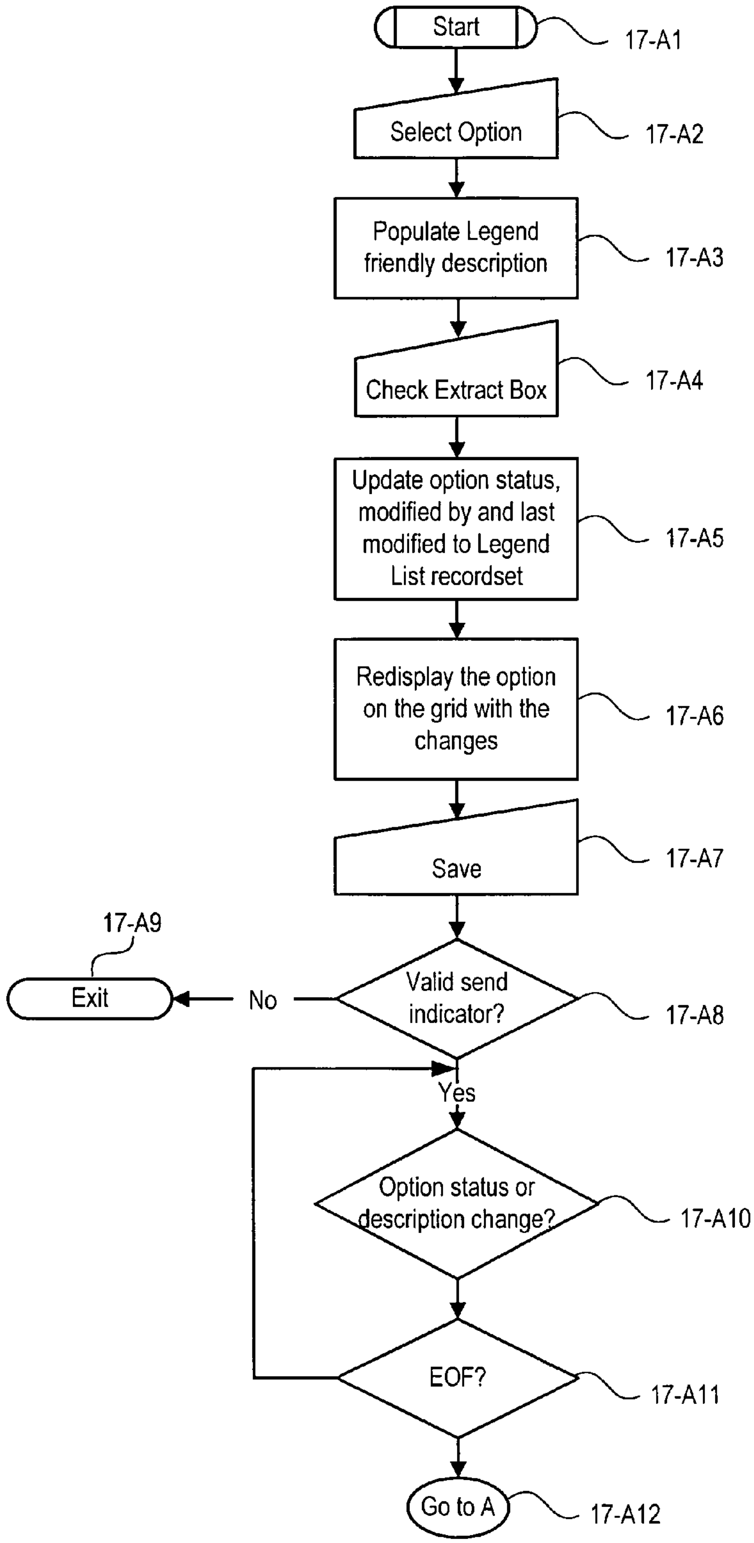
Figures 5, 6, 7, 8, 9, 10, 11, 12, 13, 14, 15, 16, 17, 17B:
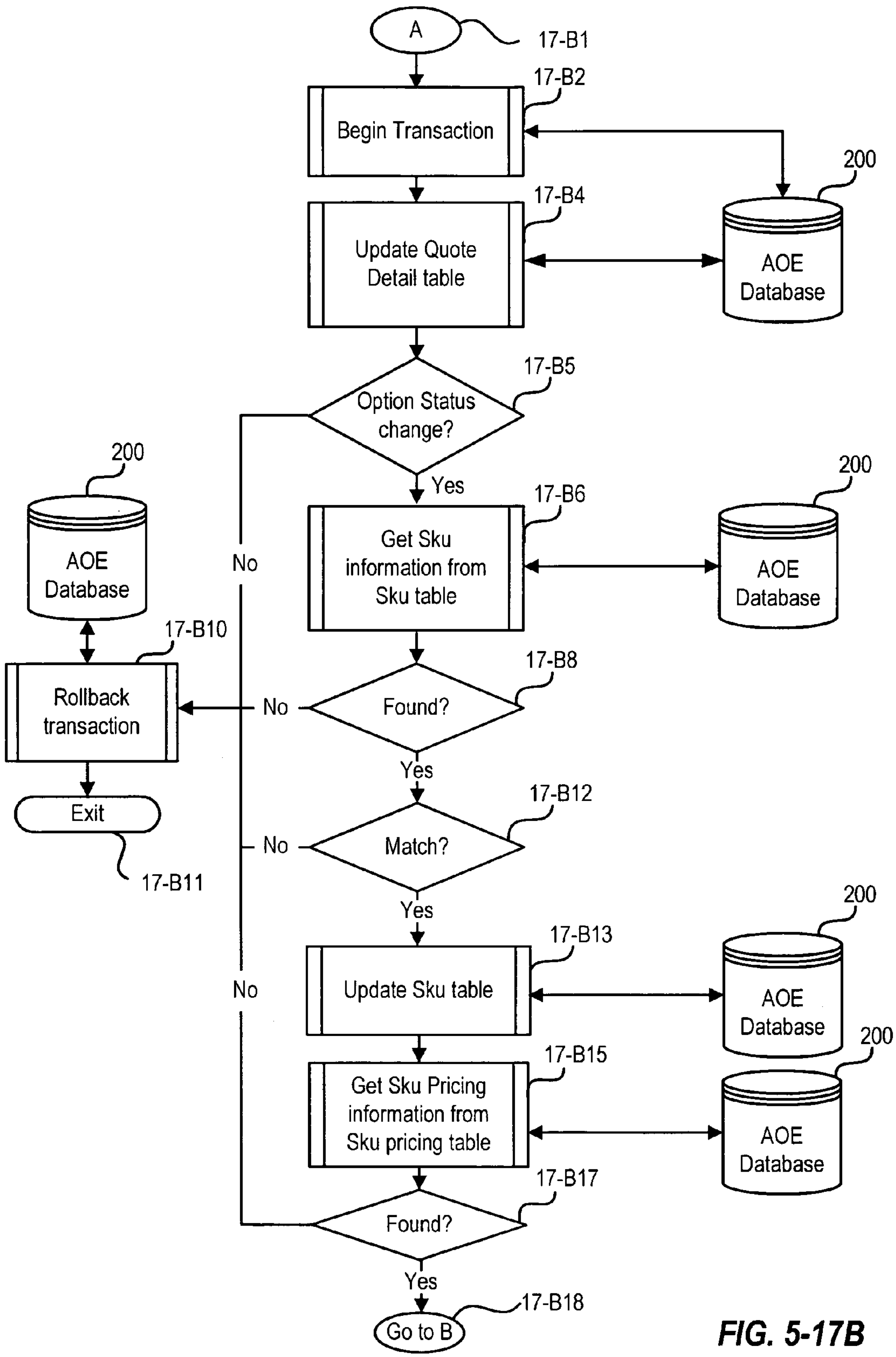
Figures 5, 6, 7, 8, 9, 10, 11, 12, 13, 14, 15, 16, 17, 17C:
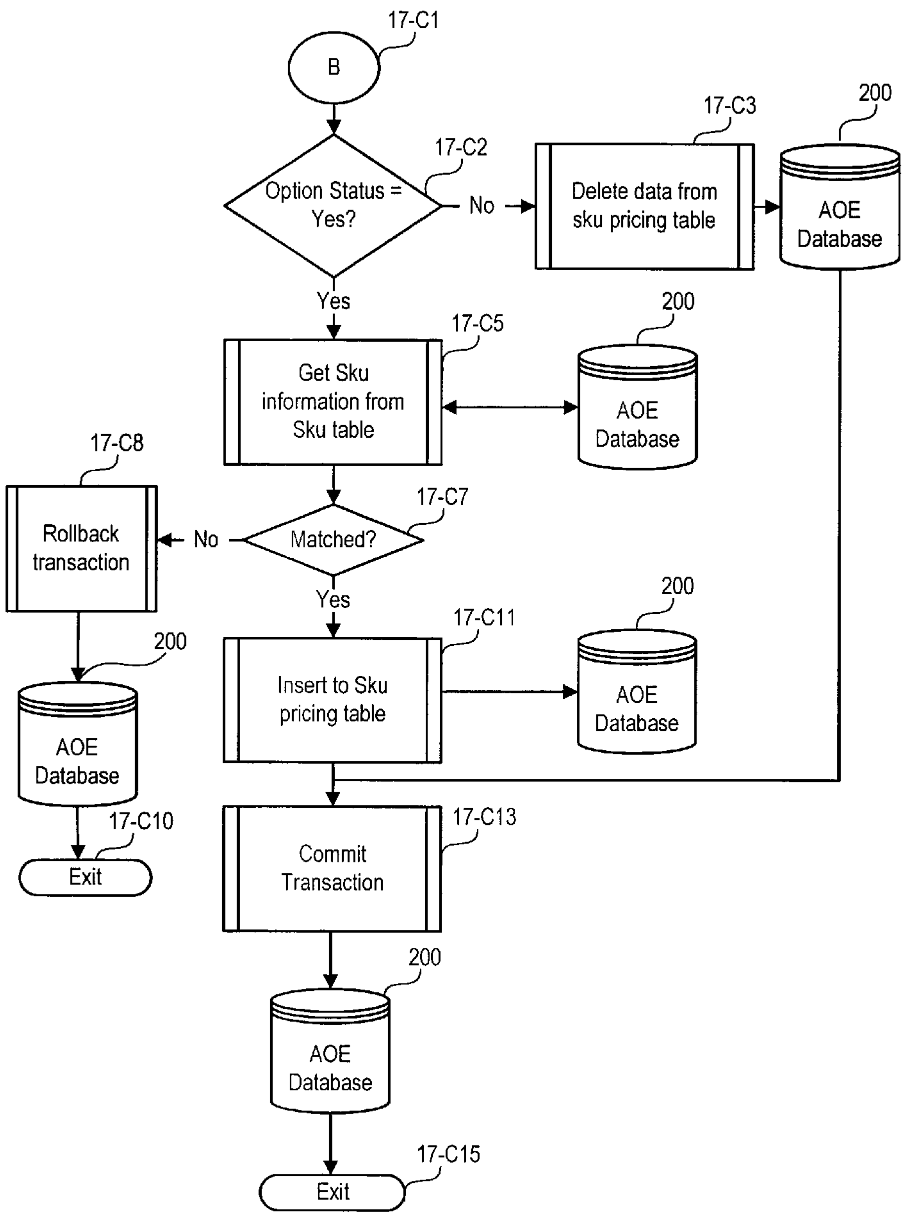
Figures 5, 6, 7, 8, 9, 10, 11, 12, 13, 14, 15, 16, 17, 18:
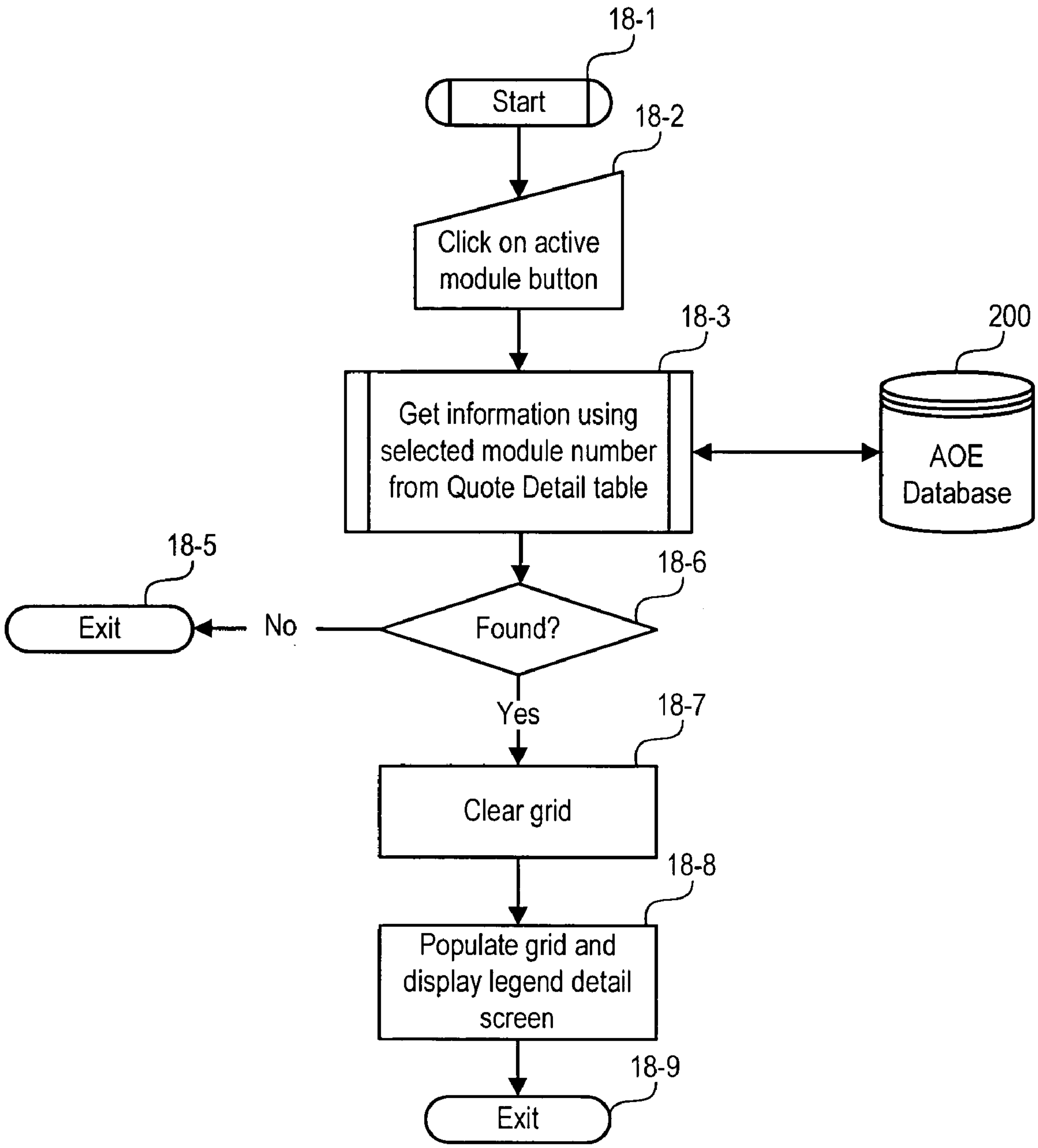
Figures 5, 6, 7, 8, 9, 10, 11, 12, 13, 14, 15, 16, 17, 18, 19, 19A:
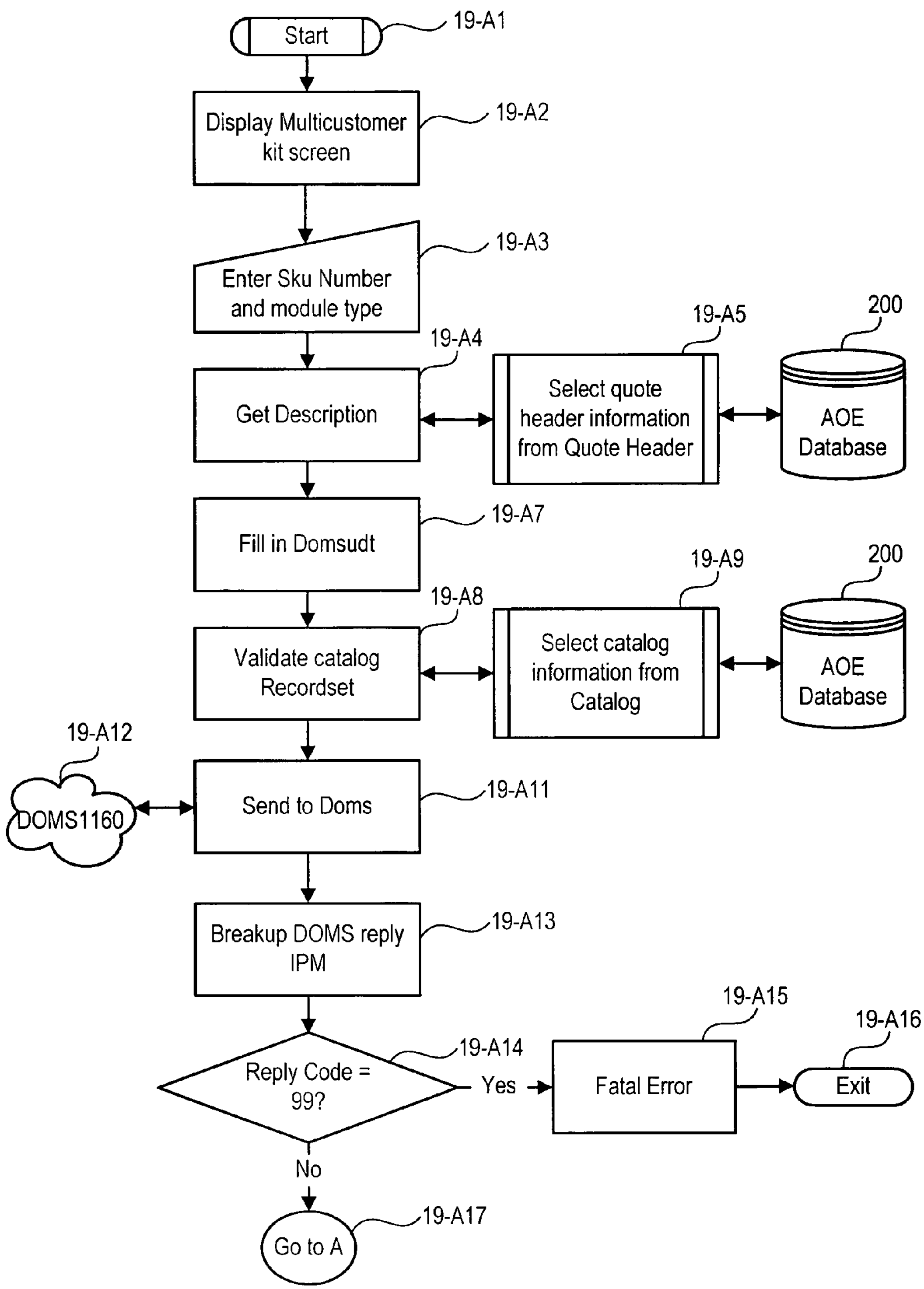
Figures 5, 6, 7, 8, 9, 10, 11, 12, 13, 14, 15, 16, 17, 18, 19, 19B:
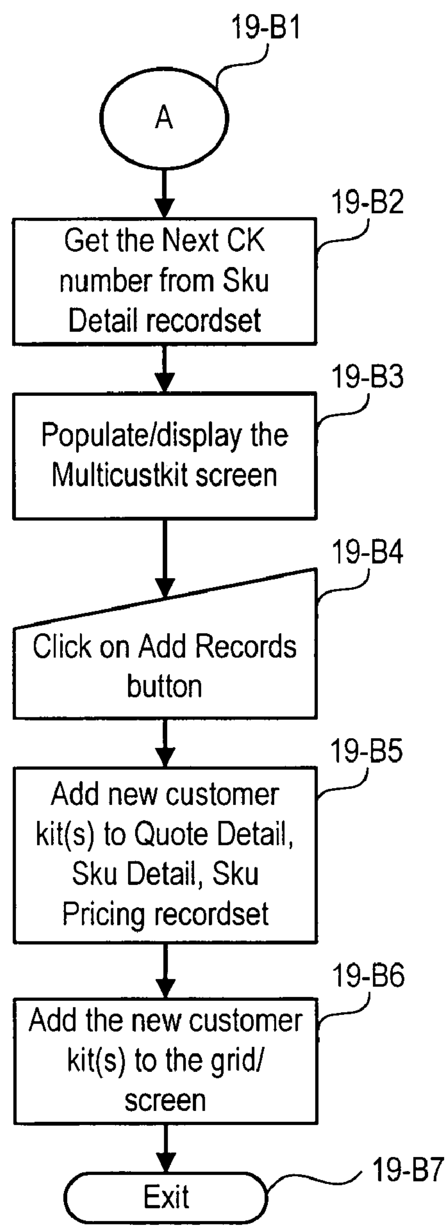
Figures 5, 6, 7, 8, 9, 10, 11, 12, 13, 14, 15, 16, 17, 18, 19, 20, 21:
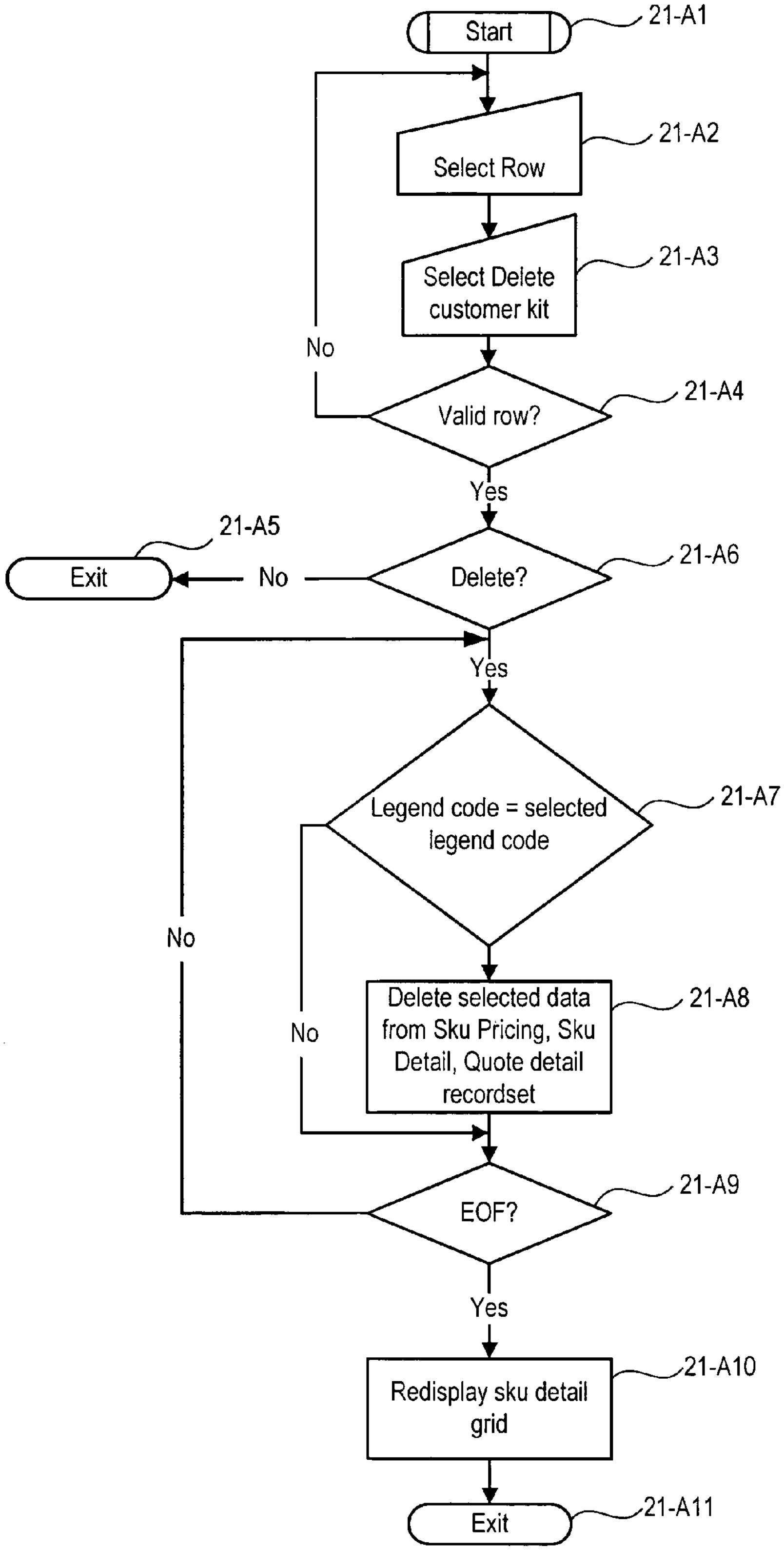
Figures 5, 6, 7, 8, 9, 10, 11, 12, 13, 14, 15, 16, 17, 18, 19, 20, 21, 22, 22A:
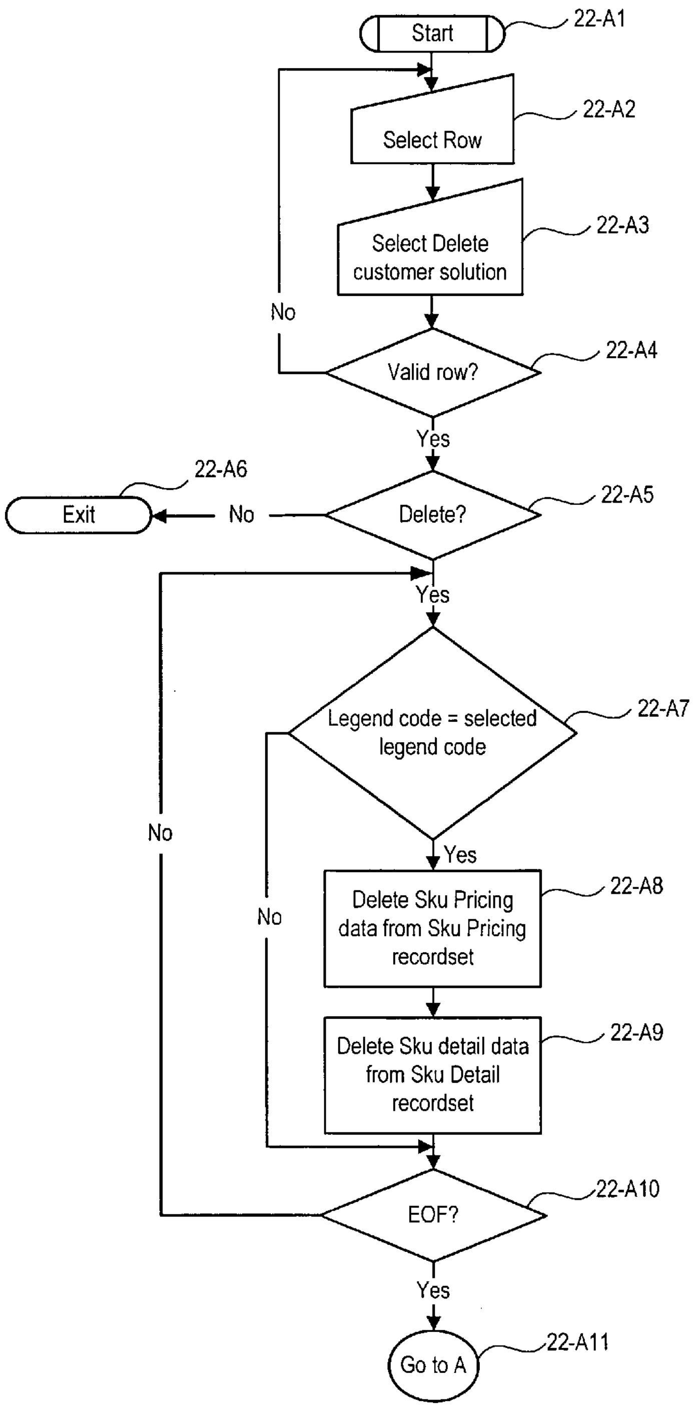
Figures 5, 6, 7, 8, 9, 10, 11, 12, 13, 14, 15, 16, 17, 18, 19, 20, 21, 22, 22B:
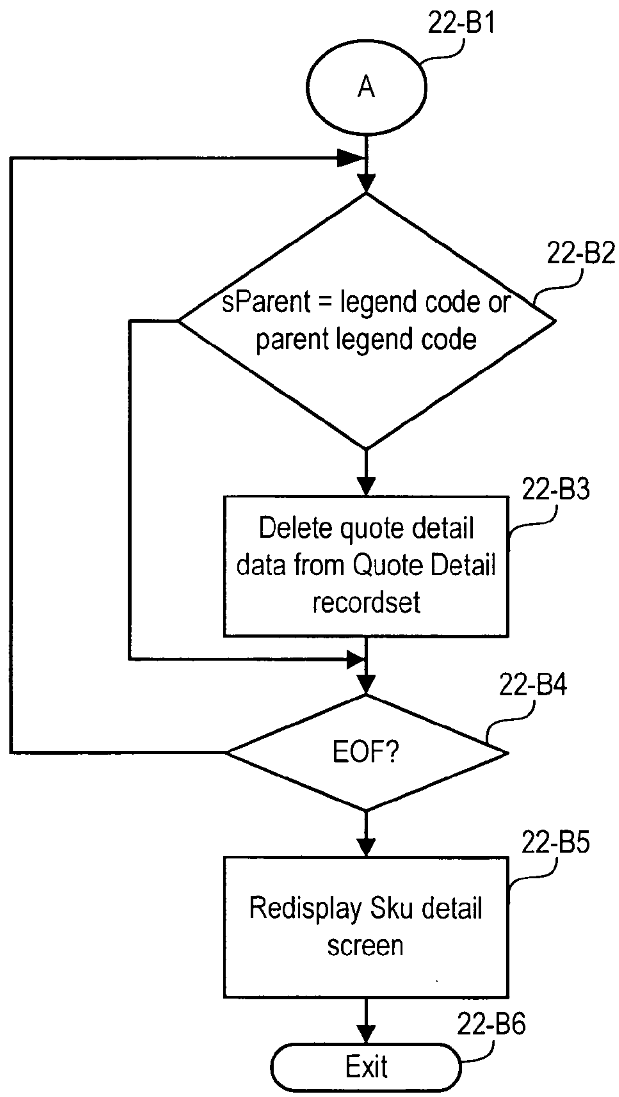
Figure 6:
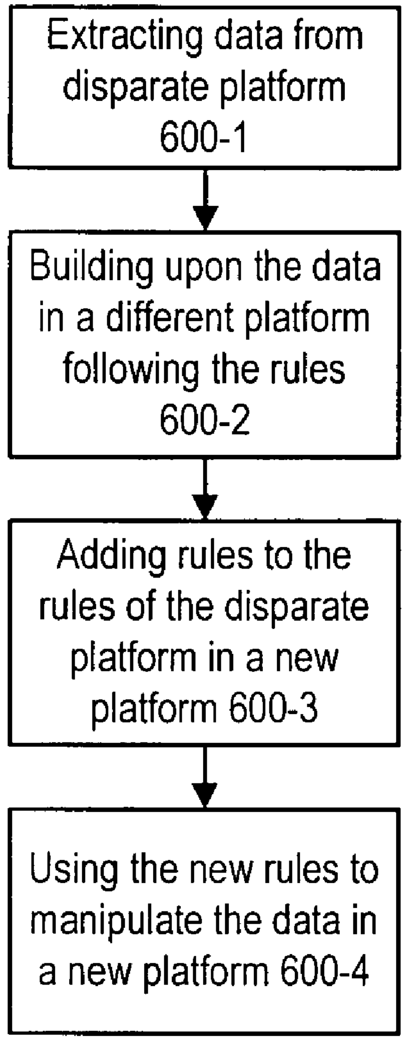
Figure 6A:
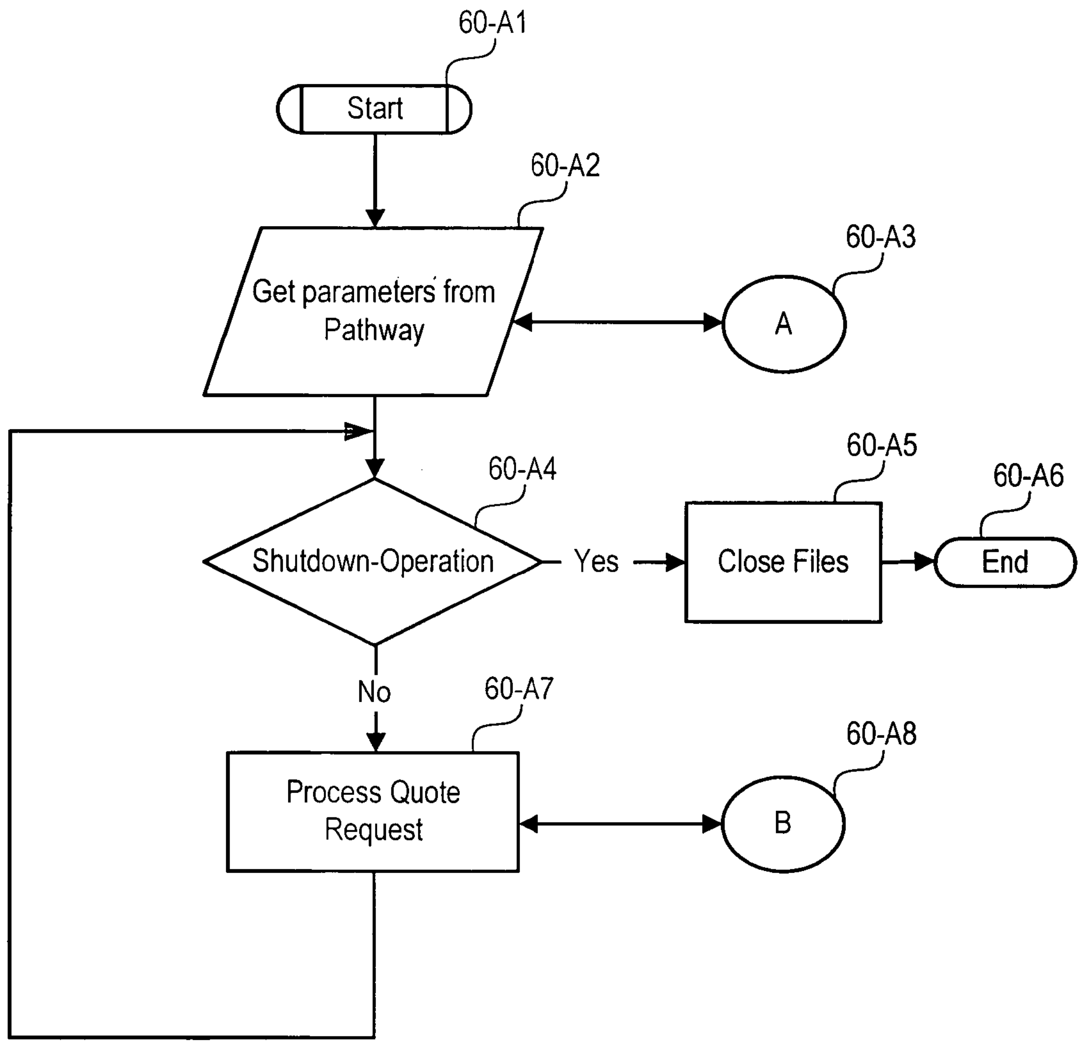
Figure 6B:
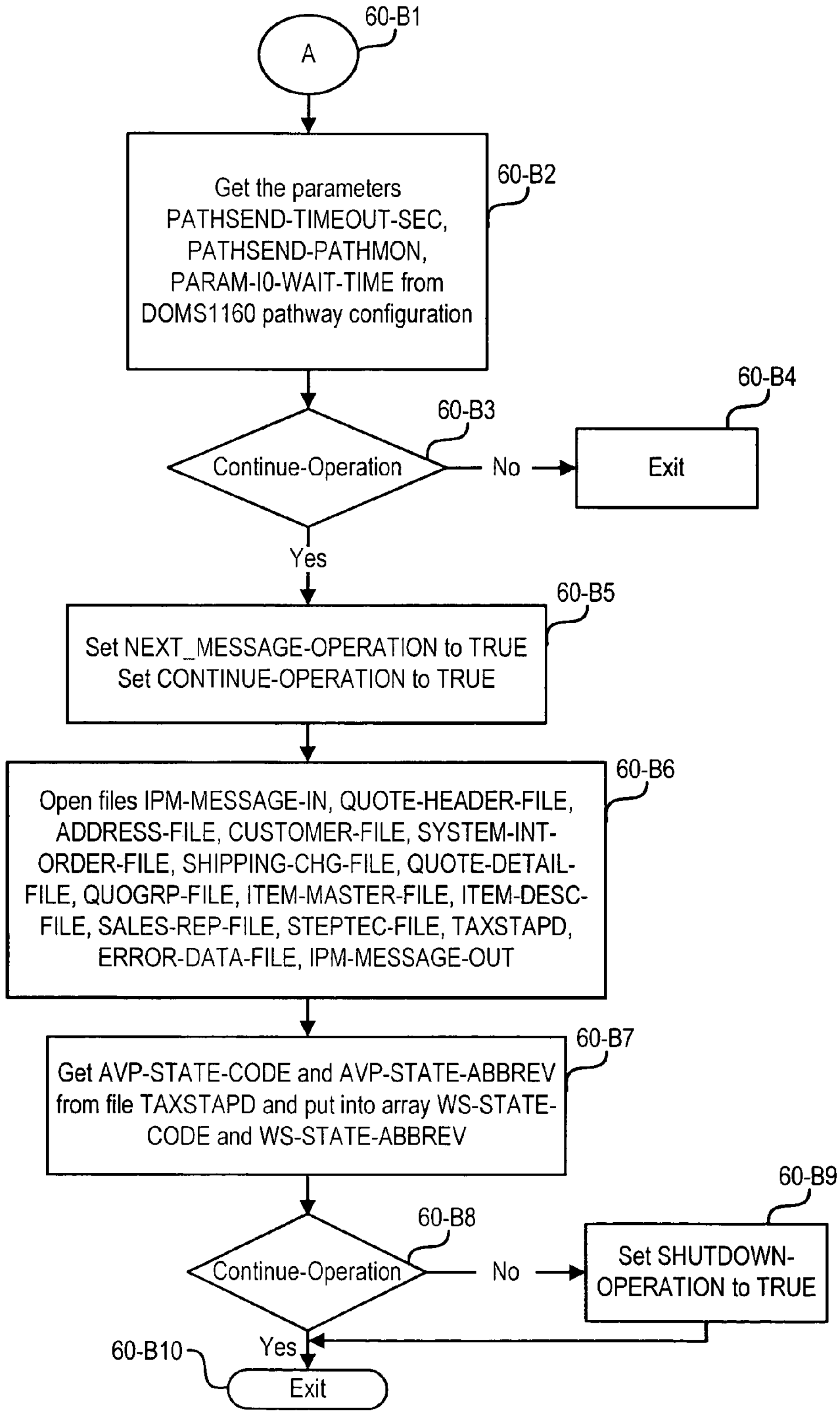
Figure 6C:
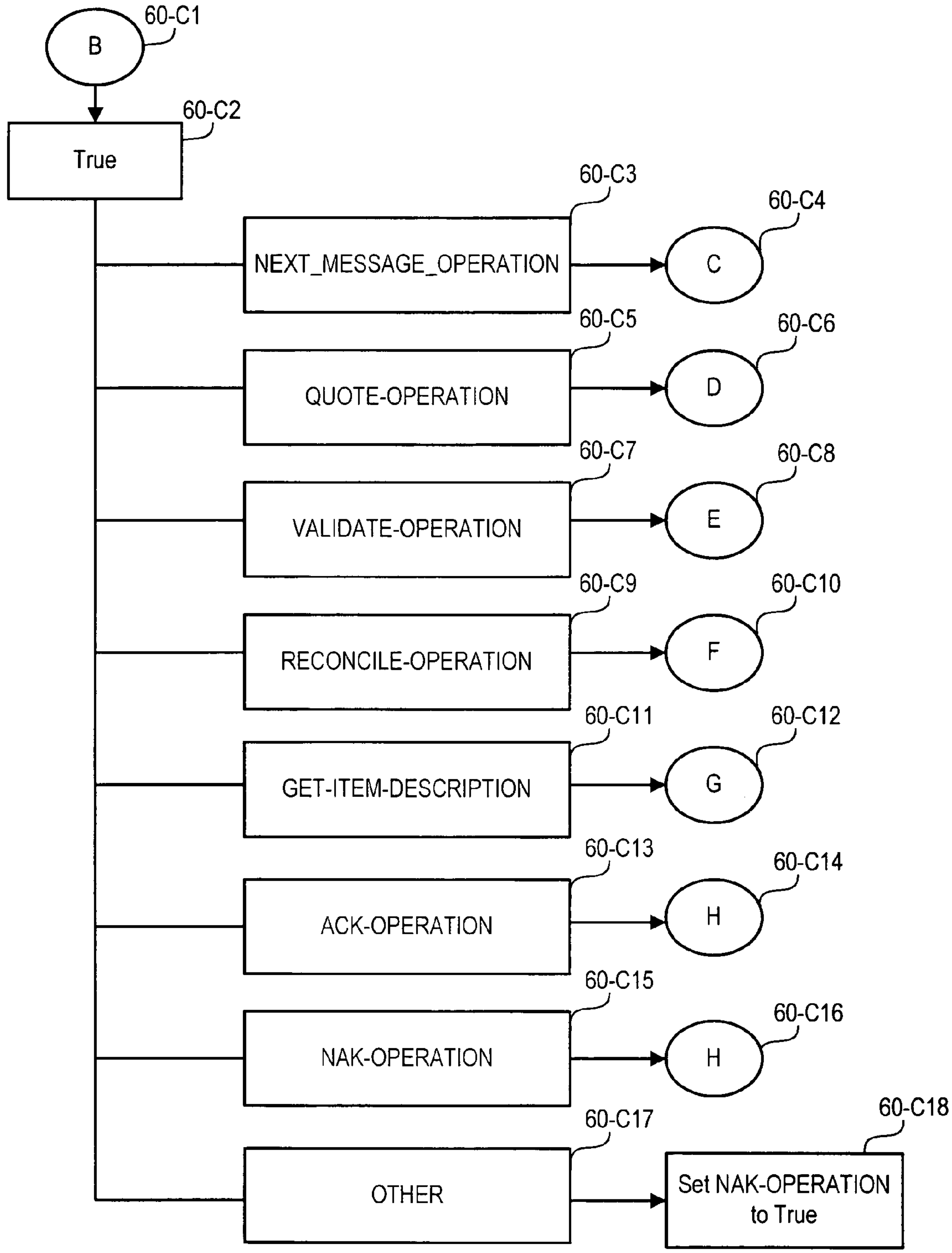
Figure 6D:
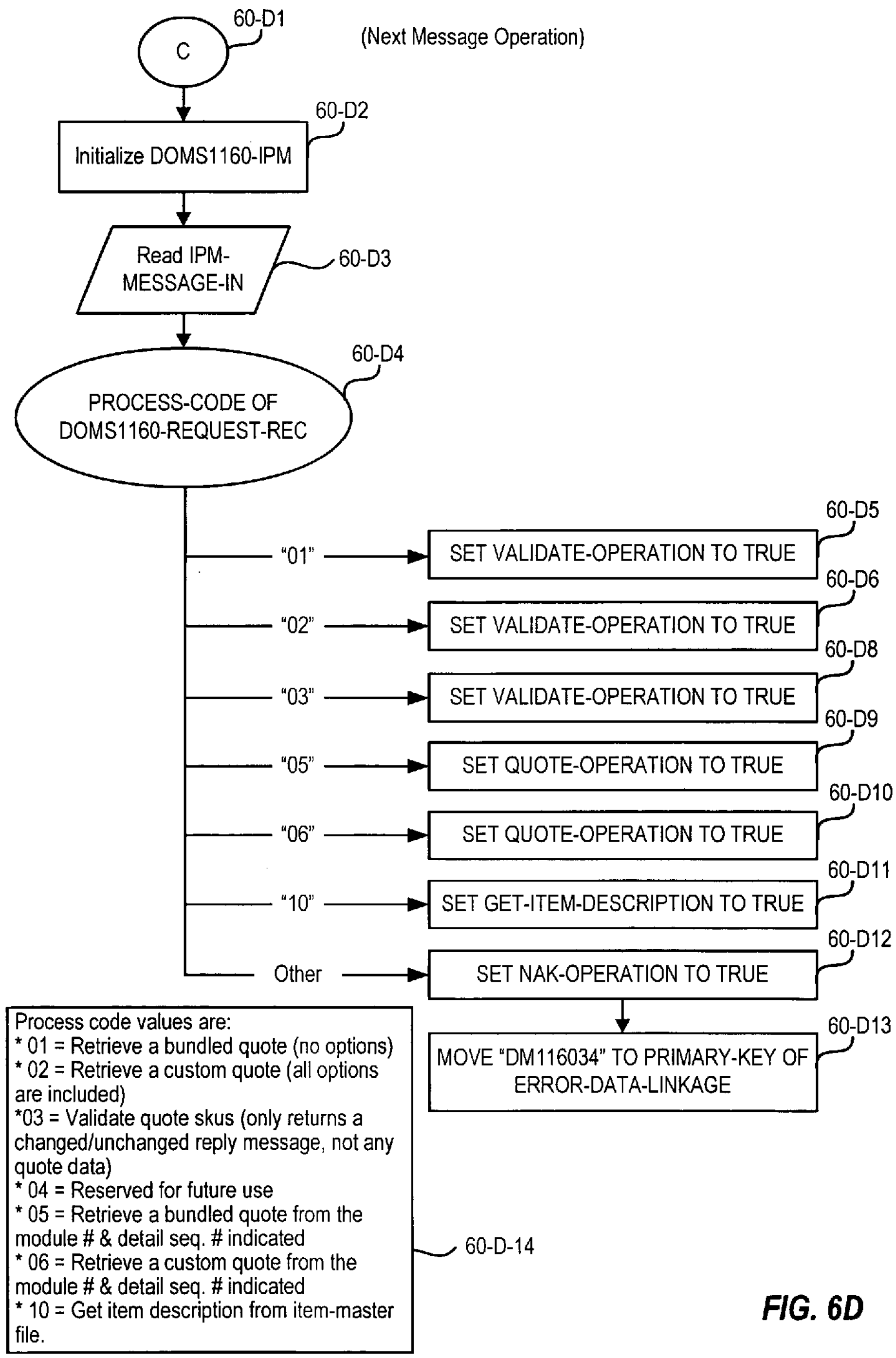
Figure 6E:
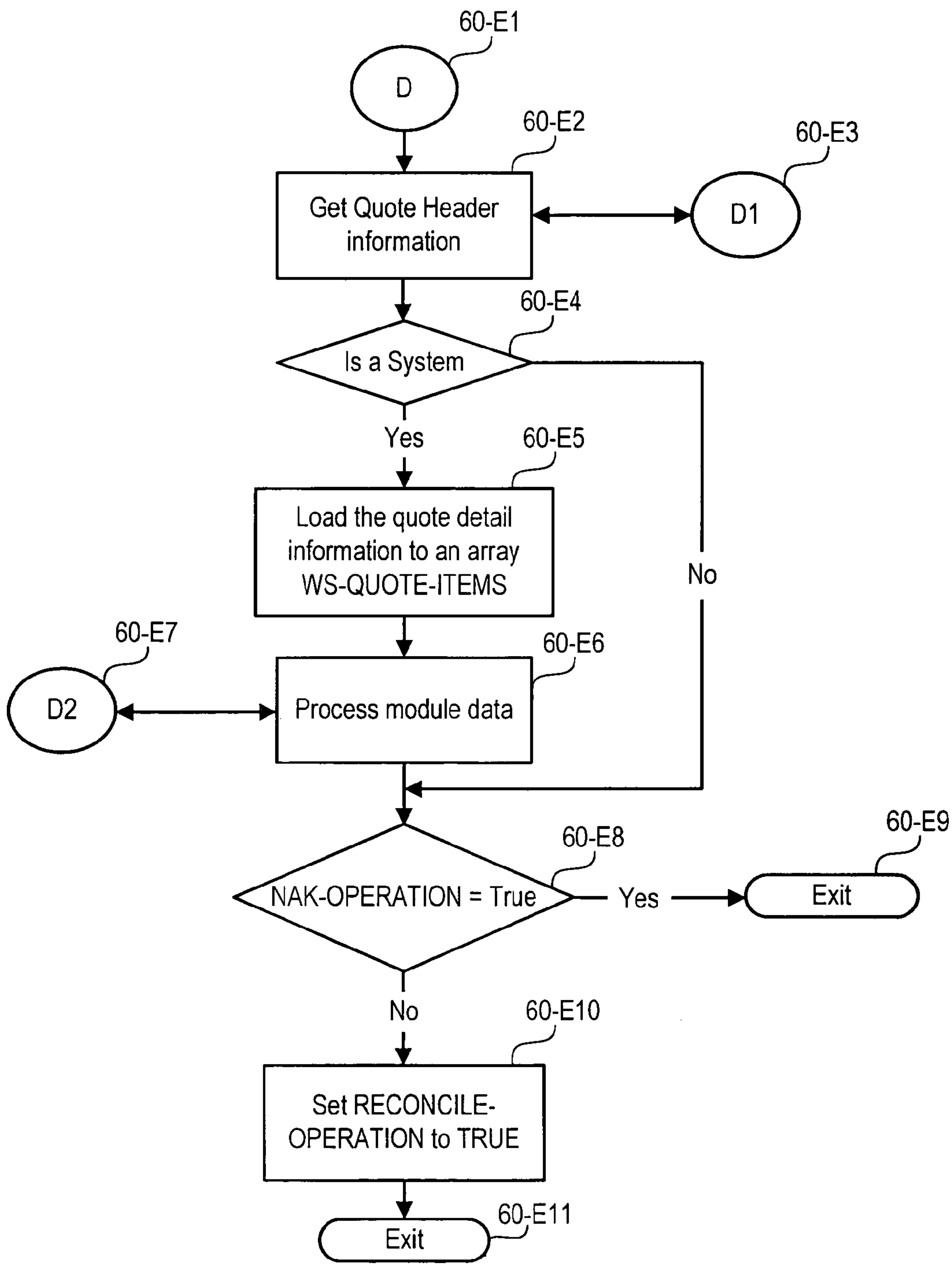
Figure 6F:
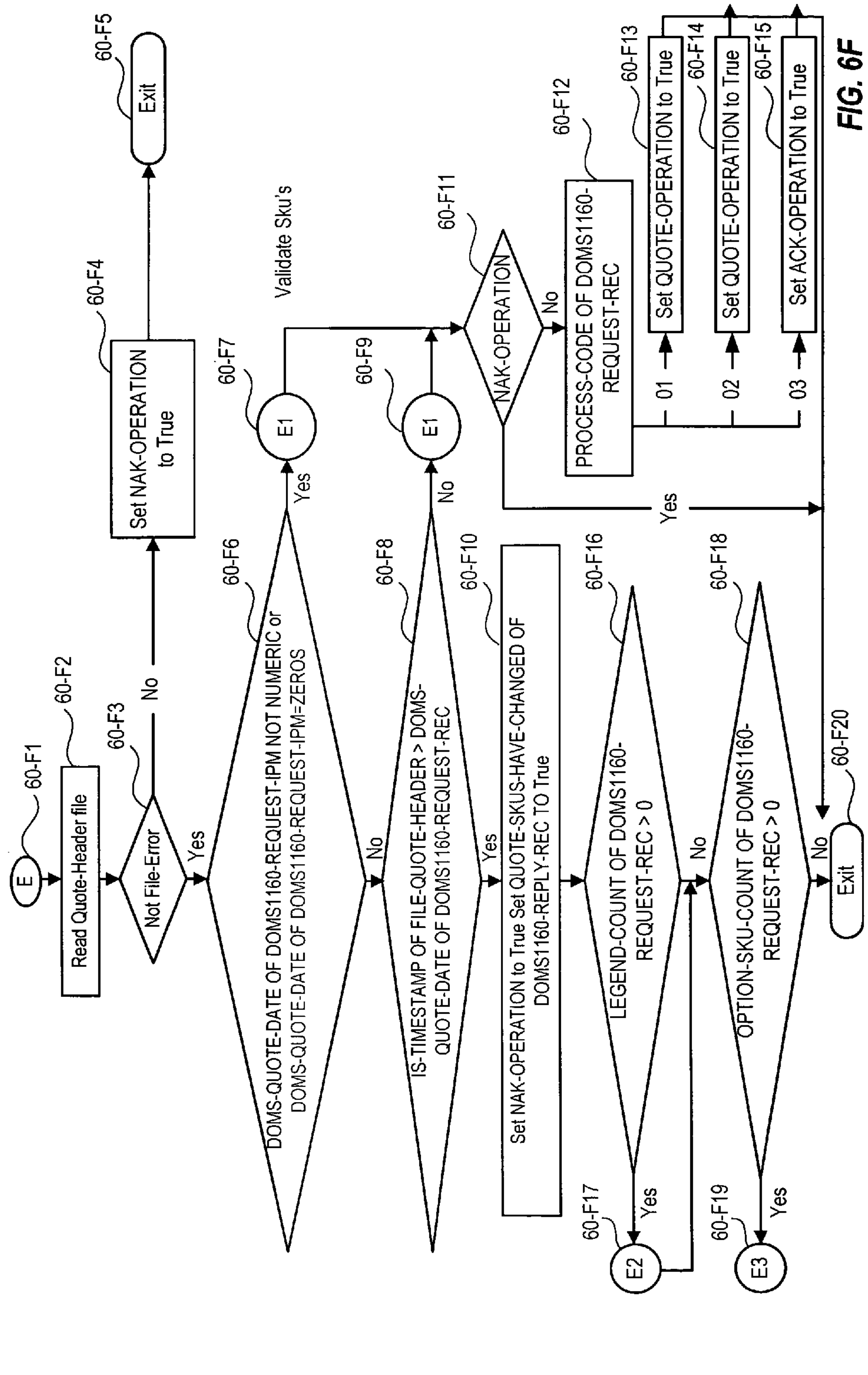
Figure 6G:
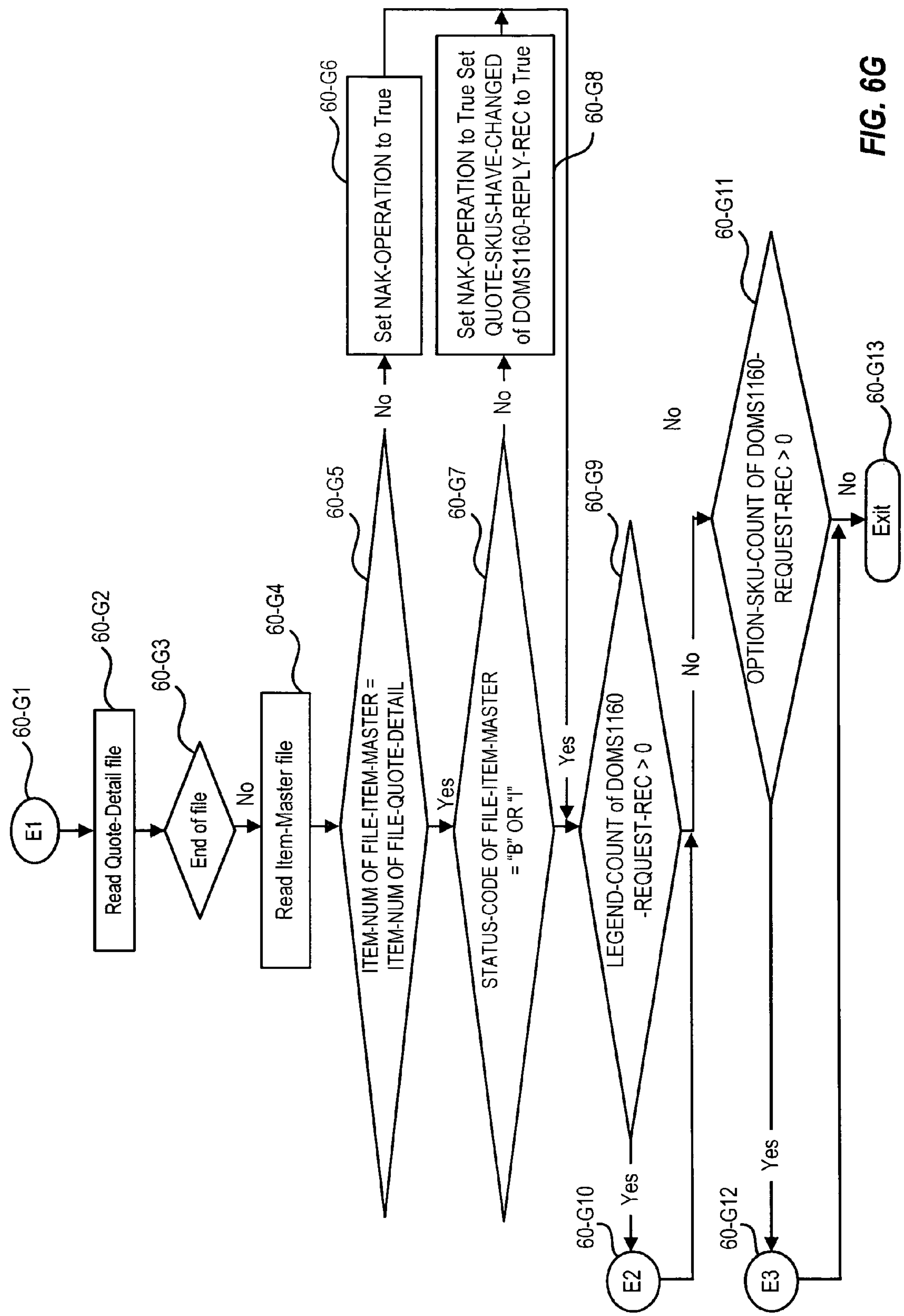
Figure 6H:
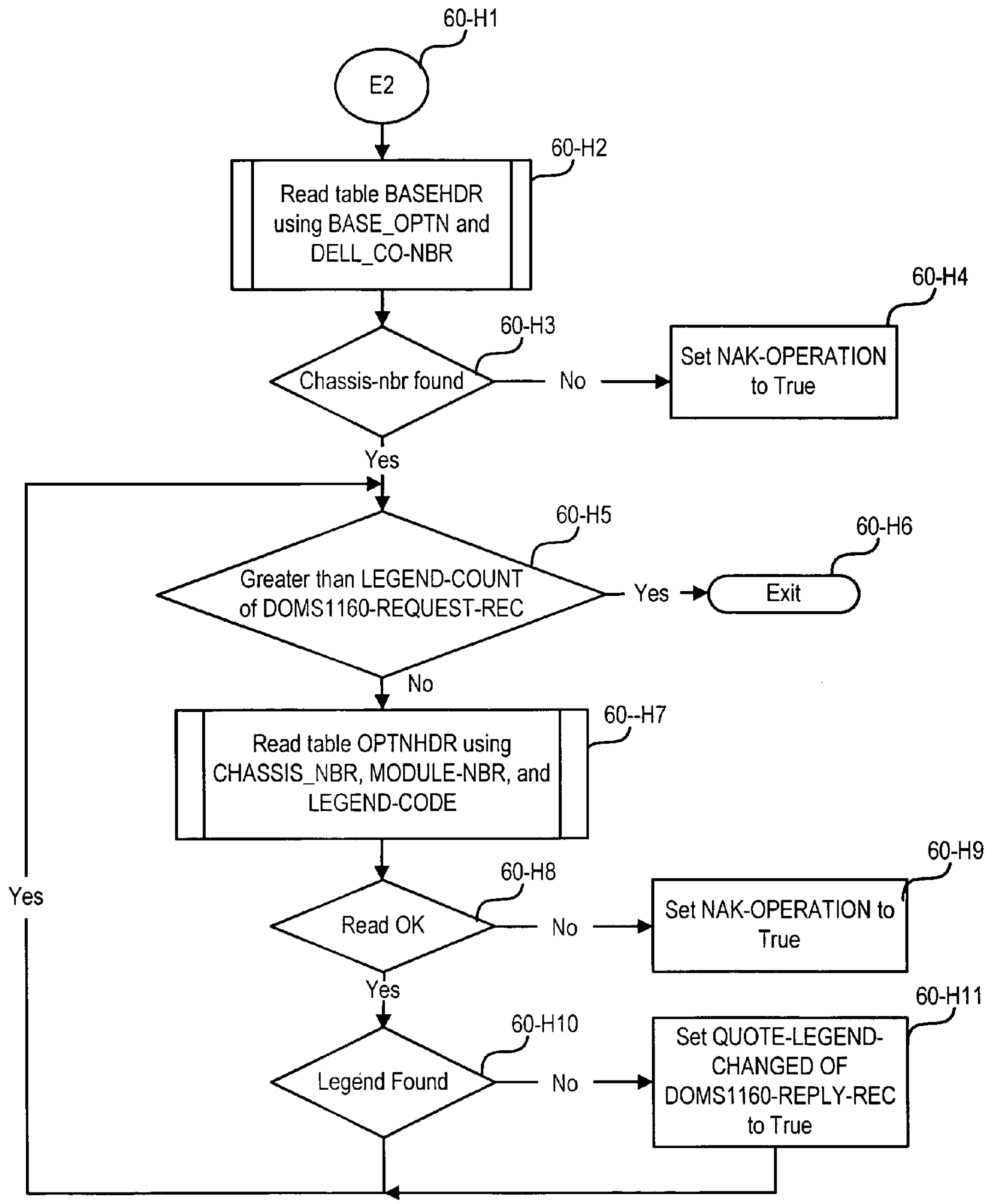
Figure 6I:
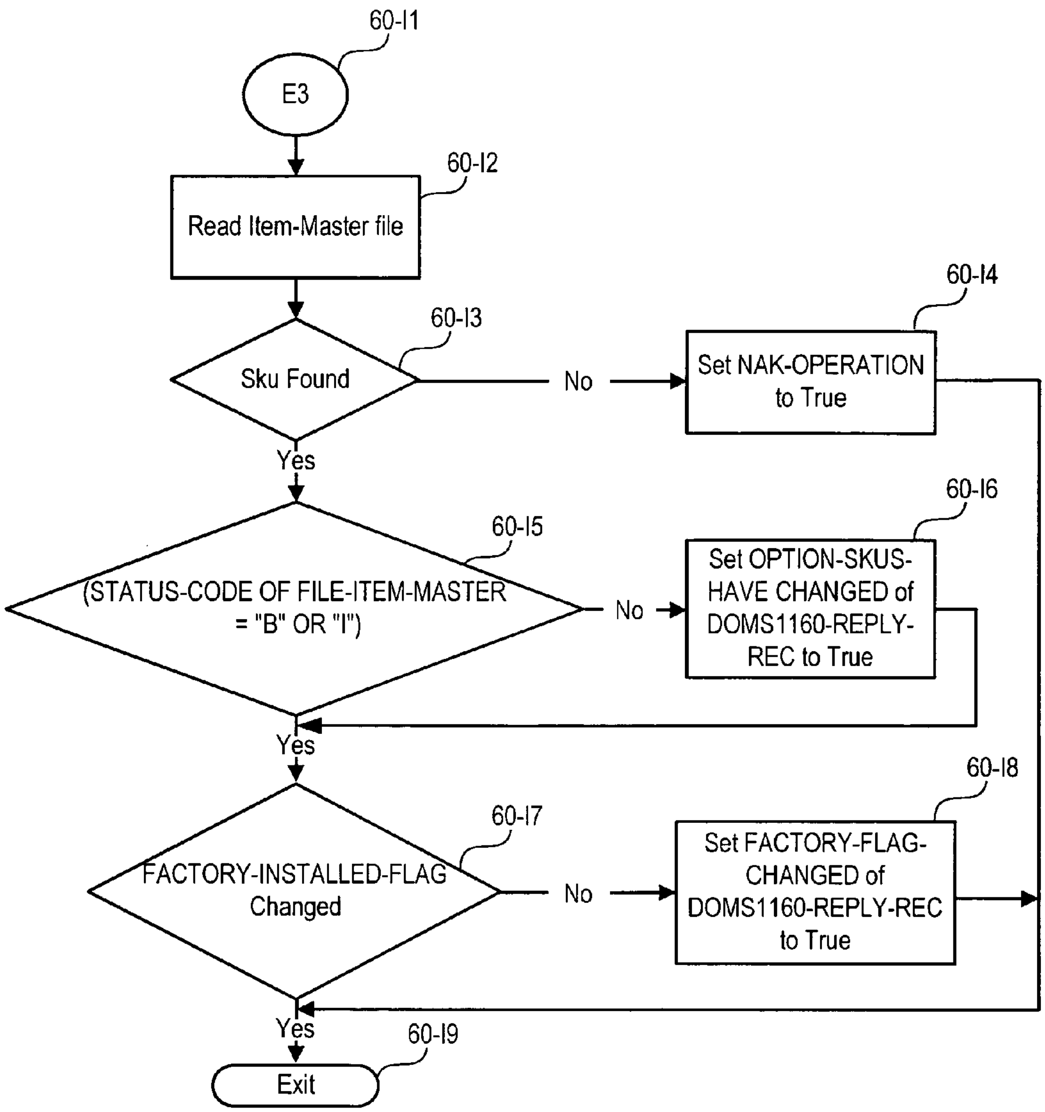
Figure 6J:
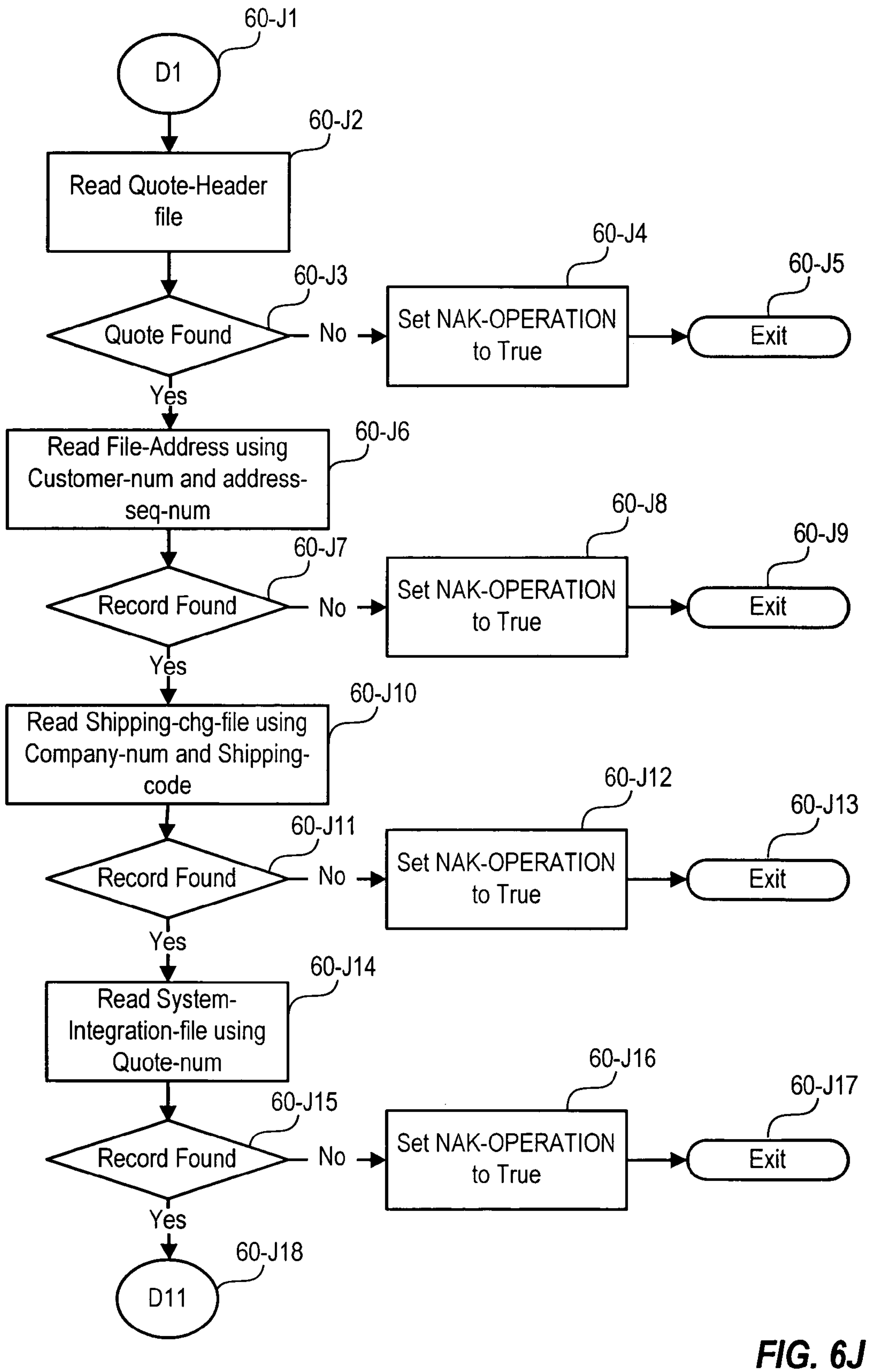
Figure 6K:
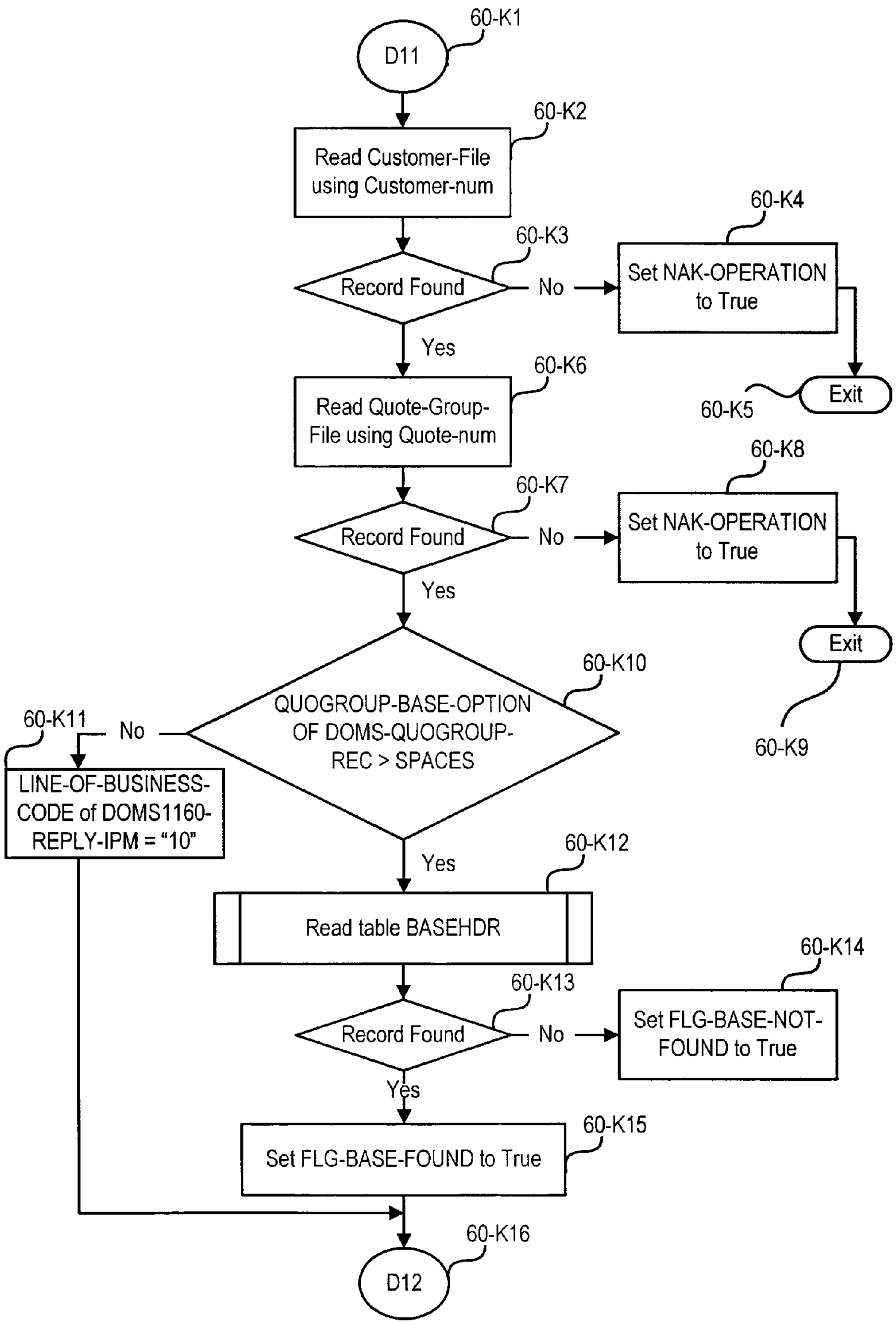
Figure 6M:
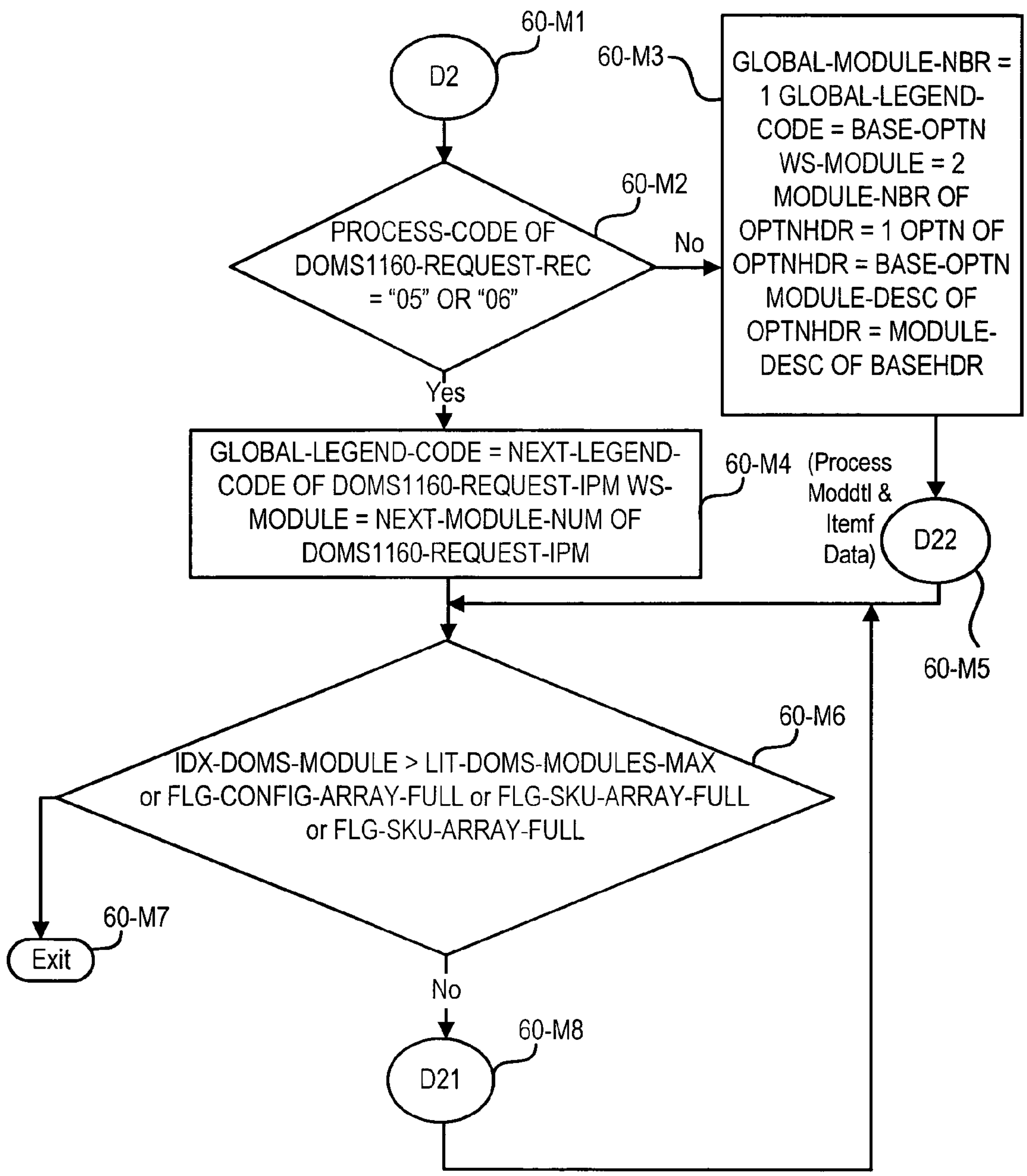
Figure 6N:
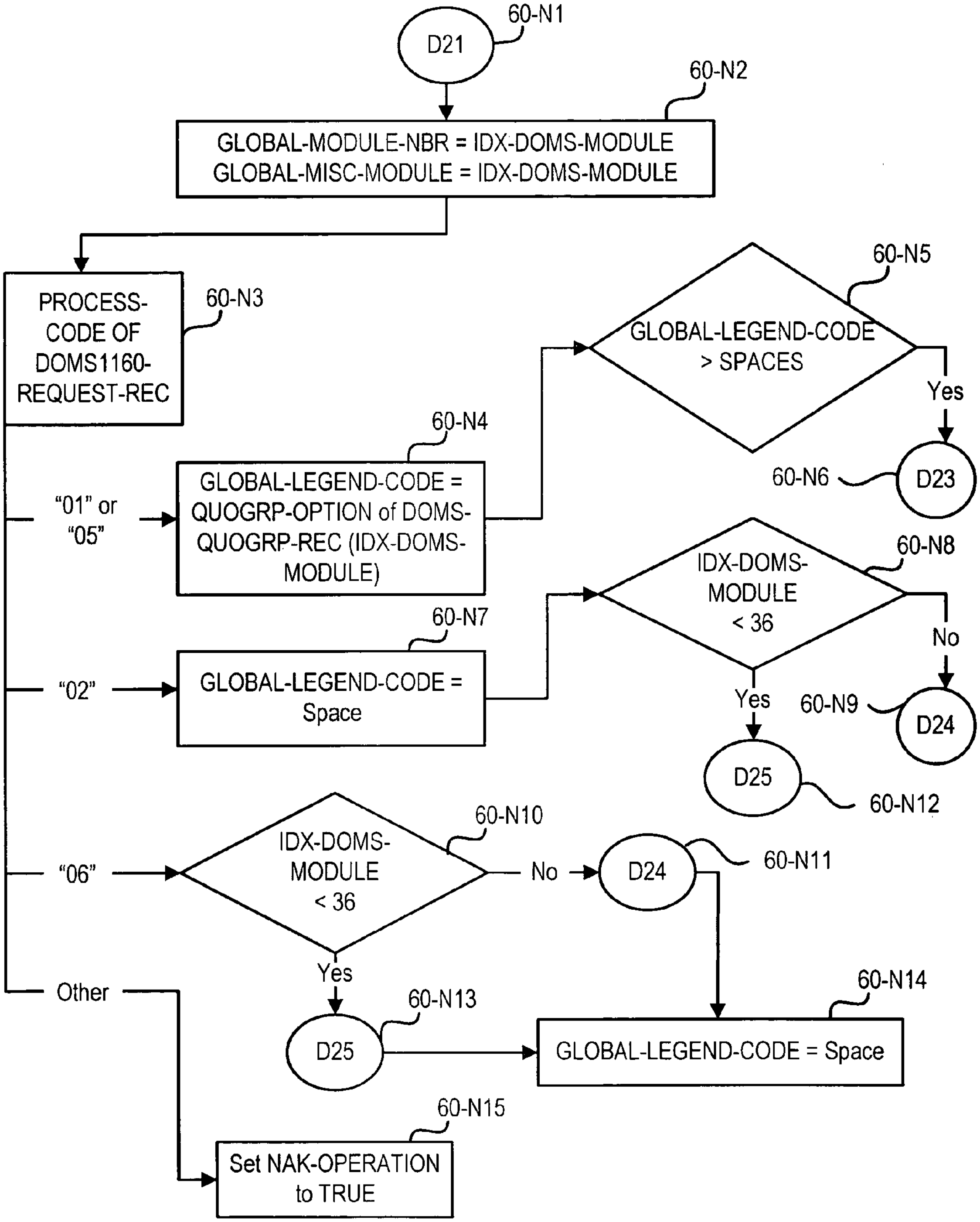
Figure 6O:
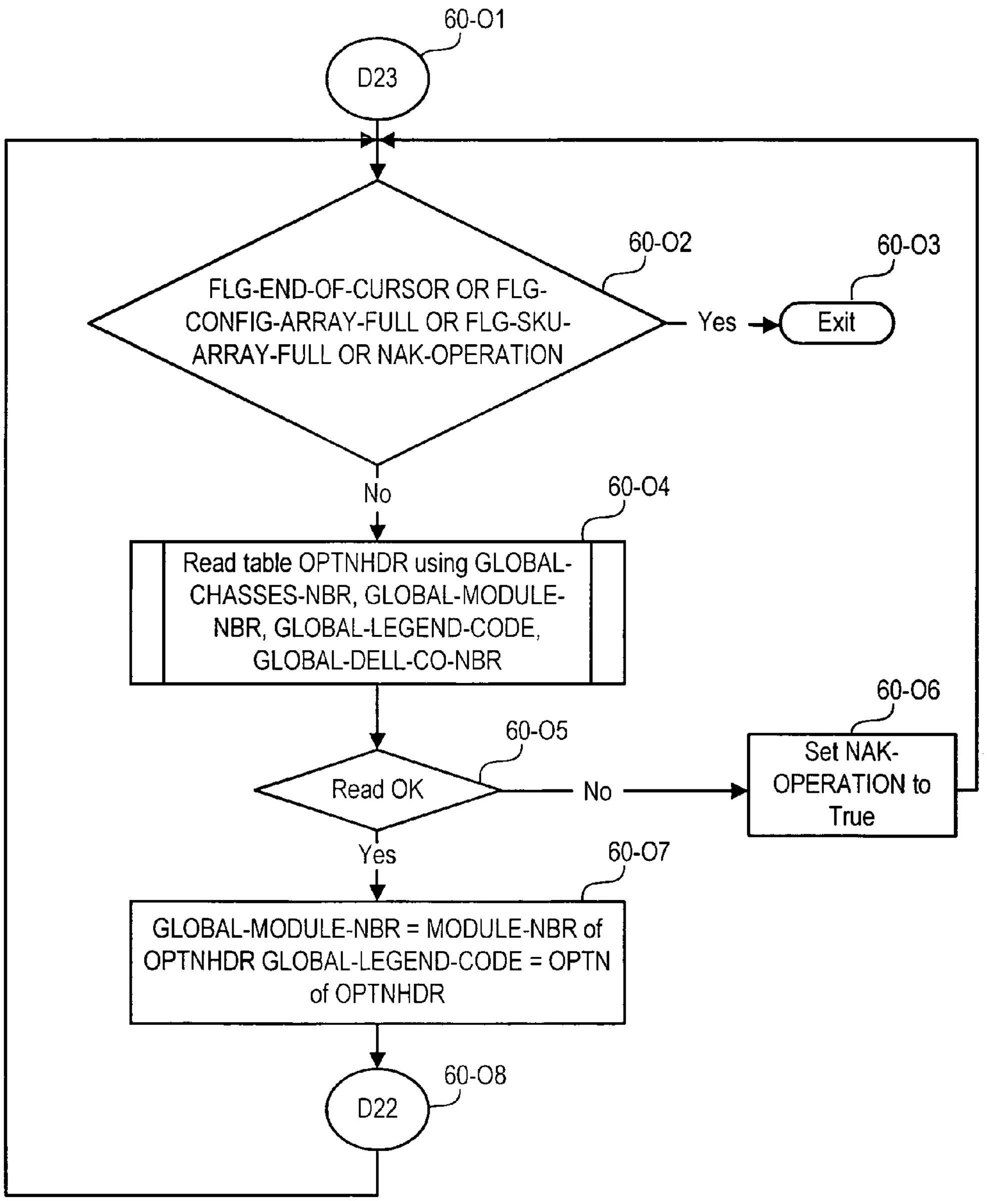
Figure 6P:
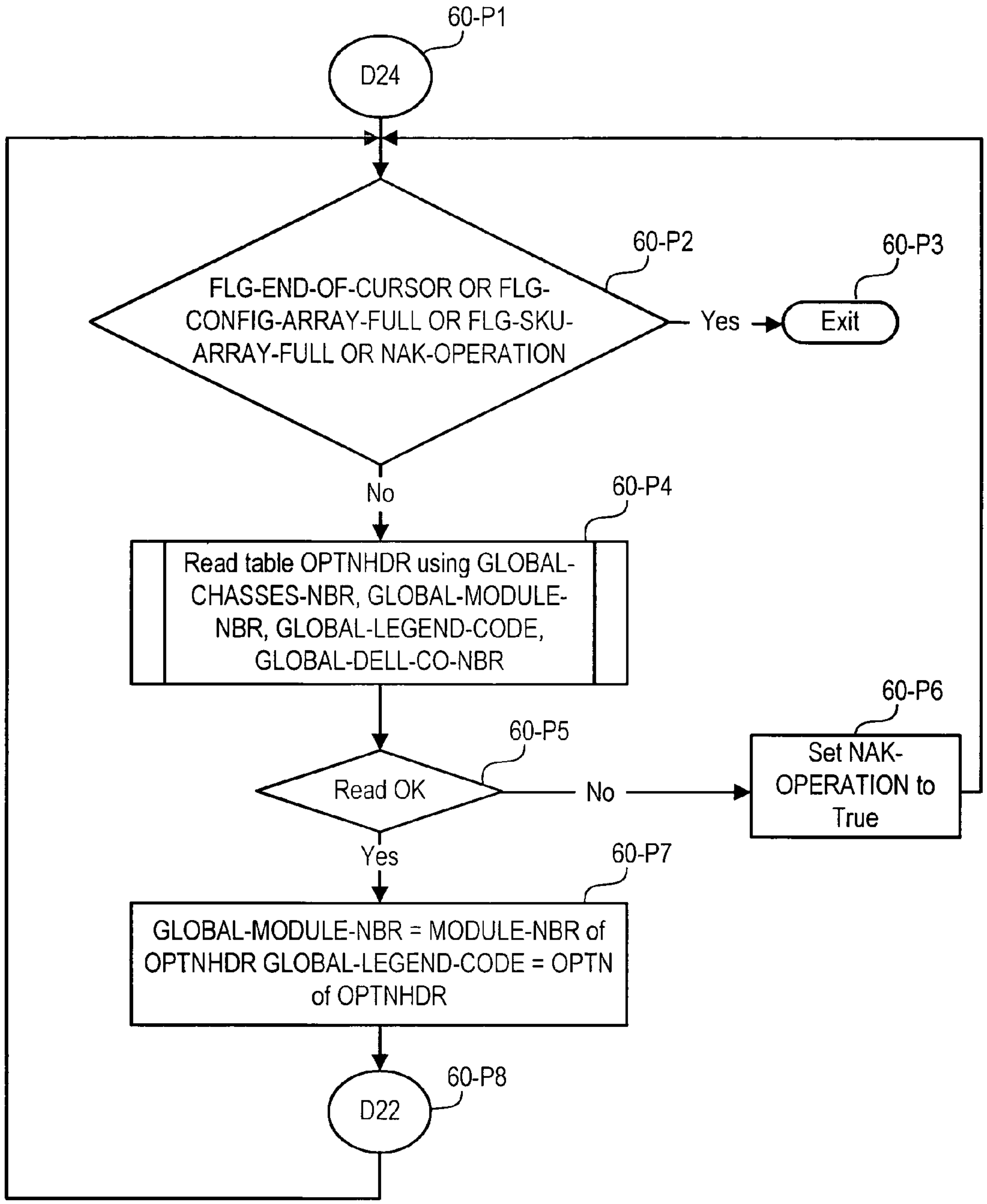
Figure 6Q:
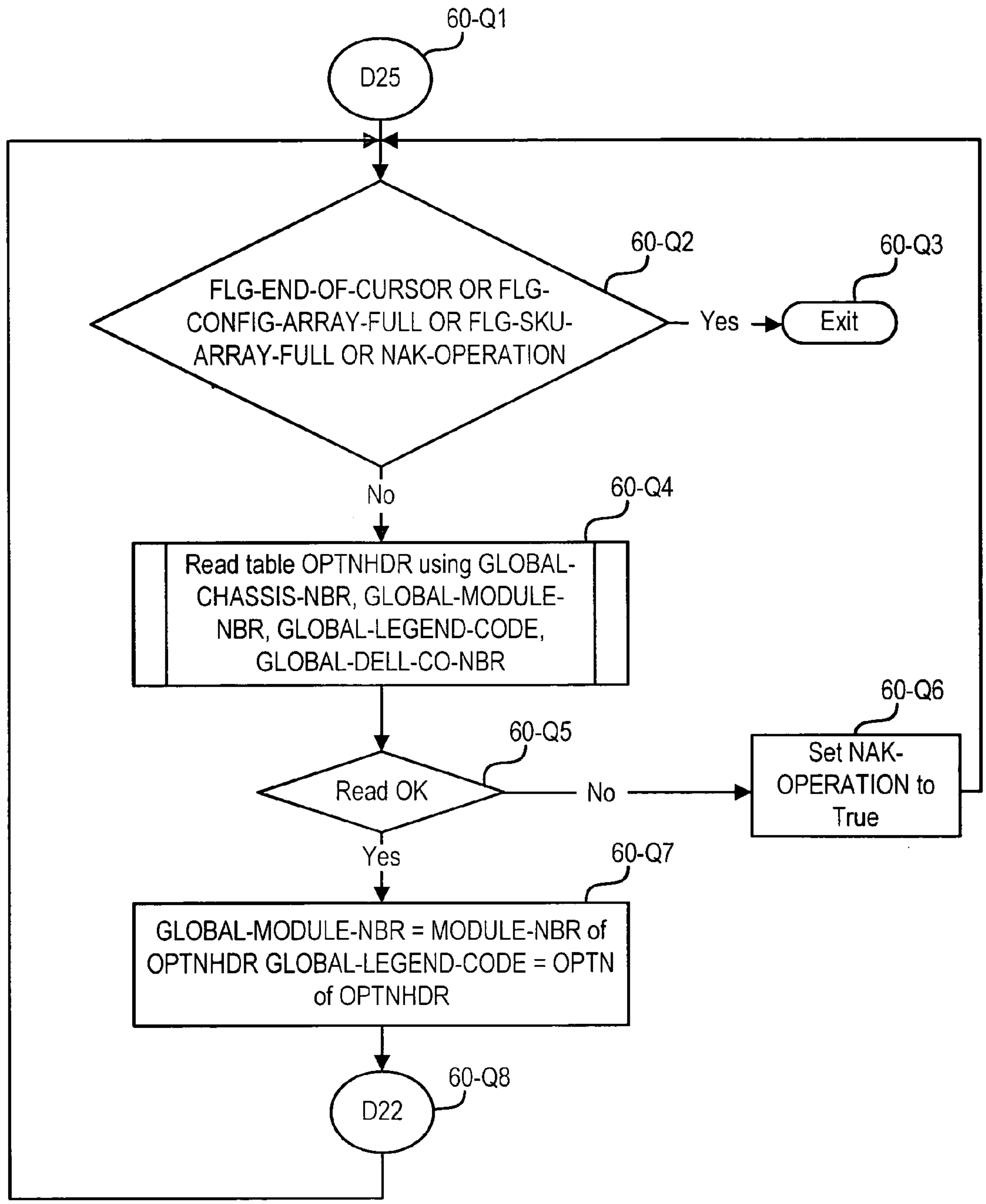
Figure 6R:
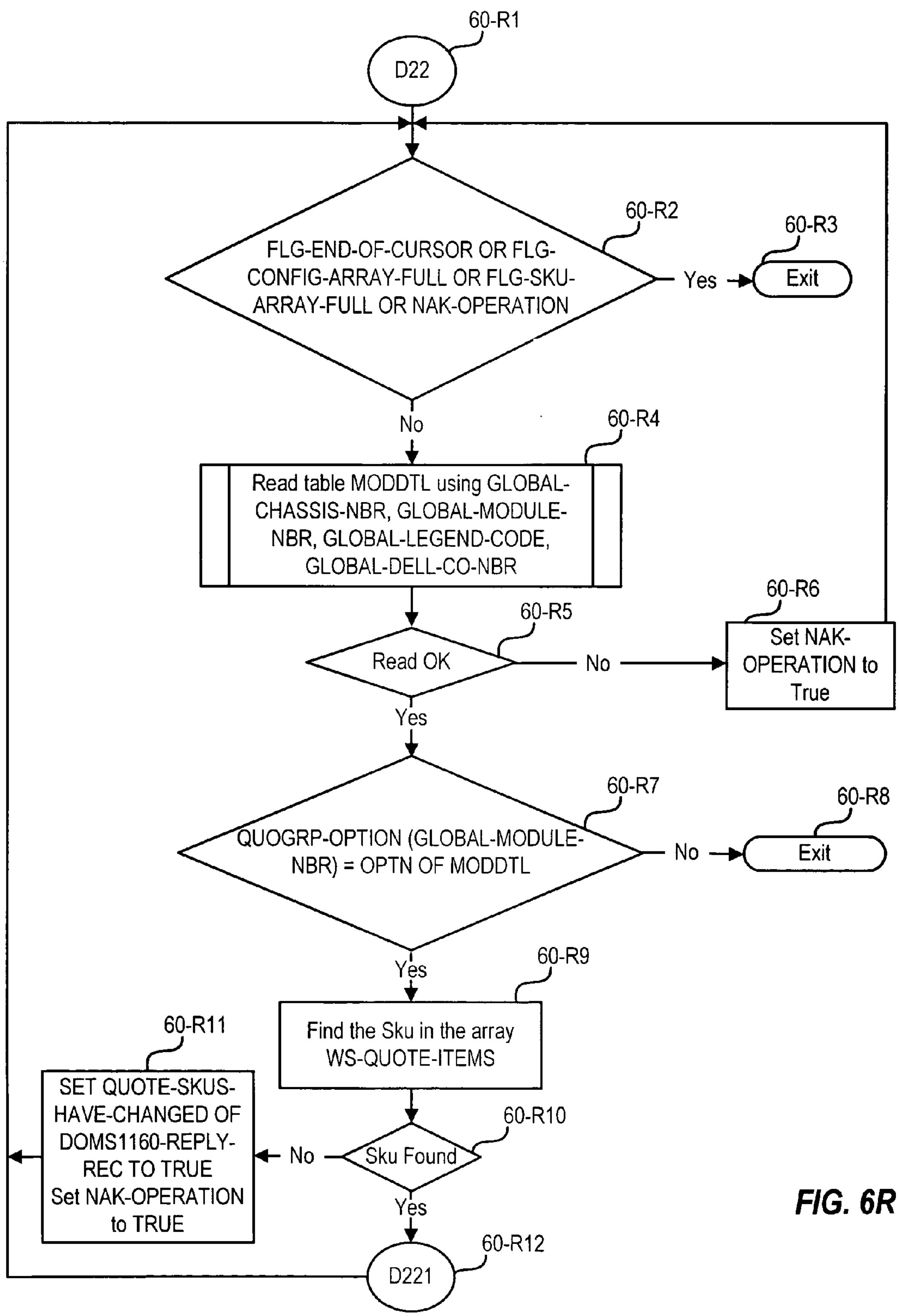
Figure 6S:
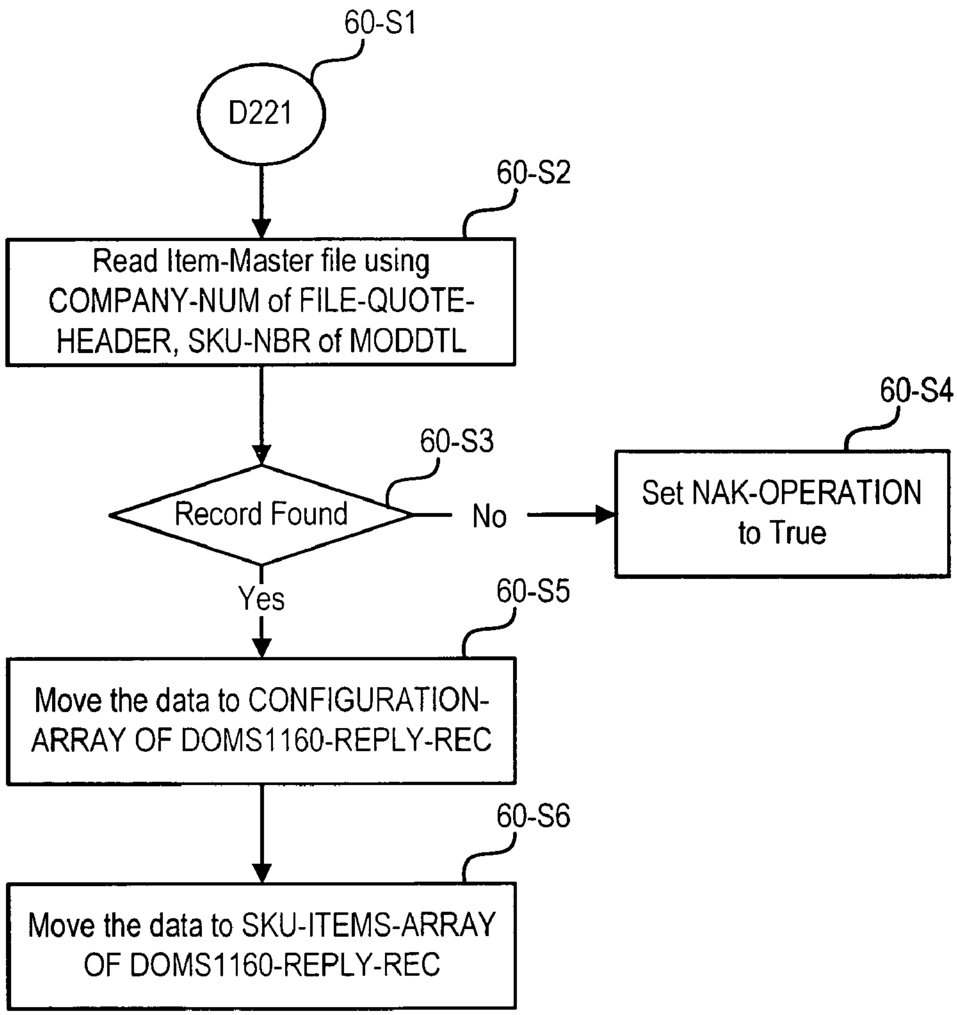
Figure 6T:
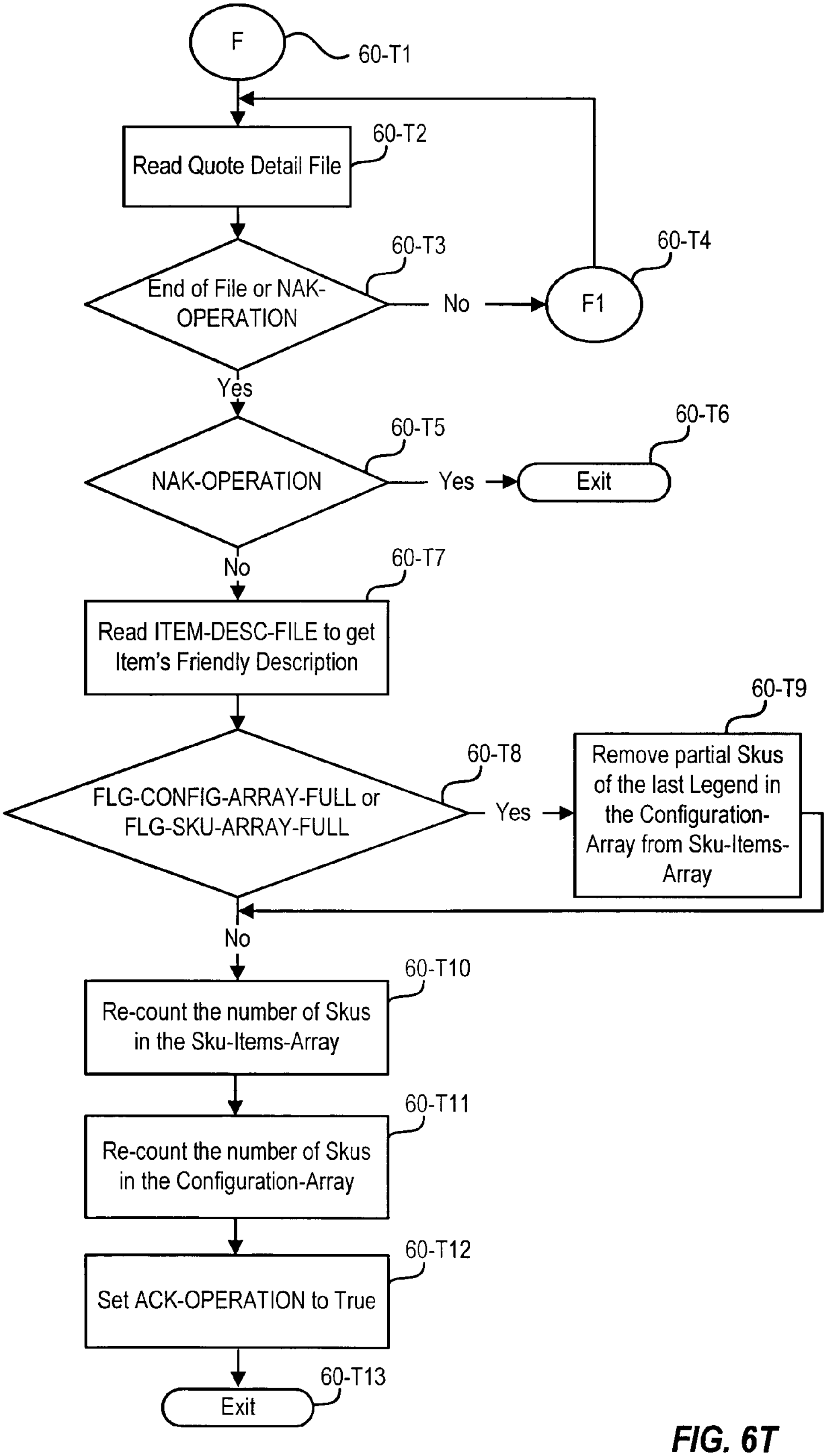
Figure 6U:
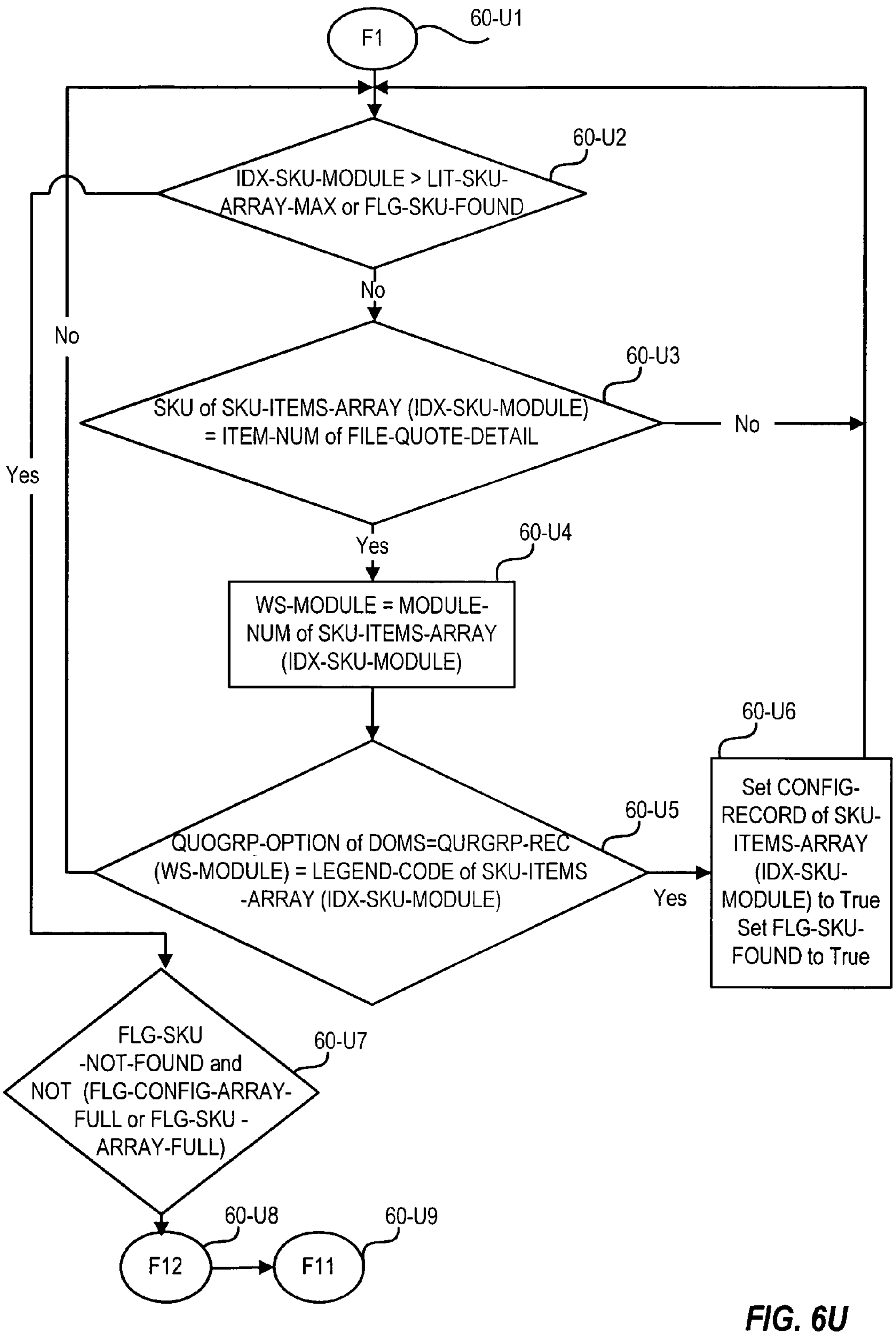
Figure 6V:
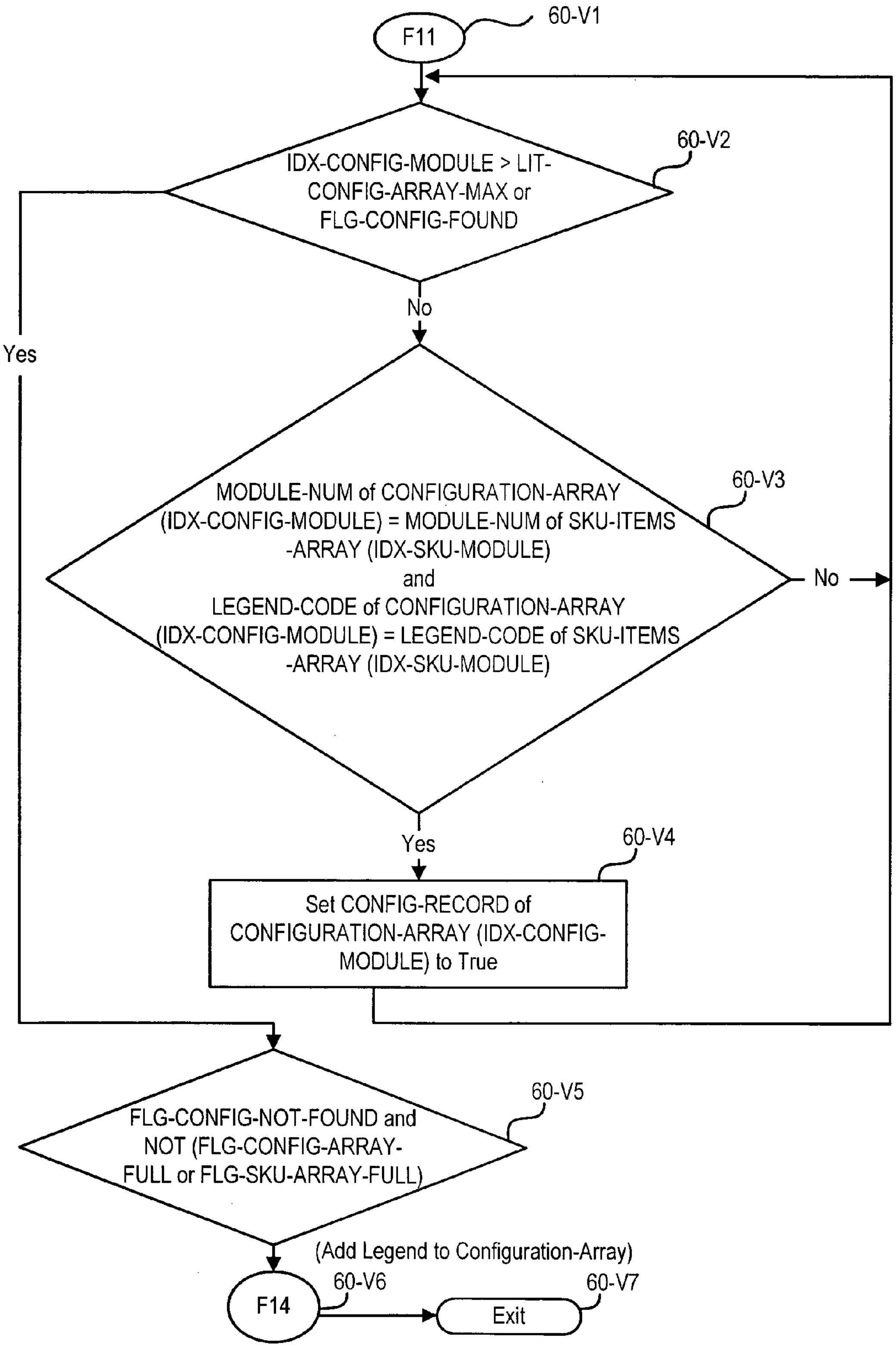
Figure 6W:
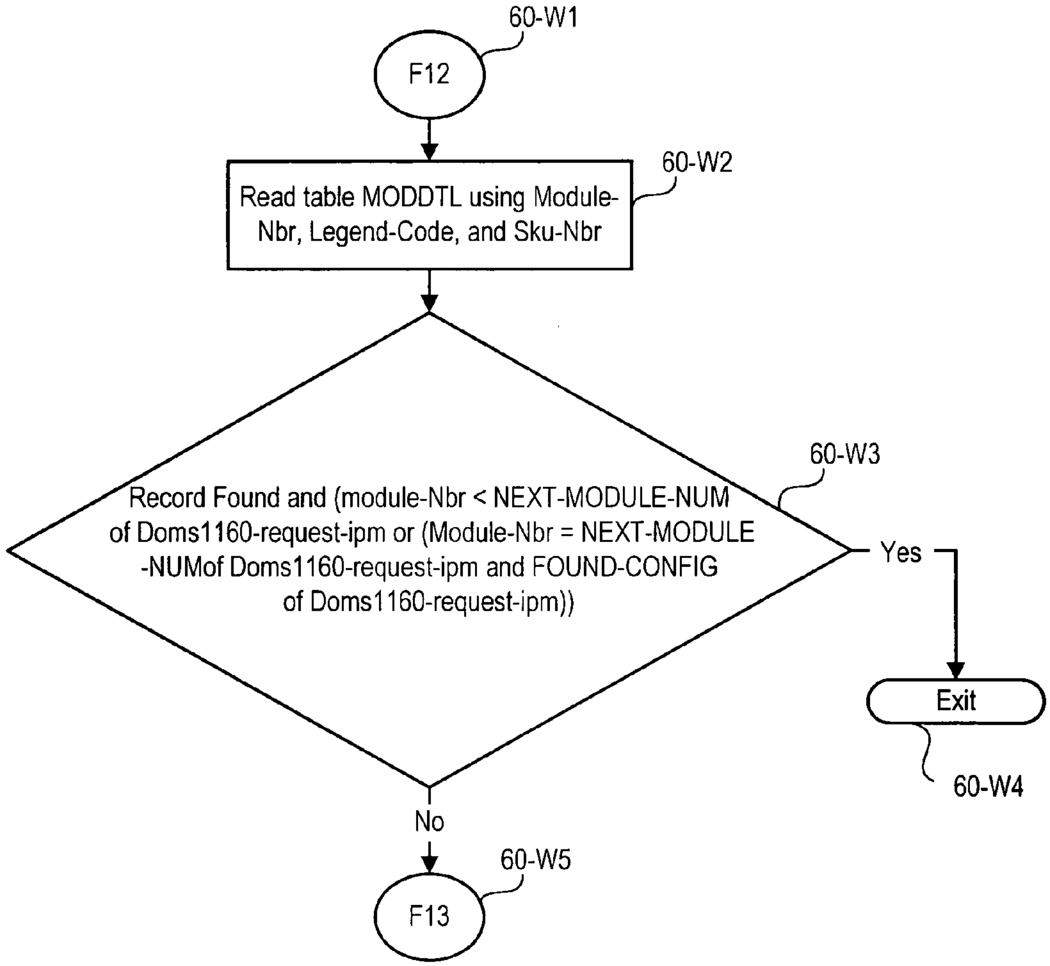
Figure 6X:
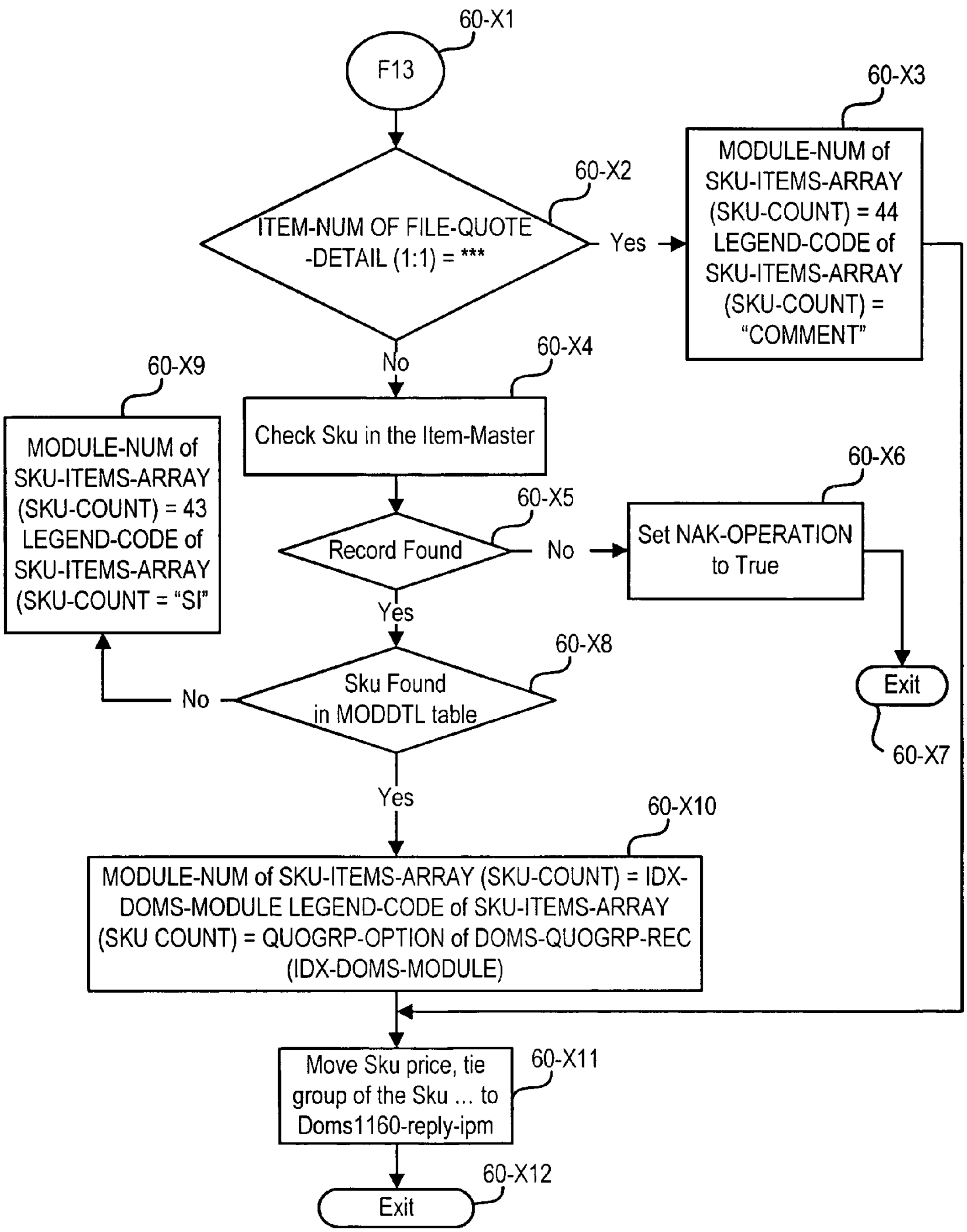
Figure 6Y:
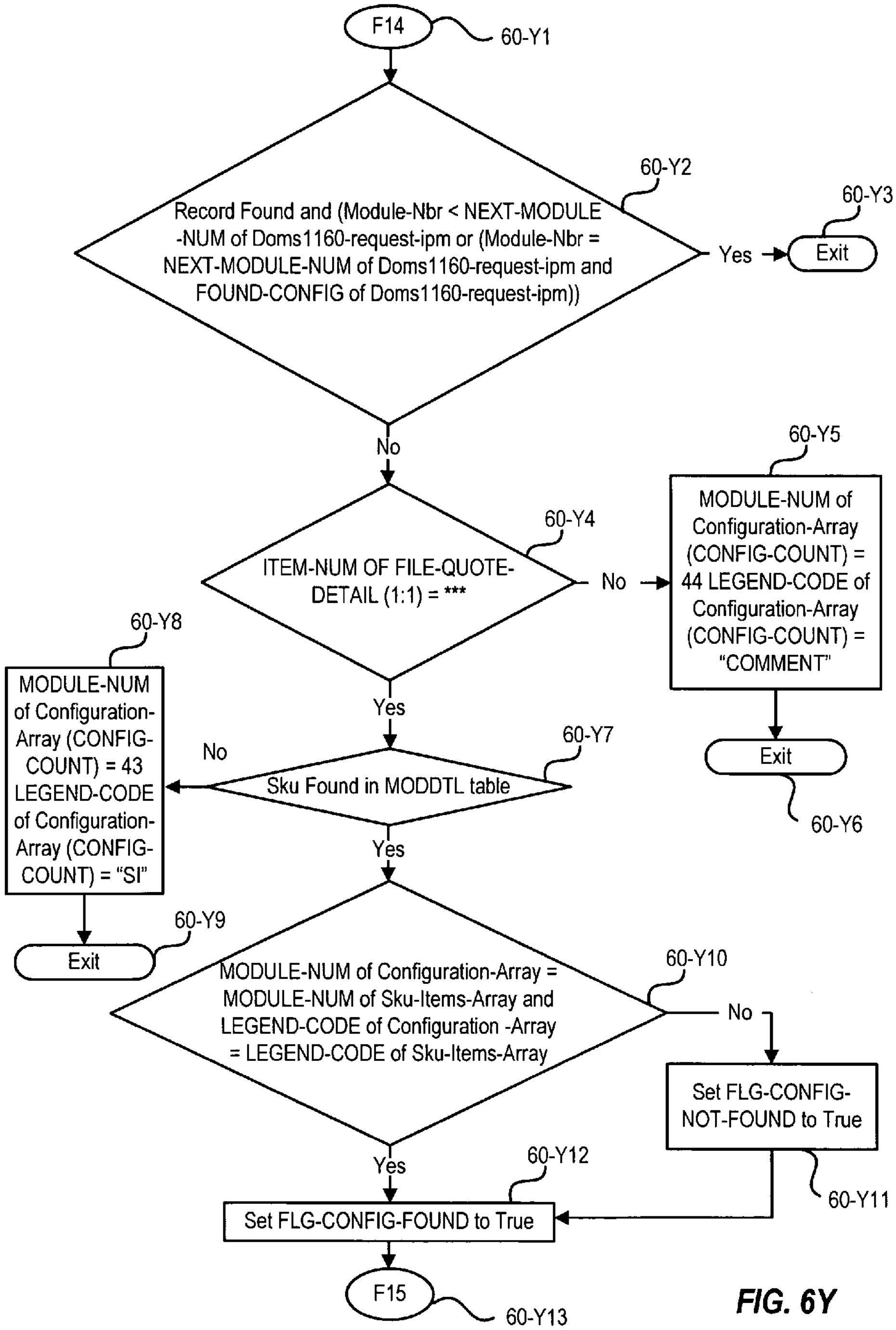
Figure 6Z:
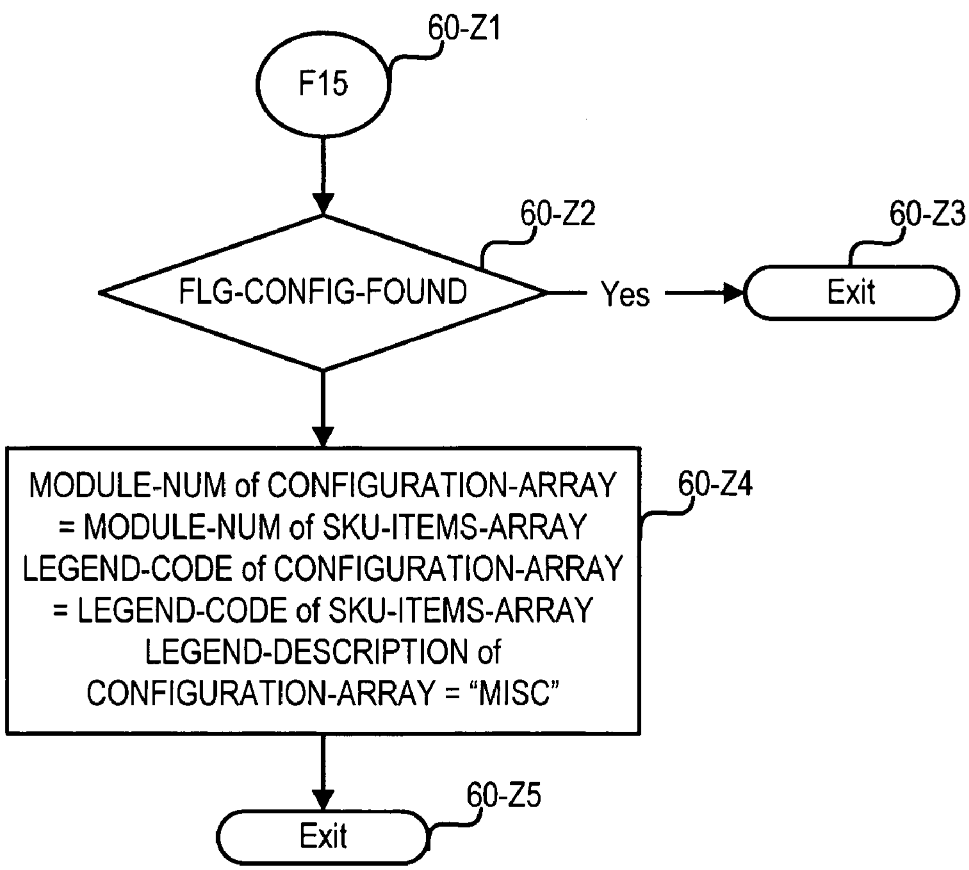
Figure 6A:
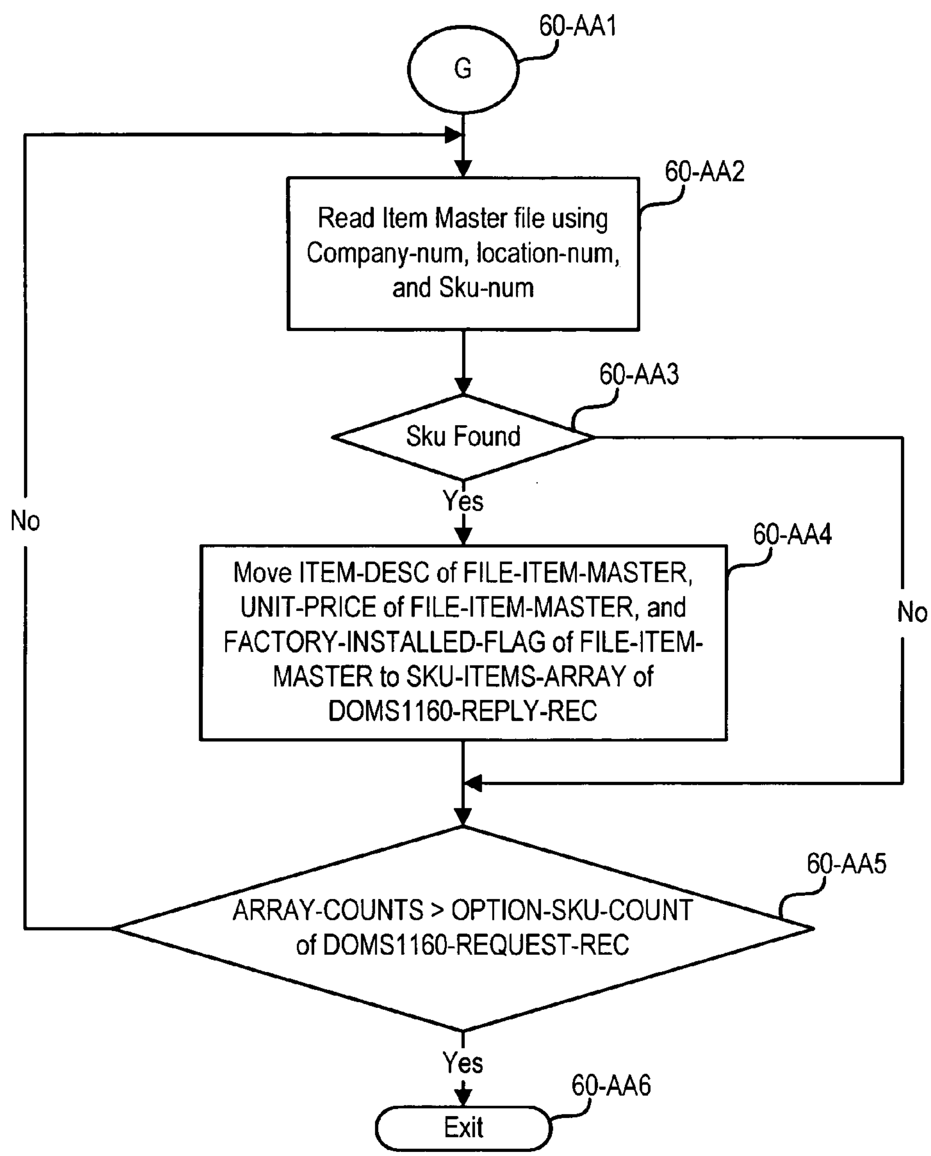
Figure 6B:
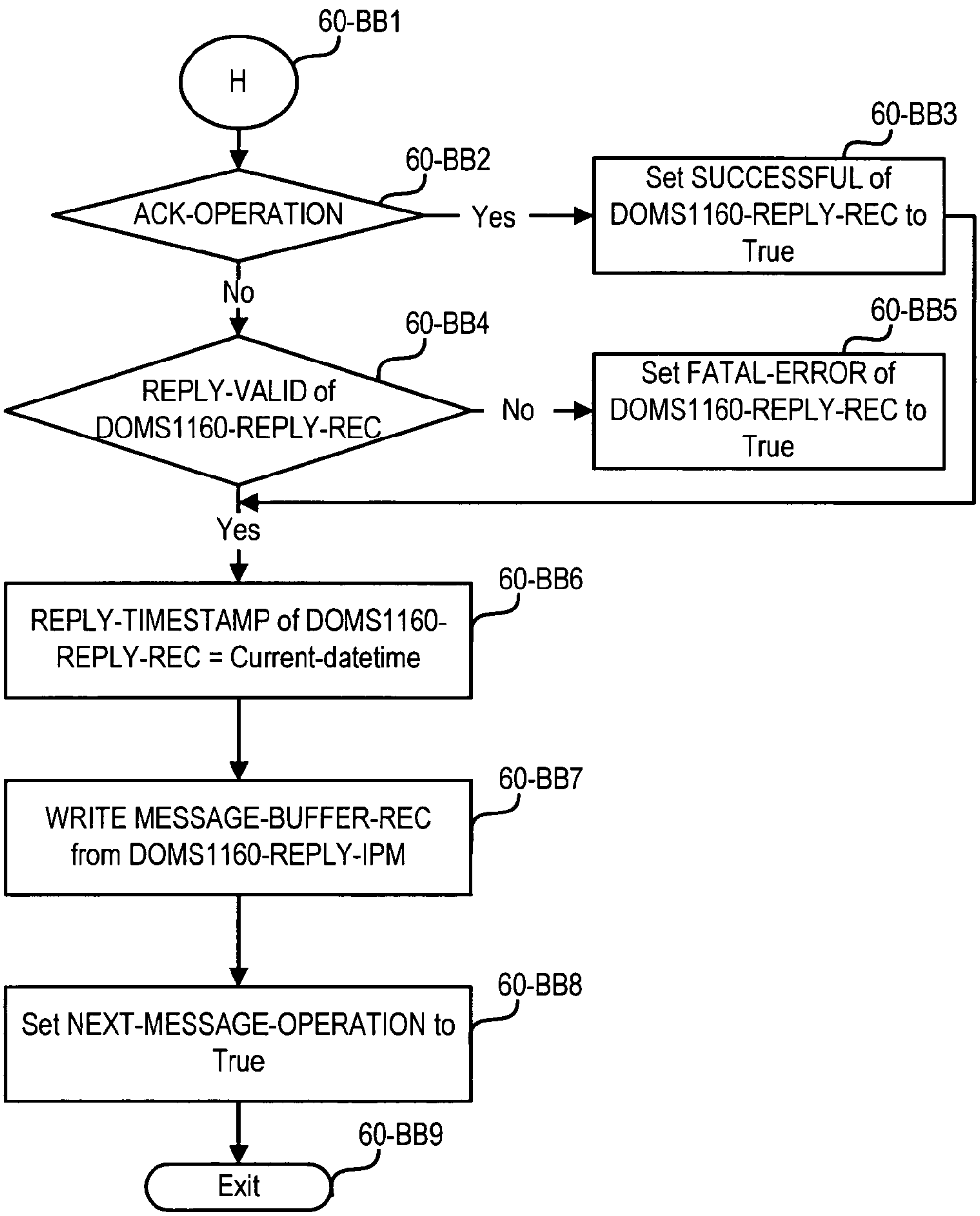
Figure 7A:
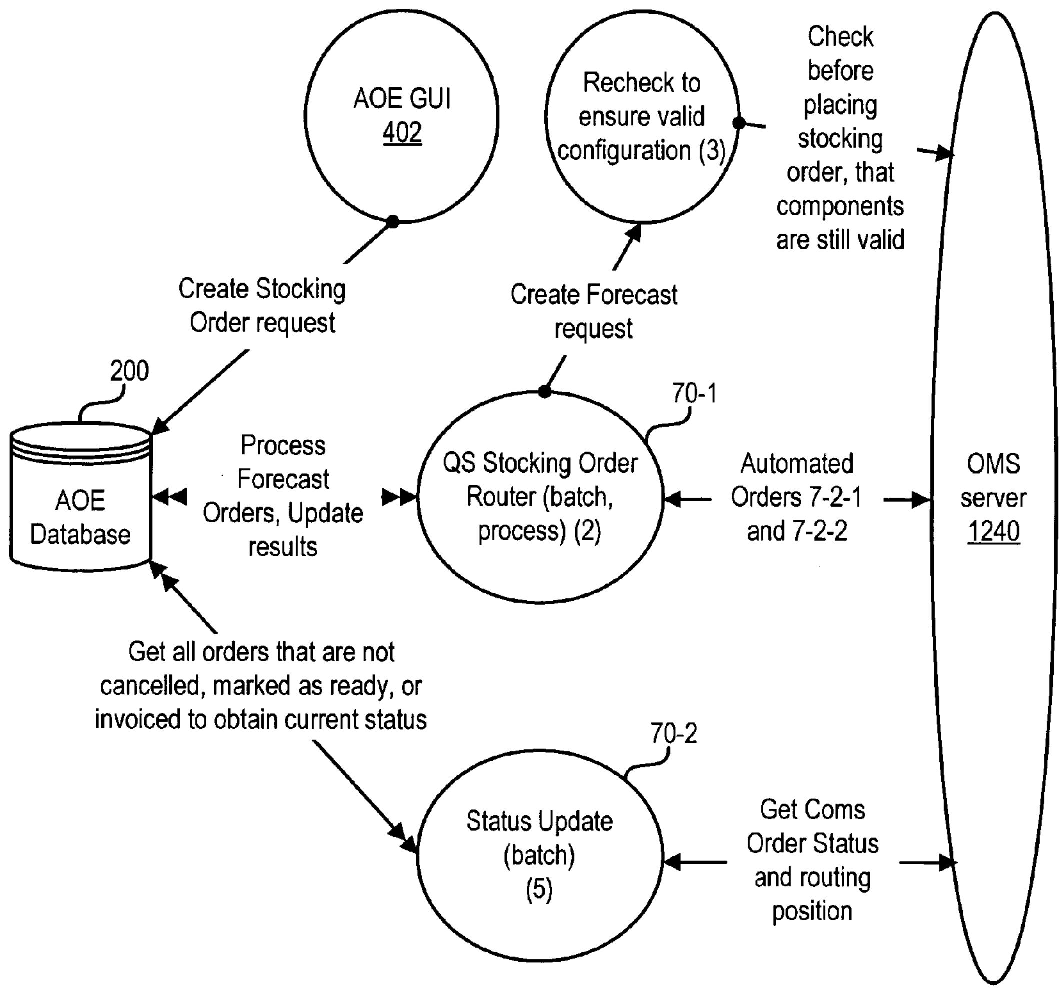
Figure 7B:
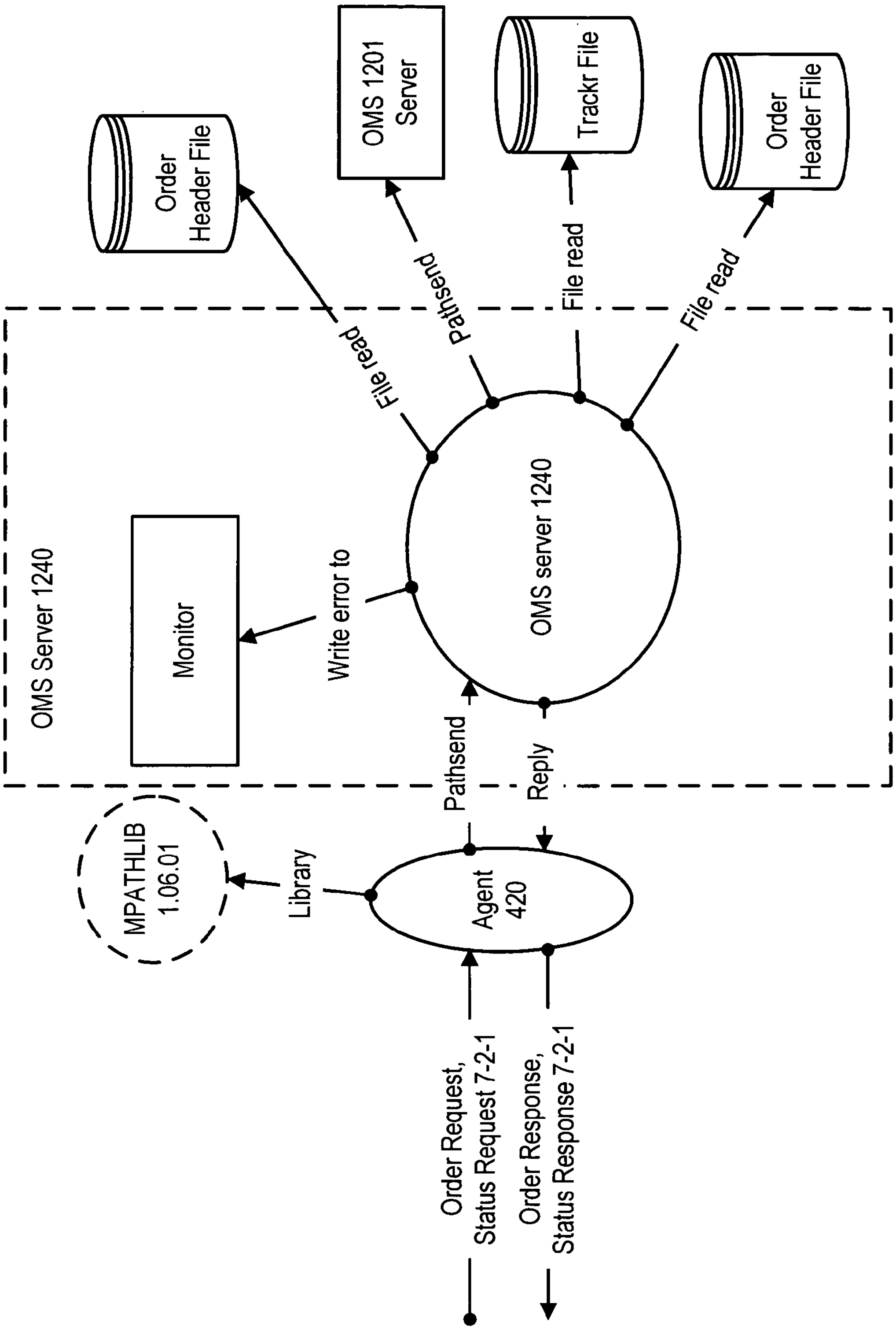
Figure 8:
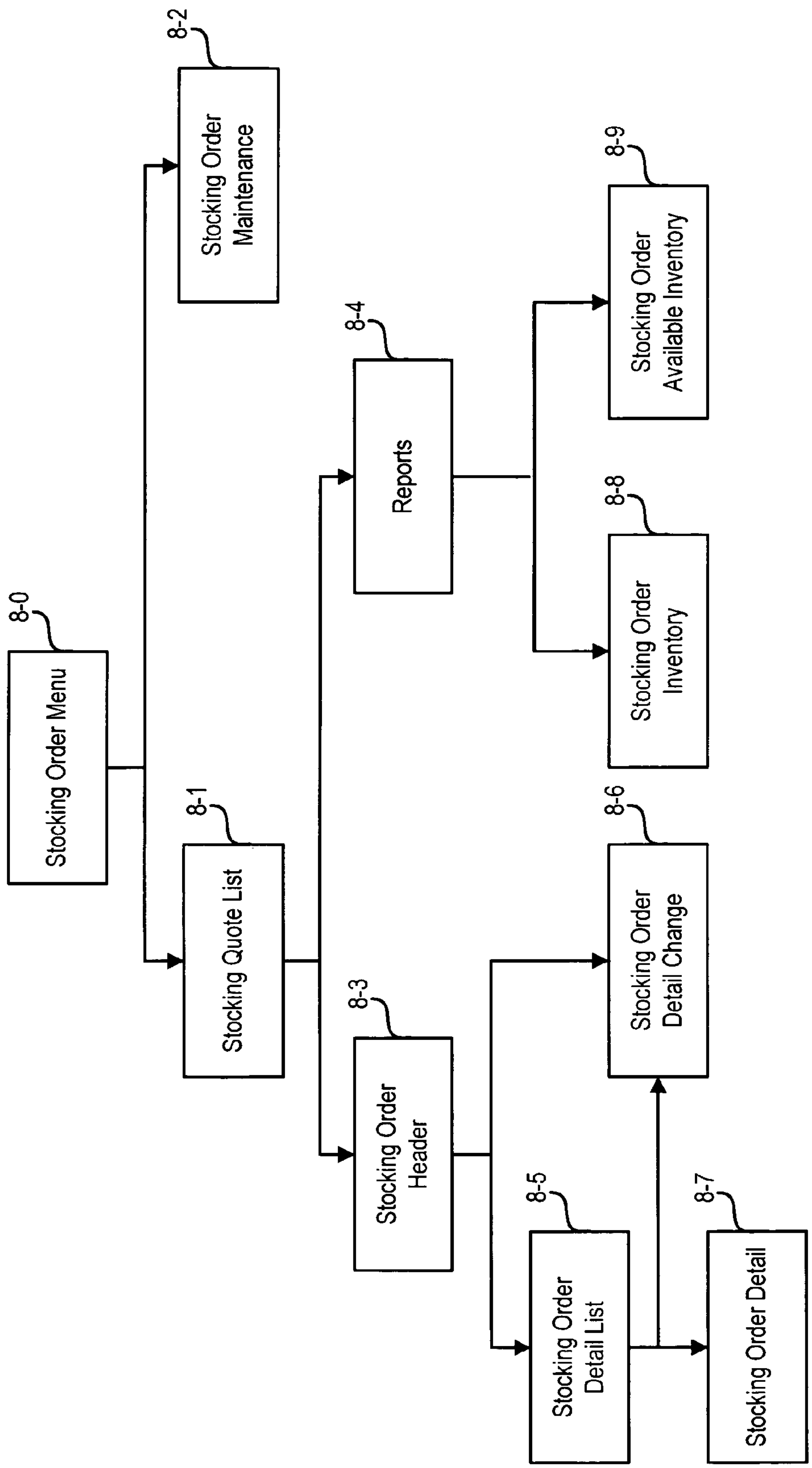
Figure 9:
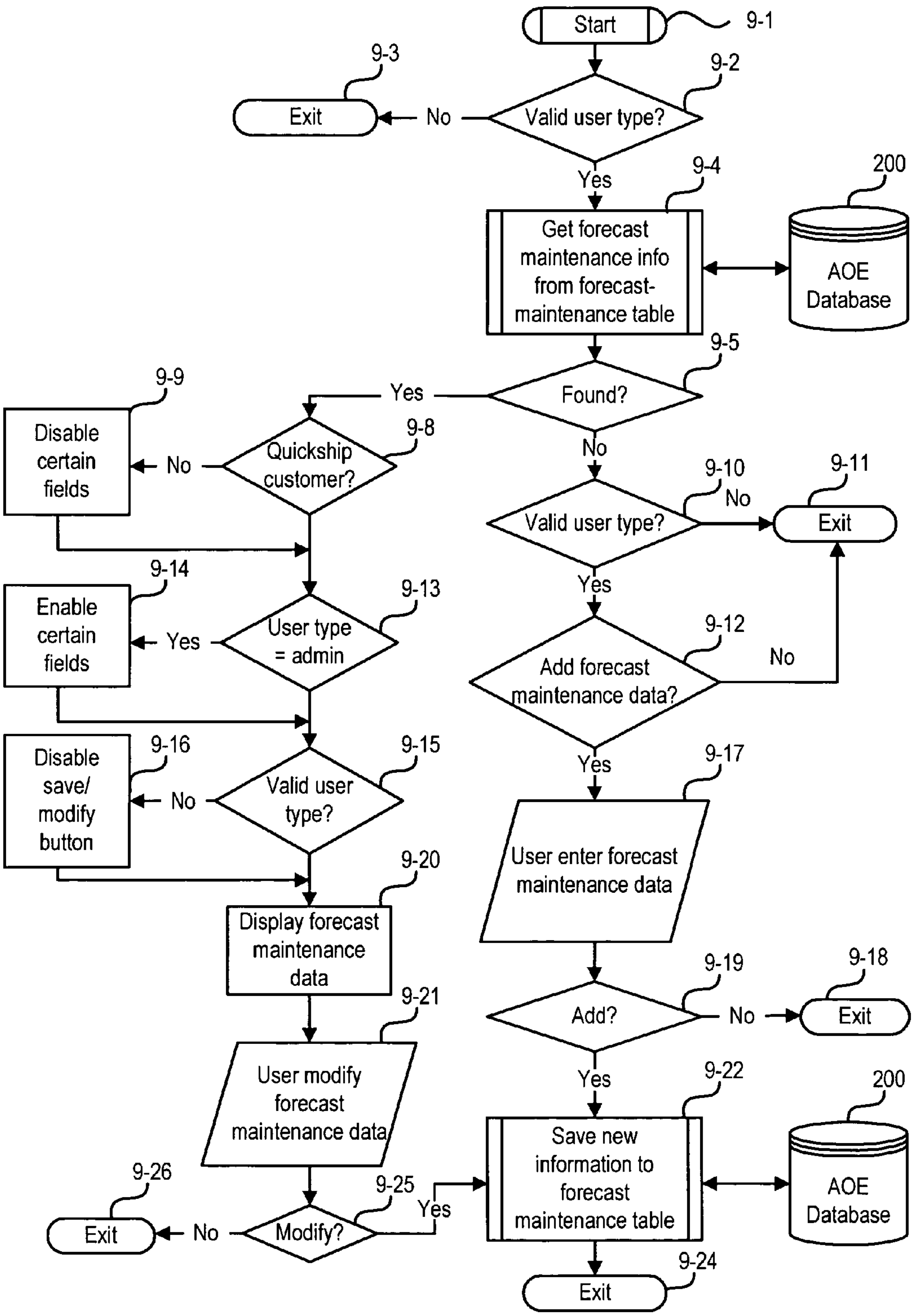
Figure 10:
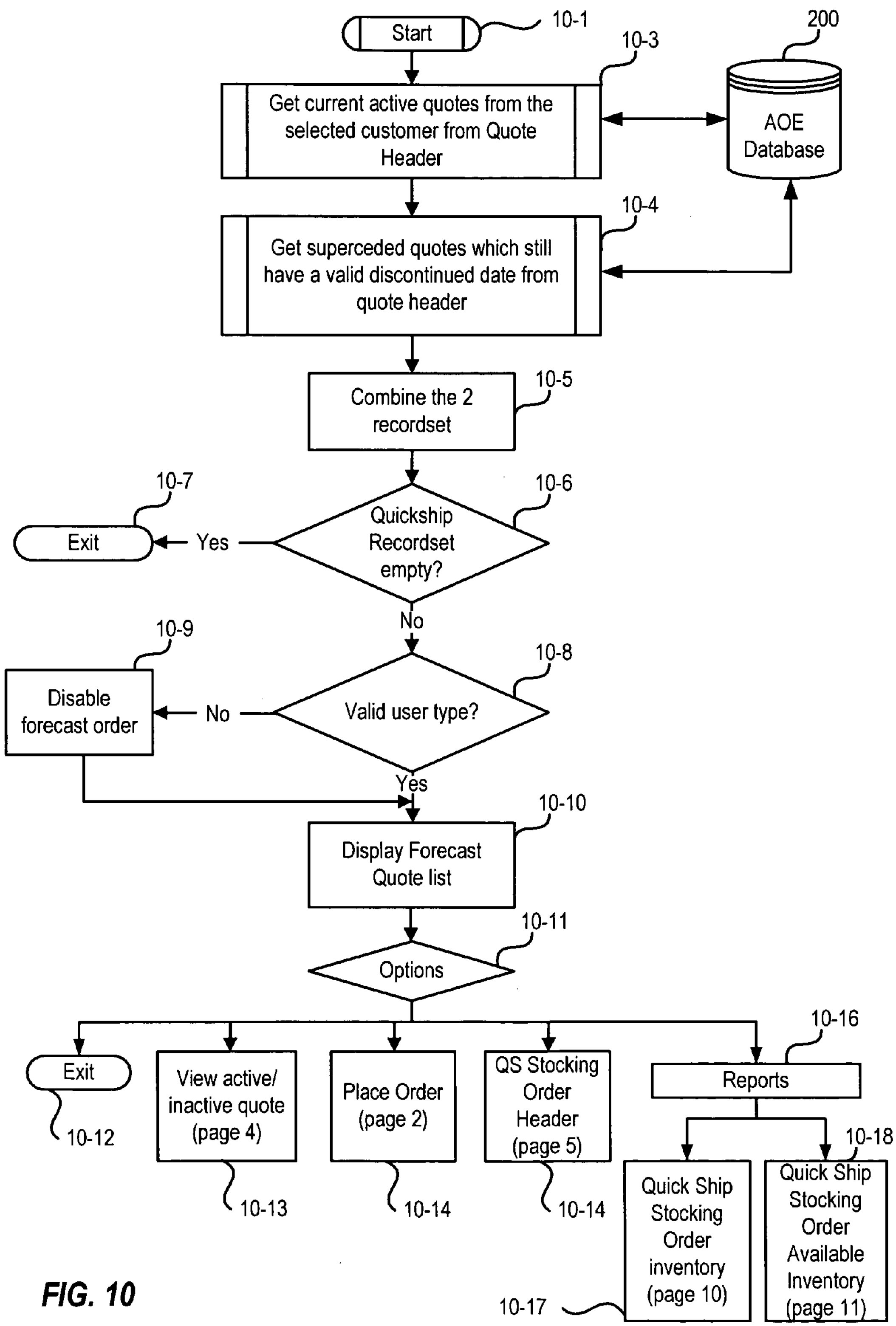
Figures 1A, 10:
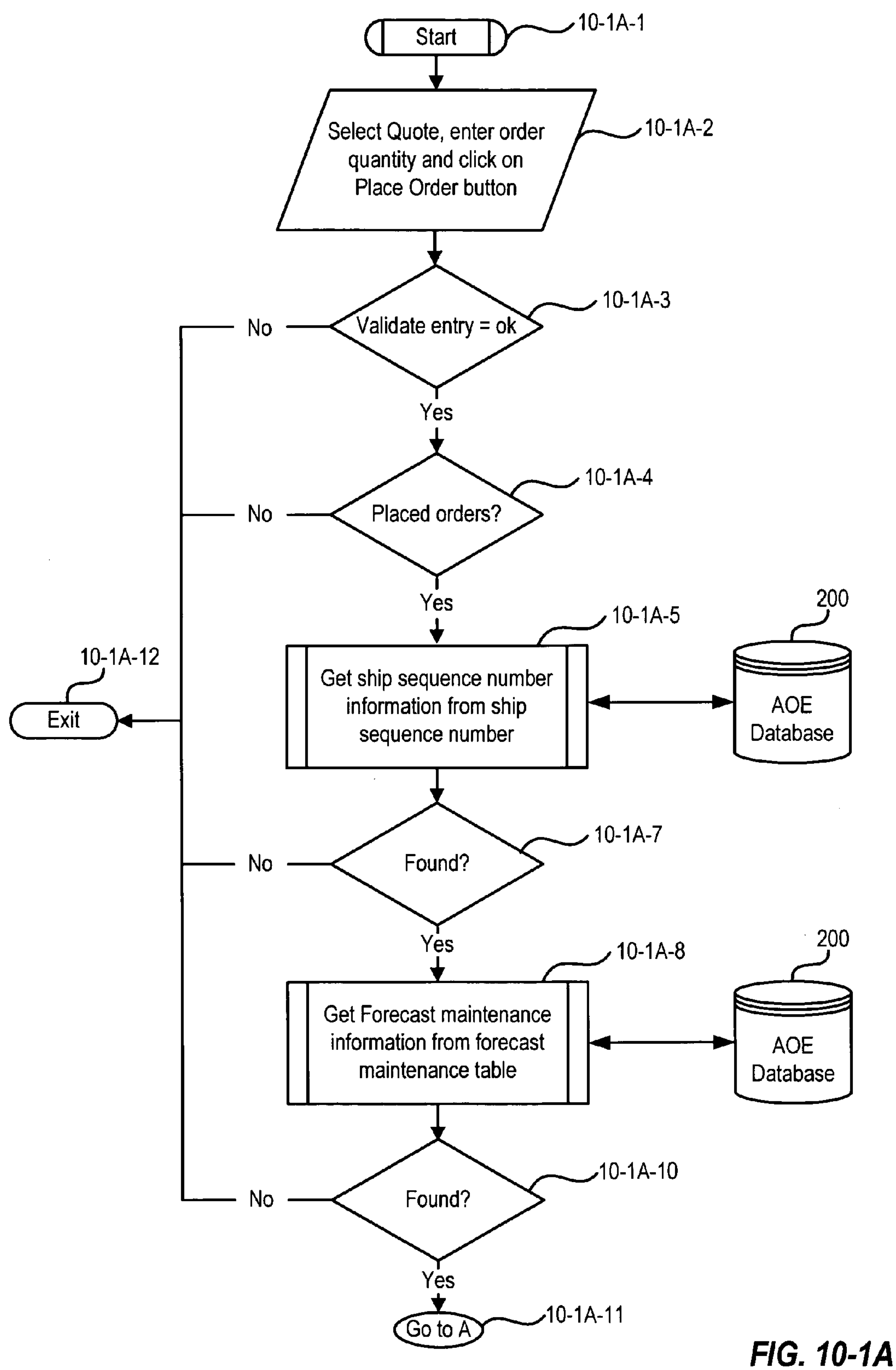
Figures 1B, 10:
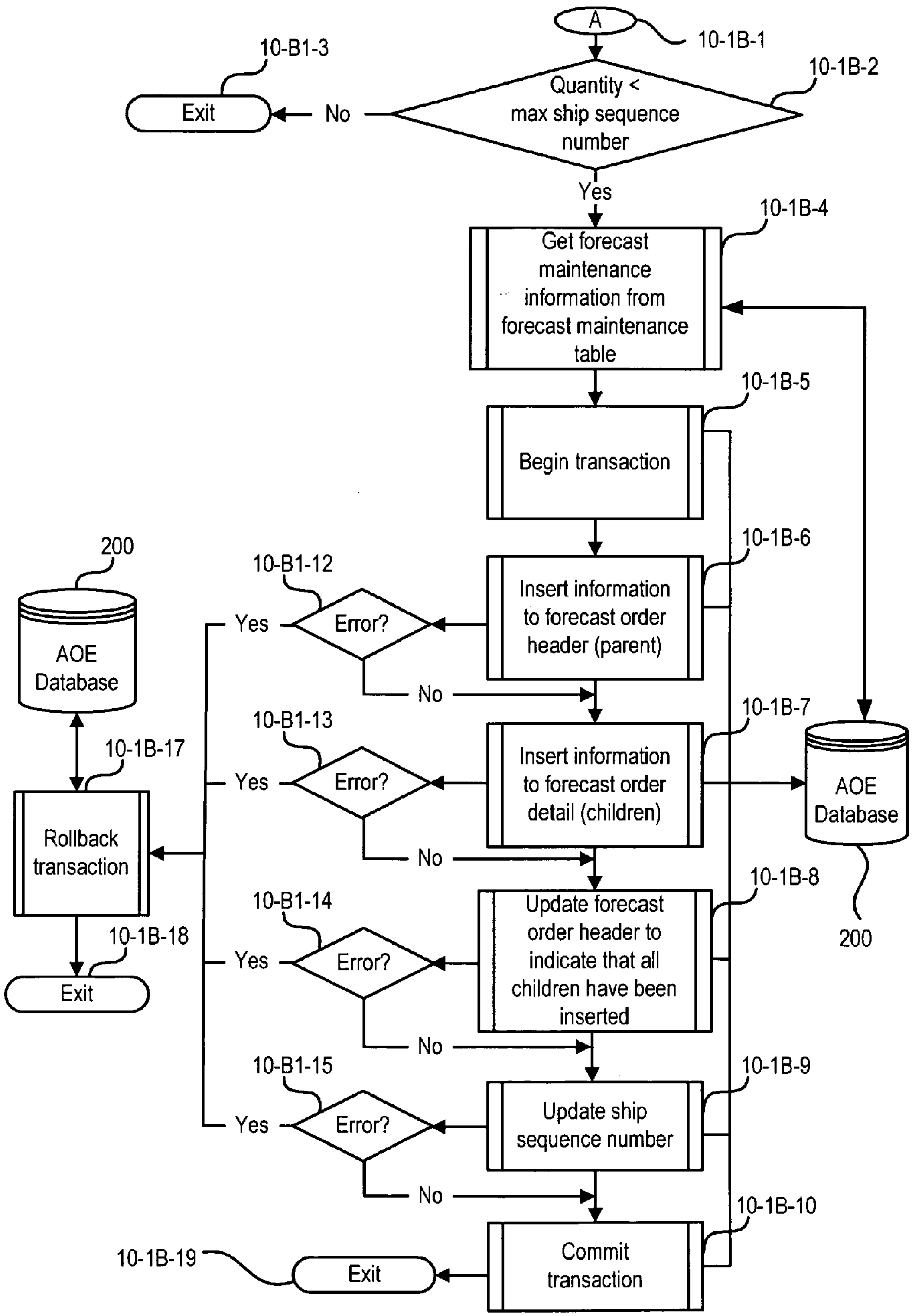
Figures 2, 10:
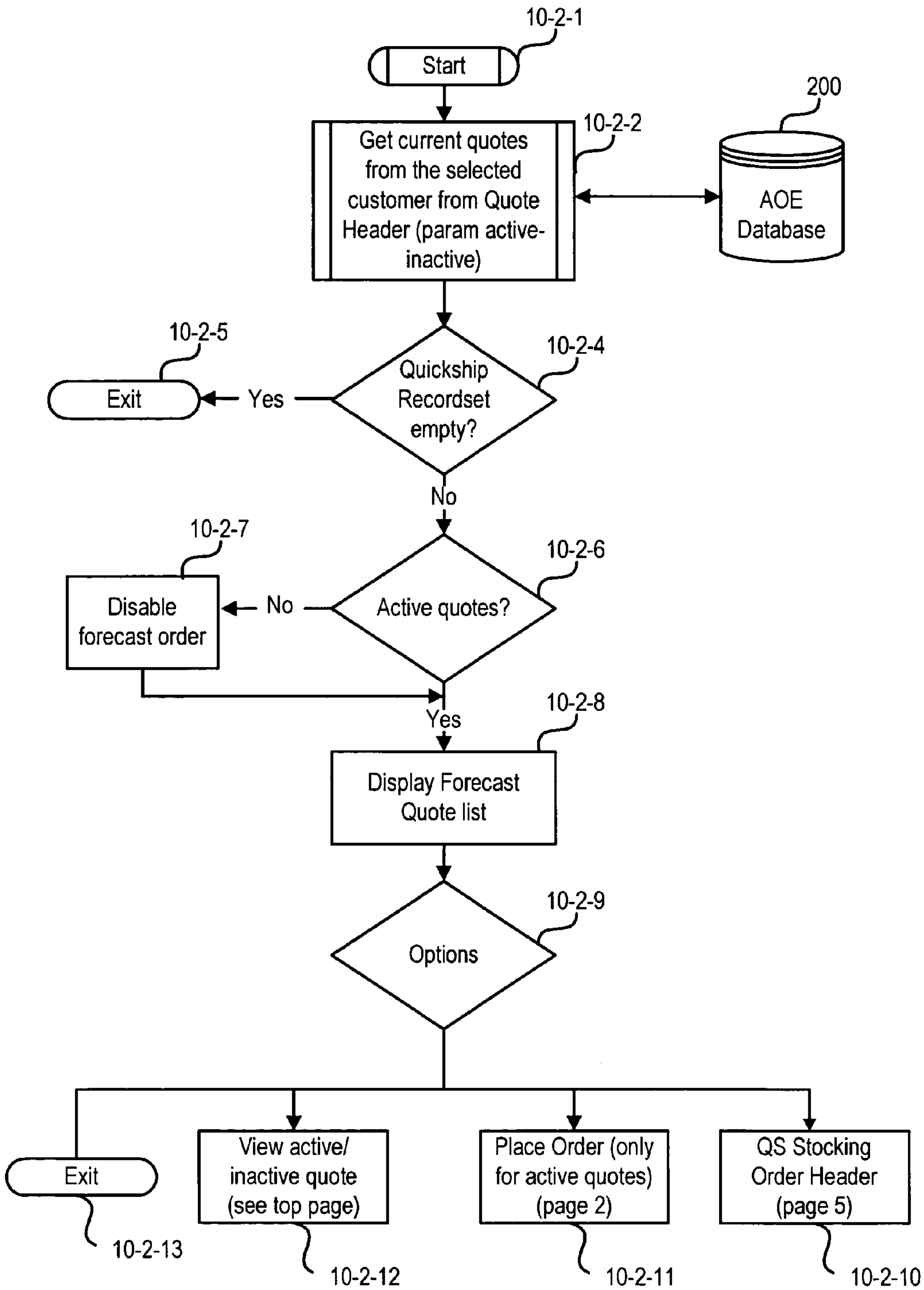
Figures 3, 10:
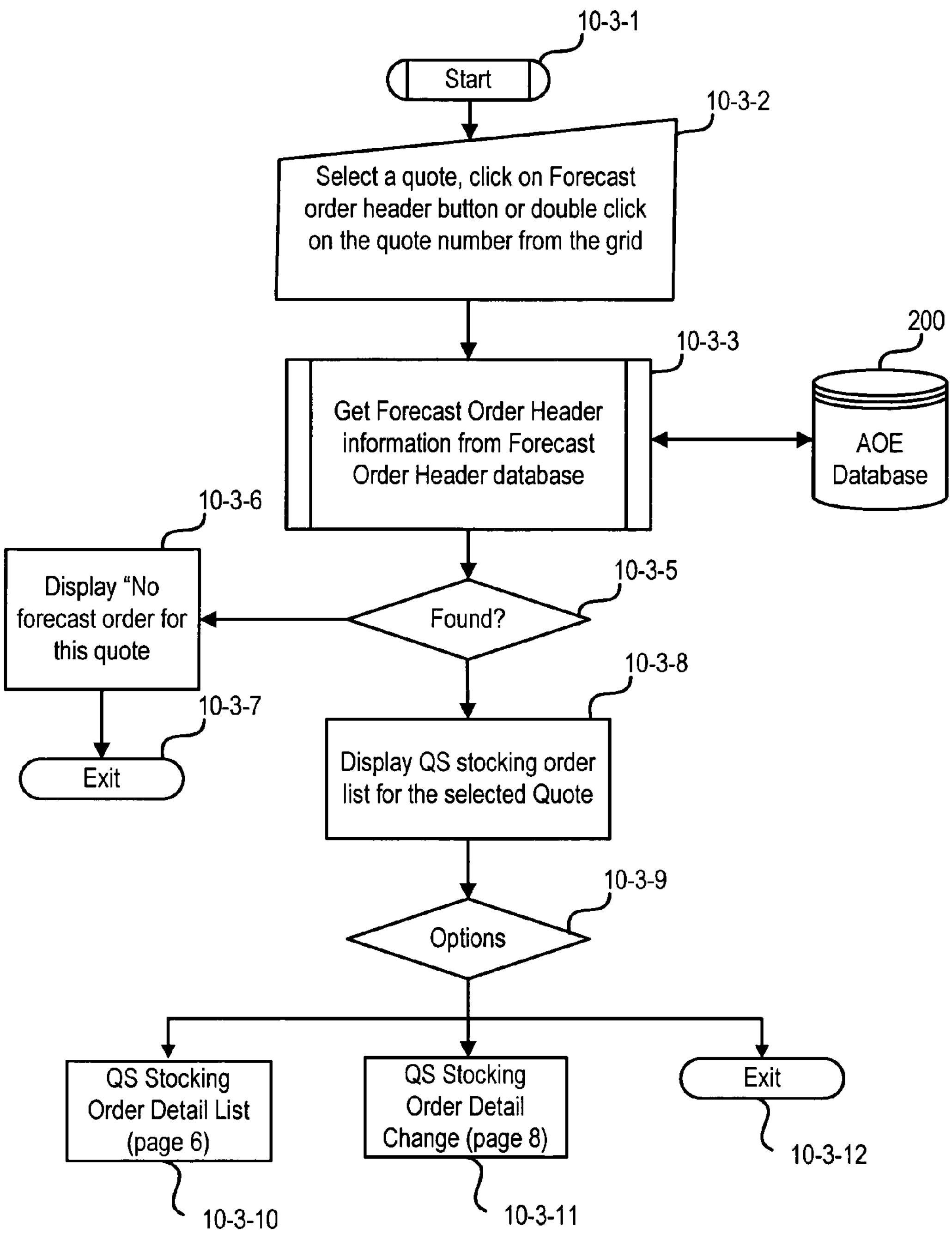
Figures 4, 10:
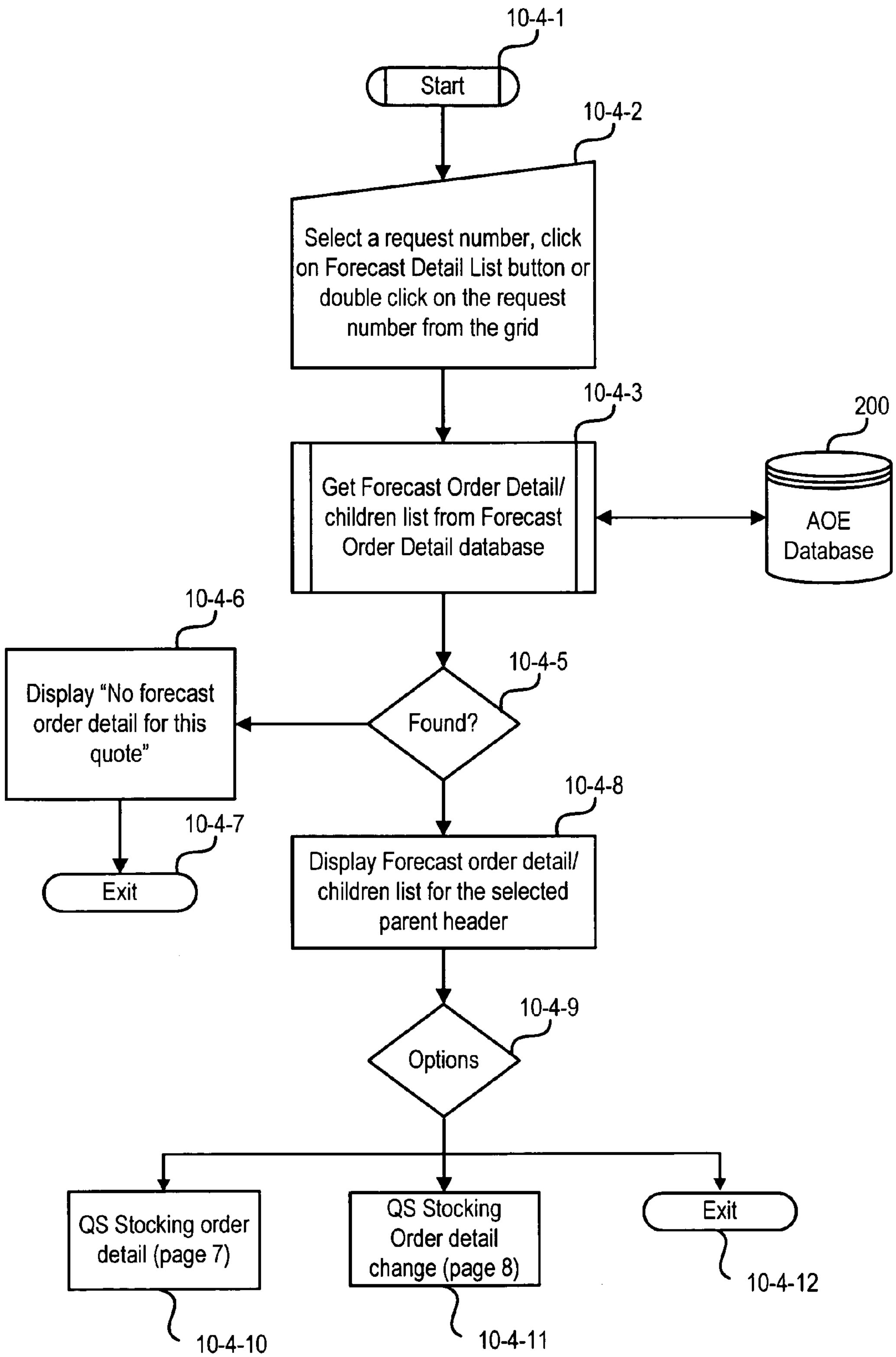
Figures 5, 10:
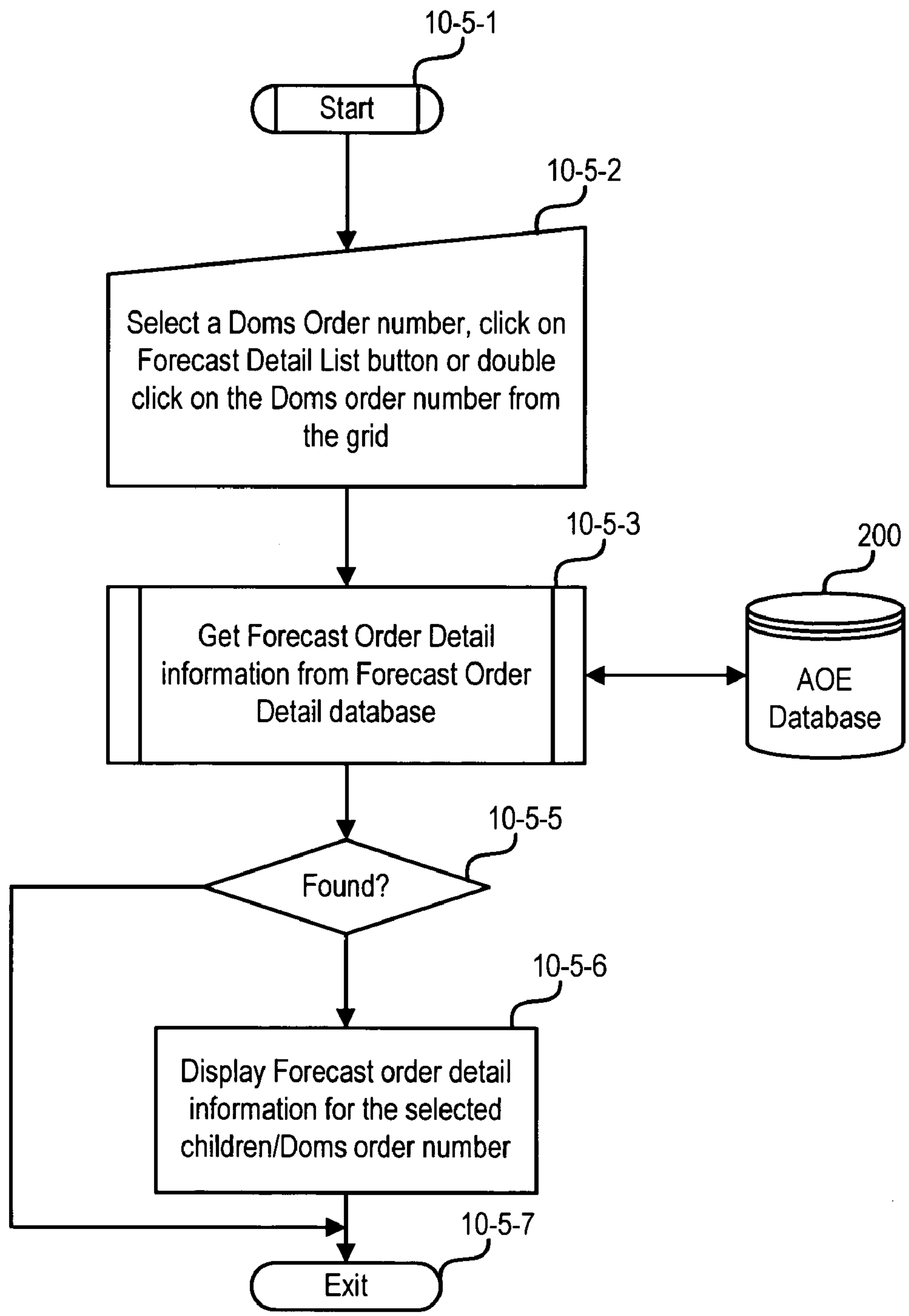
Figures 6A, 10:
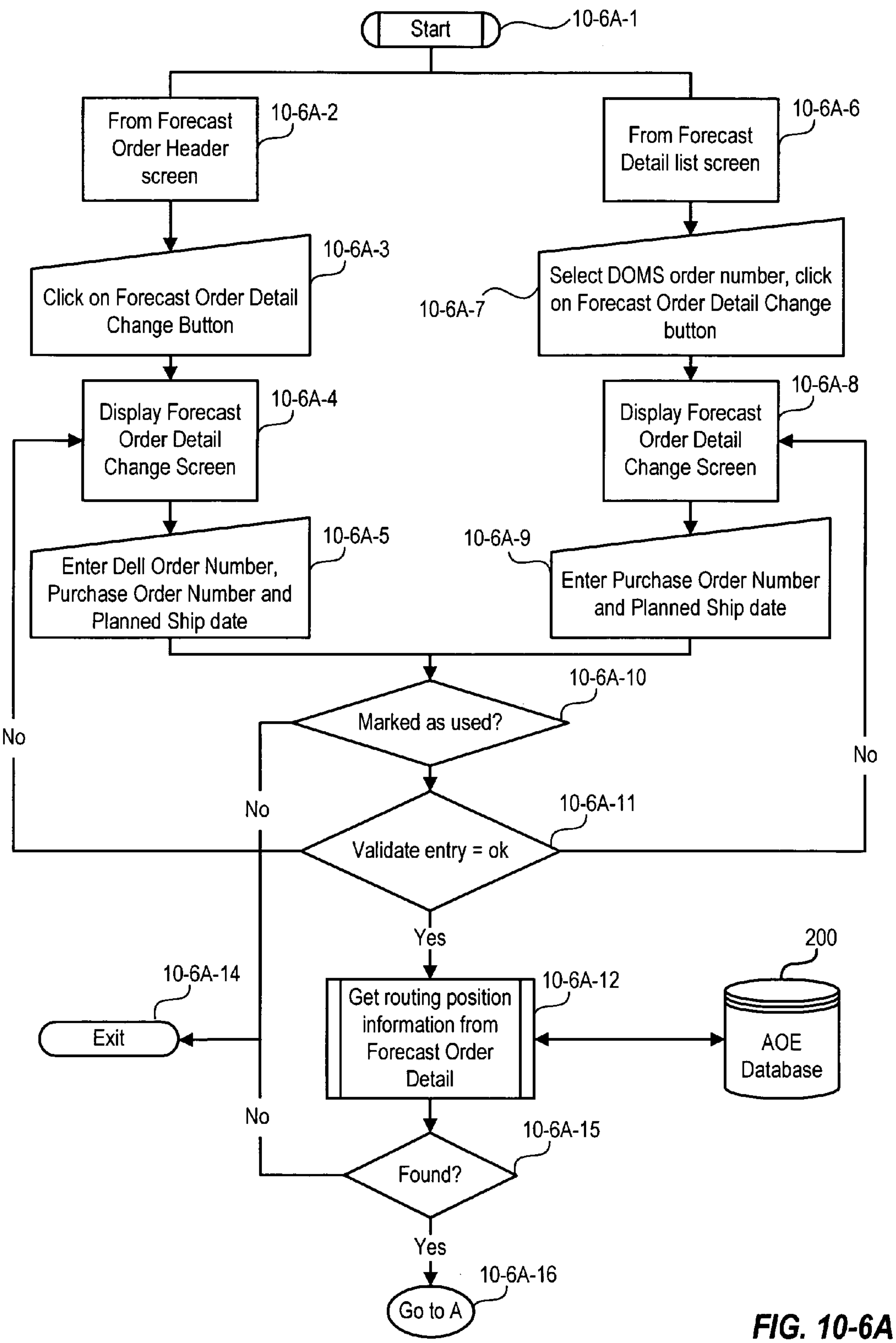
Figures 6B, 10:
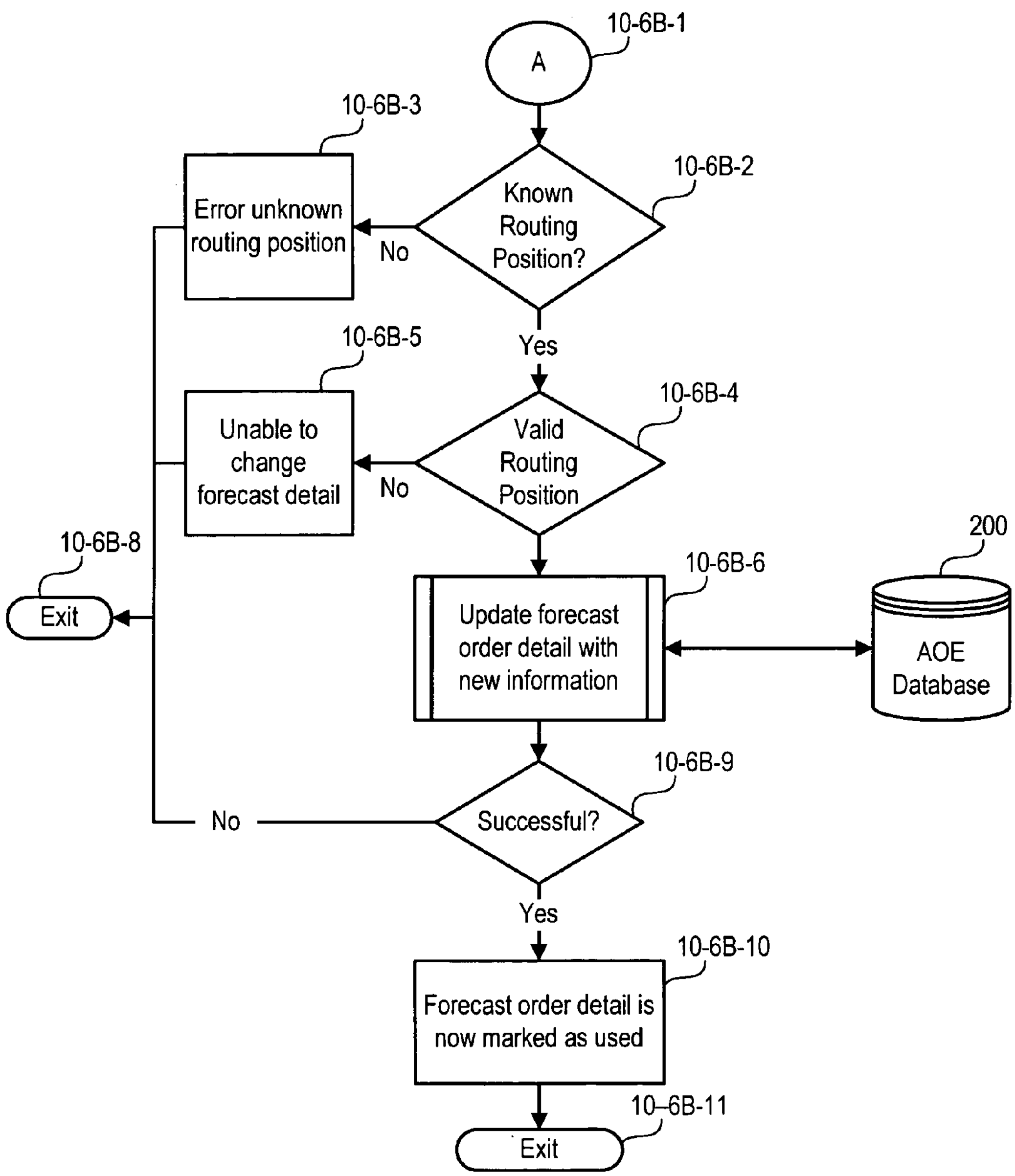
Figures 7, 10:
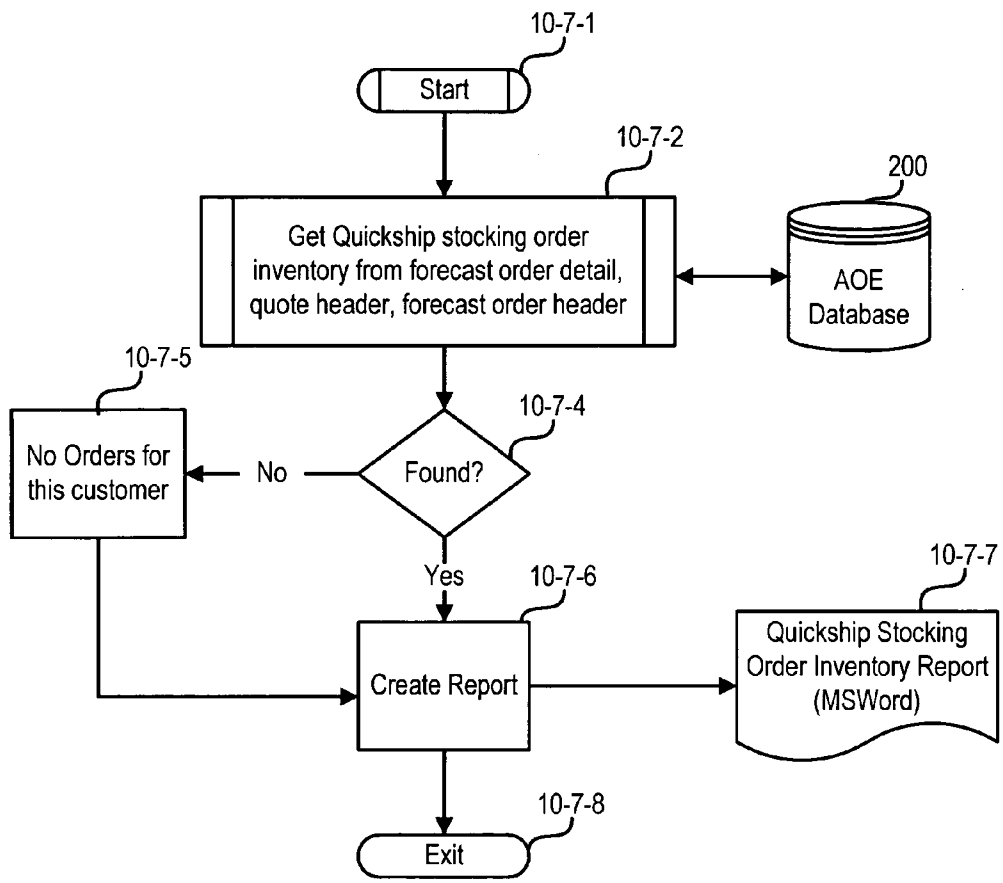
Figures 8, 10:
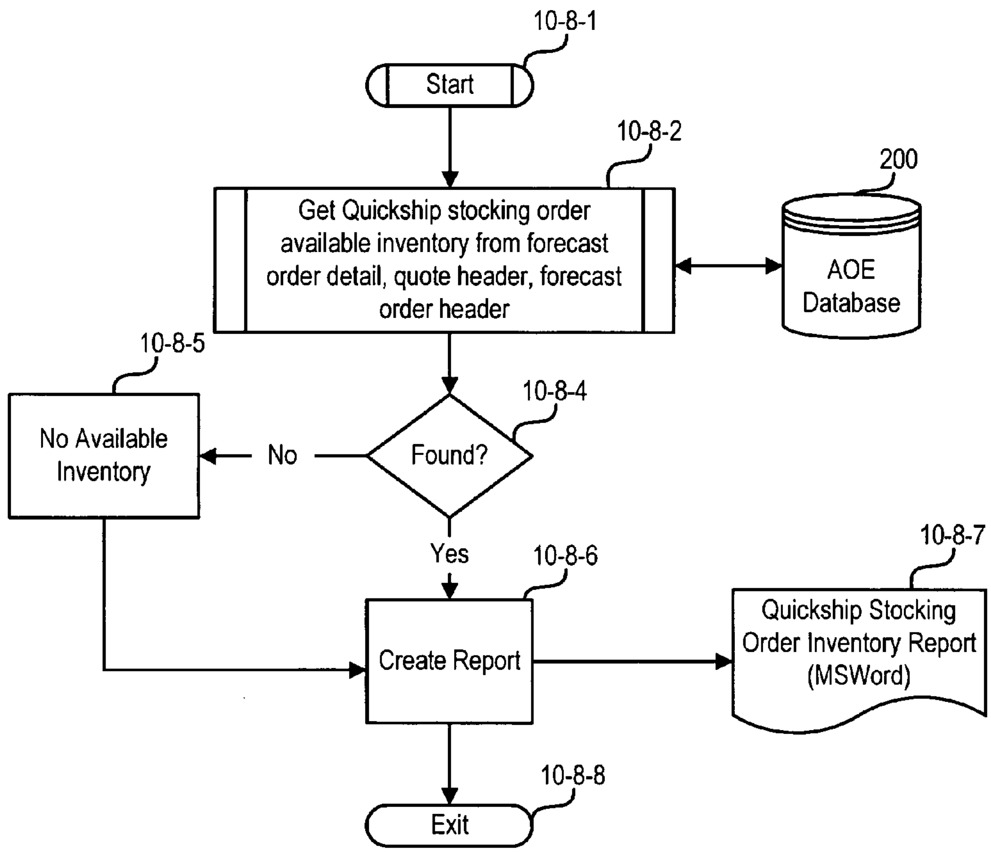
Figures 1A, 11:
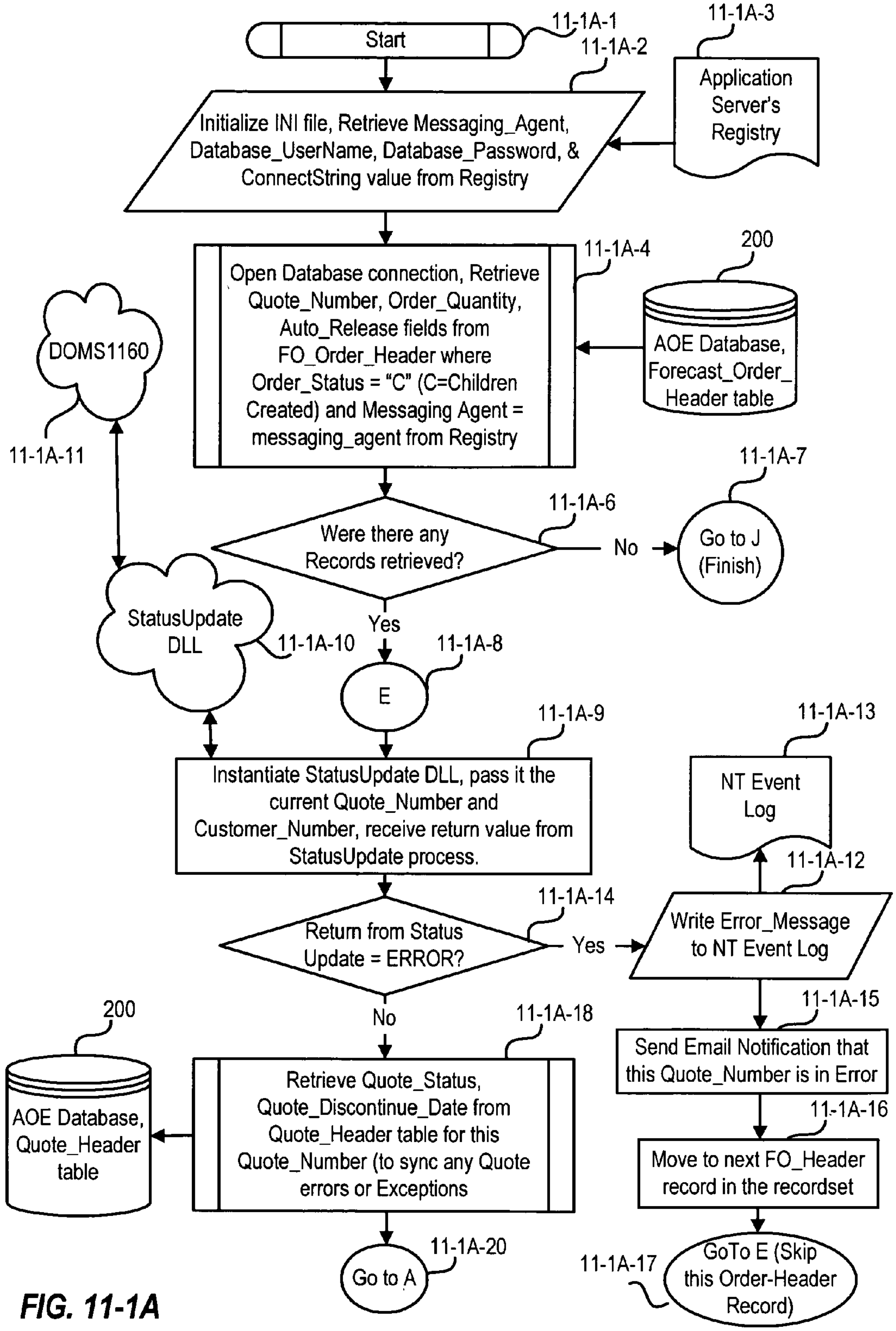
Figures 1B, 11:
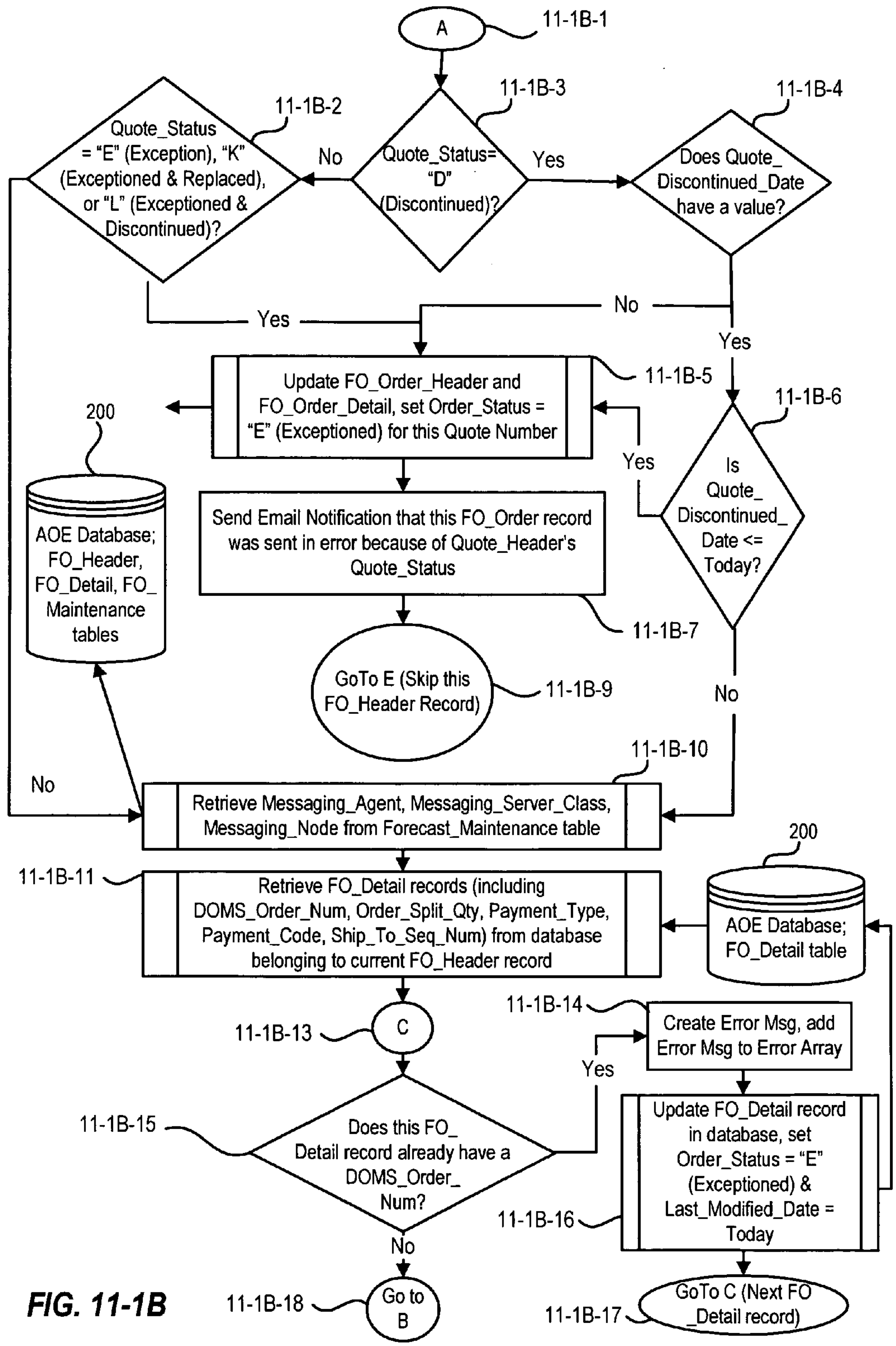
Figures 1C, 11:
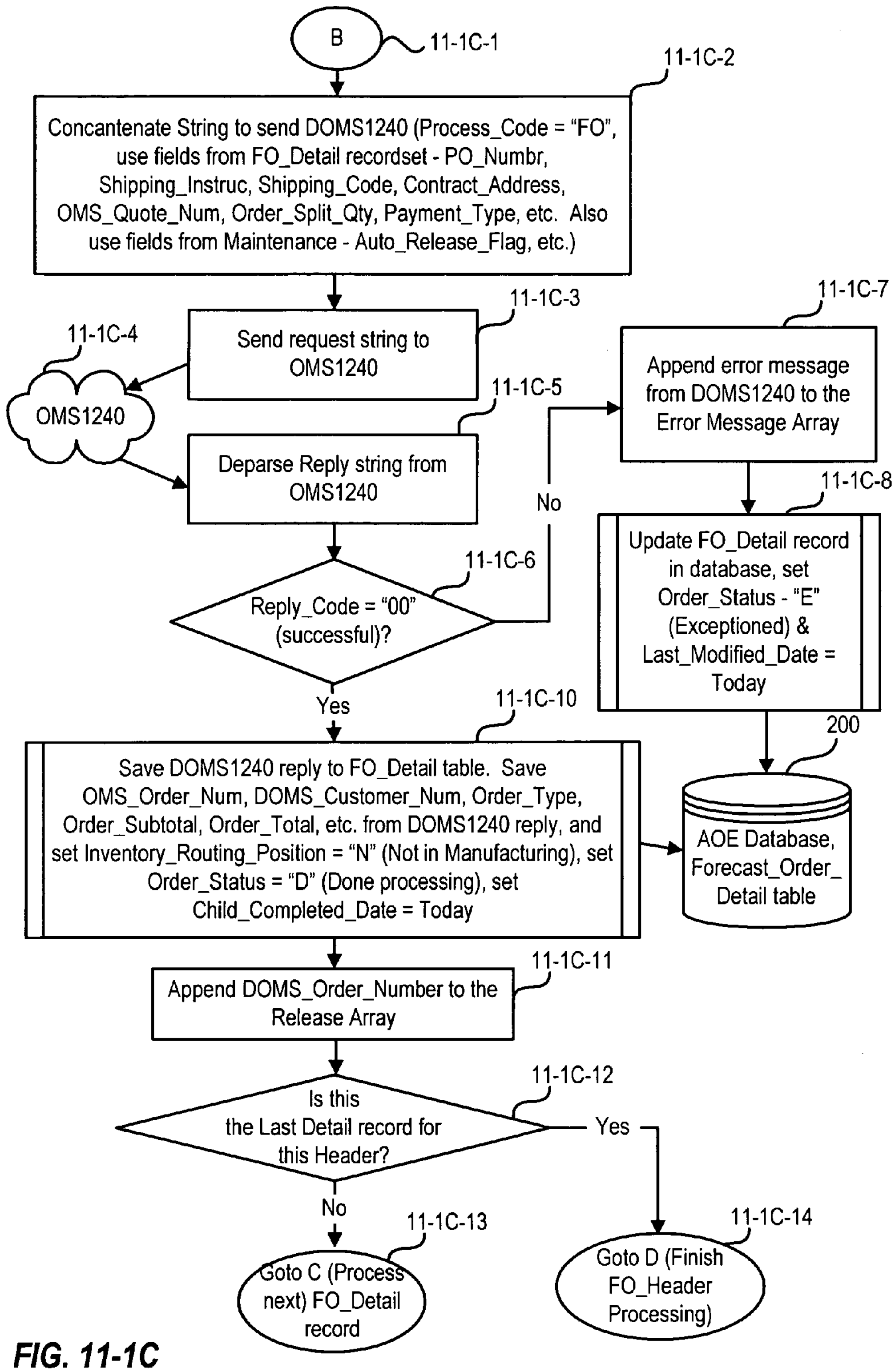
Figures 1D, 11:
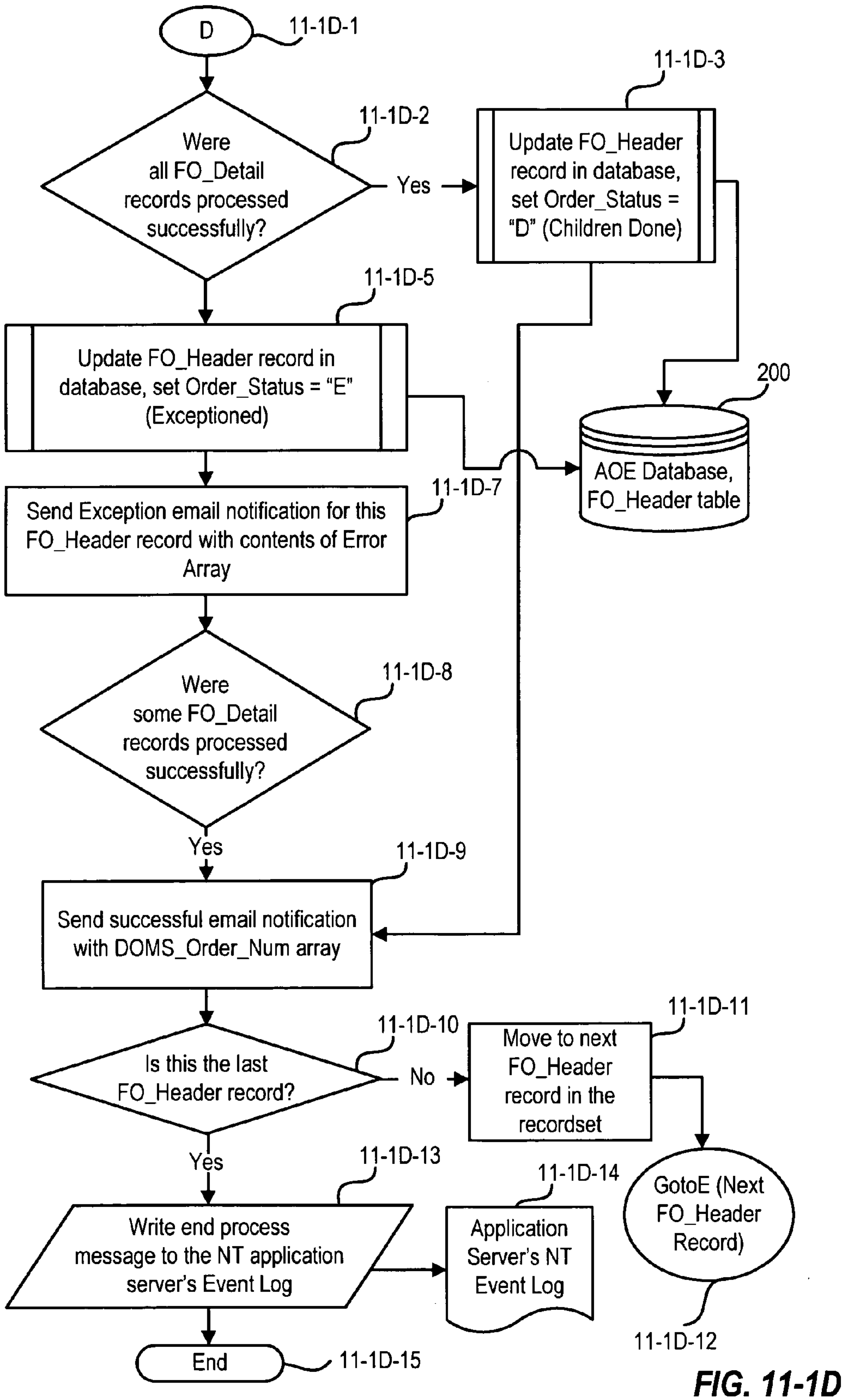
Figure 12:
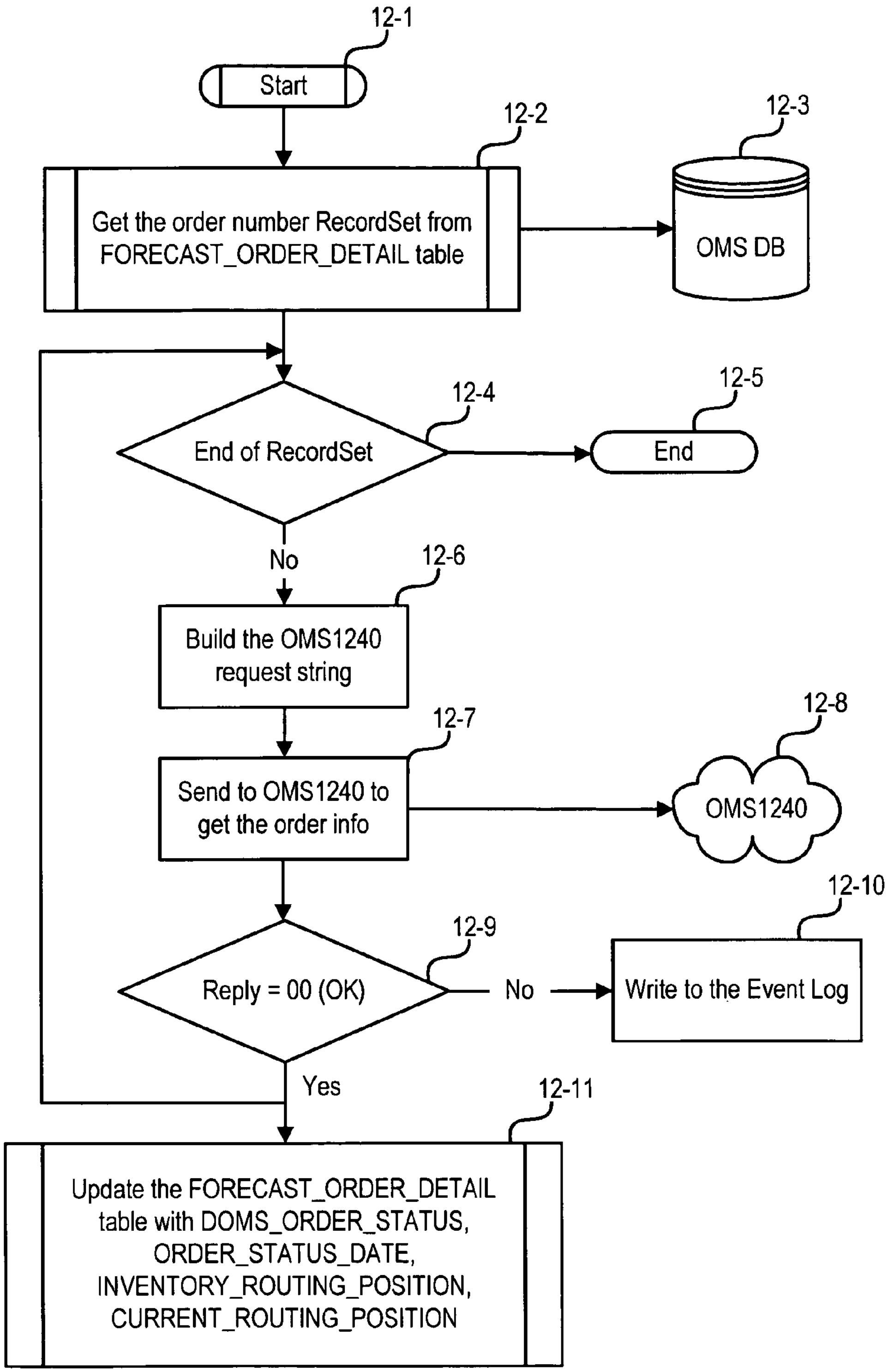
Figure 13:
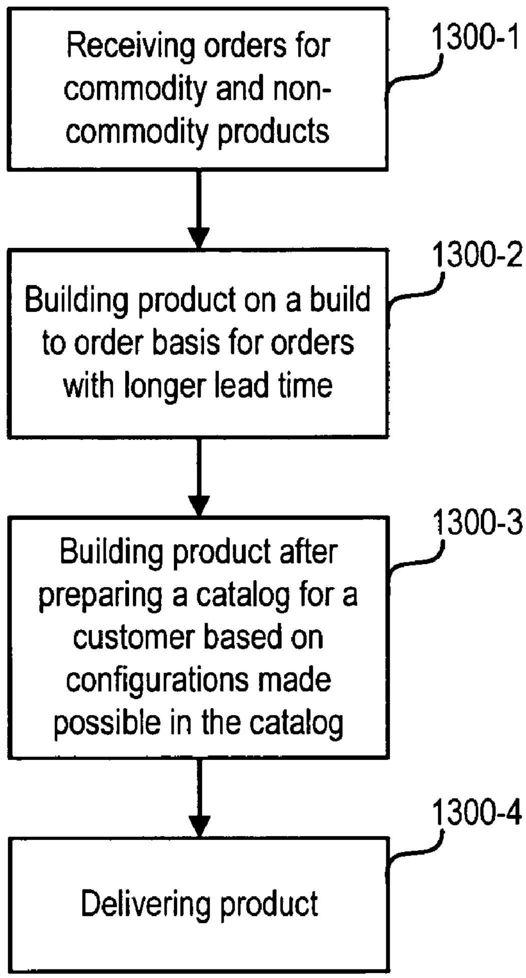
Figure 14:
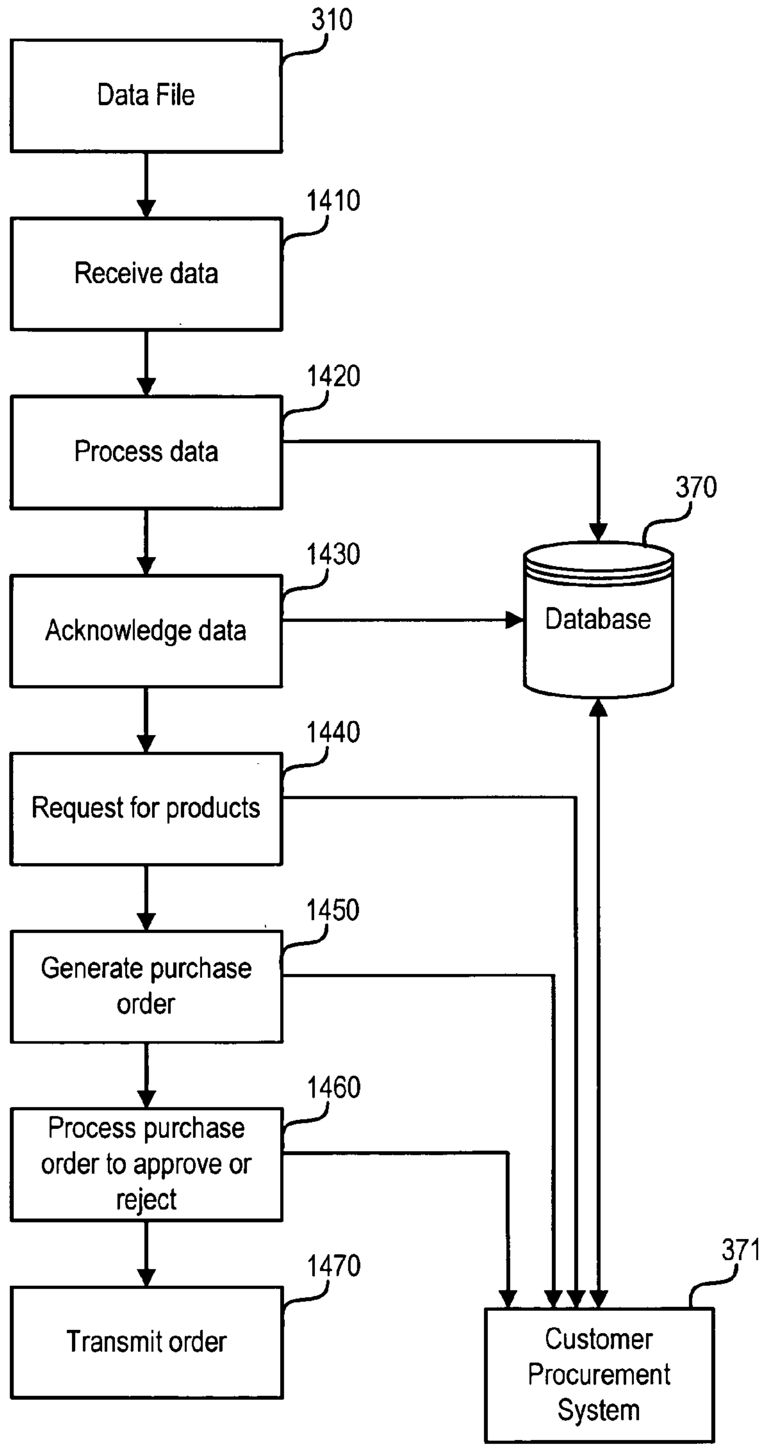
Figure 14A:
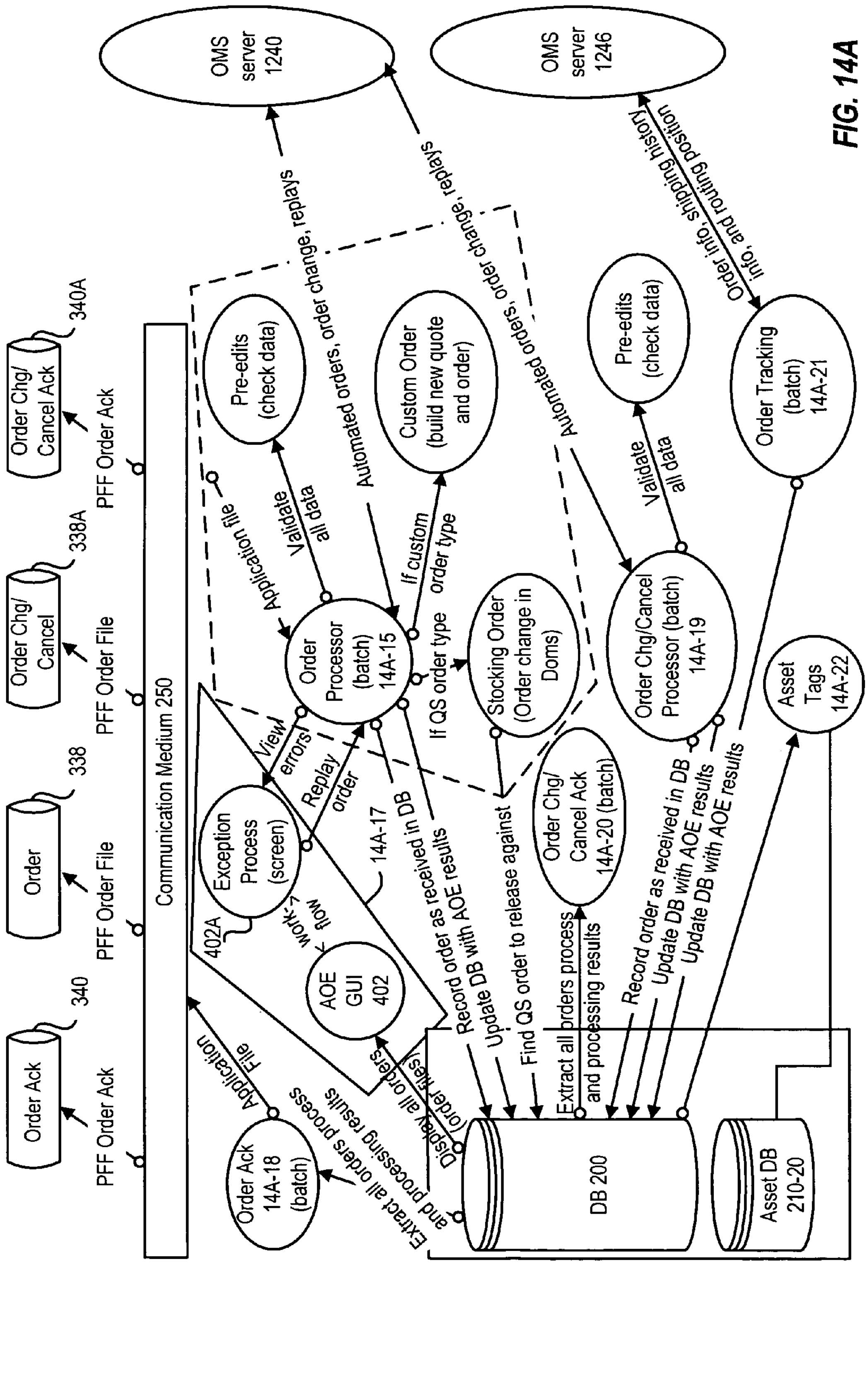
Figure 14C:
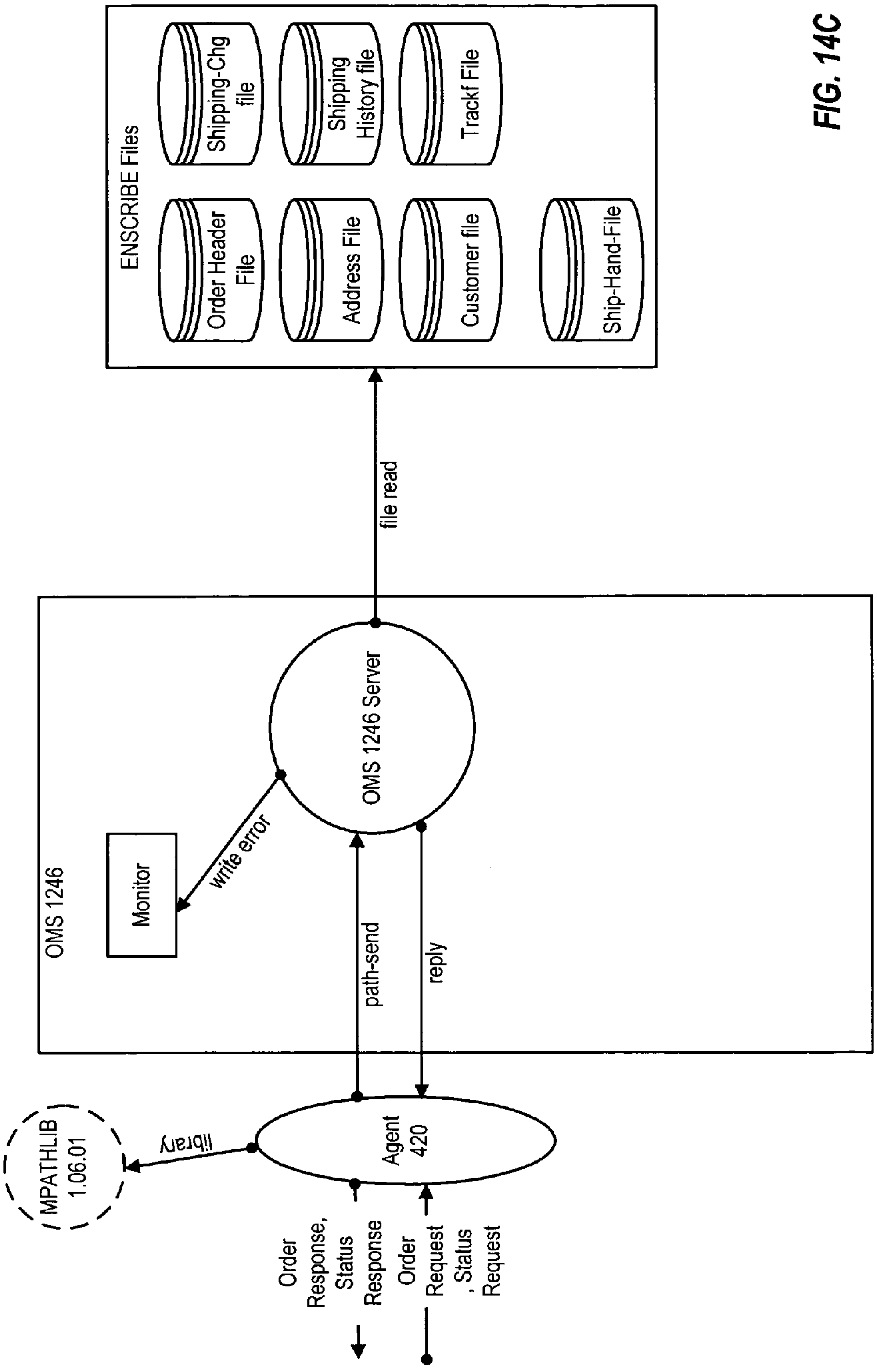
Figure 15A:
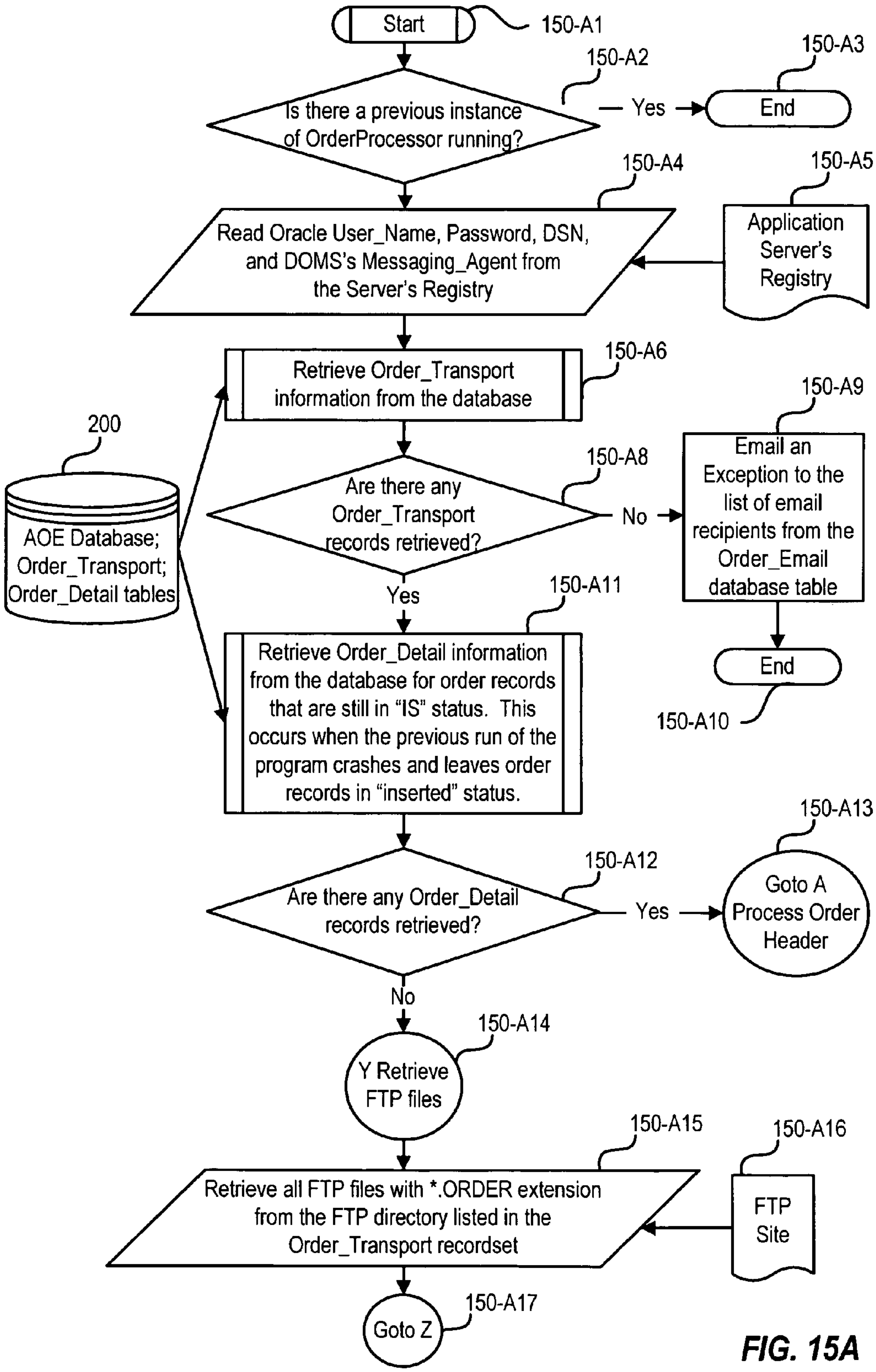
Figure 15B:
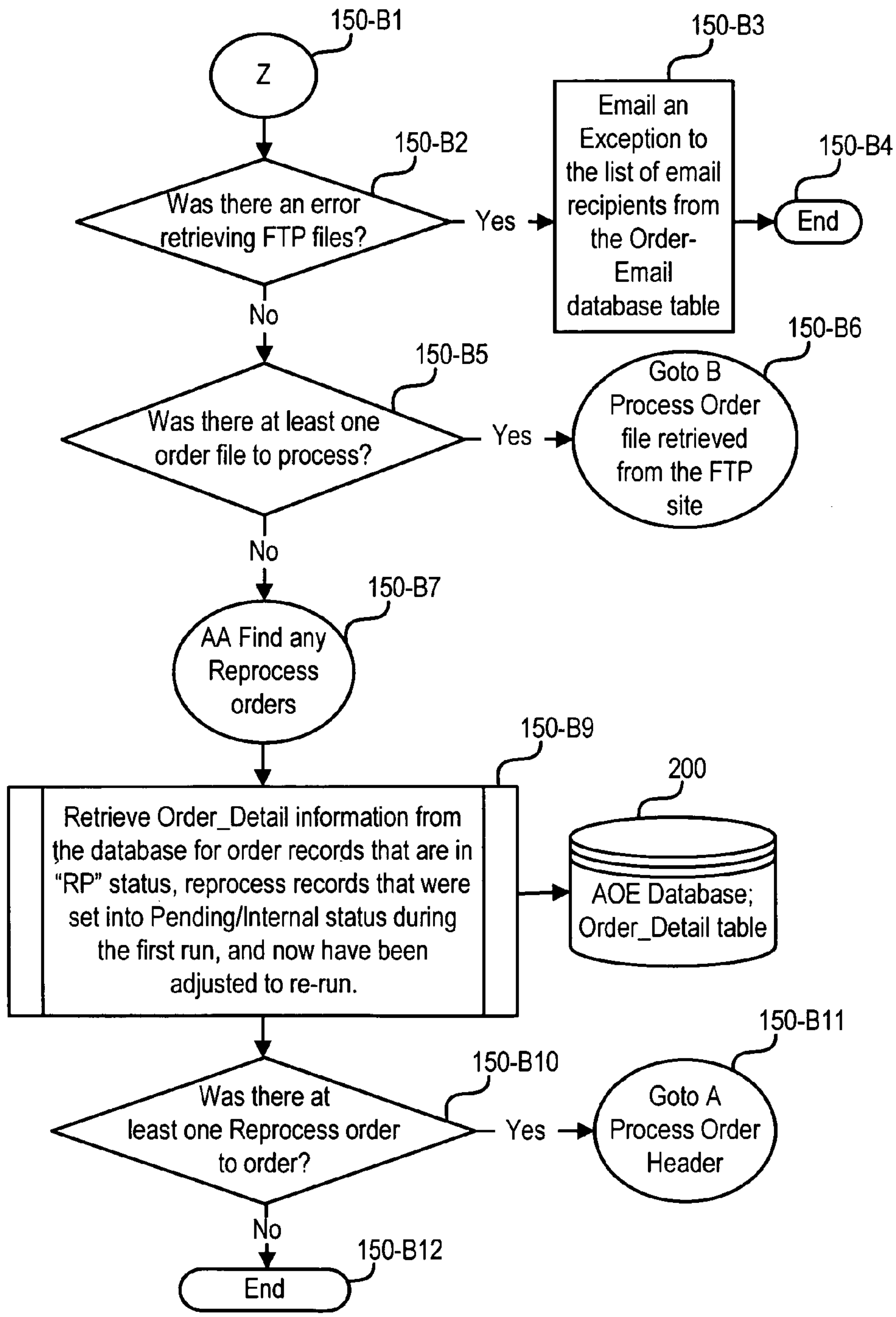
Figure 15C:
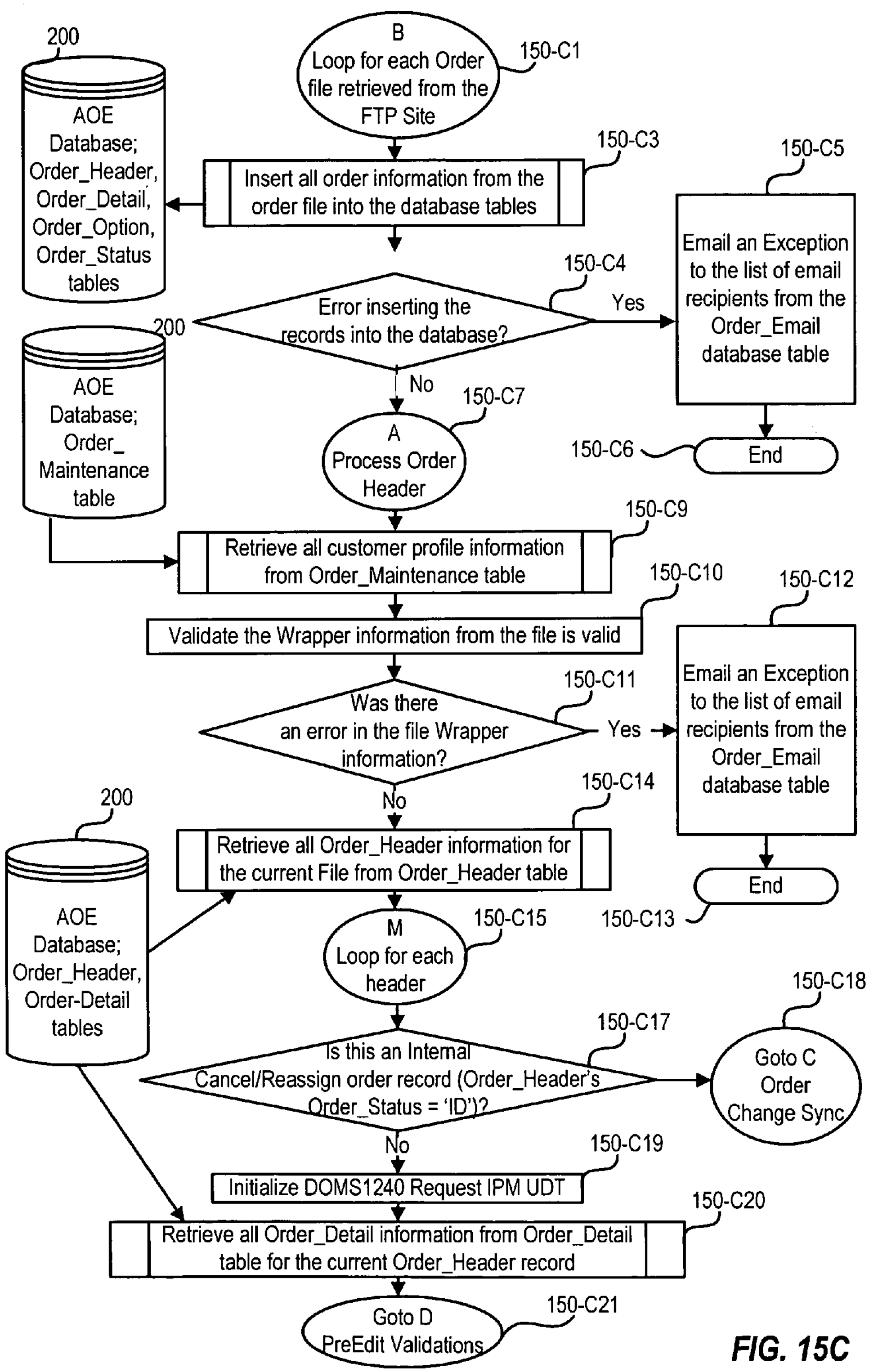
Figure 15D:
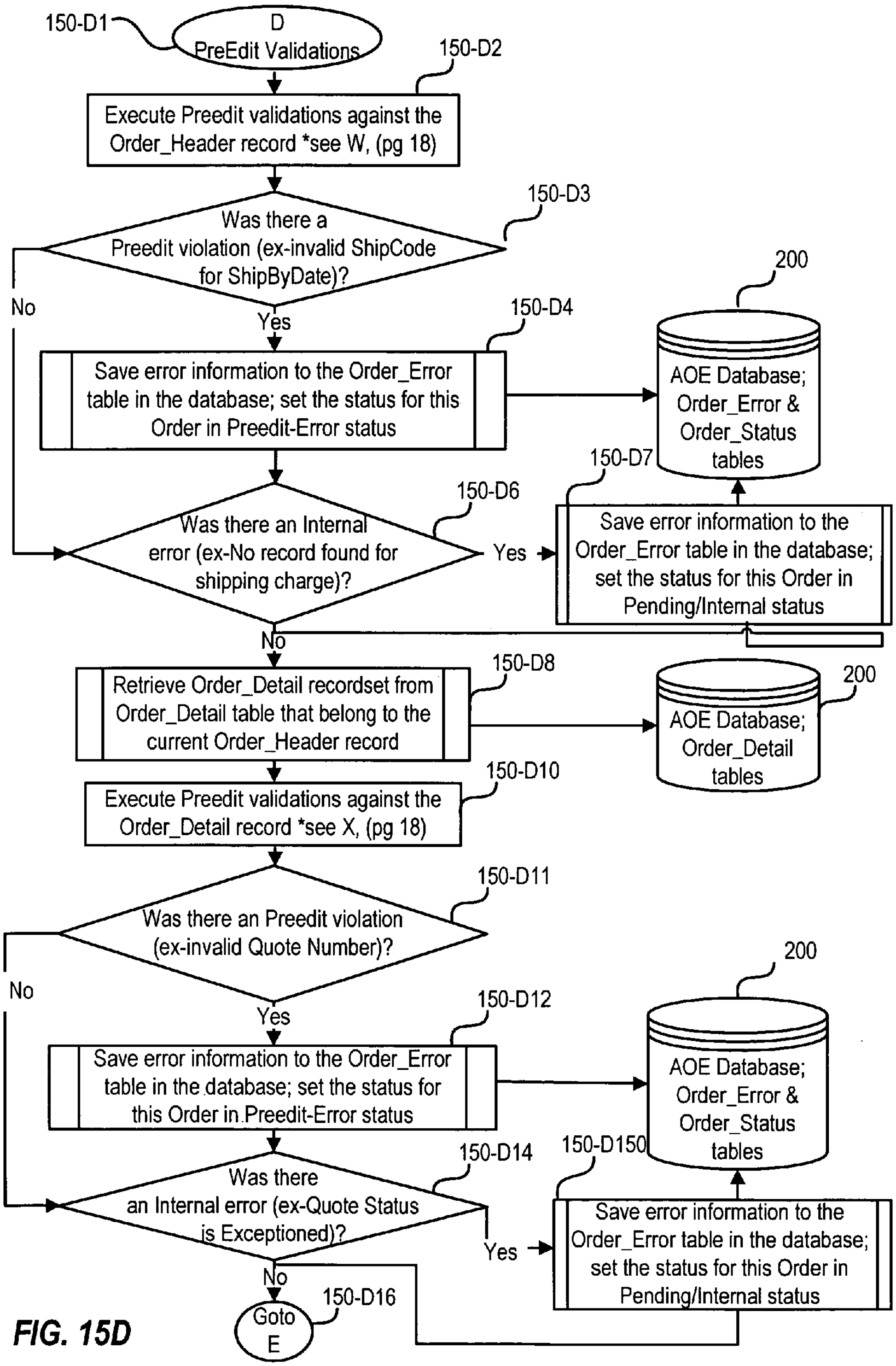
Figures 1, 15E:
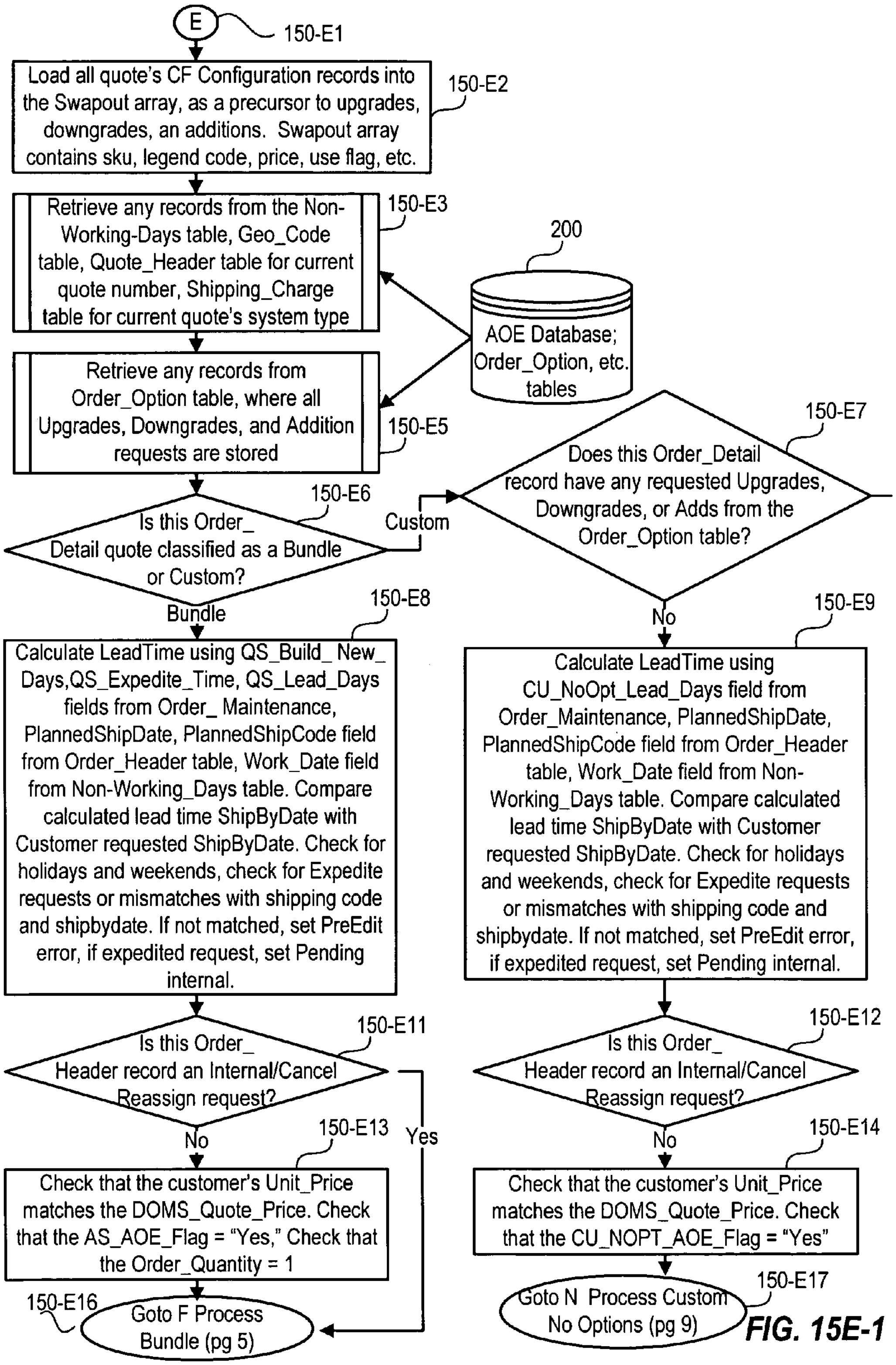
Figures 2, 15E:
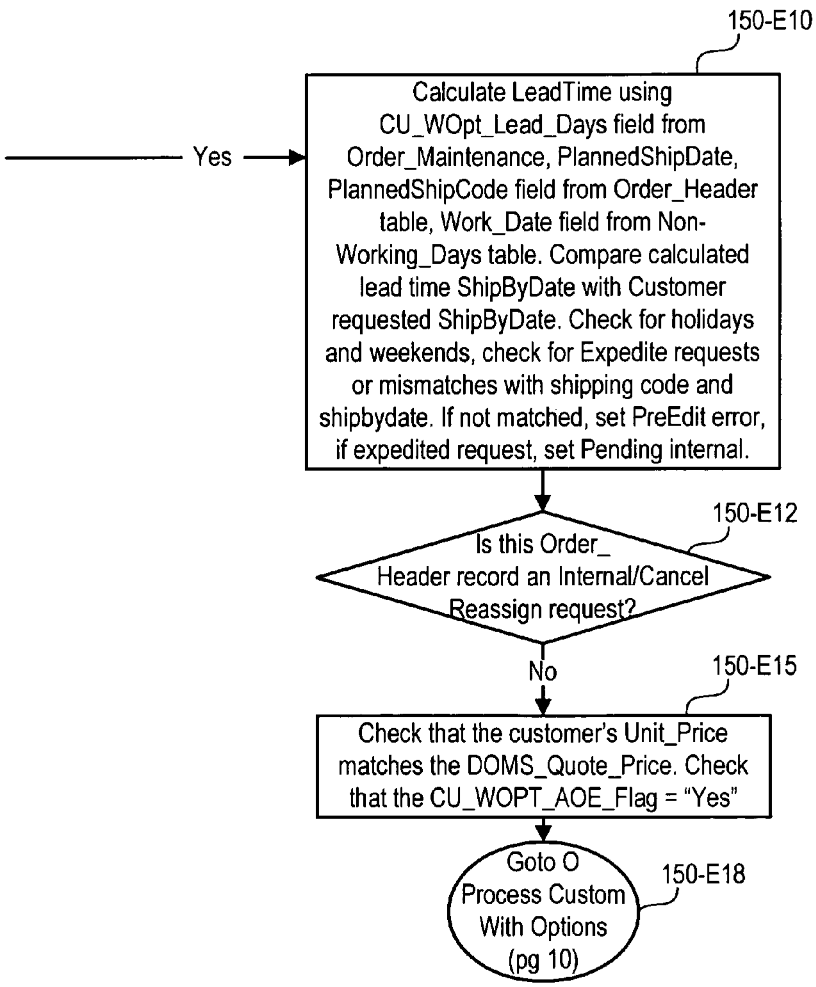
Figure 15G:
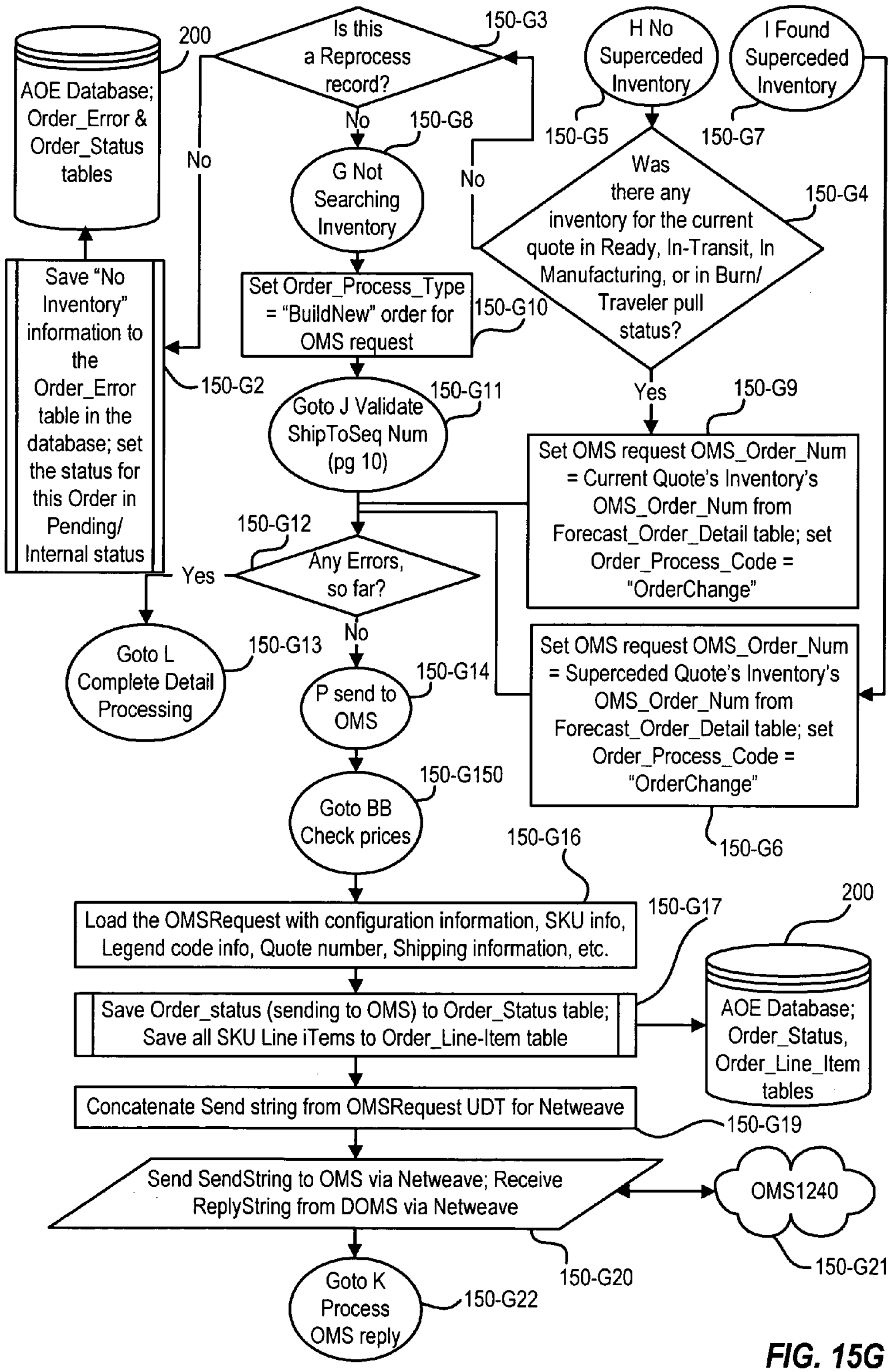
Figure 15H:
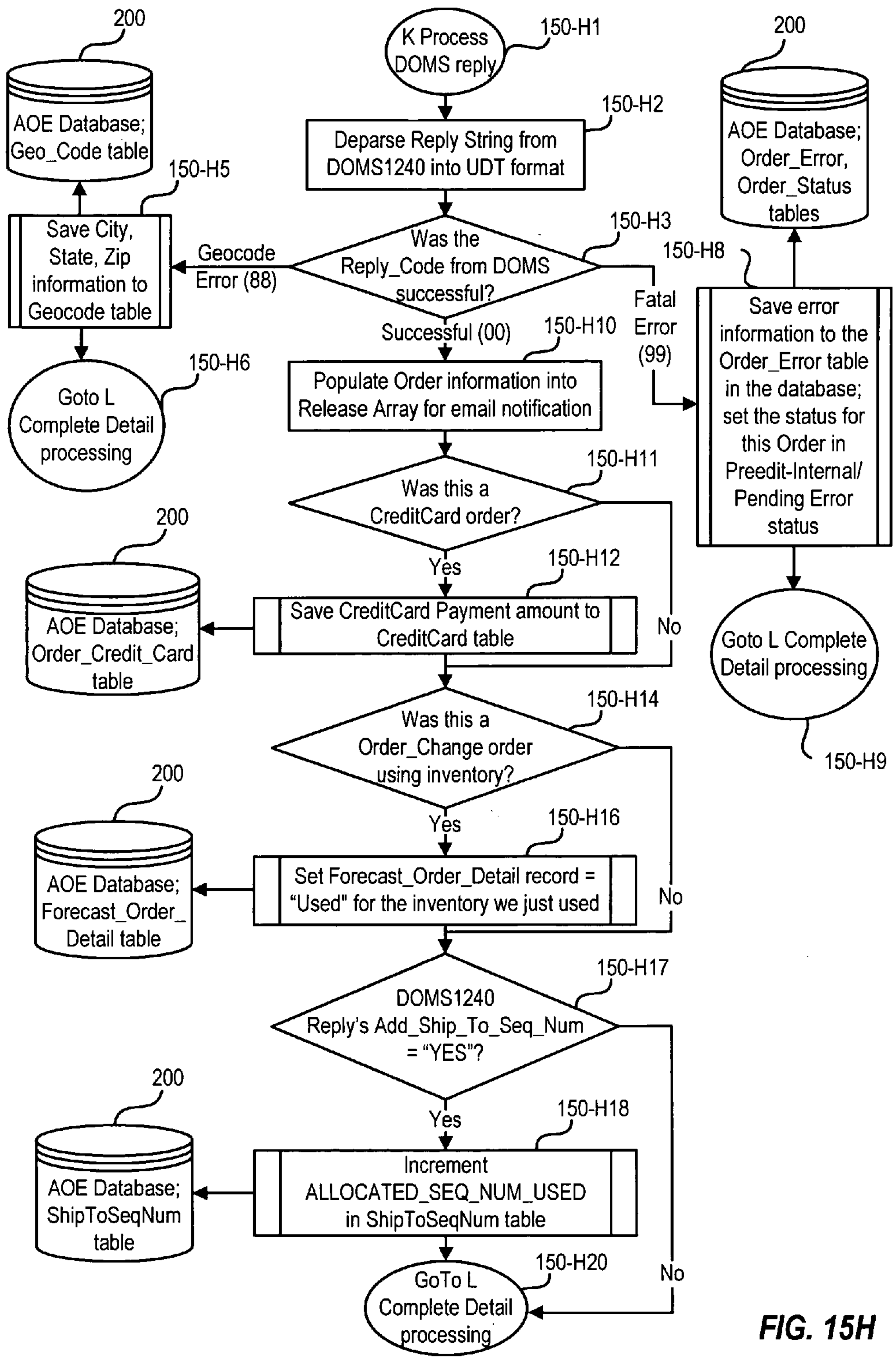
Figure 15I:
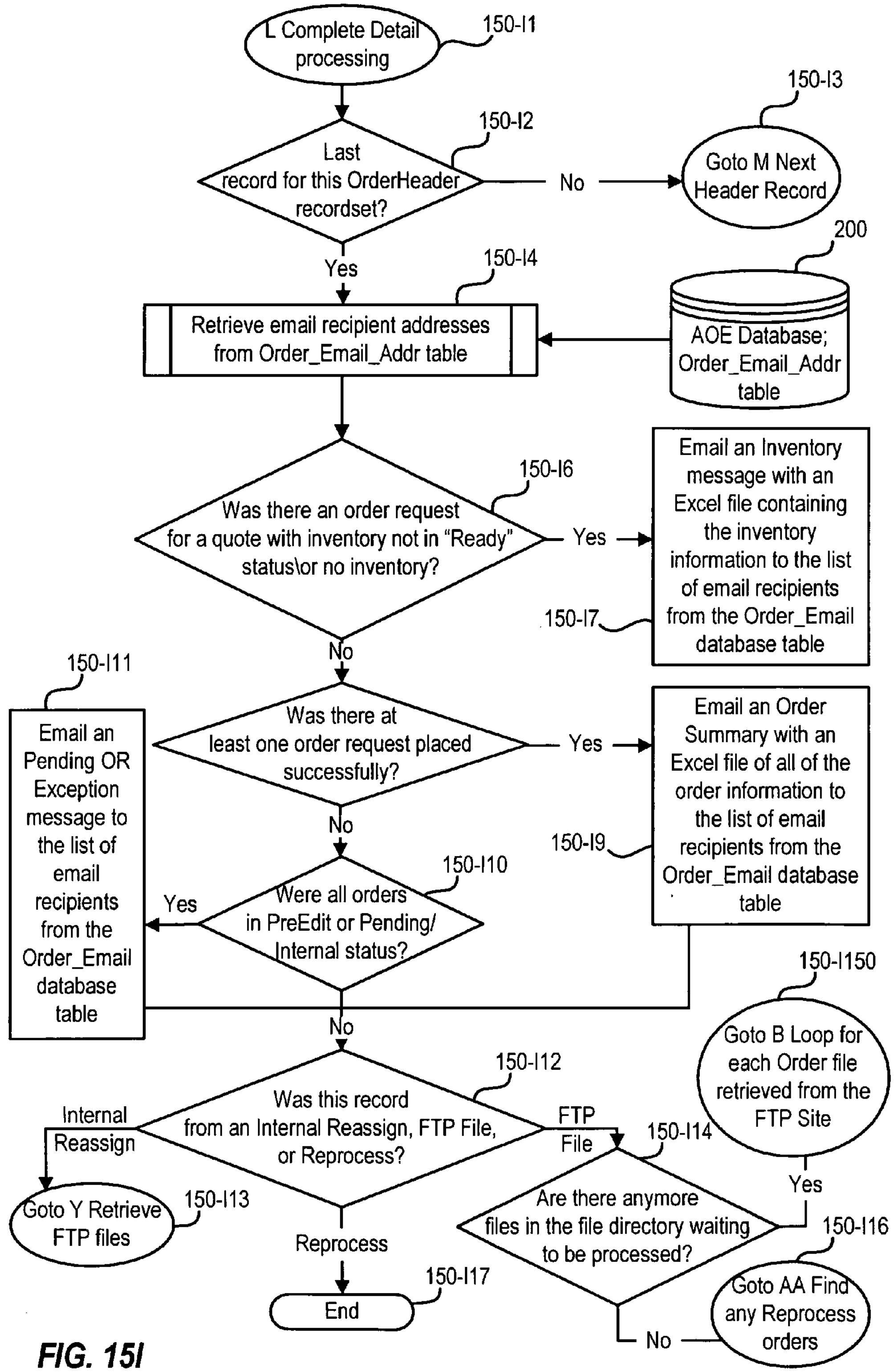
Figure 15P:
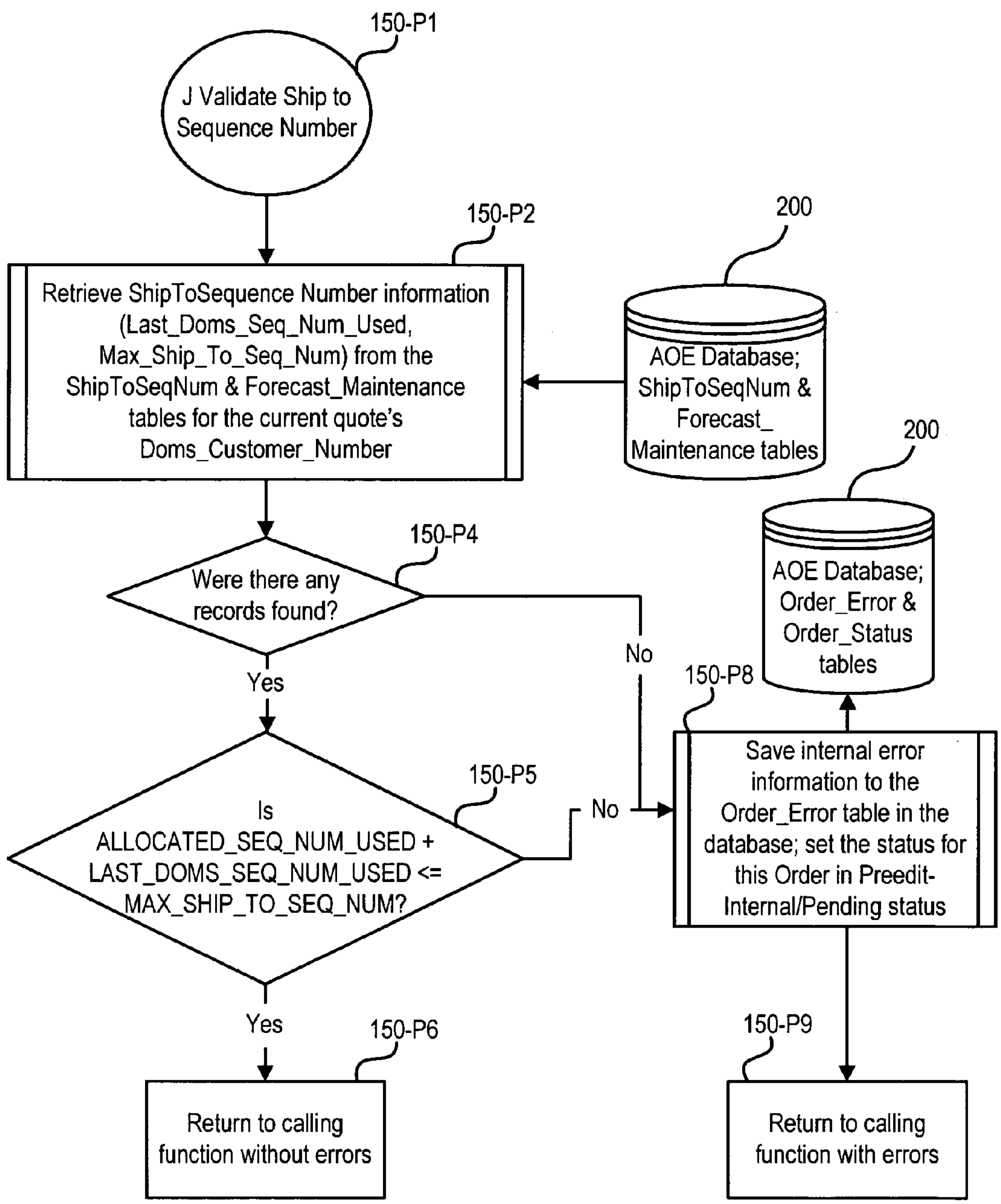
Figure 15Q:
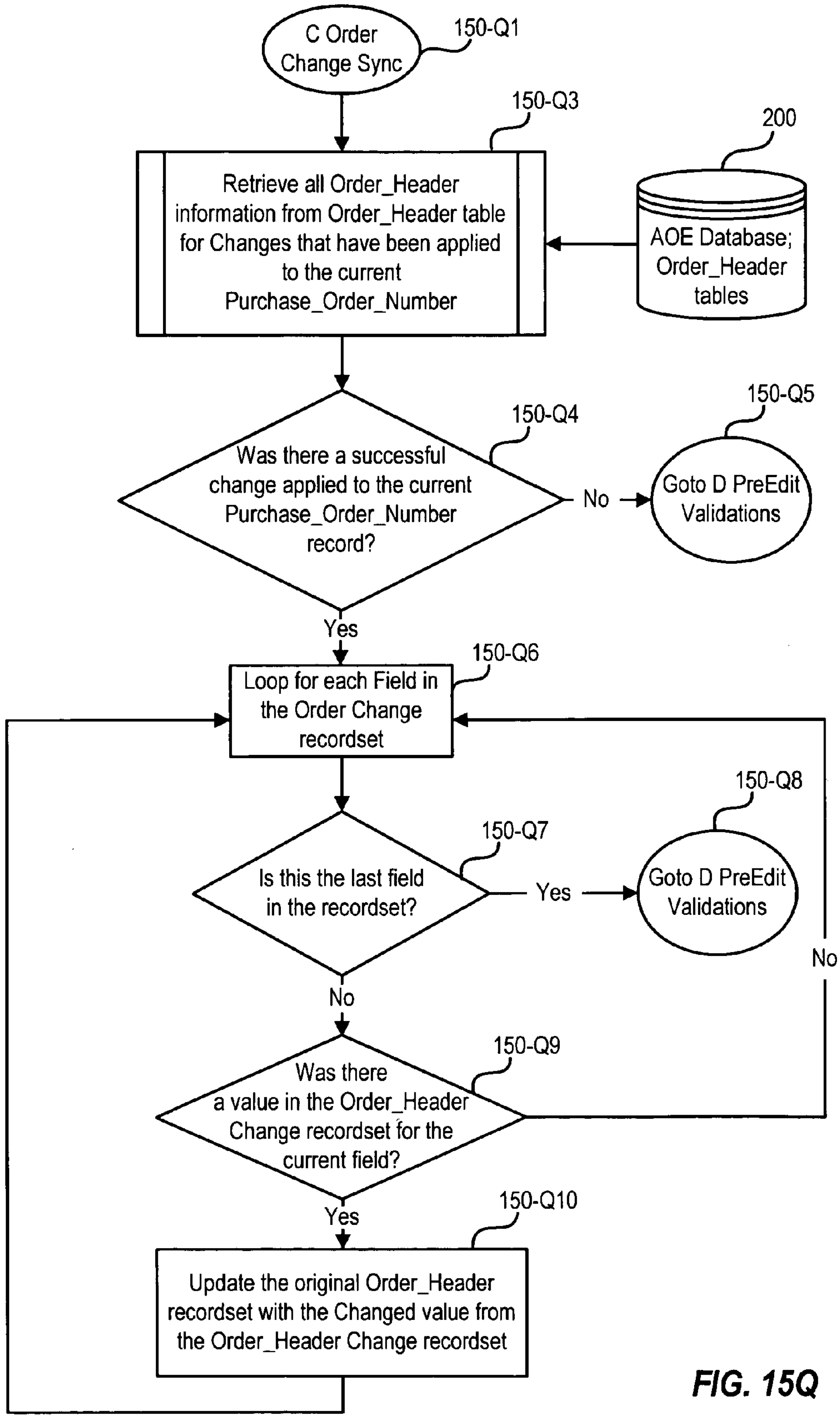
Figure 15R:
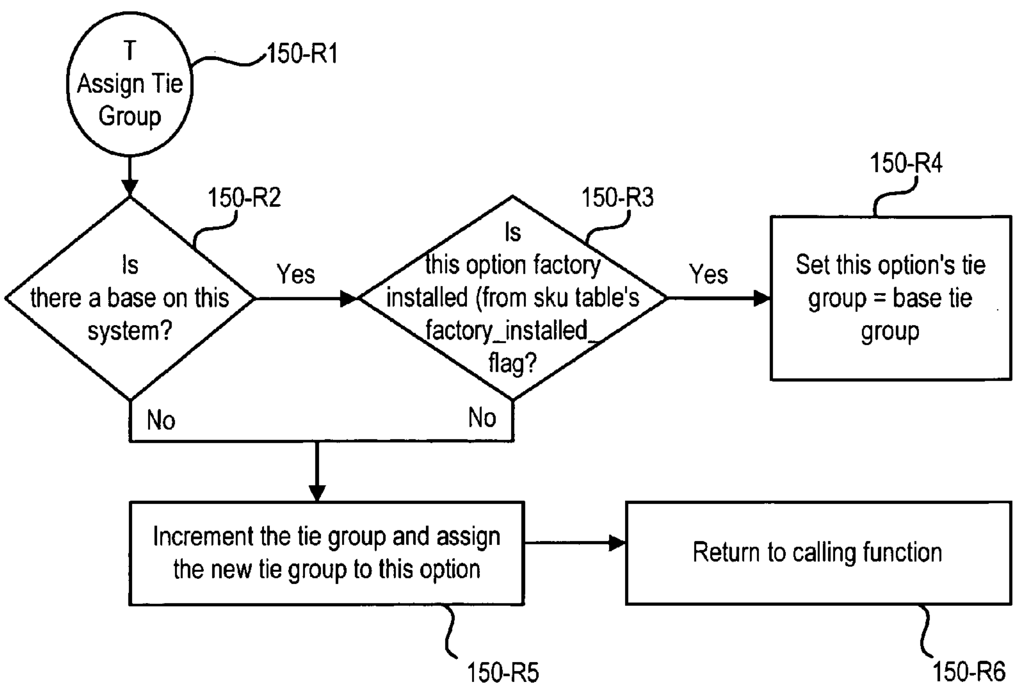
Figure 15S:
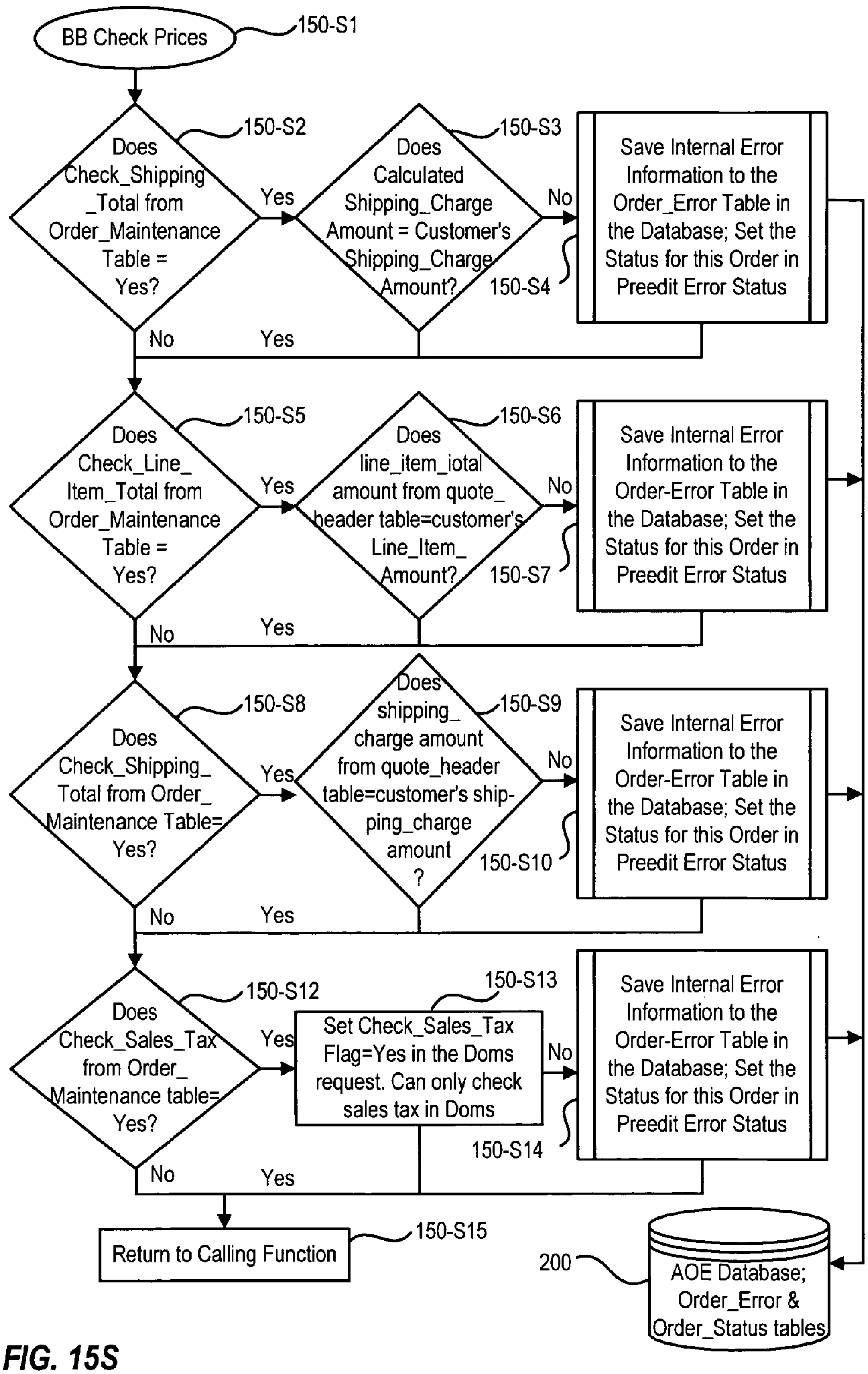
Figure 16:
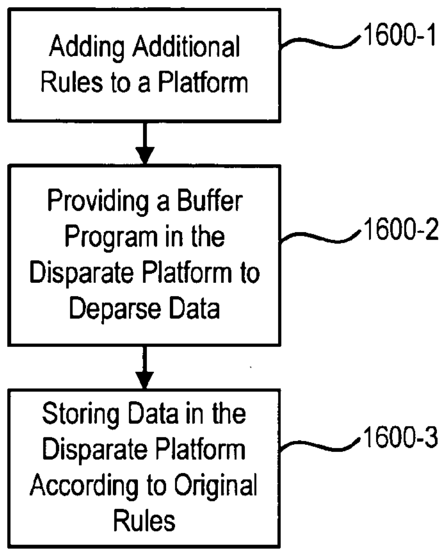
Figures 1, 17:
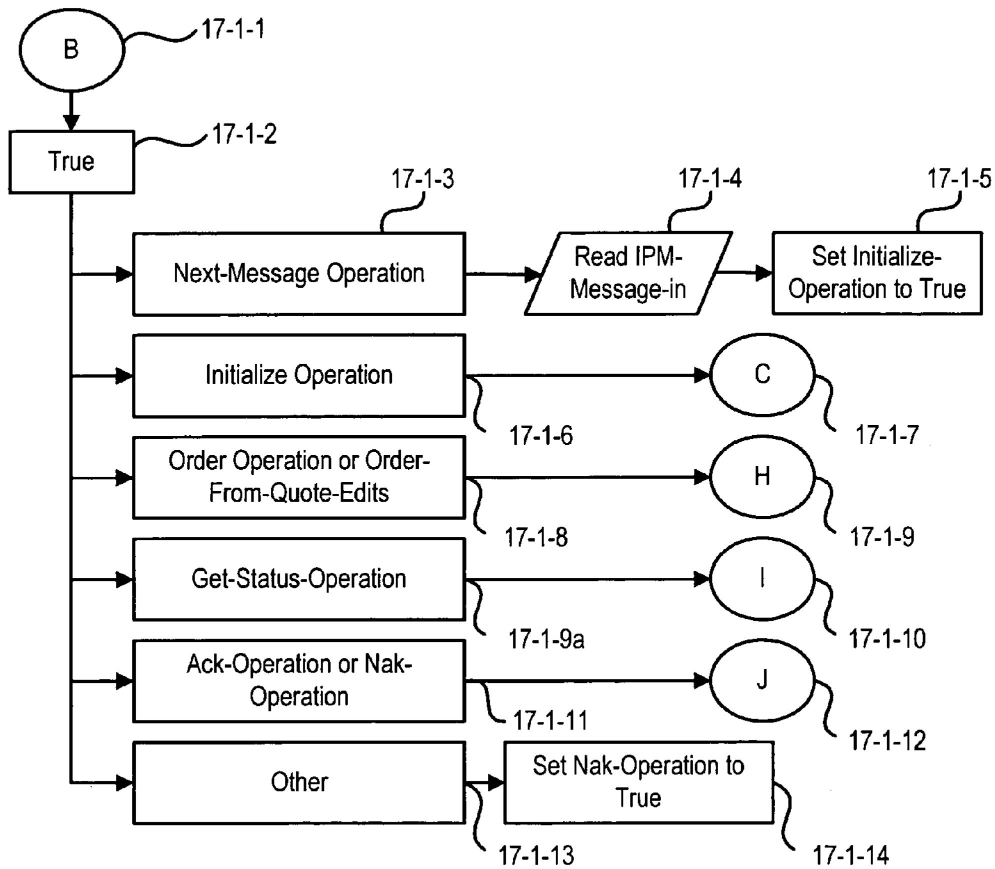
Figures 2, 17:
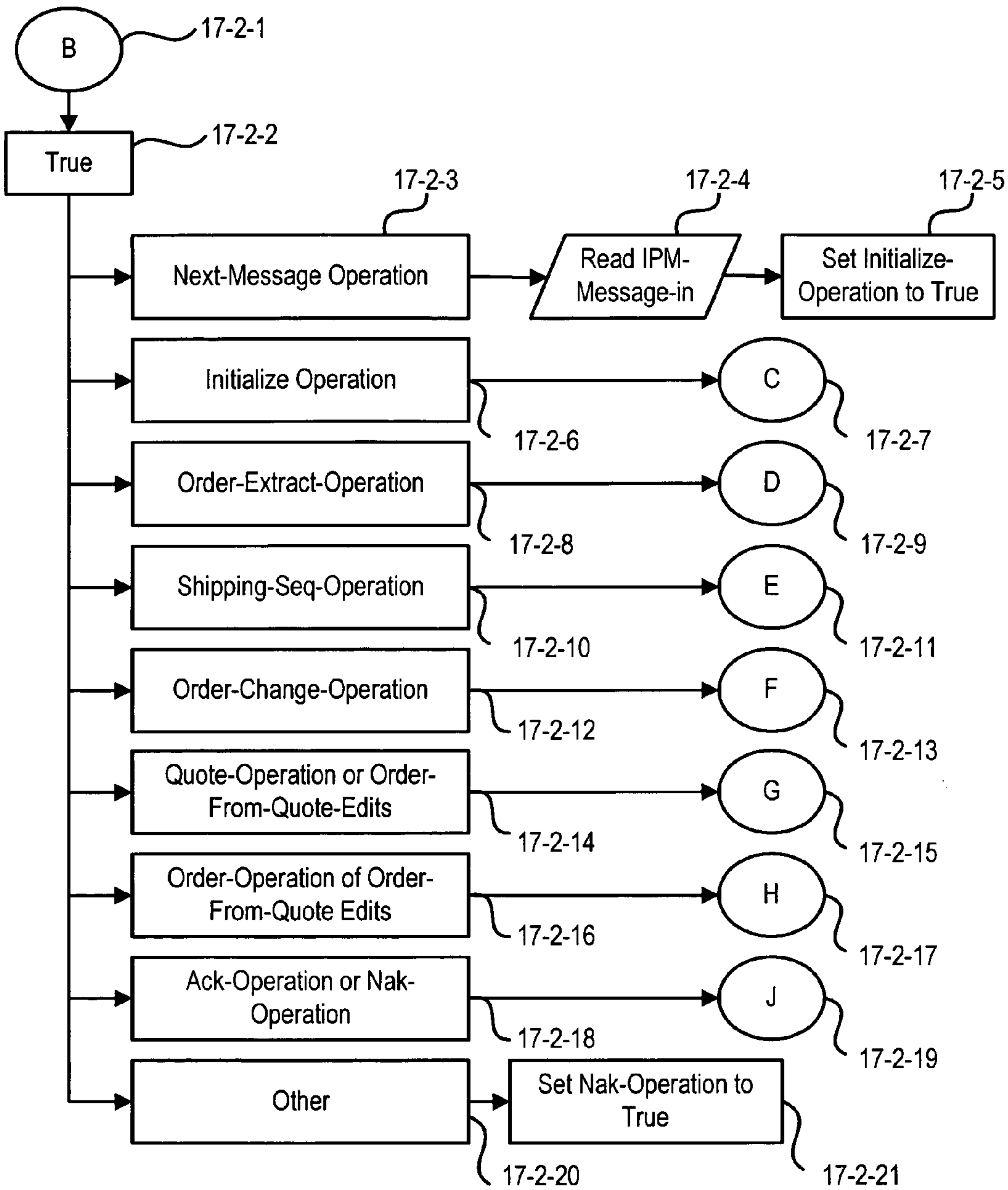
Figures 3, 17:
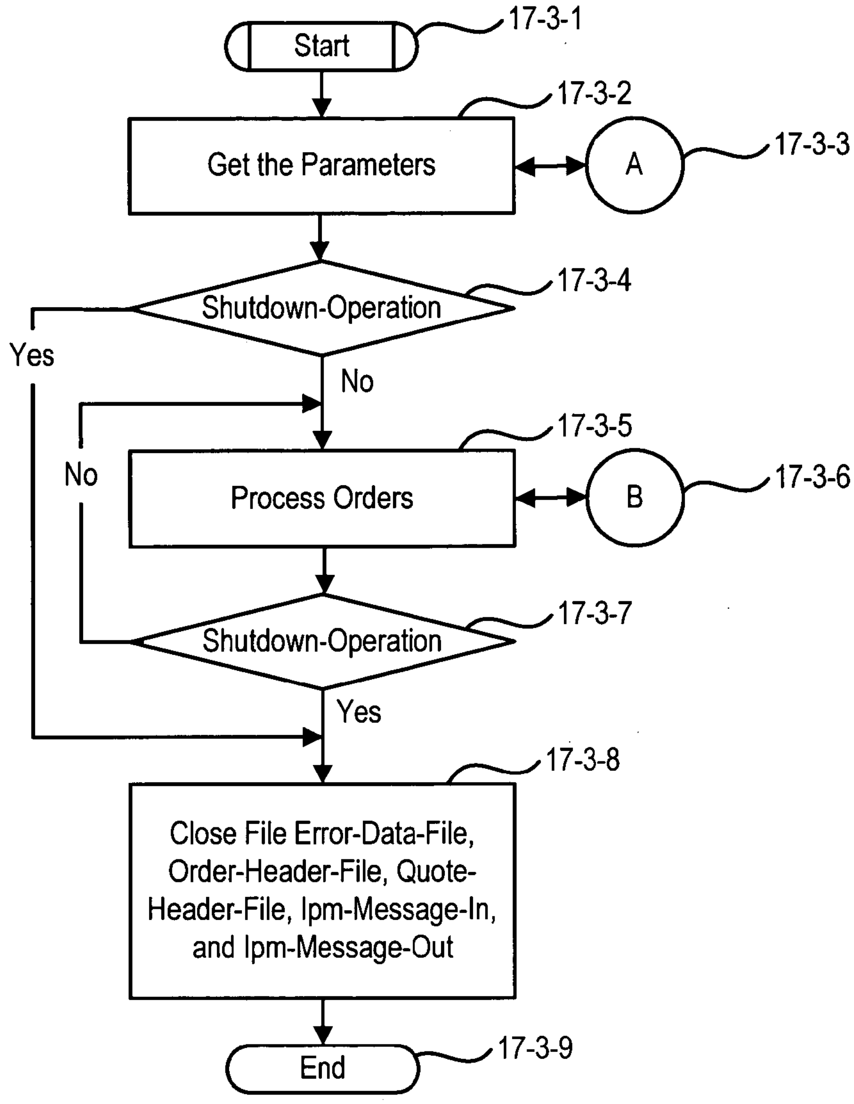
Figures 4, 17:
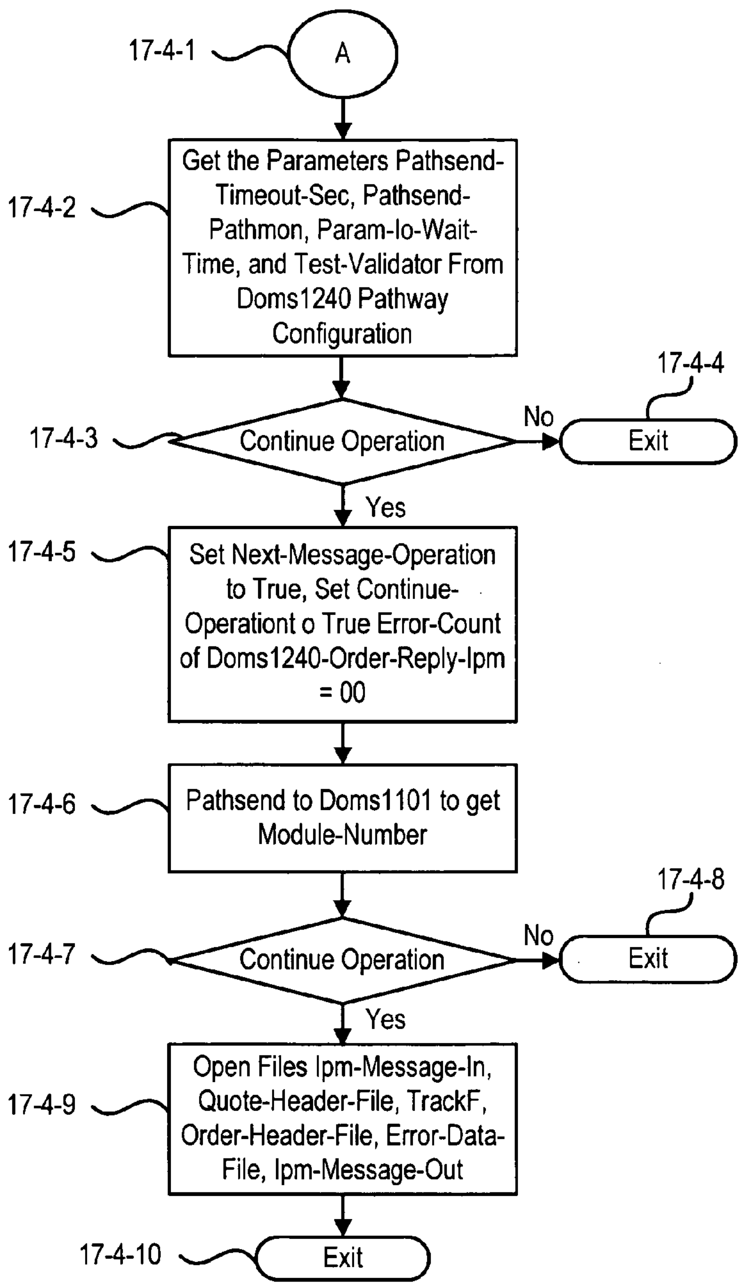
Figures 5, 17:
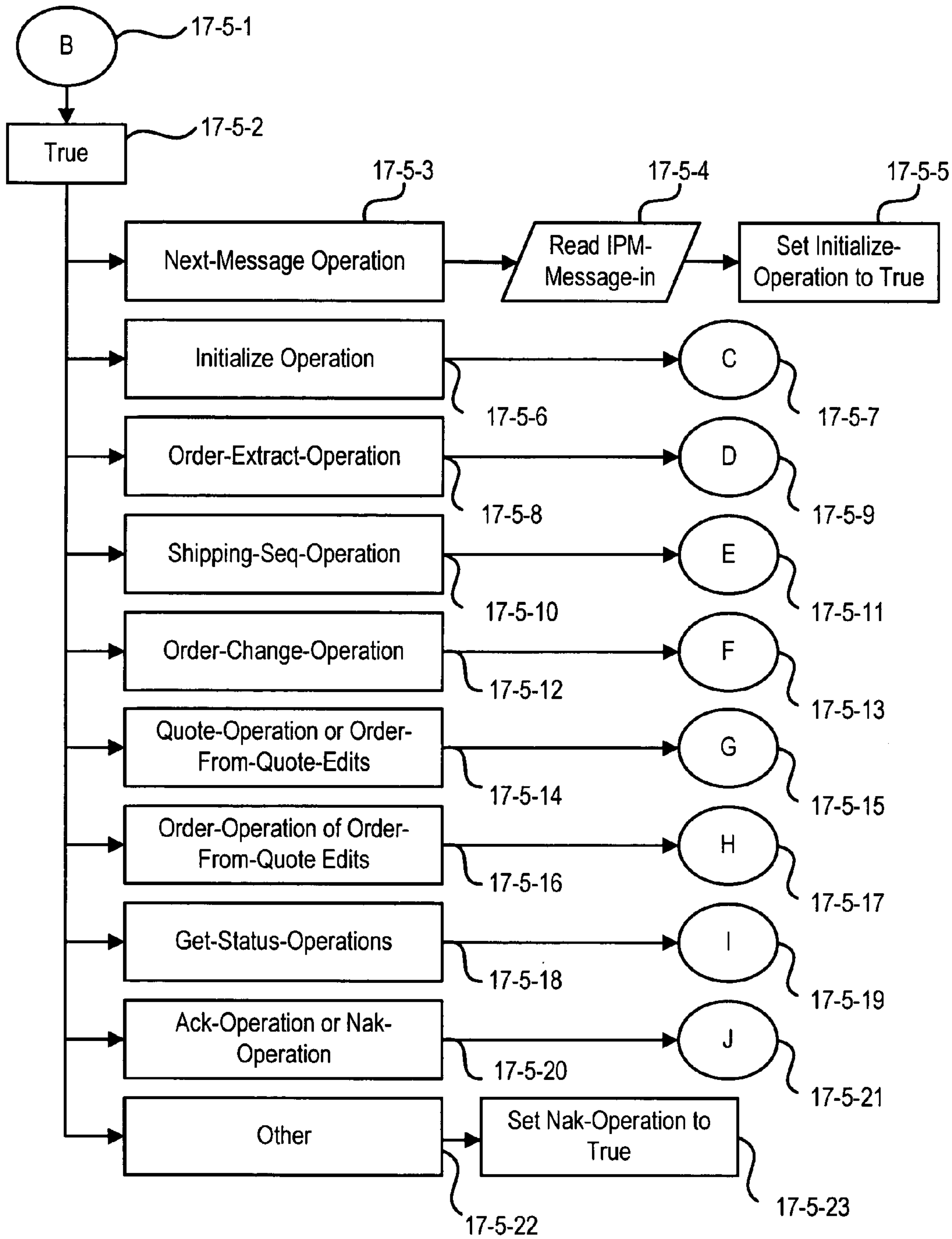
Figures 6, 17:
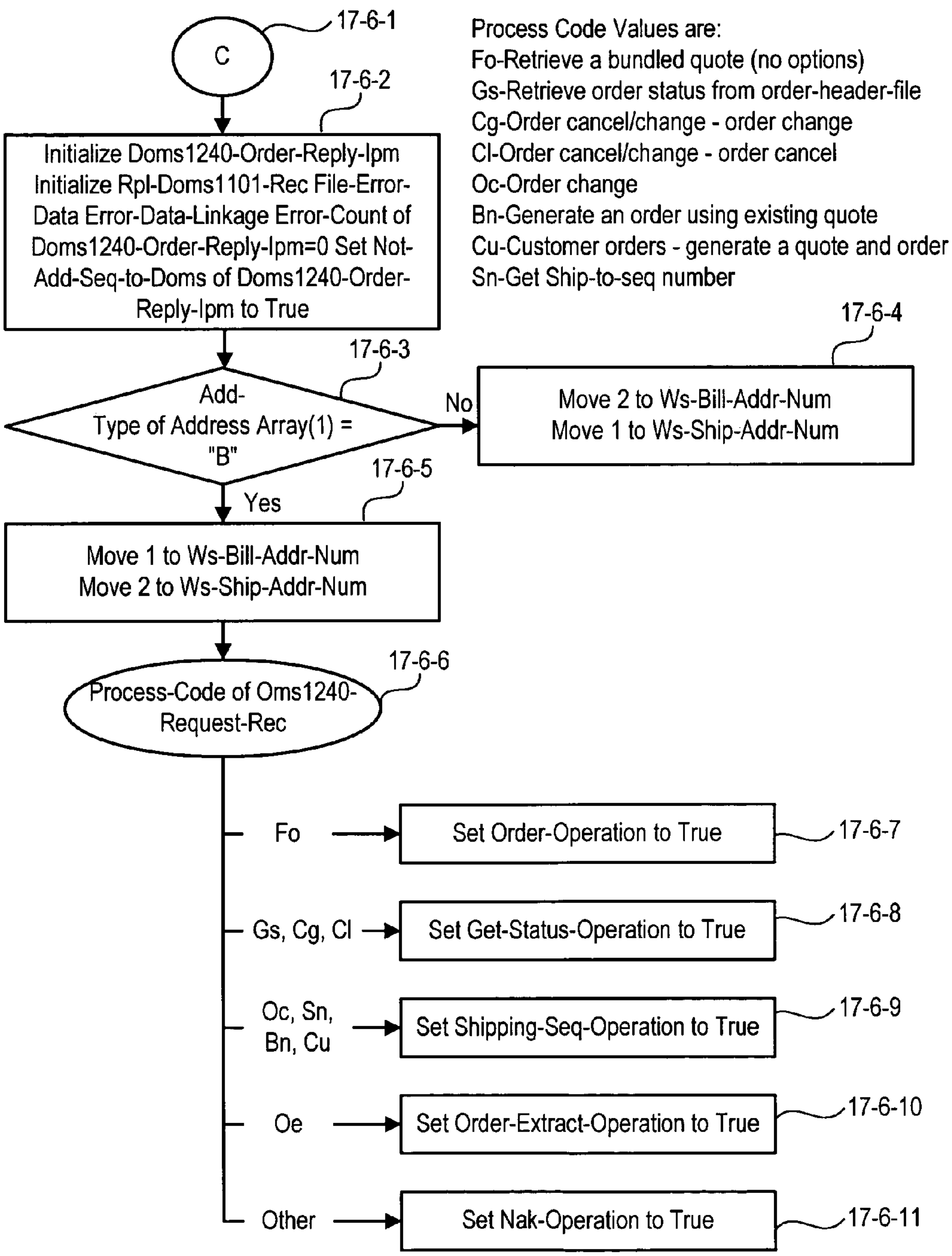
Figures 7, 17:
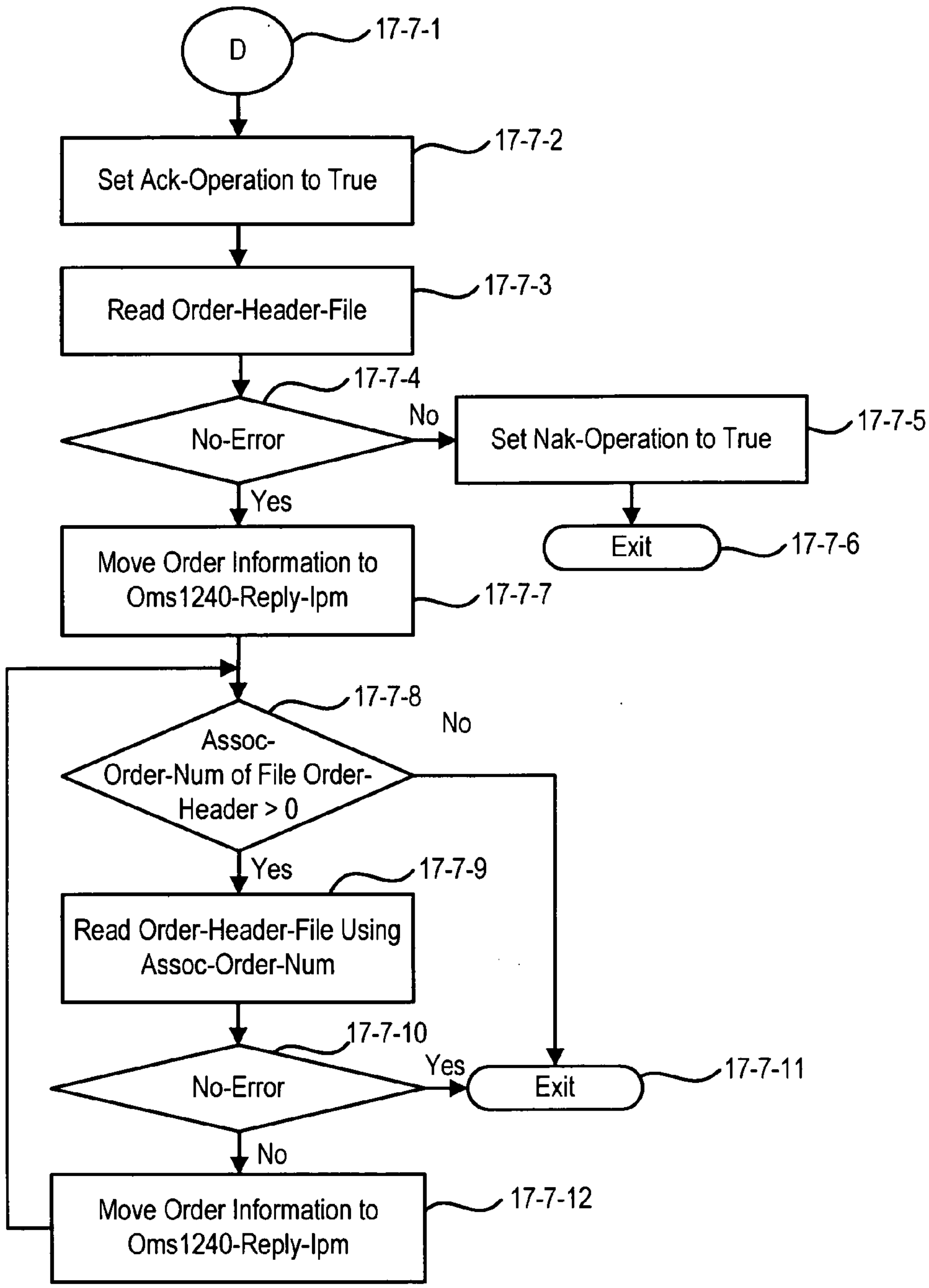
Figures 8, 17:
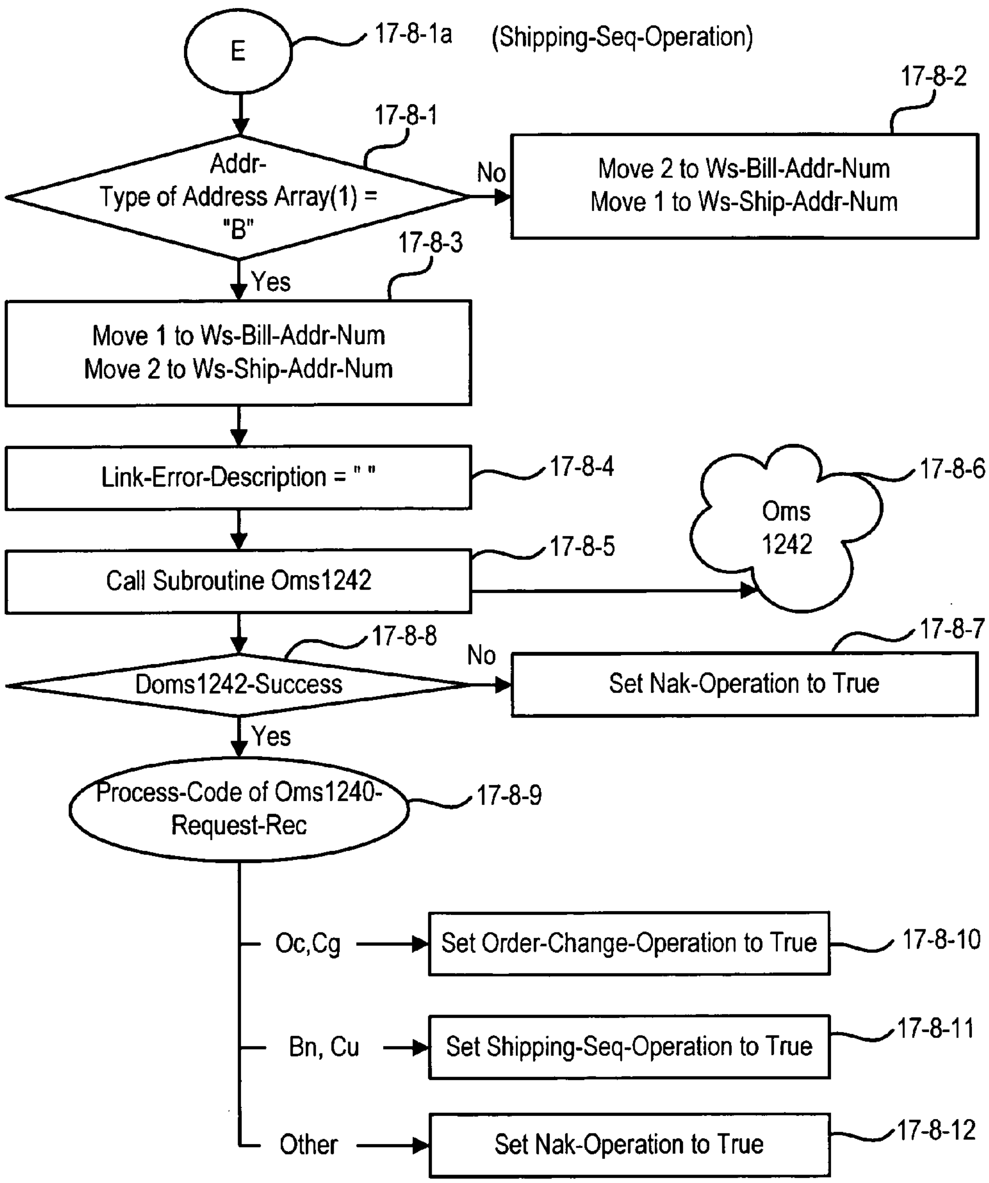
Figures 9, 17:
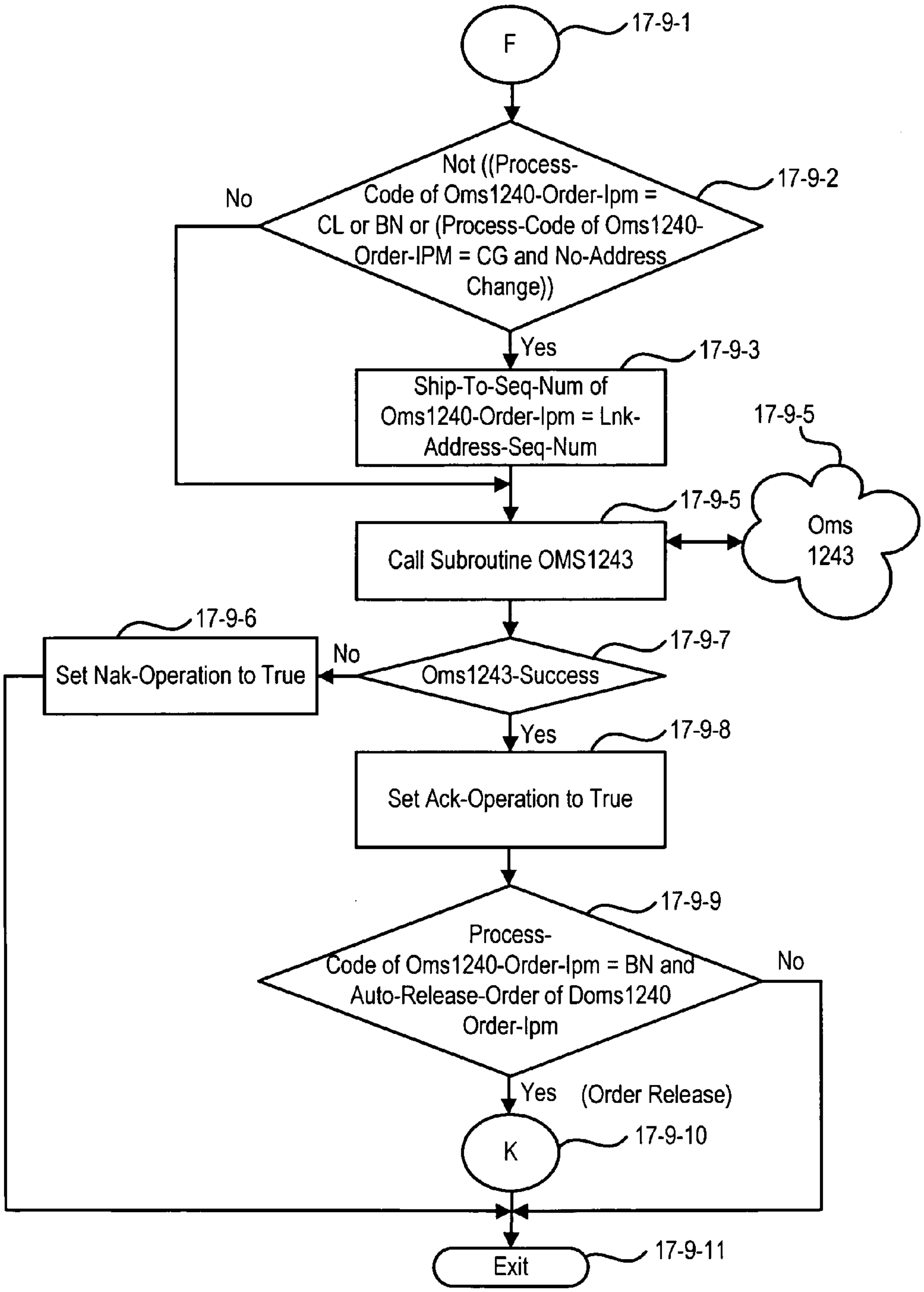
Figures 10, 17:
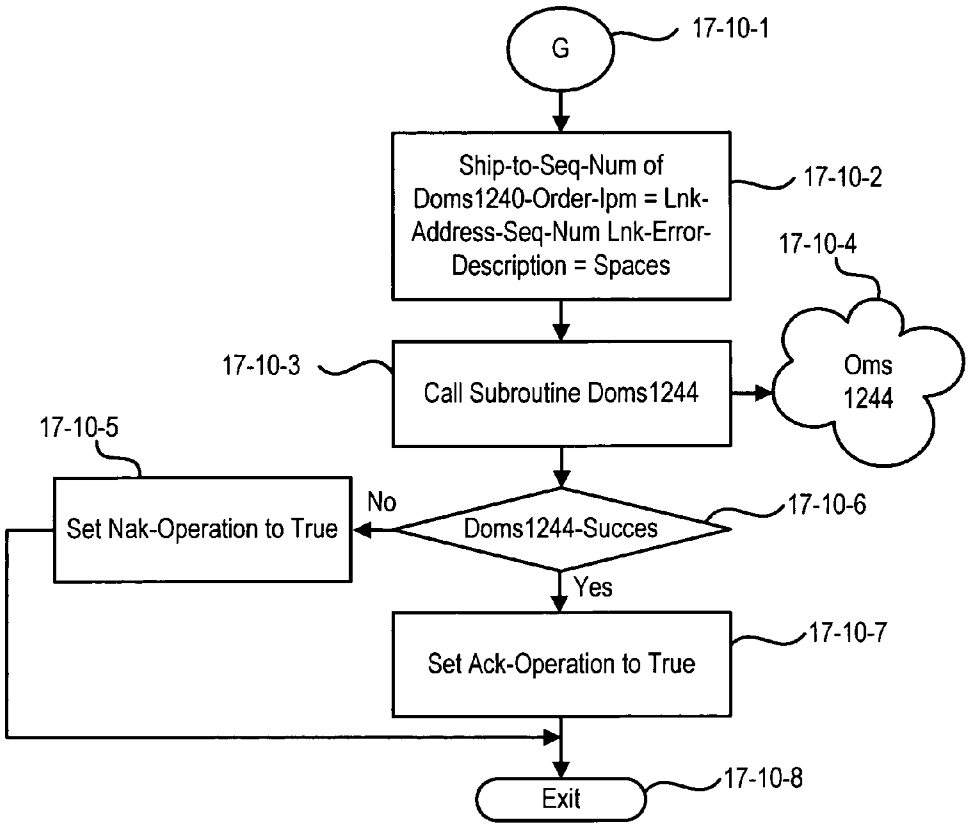
Figures 11, 17:
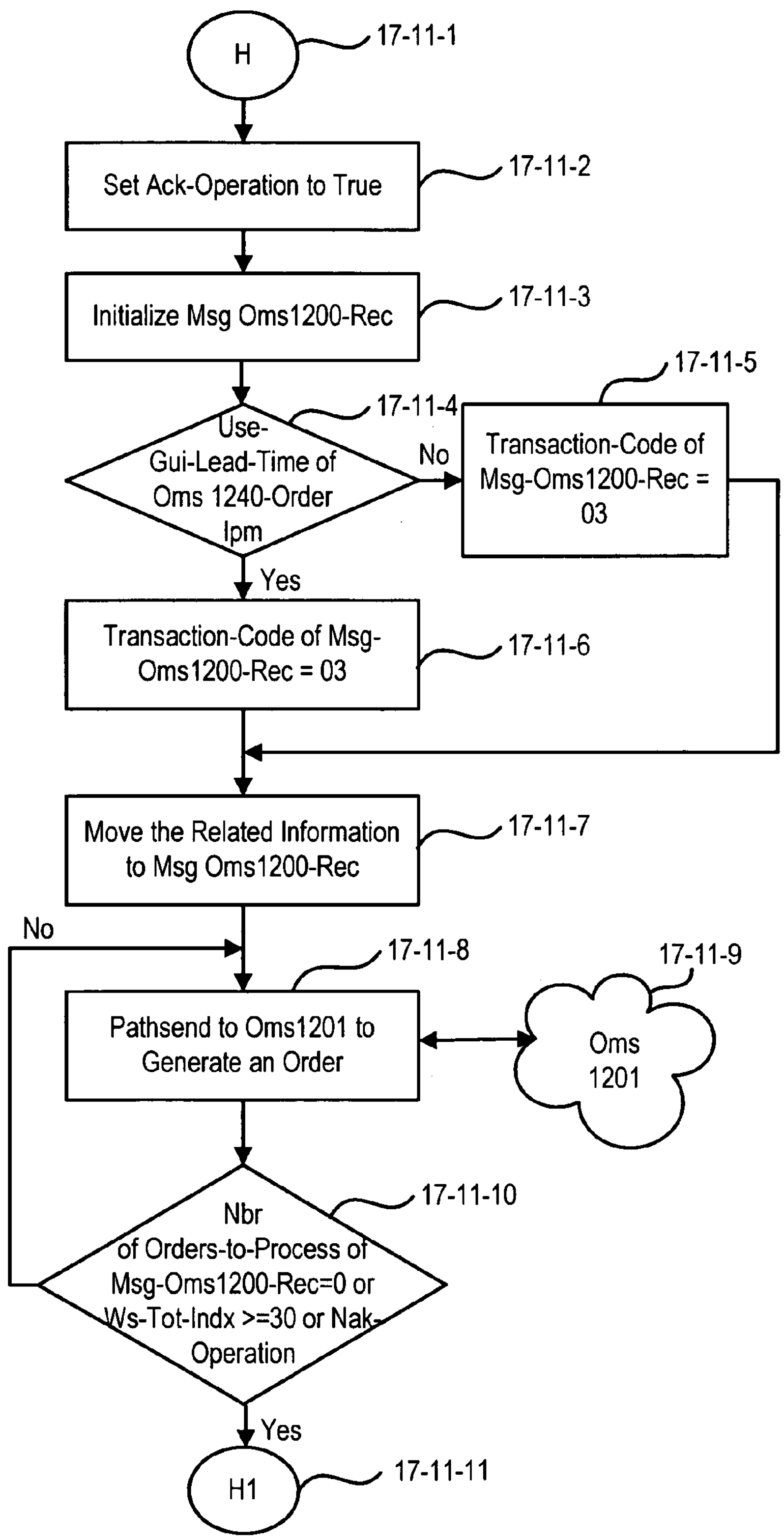
Figures 12, 17:
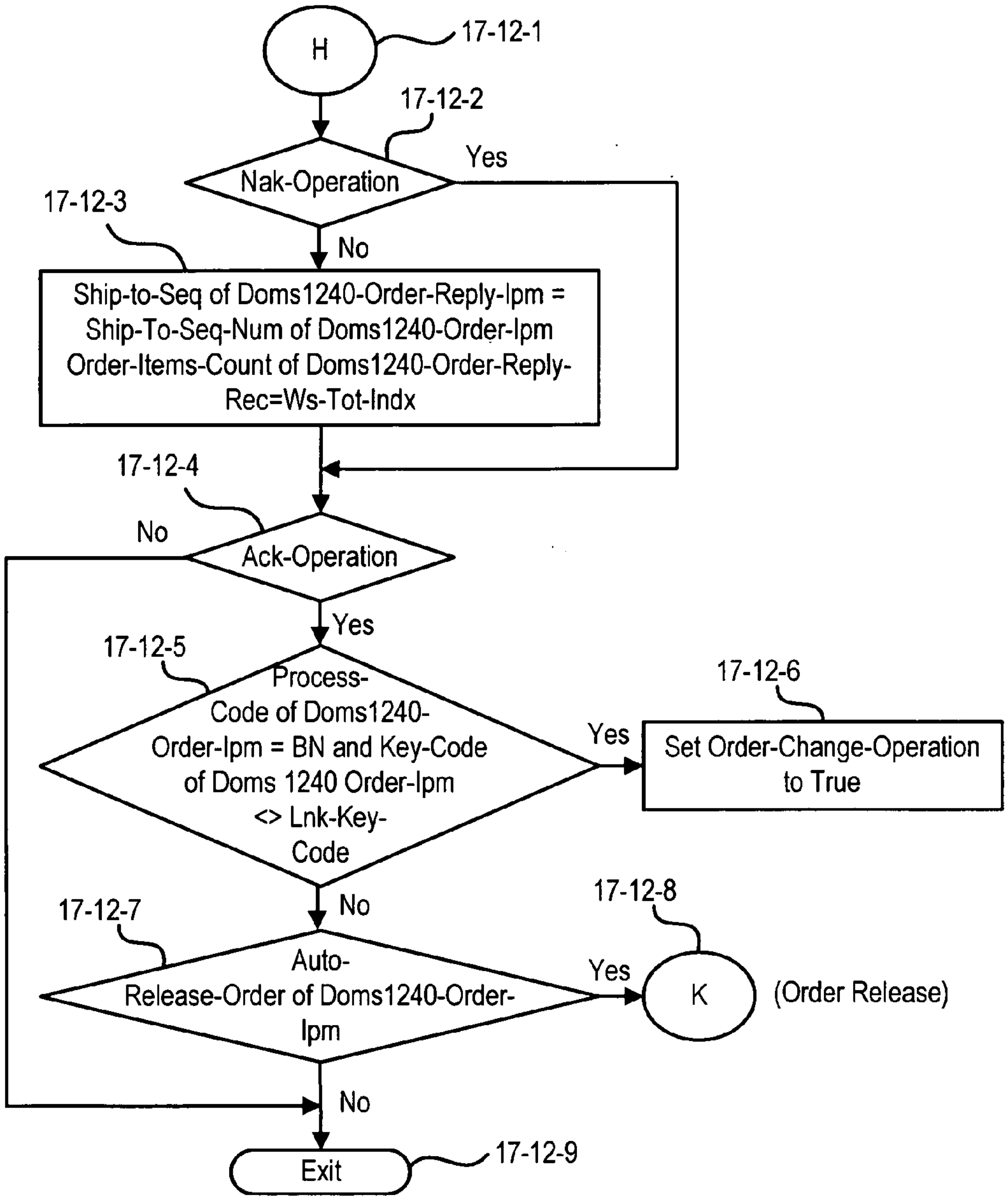
Figures 13, 17:
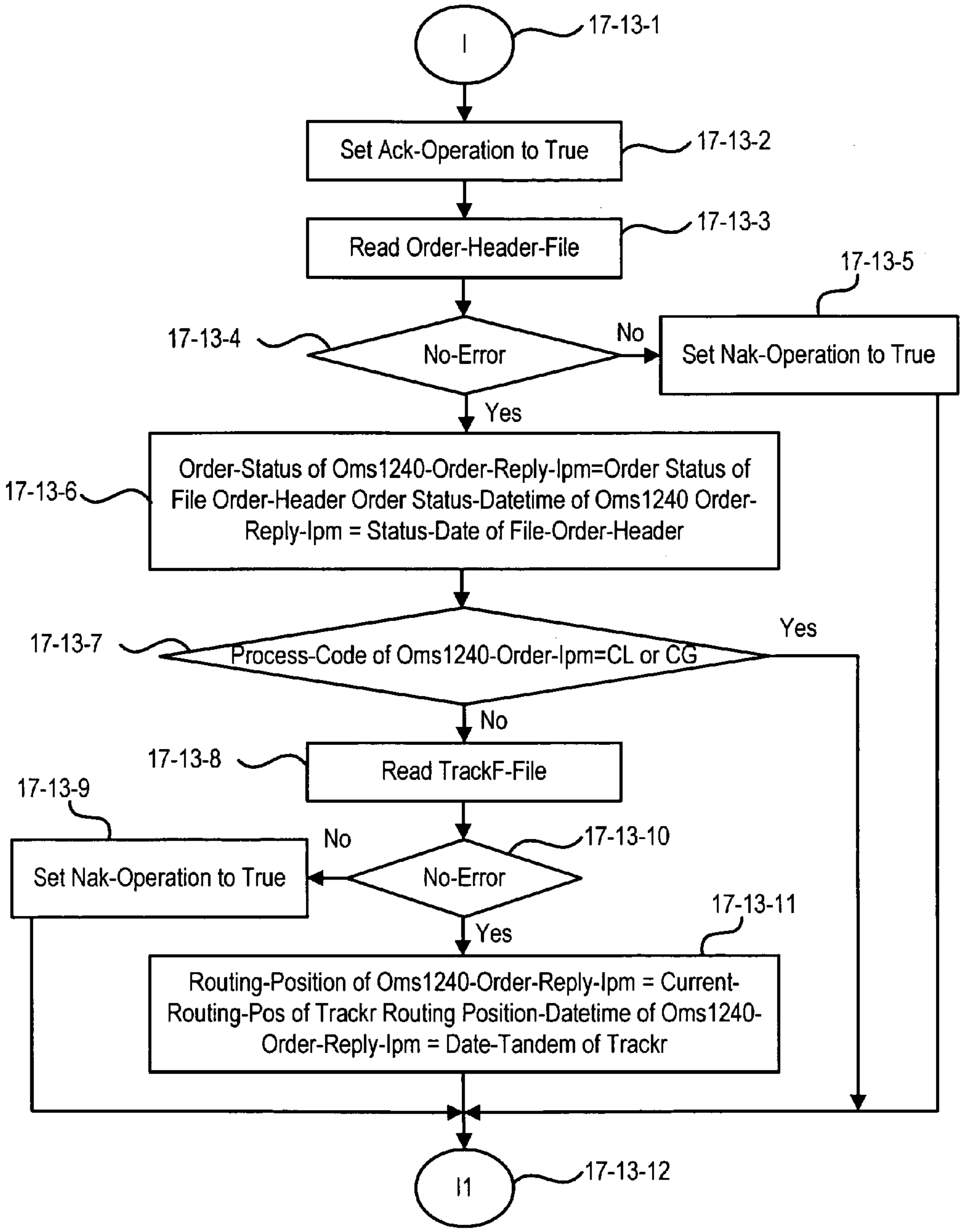
Figures 14, 17:
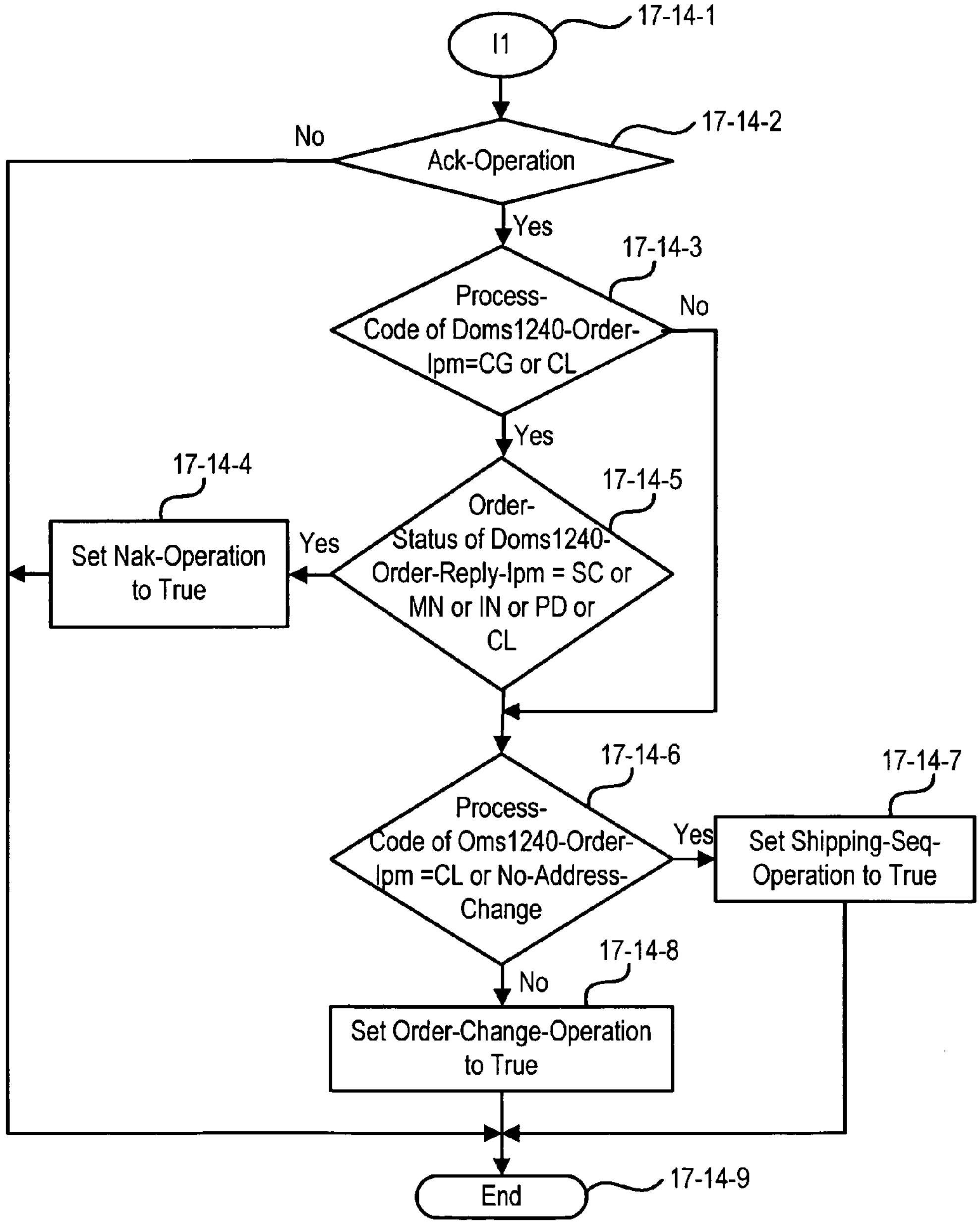
Figures 15, 17:
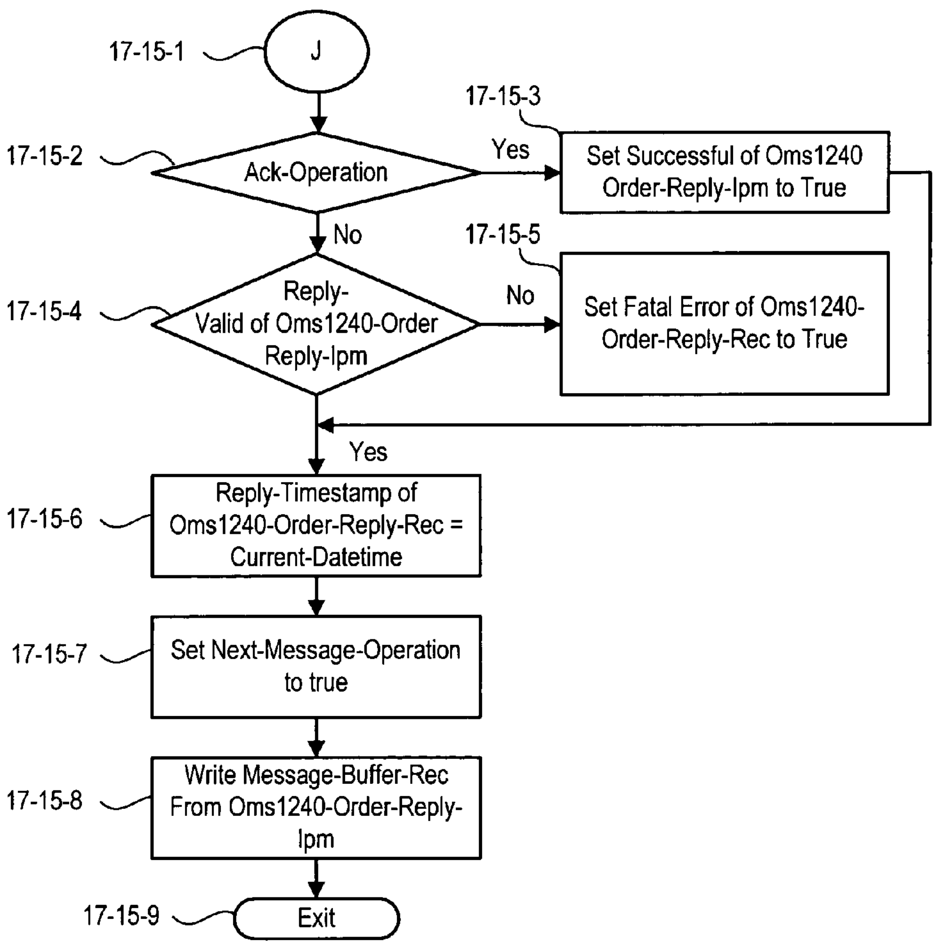
Figures 16, 17:
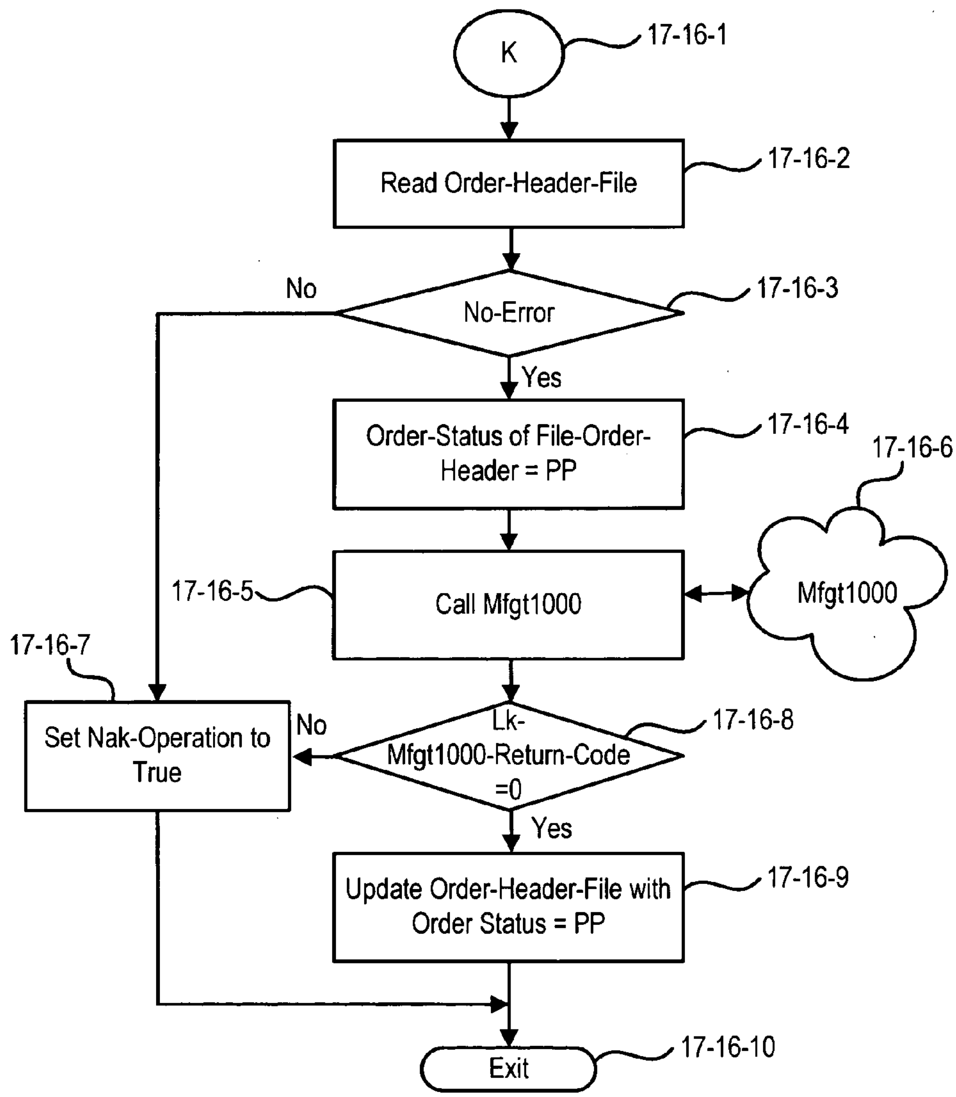
Figure 17:
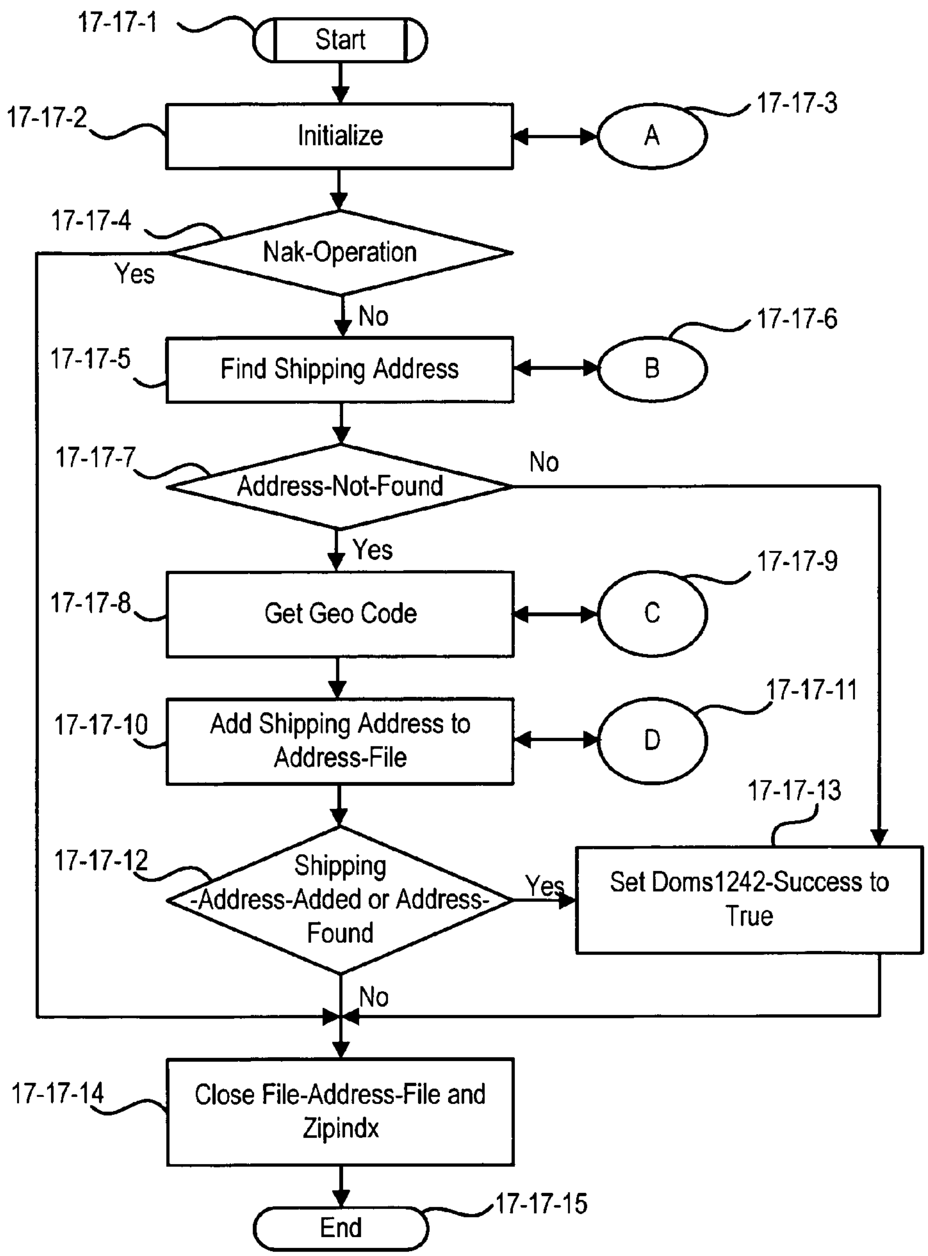
Figures 17, 18:
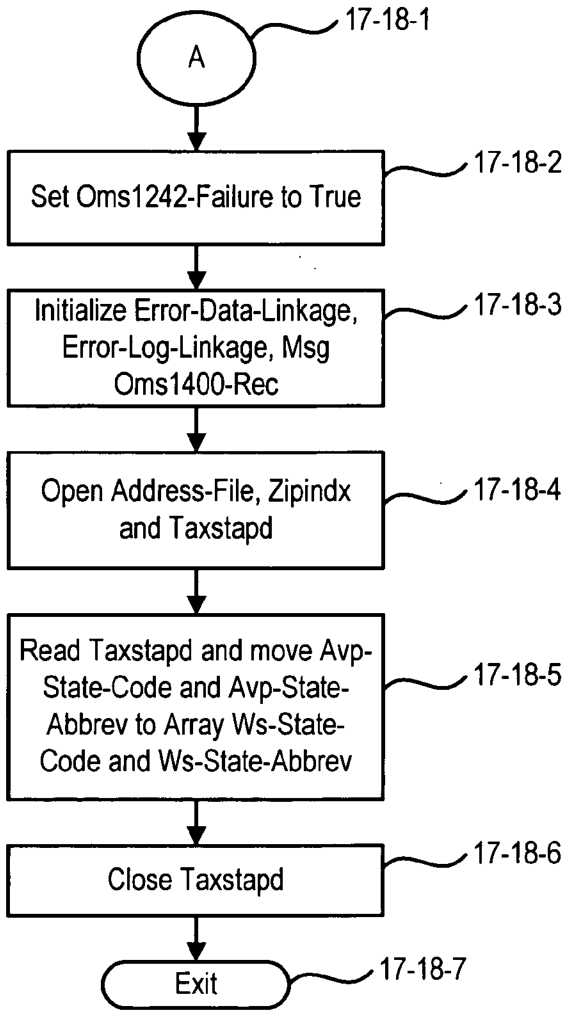
Figures 17, 18, 19:
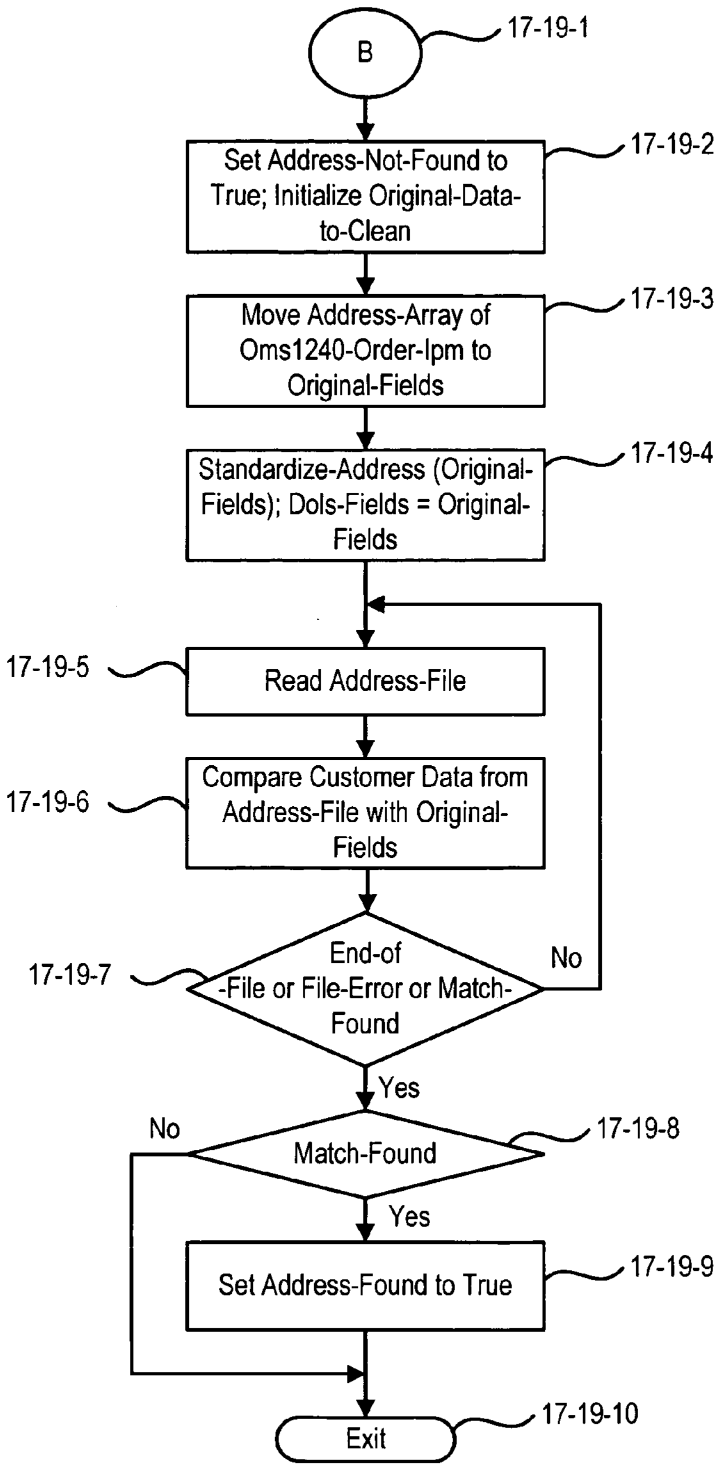
Figures 17, 18, 19, 20:
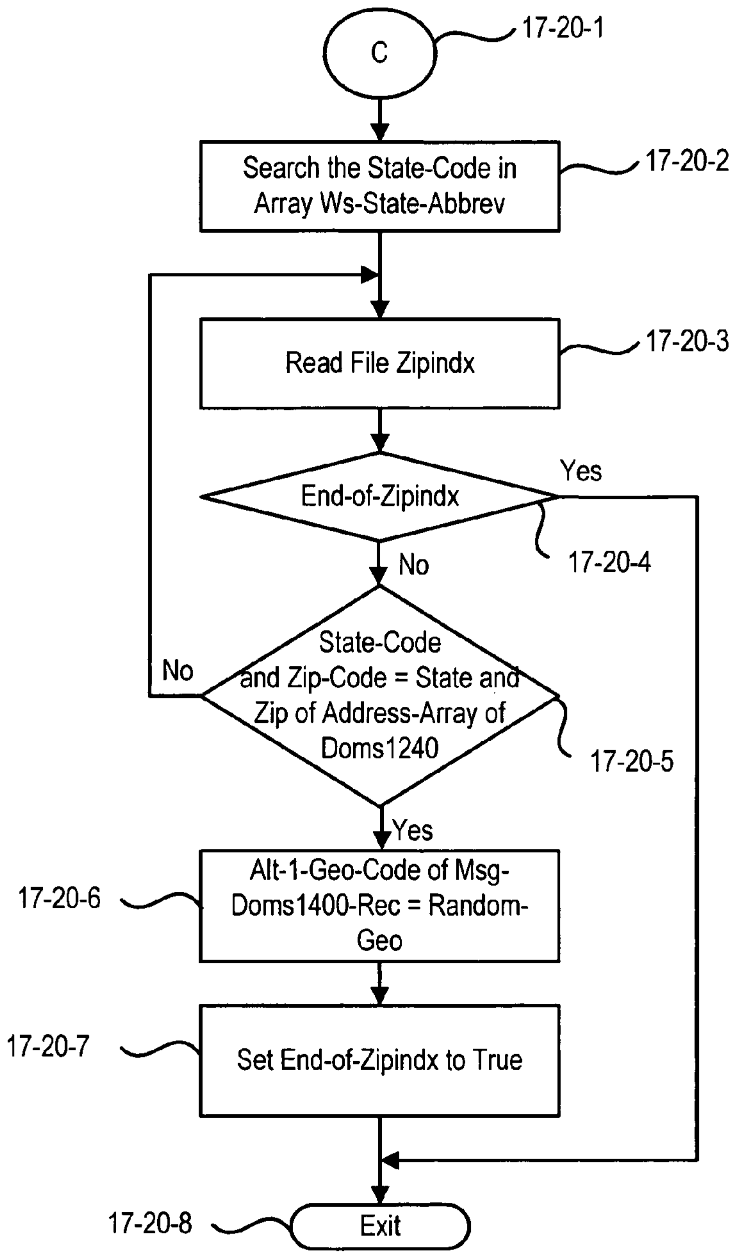
Figures 17, 18, 19, 20, 21:
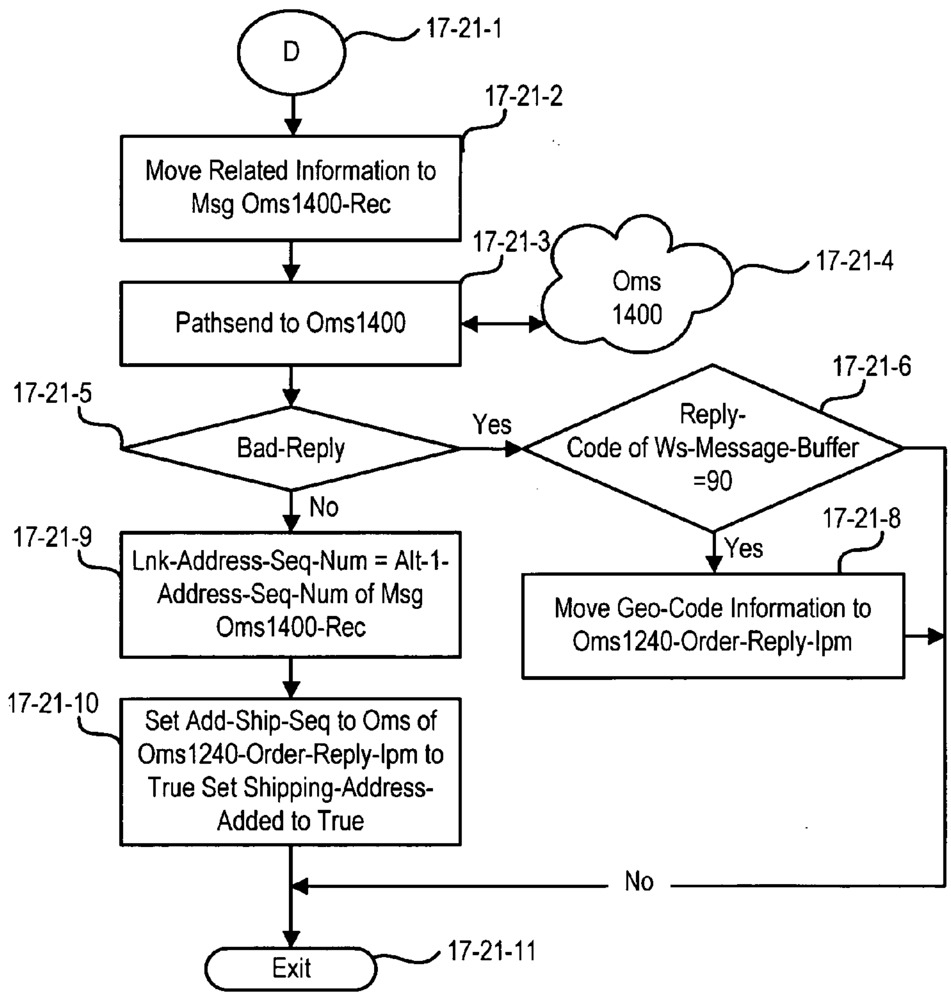
Figures 17, 18, 19, 20, 21, 22, 23:
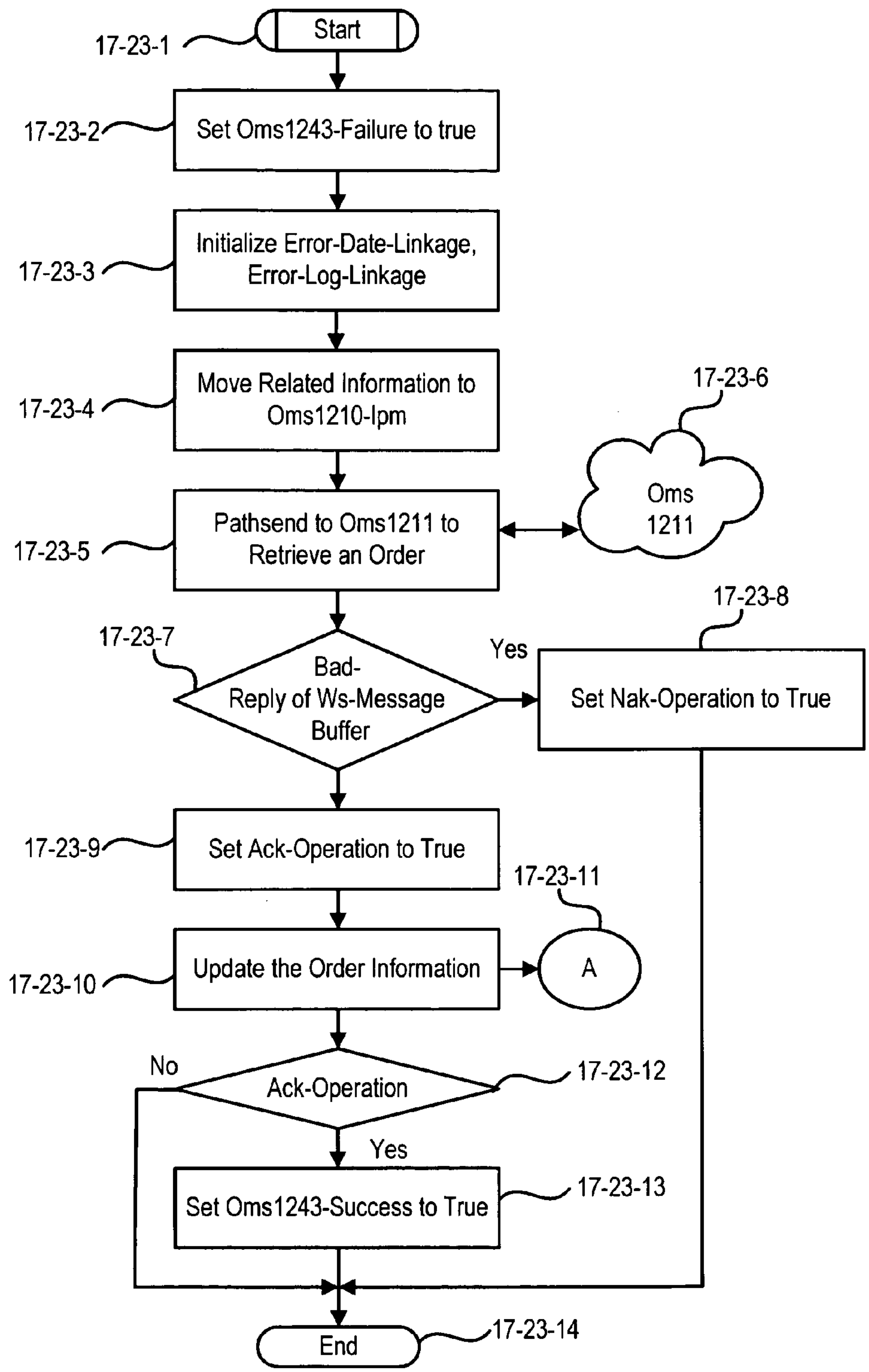
Figures 17, 18, 19, 20, 21, 22, 23, 24:
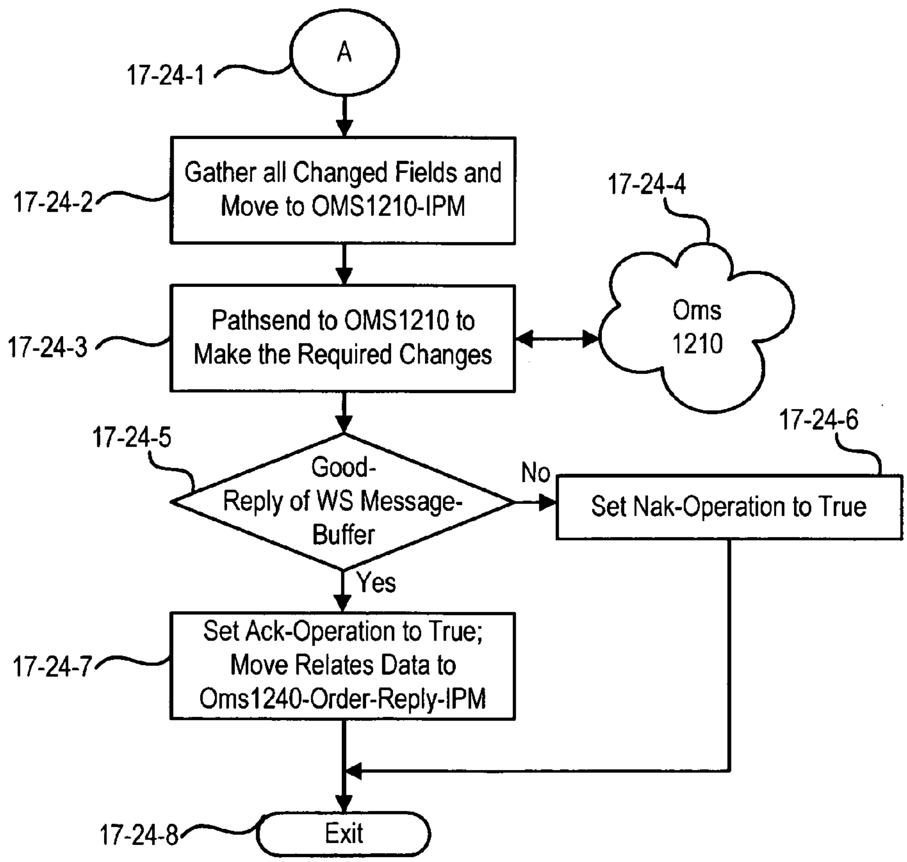
Figure 18A:
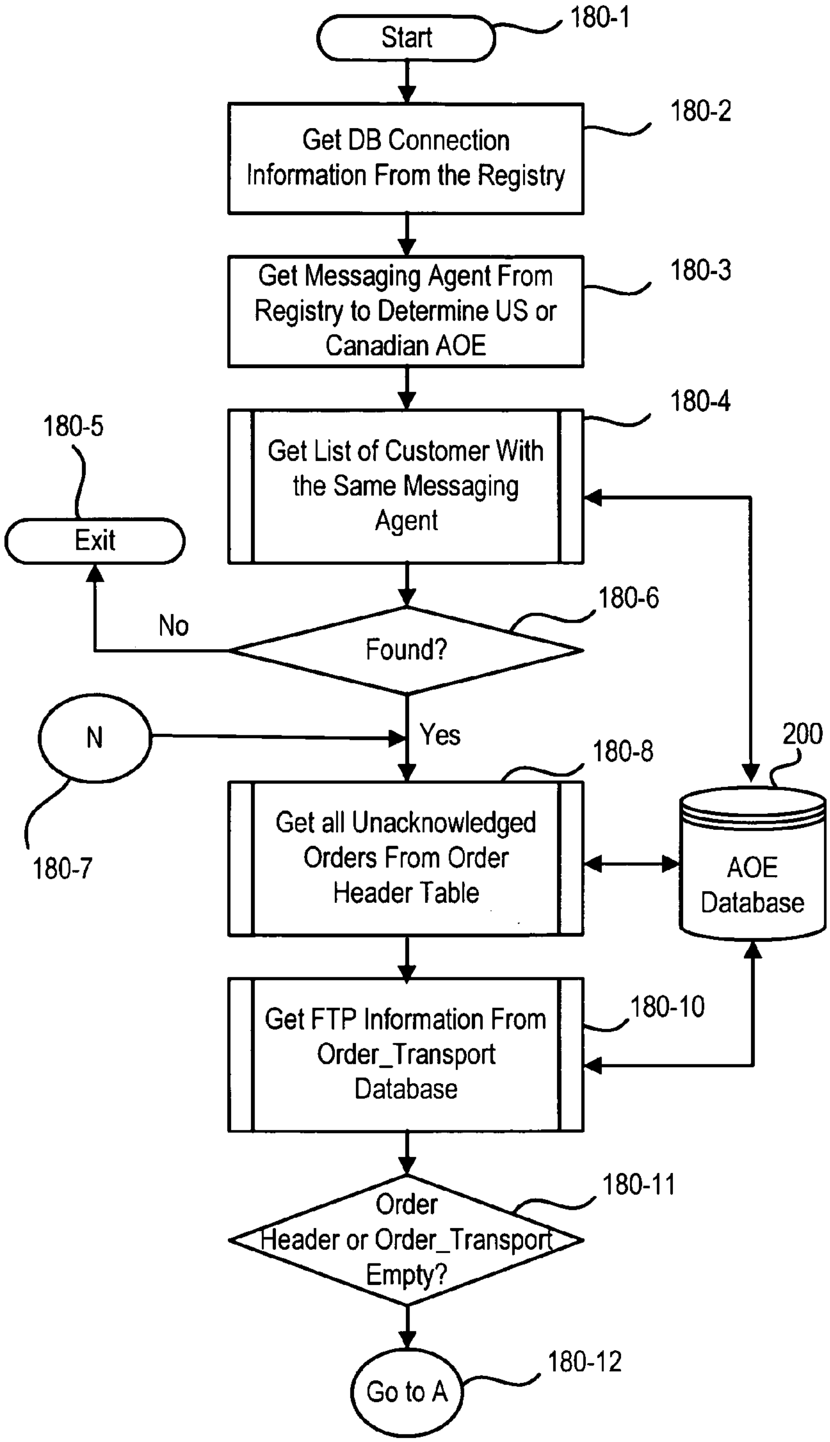
FIG. 18A through 18H is a logic flow diagram of a batch program for providing order acknowledgments in accordance with an embodiment of the present invention.
Figure 18B:
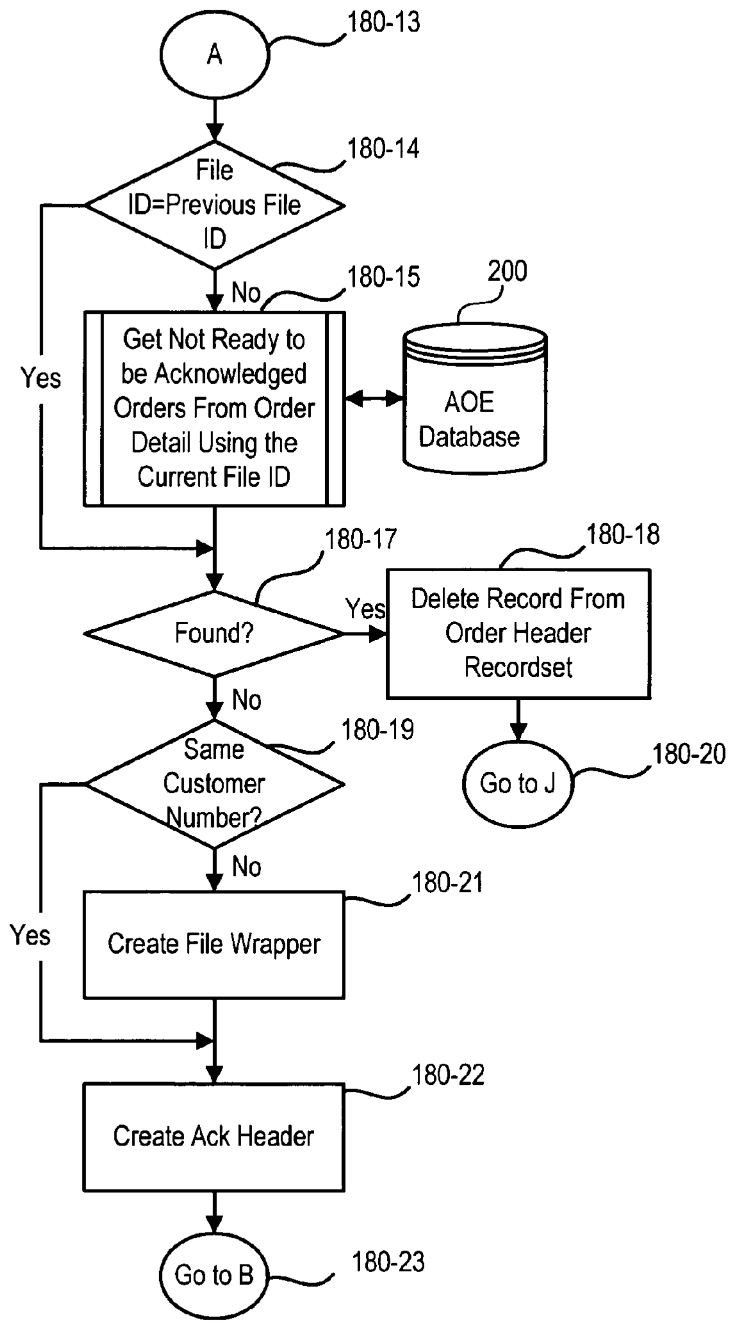
Figure 18C:
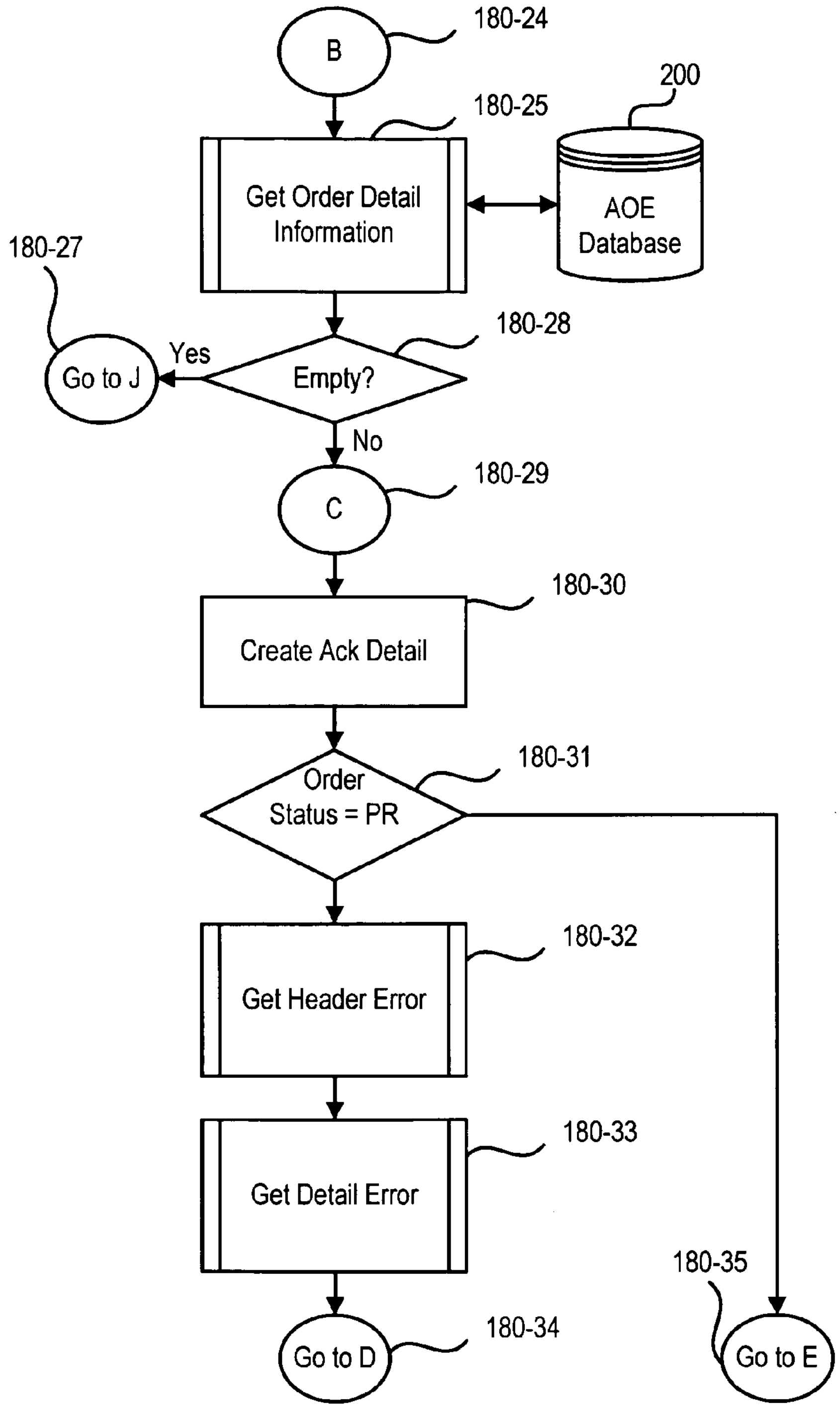
Figure 18D:
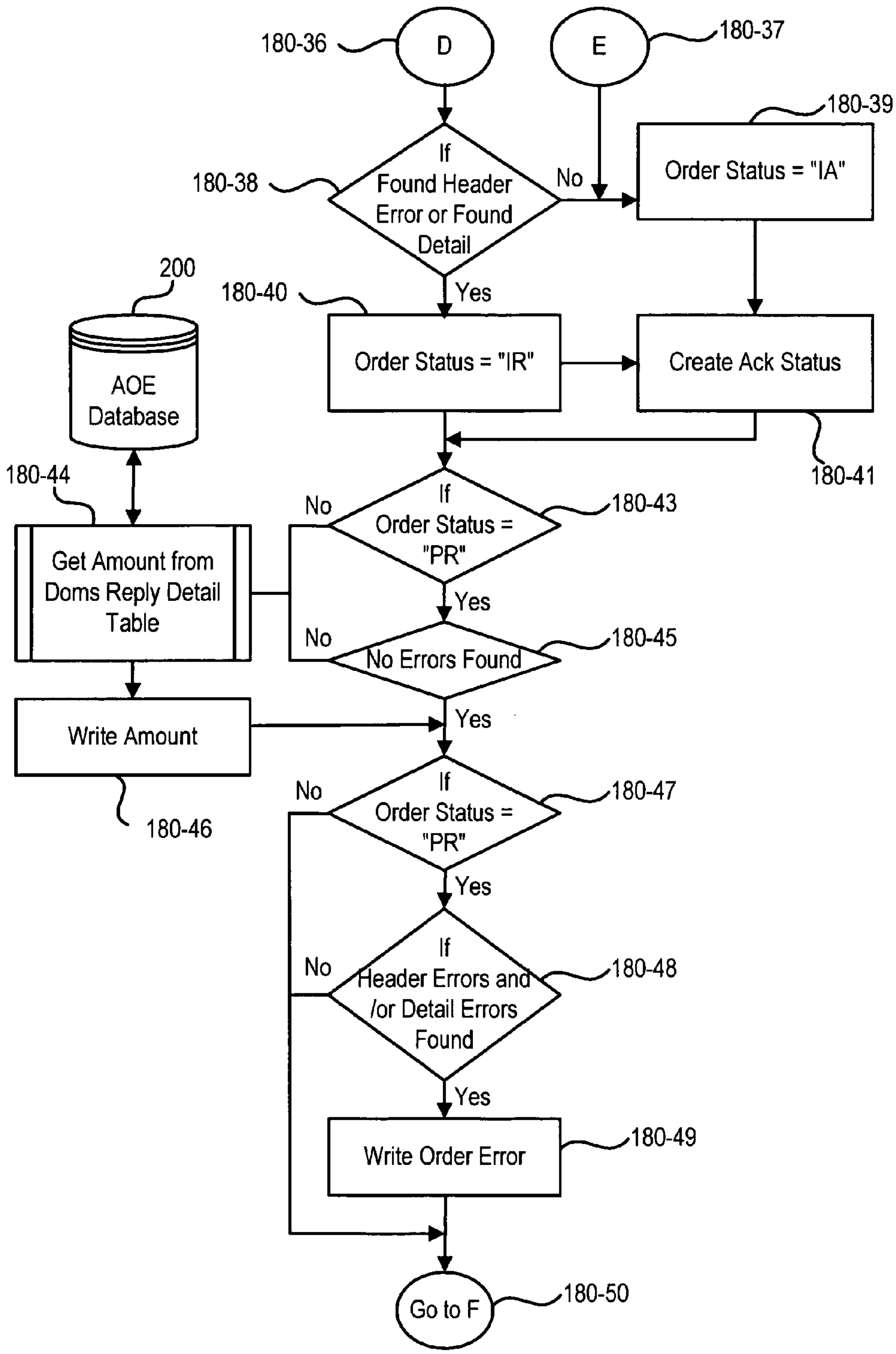
Figure 18E:
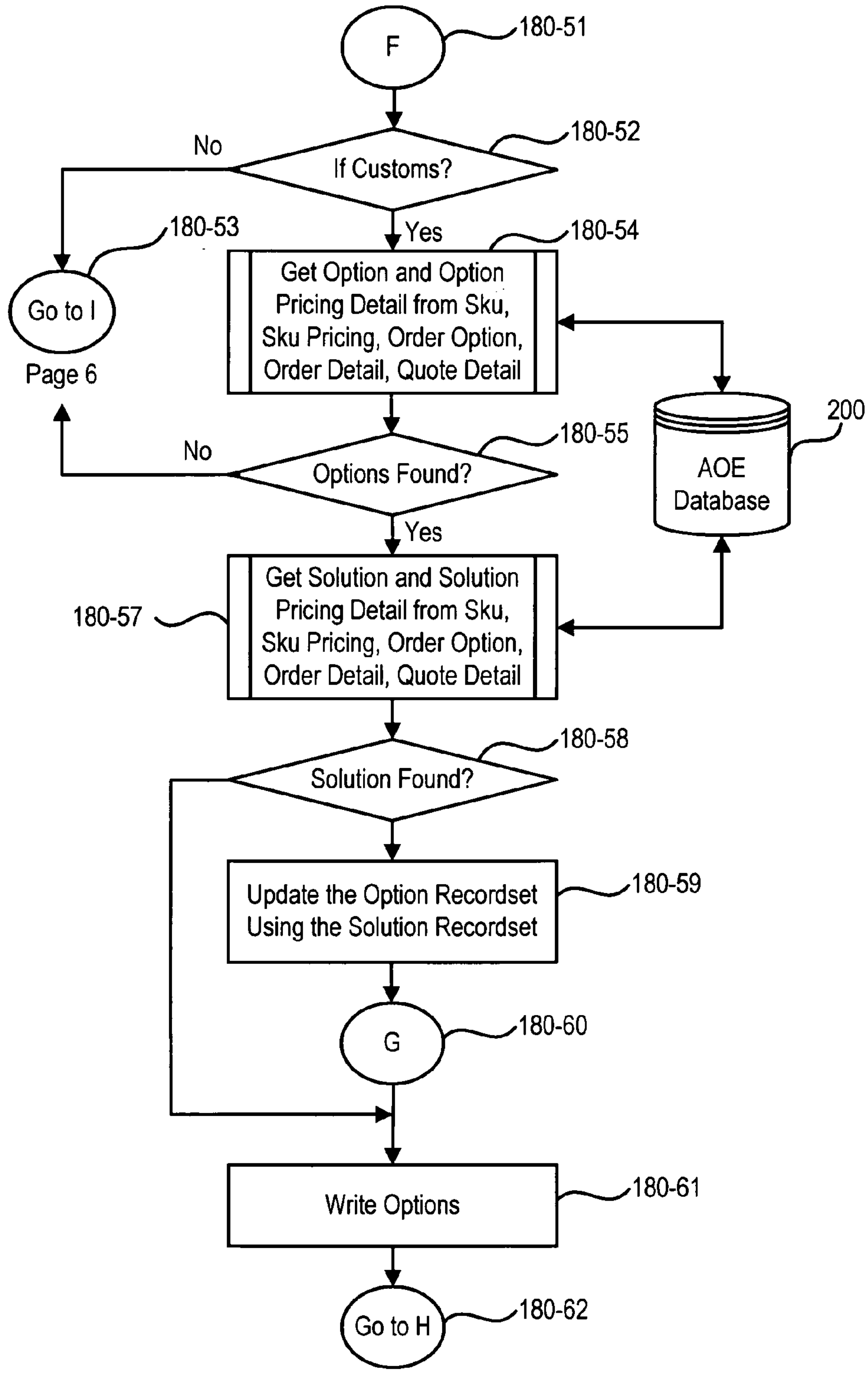
Figure 18F:
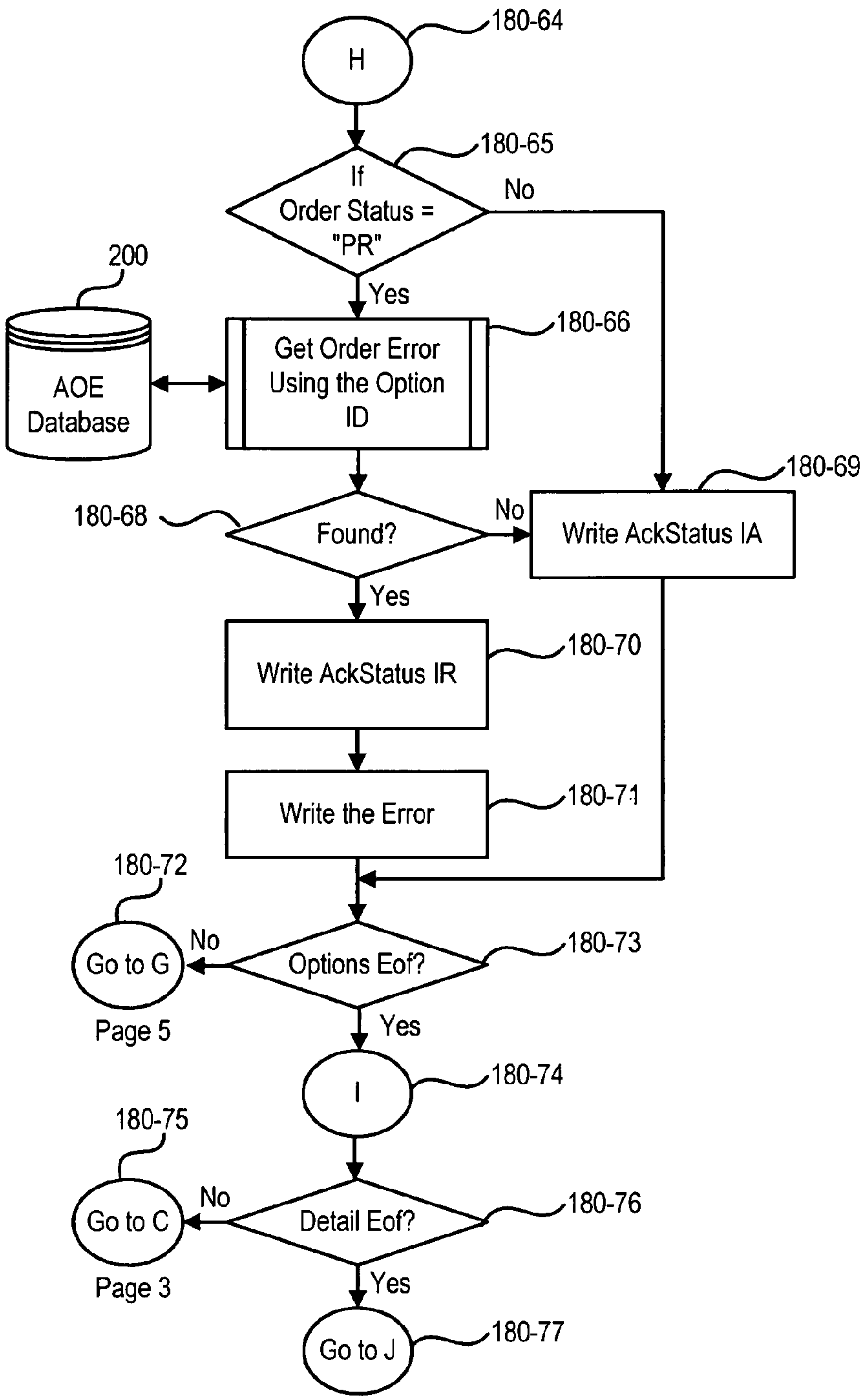
Figure 18G:
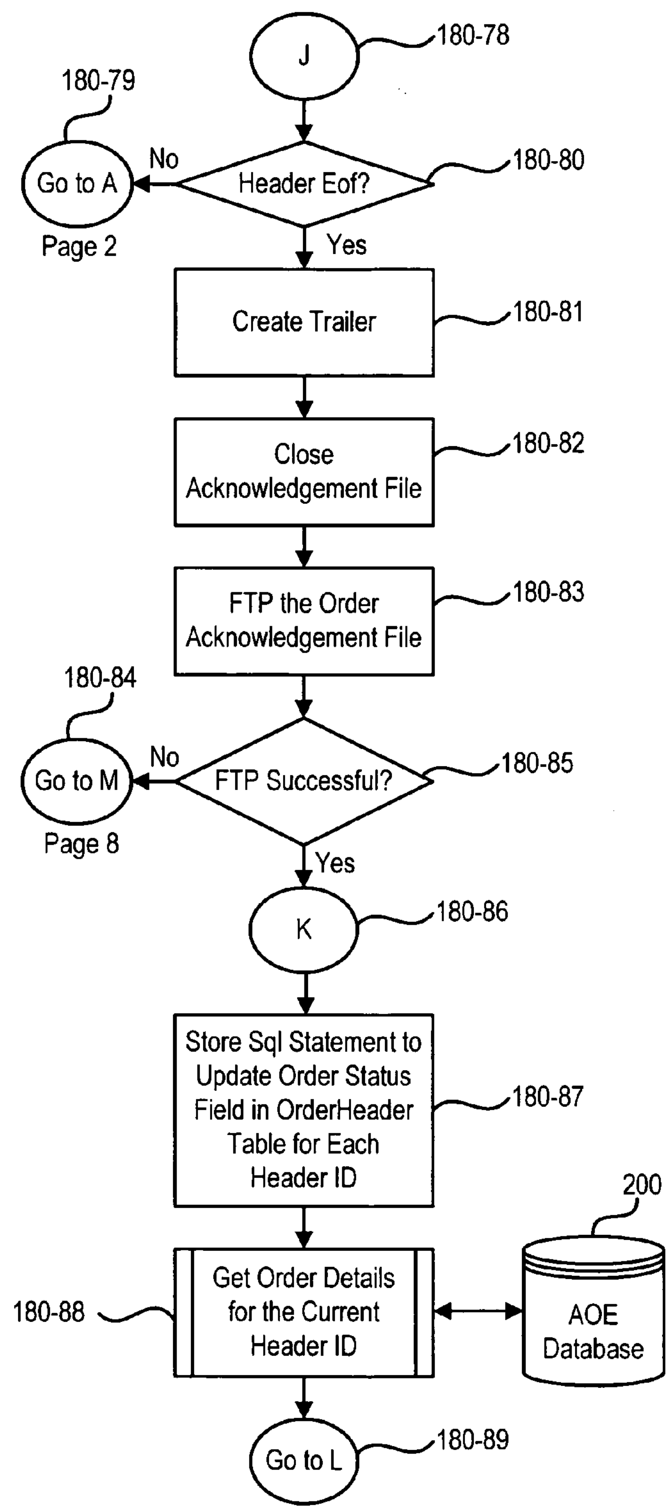
Figure 18H:
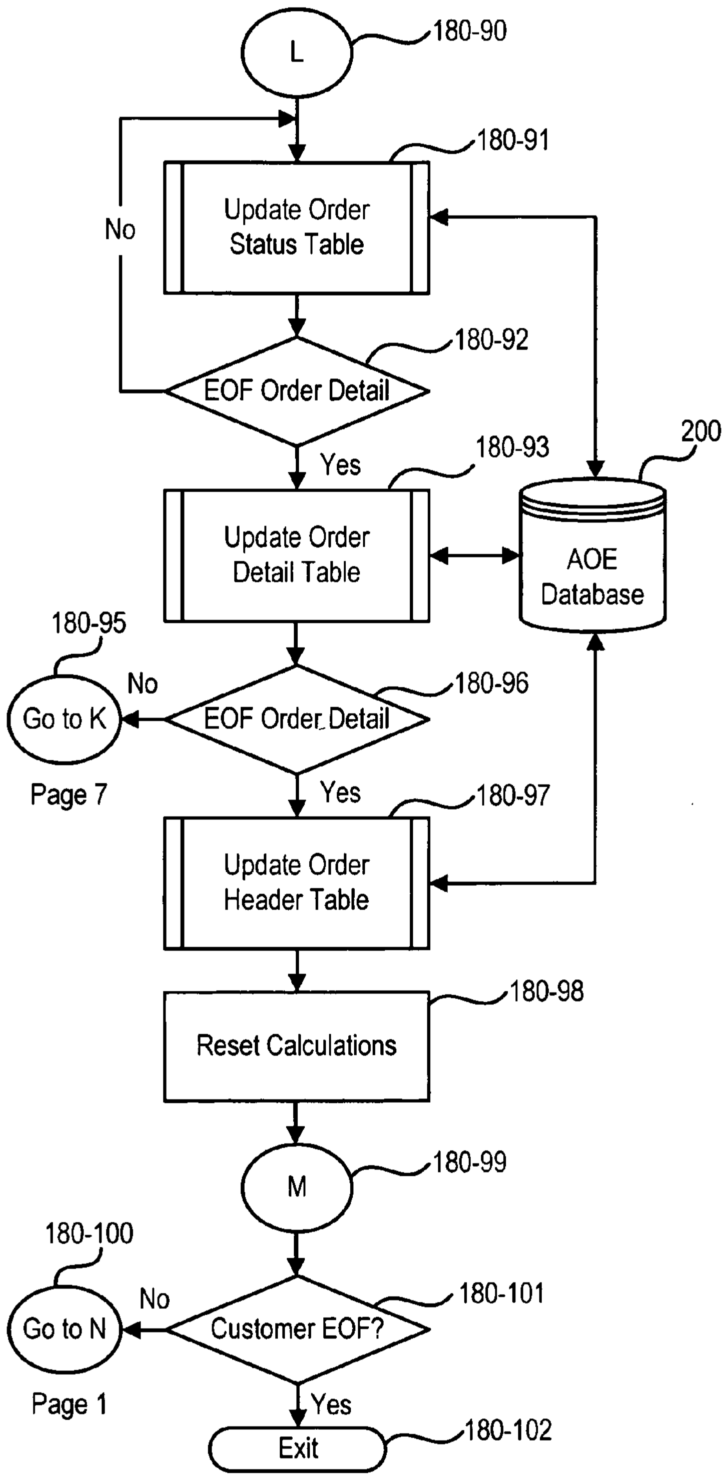
Figure 19A:
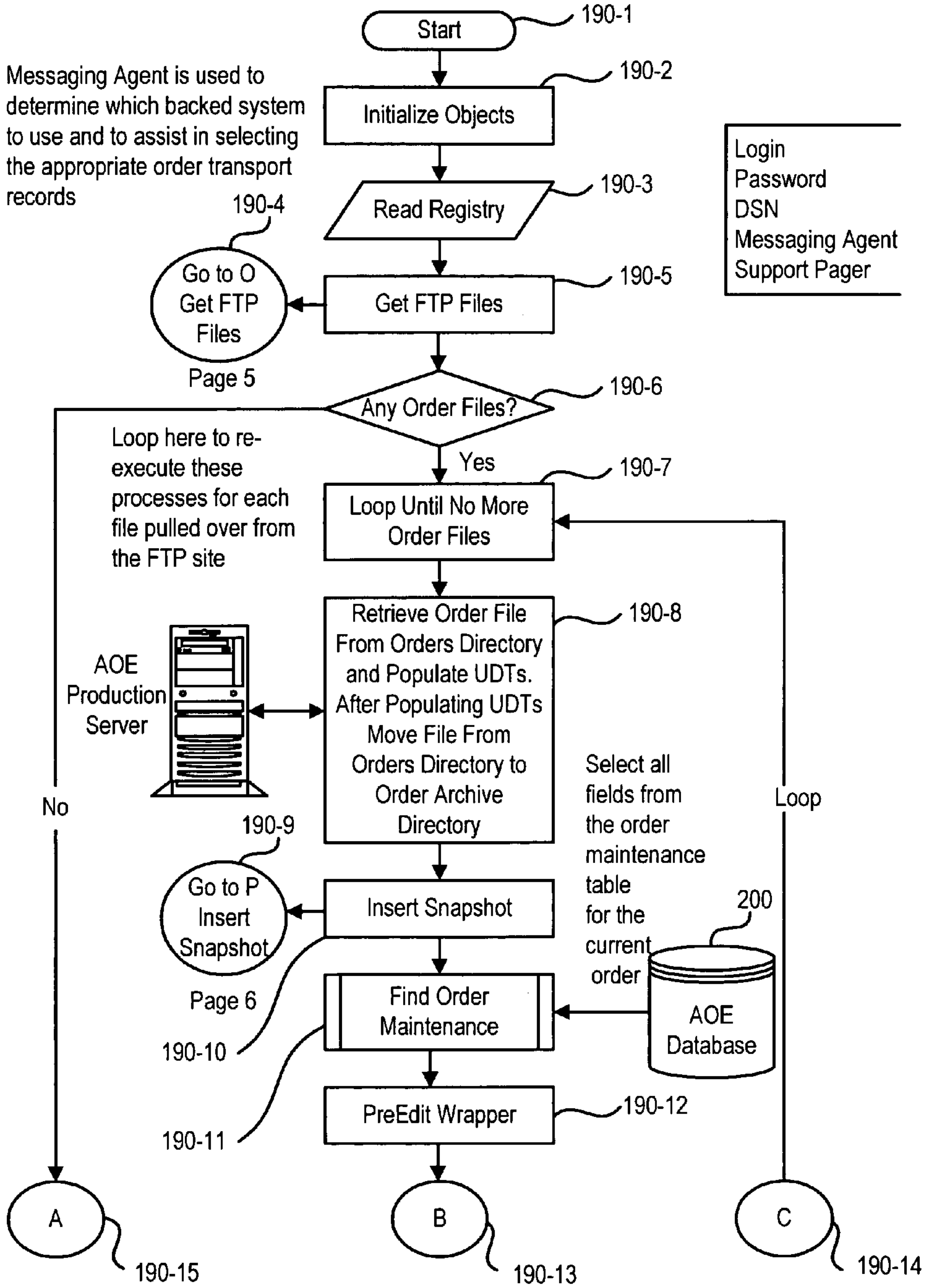
Figure 19B:
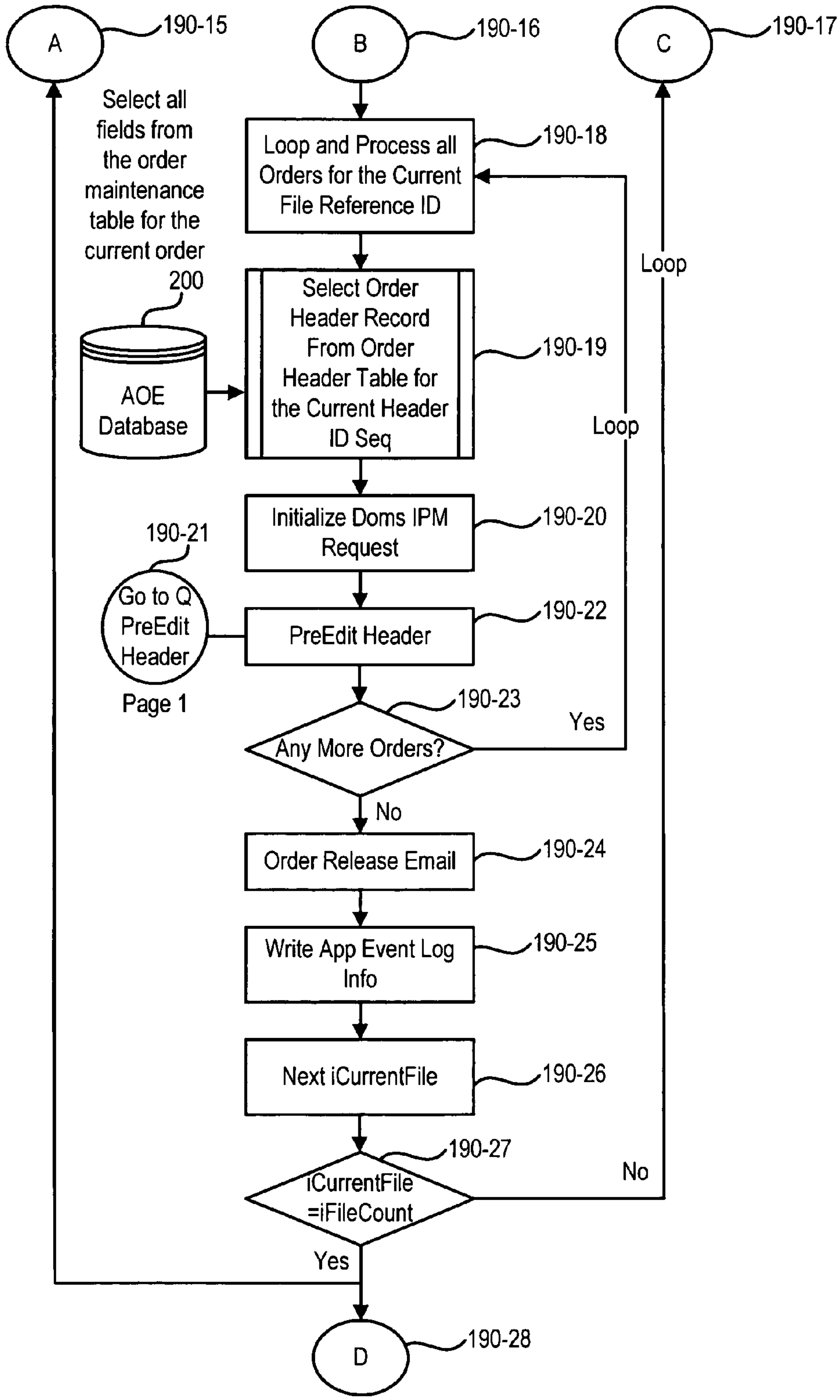
Figure 19C:
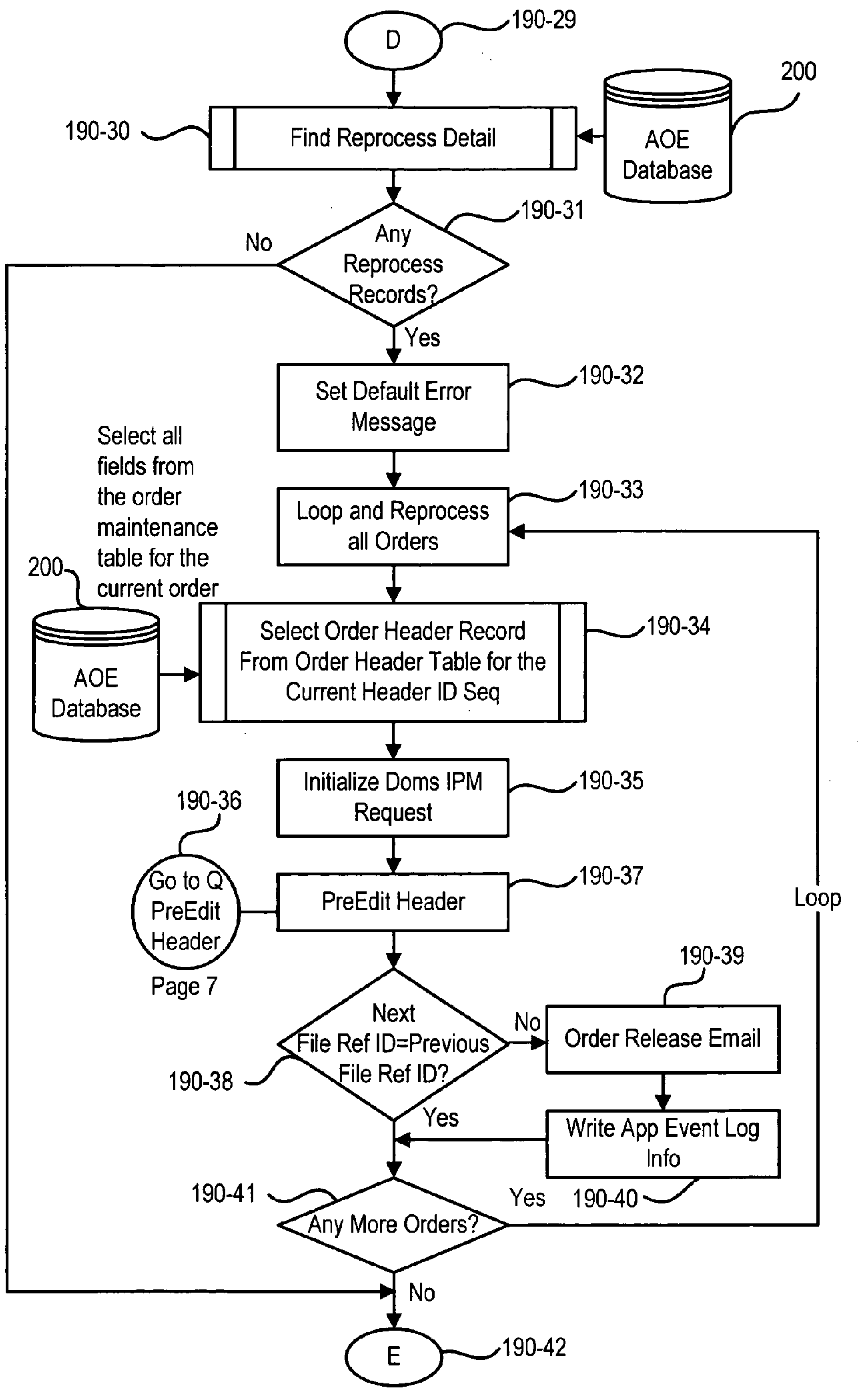
Figure 19D:
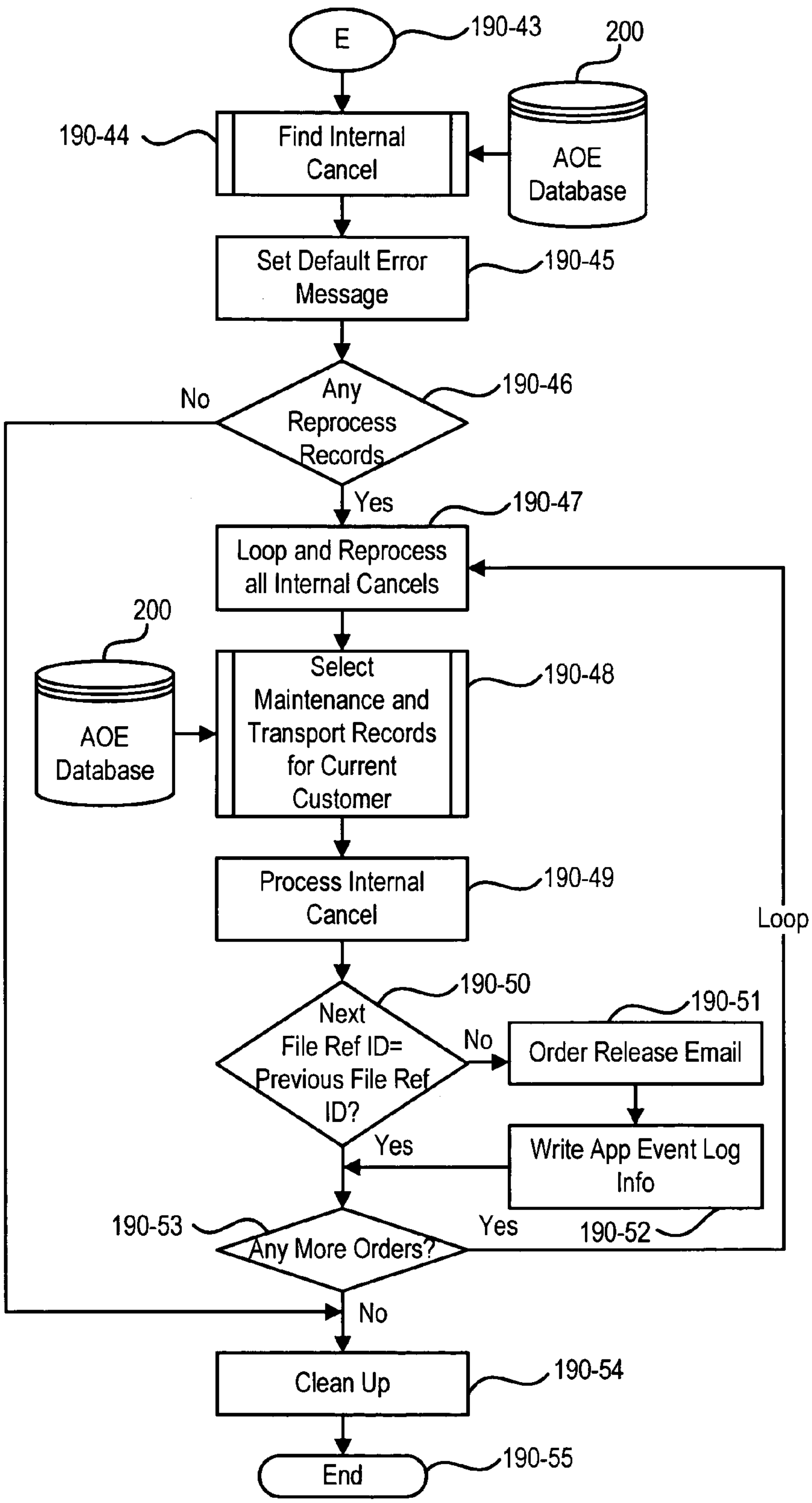
Figure 19E:
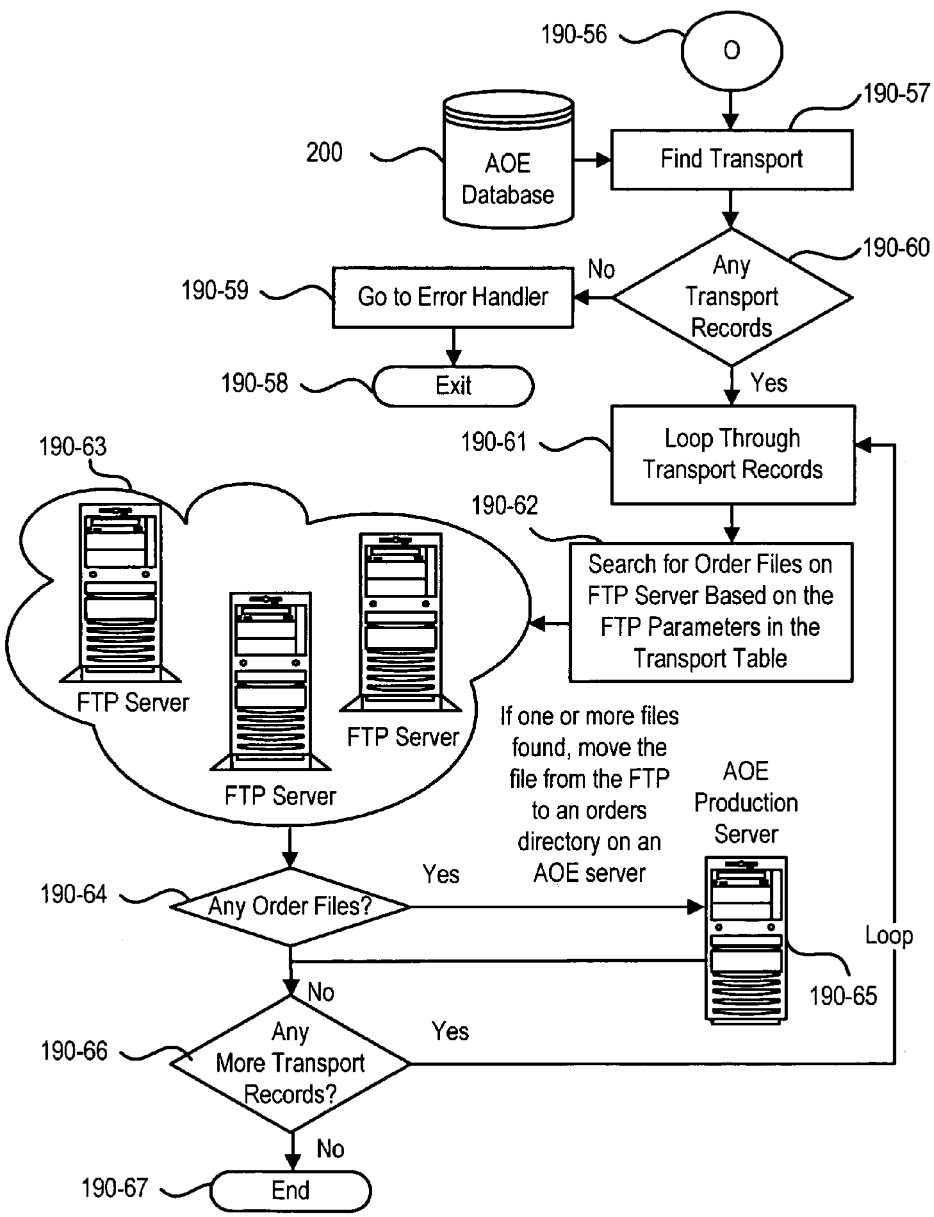
Figure 19F:
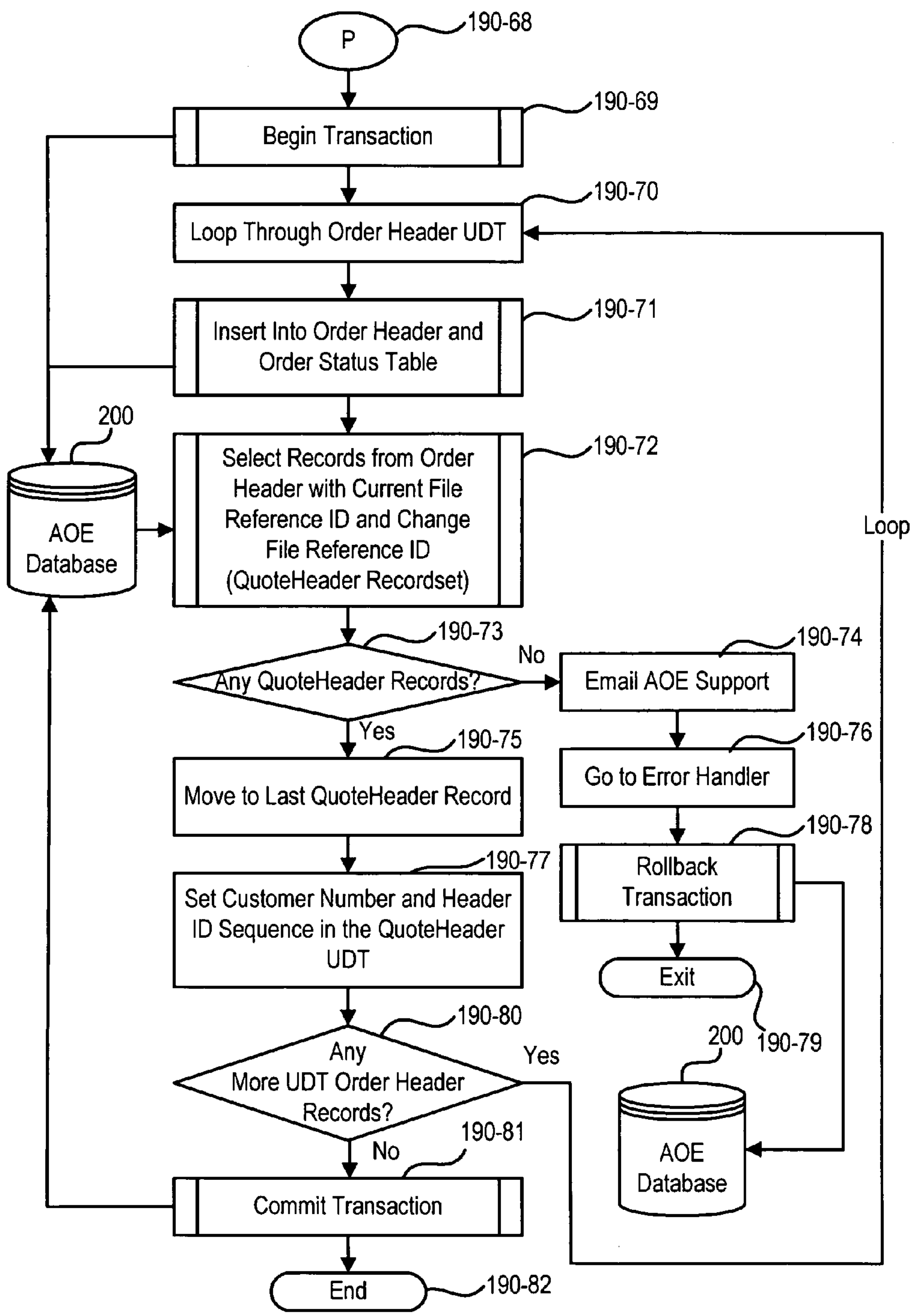
Figure 19G:
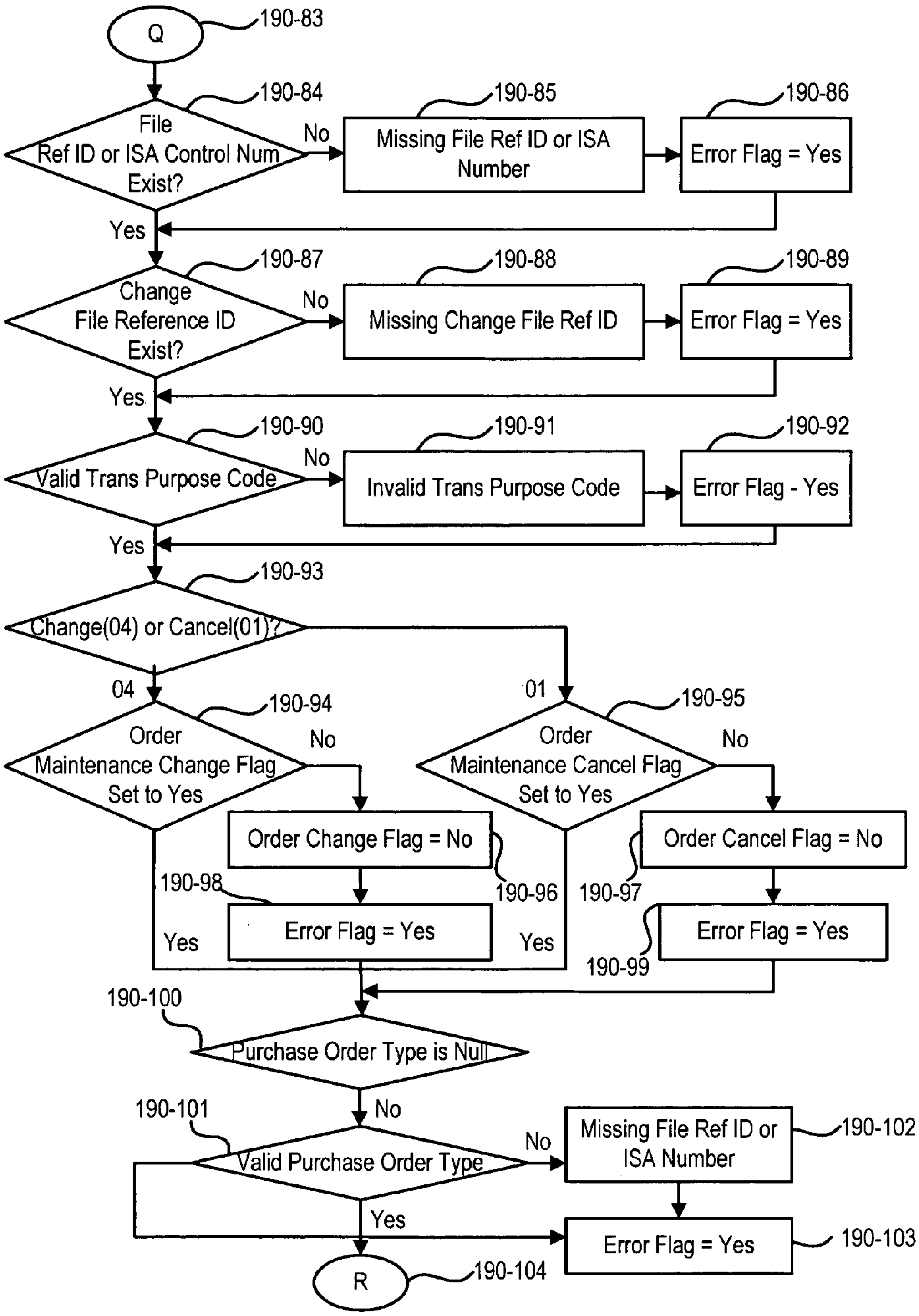
Figure 19H:
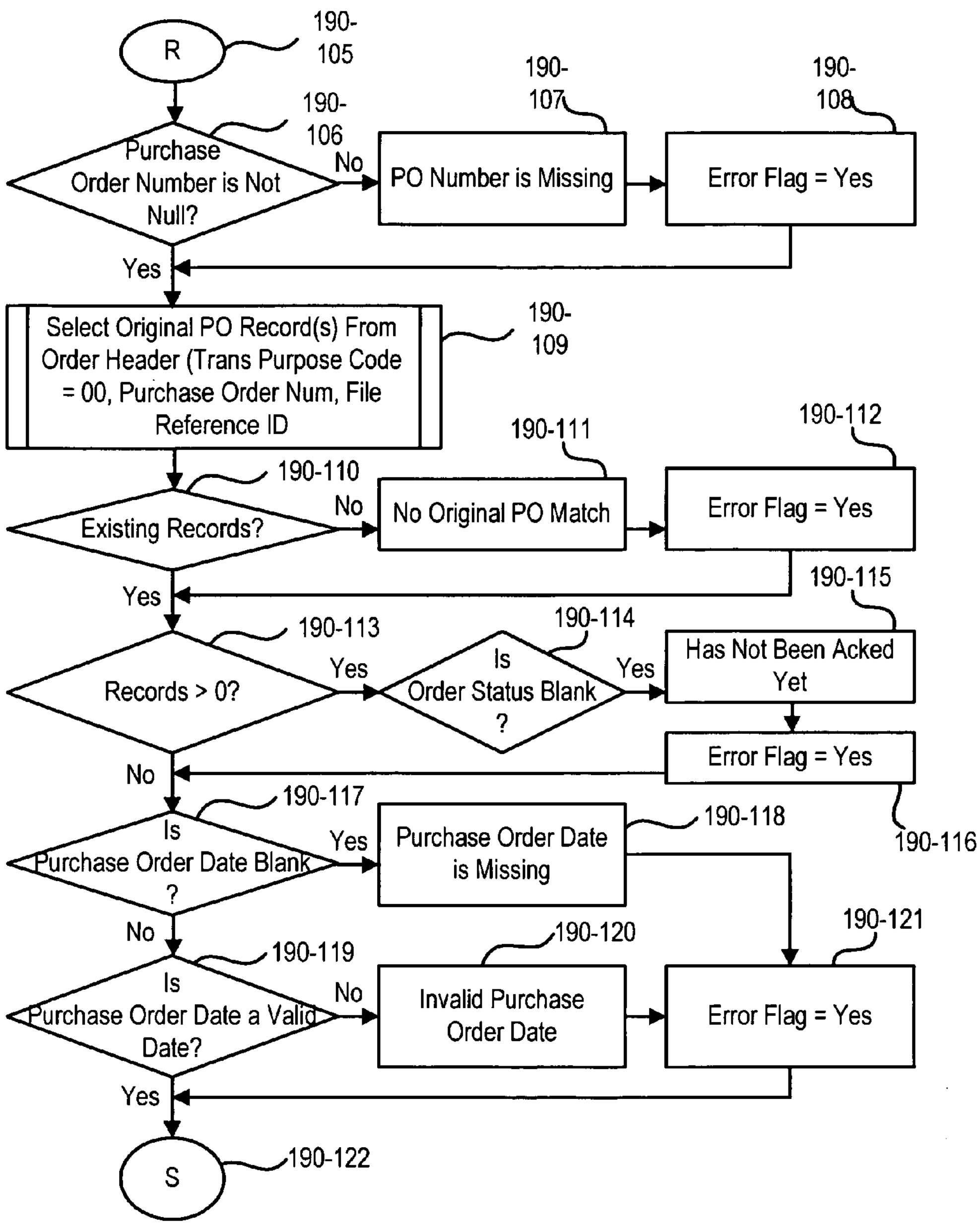
Figure 19I:
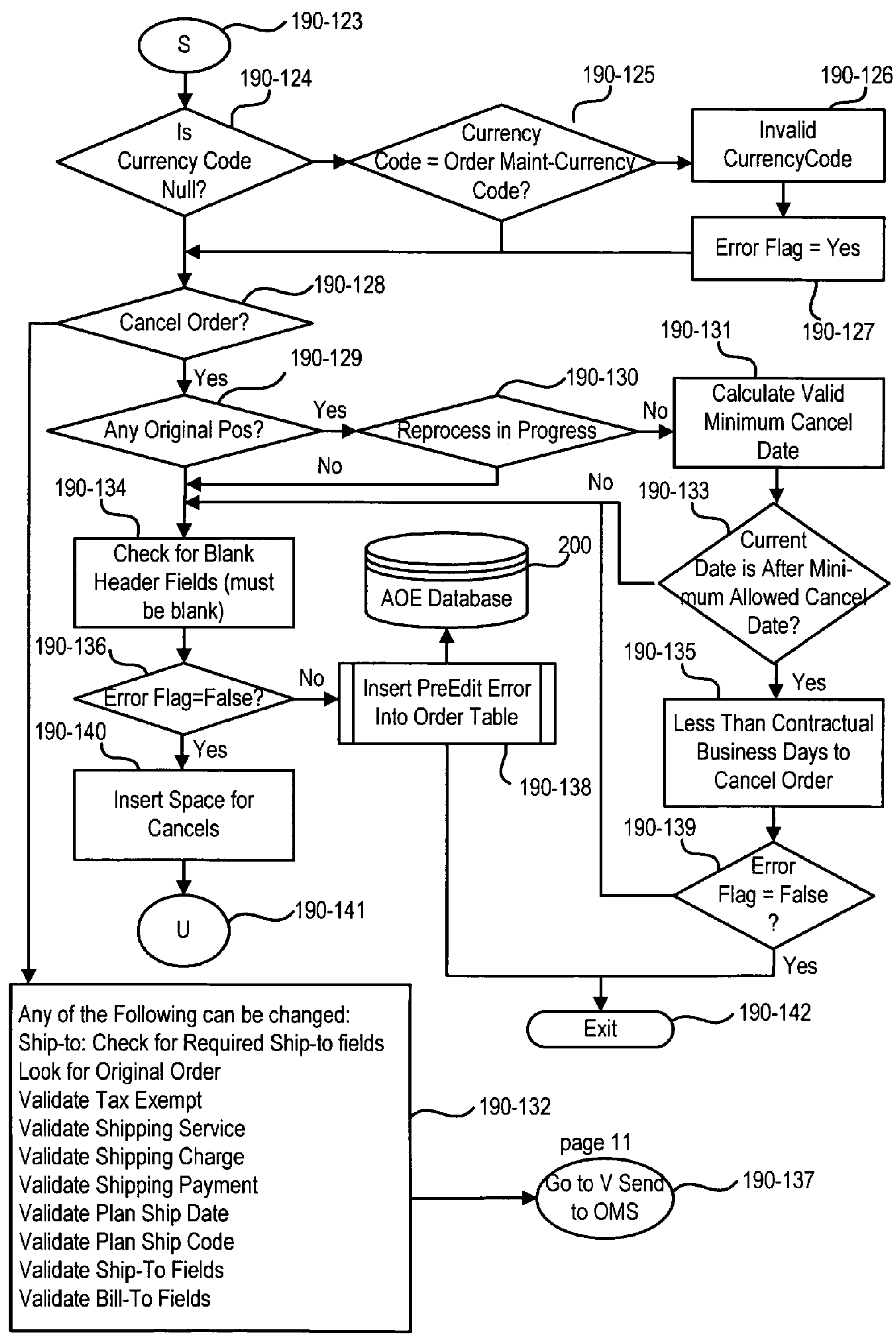
Figure 19J:
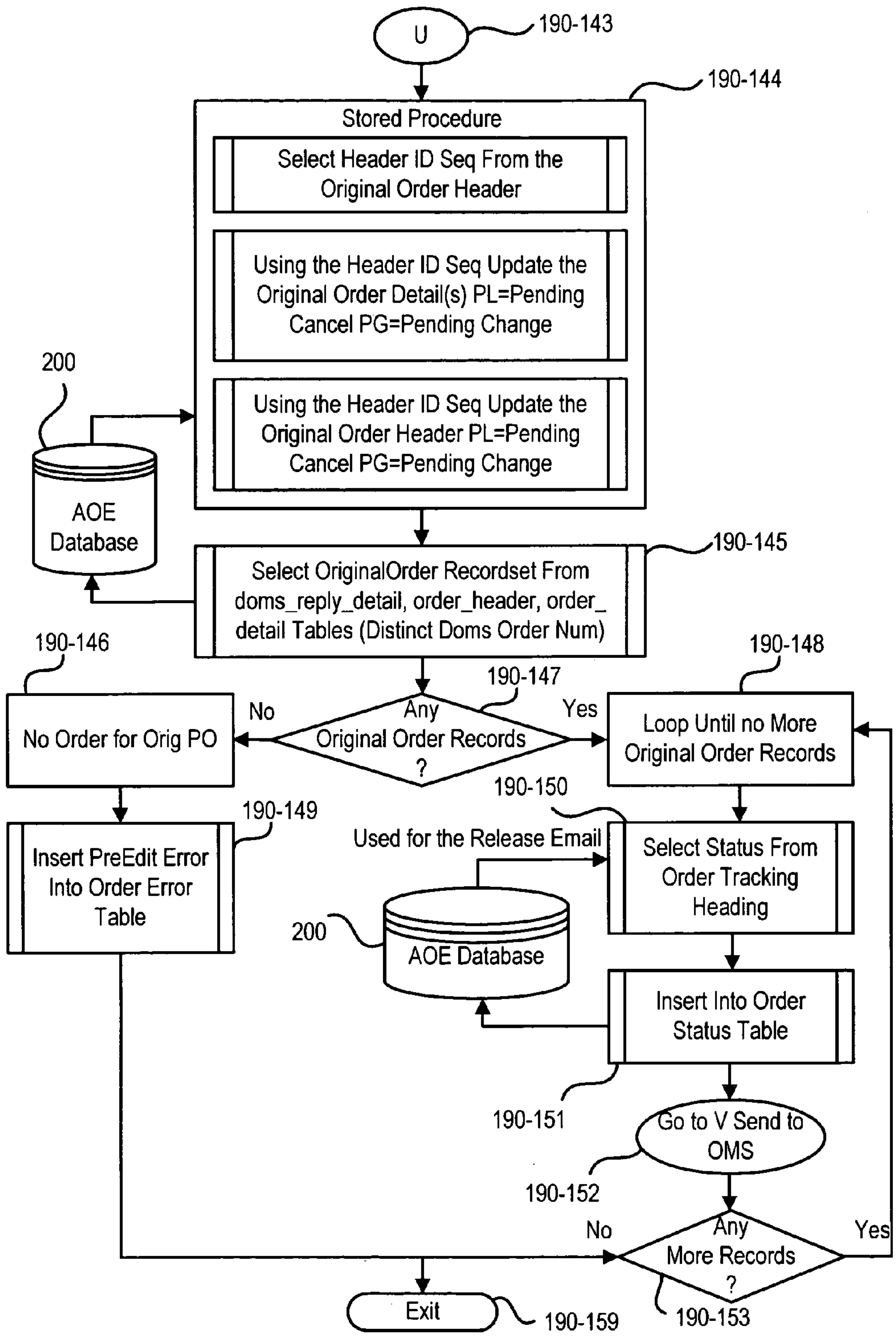
Figure 19K:
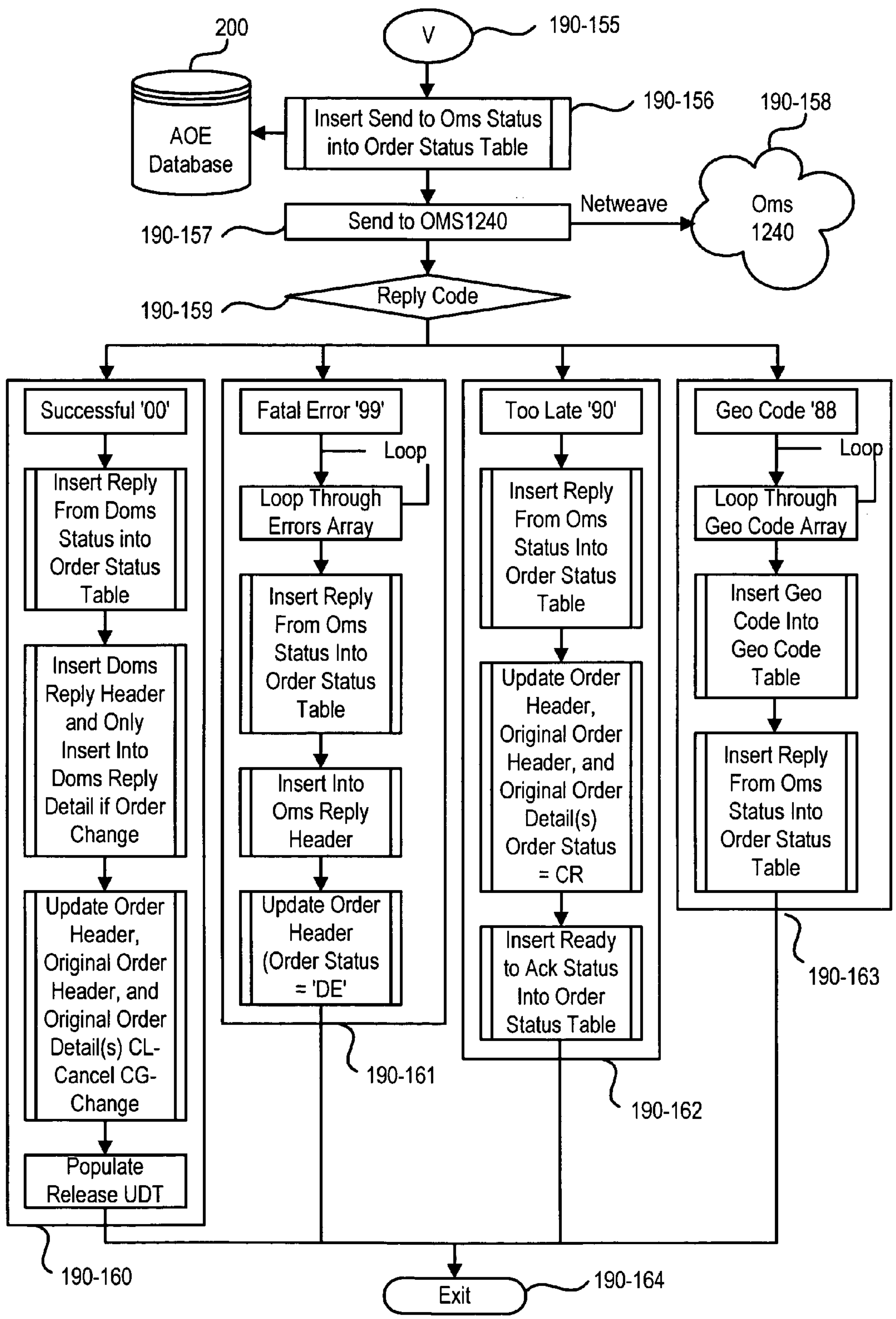
Figure 20A:
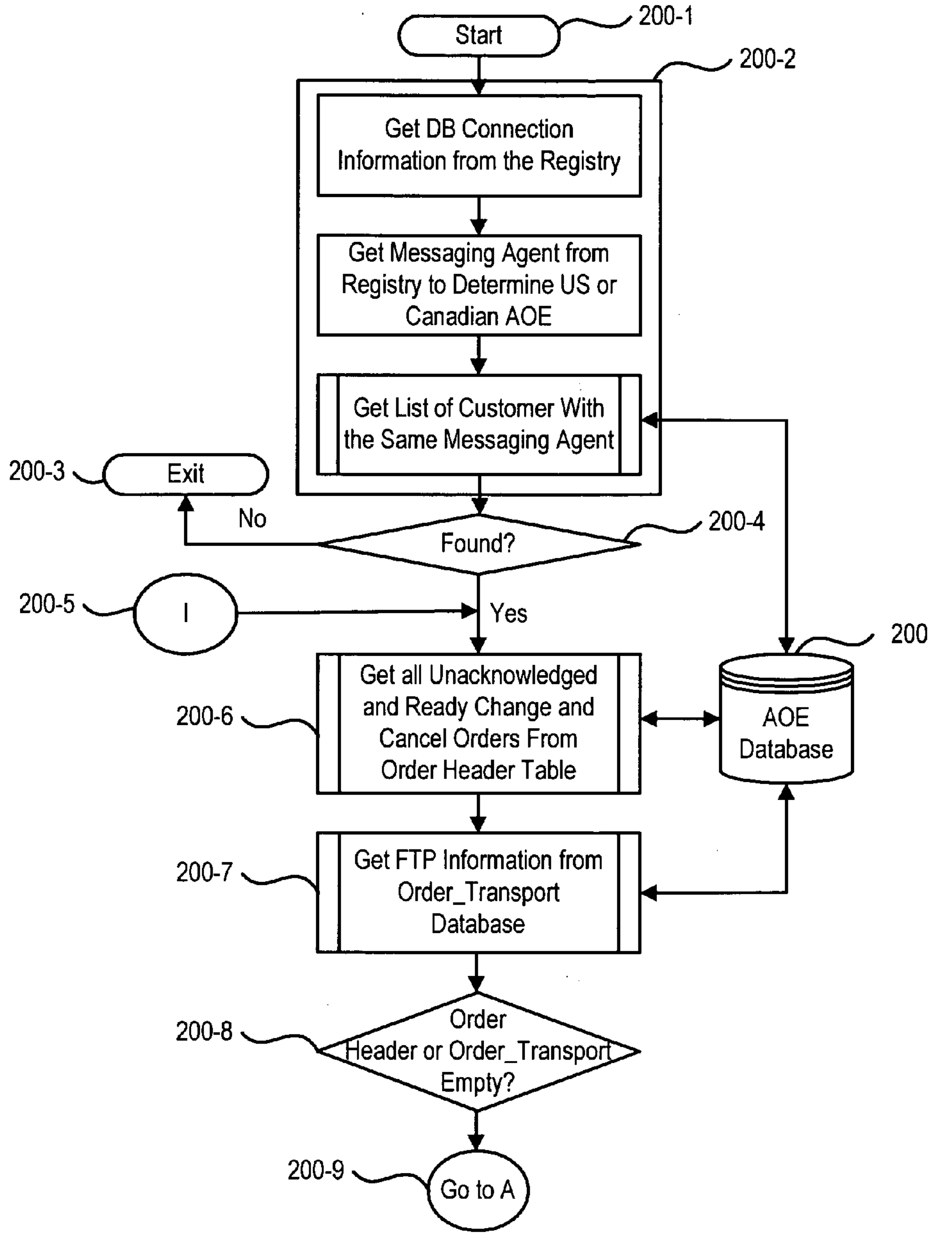
FIGS. 20A through 20F is a logic flow diagram for a batch program for an automated order change/cancel acknowledgment.
Figure 20B:
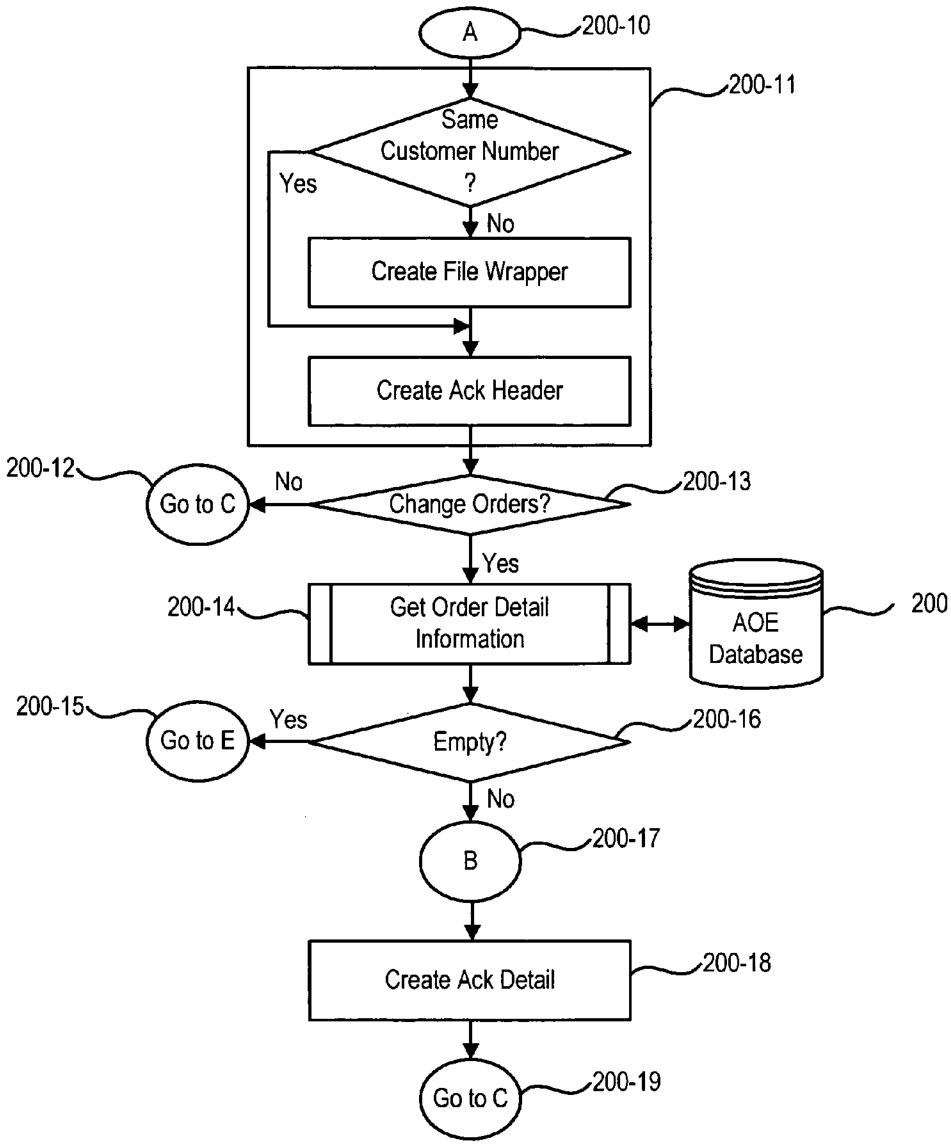
Figure 20C:
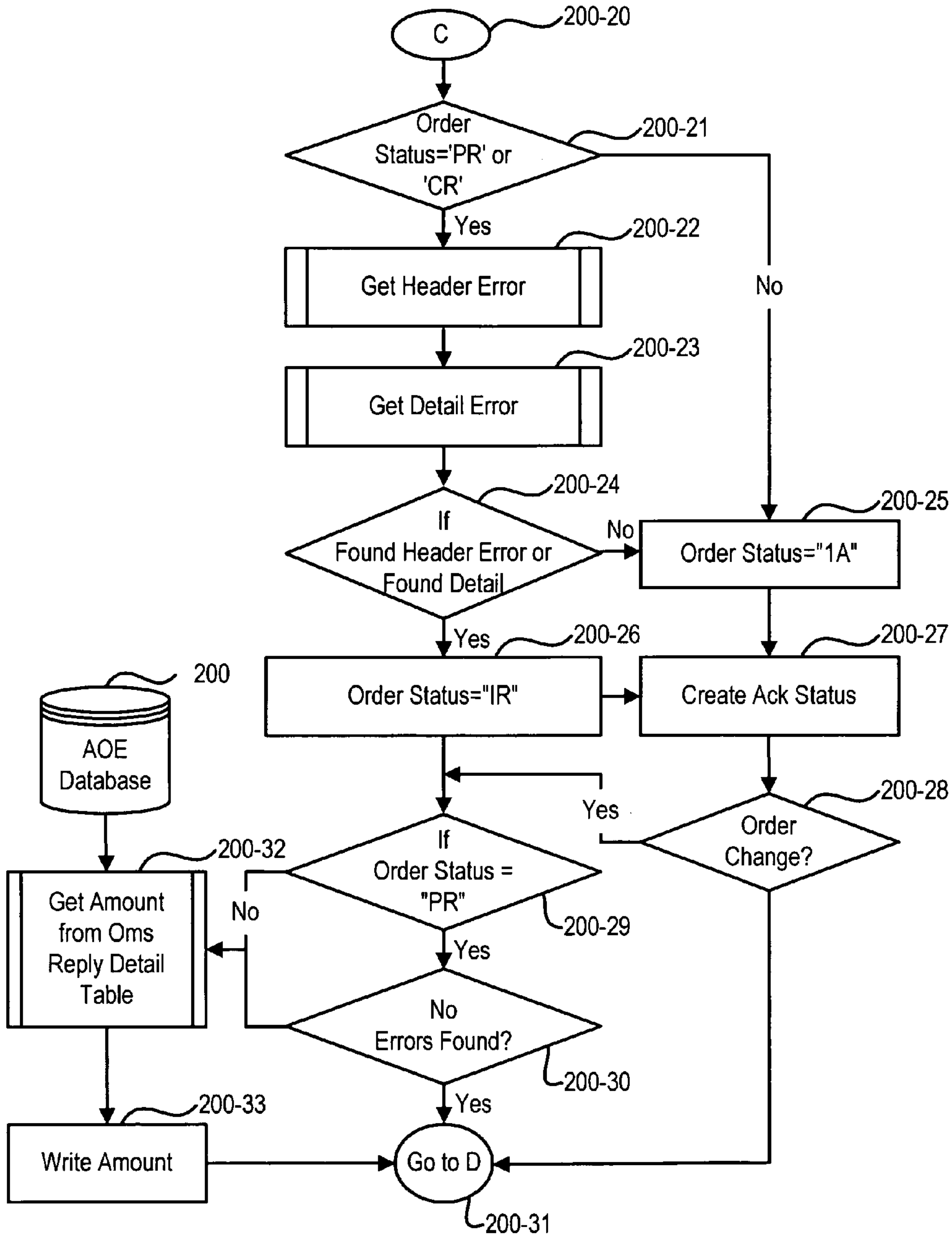
Figure 20D:
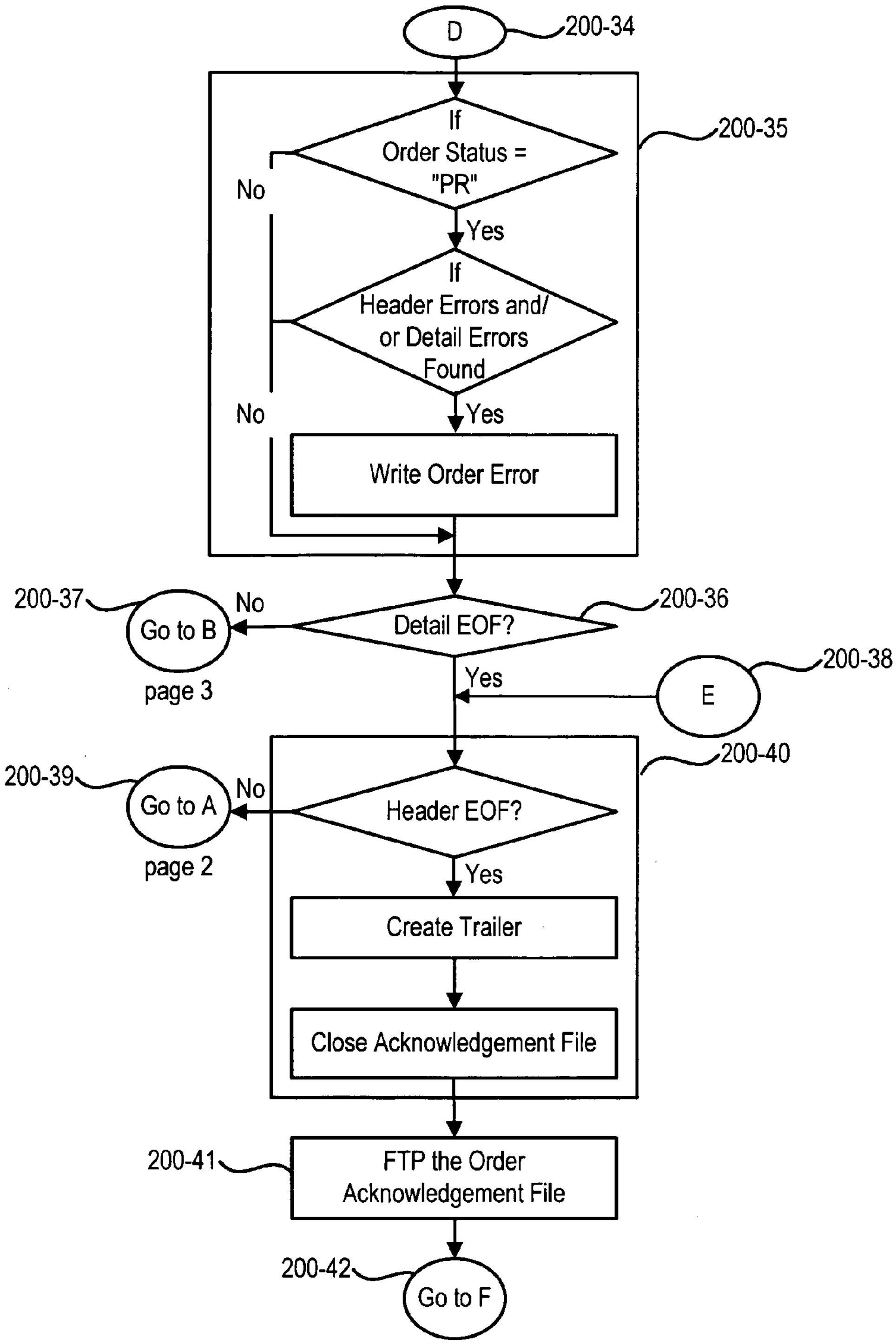
Figure 20E:
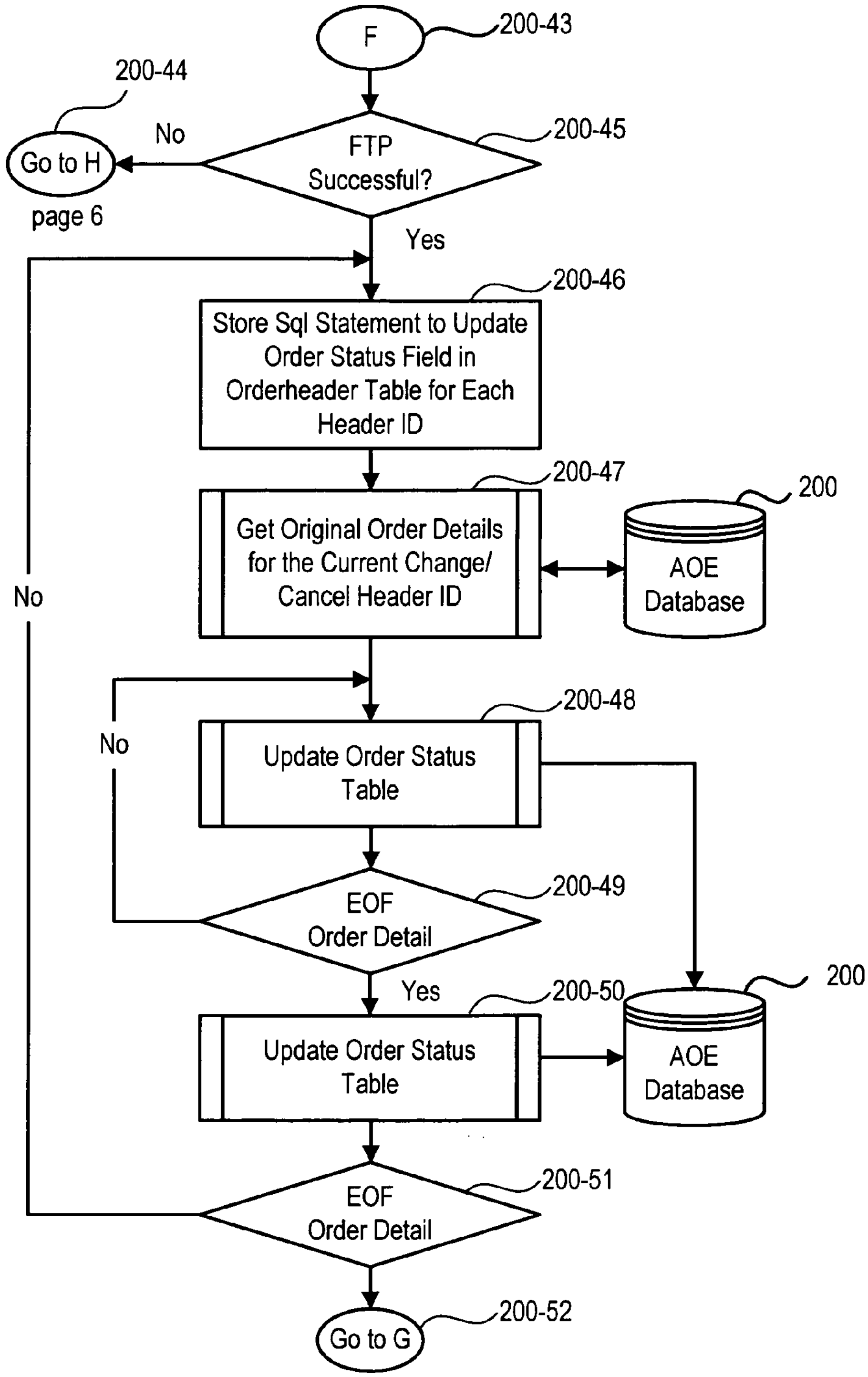
Figure 20F:
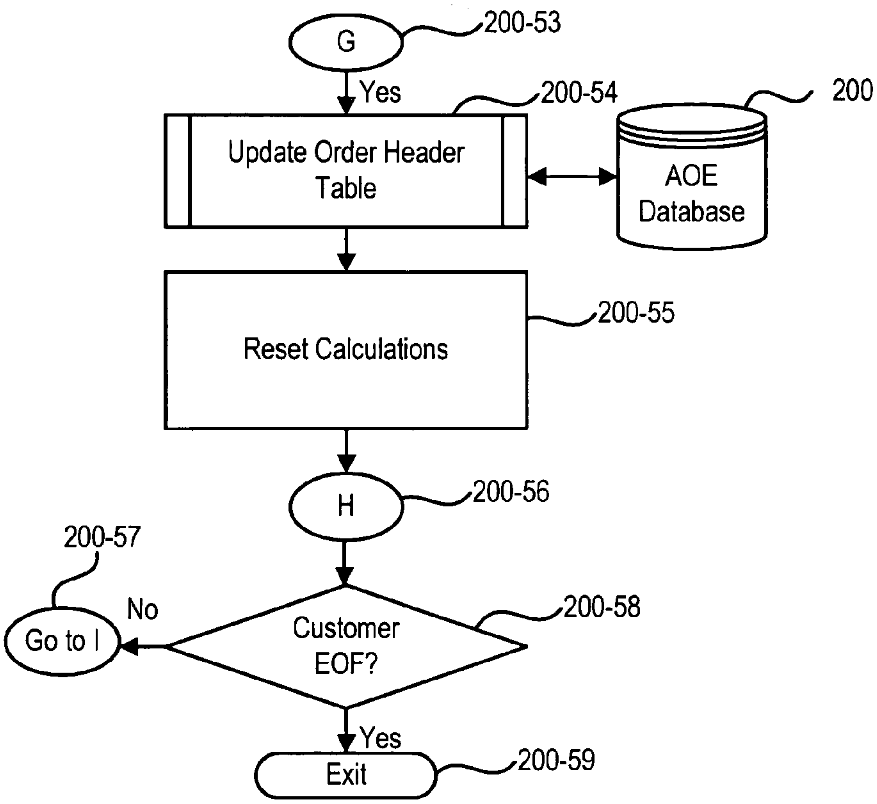
Figure 21A:
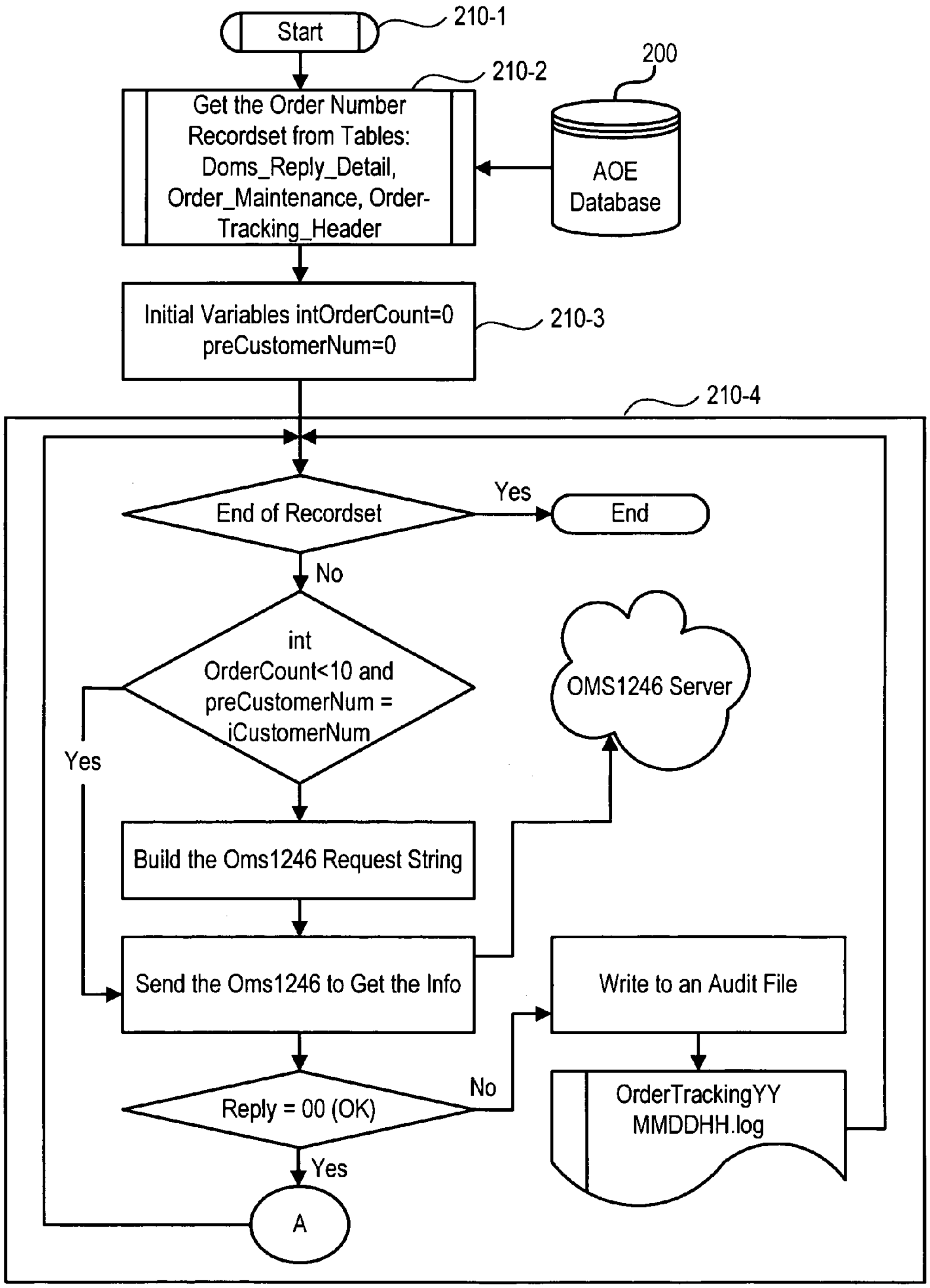
FIGS. 21A through 21C is a logic flow diagram for a batch program for order tracking and asset tagging in accordance with an embodiment of the invention.
Figure 21B:
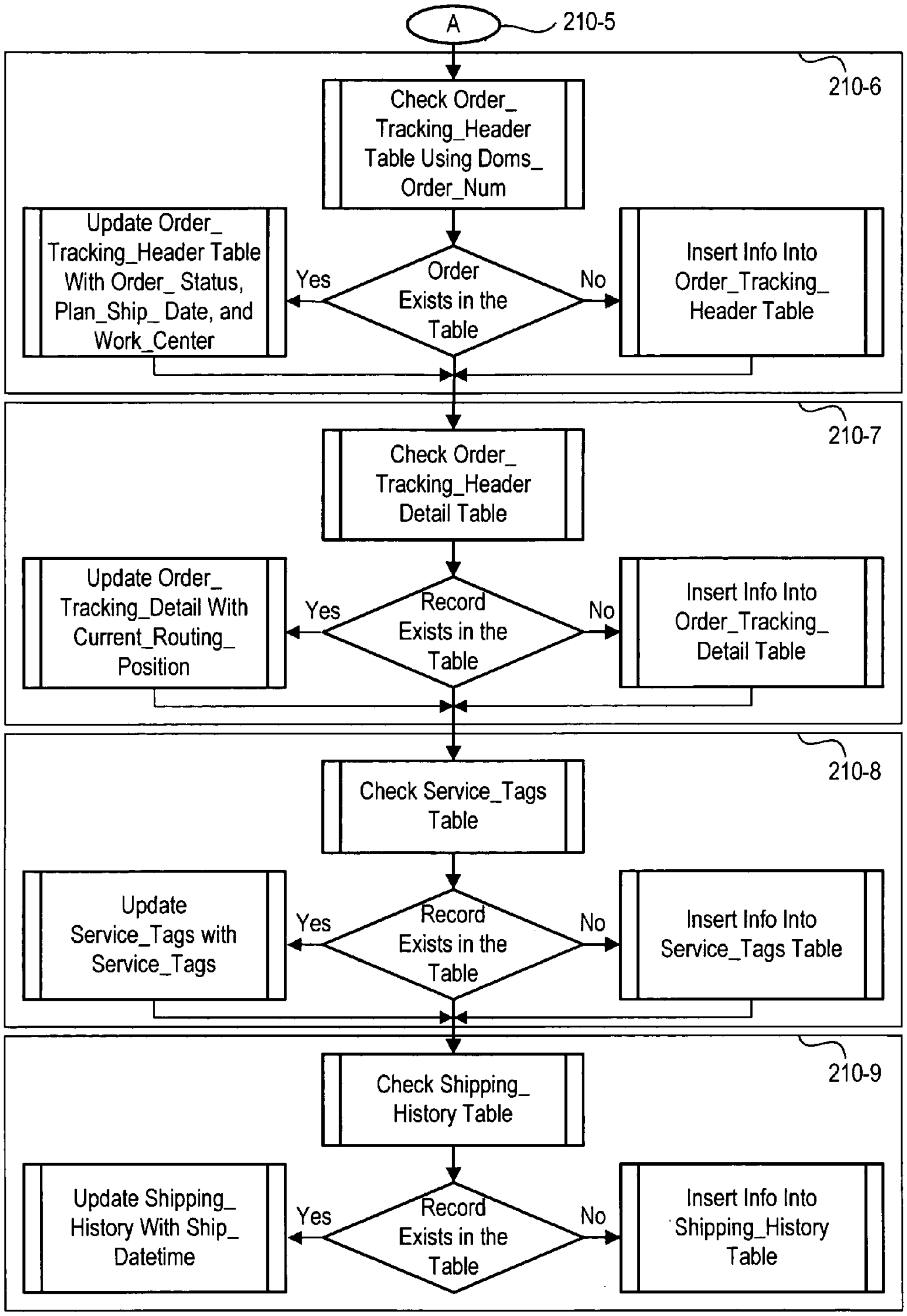
Figure 21C:
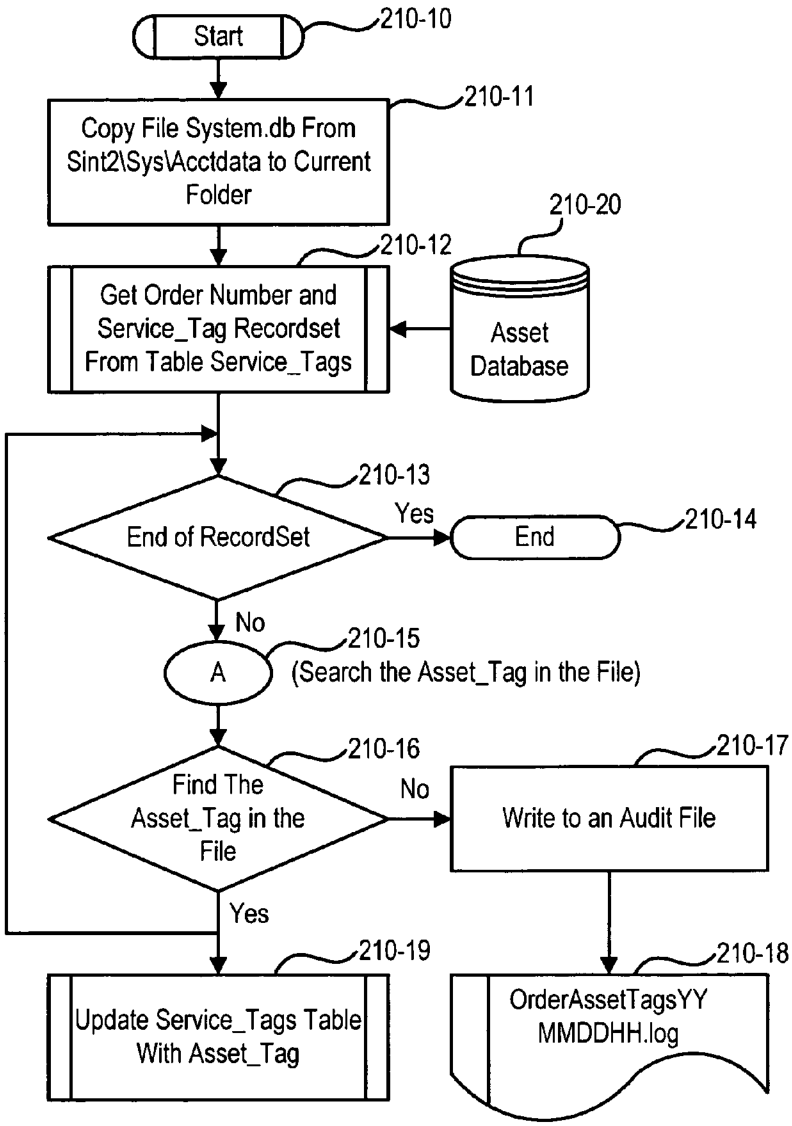
Figure 22A:
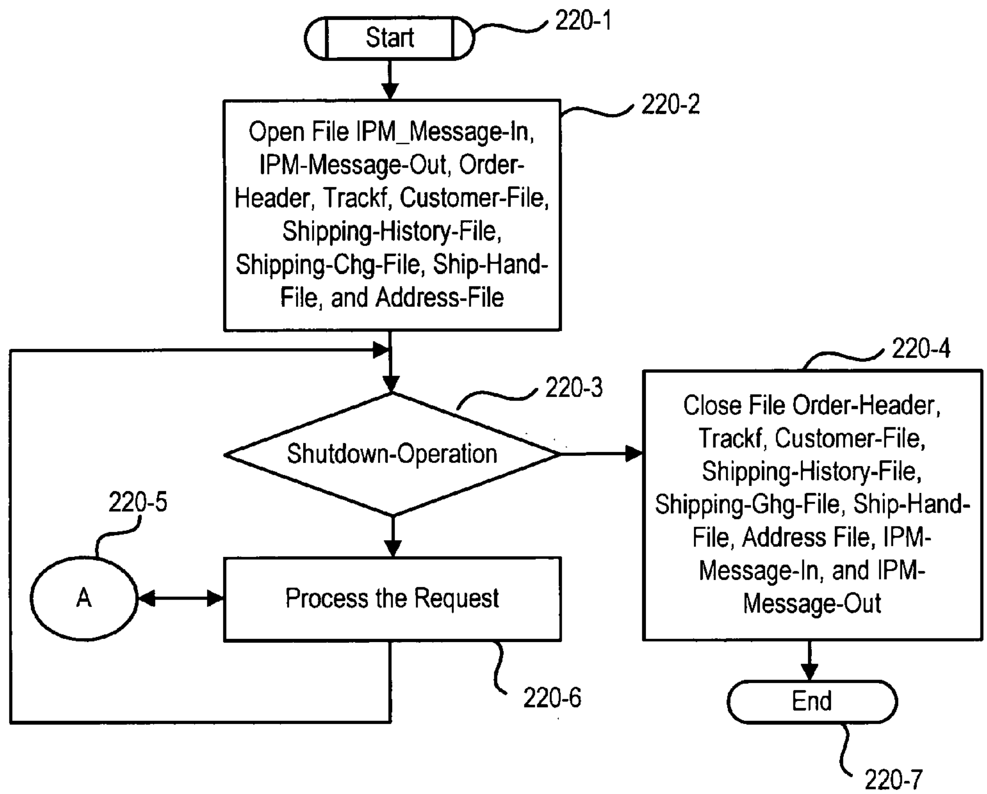
Figure 22B:
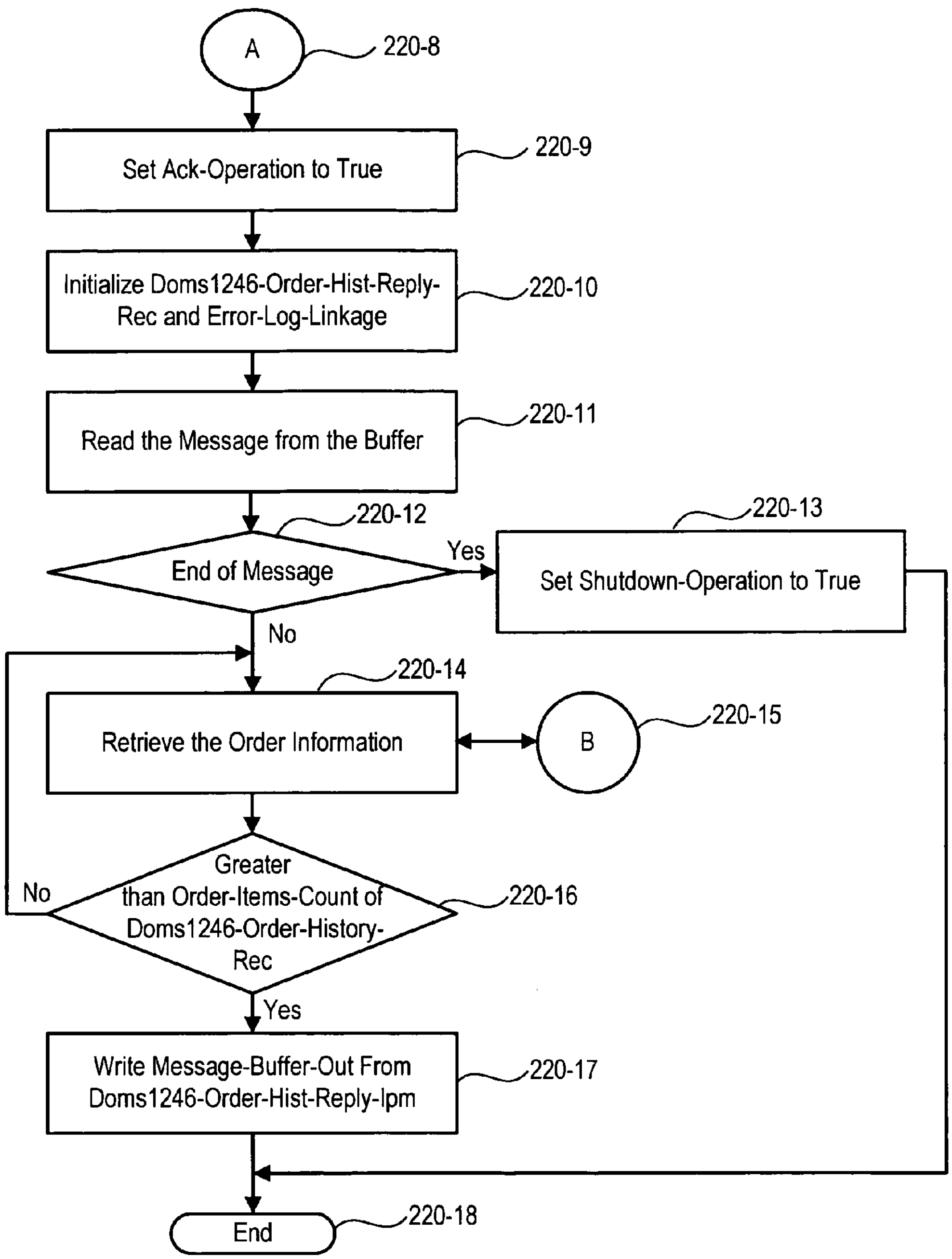
Figure 22D:
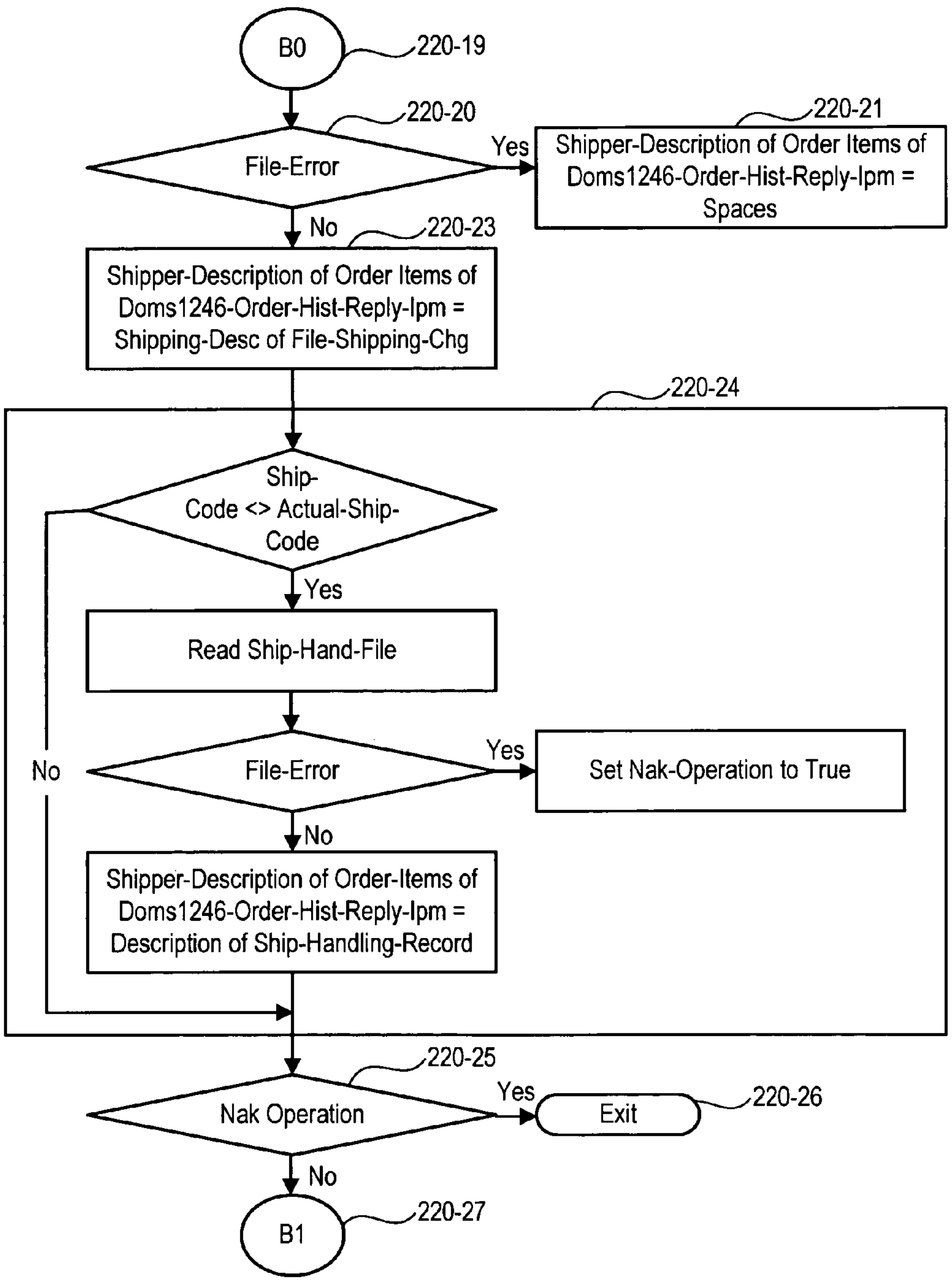
Figure 22E:
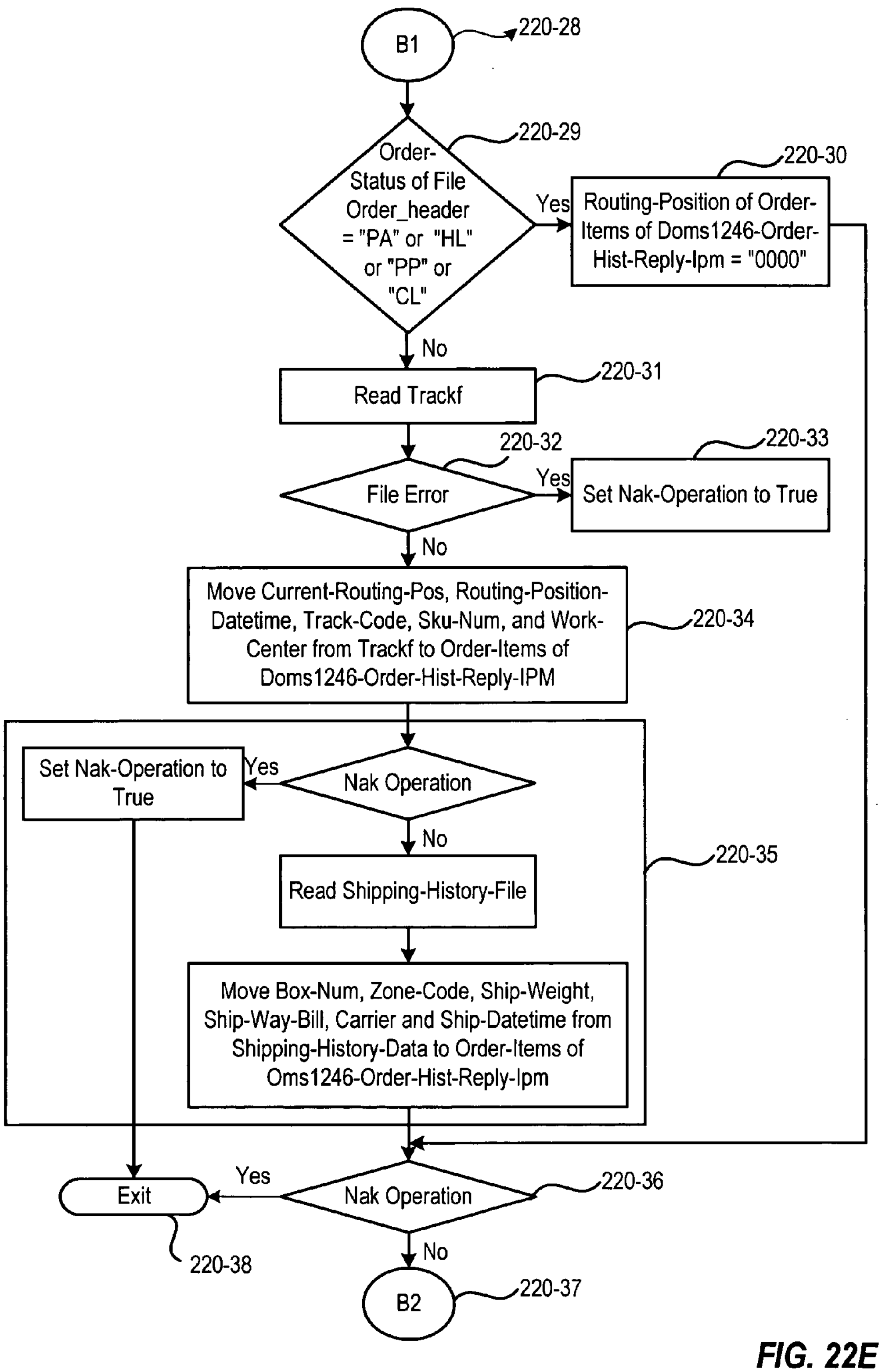
Figure 22F:
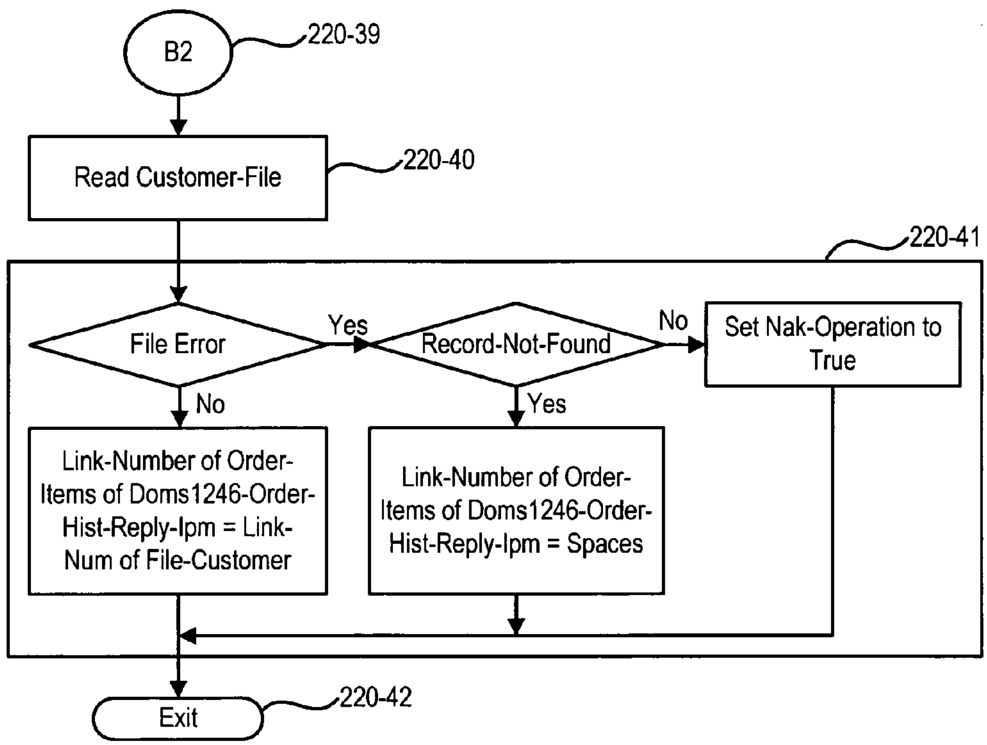
Figure 23:
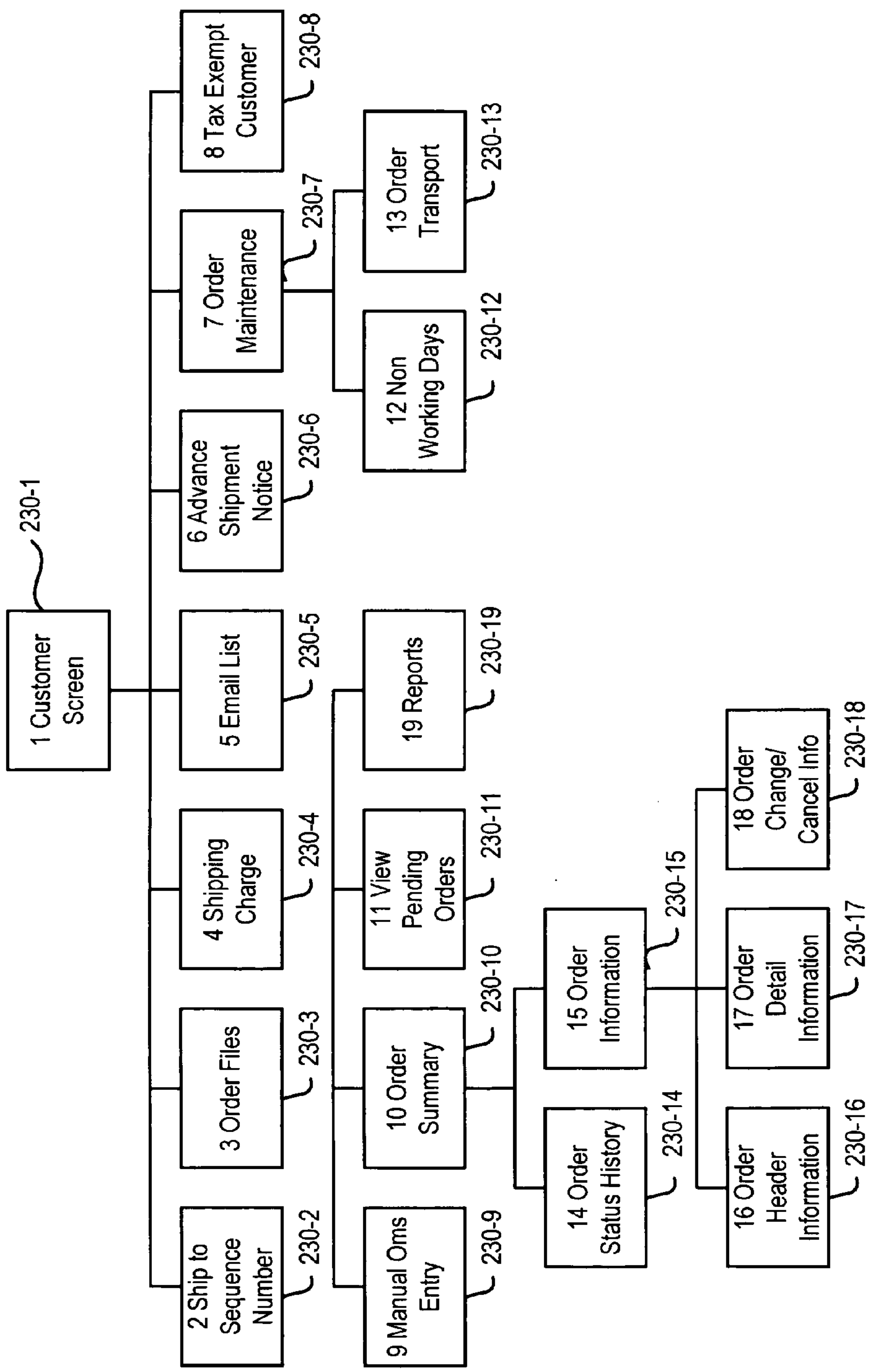
Figures 3A, 23:
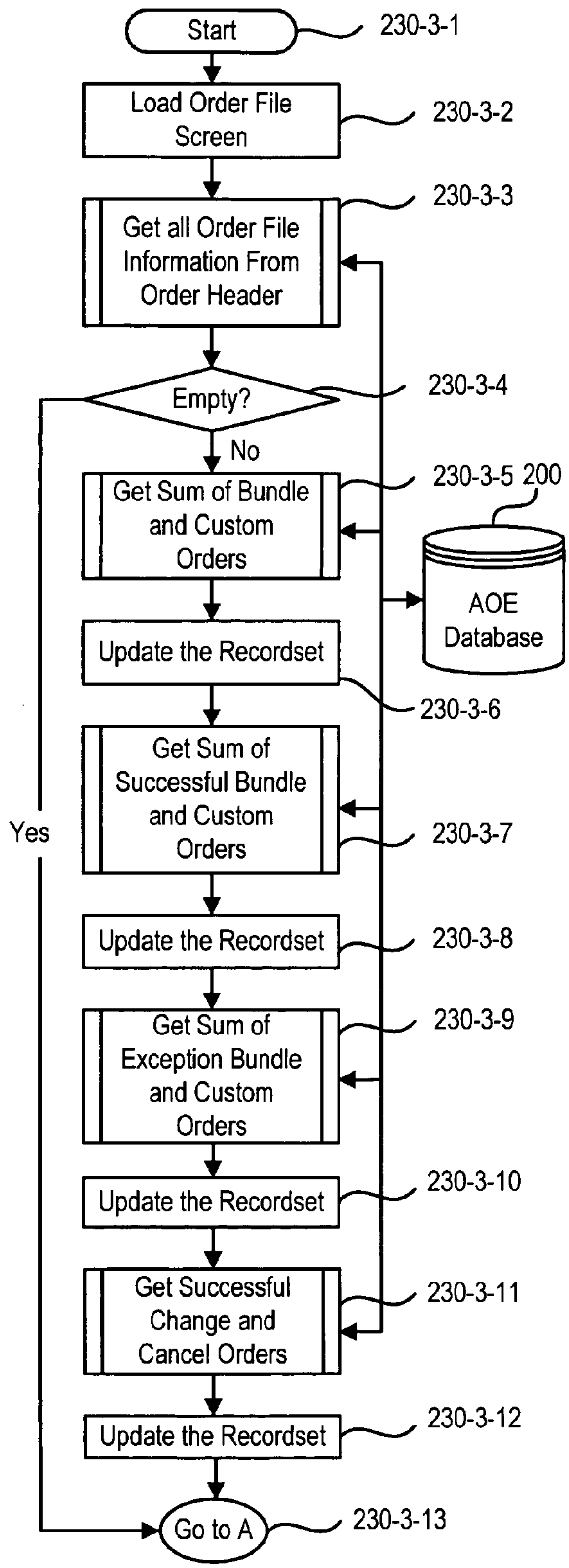
Figures 3B, 23:
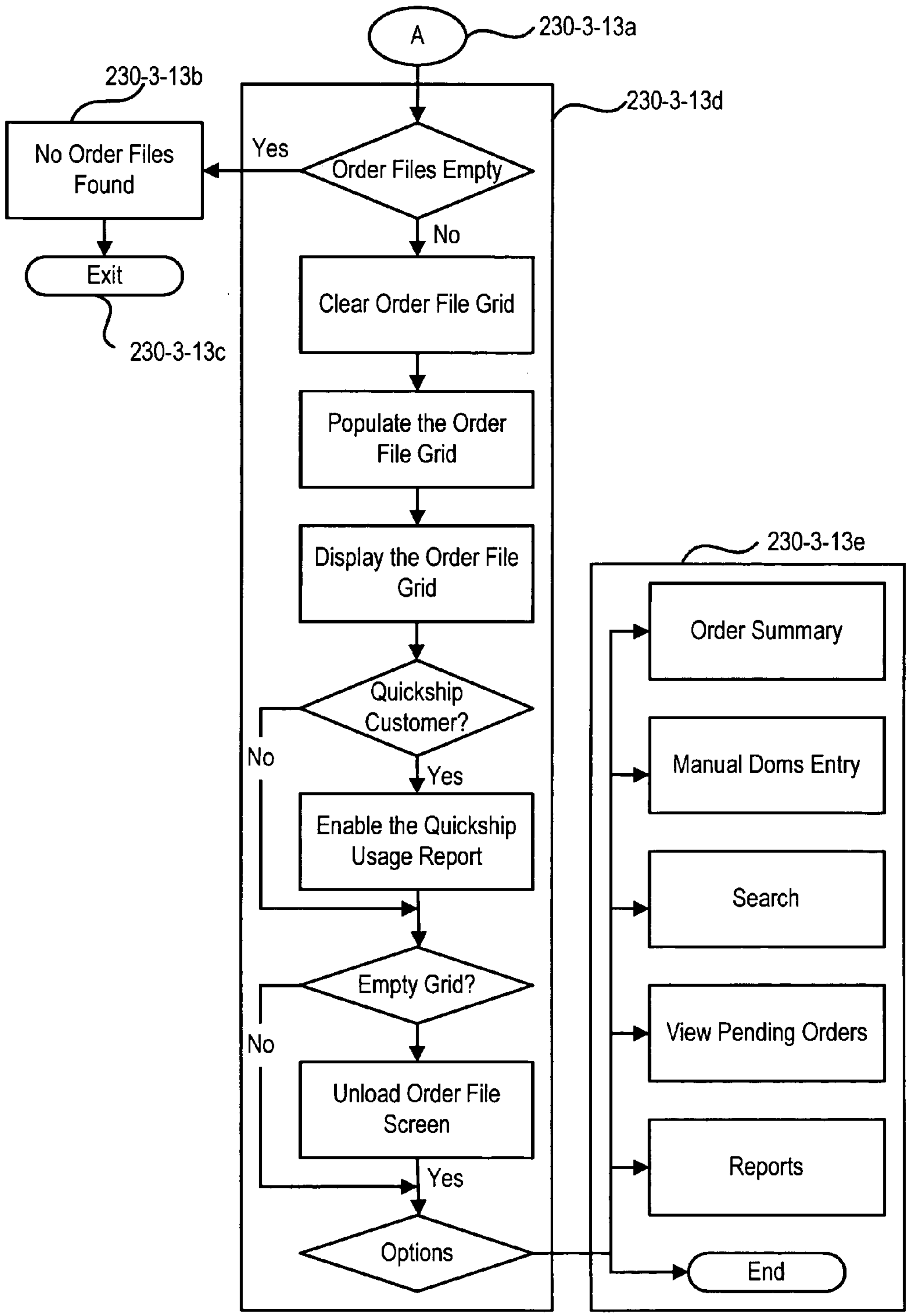
Figures 3C, 23:
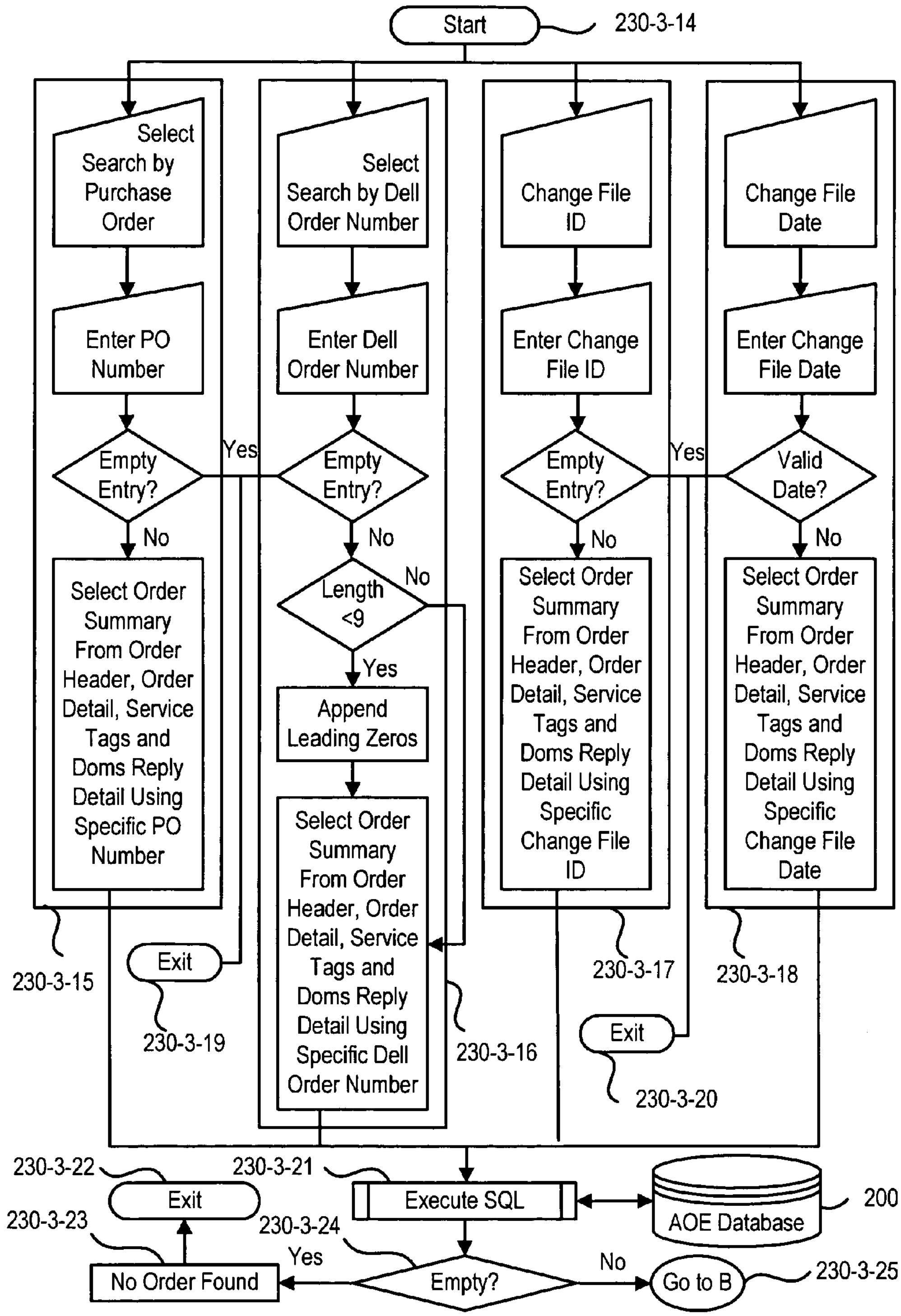
Figures 3D, 23:
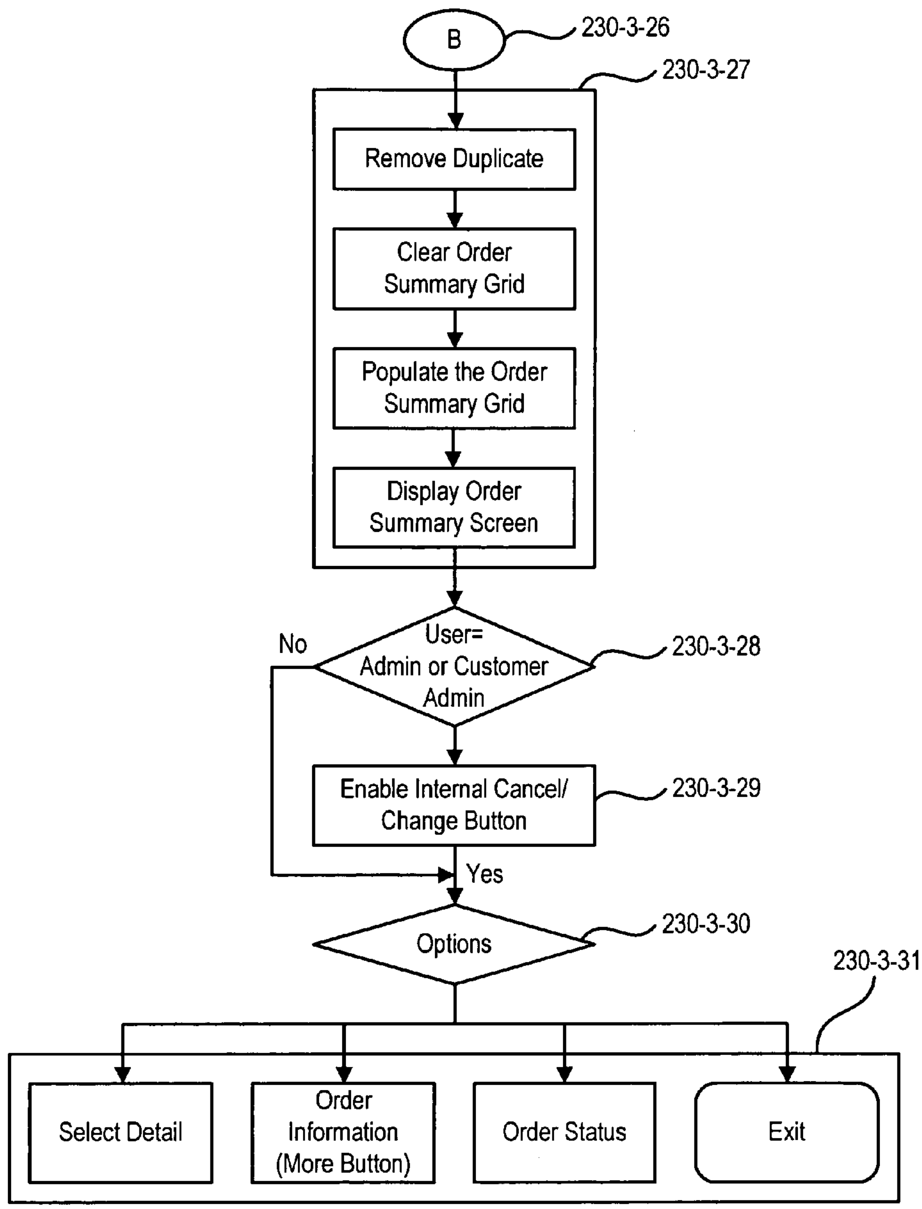
Figures 4A, 23:
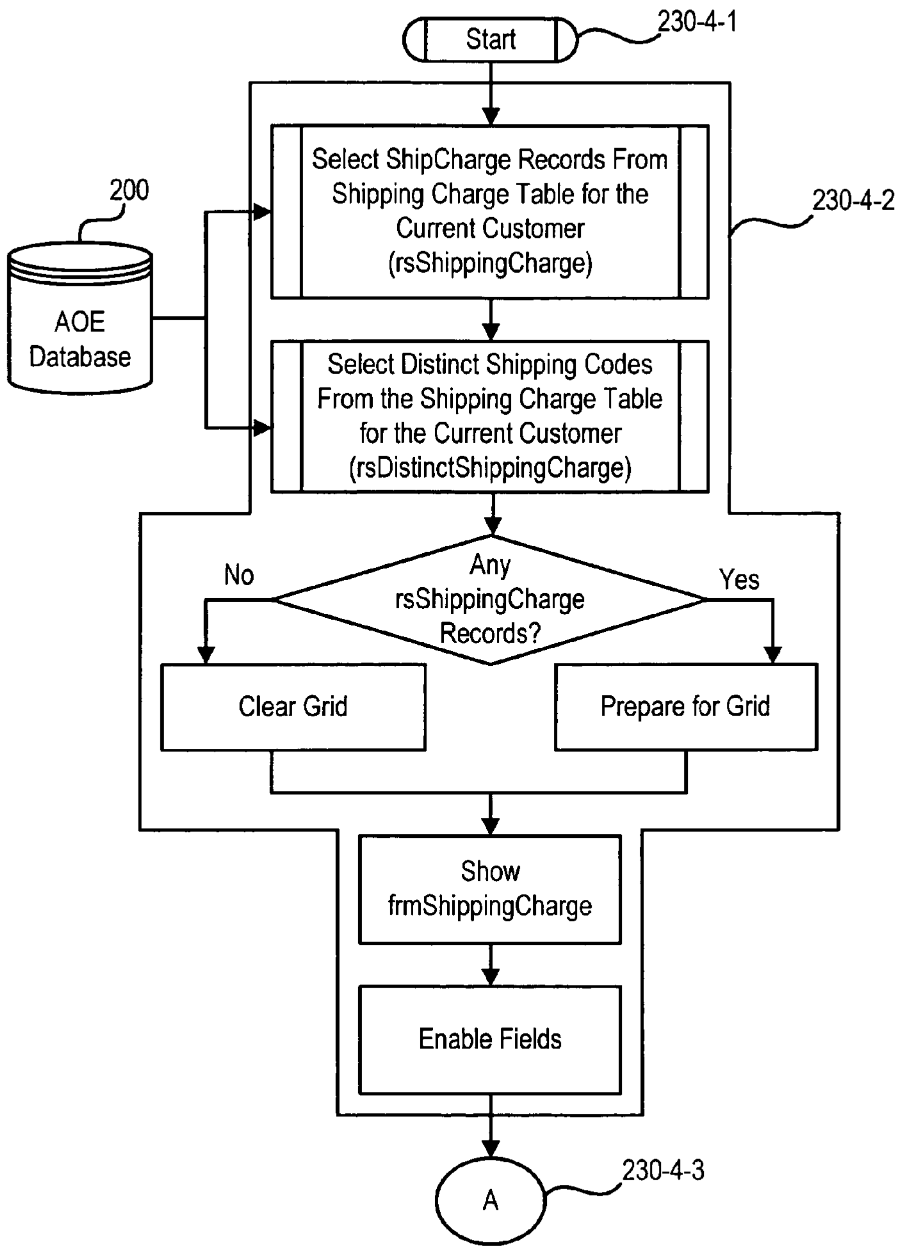
Figures 4B, 23:
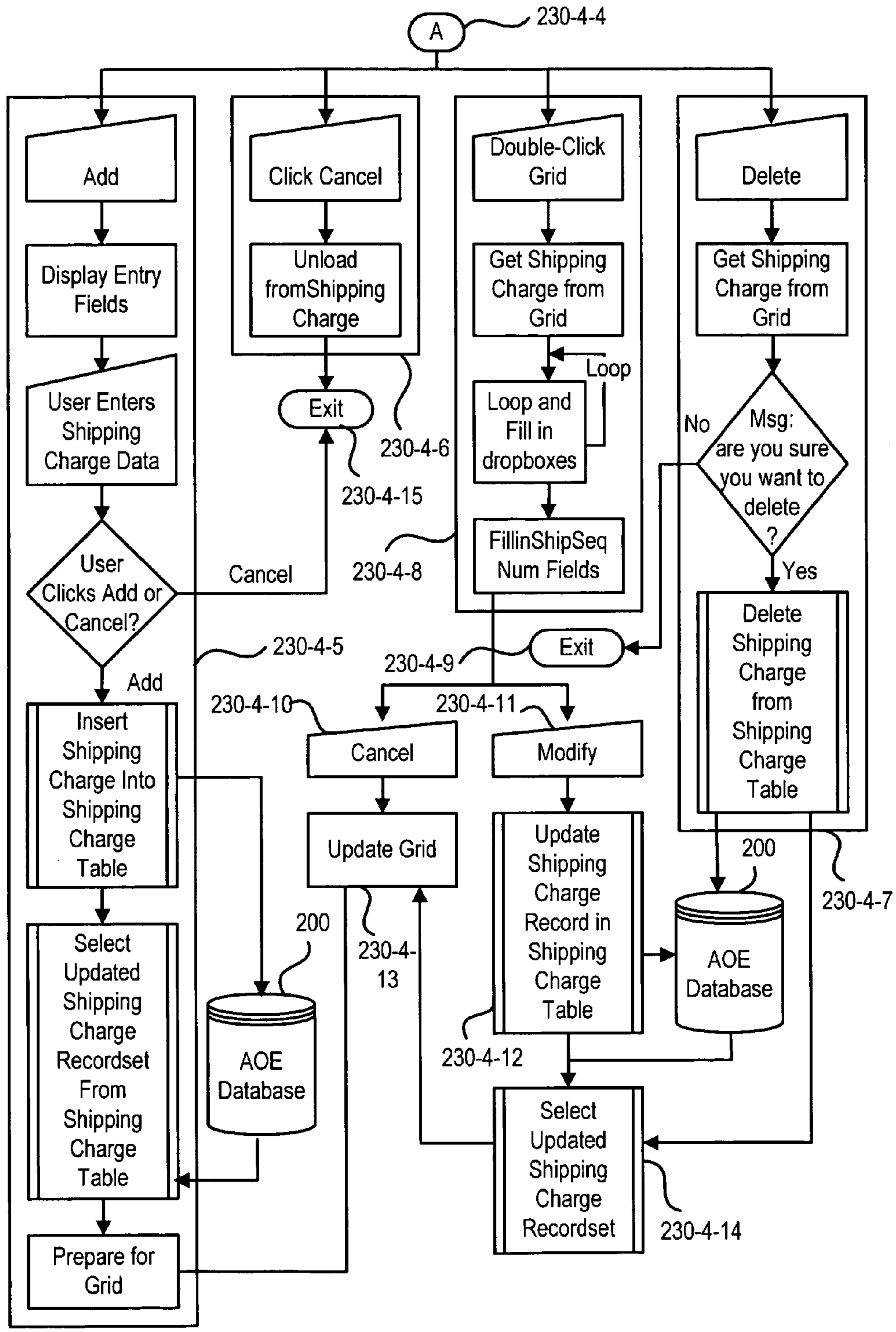
Figures 5A, 23:
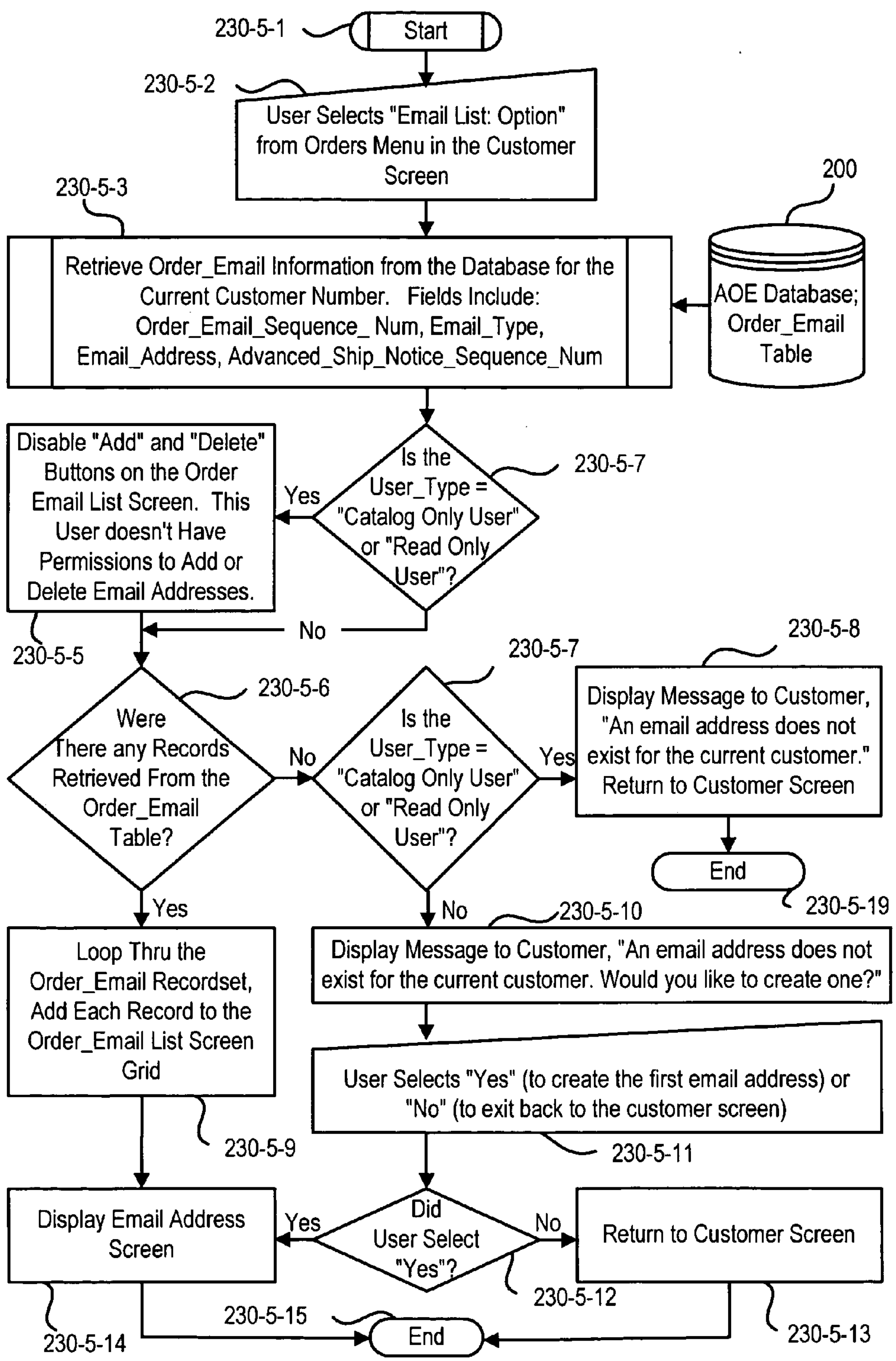
Figures 5B, 23:
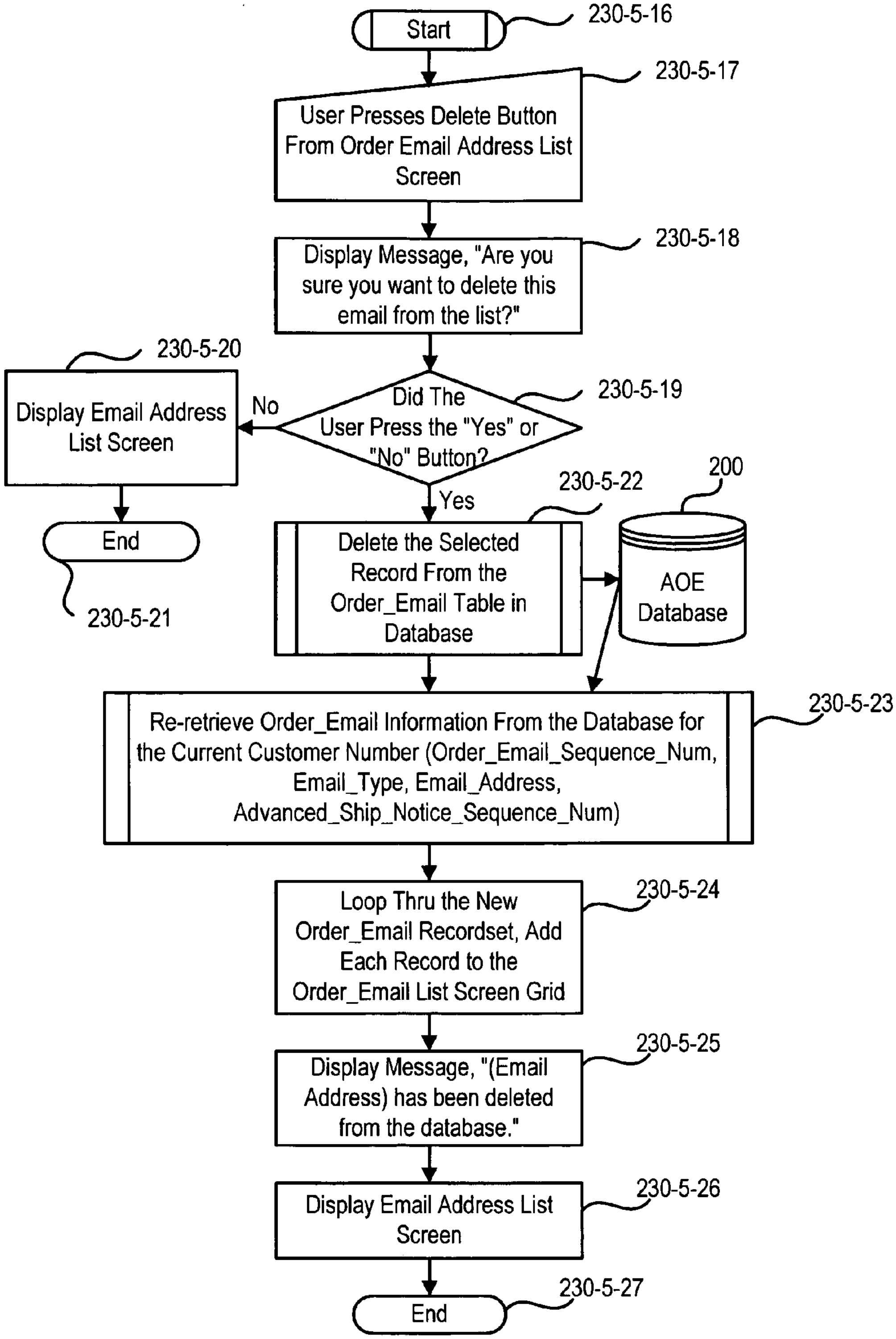
Figures 6A, 23:
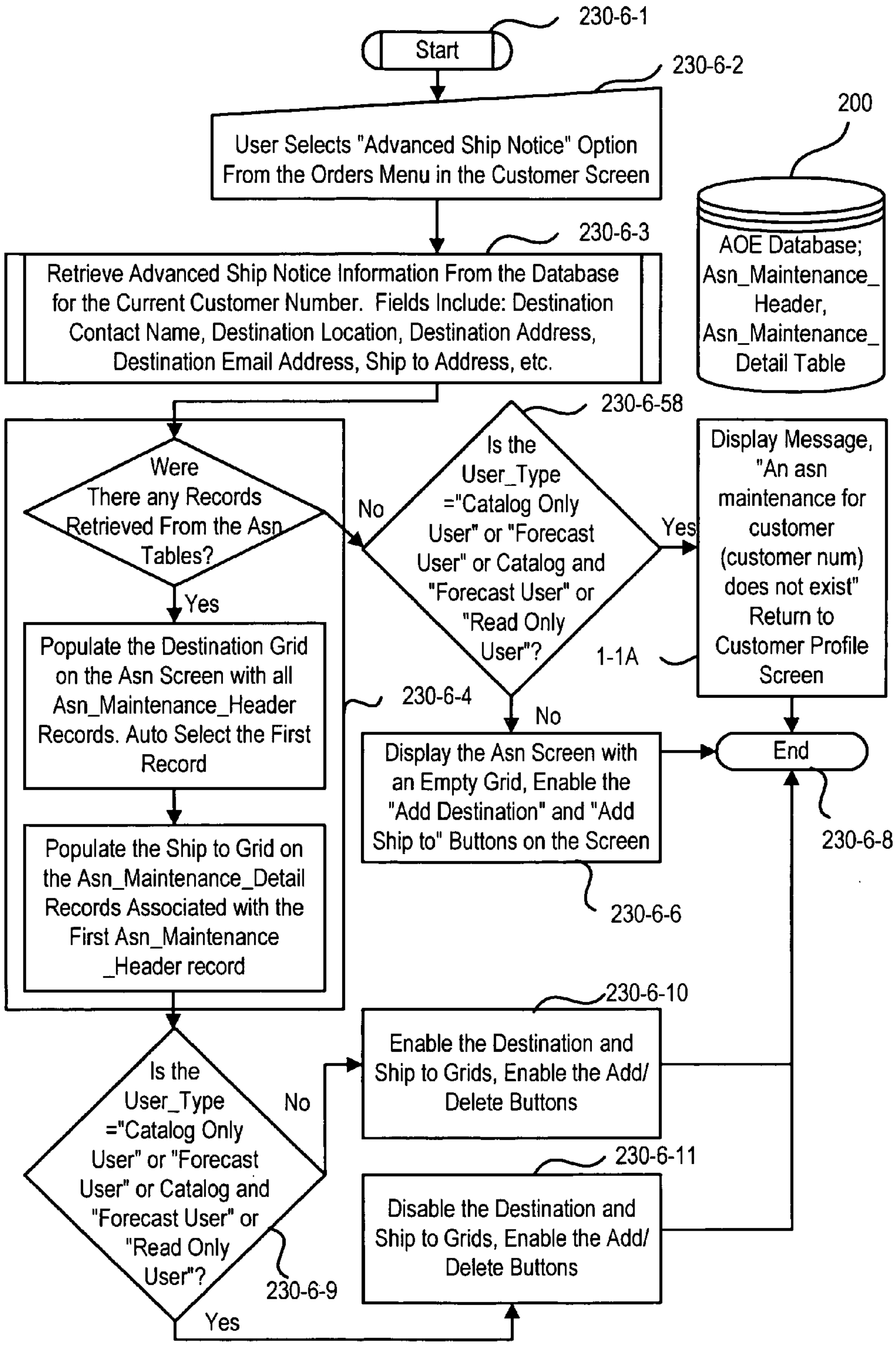
Figures 6B, 23:
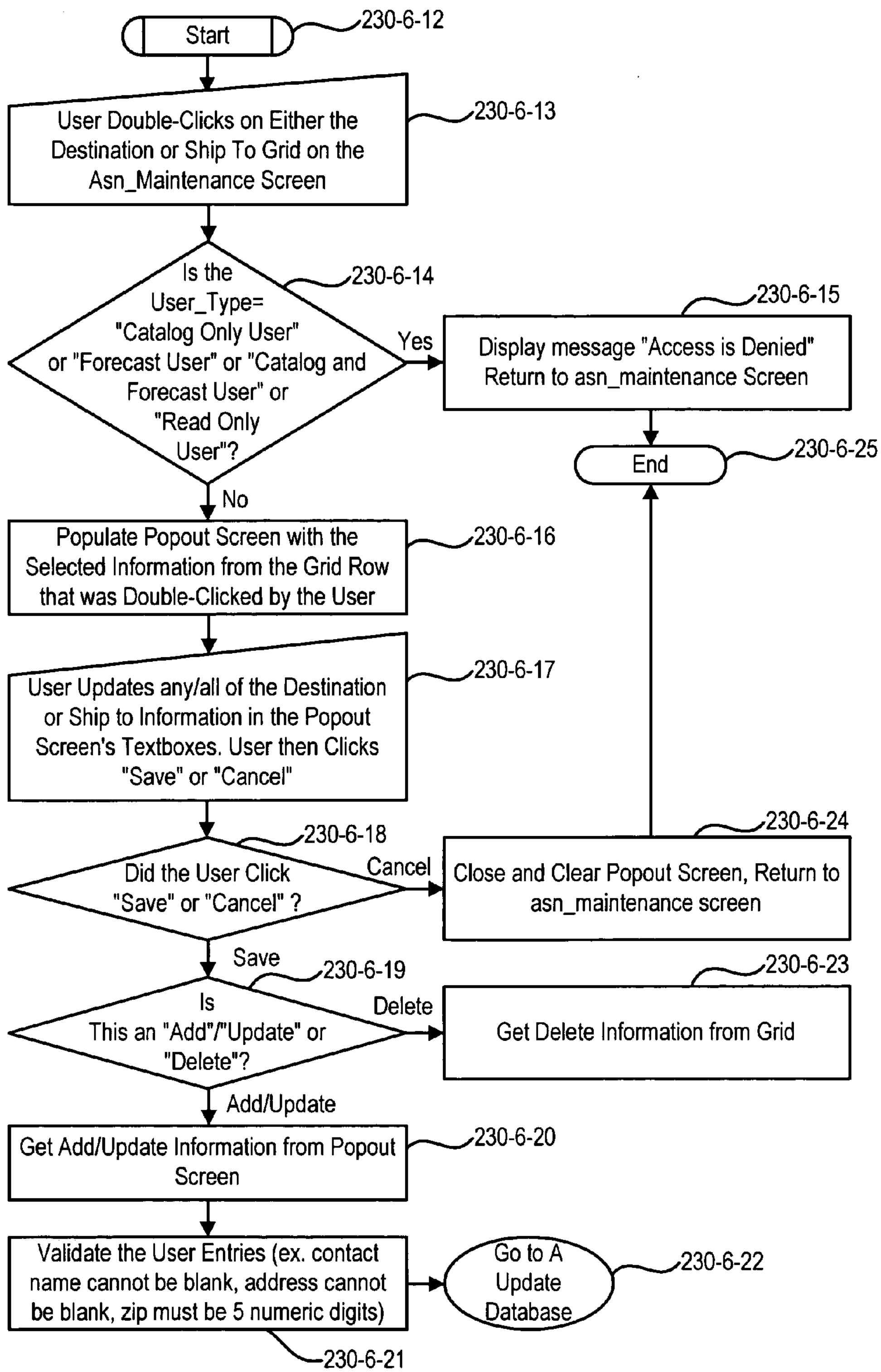
Figures 6C, 23:
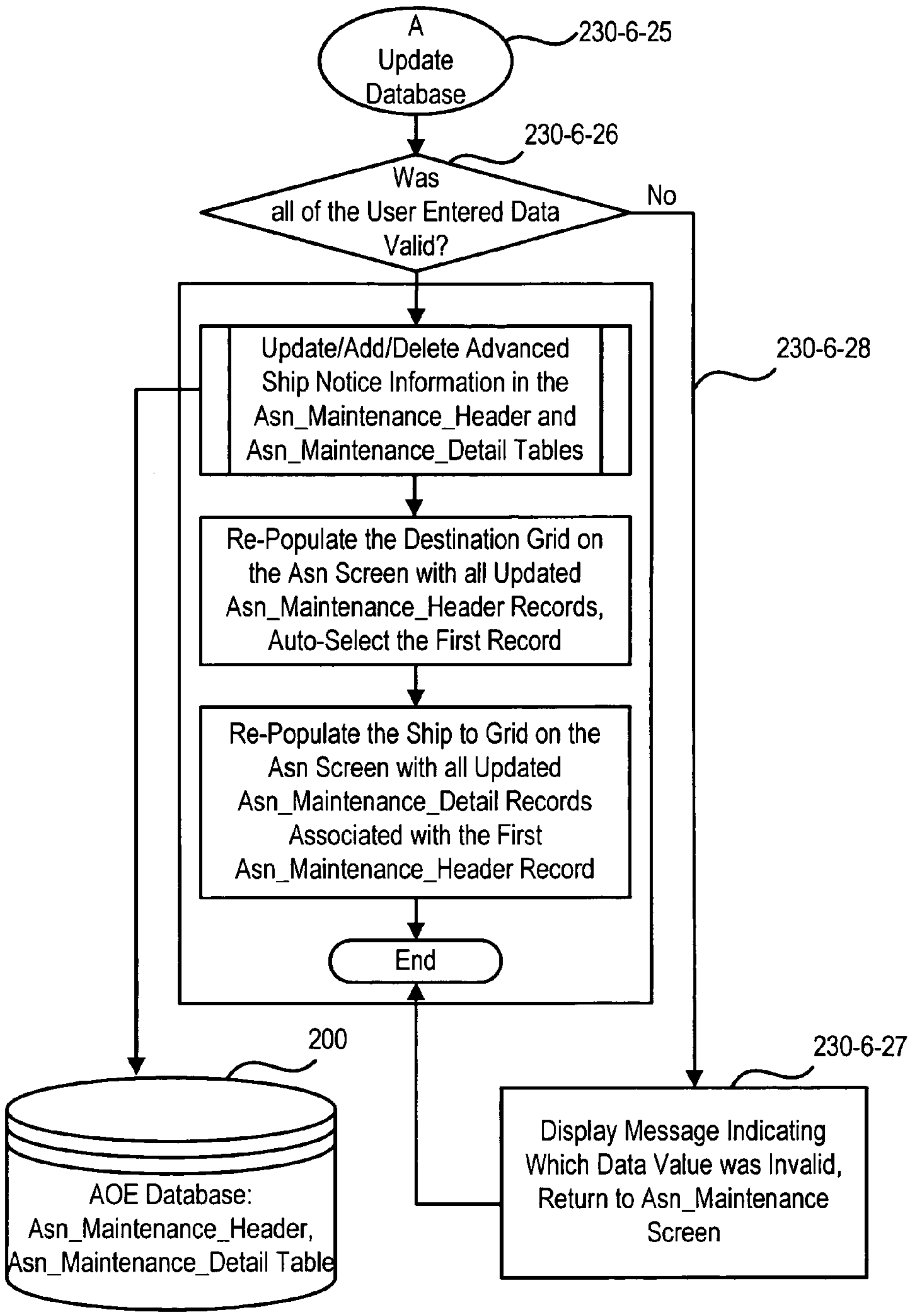
Figures 7, 23:
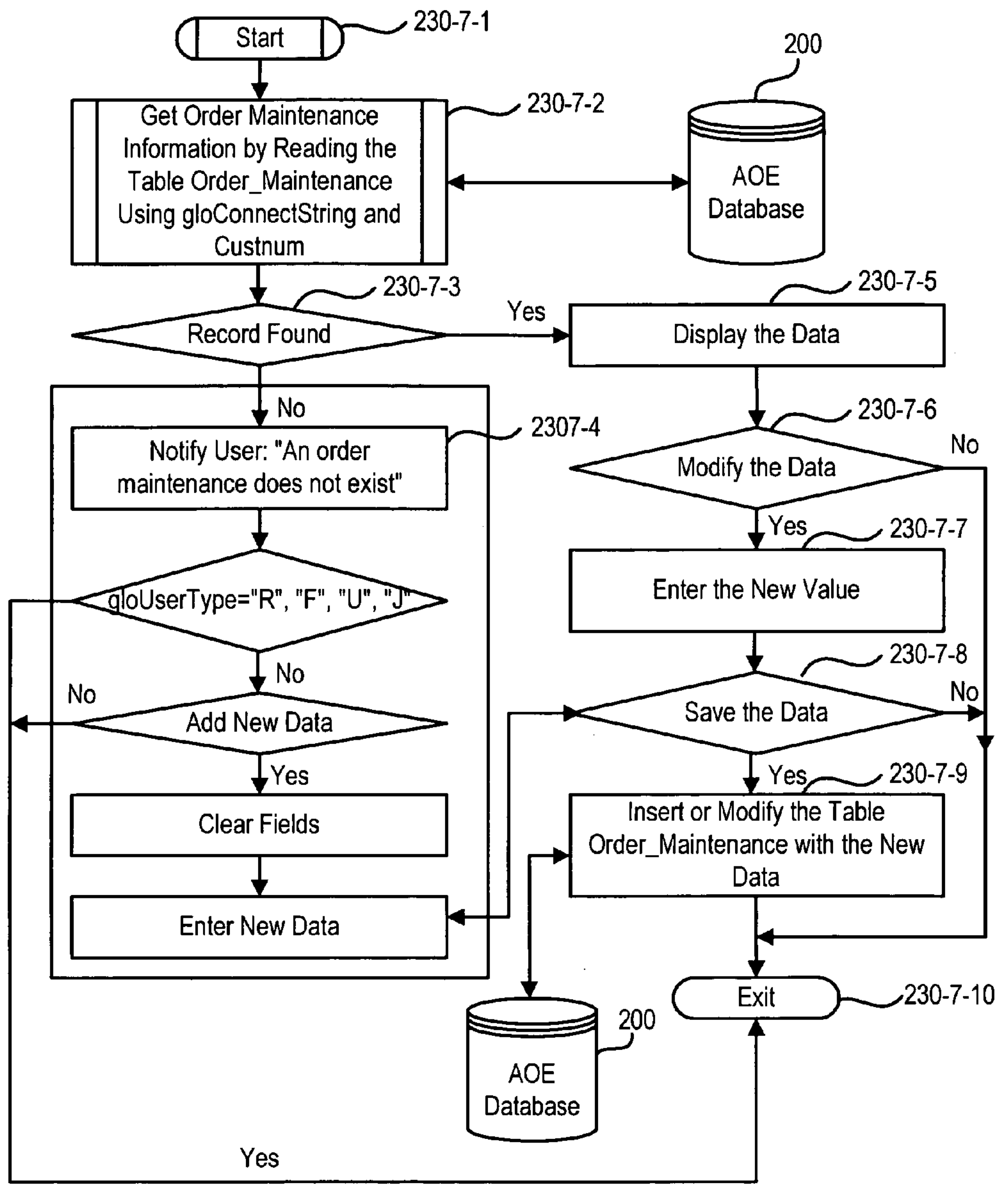
Figures 8A, 23:
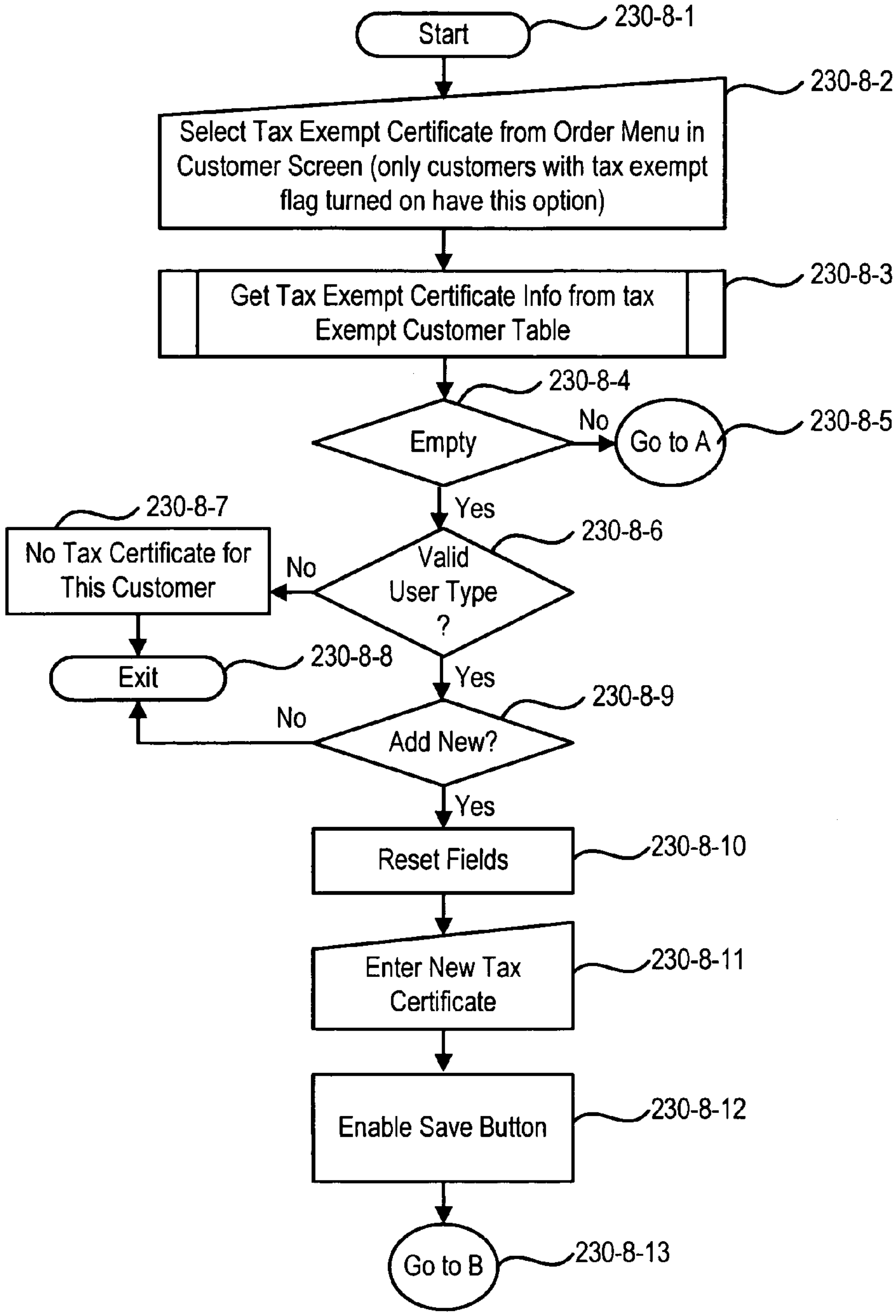
Figures 8B, 23:
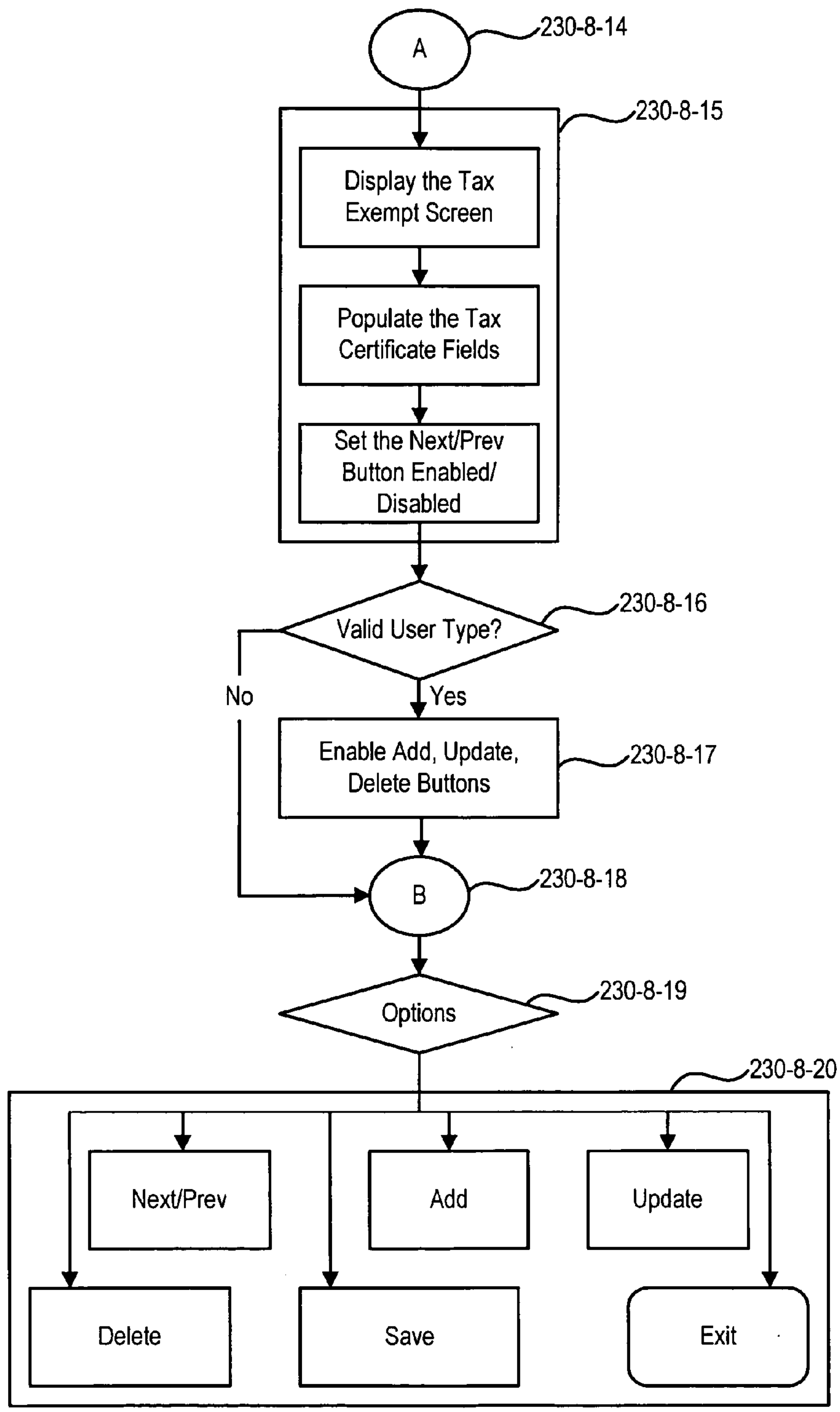
Figures 8C, 23:
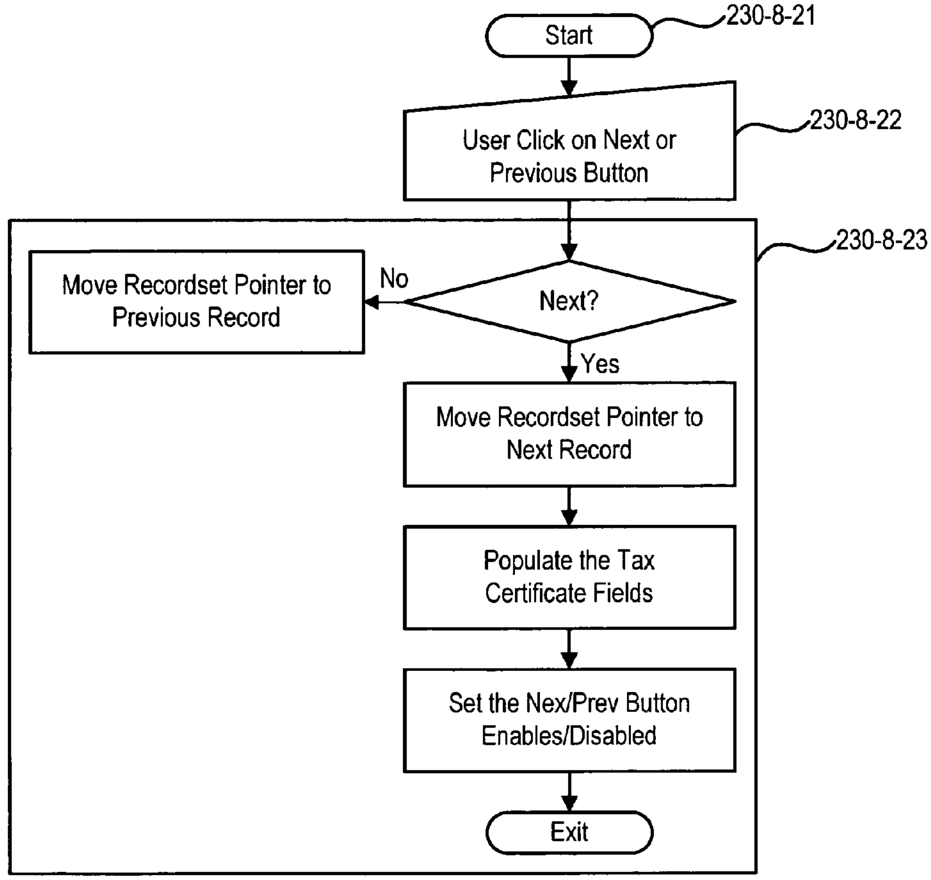
Figures 8D, 23:
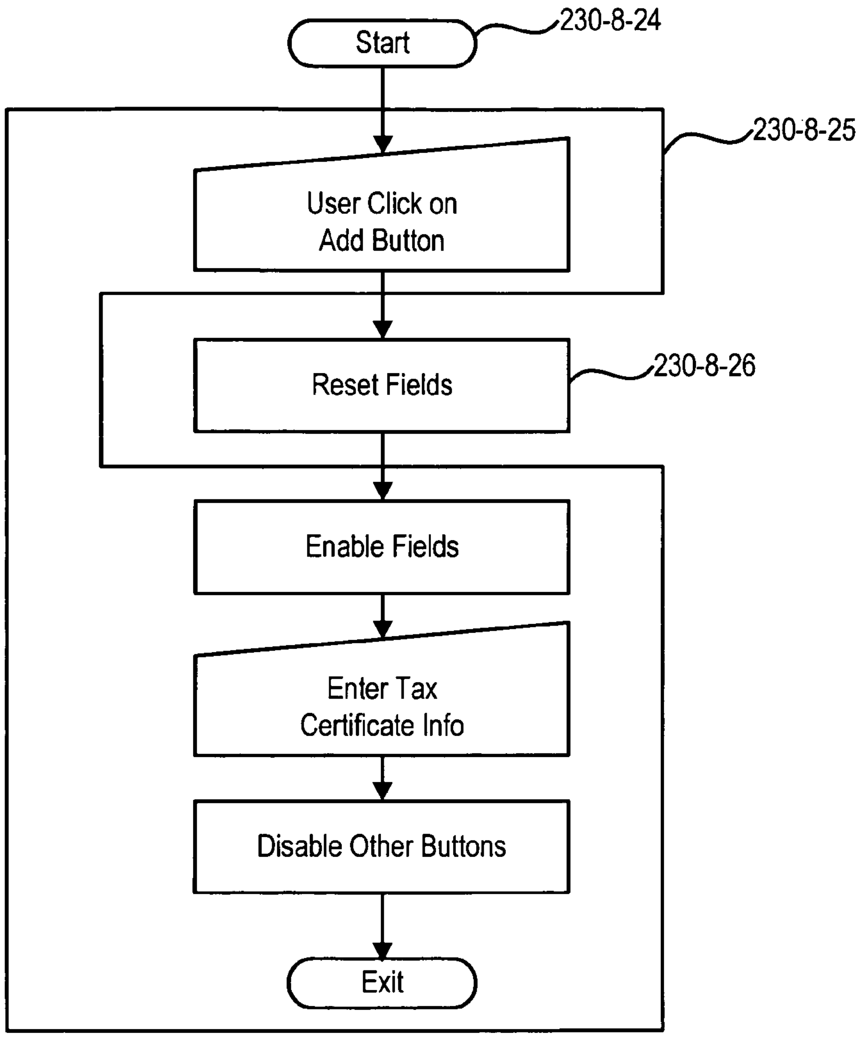
Figures 8F, 23:
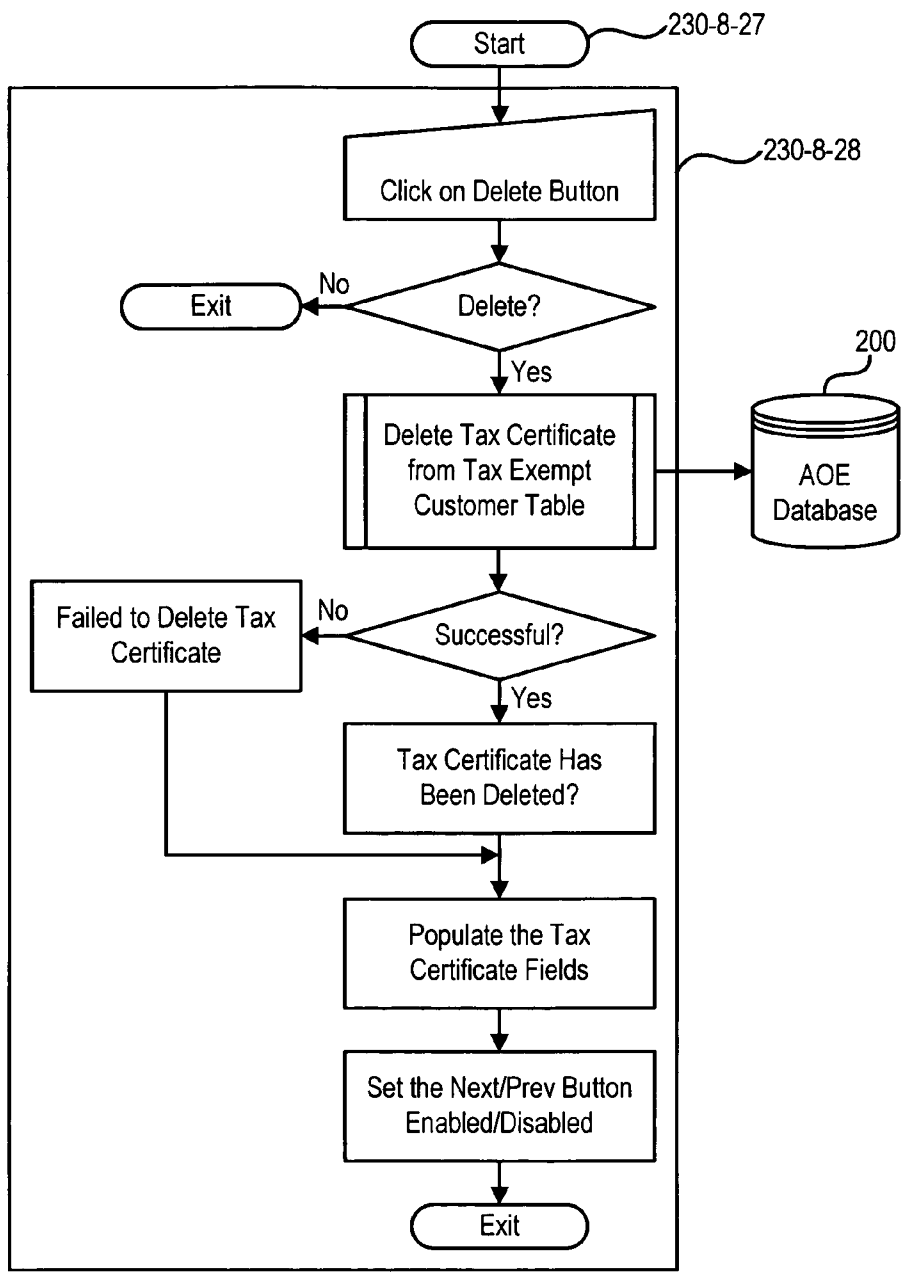
Figures 8G, 23:
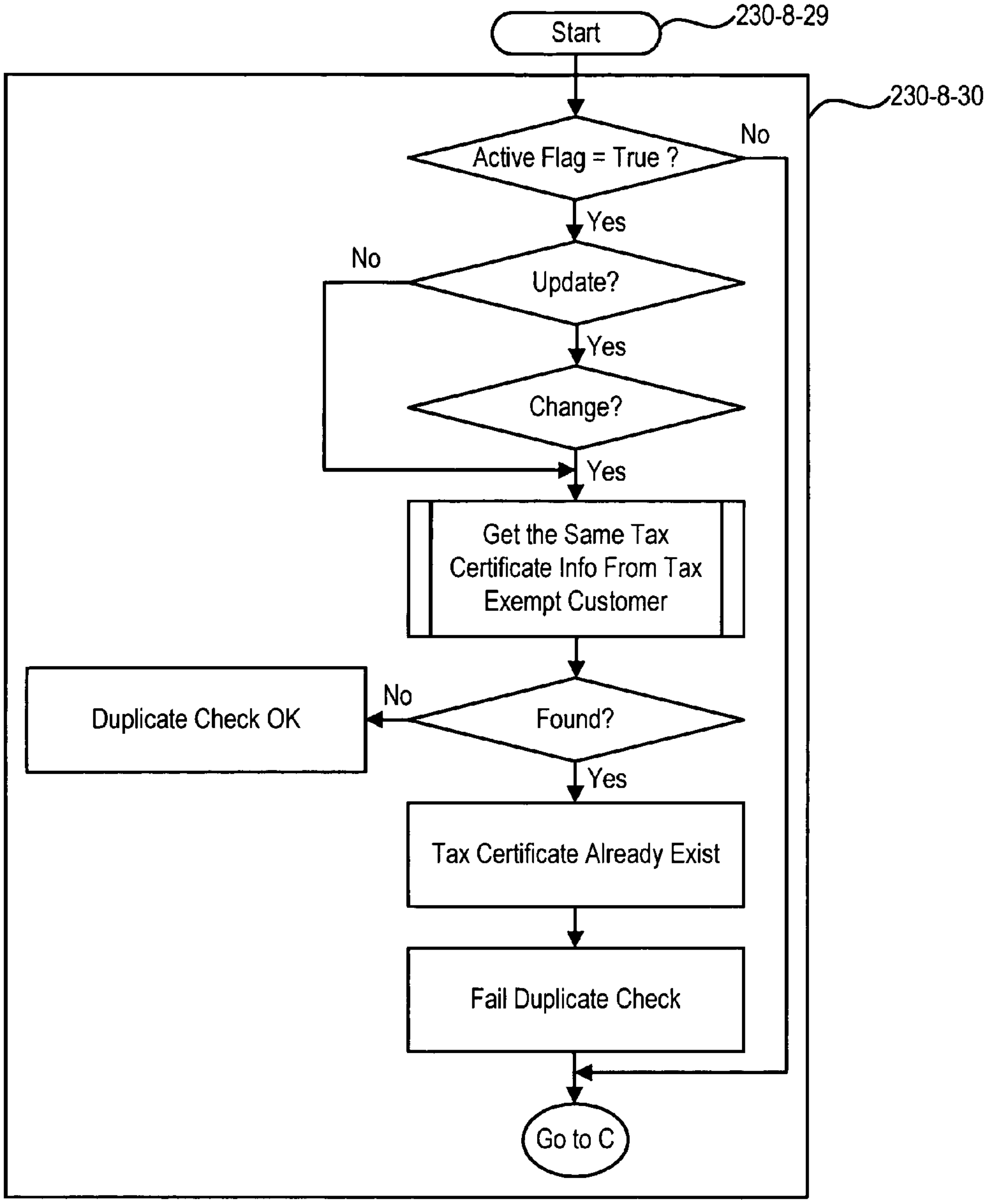
Figures 8H, 23:
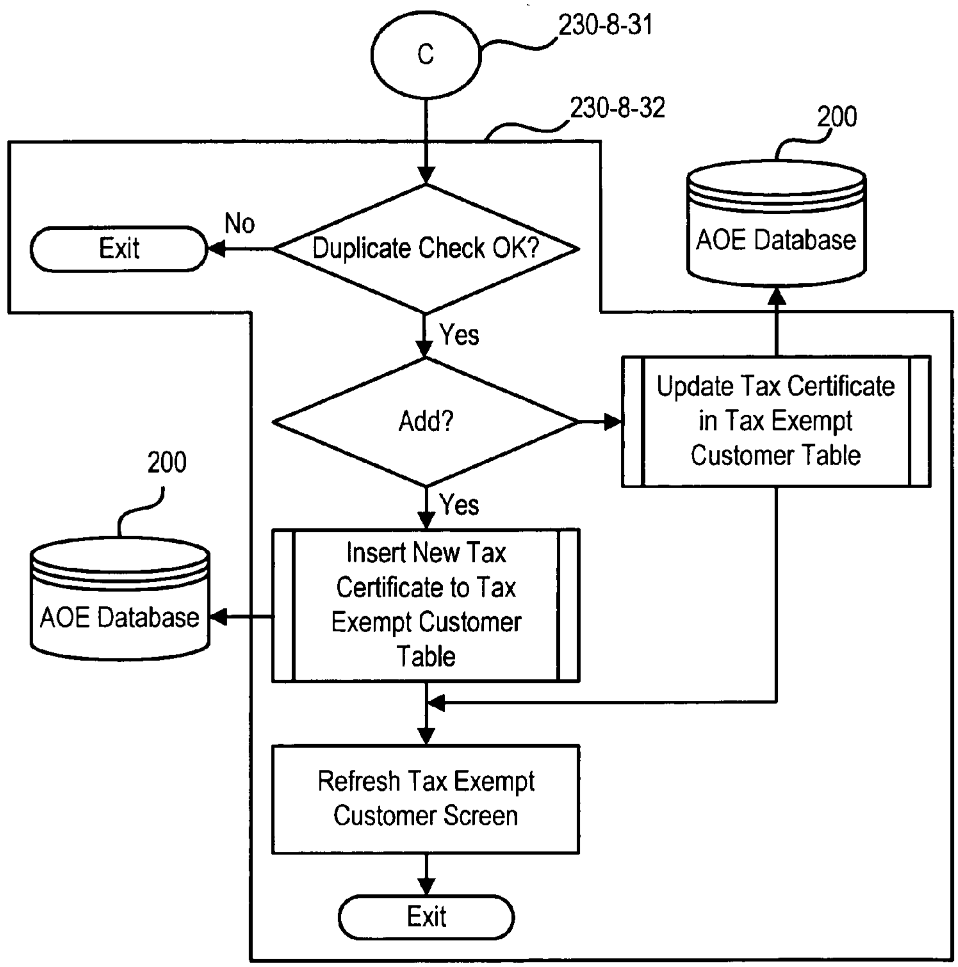
Figures 9A, 23:
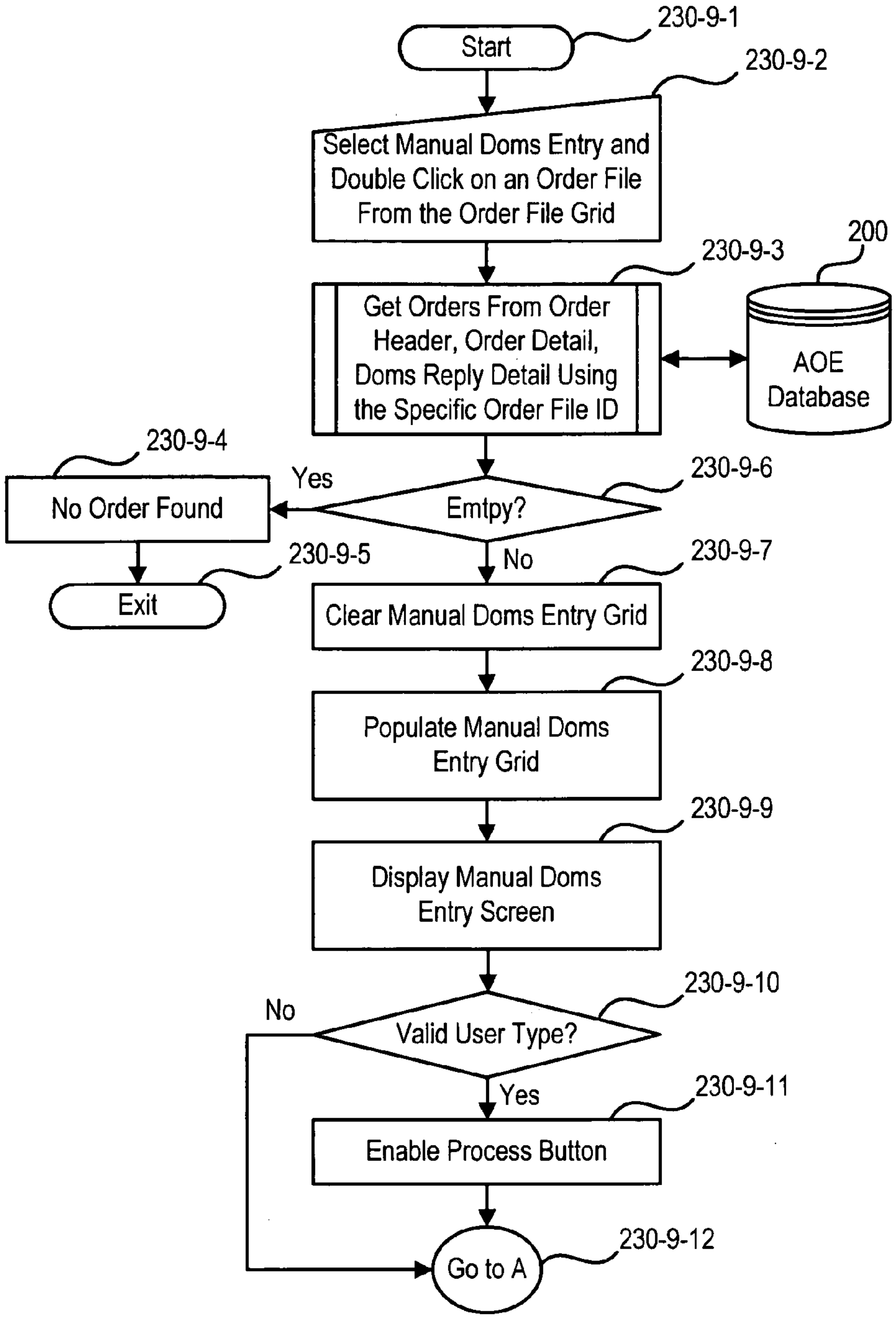
Figures 9B, 23:
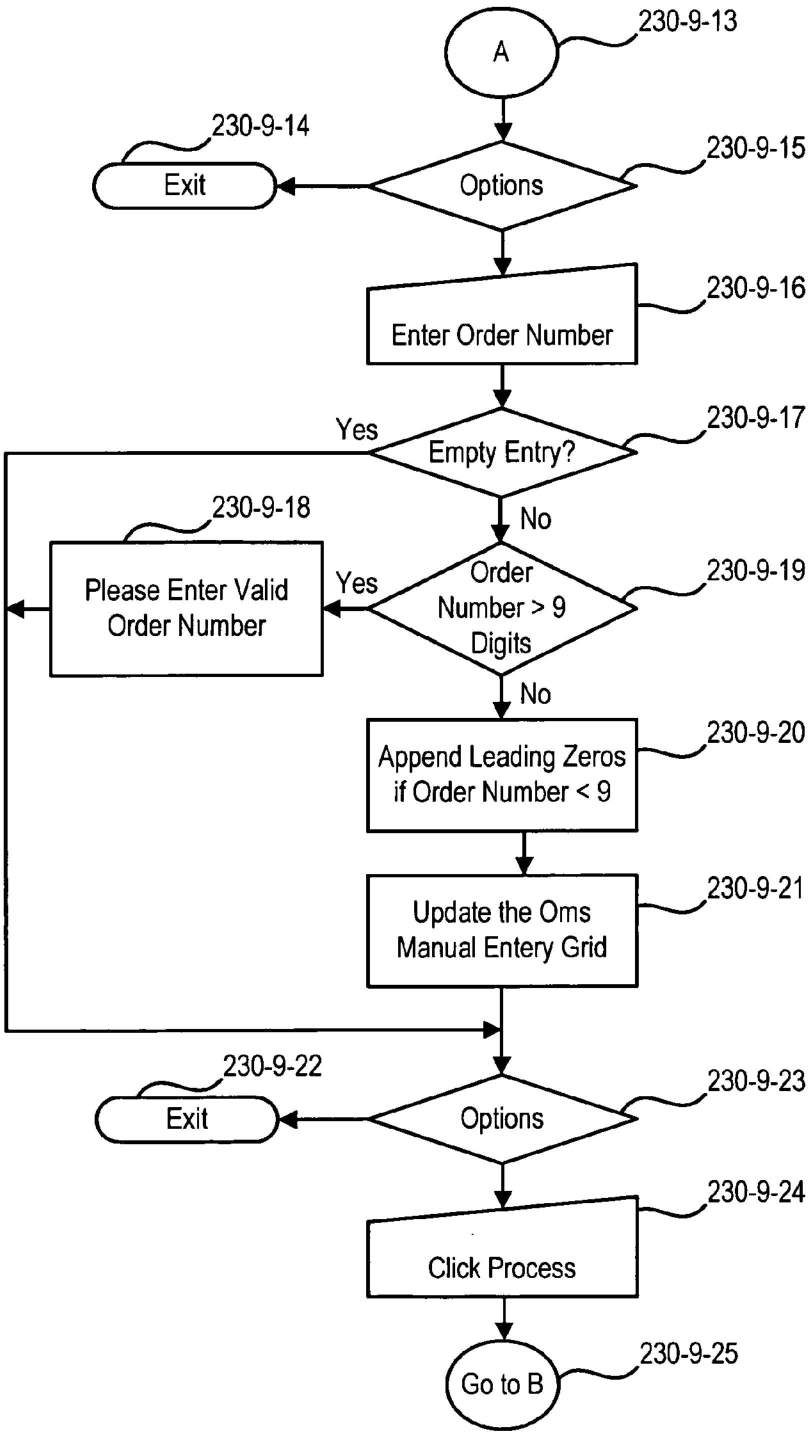
Figures 9C, 23:
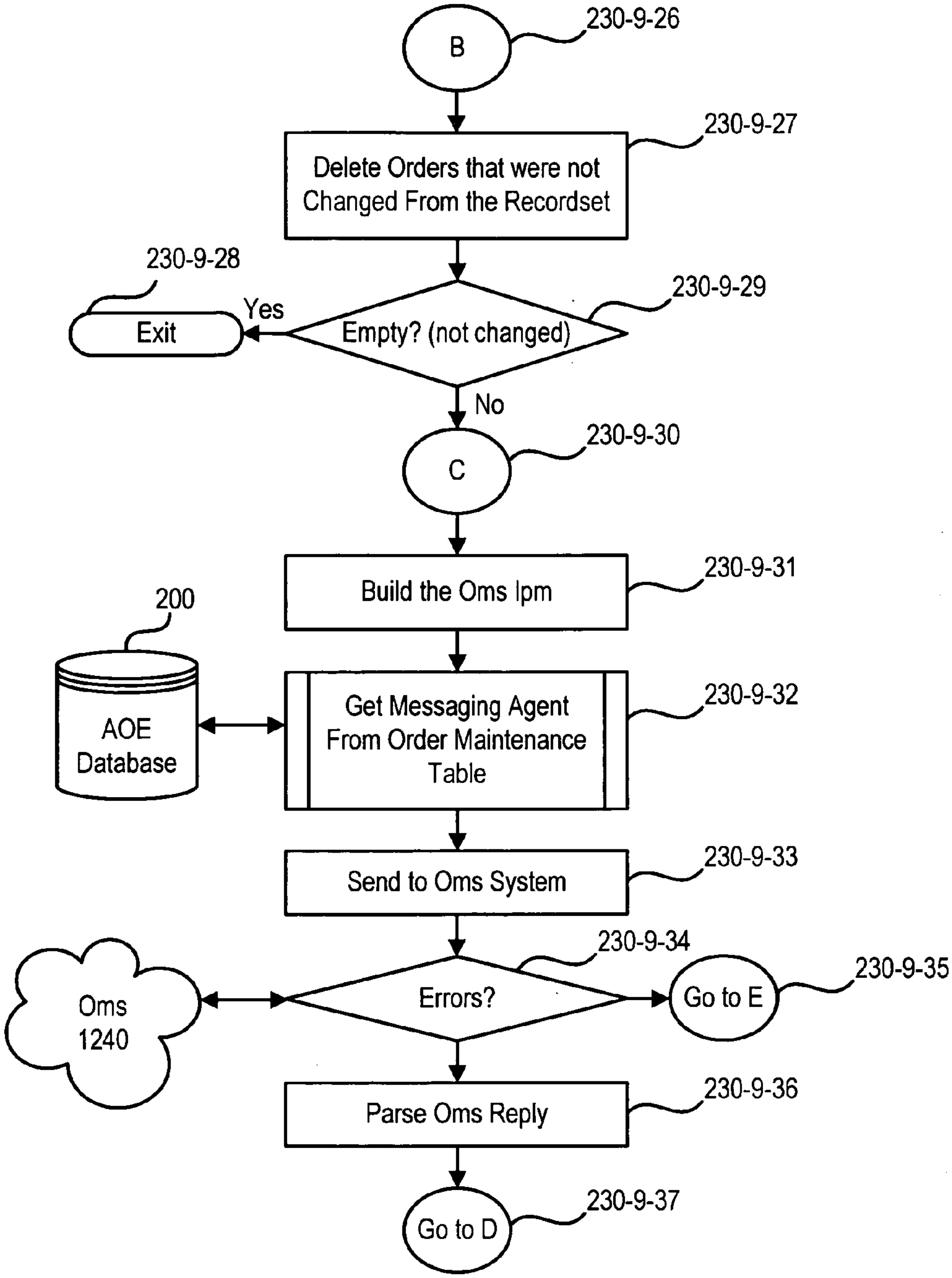
Figures 9D, 23:
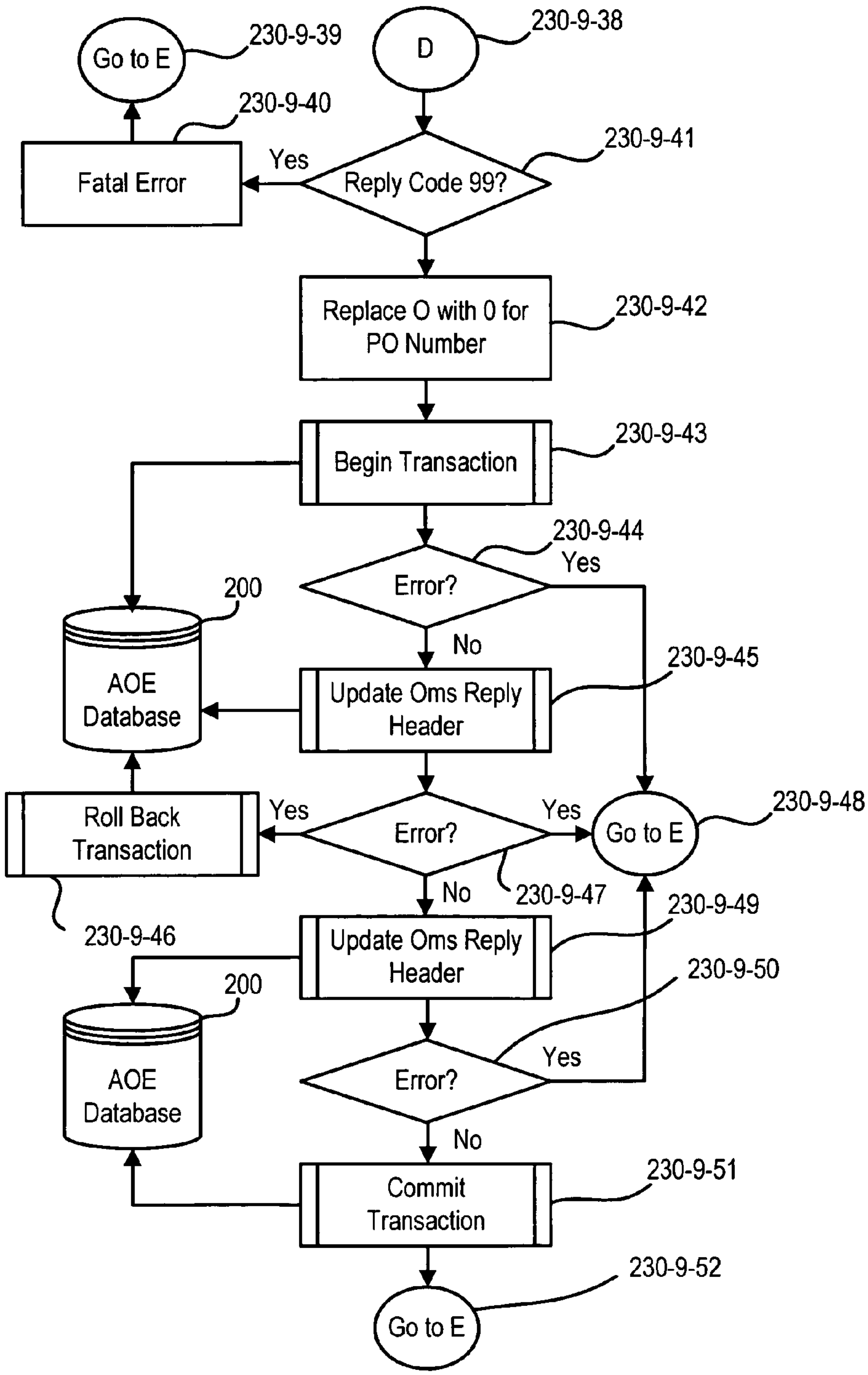
Figures 9E, 23:
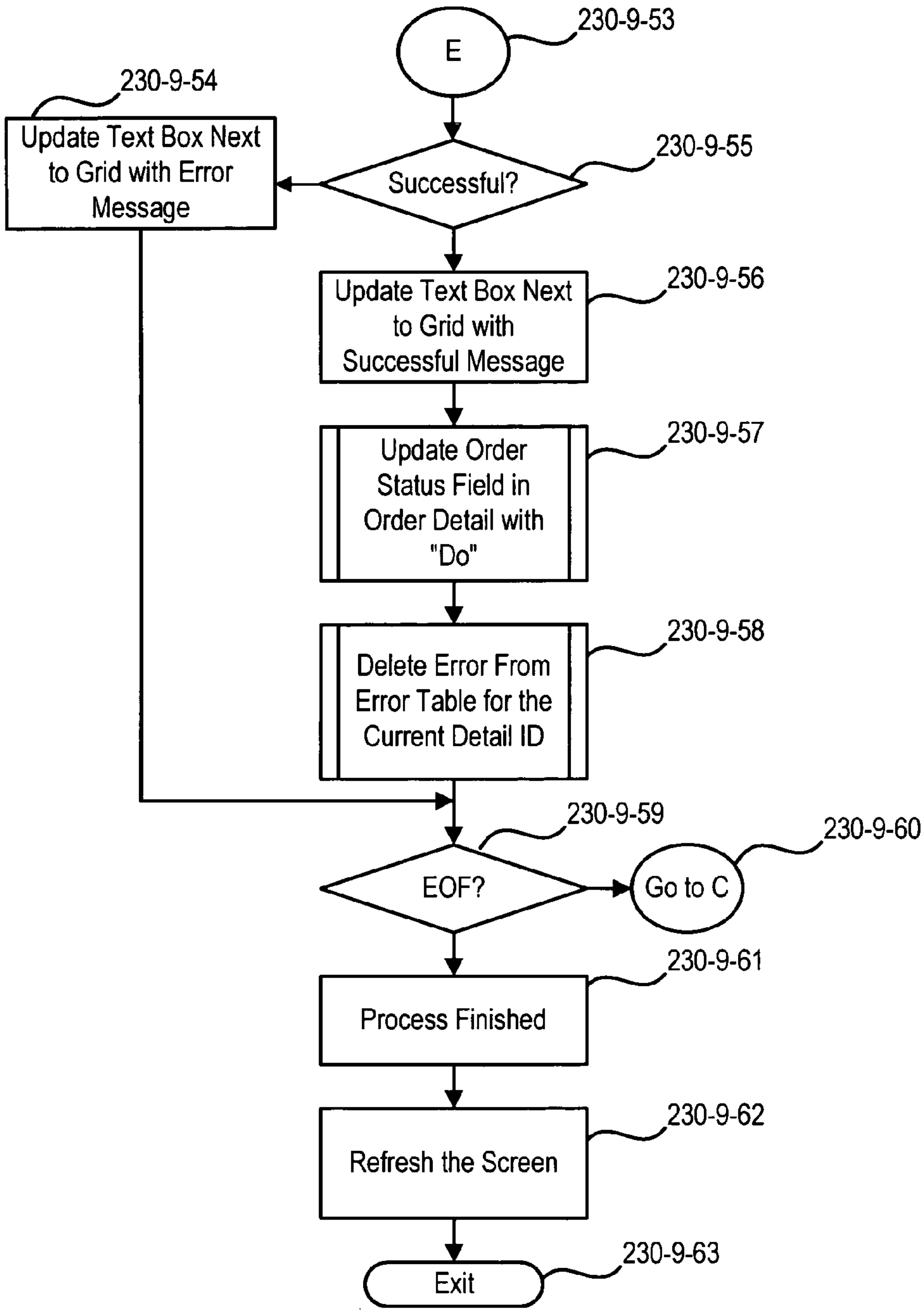
Figures 10A, 23:
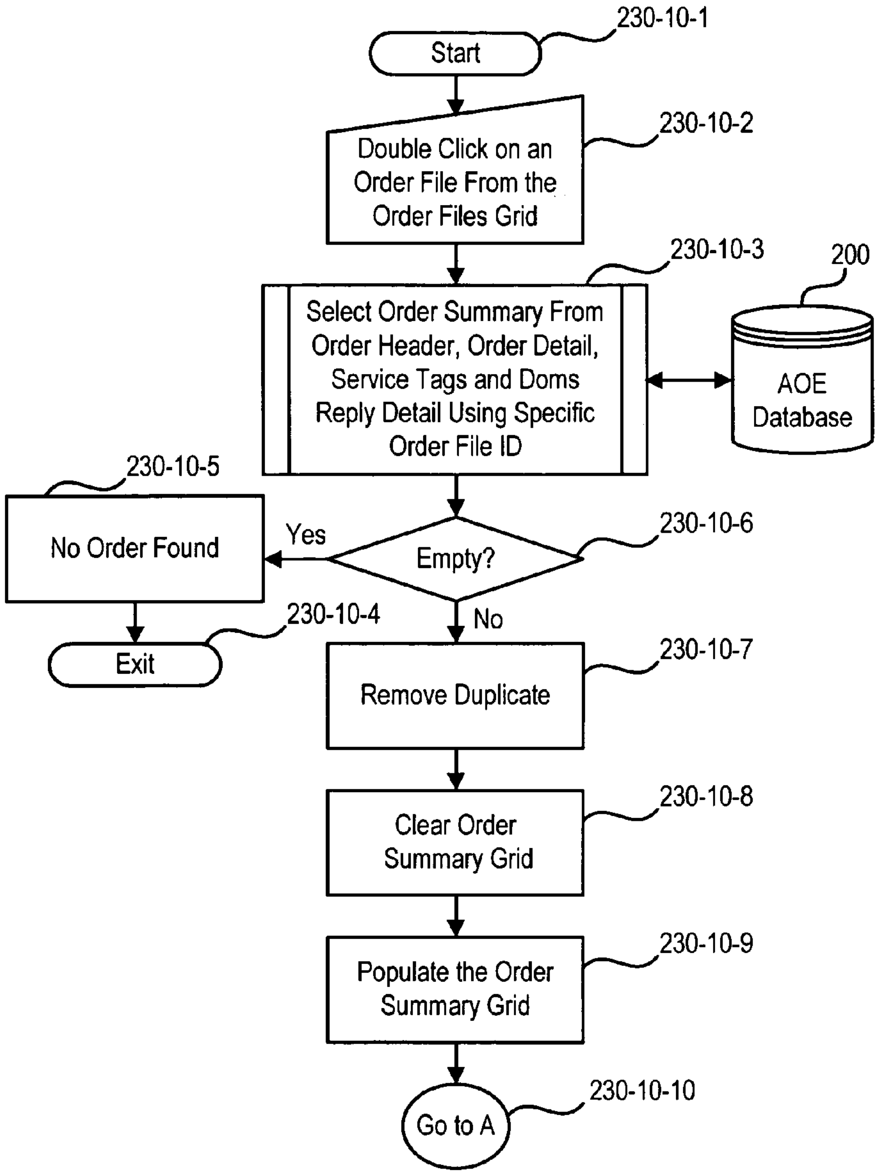
Figures 10B, 23:
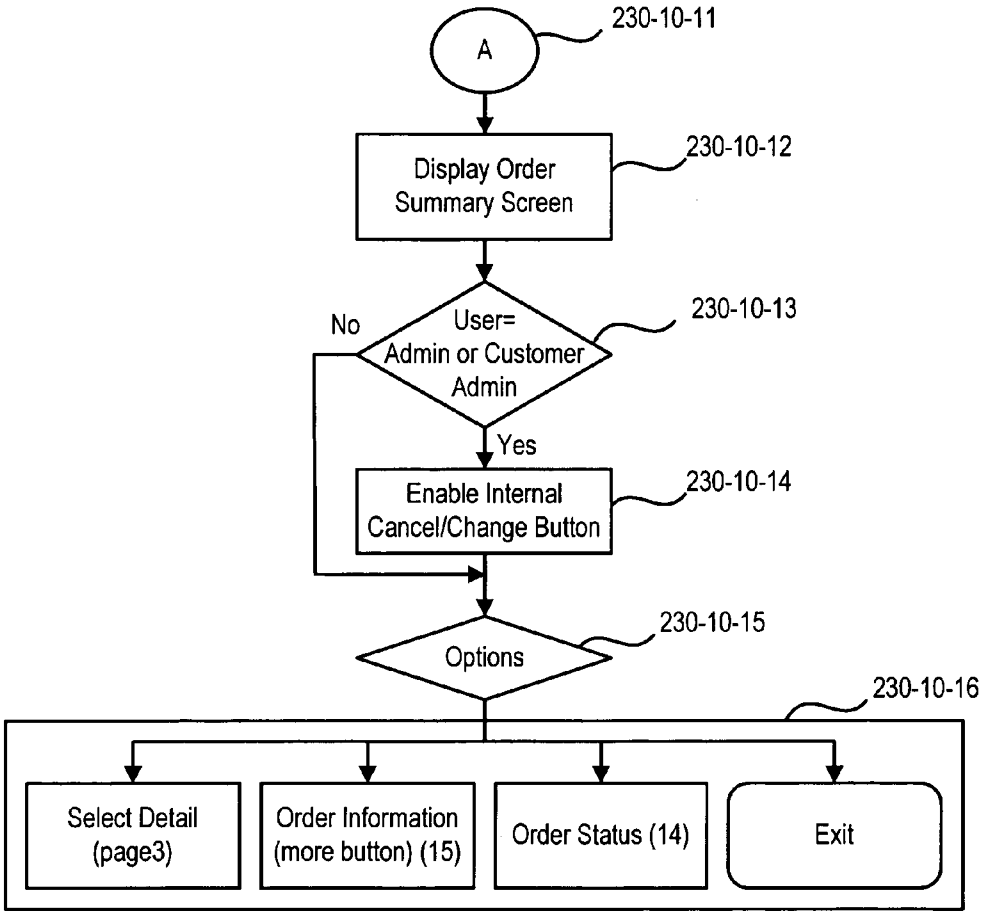
Figures 11A, 23:
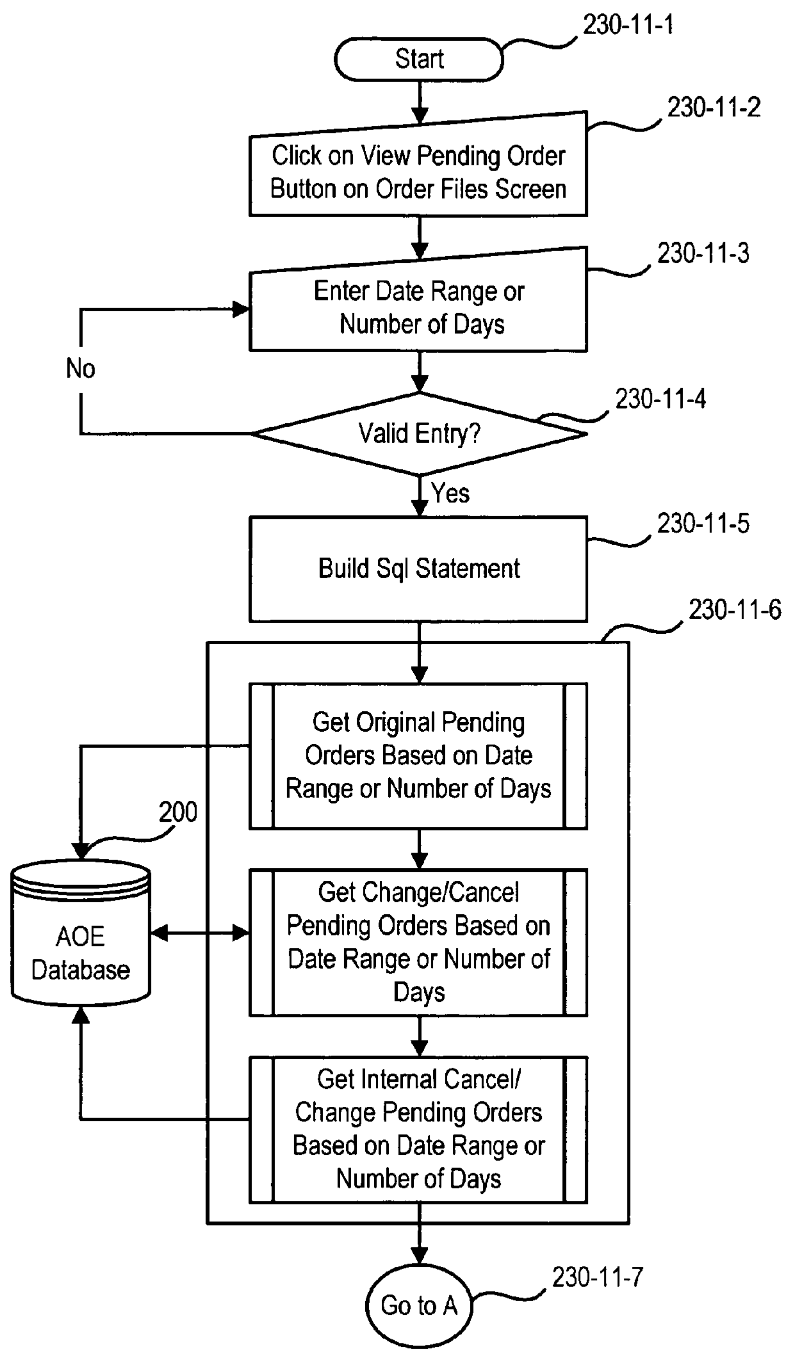
Figures 11B, 23:
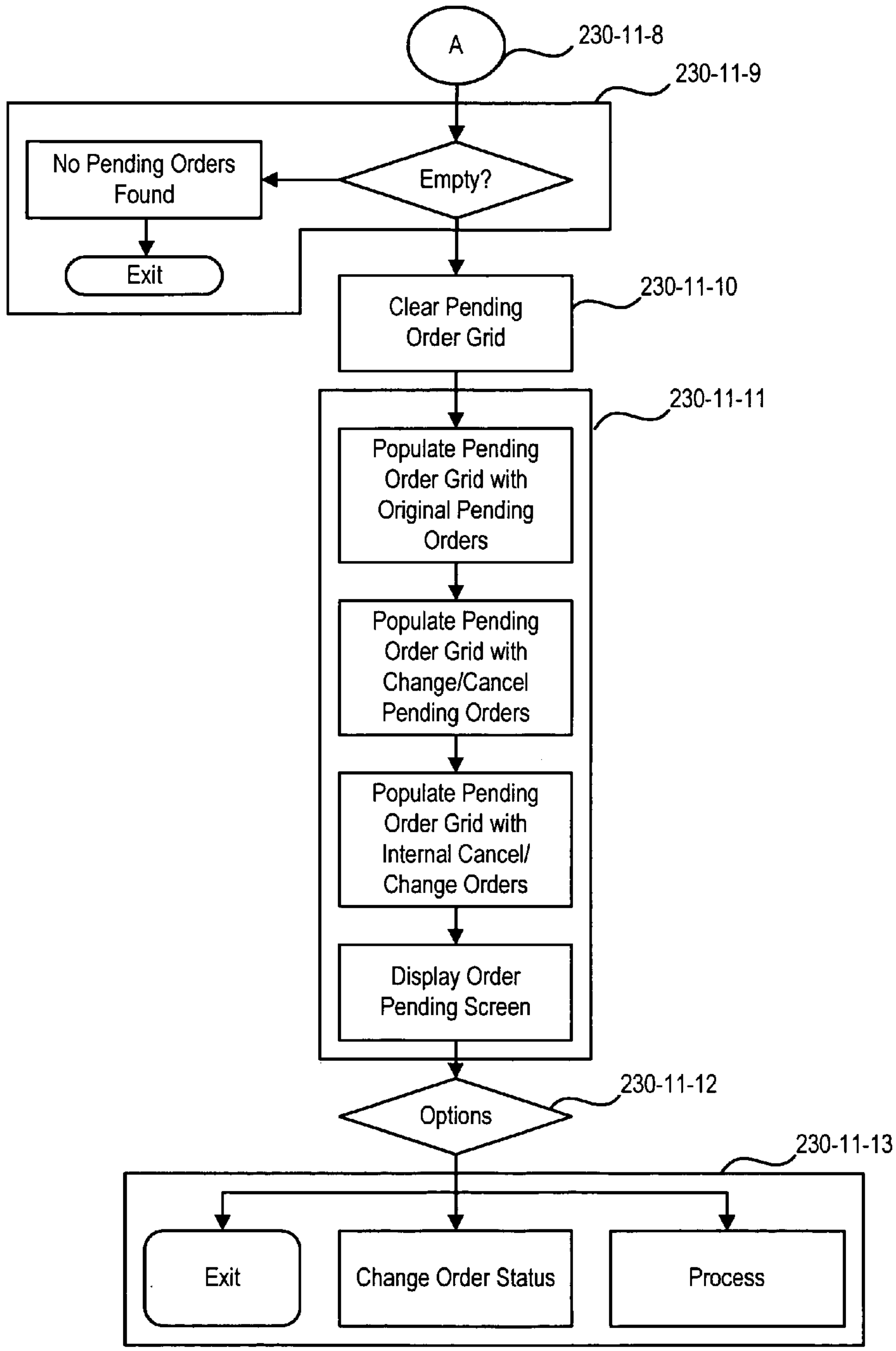
Figures 11C, 23:
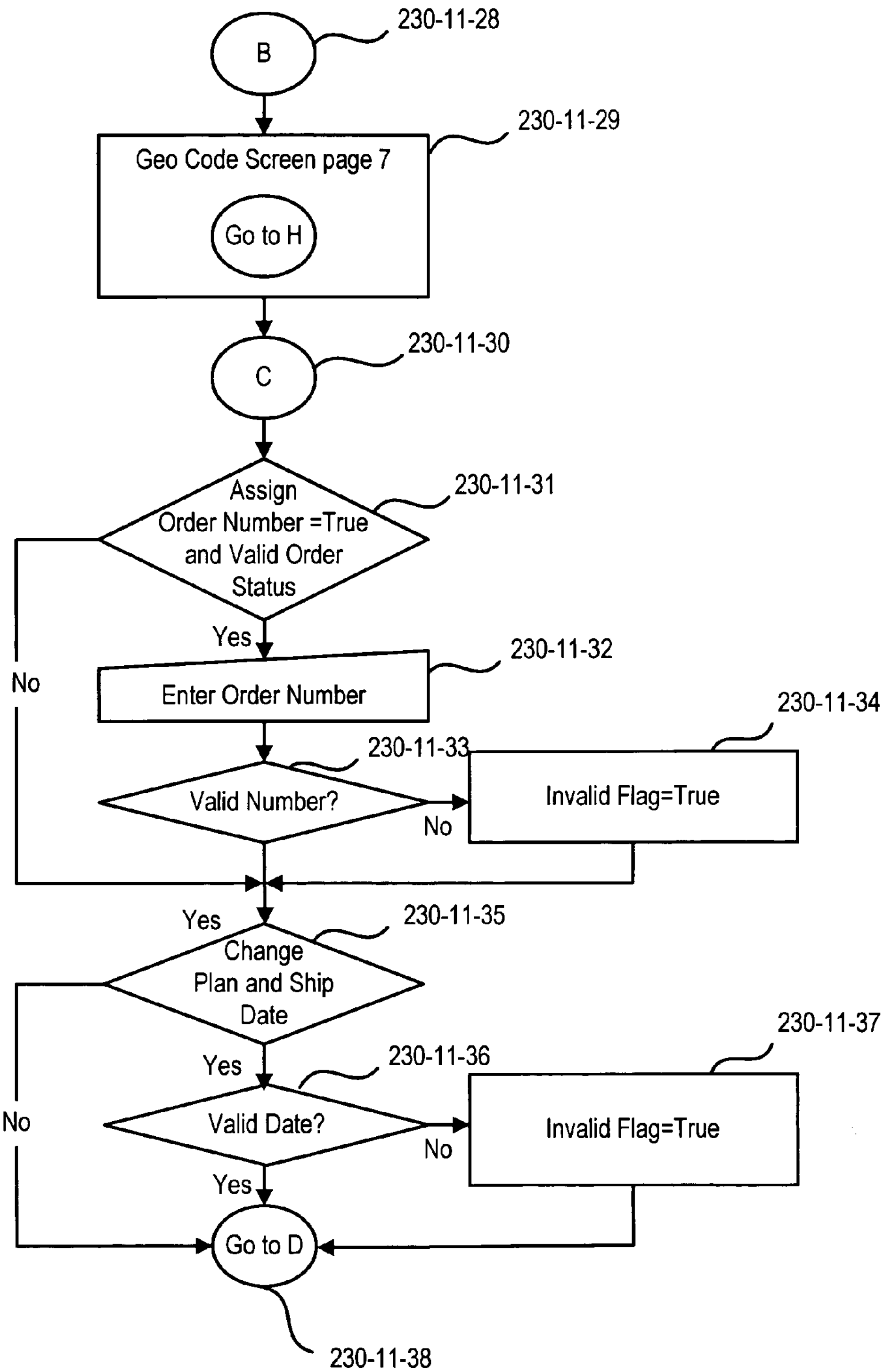
Figures 11D, 23:
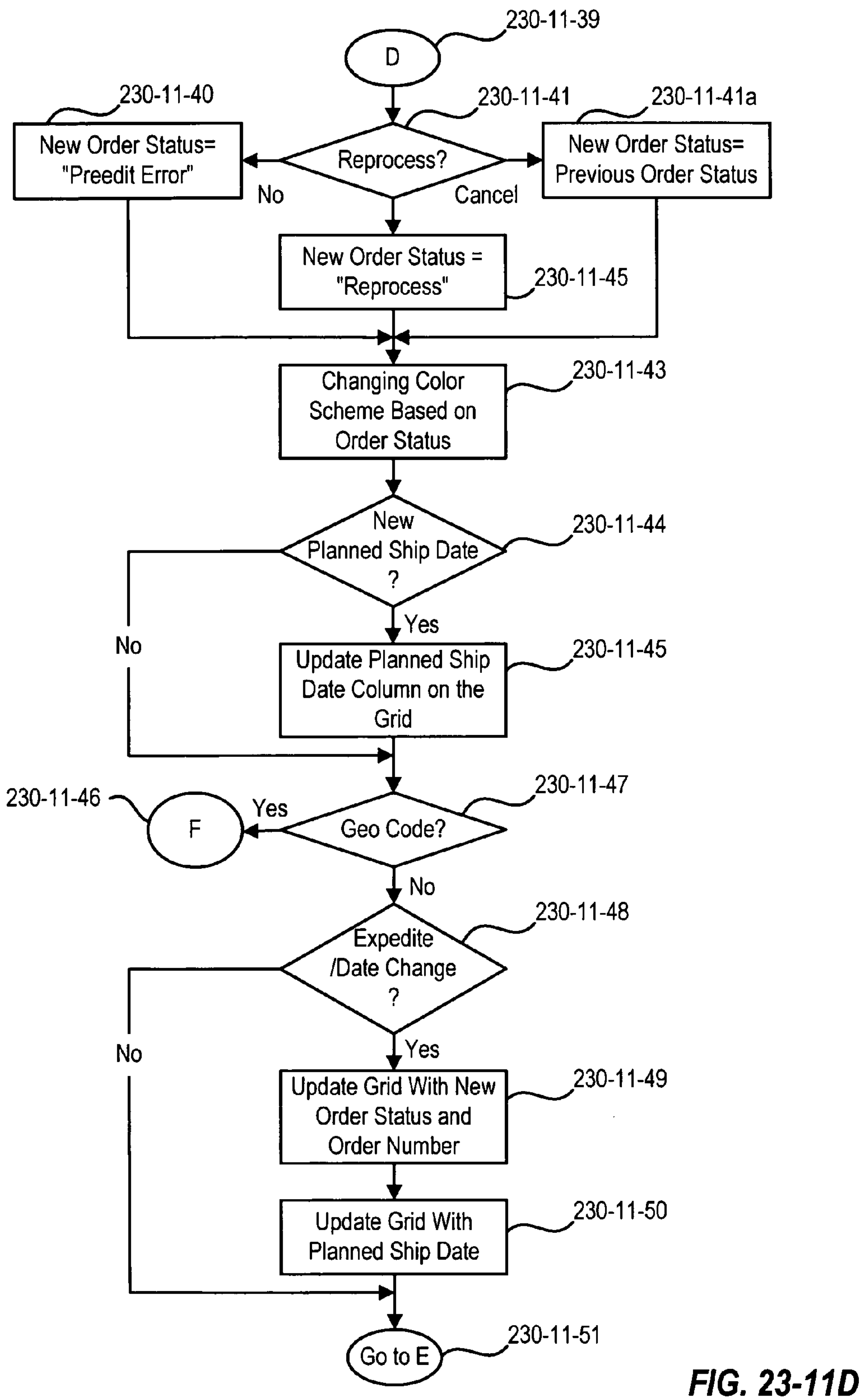
Figures 11E, 23:
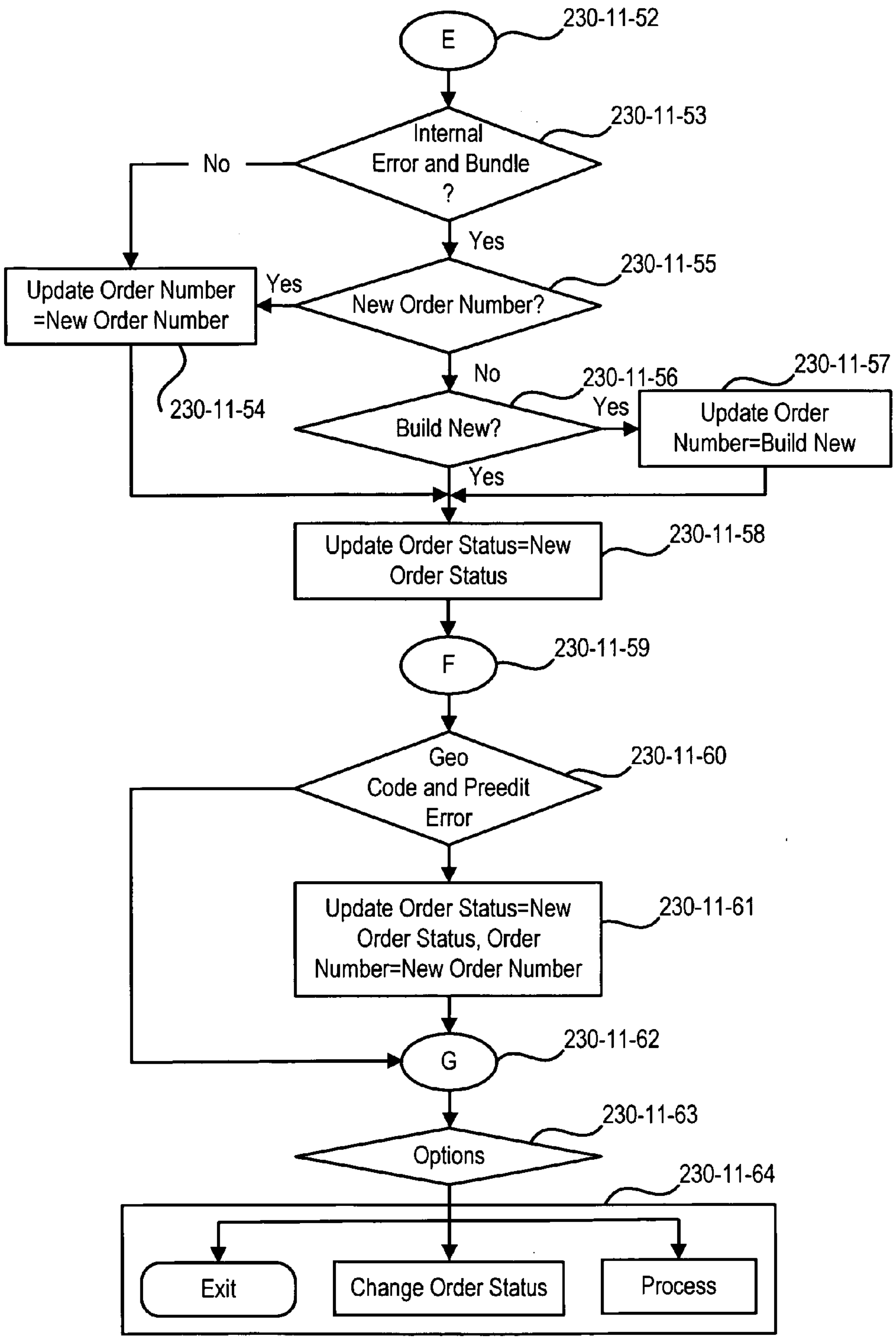
Figures 11F, 23:
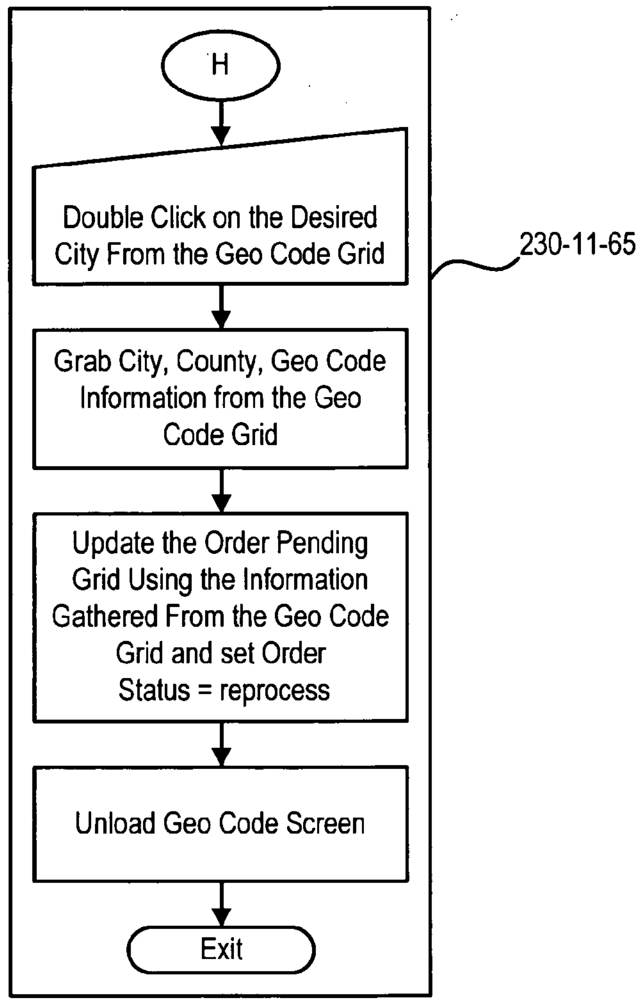
Figures 11G, 23:
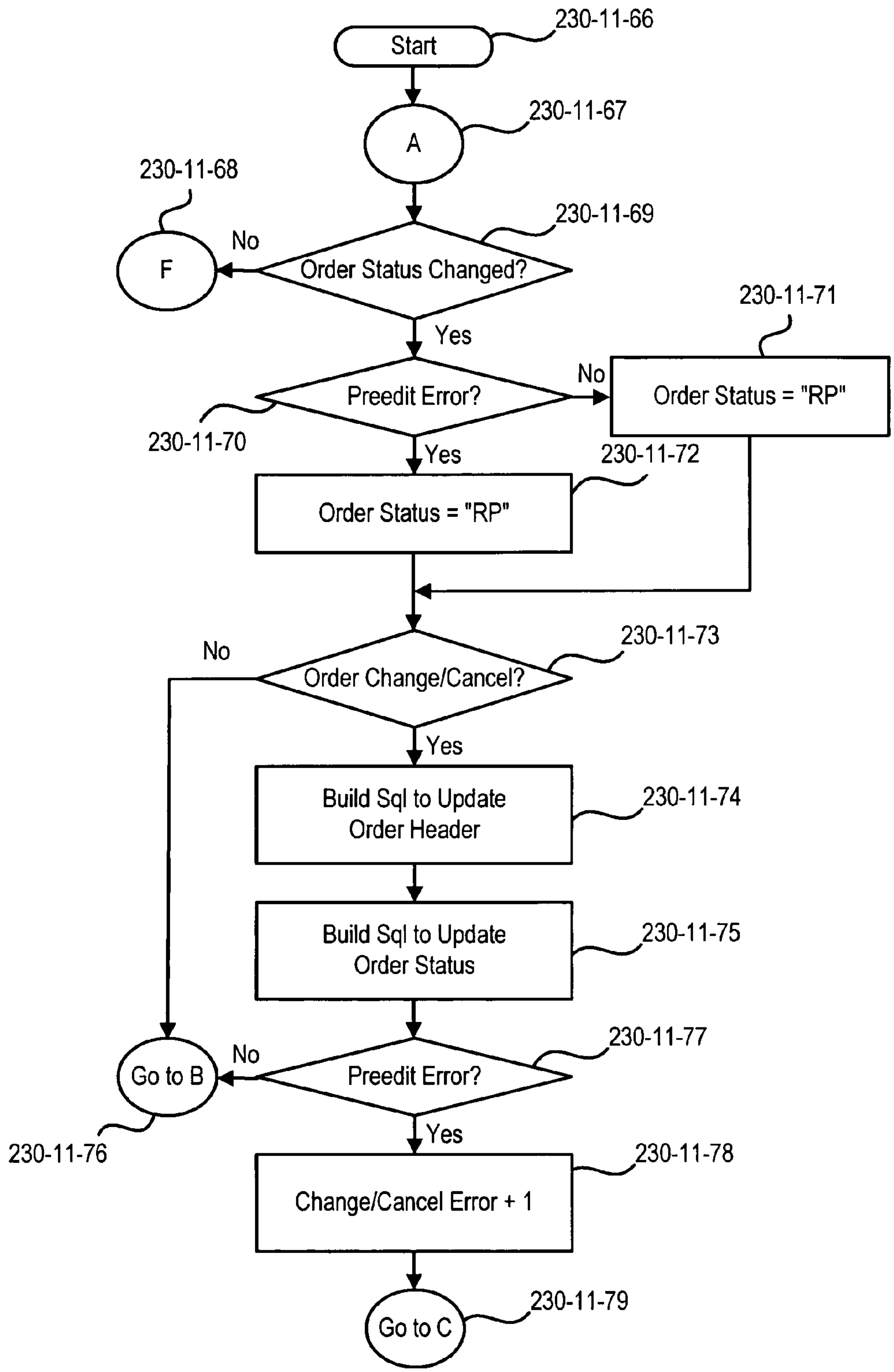
Figures 11H, 23:
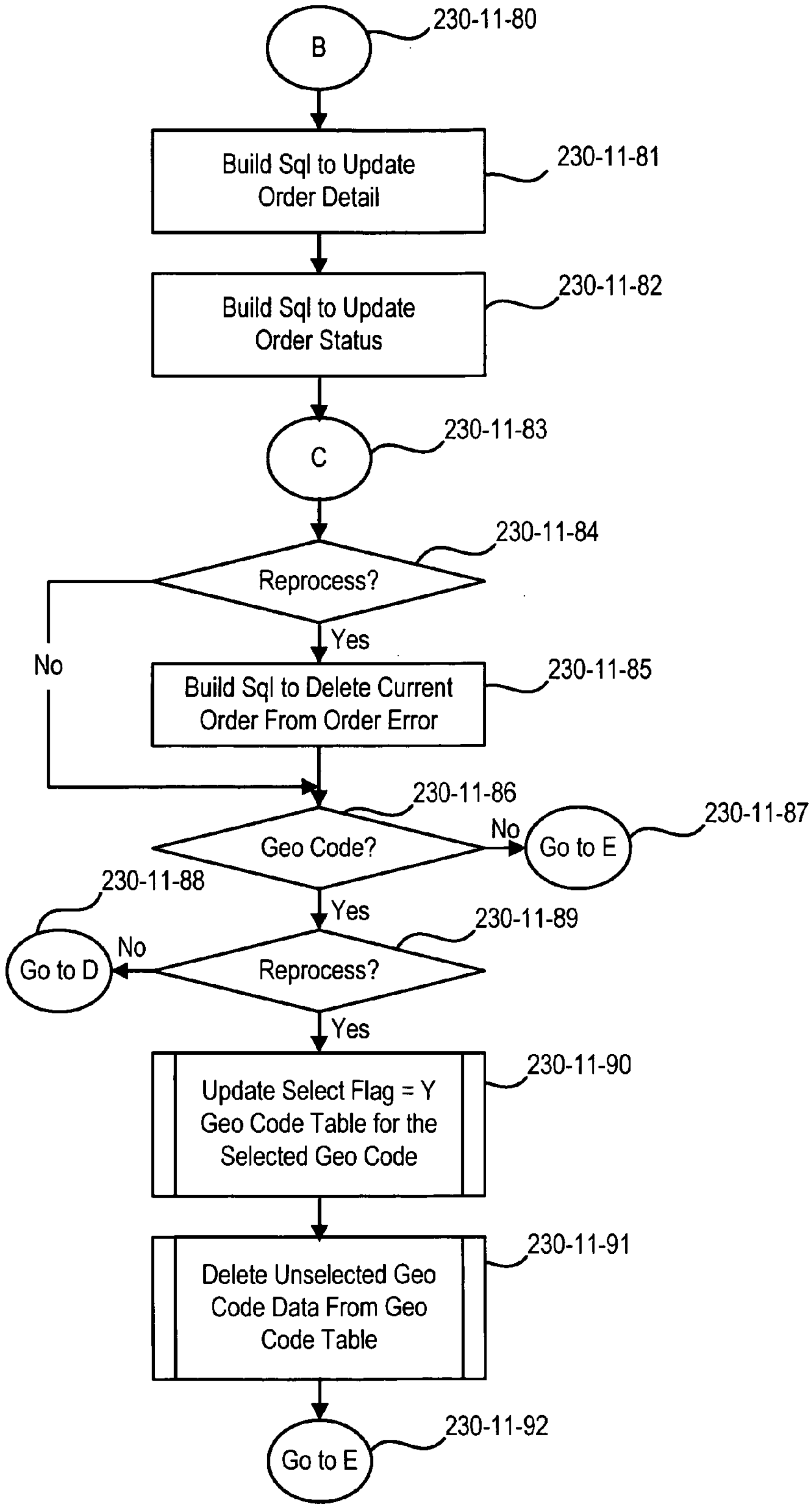
Figures 11I, 23:
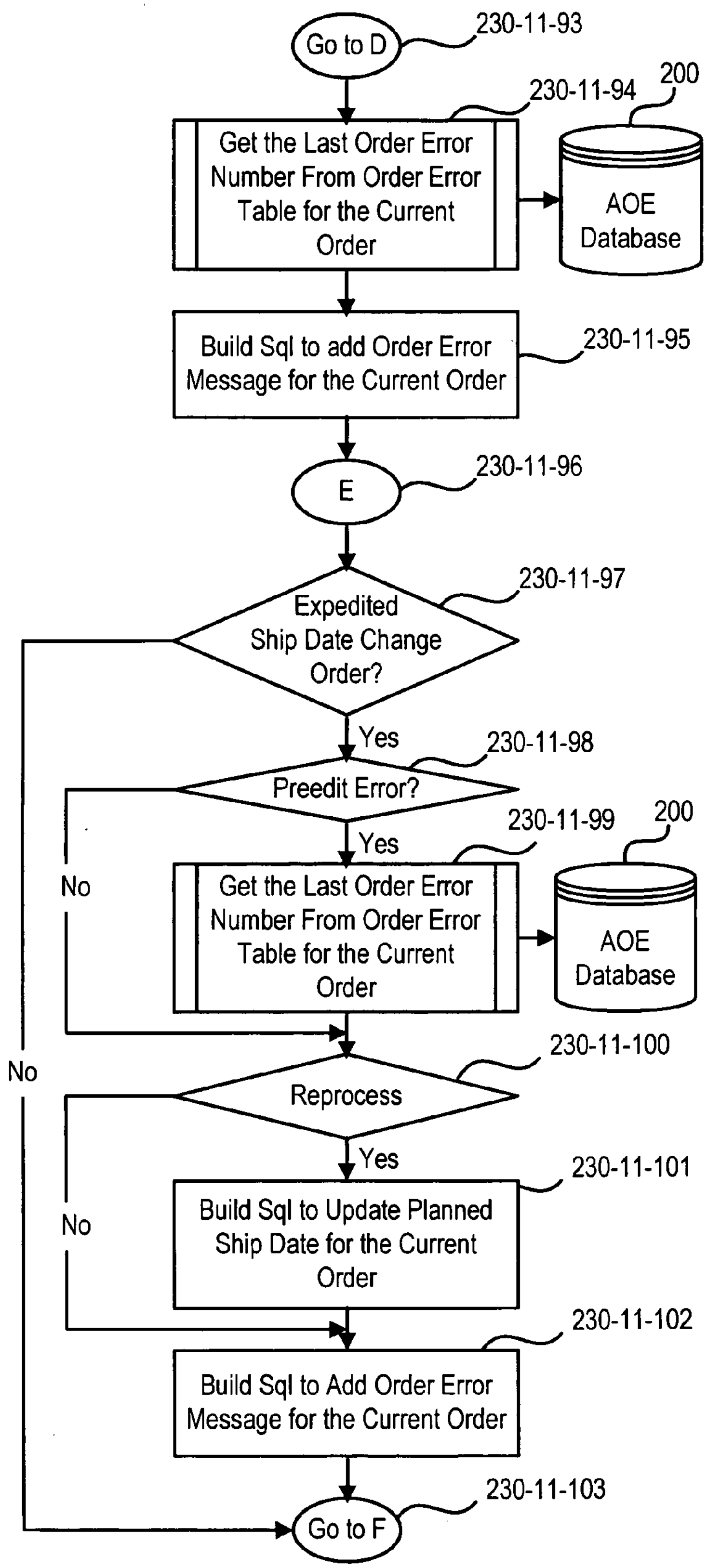
Figures 11J, 23:
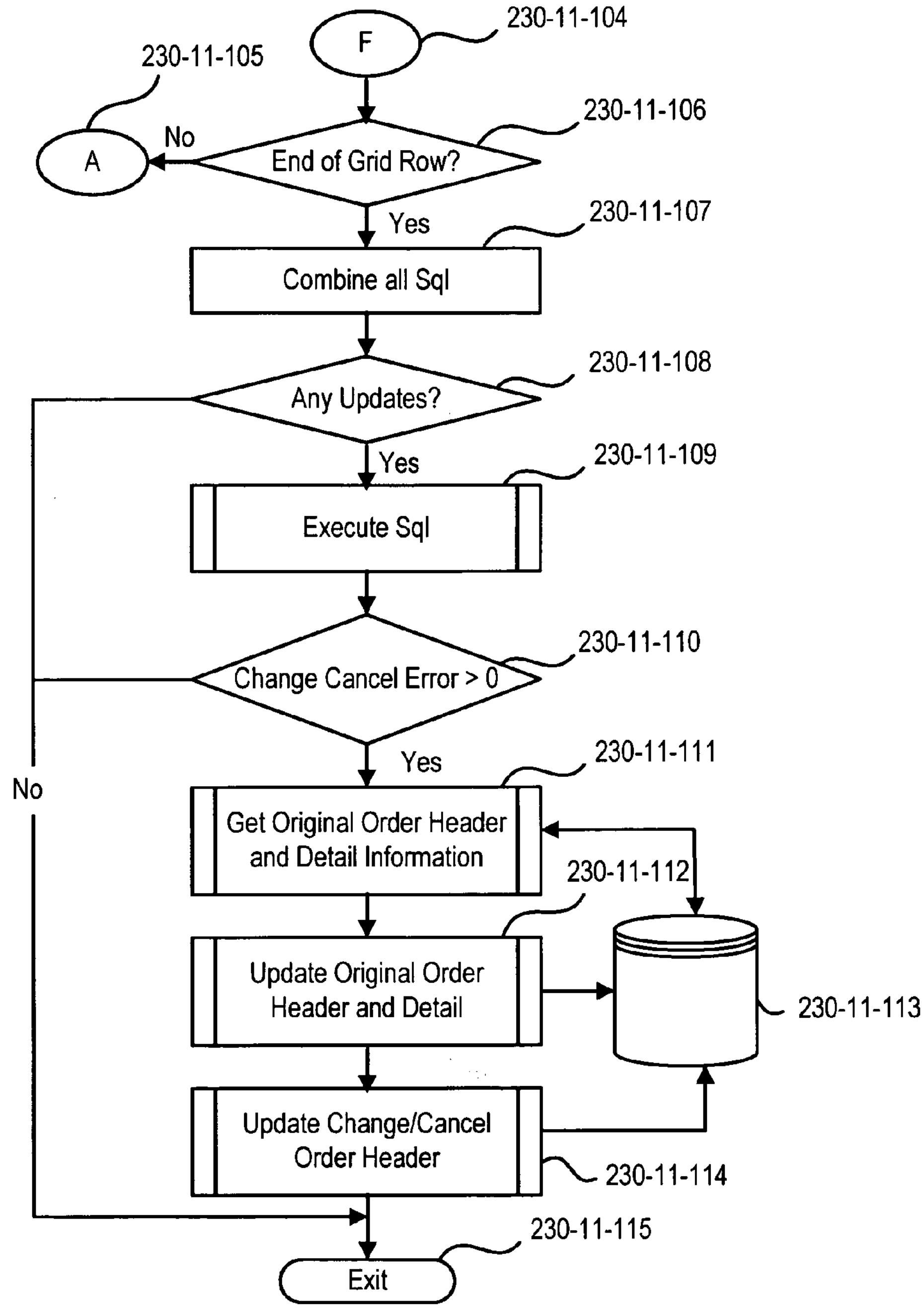
Figures 12, 23:
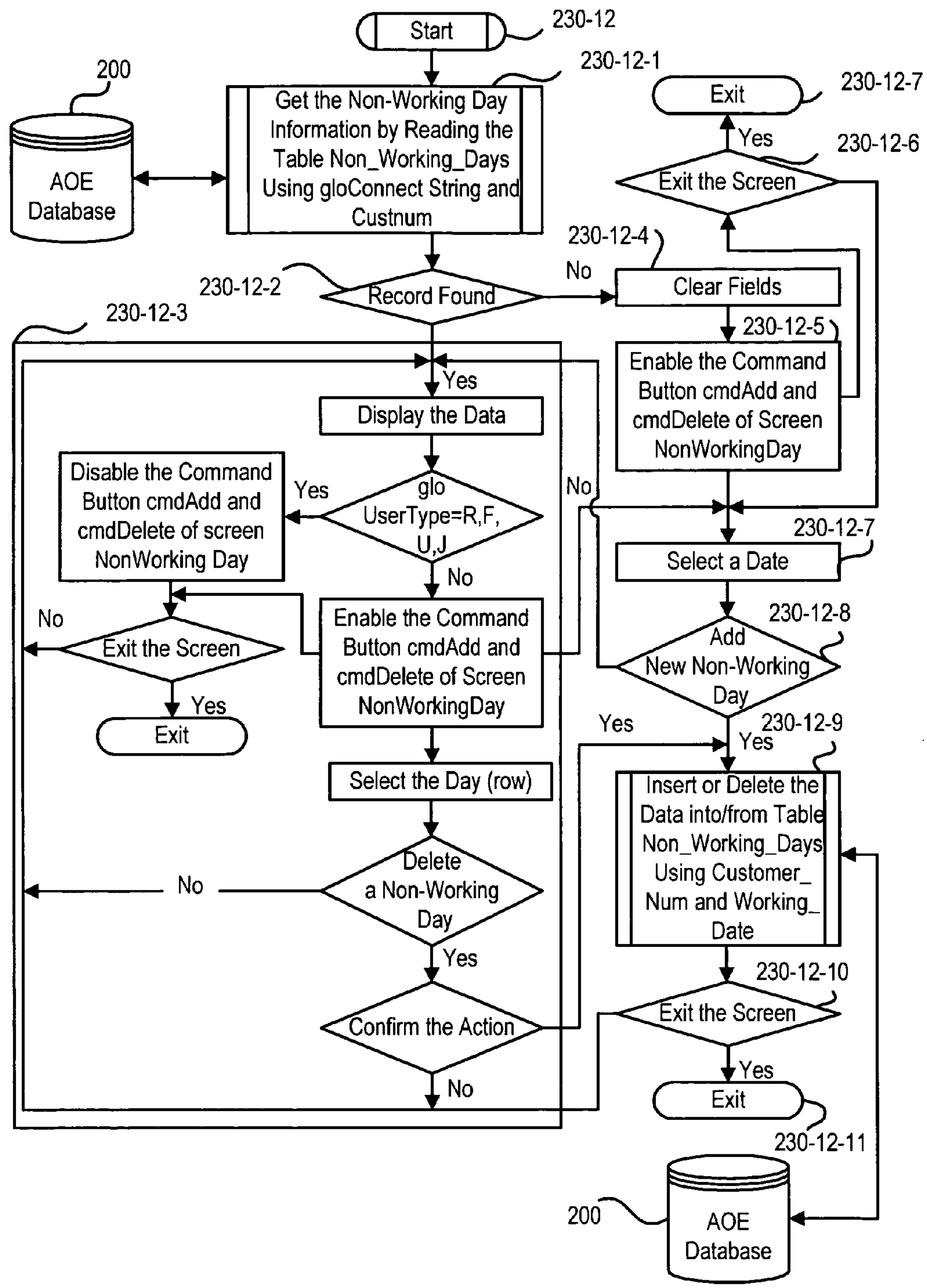
Figures 13, 23:
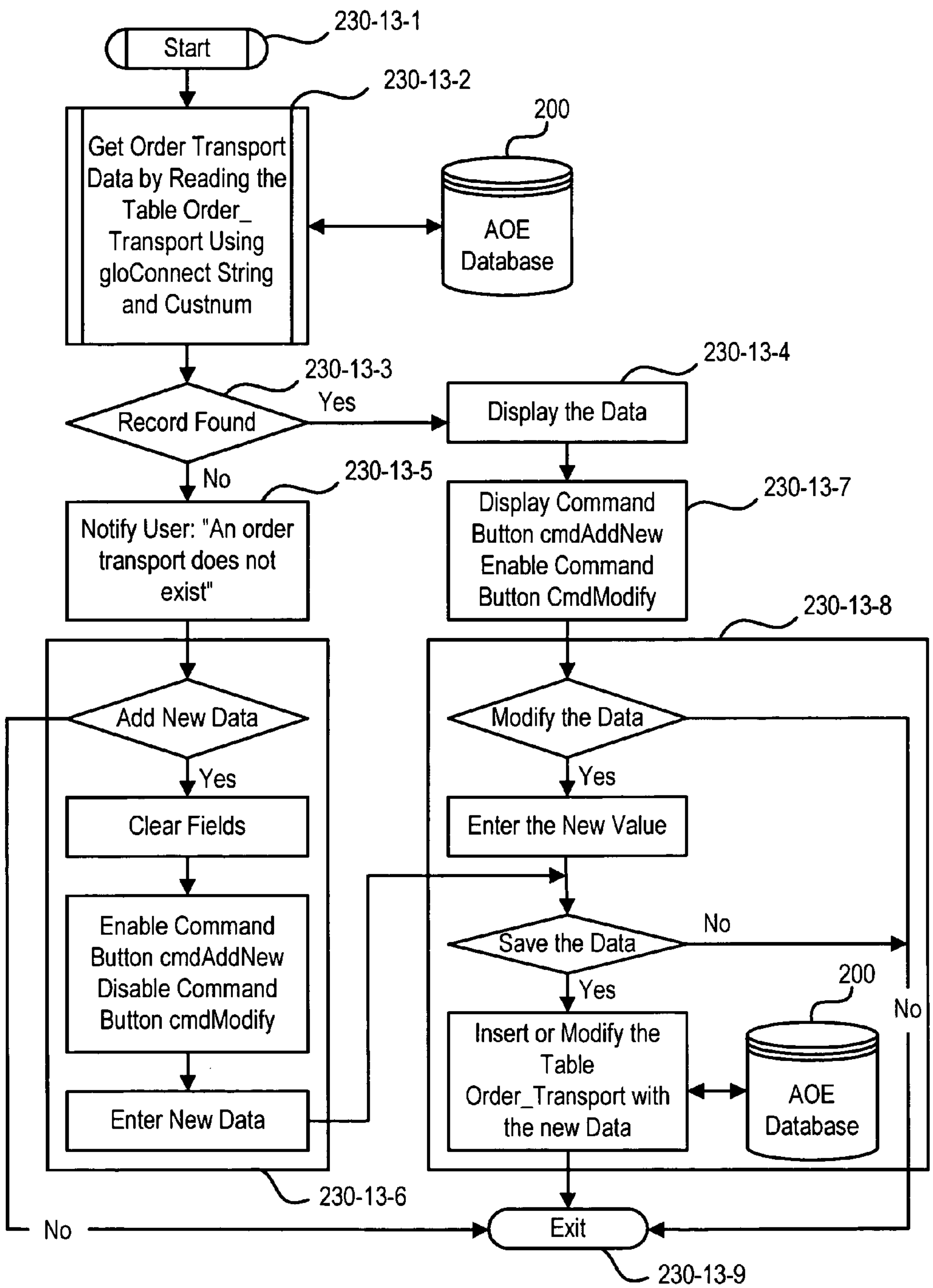
Figures 15A, 23:
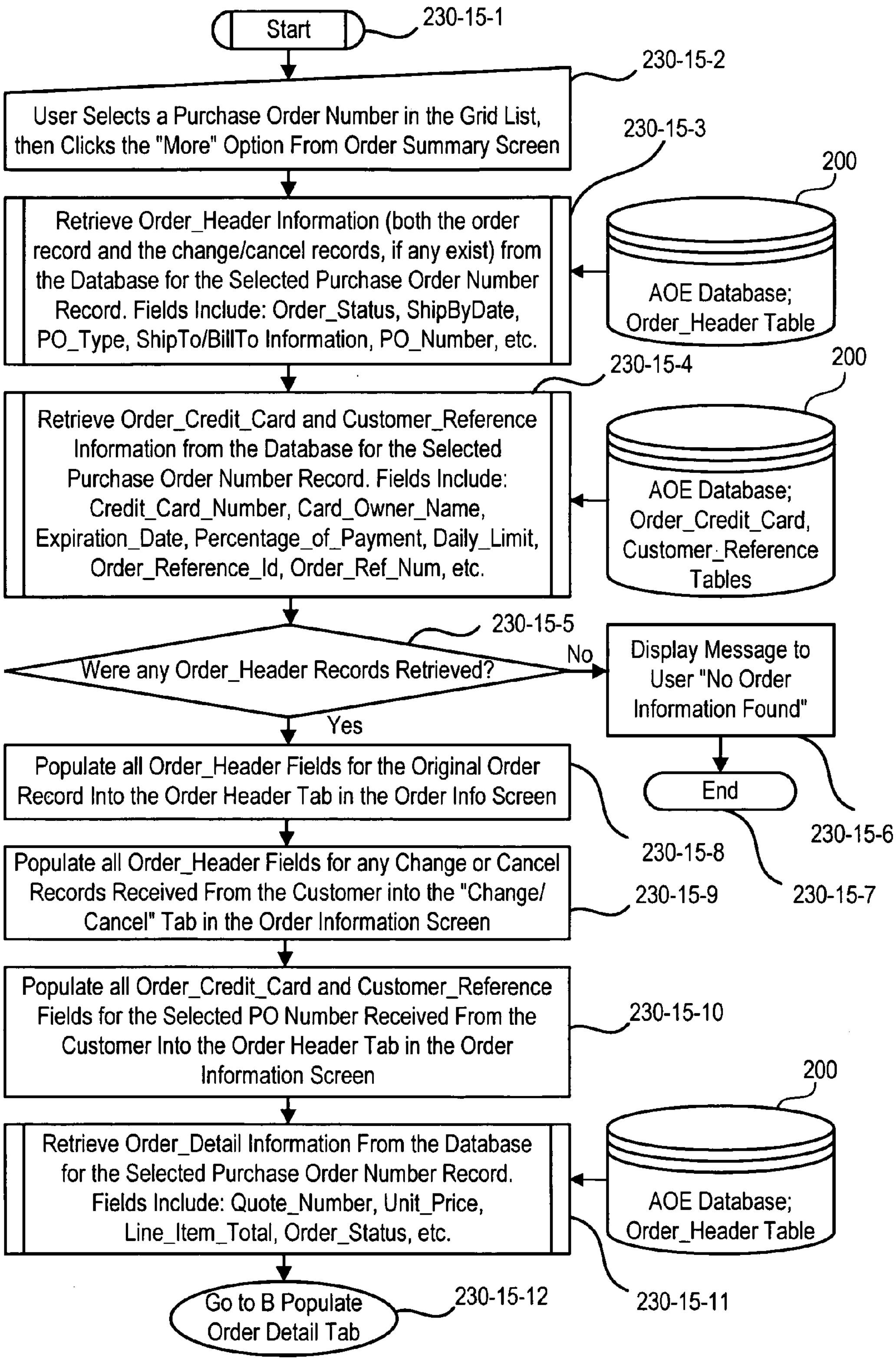
Figures 15B, 23:
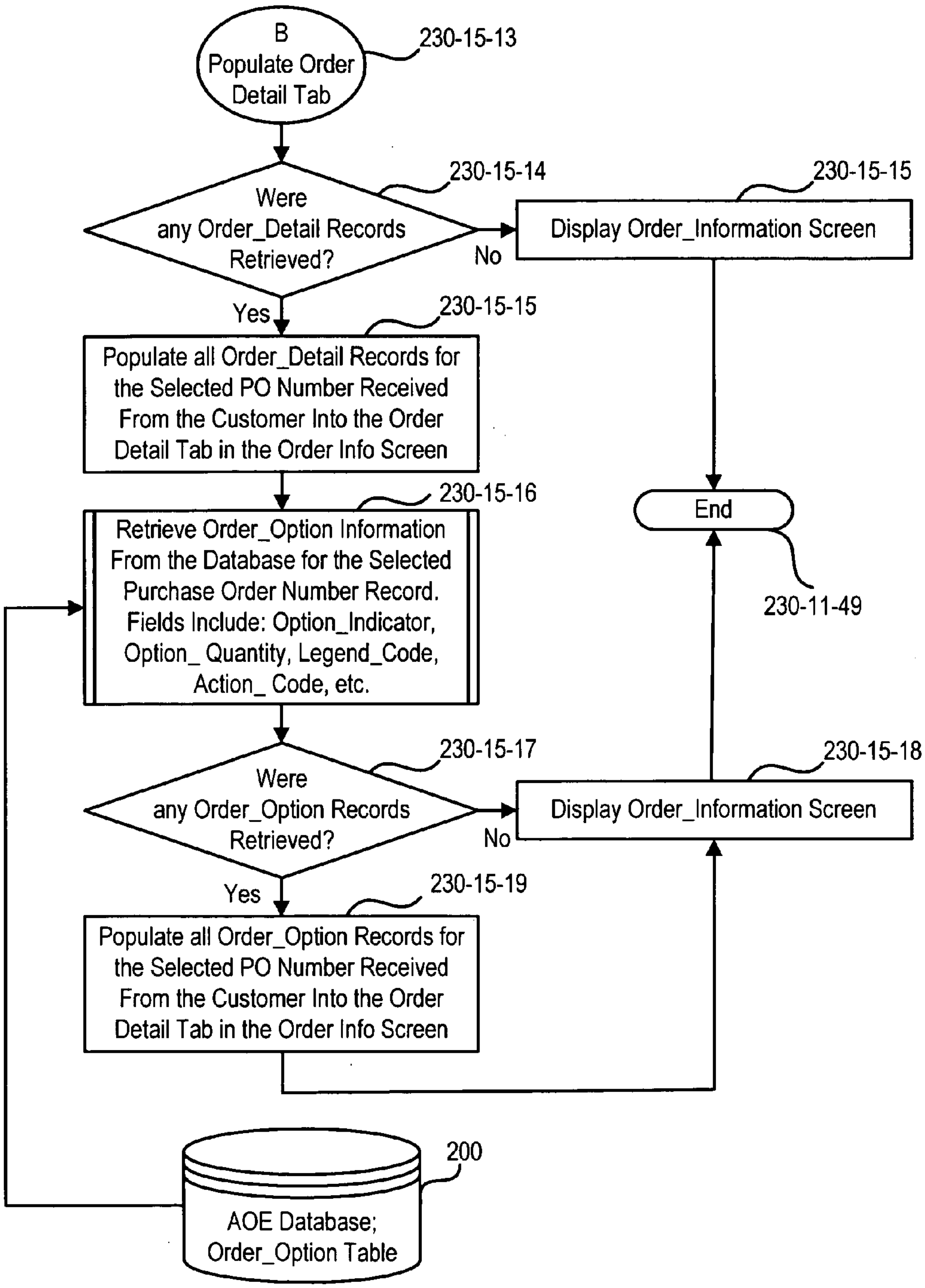
Figures 17A, 23:
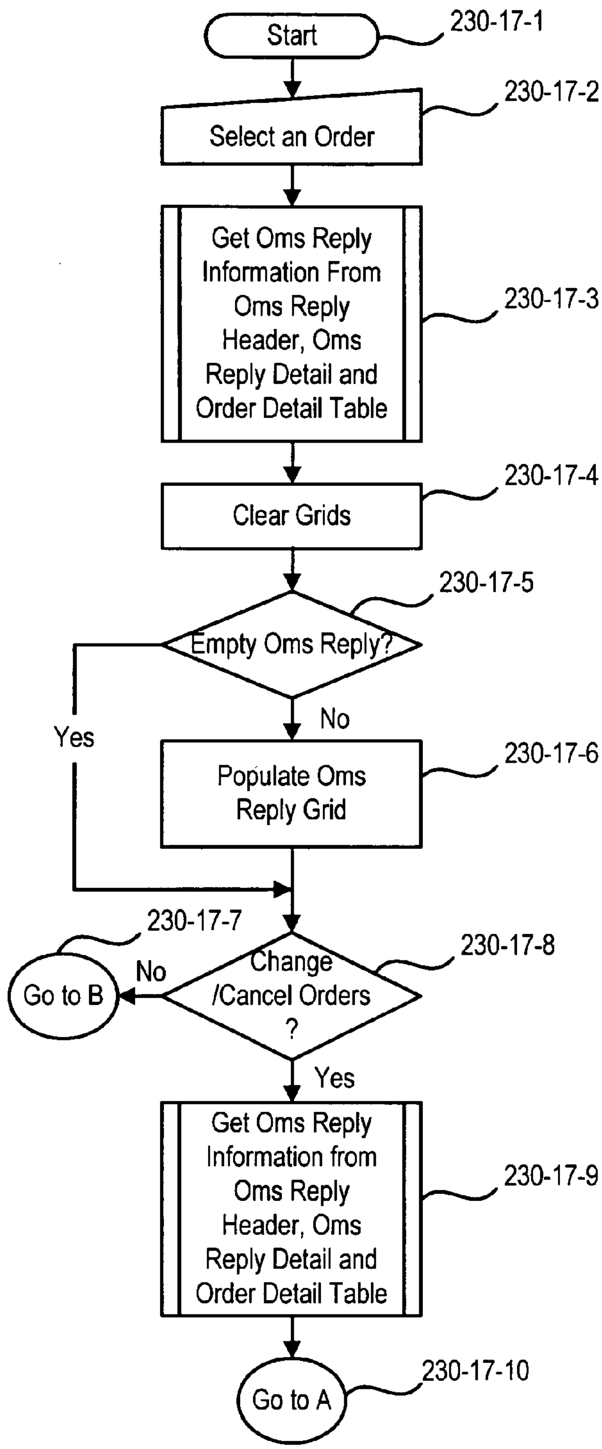
Figures 17B, 23:
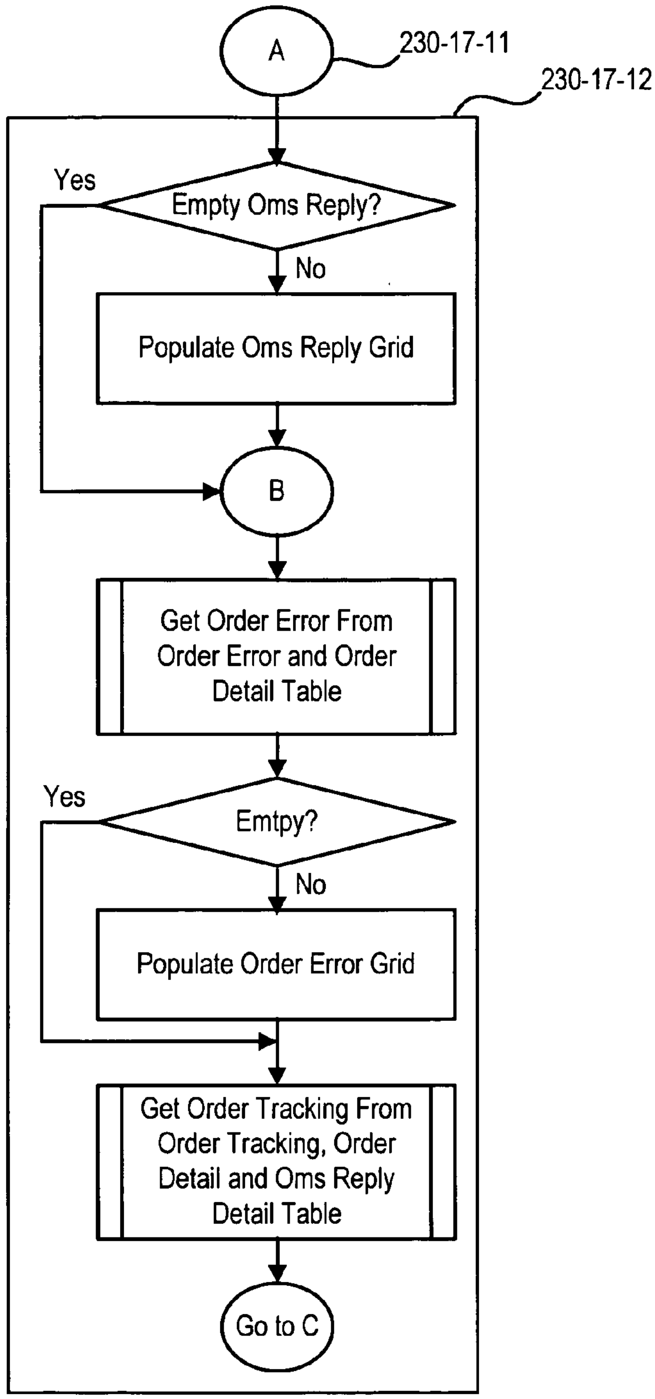
Figures 17C, 23:
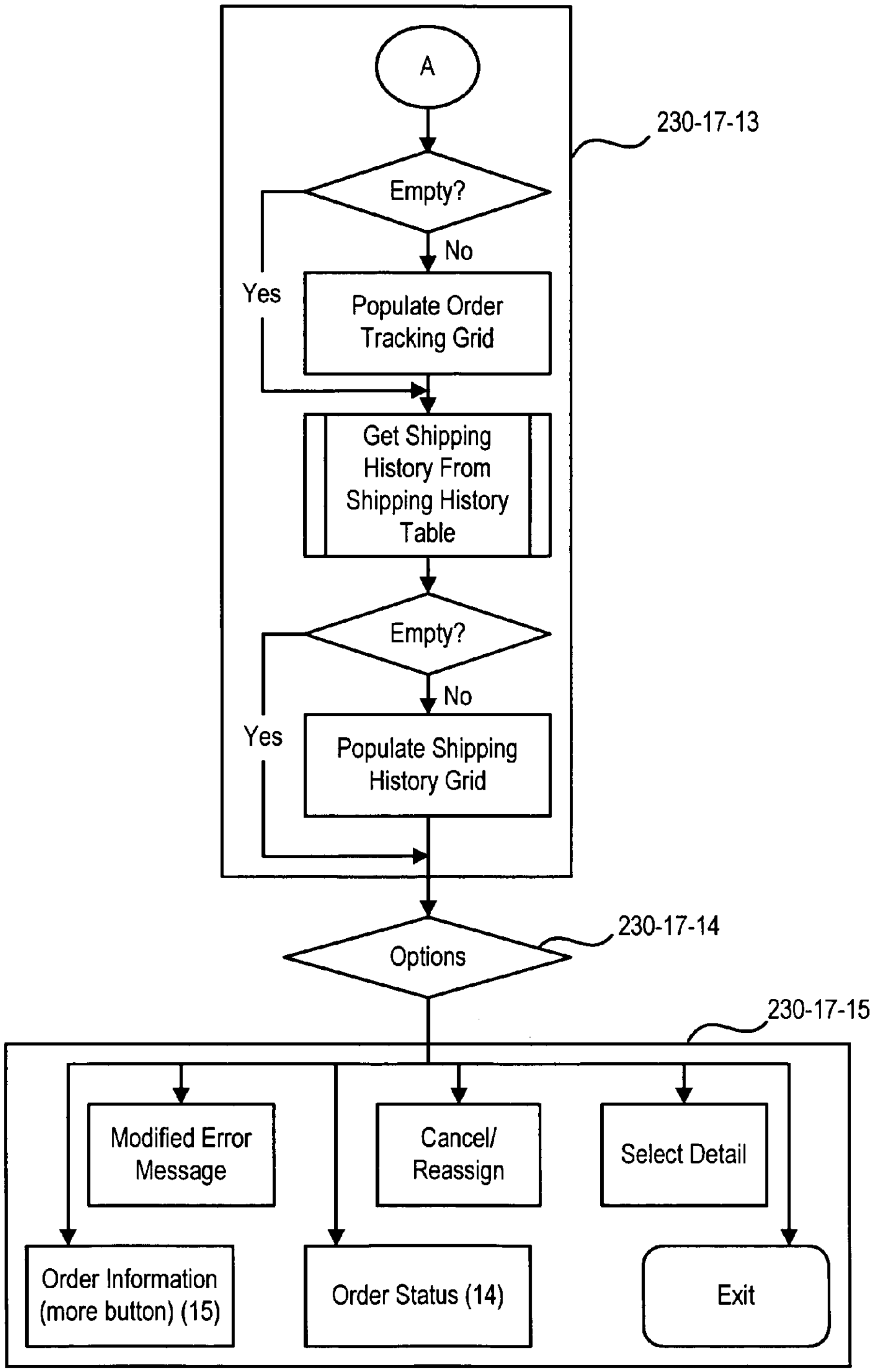
Figures 18, 23:
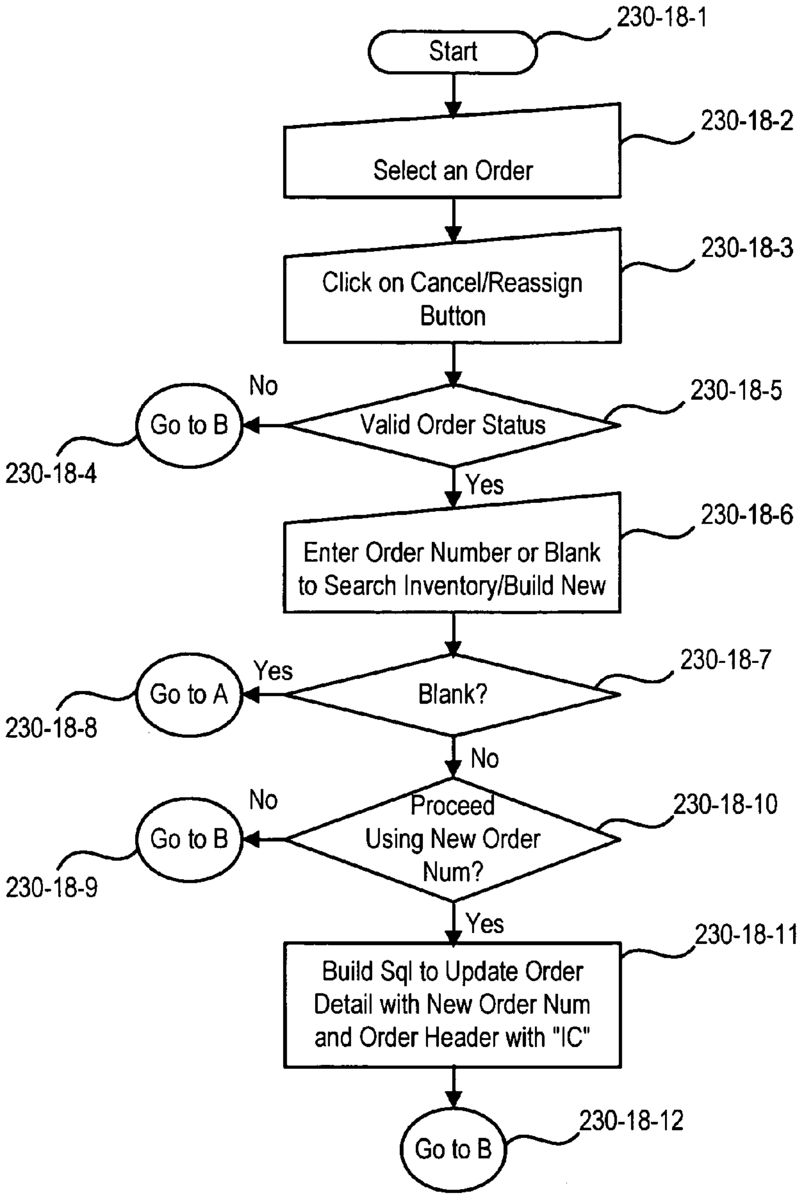
Figures 19A, 23:
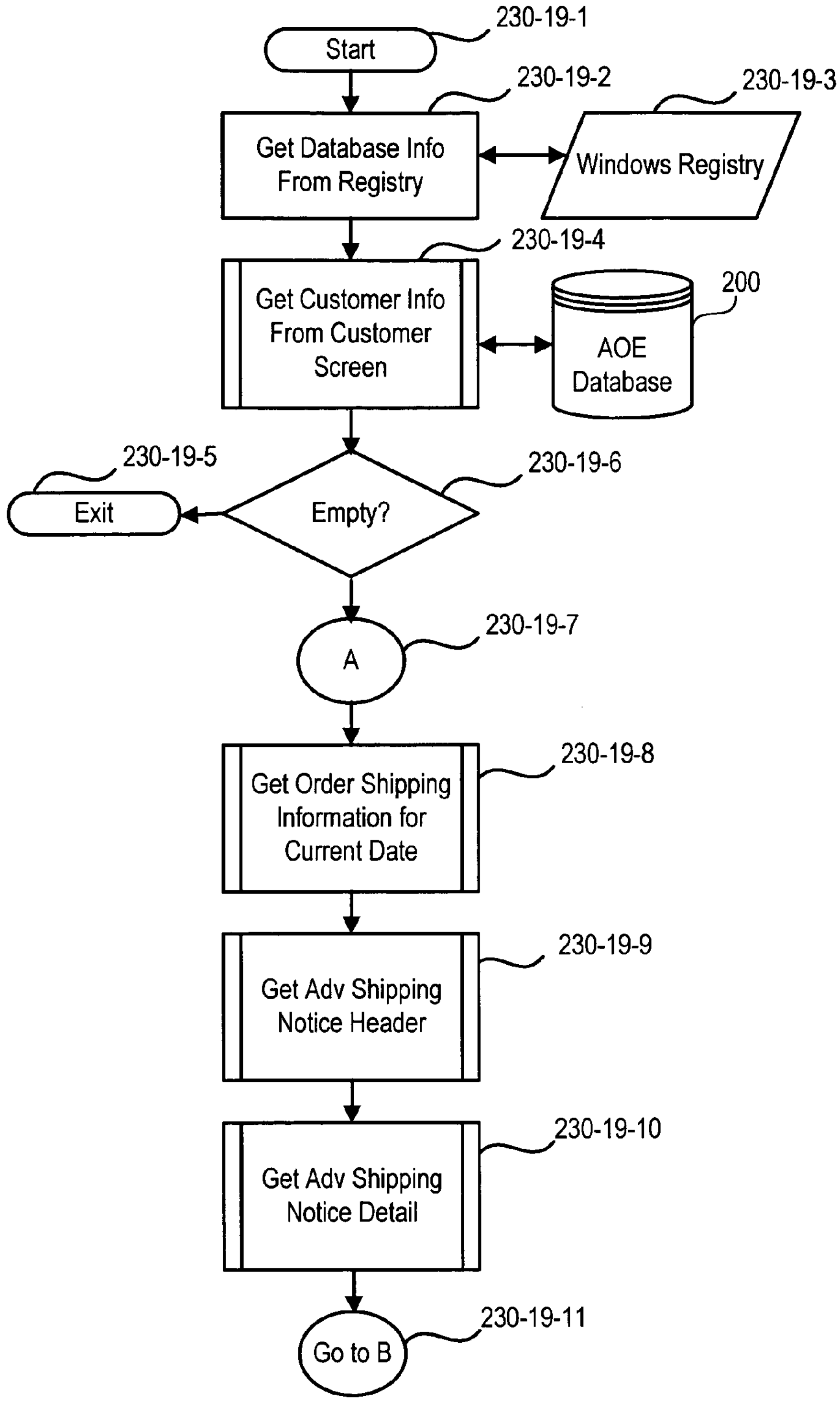
Figures 19B, 23:
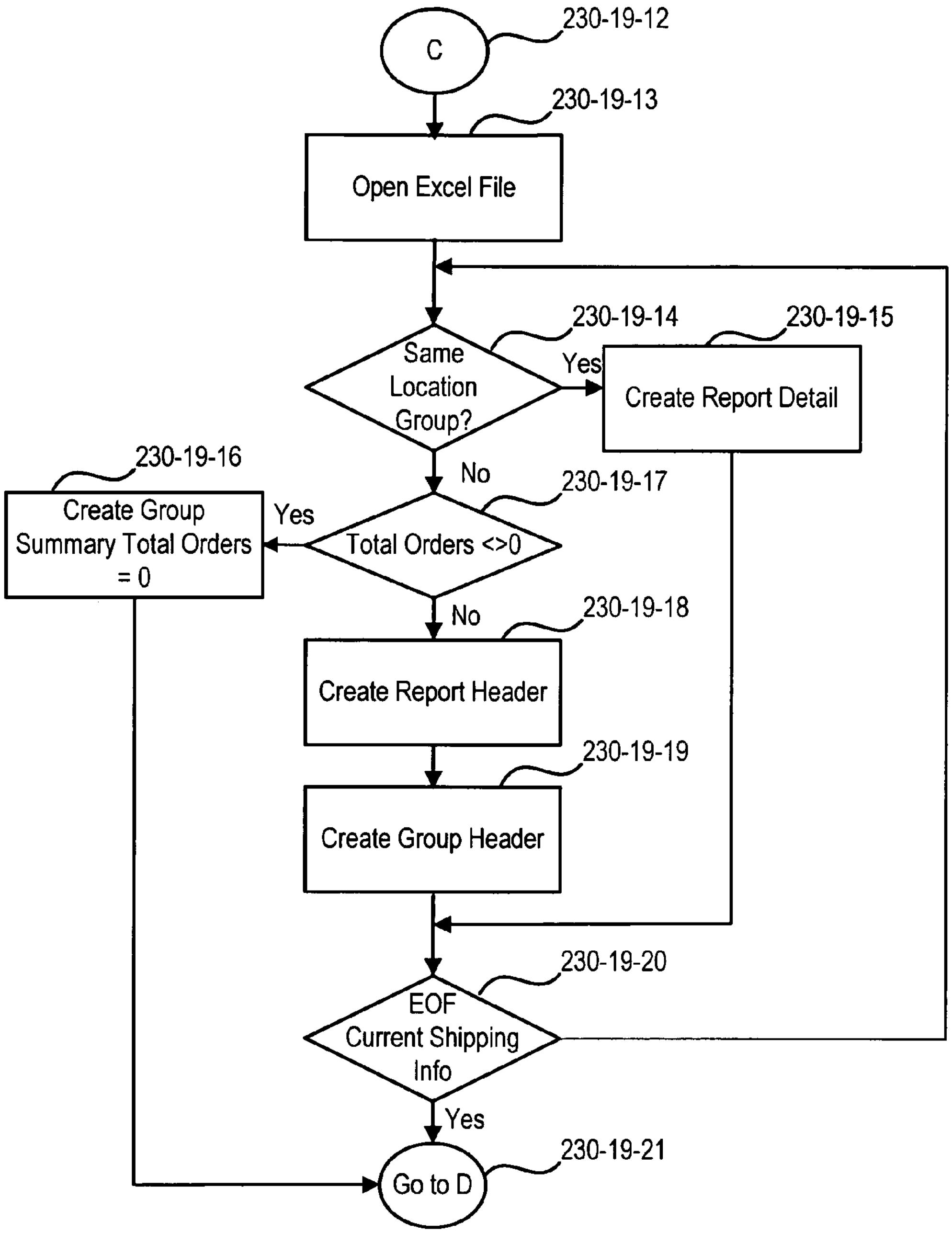
Figures 20, 23:
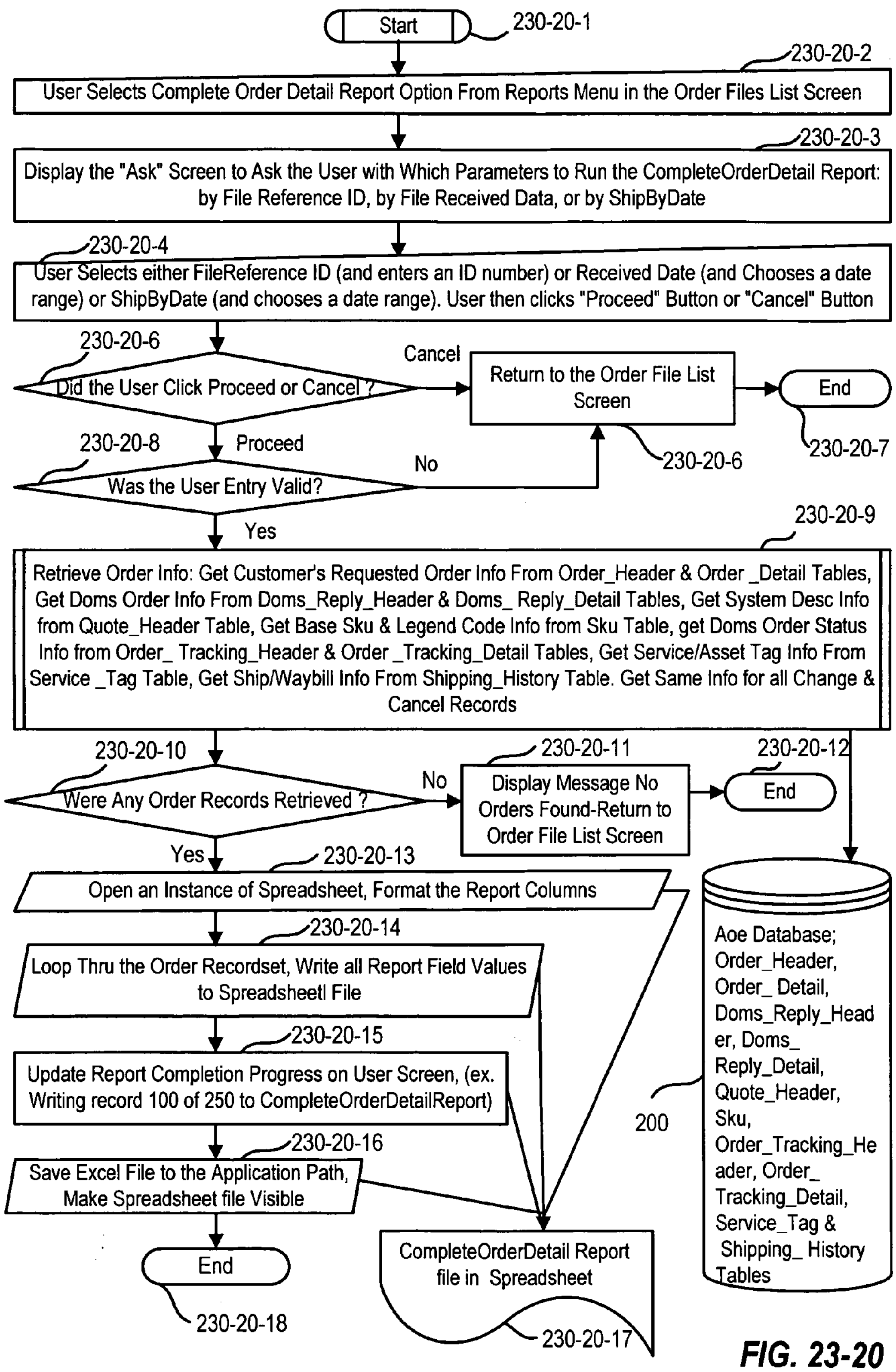
Figures 21, 23:
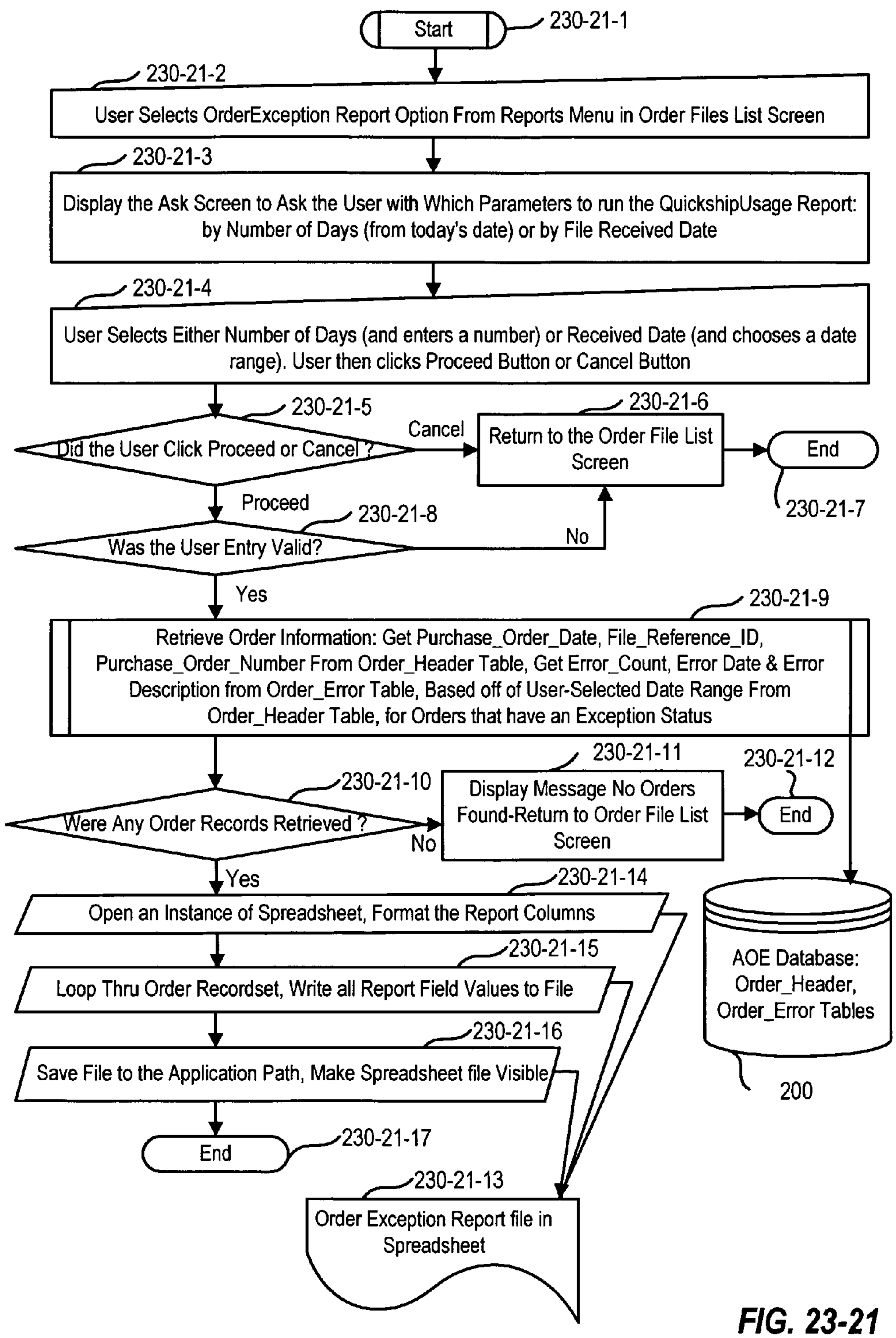
Figures 22, 23:
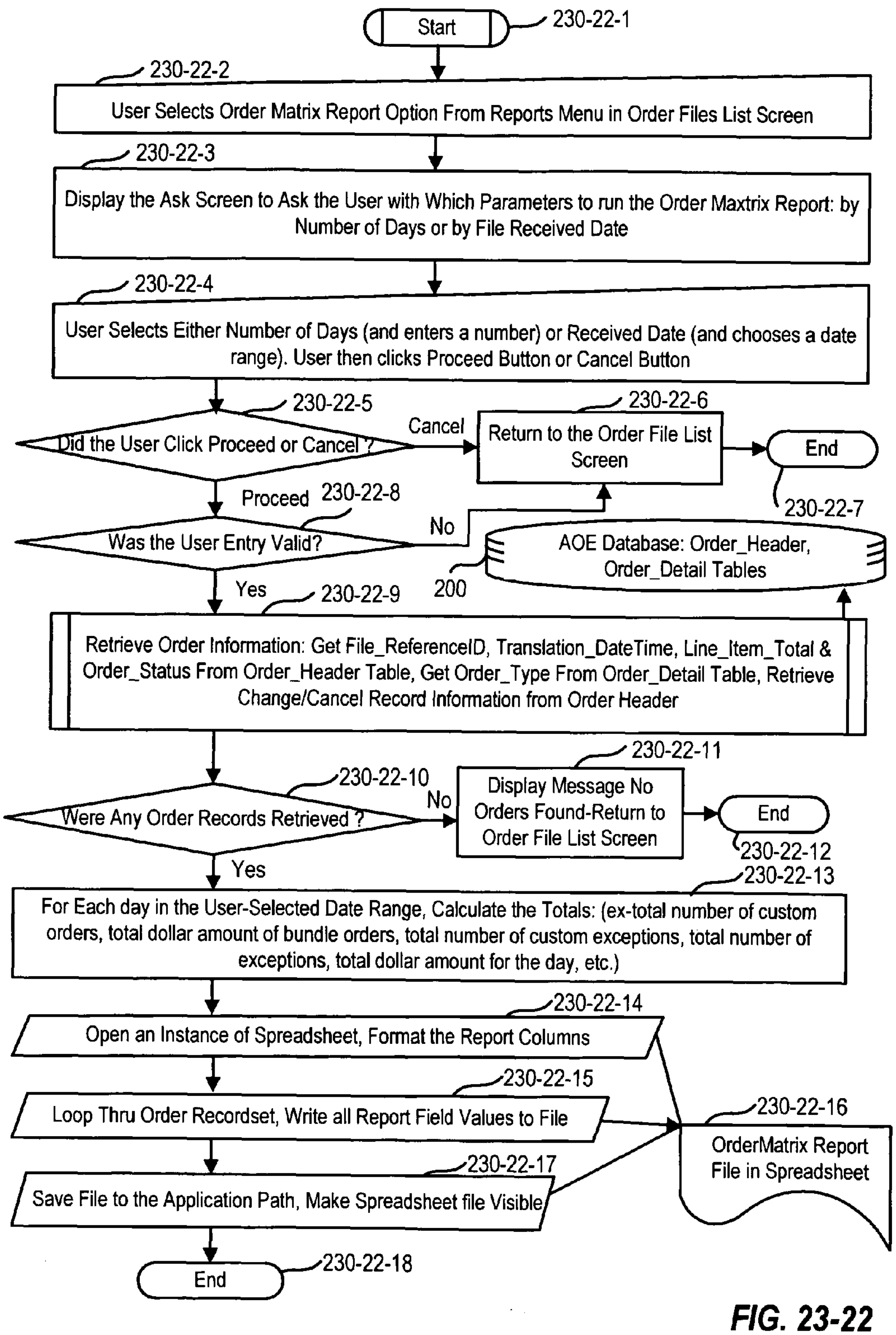
Figure 23:
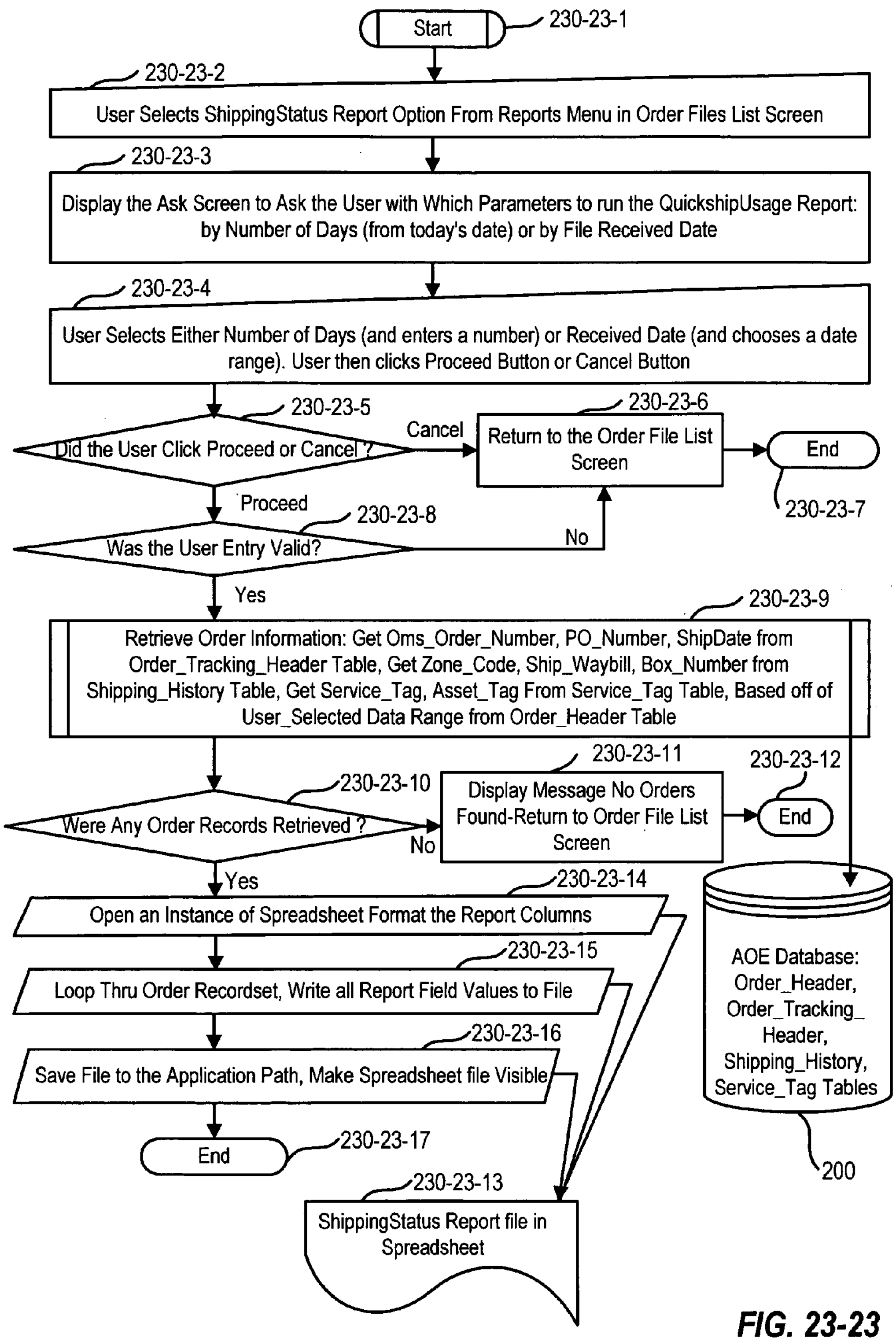
Figure 24:
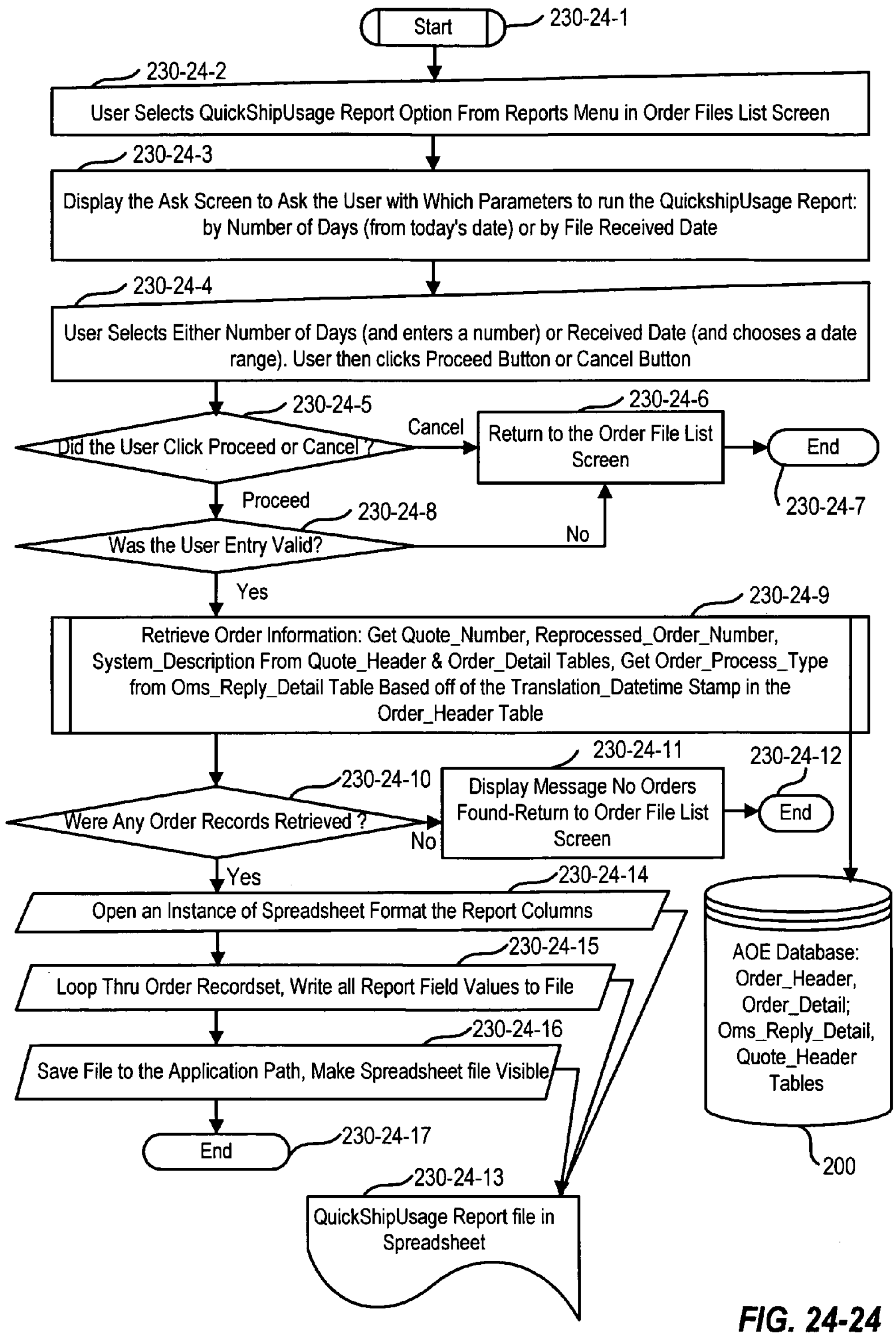

FIG. 4 sets forth the flow of data structures to a customer from a manufacturer and to the manufacturer from a customer. More specifically, a Catalog data structure 400 is generated by AoE server Database 200 in a PFF. The Catalog data structure is then translated from the PFF data structure to an industry standard format. This data structure is transmitted to the customer via transmission medium 250. The customer then acknowledges receipt of the Catalog with a Catalog Acknowledgement data structure 402. The Catalog Acknowledgement data structure 402 is translated from an industry standard format to a PFF via translator 320. If, for a particular customer, no acknowledgement is required, then the customer can proceed directly with ordering from the catalog after receipt of the catalog. In either case, the next step is the generation of an Order data structure 404 by the customer. The Order data structure is transmitted to the manufacturer using an industry standard format. The Order data structure is translated from the industry standard format to a PFF via translator 320. Once the Order data structure is processed, then the manufacturer may optionally generate and provide an Order Acknowledgement data structure 406 to the customer. It will be appreciated that additional variations on this flow may be used by those skilled in the art. For example, order cancel/change data structures and order cancel/change acknowledgement data structures may also be used in this flow.

Data Structures and Translations

The following data structures and translations show the operation of translator 320 as well as the data structures that are transmitted via communication medium 250.

More specifically, Table 1 sets forth the proprietary file format (PFF) data structure and translation to an EDI format for a Catalog data structure 400. In Table 1 (as well as throughout the other Tables), the EDI structures are set forth on the left and the corresponding PFF structure are set forth on the right. For example, the EDI structure BCT.01 corresponds to and is translated from the PFF structure Catalog Type, the EDI structure BCT.02 corresponds to and is translated from the PFF structure Catalog Version Number, etc. . . . Translator 320 performs the translation for each data structure that is provided to communication medium 250.

TABLE 1

File name =
CUSTOMERUSA + Date (ccyymmdd) + Sequence number + extension
Example: CUSTOMERUSA199808313.CAT
File Wrapper:
Record tag: RTG
From source: string length 30 ("DELLUSA")
To destination: string length 10 ("CUSTOMERUSA")
File type: string 15 ('CATALOG")
Catalog Header (occurs once for each catalog file):
Record tag:CAT

| | |
|---|---|
| BCT.01 | Catalog Type: (string length 1 - value D = Delta). |
| BCT.02 | Catalog Version Number: (number length 4 - values 1 to 9999). |
| DTM.02 | Catalog Date: (string length 10 - format mm/dd/yyyy). |
| DTM.03 | Catalog Time: (string length 8 - format hh:mm:ss). |
| DTM.04 | Catalog Time Code (string length 2 - value CS = Central Standard Time) |
| CUR.02(1) | Currency: (string length 3 - values USD or CAN). |
| CUR.03(1) | Exchange Rate: (number 10) |
| CUR.02(2) | Exchange From Currency/To Currency: (string length 3) |
| PER.02 | Catalog Contact: Dell Sales (string length 32 - i.e.: Stephan Moran ). |
| PER.04 | Catalog Contact phone number (number length 10 - format 9999999999). |

System ID record (occurs once for each system type):
Record tag: SYS

| | |
|---|---|
| LIN.01 | Loop Counter: number length 5 (sequential counter). |
| LIN.03 | System ID: (number length 9 - values 1 to 999999999; Dell assigned). |
| LIN.05 | System ID Text description: (string length 30, "POWER PORTABLE BUNDLE"). |
| DTM.02(1) | System ID Effective Date: (string length 10 - format mm/dd/yyyy). |
| G53.01 | System ID Action: (string length 1 - values A = Add, R = Replace, D = Discontinue). |
| REF.02 | Replace Old System ID: (number length 9 - values 1 to 999999999). Note: When System Action = R |
| CTP.03(1) | System ID Purchase Price: (number length 10 - values .01 to 9999999.99). |
| CTP.03(2) | Default Shipping Price: (number length 10 - values .01 to 9999999.99). Note: If shipping is built into system ID . |
| TXI.02 | Sales Tax Amount: (number length 10 - values .01 to 9999999.99). Note: If sales tax is built into system ID . |

TABLE 1-continued

| | |
|---|---|
| C00101(CTP) | System Type: (string length 3 - values BNL = Bundle, CUS = custom). |
| PID.05(1-6) | System Specification Description (string length 480, system specifications) |
| DTM.02(2) | System Discontinue Date: (string length 10 - format mm/dd/yyyy). |
| System Option Record (can occur multiple times for each system ID): Record tag: OPT | |
| SLN.02 | Relationship id: (string length 2 - values are "PO" for parent option, "CH" for child option, and "OR" for orphan option (no children) |
| SI.07 | Record Type: (string length 2 - values default system configuration = CF, valid options for a system ID = OP). |
| SI.03 | Option Indicator: (string length 7 ). Note: See Option Indicator values. |
| SI.05 | Option Legend Code: (string length 7 - value 64m, 128m). |
| SI.02 | Option Action Code: (string length 1 - D = downgrade, U=upgrade, A = in addition, C = configuration) |
| PID.05 | Option Legend Friendly Description: (string length 60 - 64 Meg memory). |
| CTP.03 | Option Price: (number length 10 - values .01 to 9999999.99 ). Note: Roll up detail part number pricing. Will be dependant on the option action code as to what price it is |
| Part record (can occur multiple times for each System Option Record): Record tag: PRT | |
| SAC.13 | Part number: (number length 8 - values 230-1122). |
| SAC.10 | Part Quantity: (number length 4 - values 1 to 9999). |
| SAC.15 | Part Description: (string length 30 - values text description). |
| SAC.05 | Part Price: (number length 10 - values .01 to 9999999.99). Note: Part number contracted prices. |
| N/A | Additional Shipping Price: (number length 10 - values .01 to 9999999.99). Note: When applies, else it will be zero. |
| Trailer record (occurs once for each catalog file): Record tag: TRL | |

With the Catalog data structure 400, Catalog header data applies to the entire file. Bundle record structure has a system ID record followed by the system option records that make up that system and for each option, the part numbers that make up that option. The record type is "CF", and there are no "OP" record types for a Bundle system ID; the system type is "BNL". Additionally, Custom configurations have a system ID record that represents the default system ID prior to choosing options. This is referred to as a default system ID and is followed by the option records that make up that default system, the part numbers that make up that option. The system options record type is "CF", and configuration records are followed with additional record types of "OP" to denote the valid options that are available for that default configuration. The system type is "CUS".

Catalog data structure 400 includes a number of portions as well as elements within these portions. More specifically, the Catalog data structure 400 includes a Catalog Header portion 410, a System ID record portion 412, a System Option Record portion 414, a Part record portion and a Trailer portion. The Catalog header portion includes a number of data elements that apply to the entire Catalog. The System ID record portion is system specific for each configuration identifier. The System Option Record portion includes all of the component information for a specific system. The Part Record portion includes the skew level details for a specific system. The Trailer portion allows for an application program to validate that all records for a configuration/product are complete.

The System ID record portion includes plurality of business rule elements that apply to a particular system. More specifically, the System ID element provides a manufacturer assigned unique identifier. The system ID Text description element provides the text describing the supplier assigned identification. The System ID Effective Date element provides the effective date that a particular configuration is allowed to be purchased. The System ID Action element programmably tells a customer what an action to perform. For example, an Add value adds a new product, a Replace value allows a price refresh where the same product is used but with a new price, a Discontinue value discontinues a product. The Replace System ID element is used with the System ID Action element indicates a Replace function. The Replace System ID refers to an old product number when a new product number replaces the old product number. The Replace System ID element allows a customer to trigger any orders that have been started (within the customer's procurement system) to automatically update the pricing so that the whole ordering process does not have to be restarted. The System Type element tells a user whether a product is bundled, i.e., is a commodity item, or custom, i.e., is a non-commodity item. The System Discontinue Date element provides the date by which a system is discontinued. The System Discontinue Date element allows overlap of systems when discontinuing to flush out any pending (i.e., in process) orders. Alternately, the System Discontinue Date element may provide a hard drop date on which systems are discontinued.

The System Option Record portion includes a plurality of relationship indicator elements. More specifically, the Relationship id element provides an indicator that communicates for a component what the relationship of the component is with other components. For example, a PO (parent) value indicates that the component is a minisystem (or a solution), a CH (child) value indicates that the component is within a minisystem (i.e., is a child of the solution), a OR (orphan) value indicates that the component is optionally within a minisystem (i.e., is an orphan of the solution). The Record Type element determines whether the component is directly tied to a parent. I.e., the Record Type element shows whether an orphan is connected to the parent. The Option Indicator element shows what each component is (see, e.g., TABLE 2). The Option Legend Code element indicates the manufacturer code used to order a component as shown by the PFF. The Option Action Code element indicates that action that can be performed by a component.

Table 2 sets forth the option indicator values that are used by the data structure for the Option Indicator element of the Catalog data structure as well as other data structures of the AoE system. Providing a set of option indicator values allows a predefined cross-reference ability between the customer and the manufacturer, a customer to have a relationship and knowledge of what a non-commodity or commodity configuration includes.

TABLE 2

| Option Indicator Values: | |
|---|---|
| 1 | base-option = BASE |
| 2 | processor-option = PROC |
| 3 | memory-option = MEM |
| 4 | keyboard-option = KEYB |
| 5 | video-option = MONITOR |
| 6 | video-board-option = VIDB |
| 7 | video-memory-option = VIDM |
| 8 | hd-option = HD |
| 9 | ctl1-option = CNTRL |
| 10 | fd-option = FLPD |
| 11 | os-option = OS |
| 12 | point-option = MOUSE |
| 13 | nic-option = NIC |
| 14 | modem-option = MODEM |
| 15 | tbu-option = TAPEB |
| 16 | cdrom-option = CDROM |
| 17 | sound-option = SOUND |
| 18 | spkers-option = SPKERS |

TABLE 2-continued

| Option Indicator Values: | |
|---|---|
| 19 | cache-option = CACHE |
| 20 | cable-option = CABLE |
| 21 | doc-dsk-option = DOCDSK |
| 22 | bundle-option = BUNDLE |
| 23 | hd-opt-option = HDOPT |
| 24 | ctl-opt-option = CNTRLO |
| 25 | swl-option = SW1 |
| 26 | sw2-option = SW2 |
| 27 | optl-option = OPT1 |
| 28 | opt2-option = OPT2 |
| 29 | initsvc-option = INITSVC |
| 30 | ext-svc-option = EXTSVC |
| 31 | dirline-option = DIRLINE |
| 32 | svc1-option = SVC1 |
| 33 | svc2-option = SVC2 |
| 34 | svc3-option = SVC3 |
| 35 | svc4-option = SVC4 |
| 36 | miscl-option = MISC1 |
| 37 | misc2-option = MISC2 |
| 38 | misc3-option = MISC3 |
| 39 | misc4-option = MISC4 |
| 40 | misc5-option = MISC5 |
| 41 | misc6-option = MISC6 |
| 42 | misc7-option = MISC7 |
| 43 | system-integration = SI |
| 44 | comments = COMMENT |
| 45 | dock-sol = CSTMSOL |
| 46 | customer-kit = CUSTKIT |
| 47 | Dellware = DELLWAR |

Table 3 sets forth the PFF data structure and translation for the Catalog Acknowledgement data structure 402.

TABLE 3

| | |
|---|---|
| File name = | |
| DELLUSA + Date (ccyymmdd) + Sequence number + extension | |
| The sequence number is 4 characters in length | |
| Example: DELLUSA199808310003.CATACK | |
| File Wrapper: | |
| Record tag: RTG | |
| From source: string length 10 ("CUSTOMERUSA") | |
| To destination: string length 30 ("DELLUSA") | |
| File type: string 15 ('CATACK") | |
| Acknowledgment Header (occurs once for each catalog ack file): | |
| Record tag: HDR | |
| BGN.01 | Transaction purpose code: (string length 2, value 06 = confirmation) |
| BGN.02 | Reference ID (string length 30 - value, Dell Catalog number). |
| BGN.06 | Acknowledgement Version Number ( number length 4 - values 1 to 9999). |
| BGN.03 | Acknowledgement Date: (string length 10 - format mm/dd/yyyy). |
| BGN.04 | Acknowledgement Time: (string length 8 - format hh:mm:ss). |
| BGN.05 | Acknowledgement Time Code (string length 2 - value ES = Eastern Standard Time) |
| N1.02 | Acknowledgement Contact: Customer (string length 32 - i.e.: Natalie Wong ). |
| PER.02 | Acknowledgement phone number (number length 10 - format 9999999999). |
| Acknowledgment Detail (occurs once for each catalog system ID): | |
| Record tag: DTL | |
| OTI.01 | Application acknowledgement code: (string length 2, value IA = item accept, IR = item reject) |
| OTI.02 | Original transaction identifier: (string length 3, value TN = transaction reference nbr) |
| OTI.03 | Original transaction number: (string length 30, value = System ID number from Catalog File) |
| TED.02 | Item reject text: (string length 60, value is free form text - only used if the Application ack code = IR) |
| Trailer record (occurs once for each catalog acknowledgment file): | |
| Record tag: TRL | |
| SE.01 RECORD COUNT: NUMBER, LENGTH 7 | |

Catalog acknowledgement data structure 402 includes a number of portions as well as elements within these portions. More specifically, the Catalog acknowledgement data structure 402 includes an Acknowledgement Header portion, an Acknowledgment Detail portion and a Trailer portion. The Acknowledgement Header portion includes a number of data elements that apply to the entire Acknowledgement. The Acknowledgement Detail portion includes a number of elements relating to the detail of the acknowledgement. The Trailer portion allows for an application program to validate that all records for an acknowledgement are complete.

The Acknowledgement Header portion includes a plurality of elements that enable acknowledgement of a commodity or non-commodity catalog. More specifically, the Reference ID element provides a reference to the catalog number from the Catalog data structure. The Acknowledgement Version Number element, the Acknowledgement Date element, the Acknowledgement Time element, and the Acknowledgement Time Code element all provide information relating to the acknowledgement of receipt of the catalog.

The Acknowledgement Detail portion includes a plurality of elements relating to the acknowledgement of receipt of the catalog. More specifically, the Application acknowledgement code element indicates whether each configuration in the catalog (commodity and non-commodity) is accepted or rejected. The Item reject text provides the reason why a configuration in the catalog is rejected.

Table 4 sets forth the PFF data structure and translation for the Order data structure 404.

TABLE 4

File name =
DELLUSA + Date (ccyymmdd) + Sequence number(XXX) + extension
Example: DELLUSA19990608001.ORDER
File Wrapper:
Record tag: RTG
From source: string length 10 (“CUSTOMERUSA”)
To destination: string length 30 (“DELLUSA)
File type: string 15 (‘ORDER”)
ORDER HEADER (occurs once for each order):
Record tag: OHDR
Sender ISA control number: (number length 15)
Sender GS control number: (number length 15)
Sender TS control number: (number length 9)
Translation Date Time Stamp (string length 8 - format mmddyyyy)
File reference Id : (string length 15 - unique file id that order is sent in)

| | |
|---|---|
| BEG.01 | Transaction purpose code: (string length 2, value 00 = Original) |
| BEG.02 | Purchase order type: (string length 2, value LE for Lease or PO for Purchase) |
| BEG.03 | Purchase order number: (string length 22) |
| BEG.04 | Purchase order release number: (string length 30) |
| BEG.05 | Purchase order date: (string length 8 - format mmddyyyy) |
| CUR.02 | Currency code: (string length 3 - values = USD, future use of CAN) |
| CUR.03 | Exchange Rate: (string number 10) |
| CUR.05 | Exchange From Currency/To Currency: (string 10) |
| DTM.02(1) | Order Processed Date: (string length 8 - format mmddyyyy). |
| DTM.03(1) | Order Processed Time: (string length 6 - format hhmmss). |
| DTM.04(1) | Order Processed Time Code (string length 2 - value ES = Eastern Standard Time or CS = Central Standard Time) |
| DTM.02(2) | Planned Ship Date (string length 8 - format mmddyyyy). |
| Address loop (occurs twice, once for bill to, once for ship to) | |
| N.101 | Loop Id:(string length 3, values ST = ship to , BT = Bill to) |
| N.102 | Name (string length 30, values ST = Hub Prime name, BT= Customer DT&M) |
| N.201 | Additional Name 1 (string length 30, values ST = CSR contact name, BT = blank) |
| N.301(1) | Address line 1 (string length 30) |
| N.302(1) | Address line 2 (string length 30) |
| N.301(2) | Address line 3 (string length 30) |
| N.401 | City (string length 30) |
| N.402 | State (string length 2) |
| N.403 | Zip (string length 9) |
| N.404 | Country code (string length 2 values = US, future use of CN) |
| PER.02 | Contact name (string length 30 when ST = end user name, BT = not used) |
| PER.04 | Contact phone number (number length 10, format 9999999999, ST = end user phone nbr, BT = not used). |
| TAX.01 | Sales Tax Code (String length 20 - if filled in then this is a tax exempt number and is considered non-taxable, if blank that this is a taxable order) |
| TD.401 | (EXP only, not present when STND) Planned Ship Code (String length 5 - values are STND for standard or EXP for expedited) |
| TD.512 | Shipping Service (String length 2 - values are 1D = one day, 2D =- two day, 3D = three day, ON = overnight, DF = default shipping service per contract) |
| FOB.01 | Shipping Payment Terms (string length 2 - BP = pay by buyer, standard shipping, PC = prepaid but charged to customer which will be used in preferred carrier situations) |
| REF.03 | Shipping Preferred Carrier Name: (String length 30 - carriers name for preferred shipping when shipping payment terms = PC) |

TABLE 4-continued

| | |
|---|---|
| REF.02 | Shipping Preferred Account Number: (String length 35 - account number for carrier when shipping payment terms = PC) |
| AMT.02 | Shipping Charge (number length 10 - values .01 to 9999999.99, will be zero if using preferred carrier shipping) |
| Reference Information (occurs up to three times if needed) | |
| REF.02 | Order reference id: (string length 3 - values RQ = Purchase Order Requisition Number<br>P4 = Project Code<br>PS = Purchase Order Suffix<br>PP = Purchase Order Revision Number |
| REF.03 | Order reference number: (string length 30) |
| Length of Lease (In terms of years): (number length 1; Length of the leasing period ider record b/c some customers may not have this field included in their order file. ** | |
| CREDIT CARD PAYMENT (occurs up to three times, if using a Corporate Credit for Payment) | |
| Record Tag: CCC | |
| SPI.03 Credit Card number: (string length 21) | |
| REF.02 | Credit Card Type: (string length 1,values are V=Visa, M=mastercard, A=AMEX,D=Discover) |
| DTM.06 | Credit Card expiration: (date, format = mm/yy) |
| SPI.05 CID: (string length 6, values are customer specific) | |
| N.102 | Credit Card Full Name: (string length 30, name as it appears on Credit Card) |
| | Credit Card First Name: (string length 14) |
| | Credit Card Middle Initial: (string length 1) |
| | Credit Card Last Name: (string length 15) |
| N.301(3) | Credit Card Address Line 1: (string length 30) |
| N.302(3) | Credit Card Address Line 2: (string length 30) |
| N.401(3) | Credit Card City: (string length 30) |
| N.402(3) | Credit Card State: (string length 2) |
| N.403(3) | Credit Card Zip: (string length 5) |
| N.403(3) | Credit Card Zip + 4: (string length 4) |
| PER04(2) | Credit Card Area Code: (string length 3) |
| PER04(2) | Credit Card Phone Number: (string length 7) |
| REF.01 | Credit Card Reference Number: (string length 25) |
| MSG.01(1) | Credit Card Description 1:(string length 40) |
| MSG.01(2) | Credit Card Description 2:(string length 40) |
| MSG.01(3) | Credit Card Description 3:(string length 40) |
| MSG.01(4) | Credit Card Description 4:(string length 40) |
| | Percentage of Payment: (string length 3) |
| | Daily Limit on Charge: (string length 6) |
| ORDER DETAIL (occurs once for system ID): | |
| Record tag: ODTL | |
| PO.101 | Loop counter: (number length 5 - sequential counter). |
| PO.102 | Order quantity: (number length 2 - values 1 to 50) |
| PO.104 | Unit price: (number length 10 - values .01 to 9999999.99, order total) |
| PO.107 | System ID: (number length 9 - values 1 to 999999999; Dell assigned). |
| OPTION DETAIL (occurs once for each option) | |
| Record tag: OOPT | |
| SLN.01 | Option Counter: (number length 5 - sequential counter). |
| SLN.02 | Option Indicator: (string length 7).<br>Note: See Option Indicator values. |
| SLN.04 | Option Quantity: (number length two) |
| PID.05 | Option Legend Code: (string length 7 - value 64m, 128m). |
| PO.301 | Option Action Code : (string length 1 - D= downgrade, U= upgrade, A= in addition, C= configuration). |
| Line Items Total (occurs once for each system + each option detail) | |
| Record tag: OAMT | |
| REF.02 | Line item count: (number, length 7) |
| AMT.02 | Line item total (number length 10 - values .01 to 9999999.99) . |
| Trailer record (occurs once for each Order file): | |
| Record tag: OTRL | |
| STT.01 | RECORD COUNT: NUMBER, LENGTH 7 |
| AMT.02 | Grand Total Order Amount (number length 10 - values .01 to 9999999.99 (items total + shipping + tax )) |

Order data structure 404 includes a number of portions as well as elements within these portions. More specifically, the Order data structure 404 includes an Order Header portion, a Credit Card Payment portion, an Order Detail portion, an Option Detail portion, a Line Items Total portion and a Trailer portion. The Order Header portion provides a Header for each purchase order. The Credit Card Payment portion provides the information necessary for credit card payment. The Order Detail portion provides the specific configuration information for the order. The Option Detail portion provides the option details for the order. The Line Items Total portion provides detail used for confirming the line items of the order. The Trailer portion allows for an application program to validate that all records for an order are complete.

The Order Header portion includes a Planned Ship Code element that enables a customer to indicate that a ship date of less than or equal to a contracted lead time is desired. The element allows expedited handling to be requested while not causing an order to be rejected for being outside of a contract.

The Order Detail portion includes a System ID element which is the manufacturer quote number. When a system is a commodity system then the Order Detail portion includes all the information necessary to complete the order. I.e., no Option Detail portion is necessary.

The Option Detail portion includes elements that enable a custom, non-commodity system to be ordered. Specifically, the Option Counter element provides a count of options being ordered. The Option Indicator element indicates the type of options being ordered (see, e.g., Table 2). The Option Quantity element indicates how many of each option are being ordered. The Option Action Code element indicates that action that is being used to include a particular option in the order.

Table 5 sets forth the PFF data structure and translation for the Order Acknowledgement data structure 406.

TABLE 5

| | |
|---|---|
| File name = | |
| CUSTOMERUSA + Date (ccyymmdd) + Sequence number(XXX) + extension | |
| Example: CUSTOMERUSA19990608001.0RDERACK | |
| File Wrapper: | |
| Record tag: RTG | |
| From source: string length 30 (“DELLUSA”) | |
| To destination: string length 10 (“CUSTOMERUSA”) | |
| File type: string 15 (‘ORDERACK”) | |
| ACK HEADER (occurs once for each order): | |
| Record tag: AHDR | |
| BAK.08 | Order File reference Id : (string length 15 - order file id that order was sent in) |
| BAK.01 | Transaction purpose code: (string length 2, value 00 = Original) |
| BAK.02 | Acknowledgement type: (string length 2, value AD = Ack w/detail, no change) |
| BAK.03 | Purchase order number: (string length 22 ) |
| BAK.04 | Purchase order date: (string length 10 - format mmddyyyy) |
| DTM.02(1) | Order Acknowledgment Date: (string length 8, format mmddyyyy). |
| DTM.03(1) | Order Acknowledgment Time: (string length 6, format hhmmss). |
| DTM.04(1) | Order Acknowledgment Time Code: (string length 2, value ES = Eastern Standard Time) |
| ACK DETAIL (occurs once for each ORDER DETAIL from Order): | |
| Record tag: ADLT | |
| PO1.06 | Ack Detail qualifier: ( string length 2, value = CF for system, OP = Option) |
| PO.101/sln.01 | Line Item: (number length 5, loop counter from CF and OP records). |
| PO.102/sln.04 | Order quantity: (number length 2, value 1 to 50) |
| PO.104/sln.06 | Unit price: (number length 10, value .01 to 9999999.99) |
| PO.107/SLN.10 | Reference ID: (number length 9, value 1 to 999999999, when Ack Detail Qual = CF then this will be the system Id, when Ack Detail Qual. = OP will be the Option Legend Code) |
| ACK STATUS (occurs once for each Ack Detail Record) | |
| Record tag: ASTS | |
| ACK.01 | Line Item Status Code: (string length 2, IA = item accepted, IR = item rejected) |
| ACK.02 | Line Item Error Counter: (number length 3, if Line Item Status Code = IR, total number of errors, If Line Item Status Code = IA, then this will be blank.) |
| AMT (occurs once for each Dell order, 1:M relationship from PO:Dell Order): | |
| Record tag: AMT | |
| N9.02 | Dell Order Number: (string length 10) |
| AMT.02 | Confirmed Order Total: (number length 10 value .01 to 9999999.99) |
| | Confirmed Shipping Total: (number length 10 value .01 to 9999999.99) |
| | Confirmed Tax Total: (number length 10, value .01 to 9999999.99) |
| | Confirmed Line Item Total: (number length 10) |
| DTM02(2) | Order Expected Ship Date: (string length 8, format mmddyyyy). |
| ACK ERROR (Each error when ASTS record status = IR) | |
| Record tag: AERR | |
| ACK.06 | Line Item IR error msg: (string length 45 ? if status code = IR, error message) |
| Trailer record (occurs once for each Order Ack file): | |
| Record tag: TRL | |
| CTT.01 | Total number of line items (number length 10) . |

Order acknowledgement data structure 406 includes a number of portions as well as elements within these portions. More specifically, the Order acknowledgement data structure 406 includes an Acknowledgement Header portion, an Acknowledgment Detail portion, an Acknowledgement Status portion and a Trailer portion. The Acknowledgement Header portion includes a number of data elements that apply to the entire Acknowledgement. The Acknowledgement Detail portion includes a number of elements that provide the detail of the acknowledgement. The Acknowledgement status portion includes a number of elements that relate to the status of the acknowledgement, to acknowledge each option and system ID in an original order. The Trailer portion allows for an application program to validate that all records for an acknowledgement are complete.

Other Embodiments

Other embodiments are within the following claims.

For example, while the preferred embodiment is set forth with reference to specific EDI transaction sets, other industry standard formats such as, but not limited to, XML or HTML are also within the scope of the invention.

Attachments A-D set forth the EDI transaction layouts that substantially conform to the ANSI EDI transaction sets 832, 824, 850, and 855, respectively. These transaction sets have been tailored from the ANSI industry standards to implement transaction sets that function with both commodity and non-commodity products.

Attachment A

832 Price/Sales Catalog

Functional Group ID=SC

Introduction:

This Standard contains the format and establishes the data contents of the Price/Sales Catalog Transaction Set (832) for use within the context of an Electronic Data Interchange (EDI) environment. The transaction set can be used to provide for customary and established business and industry practice relative to furnishing or requesting the price of goods or services in the form of a catalog.

Heading:

| | Pos. No. | Seg. ID | Name | Req. Des. | Max.Use | Loop Repeat | Notes and Comments |
|---|---|---|---|---|---|---|---|
| M | 010 | ST | Transaction Set Header | M | 1 | | |
| M | 020 | BCT | Beginning Segment for Price/Sales Catalog | M | 1 | | |
| | 070 | DTM | Date/Time Reference | O | 10 | | |
| | 090 | CUR | Currency | O | 5 | | |
| | | | LOOP ID - N1 | | | >1 | |
| | 150 | N1 | Name | O | 1 | | |
| | 200 | PER | Administrative Communications Contact | O | >1 | | |

Detail:

| Pos. No. | Seg. ID | Name | Req. Des. | Max.Use | Loop Repeat | Notes and Comments |
|---|---|---|---|---|---|---|
| | | LOOP ID - LIN | | | >1 | |
| 010 | LIN | Item Identification | O | 1 | | |
| 015 | G53 | Maintenance Type | O | 1 | | n1 |
| 030 | DTM | Date/Time Reference | O | 10 | | |
| 040 | REF | Reference Identification | O | >1 | | |
| 070 | PID | Product/Item Description | O | 200 | | |
| 166 | TXI | Tax Information | O | >1 | | |
| | | LOOP ID - CTP | | | 100 | |
| 170 | CTP | Pricing Information | O | 1 | | |
| | | LOOP ID - SLN | | | >1 | |
| 350 | SLN | Subline Item Detail | O | 1 | | |
| 360 | SI | Service Characteristic Identification | O | >1 | | |
| 370 | PID | Product/Item Description | O | >1 | | |
| 390 | CTP | Pricing Information | O | >1 | | |
| 450 | SAC | Service, Promotion, Allowance, or Charge Information | O | >1 | | |

Summary:

| | Pos. No. | Seg. ID | Name | Req. Des. | Max.Use | Loop Repeat | Notes and Comments |
|---|---|---|---|---|---|---|---|
| | 010 | CTT | Transaction Totals | O | 1 | | n2 |
| M | 020 | SE | Transaction Set Trailer | M | 1 | | |

Transaction Set Notes

1. If BCT10 is used and G5301 is used, then the G5301 takes precedence.
2. Number of line items (CTT01) is the accumulation of the number of LIN segments. Hash total (CTT02) is not used in this transaction.

Segment: ST Transaction Set Header
Position: 010
Loop:
Level: Heading
Usage: Mandatory
Max Use: 1
Purpose: To indicate the start of a transaction set and to assign a control number
Syntax Notes:
Semantic Notes: 1 The transaction set identifier (ST01) is used by the translation routines of the interchange partners to select the appropriate transaction set definition (e.g., 810 selects the Invoice Transaction Set).
Comments:

Data Element Summary

| | Ref. Des. | Data Element | Name | Attributes |
|---|---|---|---|---|
| M | ST01 | 143 | **Transaction Set Identifier Code**<br>Code uniquely identifying a Transaction Set | M ID 3/3 |
| M | ST02 | 329 | **Transaction Set Control Number**<br>Identifying control number that must be unique within the transaction set functional group assigned by the originator for a transaction set | M AN 4/9 |

Segment: BCT Beginning Segment for Price/Sales Catalog
Position: 020
Loop:
Level: Heading
Usage: Mandatory
Max Use: 1
Purpose: To indicate the beginning of the Price/Sales Catalog Transaction Set and specify catalog purpose and number information
Syntax Notes:
Semantic Notes:

Comments:

Data Element Summary

| | Ref. Des. | Data Element | Name | | Attributes |
|---|---|---|---|---|---|
| M | BCT01 | 683 | **Catalog Purpose Code** | | M ID 2/2 |
| | | | Code indicating purpose of catalog | | |
| | | | CP | Customized Catalog<br>A collection of criteria for the user of a catalog that generates responses from the catalog when the criteria are met | |
| | | | PC | Price Catalog | |
| | | | PS | Price Sheet | |
| | | | RC | Resale Catalog | |
| | BCT02 | 684 | **Catalog Number** | | O AN 1/15 |
| | | | Identifying number for catalog or superseded catalog | | |
| | | | Dell Catalog Number | | |
| | BCT10 | 353 | **Transaction Set Purpose Code** | | O ID 2/2 |
| | | | Code identifying purpose of transaction set | | |
| | | | 00 | Original | |

Segment: DTM Date/Time Reference
Position: 070
Loop:
Level: Heading
Usage: Optional
Max Use: 10
Purpose: To specify pertinent dates and times
Syntax Notes:
1 At least one of DTM02 DTM03 or DTM05 is required.
2 If DTM04 is present, then DTM03 is required.
3 If either DTM05 or DTM06 is present, then the other is required.

Semantic Notes:
Comments:

Data Element Summary

| | Ref. Des. | Data Element | Name | Attributes |
|---|---|---|---|---|
| M | DTM01 | 374 | **Date/Time Qualifier**<br>Code specifying type of date or time, or both date and time<br>007 Effective | M ID 3/3 |
| | DTM02 | 373 | **Date**<br>Date expressed as CCYYMMDD<br>Catalog Date | X DT 8/8 |
| | DTM03 | 337 | **Time**<br>Time expressed in 24-hour clock time as follows: HHMM, or HHMMSS, or HHMMSSD, or HHMMSSDD, where H = hours (00-23), M = minutes (00-59), S = integer seconds (00-59) and DD = decimal seconds; decimal seconds are expressed as follows: D = tenths (0-9) and DD = hundredths (00-99) | X TM 4/8 |
| | DTM04 | 623 | **Time Code**<br>Code identifying the time. In accordance with International Standards Organization standard 8601, time can be specified by a + or - and an indication in hours in relation to Universal Time Coordinate (UTC) time; since + is a restricted character, + and - are substituted by P and M in the codes that follow<br>CS Central Standard Time | O ID 2/2 |

Segment: CUR Currency
Position: 090
Loop:
Level: Heading
Usage: Optional
Max Use: 5
Purpose: To specify the currency (dollars, pounds, francs, etc.) used in a transaction
Syntax Notes:
1. If CUR08 is present, then CUR07 is required.
2. If CUR09 is present, then CUR07 is required.
3. If CUR10 is present, then at least one of CUR11 or CUR12 is required.
4. If CUR11 is present, then CUR10 is required.
5. If CUR12 is present, then CUR10 is required.
6. If CUR13 is present, then at least one of CUR14 or CUR15 is required.
7. If CUR14 is present, then CUR13 is required.
8. If CUR15 is present, then CUR13 is required.
9. If CUR16 is present, then at least one of CUR17 or CUR18 is required.
10. If CUR17 is present, then CUR16 is required.
11. If CUR18 is present, then CUR16 is required.
12. If CUR19 is present, then at least one of CUR20 or CUR21 is required.

13 If CUR20 is present, then CUR19 is required.
14 If CUR21 is present, then CUR19 is required.

Semantic Notes:

Comments: 1 See Figures Appendix for examples detailing the use of the CUR segment.

Notes: This segment occurs 2 times if exchange rate will be used.
The first occurance will be the Exchange From Currency.
The second occurance will be the Exchange To Currency.

Data Element Summary

| | Ref. Des. | Data Element | Name | Attributes |
|---|---|---|---|---|
| M | **CUR01** | **98** | **Entity Identifier Code**<br>Code identifying an organizational entity, a physical location, property or an individual<br>MF Manufacturer of Goods | **M ID 2/3** |
| M | **CUR02** | **100** | **Currency Code**<br>Code (Standard ISO) for country in whose currency the charges are specified<br>USD - United States Dollars<br>CAN - Canadian Dollars | **M ID 3/3** |
| | **CUR03** | **280** | **Exchange Rate**<br>Value to be used as a multiplier conversion factor to convert monetary value from one currency to another | **O R 4/10** |

Segment: N1 Name
Position: 150
Loop: N1 Optional
Level: Heading
Usage: Optional
Max Use: 1
Purpose: To identify a party by type of organization, name, and code
Syntax Notes: 1 At least one of N102 or N103 is required.
2 If either N103 or N104 is present, then the other is required.

Semantic Notes:

Comments: 1 This segment, used alone, provides the most efficient method of providing organizational identification. To obtain this efficiency the "ID Code" (N104) must provide a key to the table maintained by the transaction processing party.
2 N105 and N106 further define the type of entity in N101.

Data Element Summary

| | Ref. Des. | Data Element | Name | Attributes |
|---|---|---|---|---|
| M | N101 | 98 | **Entity Identifier Code** | M ID 2/3 |
| | | | Code identifying an organizational entity, a physical location, property or an individual | |
| | | | SE Selling Party | |
| | N102 | 93 | **Name** | X AN 1/60 |
| | | | Free-form name | |
| | | | DELL COMPUTER CORPORATION | |

Segment: PER Administrative Communications Contact
Position: 200
Loop: N1 Optional
Level: Heading
Usage: Optional
Max Use: >1
Purpose: To identify a person or office to whom administrative communications should be directed
Syntax Notes:
1 If either PER03 or PER04 is present, then the other is required.
2 If either PER05 or PER06 is present, then the other is required.
3 If either PER07 or PER08 is present, then the other is required.
Semantic Notes:
Comments:

Data Element Summary

| | Ref. Des. | Data Element | Name | Attributes |
|---|---|---|---|---|
| M | PER01 | 366 | **Contact Function Code** | M ID 2/2 |
| | | | Code identifying the major duty or responsibility of the person or group named | |
| | | | SR Sales Representative or Department | |
| | PER02 | 93 | **Name** | O AN 1/60 |
| | | | Free-form name | |
| | | | Dell Sales Representative | |
| | PER03 | 365 | **Communication Number Qualifier** | X ID 2/2 |
| | | | Code identifying the type of communication number | |
| | | | TE Telephone | |
| | PER04 | 364 | **Communication Number** | X AN 1/80 |
| | | | Complete communications number including country or area code when applicable | |
| | | | Sales Representative phone number | |

Segment: LIN Item Identification
Position: 010
Loop: LIN Optional
Level: Detail
Usage: Optional
Max Use: 1
Purpose: To specify basic item identification data
Syntax Notes:
1 If either LIN04 or LIN05 is present, then the other is required.
2 If either LIN06 or LIN07 is present, then the other is required.
3 If either LIN08 or LIN09 is present, then the other is required.
4 If either LIN10 or LIN11 is present, then the other is required.
5 If either LIN12 or LIN13 is present, then the other is required.
6 If either LIN14 or LIN15 is present, then the other is required.
7 If either LIN16 or LIN17 is present, then the other is required.
8 If either LIN18 or LIN19 is present, then the other is required.
9 If either LIN20 or LIN21 is present, then the other is required.
10 If either LIN22 or LIN23 is present, then the other is required.
11 If either LIN24 or LIN25 is present, then the other is required.
12 If either LIN26 or LIN27 is present, then the other is required.
13 If either LIN28 or LIN29 is present, then the other is required.
14 If either LIN30 or LIN31 is present, then the other is required.
Semantic Notes:
1 LIN01 is the line item identification
Comments:
1 See the Data Dictionary for a complete list of IDs.
2 LIN02 through LIN31 provide for fifteen different product/service IDs for each item. For example: Case, Color, Drawing No., U.P.C. No., ISBN No., Model No., or SKU.

Data Element Summary

| | Ref. Des. | Data Element | Name | Attributes |
|---|---|---|---|---|
| | **LIN01** | **350** | **Assigned Identification**<br>Alphanumeric characters assigned for differentiation within a transaction set | **O AN 1/20** |
| **M** | **LIN02** | **235** | **Product/Service ID Qualifier**<br>Code identifying the type/source of the descriptive number used in Product/Service ID (234)<br>SO System Identifier | **M ID 2/2** |
| **M** | **LIN03** | **234** | **Product/Service ID**<br>Identifying number for a product or service<br>Dell System ID | **M AN 1/48** |
| | **LIN04** | **235** | **Product/Service ID Qualifier**<br>Code identifying the type/source of the descriptive number used in Product/Service ID (234)<br>F7 End-Item Description<br>Item identifier describes an end-item associated with the use of the required material | **X ID 2/2** |
| | **LIN05** | **234** | **Product/Service ID**<br>Identifying number for a product or service | **X AN 1/48** |

System ID Text Description

Segment: G53 Maintenance Type
Position: 015
Loop: LIN Optional
Level: Detail
Usage: Optional
Max Use: 1
Purpose: To identify the specific type of item maintenance
Syntax Notes:
Semantic Notes:
Comments:

Data Element Summary

| | Ref. Des. | Data Element | Name | Attributes |
|---|---|---|---|---|
| M | G5301 | 875 | **Maintenance Type Code** | M ID 3/3 |
| | | | Code identifying the specific type of item maintenance | |
| | | | 001 Change | |
| | | | 002 Delete | |
| | | | This is to be interpreted as Discontinued | |
| | | | 003 Add Full Item Detail | |

Segment: DTM Date/Time Reference
Position: 030
Loop: LIN Optional
Level: Detail
Usage: Optional
Max Use: 10
Purpose: To specify pertinent dates and times
Syntax Notes:
1 At least one of DTM02 DTM03 or DTM05 is required.
2 If DTM04 is present, then DTM03 is required.
3 If either DTM05 or DTM06 is present, then the other is required.
Semantic Notes:
Comments:

Data Element Summary

| | Ref. Des. | Data Element | Name | Attributes |
|---|---|---|---|---|
| M | DTM01 | 374 | **Date/Time Qualifier** | M ID 3/3 |
| | | | Code specifying type of date or time, or both date and time | |
| | | | This segment may occur two times, once for Effective Date and once for Expiration Date. | |
| | | | 007 Effective | |

| | | | | |
|---|---|---|---|---|
| | | 036 | Expiration<br>Date coverage expires | |
| DTM02 | 373 | **Date**<br>Date expressed as CCYYMMDD | | X DT 8/8 |

Segment: REF Reference Identification
Position: 040
Loop: LIN Optional
Level: Detail
Usage: Optional
Max Use: >1
Purpose: To specify identifying information
Syntax Notes:
1 At least one of REF02 or REF03 is required.
2 If either C04003 or C04004 is present, then the other is required.
3 If either C04005 or C04006 is present, then the other is required.
Semantic Notes:
1 REF04 contains data relating to the value cited in REF02.
Comments:

Data Element Summary

| | Ref. Des. | Data Element | Name | Attributes |
|---|---|---|---|---|
| M | REF01 | 128 | **Reference Identification Qualifier**<br>Code qualifying the Reference Identification<br>VP — Vendor Product Number<br>A unique number assigned by a vendor or manufacturer to identify its products | M ID 2/3 |
| | REF02 | 127 | **Reference Identification**<br>Reference information as defined for a particular Transaction Set or as specified by the Reference Identification Qualifier<br>This number represents an old system ID to be replaced by current system ID. | X AN 1/30 |

Segment: PID Product/Item Description
Position: 070
Loop: LIN Optional
Level: Detail
Usage: Optional
Max Use: 200
Purpose: To describe a product or process in coded or free-form format
Syntax Notes:
1 If PID04 is present, then PID03 is required.
2 At least one of PID04 or PID05 is required.
3 If PID07 is present, then PID03 is required.
4 If PID08 is present, then PID04 is required.
5 If PID09 is present, then PID05 is required.
Semantic Notes:
1 Use PID03 to indicate the organization that publishes the code list being referred to.

2 PID04 should be used for industry-specific product description codes.
3 PID08 describes the physical characteristics of the product identified in PID04. A "Y" indicates that the specified attribute applies to this item; an "N" indicates it does not apply. Any other value is indeterminate.
4 PID09 is used to identify the language being used in PID05.

Comments:
1 If PID01 equals "F", then PID05 is used. If PID01 equals "S", then PID04 is used. If PID01 equals "X", then both PID04 and PID05 are used.
2 Use PID06 when necessary to refer to the product surface or layer being described in the segment.
3 PID07 specifies the individual code list of the agency specified in PID03.

Notes: System Specification Description
This segment may occur up to 6 times.

Data Element Summary

| | Ref. Des. | Data Element | Name | Attributes |
|---|---|---|---|---|
| M | PID01 | 349 | **Item Description Type**<br>Code indicating the format of a description<br>F Free-form | M ID 1/1 |
| | PID05 | 352 | **Description**<br>A free-form description to clarify the related data elements and their content | X AN 1/80 |

Segment: TXI Tax Information
Position: 166
Loop: LIN Optional
Level: Detail
Usage: Optional
Max Use: >1
Purpose: To specify tax information
Syntax Notes:
1 At least one of TXI02 TXI03 or TXI06 is required.
2 If either TXI04 or TXI05 is present, then the other is required.
3 If TXI08 is present, then TXI03 is required.

Semantic Notes:
1 TXI02 is the monetary amount of the tax.
2 TXI03 is the tax percent expressed as a decimal.
3 TXI07 is a code indicating the relationship of the price or amount to the associated segment.

Comments:

Data Element Summary

| | Ref. Des. | Data Element | Name | Attributes |
|---|---|---|---|---|
| M | TXI01 | 963 | **Tax Type Code**<br>Code specifying the type of tax | M ID 2/2 |

| | | | | |
|---|---|---|---|---|
| | | ZZ Mutually Defined | | |
| TXI02 | 782 | **Monetary Amount**<br>Monetary amount<br>Sales Tax Amount if built into system price. | X | R 1/18 |

Segment: CTP Pricing Information
Position: 170
Loop: CTP Optional
Level: Detail
Usage: Optional
Max Use: 1
Purpose: To specify pricing information
Syntax Notes:
1 If either CTP04 or CTP05 is present, then the other is required.
2 If CTP06 is present, then CTP07 is required.
3 If CTP09 is present, then CTP02 is required.
4 If CTP10 is present, then CTP02 is required.
5 If CTP11 is present, then CTP03 is required.
Semantic Notes:
1 CTP07 is a multiplier factor to arrive at a final discounted price. A multiplier of .90 would be the factor if a 10% discount is given.
2 CTP08 is the rebate amount.
Comments:
1 See Figures Appendix for an example detailing the use of CTP03 and CTP04.
See Figures Appendix for an example detailing the use of CTP03, CTP04 and CTP07.
Notes: This segment may occur 2 times, once for Catalog Price and once for Shipping Price.

Data Element Summary

| Ref. Des. | Data Element | Name | Attributes |
|---|---|---|---|
| CTP02 | 236 | **Price Identifier Code**<br>Code identifying pricing specification<br>CAT Catalog Price<br>This is to be used as the qualifier for System Id Purchase Price.<br>SPC Special Price<br>This is be used as the qualifier for Shipping Price. | X ID 3/3 |
| CTP03 | 212 | **Unit Price**<br>Price per unit of product, service, commodity, etc.<br>System ID purchase price | X R 1/17 |
| CTP05 | C001 | **Composite Unit of Measure**<br>To identify a composite unit of measure (See Figures Appendix for examples of use) | X |
| M C00101 | 355 | **Unit or Basis for Measurement Code**<br>Code specifying the units in which a value is being expressed, or manner in which a measurement has been taken<br>BD - for bundle system type<br>ZZ - for custom system type<br>BD Bundle<br>for bundle system type<br>ZZ Mutually Defined<br>for custom system type | M ID 2/2 |

Segment: SLN Subline Item Detail
Position: 350
Loop: SLN Optional
Level: Detail
Usage: Optional
Max Use: 1
Purpose: To specify product subline detail item data
Syntax Notes:
1. If either SLN04 or SLN05 is present, then the other is required.
2. If SLN07 is present, then SLN06 is required.
3. If SLN08 is present, then SLN06 is required.
4. If either SLN09 or SLN10 is present, then the other is required.
5. If either SLN11 or SLN12 is present, then the other is required.
6. If either SLN13 or SLN14 is present, then the other is required.
7. If either SLN15 or SLN16 is present, then the other is required.
8. If either SLN17 or SLN18 is present, then the other is required.
9. If either SLN19 or SLN20 is present, then the other is required.
10. If either SLN21 or SLN22 is present, then the other is required.
11. If either SLN23 or SLN24 is present, then the other is required.
12. If either SLN25 or SLN26 is present, then the other is required.
13. If either SLN27 or SLN28 is present, then the other is required.

Semantic Notes:
1 SLN01 is the identifying number for the subline item.
2 SLN02 is the identifying number for the subline level. The subline level is analogous to the level code used in a bill of materials.
3 SLN03 is the configuration code indicating the relationship of the subline item to the baseline item.
4 SLN08 is a code indicating the relationship of the price or amount to the associated segment.

Comments:
1 See the Data Element Dictionary for a complete list of IDs.
2 SLN01 is related to (but not necessarily equivalent to) the baseline item number. Example: 1.1 or 1A might be used as a subline number to relate to baseline number 1.
3 SLN09 through SLN28 provide for ten different product/service IDs for each item. For example: Case, Color, Drawing No., U.P.C. No., ISBN No., Model No., or SKU.

Data Element Summary

| | Ref. Des. | Data Element | Name | Attributes |
|---|---|---|---|---|
| M | SLN01 | 350 | **Assigned Identification**<br>Alphanumeric characters assigned for differentiation within a transaction set | M AN 1/20 |
| | SLN02 | 350 | **Assigned Identification**<br>Alphanumeric characters assigned for differentiation within a transaction set<br>This is the relationship ID<br>PO - Parent Option<br>CH - Child Option<br>OR - Orphan Option (no children) | O AN 1/20 |
| M | SLN03 | 662 | **Relationship Code**<br>Code indicating the relationship between entities<br>O Information Only<br>Charges which relate to but may not be included in or added to the unit price of the SLN. (i.e., compute WATS calculation based upon usage amounts) | M ID 1/1 |

Segment: SI Service Characteristic Identification
Position: 360
Loop: SLN Optional
Level: Detail
Usage: Optional
Max Use: >1
Purpose: To specify service characteristic data
Syntax Notes:
1 If either SI04 or SI05 is present, then the other is required.
2 If either SI06 or SI07 is present, then the other is required.
3 If either SI08 or SI09 is present, then the other is required.
4 If either SI10 or SI11 is present, then the other is required.

5 If either SI12 or SI13 is present, then the other is required.
6 If either SI14 or SI15 is present, then the other is required.
7 If either SI16 or SI17 is present, then the other is required.
8 If either SI18 or SI19 is present, then the other is required.
9 If either SI20 or SI21 is present, then the other is required.

Semantic Notes:

Comments: 1 SI01 defines the source for each of the service characteristics qualifiers.

Data Element Summary

| | Ref. Des. | Data Element | Name | Attributes |
|---|---|---|---|---|
| M | SI01 | 559 | **Agency Qualifier Code**<br>Code identifying the agency assigning the code values<br>ZZ Mutually Defined | M ID 2/2 |
| M | SI02 | 1000 | **Service Characteristics Qualifier**<br>Code from an industry code list qualifying the type of service characteristics<br>D - Downgrade<br>U - Upgrade<br>A - Addition<br>C - Configuration | M AN 2/2 |
| M | SI03 | 234 | **Product/Service ID**<br>Identifying number for a product or service<br>Option Indicator Values<br><br>1 base-option = BASE<br>2 processor-option = PROC<br>3 memory-option = MEM<br>4 keyboard-option = KEYB<br>5 video-option = MONITOR<br>6 video-board-option = VIDB<br>7 video-memory-option = VIDM<br>8 hd-option = HD<br>9 ctl1-option = CNTRL<br>10 fd-option = FLPD<br>11 os-option = OS<br>12 point-option = MOUSE<br>13 nic-option = NIC<br>14 modem-option = MODEM<br>15 tbu-option = TAPEB<br>16 cdrom-option = CDROM<br>17 sound-option = SOUND<br>18 spkers-option = SPKERS<br>19 cache-option = CACHE<br>20 cable-option = CABLE<br>21 doc-dsk-option = DOCDSK<br>22 bundle-option = BUNDLE<br>23 hd-opt-option = HDOPT | M AN 1/48 |

```
24 ctl-opt-option = CNTRLO
25 sw1-option = SW1
26 sw2-option = SW2
27 opt1-option = OPT1
28 opt2-option = OPT2
29 initsvc-option = INITSVC
30 ext-svc-option = EXTSVC
31 dirline-option = DIRLINE
32 svc1-option = SVC1
33 svc2-option = SVC2
34 svc3-option = SVC3
35 svc4-option = SVC4
36 misc1-option = MISC1
37 misc2-option = MISC2
38 misc3-option = MISC3
39 misc4-option = MISC4
40 misc5-option = MISC5
41 misc6-option = MISC6
42 misc7-option = MISC7
43 system-integration = SI
44 comments = COMMENT
45 dock-sol = CSTMSOL
46 customer-kit = CUSTKIT
47 Dellware = DELLWAR
```

ATTACHMENT B

824 Application Advice

Functional Group ID=AG

Introduction:

This Standard contains the format and establishes the data contents of the Application Advice Transaction Set (824) for use within the context of an Electronic Data Interchange (EDI) environment. The transaction set can be used to provide the ability to report the results of an application system's data content edits of transaction sets. The results of editing transaction sets can be reported at the functional group and transaction set level, in either coded or free-form format. It is designed to accommodate the business need of reporting the acceptance, rejection or acceptance with change of any transaction set. The Application Advice should not be used in place of a transaction set designed as a specific response to another transaction set (e.g., purchase order acknowledgment sent in response to a purchase order).

Notes:

This transaction is used to acknowledge receipt of a DELL 832 Sales Catalog.

Heading:

| | Pos. No. | Seg. ID | Name | Req. Des. | Max.Use | Loop Repeat | Notes and Comments |
|---|---|---|---|---|---|---|---|
| M | 010 | ST | Transaction Set Header | M | 1 | | |
| M | 020 | BGN | Beginning Segment | M | 1 | | |
| | | | LOOP ID - N1 | | | >1 | |
| | 030 | N1 | Name | O | 1 | | |
| | 080 | PER | Administrative Communications Contact | O | 3 | | |

Detail:

| | Pos. No. | Seg. ID | Name | Req. Des. | Max.Use | Loop Repeat | Notes and Comments |
|---|---|---|---|---|---|---|---|
| | | | LOOP ID - OTI | | | >1 | |
| M | 010 | OTI | Original Transaction Identification | M | 1 | | n1 |
| | | | LOOP ID - TED | | | >1 | |
| | 070 | TED | Technical Error Description | O | 1 | | |
| M | 090 | SE | Transaction Set Trailer | M | 1 | | |

Transaction Set Notes

1. The OTI loop is intended to provide a unique identification of the transaction set that is the subject of this application acknowledgment.

Segment: ST Transaction Set Header
Position: 010
Loop:
Level: Heading
Usage: Mandatory
Max Use: 1
Purpose: To indicate the start of a transaction set and to assign a control number
Syntax Notes:
Semantic Notes:
1 The transaction set identifier (ST01) is used by the translation routines of the interchange partners to select the appropriate transaction set definition (e.g., 810 selects the Invoice Transaction Set).

Comments:

Data Element Summary

| | Ref. Des. | Data Element | Name | Attributes |
|---|---|---|---|---|
| M | ST01 | 143 | **Transaction Set Identifier Code**<br>Code uniquely identifying a Transaction Set | M ID 3/3 |
| M | ST02 | 329 | **Transaction Set Control Number**<br>Identifying control number that must be unique within the transaction set functional group assigned by the originator for a transaction set | M AN 4/9 |

Segment: BGN Beginning Segment
Position: 020
Loop:
Level: Heading
Usage: Mandatory
Max Use: 1
Purpose: To indicate the beginning of a transaction set
Syntax Notes:
1 If BGN05 is present, then BGN04 is required.

Semantic Notes:
1 BGN02 is the transaction set reference number.
2 BGN03 is the transaction set date.
3 BGN04 is the transaction set time.
4 BGN05 is the transaction set time qualifier.
5 BGN06 is the transaction set reference number of a previously sent transaction affected by the current transaction.

Comments:

Data Element Summary

| | Ref. Des. | Data Element | Name | Attributes |
|---|---|---|---|---|
| M | BGN01 | 353 | **Transaction Set Purpose Code**<br>Code identifying purpose of transaction set<br>06 Confirmation | M ID 2/2 |
| M | BGN02 | 127 | **Reference Identification**<br>Reference information as defined for a particular Transaction Set or as specified by the Reference Identification Qualifier<br>This is the Dell Catalog Number. This value comes from the BCT 02 element of the 832 received from Dell. | M AN 1/30 |
| M | BGN03 | 373 | **Date**<br>Date expressed as CCYYMMDD<br>Dell Catalog Acknowledgement Date | M DT 8/8 |
| | BGN04 | 337 | **Time**<br>Time expressed in 24-hour clock time as follows: HHMM, or HHMMSS, or HHMMSSD, or HHMMSSDD, where H = hours (00-23), M = minutes (00-59), S = integer seconds (00-59) and DD = decimal seconds; decimal seconds are expressed as follows: D = tenths (0-9) and DD = hundredths (00-99)<br>Dell Catalog Acknowledgement Time | X TM 4/8 |
| | BGN05 | 623 | **Time Code**<br>Code identifying the time. In accordance with International Standards Organization standard 8601, time can be specified by a + or - and an indication in hours in relation to Universal Time Coordinate (UTC) time; since + is a restricted character, + and - are substituted by P and M in the codes that follow | O ID 2/2 |
| | BGN06 | 127 | **Reference Identification**<br>Reference information as defined for a particular Transaction Set or as specified by the Reference Identification Qualifier<br>This may be used as a customer generated reference number for the catalog received from Dell. | O AN 1/30 |

Segment: N1 Name
Position: 030
Loop: N1 Optional
Level: Heading
Usage: Optional
Max Use: 1
Purpose: To identify a party by type of organization, name, and code
Syntax Notes:
1 At least one of N102 or N103 is required.
2 If either N103 or N104 is present, then the other is required.
Semantic Notes:
Comments:
1 This segment, used alone, provides the most efficient method of providing organizational identification. To obtain this efficiency the "ID Code" (N104) must provide a key to the table maintained by the transaction processing party.

2 N105 and N106 further define the type of entity in N101.

Data Element Summary

| | Ref. Des. | Data Element | Name | Attributes |
|---|---|---|---|---|
| M | **N101** | **98** | **Entity Identifier Code**<br>Code identifying an organizational entity, a physical location, property or an individual<br>O3 Receiving Company | **M ID 2/3** |
| | **N102** | **93** | **Name**<br>Free-form name<br>Name of Company Receiving Catalog | **X AN 1/60** |

Segment: PER Administrative Communications Contact
Position: 080
Loop: N1 Optional
Level: Heading
Usage: Optional
Max Use: 3
Purpose: To identify a person or office to whom administrative communications should be directed
Syntax Notes:
1 If either PER03 or PER04 is present, then the other is required.
2 If either PER05 or PER06 is present, then the other is required.
3 If either PER07 or PER08 is present, then the other is required.
Semantic Notes:
Comments:
Notes: This segment has the contact name of the person at the Receiving Company responsible for the Dell Catalog.

Data Element Summary

| | Ref. Des. | Data Element | Name | Attributes |
|---|---|---|---|---|
| M | **PER01** | **366** | **Contact Function Code**<br>Code identifying the major duty or responsibility of the person or group named<br>RP Responsible Person | **M ID 2/2** |
| | **PER02** | **93** | **Name**<br>Free-form name | **O AN 1/60** |
| | **PER03** | **365** | **Communication Number Qualifier**<br>Code identifying the type of communication number<br>TE Telephone | **X ID 2/2** |
| | **PER04** | **364** | **Communication Number**<br>Complete communications number including country or area code when applicable<br>Telephone Number of Person Responsible for receiving the Dell Catalog | **X AN 1/80** |

| | | | | |
|---|---|---|---|---|
| **PER05** | **365** | **Communication Number Qualifier**<br>Code identifying the type of communication number<br>EM Electronic Mail | **X** | **ID 2/2** |
| **PER06** | **364** | **Communication Number**<br>Complete communications number including country or area code when applicable<br>E-mail address for the person responsible for the Dell Catalog. | **X** | **AN 1/80** |

Segment: OTI Original Transaction Identification

Position: 010

Loop: OTI Mandatory

Level: Detail

Usage: Mandatory

Max Use: 1

Purpose: To identify the edited transaction set and the level at which the results of the edit are reported, and to indicate the accepted, rejected, or accepted-with-change edit result

Syntax Notes:
1 If OTI09 is present, then OTI08 is required.

Semantic Notes:
1 OTI03 is the primary reference identification or number used to uniquely identify the original transaction set.
2 OTI06 is the group date.
3 OTI07 is the group time.
4 If OTI11 is present, it will contain the version/release under which the original electronic transaction was translated by the receiver.
5 OTI12 is the purpose of the original transaction set, and is used to assist in its unique identification.
6 OTI13 is the type of the original transaction set, and is used to assist in its unique identification.
7 OTI14 is the application type of the original transaction set, and is used to assist in its unique identification.
8 OTI15 is the type of action indicated or requested by the original transaction set, and is used to assist in its unique identification.
9 OTI16 is the action requested by the original transaction set, and is used to assist in its unique identification.
10 OTI17 is the status reason of the original transaction set, and is used to assist in its unique identification.

Comments:
1 OTI02 contains the qualifier identifying the business transaction from the original business application, and OTI03 will contain the original business application identification.
2 If used, OTI04 through OTI08 will contain values from the original electronic functional group generated by the sender.
3 If used, OTI09 through OTI10 will contain values from the original electronic transaction set generated by the sender.

Notes: The OTI will occur once for EACH catalog System ID.

Data Element Summary

| | Ref. Des. | Data Element | Name | Attributes |
|---|---|---|---|---|
| M | OTI01 | 110 | **Application Acknowledgment Code**<br>Code indicating the application system edit results of the business data<br>IA Item Accept<br>IR Item Reject | M ID 1/2 |
| M | OTI02 | 128 | **Reference Identification Qualifier**<br>Code qualifying the Reference Identification<br>TN Transaction Reference Number | M ID 2/3 |
| M | OTI03 | 127 | **Reference Identification**<br>Reference information as defined for a particular Transaction Set or as specified by the Reference Identification Qualifier<br>Original System ID number. This value comes from the LIN.03 of the Dell 832 Sales Catalog. | M AN 1/30 |

Segment: TED Technical Error Description
Position: 070
Loop: TED Optional
Level: Detail
Usage: Optional
Max Use: 1
Purpose: To identify the error and, if feasible, the erroneous segment, or data element, or both
Syntax Notes:
Semantic Notes:
Comments: 1 If used, TED02 will contain a generic description of the data in error (e.g., part number, date, reference number, etc.).

Data Element Summary

| | Ref. Des. | Data Element | Name | Attributes |
|---|---|---|---|---|
| M | TED01 | 647 | **Application Error Condition Code**<br>Code indicating application error condition<br>ZZZ Mutually Defined | M ID 1/3 |
| | TED02 | 3 | **Free Form Message**<br>Free-form text<br>This element will be used only if the Acknowledgement Code is IR. This will be free form text. | O AN 1/60 |

| | |
|---|---|
| **Segment:** | **SE Transaction Set Trailer** |
| **Position:** | 090 |
| **Loop:** | |
| **Level:** | Detail |
| **Usage:** | Mandatory |
| **Max Use:** | 1 |
| **Purpose:** | To indicate the end of the transaction set and provide the count of the transmitted segments (including the beginning (ST) and ending (SE) segments) |
| **Syntax Notes:** | |
| **Semantic Notes:** | |
| **Comments:** | **1** SE is the last segment of each transaction set. |

Data Element Summary

| | Ref. Des. | Data Element | Name | Attributes |
|---|---|---|---|---|
| **M** | **SE01** | **96** | **Number of Included Segments**<br>Total number of segments included in a transaction set including ST and SE segments | **M N0 1/10** |
| **M** | **SE02** | **329** | **Transaction Set Control Number**<br>Identifying control number that must be unique within the transaction set functional group assigned by the originator for a transaction set | **M AN 4/9** |

ATTACHMENT C

850 Purchase Order

Functional Group ID=PO

Introduction:

This Standard contains the format and establishes the data contents of the Purchase Order Transaction Set (850) for use within the context of an Electronic Data Interchange (EDI) environment. The transaction set can be used to provide for customary and established business and industry practice relative to the placement of purchase orders for goods and services. This transaction set should not be used to convey purchase order changes or purchase order acknowledgment information.

Heading:

| | Pos. No. | Seg. ID | Name | Req. Des. | Max.Use | Loop Repeat | Notes and Comments |
|---|---|---|---|---|---|---|---|
| M | 010 | ST | Transaction Set Header | M | 1 | | |
| M | 020 | BEG | Beginning Segment for Purchase Order | M | 1 | | |
| | 040 | CUR | Currency | O | 1 | | |
| | 070 | TAX | Tax Reference | O | >1 | | |
| | 080 | FOB | F.O.B. Related Instructions | O | >1 | | |
| | 150 | DTM | Date/Time Reference | O | 10 | | |
| | 240 | TD5 | Carrier Details (Routing Sequence/Transit Time) | O | 12 | | |
| | 260 | TD4 | Carrier Details (Special Handling, or Hazardous Materials, or Both) | O | 5 | | |
| | | | LOOP ID - AMT | | | >1 | |
| | 287 | AMT | Monetary Amount | O | 1 | | |
| | 289 | REF | Reference Identification | O | >1 | | |
| | | | LOOP ID - N1 | | | 200 | |
| | 310 | N1 | Name | O | 1 | | |
| | 320 | N2 | Additional Name Information | O | 2 | | |
| | 330 | N3 | Address Information | O | 2 | | |
| | 340 | N4 | Geographic Location | O | >1 | | |
| | 360 | PER | Administrative Communications Contact | O | >1 | | |
| | | | LOOP ID - SPI | | | >1 | |
| | 450 | SPI | Specification Identifier | O | 1 | | |
| | 460 | REF | Reference Identification | O | 5 | | |
| | 470 | DTM | Date/Time Reference | O | 5 | | |
| | 480 | MSG | Message Text | O | 50 | | |

Detail:

| | Pos. No. | Seg. ID | Name | Req. Des. | Max.Use | Loop Repeat | Notes and Comments |
|---|---|---|---|---|---|---|---|
| | | | LOOP ID - PO1 | | | 100000 | |
| M | 010 | PO1 | Baseline Item Data | M | 1 | | n1 |
| | | | LOOP ID - SLN | | | 1000 | |
| | 470 | SLN | Subline Item Detail | O | 1 | | |
| | 490 | PID | Product/Item Description | O | 1000 | | |
| | 500 | PO3 | Additional Item Detail | O | 104 | | |
| | | | LOOP ID - AMT | | | >1 | |
| | 600 | AMT | Monetary Amount | O | 1 | | |
| | 610 | REF | Reference Identification | O | 1 | | |

Summary:

| | Pos. No. | Seg. ID | Name | Req. Des. | Max.Use | Loop Repeat | Notes and Comments |
|---|---|---|---|---|---|---|---|
| | | | LOOP ID - CTT | | | 1 | |
| | 010 | CTT | Transaction Totals | O | 1 | | n2 |
| | 020 | AMT | Monetary Amount | O | 1 | | n3 |
| M | 030 | SE | Transaction Set Trailer | M | 1 | | |

Transaction Set Notes

1. PO102 is required.
2. The number of line items (CTT01) is the accumulation of the number of PO1 segments. If used, hash total (CTT02) is the sum of the value of quantities ordered (PO102) for each PO1 segment.
3. If AMT is used in the summary area, then AMT01 will = TT and AMT02 will indicate total transaction amount as calculated by the sender.

Segment: ST Transaction Set Header
Position: 010
Loop:
Level: Heading
Usage: Mandatory
Max Use: 1
Purpose: To indicate the start of a transaction set and to assign a control number
Syntax Notes:
Semantic Notes: 1 The transaction set identifier (ST01) is used by the translation routines of the interchange partners to select the appropriate transaction set definition (e.g., 810 selects the Invoice Transaction Set).
Comments:

Data Element Summary

Ref. Data

| | Des. | Element | Name | Attributes |
|---|---|---|---|---|
| M | ST01 | 143 | **Transaction Set Identifier Code**<br>Code uniquely identifying a Transaction Set | M ID 3/3 |
| M | ST02 | 329 | **Transaction Set Control Number**<br>Identifying control number that must be unique within the transaction set functional group assigned by the originator for a transaction set | M AN 4/9 |

Segment: BEG Beginning Segment for Purchase Order
Position: 020
Loop:
Level: Heading
Usage: Mandatory
Max Use: 1
Purpose: To indicate the beginning of the Purchase Order Transaction Set and transmit identifying numbers and dates
Syntax Notes:
Semantic Notes: 1 BEG05 is the date assigned by the purchaser to purchase order.
Comments:

Data Element Summary

| | Ref. Des. | Data Element | Name | Attributes |
|---|---|---|---|---|
| M | BEG01 | 353 | **Transaction Set Purpose Code**<br>Code identifying purpose of transaction set<br>00 Original | M ID 2/2 |
| M | BEG02 | 92 | **Purchase Order Type Code**<br>Code specifying the type of Purchase Order<br>KN Purchase Order<br>Procurement instrument within the small purchasing threshold<br>LS Lease | M ID 2/2 |
| M | BEG03 | 324 | **Purchase Order Number**<br>Identifying number for Purchase Order assigned by the orderer/purchaser | M AN 1/22 |
| | BEG04 | 328 | **Release Number**<br>Number identifying a release against a Purchase Order previously placed by the parties involved in the transaction | O AN 1/30 |
| M | BEG05 | 373 | **Date**<br>Date expressed as CCYYMMDD | M DT 8/8 |

Segment: CUR Currency
Position: 040
Loop:
Level: Heading
Usage: Optional
Max Use: 1
Purpose: To specify the currency (dollars, pounds, francs, etc.) used in a transaction

Syntax Notes:

1 If CUR08 is present, then CUR07 is required.
2 If CUR09 is present, then CUR07 is required.
3 If CUR10 is present, then at least one of CUR11 or CUR12 is required.
4 If CUR11 is present, then CUR10 is required.
5 If CUR12 is present, then CUR10 is required.
6 If CUR13 is present, then at least one of CUR14 or CUR15 is required.
7 If CUR14 is present, then CUR13 is required.
8 If CUR15 is present, then CUR13 is required.
9 If CUR16 is present, then at least one of CUR17 or CUR18 is required.
10 If CUR17 is present, then CUR16 is required.
11 If CUR18 is present, then CUR16 is required.
12 If CUR19 is present, then at least one of CUR20 or CUR21 is required.
13 If CUR20 is present, then CUR19 is required.
14 If CUR21 is present, then CUR19 is required.

Semantic Notes:

Comments:

1 See Figures Appendix for examples detailing the use of the CUR segment.

Notes:

Two Currency Codes will be used if currency is to be exchanged.
CUR02 is the TO CURRENCY
CUR05 is the FROM CURRENCY

Data Element Summary

| | Ref. Des. | Data Element | Name | Attributes |
|---|---|---|---|---|
| M | CUR01 | 98 | **Entity Identifier Code**<br>Code identifying an organizational entity, a physical location, property or an individual<br>PR Payer | M ID 2/3 |
| M | CUR02 | 100 | **Currency Code**<br>Code (Standard ISO) for country in whose currency the charges are specified<br>If currency is to be exchanged, this element is the TO CURRENCY.<br><br>USD - United States Dollars<br>CAD - Canadian Dollars (future) | M ID 3/3 |
| | CUR03 | 280 | **Exchange Rate**<br>Value to be used as a multiplier conversion factor to convert monetary value from one currency to another | O R 4/10 |
| | CUR04 | 98 | **Entity Identifier Code**<br>Code identifying an organizational entity, a physical location, property or an individual<br>CT Country of Origin | O ID 2/3 |
| | CUR05 | 100 | **Currency Code**<br>Code (Standard ISO) for country in whose currency the charges are specified<br>If currency is to be exchanged, this element is the from currency. | O ID 3/3 |

Segment: TAX Tax Reference
Position: 070
Loop:
Level: Heading
Usage: Optional
Max Use: >1
Purpose: To provide data required for proper notification/determination of applicable taxes applying to the transaction or business described in the transaction
Syntax Notes:
1 At least one of TAX01 or TAX03 is required.
2 If either TAX02 or TAX03 is present, then the other is required.
3 If either TAX04 or TAX05 is present, then the other is required.
4 If either TAX06 or TAX07 is present, then the other is required.
5 If either TAX08 or TAX09 is present, then the other is required.
6 If either TAX10 or TAX11 is present, then the other is required.

Semantic Notes:
Comments:
1 Tax ID number is, in many instances, referred to as a Tax Exemption Number. The paired (combined) use of data elements 309 and 310 provides for the designation of five taxing jurisdictions.

2 TAX01 is required if tax exemption is being claimed.

Notes: Use only for Tax Exempt Organizations.

Data Element Summary

| Ref. Des. | Data Element | Name | Attributes |
|---|---|---|---|
| **TAX01** | **325** | **Tax Identification Number**<br>Number assigned to a purchaser (buyer, orderer) by a taxing jurisdiction (state, county, etc.); often called a tax exemption number or certificate number<br>This is used to show Tax Exempt Number. | **X AN 1/20** |

Segment: FOB F.O.B. Related Instructions
Position: 080
Loop:
Level: Heading
Usage: Optional
Max Use: >1
Purpose: To specify transportation instructions relating to shipment
Syntax Notes:
1 If FOB03 is present, then FOB02 is required.
2 If FOB04 is present, then FOB05 is required.
3 If FOB07 is present, then FOB06 is required.
4 If FOB08 is present, then FOB09 is required.

Semantic Notes:
1 FOB01 indicates which party will pay the carrier.
2 FOB02 is the code specifying transportation responsibility location.
3 FOB06 is the code specifying the title passage location.
4 FOB08 is the code specifying the point at which the risk of loss transfers. This may be different than the location specified in FOB02/FOB03 and FOB06/FOB07.

Comments:

Data Element Summary

| | Ref. Des. | Data Element | Name | Attributes |
|---|---|---|---|---|
| **M** | **FOB01** | **146** | **Shipment Method of Payment**<br>Code identifying payment terms for transportation charges | **M ID 2/2** |
| | | | BP — Paid by Buyer<br>The buyer agrees to the transportation payment term requiring the buyer to pay transportation charges to a specified location (origin or destination location) | |
| | | | PC — Prepaid but Charged to Customer | |

Segment: DTM Date/Time Reference
Position: 150
Loop:
Level: Heading
Usage: Optional
Max Use: 10
Purpose: To specify pertinent dates and times
Syntax Notes:
1 At least one of DTM02 DTM03 or DTM05 is required.
2 If DTM04 is present, then DTM03 is required.
3 If either DTM05 or DTM06 is present, then the other is required.
Semantic Notes:
Comments:
Notes: This segment will occur twice. The first occurance is the Purchase Order Date.
The second occurance is the Planned Ship Date.

Data Element Summary

| | Ref. Des. | Data Element | Name | Attributes |
|---|---|---|---|---|
| M | DTM01 | 374 | **Date/Time Qualifier** | M ID 3/3 |
| | | | Code specifying type of date or time, or both date and time<br>009 Process<br>080 Scheduled for Shipment (After and Including)<br>Planned Ship Date | |
| | DTM02 | 373 | **Date** | X DT 8/8 |
| | | | Date expressed as CCYYMMDD | |
| | DTM03 | 337 | **Time** | X TM 4/8 |
| | | | Time expressed in 24-hour clock time as follows: HHMM, or HHMMSS, or HHMMSSD, or HHMMSSDD, where H = hours (00-23), M = minutes (00-59), S = integer seconds (00-59) and DD = decimal seconds; decimal seconds are expressed as follows: D = tenths (0-9) and DD = hundredths (00-99) | |
| | DTM04 | 623 | **Time Code** | O ID 2/2 |
| | | | Code identifying the time. In accordance with International Standards Organization standard 8601, time can be specified by a + or - and an indication in hours in relation to Universal Time Coordinate (UTC) time; since + is a restricted character, + and - are substituted by P and M in the codes that follow<br>CS Central Standard Time<br>ES Eastern Standard Time | |

Segment: TD5 Carrier Details (Routing Sequence/Transit Time)
Position: 240
Loop:
Level: Heading
Usage: Optional
Max Use: 12
Purpose: To specify the carrier and sequence of routing and provide transit time information
Syntax Notes:
1. At least one of TD502 TD504 TD505 TD506 or TD512 is required.
2. If TD502 is present, then TD503 is required.
3. If TD507 is present, then TD508 is required.
4. If TD510 is present, then TD511 is required.
5. If TD513 is present, then TD512 is required.
6. If TD514 is present, then TD513 is required.
7. If TD515 is present, then TD512 is required.

Semantic Notes:
1. TD515 is the country where the service is to be performed.

Comments:
1. When specifying a routing sequence to be used for the shipment movement in lieu of specifying each carrier within the movement, use TD502 to identify the party responsible for defining the routing sequence, and use TD503 to identify the actual routing sequence, specified by the party identified in TD502.

Data Element Summary

| Ref. Des. | Data Element | Name | Attributes |
|---|---|---|---|
| **TD501** | **133** | **Routing Sequence Code** | **O ID 1/2** |
| | | Code describing the relationship of a carrier to a specific shipment movement | |
| | | Z    Mutually Defined | |
| | | Preferred Carrier | |
| **TD502** | **66** | **Identification Code Qualifier** | **X ID 1/2** |
| | | Code designating the system/method of code structure used for Identification Code (67) | |
| | | 2    Standard Carrier Alpha Code (SCAC) | |
| **TD503** | **67** | **Identification Code** | **X AN 2/80** |
| | | Code identifying a party or other code | |
| | | Carrier SCAC code | |
| **TD504** | **91** | **Transportation Method/Type Code** | **X ID 1/2** |
| | | Code specifying the method or type of transportation for the shipment | |
| **TD505** | **387** | **Routing** | **X AN 1/35** |
| | | Free-form description of the routing or requested routing for shipment, or the originating carrier's identity | |
| **TD506** | **368** | **Shipment/Order Status Code** | **X ID 2/2** |
| | | Code indicating the status of an order or shipment or the disposition of any difference between the quantity ordered and the quantity shipped for a line item or transaction | |
| **TD507** | **309** | **Location Qualifier** | **O ID 1/2** |

| | | | |
|---|---|---|---|
| | | Code identifying type of location | |
| **TD512** | **284** | **Service Level Code**<br>Code indicating the level of transportation service or the billing service offered by the transportation carrier<br>If no code is used, then the default method of shipping will be per contract.<br>D1 Delivery Scheduled Next Day by Cartage Agent<br>D2 Delivery scheduled second day by cartage agent<br>D3 Delivery scheduled third day by cartage agent<br>ON Overnight | **X ID 2/2** |

Segment: TD4 Carrier Details (Special Handling, or Hazardous Materials, or Both)

Position: 260

Loop:

Level: Heading

Usage: Optional

Max Use: 5

Purpose: To specify transportation special handling requirements, or hazardous materials information, or both

Syntax Notes:
1. At least one of TD401 TD402 or TD404 is required.
2. If TD402 is present, then TD403 is required.

Semantic Notes:
1. TD405 identifies if a Material Safety Data Sheet (MSDS) exists for this product. A "Y" indicates an MSDS exists for this product; an "N" indicates an MSDS does not exist for this product.

Comments:

Notes: This segment only used to specify Expedited Shipping Planned.

Data Element Summary

| Ref. Des. | Data Element | Name | Attributes |
|---|---|---|---|
| **TD401** | **152** | **Special Handling Code**<br>Code specifying special transportation handling instructions<br>EP Expedite | **X ID 2/3** |
| **TD402** | **208** | **Hazardous Material Code Qualifier**<br>Code which qualifies the Hazardous Material Class Code (209) | **X ID 1/1** |
| **TD403** | **209** | **Hazardous Material Class Code**<br>Code specifying the kind of hazard for a material | **X AN 1/4** |
| **TD404** | **352** | **Description**<br>A free-form description to clarify the related data elements and their content | **X AN 1/80** |
| **TD405** | **1073** | **Yes/No Condition or Response Code**<br>Code indicating a Yes or No condition or response | **O ID 1/1** |

Segment: AMT Monetary Amount
Position: 287
Loop: AMT Optional
Level: Heading
Usage: Optional
Max Use: 1
Purpose: To indicate the total monetary amount
Syntax Notes:
Semantic Notes:
Comments:

Data Element Summary

| | Ref. Des. | Data Element | Name | Attributes |
|---|---|---|---|---|
| M | AMT01 | 522 | **Amount Qualifier Code**<br>Code to qualify amount<br>TZ Transportation Cost Total | M ID 1/3 |
| M | AMT02 | 782 | **Monetary Amount**<br>Monetary amount<br>Shipping Charge - will be zero if using preferred carrier shipping. | M R 1/18 |

Segment: REF Reference Identification
Position: 289
Loop: AMT Optional
Level: Heading
Usage: Optional
Max Use: >1
Purpose: To specify identifying information
Syntax Notes:
1 At least one of REF02 or REF03 is required.
2 If either C04003 or C04004 is present, then the other is required.
3 If either C04005 or C04006 is present, then the other is required.
Semantic Notes:
1 REF04 contains data relating to the value cited in REF02.
Comments:

Data Element Summary

| | Ref. Des. | Data Element | Name | Attributes |
|---|---|---|---|---|
| M | REF01 | 128 | **Reference Identification Qualifier**<br>Code qualifying the Reference Identification<br>11 Account Number<br>Number identifies a telecommunications industry account | M ID 2/3 |
| | REF02 | 127 | **Reference Identification**<br>Reference information as defined for a particular Transaction Set or as specified by the Reference Identification Qualifier<br>This is the Shipping Preferred Account Number. | X AN 1/30 |

| | | | | |
|---|---|---|---|---|
| | REF03 | 352 | **Description**<br>A free-form description to clarify the related data elements and their content<br>This may be used for the Carrier Name. | X AN 1/80 |

Segment: N1 Name
Position: 310
Loop: N1 Optional
Level: Heading
Usage: Optional
Max Use: 1
Purpose: To identify a party by type of organization, name, and code
Syntax Notes:
1. At least one of N102 or N103 is required.
2. If either N103 or N104 is present, then the other is required.

Semantic Notes:
Comments:
1. This segment, used alone, provides the most efficient method of providing organizational identification. To obtain this efficiency the "ID Code" (N104) must provide a key to the table maintained by the transaction processing party.
2. N105 and N106 further define the type of entity in N101.

Notes: If code is AO - This must be the exact name as shown on the credit card.

Data Element Summary

| | Ref. Des. | Data Element | Name | Attributes |
|---|---|---|---|---|
| M | N101 | 98 | **Entity Identifier Code**<br>Code identifying an organizational entity, a physical location, property or an individual<br>AO Account Of<br>This code is used for the Credit Card Holder's information.<br>BT Bill-to-Party<br>ST Ship To | M ID 2/3 |
| | N102 | 93 | **Name**<br>Free-form name | X AN 1/60 |

Segment: N2 Additional Name Information
Position: 320
Loop: N1 Optional
Level: Heading
Usage: Optional
Max Use: 2
Purpose: To specify additional names or those longer than 35 characters in length
Syntax Notes:
Semantic Notes:
Comments:

Data Element Summary

| | Ref. Des. | Data Element | Name | Attributes |
|---|---|---|---|---|
| M | N201 | 93 | **Name**<br>Free-form name<br>This is the contact name for the Ship To name. | M AN 1/60 |

Segment: N3 Address Information
Position: 330
Loop: N1 Optional
Level: Heading
Usage: Optional
Max Use: 2
Purpose: To specify the location of the named party
Syntax Notes:
Semantic Notes:
Comments:
Notes: 3 lines of Address max use

Data Element Summary

| | Ref. Des. | Data Element | Name | Attributes |
|---|---|---|---|---|
| M | N301 | 166 | **Address Information**<br>Address information | M AN 1/55 |
| | N302 | 166 | **Address Information**<br>Address information | O AN 1/55 |

Segment: N4 Geographic Location
Position: 340
Loop: N1 Optional
Level: Heading
Usage: Optional
Max Use: >1
Purpose: To specify the geographic place of the named party
Syntax Notes: 1 If N406 is present, then N405 is required.
Semantic Notes:
Comments:
1 A combination of either N401 through N404, or N405 and N406 may be adequate to specify a location.
2 N402 is required only if city name (N401) is in the U.S. or Canada.

Data Element Summary

| Ref. Des. | Data Element | Name | Attributes |
|---|---|---|---|
| N401 | 19 | **City Name**<br>Free-form text for city name | O AN 2/30 |
| N402 | 156 | **State or Province Code** | O ID 2/2 |

| | | | |
|---|---|---|---|
| | | Code (Standard State/Province) as defined by appropriate government agency | |
| N403 | 116 | **Postal Code** | **O ID 3/15** |
| | | Code defining international postal zone code excluding punctuation and blanks (zip code for United States) | |
| N404 | 26 | **Country Code** | **O ID 2/3** |
| | | Code identifying the country | |
| | | CN Canada | |
| | | US United States | |

Segment: PER Administrative Communications Contact
Position: 360
Loop: N1 Optional
Level: Heading
Usage: Optional
Max Use: >1
Purpose: To identify a person or office to whom administrative communications should be directed
Syntax Notes:
1 If either PER03 or PER04 is present, then the other is required.
2 If either PER05 or PER06 is present, then the other is required.
3 If either PER07 or PER08 is present, then the other is required.
Semantic Notes:
Comments:
Notes: This is used with the ST loop only.
End User Name

Data Element Summary

| | Ref. Des. | Data Element | Name | Attributes |
|---|---|---|---|---|
| M | **PER01** | **366** | **Contact Function Code** | **M ID 2/2** |
| | | | Code identifying the major duty or responsibility of the person or group named | |
| | | | AF Authorized Financial Contact | |
| | | | This is the Credit Card holder. | |
| | | | UR Ultimate Receiver | |
| | | | This is the End User. | |
| | **PER02** | **93** | **Name** | **O AN 1/60** |
| | | | Free-form name | |
| | | | End User | |
| | **PER03** | **365** | **Communication Number Qualifier** | **X ID 2/2** |
| | | | Code identifying the type of communication number | |
| | | | TE Telephone | |
| | **PER04** | **364** | **Communication Number** | **X AN 1/80** |
| | | | Complete communications number including country or area code when applicable | |
| | | | Telephone number including area code. | |

Segment: SPI Specification Identifier
Position: 450
Loop: SPI Optional
Level: Heading
Usage: Optional
Max Use: 1
Purpose: To provide a description of the included specification or technical data items
Syntax Notes: 1 If either SPI02 or SPI03 is present, then the other is required.
Semantic Notes:
Comments:
Notes: If Credit Card is used, then the SPI loop is required.

Data Element Summary

| | Ref. Des. | Data Element | Name | Attributes |
|---|---|---|---|---|
| M | SPI01 | 786 | **Security Level Code**<br>Code indicating the level of confidentiality assigned by the sender to the information following<br>02 Company Confidential | M ID 2/2 |
| | SPI02 | 128 | **Reference Identification Qualifier**<br>Code qualifying the Reference Identification<br>E4 Charge Card Number | X ID 2/3 |
| | SPI03 | 127 | **Reference Identification**<br>Reference information as defined for a particular Transaction Set or as specified by the Reference Identification Qualifier<br>Credit Card Number | X AN 1/30 |
| | SPI05 | 791 | **Entity Purpose**<br>The reason for the existence of the data item specified by the electronic data item independent of its presence in an EDI transaction<br>This element may contain the additional ID number present on the credit card, such as a non-embossed ID. | O AN 1/80 |

Segment: REF Reference Identification
Position: 460
Loop: SPI Optional
Level: Heading
Usage: Optional
Max Use: 5
Purpose: To specify identifying information
Syntax Notes: 1 At least one of REF02 or REF03 is required.
2 If either C04003 or C04004 is present, then the other is required.
3 If either C04005 or C04006 is present, then the other is required.
Semantic Notes: 1 REF04 contains data relating to the value cited in REF02.

Comments:

Notes: This segment may be used twice.
The first occurrence is used to tell which credit card is being used with code E4.
The second occurrence is used to provide an internal reference number with code CR.

Data Element Summary

| | Ref. Des. | Data Element | Name | Attributes |
|---|---|---|---|---|
| M | REF01 | 128 | **Reference Identification Qualifier**<br>Code qualifying the Reference Identification<br>CR Customer Reference Number<br>E4 Charge Card Number | M ID 2/3 |
| | REF03 | 352 | **Description**<br>A free-form description to clarify the related data elements and their content<br>This will provide the credit card type.<br>V - Visa<br>M - Mastercard<br>A - AMEX<br>D - Discover | X AN 1/80 |

Segment: DTM Date/Time Reference
Position: 470
Loop: SPI Optional
Level: Heading
Usage: Optional
Max Use: 5
Purpose: To specify pertinent dates and times
Syntax Notes:
1 At least one of DTM02 DTM03 or DTM05 is required.
2 If DTM04 is present, then DTM03 is required.
3 If either DTM05 or DTM06 is present, then the other is required.

Semantic Notes:
Comments:

Data Element Summary

| | Ref. Des. | Data Element | Name | Attributes |
|---|---|---|---|---|
| M | DTM01 | 374 | **Date/Time Qualifier**<br>Code specifying type of date or time, or both date and time<br>036 Expiration<br>Date coverage expires | M ID 3/3 |
| | DTM05 | 1250 | **Date Time Period Format Qualifier**<br>Code indicating the date format, time format, or date and time format<br>D6 Date Expressed in Format YYMMDD<br>D8 Date Expressed in Format CCYYMMDD | X ID 2/3 |

| | | | | |
|---|---|---|---|---|
| | | TQ | Date Expressed in Format MMYY | |
| DTM06 | 1251 | **Date Time Period** | | **X AN 1/35** |
| | | Expression of a date, a time, or range of dates, times or dates and times<br>TQ - MMYY<br>D6 - YYMMDD<br>D8 - CCYYMMDD | | |

Segment: MSG Message Text
Position: 480
Loop: SPI Optional
Level: Heading
Usage: Optional
Max Use: 50
Purpose: To provide a free-form format that allows the transmission of text information
Syntax Notes: 1 If MSG03 is present, then MSG02 is required.
Semantic Notes: 1 MSG03 is the number of lines to advance before printing.
Comments: 1 MSG02 is not related to the specific characteristics of a printer, but identifies top of page, advance a line, etc.
2 If MSG02 is "AA - Advance the specified number of lines before print" then MSG03 is required.
Notes: This segment is used for Credit Card description. It may be used up to 4 times. Each message may not be longer than 40 characters.

Data Element Summary

| | Ref. Des. | Data Element | Name | Attributes |
|---|---|---|---|---|
| M | MSG01 | 933 | **Free-Form Message Text**<br>Free-form message text<br>Up to 40 characters only | **M AN 1/264** |

Segment: PO1 Baseline Item Data
Position: 010
Loop: PO1 Mandatory
Level: Detail
Usage: Mandatory
Max Use: 1
Purpose: To specify basic and most frequently used line item data
Syntax Notes: 1 If PO103 is present, then PO102 is required.
2 If PO105 is present, then PO104 is required.
3 If either PO106 or PO107 is present, then the other is required.
4 If either PO108 or PO109 is present, then the other is required.
5 If either PO110 or PO111 is present, then the other is required.
6 If either PO112 or PO113 is present, then the other is required.
7 If either PO114 or PO115 is present, then the other is required.
8 If either PO116 or PO117 is present, then the other is required.
9 If either PO118 or PO119 is present, then the other is required.

10 If either PO120 or PO121 is present, then the other is required.
11 If either PO122 or PO123 is present, then the other is required.
12 If either PO124 or PO125 is present, then the other is required.

Semantic Notes:

Comments:
1 See the Data Element Dictionary for a complete list of IDs.
2 PO101 is the line item identification.
3 PO106 through PO125 provide for ten different product/service IDs per each item. For example: Case, Color, Drawing No., U.P.C. No., ISBN No., Model No., or SKU.

Data Element Summary

| Ref. Des. | Data Element | Name | Attributes | |
|---|---|---|---|---|
| **PO101** | **350** | **Assigned Identification**<br>Alphanumeric characters assigned for differentiation within a transaction set | **O** | **AN 1/20** |
| **PO102** | **330** | **Quantity Ordered**<br>Quantity ordered | **X** | **R 1/15** |
| **PO104** | **212** | **Unit Price**<br>Price per unit of product, service, commodity, etc. | **X** | **R 1/17** |
| **PO106** | **235** | **Product/Service ID Qualifier**<br>Code identifying the type/source of the descriptive number used in Product/Service ID (234)<br>SO System Identifier | **X** | **ID 2/2** |
| **PO107** | **234** | **Product/Service ID**<br>Identifying number for a product or service | **X** | **AN 1/48** |

Segment: SLN Subline Item Detail
Position: 470
Loop: SLN Optional
Level: Detail
Usage: Optional
Max Use: 1
Purpose: To specify product subline detail item data
Syntax Notes:
1 If either SLN04 or SLN05 is present, then the other is required.
2 If SLN07 is present, then SLN06 is required.
3 If SLN08 is present, then SLN06 is required.
4 If either SLN09 or SLN10 is present, then the other is required.
5 If either SLN11 or SLN12 is present, then the other is required.
6 If either SLN13 or SLN14 is present, then the other is required.
7 If either SLN15 or SLN16 is present, then the other is required.
8 If either SLN17 or SLN18 is present, then the other is required.
9 If either SLN19 or SLN20 is present, then the other is required.
10 If either SLN21 or SLN22 is present, then the other is required.
11 If either SLN23 or SLN24 is present, then the other is required.
12 If either SLN25 or SLN26 is present, then the other is required.
13 If either SLN27 or SLN28 is present, then the other is required.

Semantic Notes:
1 SLN01 is the identifying number for the subline item.

2 SLN02 is the identifying number for the subline level. The subline level is analogous to the level code used in a bill of materials.
3 SLN03 is the configuration code indicating the relationship of the subline item to the baseline item.
4 SLN08 is a code indicating the relationship of the price or amount to the associated segment.

Comments: 1 See the Data Element Dictionary for a complete list of IDs.
2 SLN01 is related to (but not necessarily equivalent to) the baseline item number. Example: 1.1 or 1A might be used as a subline number to relate to baseline number 1.
3 SLN09 through SLN28 provide for ten different product/service IDs for each item. For example: Case, Color, Drawing No., U.P.C. No., ISBN No., Model No., or SKU.

Notes: This subline item loop is used once for each option.

Data Element Summary

| | Ref. Des. | Data Element | Name | Attributes |
|---|---|---|---|---|
| M | SLN01 | 350 | **Assigned Identification**<br>Alphanumeric characters assigned for differentiation within a transaction set | M AN 1/20 |
| | SLN02 | 350 | **Assigned Identification**<br>Alphanumeric characters assigned for differentiation within a transaction set<br>This element will be as:<br>Option Indicator Values:<br>1 base-option = BASE<br>2 processor-option = PROC<br>3 memory-option = MEM<br>4 keyboard-option = KEYB<br>5 video-option = MONITOR<br>6 video-board-option = VIDB<br>7 video-memory-option = VIDM<br>8 hd-option = HD<br>9 ctl1-option = CNTRL<br>10 fd-option = FLPD<br>11 os-option = OS<br>12 point-option = MOUSE<br>13 nic-option = NIC<br>14 modem-option = MODEM<br>15 tbu-option = TAPEB<br>16 cdrom-option = CDROM<br>17 sound-option = SOUND<br>18 spkers-option = SPKERS<br>19 cache-option = CACHE<br>20 cable-option = CABLE<br>21 doc-dsk-option = DOCDSK<br>22 bundle-option = BUNDLE<br>23 hd-opt-option = HDOPT<br>24 ctl-opt-option = CNTRLO | O AN 1/20 |

| | | | | | |
|---|---|---|---|---|---|
| | | | 25 sw1-option = SW1<br>26 sw2-option = SW2<br>27 opt1-option = OPT1<br>28 opt2-option = OPT2<br>29 initsvc-option = INITSVC<br>30 ext-svc-option = EXTSVC<br>31 dirline-option = DIRLINE<br>32 svc1-option = SVC1<br>33 svc2-option = SVC2<br>34 svc3-option = SVC3<br>35 svc4-option = SVC4<br>36 misc1-option = MISC1<br>37 misc2-option = MISC2<br>38 misc3-option = MISC3<br>39 misc4-option = MISC4<br>40 misc5-option = MISC5<br>41 misc6-option = MISC6<br>42 misc7-option = MISC7<br>43 system-integration = SI<br>44 comments = COMMENT<br>45 dock-sol = CSTMSOL<br>46 customer-kit = CUSTKIT<br>47 Dellware = DELLWAR | | |
| **M** | **SLN03** | **662** | **Relationship Code**<br>Code indicating the relationship between entities | **M** | **ID 1/1** |
| | **SLN04** | **380** | **Quantity**<br>Numeric value of quantity | **X** | **R 1/15** |

Segment: PID Product/Item Description
Position: 490
Loop: SLN Optional
Level: Detail
Usage: Optional
Max Use: 1000
Purpose: To describe a product or process in coded or free-form format
Syntax Notes:
1 If PID04 is present, then PID03 is required.
2 At least one of PID04 or PID05 is required.
3 If PID07 is present, then PID03 is required.
4 If PID08 is present, then PID04 is required.
5 If PID09 is present, then PID05 is required.

Semantic Notes:
1 Use PID03 to indicate the organization that publishes the code list being referred to.
2 PID04 should be used for industry-specific product description codes.

3 PID08 describes the physical characteristics of the product identified in PID04. A "Y" indicates that the specified attribute applies to this item; an "N" indicates it does not apply. Any other value is indeterminate.

4 PID09 is used to identify the language being used in PID05.

Comments: 1 If PID01 equals "F", then PID05 is used. If PID01 equals "S", then PID04 is used. If PID01 equals "X", then both PID04 and PID05 are used.

2 Use PID06 when necessary to refer to the product surface or layer being described in the segment.

3 PID07 specifies the individual code list of the agency specified in PID03.

Data Element Summary

| | Ref. Des. | Data Element | Name | Attributes |
|---|---|---|---|---|
| M | **PID01** | **349** | **Item Description Type**<br>Code indicating the format of a description<br>F Free-form | **M ID 1/1** |
| | **PID05** | **352** | **Description**<br>A free-form description to clarify the related data elements and their content<br>Option Legend Code - max of 7 characters | **X AN 1/80** |

Segment: PO3 Additional Item Detail
Position: 500
Loop: SLN Optional
Level: Detail
Usage: Optional
Max Use: 104
Purpose: To specify additional item-related data involving variations in normal price/quantity structure
Syntax Notes: 1 If PO304 is present, then at least one of PO303 or PO305 is required.
Semantic Notes:
Comments: 1 Some examples of price/quantity variations are: price in different units from the PO1 segment, price changes by date, or price changes by quantity (break and level).

2 PO307 defines the unit of measure for PO306.

Data Element Summary

| | Ref. Des. | Data Element | Name | Attributes |
|---|---|---|---|---|
| M | **PO301** | **371** | **Change Reason Code**<br>Code specifying the reason for price or quantity change | **M ID 2/2** |
| | **PO302** | **373** | **Date**<br>Date expressed as CCYYMMDD | **O DT 8/8** |

| | Ref. Des. | Data Element | Name | Attributes |
|---|---|---|---|---|
| | PO303 | 236 | **Price Identifier Code**<br>Code identifying pricing specification | X ID 3/3 |
| | PO304 | 212 | **Unit Price**<br>Price per unit of product, service, commodity, etc. | O R 1/17 |
| | PO305 | 639 | **Basis of Unit Price Code**<br>Code identifying the type of unit price for an item | X ID 2/2 |
| M | PO306 | 380 | **Quantity**<br>Numeric value of quantity | M R 1/15 |
| M | PO307 | 355 | **Unit or Basis for Measurement Code**<br>Code specifying the units in which a value is being expressed, or manner in which a measurement has been taken | M ID 2/2 |
| | PO308 | 352 | **Description**<br>A free-form description to clarify the related data elements and their content | O AN 1/80 |

Segment: AMT Monetary Amount
Position: 600
Loop: AMT Optional
Level: Detail
Usage: Optional
Max Use: 1
Purpose: To indicate the total monetary amount
Syntax Notes:
Semantic Notes:
Comments:

Data Element Summary

| | Ref. Des. | Data Element | Name | Attributes |
|---|---|---|---|---|
| M | AMT01 | 522 | **Amount Qualifier Code**<br>Code to qualify amount<br>1 Line Item Total | M ID 1/3 |
| M | AMT02 | 782 | **Monetary Amount**<br>Monetary amount<br>Line Item total for system with options. | M R 1/18 |

Segment: REF Reference Identification
Position: 610
Loop: AMT Optional
Level: Detail
Usage: Optional
Max Use: 1
Purpose: To specify identifying information
Syntax Notes:
1 At least one of REF02 or REF03 is required.
2 If either C04003 or C04004 is present, then the other is required.
3 If either C04005 or C04006 is present, then the other is required.
Semantic Notes:
1 REF04 contains data relating to the value cited in REF02.

Comments:

Data Element Summary

| | Ref. Des. | Data Element | Name | Attributes |
|---|---|---|---|---|
| M | REF01 | 128 | **Reference Identification Qualifier**<br>Code qualifying the Reference Identification<br>ZZ Mutually Defined | M ID 2/3 |
| | REF02 | 127 | **Reference Identification**<br>Reference information as defined for a particular Transaction Set or as specified by the Reference Identification Qualifier<br>This will contain the total number of items for this line item. | X AN 1/30 |

Segment: CTT Transaction Totals
Position: 010
Loop: CTT Optional
Level: Summary
Usage: Optional
Max Use: 1
Purpose: To transmit a hash total for a specific element in the transaction set
Syntax Notes:
1 If either CTT03 or CTT04 is present, then the other is required.
2 If either CTT05 or CTT06 is present, then the other is required.
Semantic Notes:
Comments:
1 This segment is intended to provide hash totals to validate transaction completeness and correctness.

Data Element Summary

| | Ref. Des. | Data Element | Name | Attributes |
|---|---|---|---|---|
| M | CTT01 | 354 | **Number of Line Items**<br>Total number of line items in the transaction set | M N0 1/6 |
| | CTT02 | 347 | **Hash Total**<br>Sum of values of the specified data element. All values in the data element will be summed without regard to decimal points (explicit or implicit) or signs. Truncation will occur on the left most digits if the sum is greater than the maximum size of the hash total of the data element. Example: -.0018 First occurrence of value being hashed. .18 Second occurrence of value being hashed. 1.8 Third occurrence of value being hashed. 18.01 Fourth occurrence of value being hashed. --------- 1855 Hash total prior to truncation. 855 Hash total after truncation to three-digit field. | O R 1/10 |
| | CTT03 | 81 | **Weight**<br>Numeric value of weight | X R 1/10 |
| | CTT04 | 355 | **Unit or Basis for Measurement Code**<br>Code specifying the units in which a value is being expressed, or manner in which a measurement has been taken | X ID 2/2 |
| | CTT05 | 183 | **Volume**<br>Value of volumetric measure | X R 1/8 |

| | | | | |
|---|---|---|---|---|
| CTT06 | 355 | **Unit or Basis for Measurement Code**<br>Code specifying the units in which a value is being expressed, or manner in which a measurement has been taken | X | ID 2/2 |
| CTT07 | 352 | **Description**<br>A free-form description to clarify the related data elements and their content | O | AN 1/80 |

Segment: AMT Monetary Amount
Position: 020
Loop: CTT Optional
Level: Summary
Usage: Optional
Max Use: 1
Purpose: To indicate the total monetary amount
Syntax Notes:
Semantic Notes:
Comments:

Data Element Summary

| | Ref. Des. | Data Element | Name | Attributes |
|---|---|---|---|---|
| M | AMT01 | 522 | **Amount Qualifier Code**<br>Code to qualify amount<br>UI Total Costs | M ID 1/3 |
| M | AMT02 | 782 | **Monetary Amount**<br>Monetary amount<br>Total Purchase Order Amount | M R 1/18 |

Segment: SE Transaction Set Trailer
Position: 030
Loop:
Level: Summary
Usage: Mandatory
Max Use: 1
Purpose: To indicate the end of the transaction set and provide the count of the transmitted segments (including the beginning (ST) and ending (SE) segments)
Syntax Notes:
Semantic Notes:
Comments: 1 SE is the last segment of each transaction set.

Data Element Summary

| | Ref. Des. | Data Element | Name | Attributes |
|---|---|---|---|---|
| M | SE01 | 96 | **Number of Included Segments**<br>Total number of segments included in a transaction set including ST and SE segments | M N0 1/10 |
| M | SE02 | 329 | **Transaction Set Control Number**<br>Identifying control number that must be unique within the transaction set functional group assigned by the originator for a transaction set | M AN 4/9 |

ATTACHMENT D

855 Purchase Order Acknowledgment

Functional Group ID=PR

Introduction:

This Standard contains the format and establishes the data contents of the Purchase Order Acknowledgment Transaction Set (855) for use within the context of an Electronic Data Interchange (EDI) environment. The transaction set can be used to provide for customary and established business and industry practice relative to a seller's acknowledgment of a buyer's purchase order. This transaction set can also be used as notification of a vendor generated order. This usage advises a buyer that a vendor has or will ship merchandise as prearranged in their partnership.

Heading:

| | Pos. No. | Seg. ID | Name | Req. Des. | Max.Use | Loop Repeat | Notes and Comments |
|---|---|---|---|---|---|---|---|
| M | 010 | ST | Transaction Set Header | M | 1 | | |
| M | 020 | BAK | Beginning Segment for Purchase Order Acknowledgment | M | 1 | | |
| | 150 | DTM | Date/Time Reference | O | 10 | | |

Detail:

| Pos. No. | Seg. ID | Name | Req. Des. | Max.Use | Loop Repeat | Notes and Comments |
|---|---|---|---|---|---|---|
| | | LOOP ID - PO1 | | | 100000 | |
| 010 | PO1 | Baseline Item Data | O | 1 | | n1 |
| | | LOOP ID - ACK | | | 104 | |
| 270 | ACK | Line Item Acknowledgment | O | 1 | | |
| | | LOOP ID - N9 | | | 1000 | |
| 350 | N9 | Reference Identification | O | 1 | | |
| 355 | DTM | Date/Time Reference | O | >1 | | |
| | | LOOP ID - SLN | | | 1000 | |
| 490 | SLN | Subline Item Detail | O | 1 | | |
| 530 | ACK | Line Item Acknowledgment | O | 104 | | |

Summary:

| | Pos. No. | Seg. ID | Name | Req. Des. | Max.Use | Loop Repeat | Notes and Comments |
|---|---|---|---|---|---|---|---|
| | | | LOOP ID - CTT | | | 1 | |
| | 010 | CTT | Transaction Totals | O | 1 | | n2 |
| | 020 | AMT | Monetary Amount | O | 1 | | n3 |
| M | 030 | SE | Transaction Set Trailer | M | 1 | | |

Transaction Set Notes

1. PO102 is required.
2. The number of line items (CTT01) is the accumulation of the number of PO1 segments. If used, hash total (CTT02) is the sum of the value of quantities ordered (PO102) for each PO1 segment.
3. If AMT is used in the summary area, then AMT01 will = TT and AMT02 will indicate total transaction amount as calculated by the sender.

Segment: ST Transaction Set Header
Position: 010
Loop:
Level: Heading
Usage: Mandatory
Max Use: 1
Purpose: To indicate the start of a transaction set and to assign a control number
Syntax Notes:
Semantic Notes: 1 The transaction set identifier (ST01) is used by the translation routines of the interchange partners to select the appropriate transaction set definition (e.g., 810 selects the Invoice Transaction Set).
Comments:

Data Element Summary

| | Ref. Des. | Data Element | Name | Attributes |
|---|---|---|---|---|
| M | ST01 | 143 | **Transaction Set Identifier Code**<br>Code uniquely identifying a Transaction Set | M ID 3/3 |
| M | ST02 | 329 | **Transaction Set Control Number**<br>Identifying control number that must be unique within the transaction set functional group assigned by the originator for a transaction set | M AN 4/9 |

Segment: BAK Beginning Segment for Purchase Order Acknowledgment
Position: 020
Loop:
Level: Heading
Usage: Mandatory
Max Use: 1
Purpose: To indicate the beginning of the Purchase Order Acknowledgment Transaction Set and transmit identifying numbers and dates
Syntax Notes:
Semantic Notes:
1 BAK04 is the date assigned by the purchaser to purchase order.
2 BAK08 is the seller's order number.
3 BAK09 is the date assigned by the sender to the acknowledgment.

Comments:

Data Element Summary

| | Ref. Des. | Data Element | Name | Attributes |
|---|---|---|---|---|
| M | BAK01 | 353 | **Transaction Set Purpose Code**<br>Code identifying purpose of transaction set<br>00 Original | M ID 2/2 |
| M | BAK02 | 587 | **Acknowledgment Type**<br>Code specifying the type of acknowledgment<br>AD Acknowledge - With Detail, No Change | M ID 2/2 |
| M | BAK03 | 324 | **Purchase Order Number**<br>Identifying number for Purchase Order assigned by the orderer/purchaser<br>Original Purchase Order Number from BEG.03 | M AN 1/22 |
| M | BAK04 | 373 | **Date**<br>Date expressed as CCYYMMDD<br>Original Purchase Order Date from the BEG.05 | M DT 8/8 |
| | BAK08 | 127 | **Reference Identification**<br>Reference information as defined for a particular Transaction Set or as specified by the Reference Identification Qualifier<br>Order File Reference ID | O AN 1/30 |

Segment: DTM Date/Time Reference
Position: 150
Loop:
Level: Heading
Usage: Optional
Max Use: 10
Purpose: To specify pertinent dates and times
Syntax Notes:
1 At least one of DTM02 DTM03 or DTM05 is required.
2 If DTM04 is present, then DTM03 is required.
3 If either DTM05 or DTM06 is present, then the other is required.

Semantic Notes:
Comments:
Notes: Order Acknowledgement Date and Time

Data Element Summary

| | Ref. Des. | Data Element | Name | Attributes |
|---|---|---|---|---|
| M | DTM01 | 374 | **Date/Time Qualifier**<br>Code specifying type of date or time, or both date and time<br>ACK Acknowledgment | M ID 3/3 |
| | DTM02 | 373 | **Date**<br>Date expressed as CCYYMMDD<br>Order Acknowledgement Date | X DT 8/8 |
| | DTM03 | 337 | **Time**<br>Time expressed in 24-hour clock time as follows: HHMM, or HHMMSS, or HHMMSSD, or HHMMSSDD, where H = hours | X TM 4/8 |

(00-23), M = minutes (00-59), S = integer seconds (00-59) and DD = decimal seconds; decimal seconds are expressed as follows: D = tenths (0-9) and DD = hundredths (00-99)

Order Acknowledgement Time

| | | | |
|---|---|---|---|
| DTM04 | 623 | **Time Code** | **O ID 2/2** |

Code identifying the time. In accordance with International Standards Organization standard 8601, time can be specified by a + or - and an indication in hours in relation to Universal Time Coordinate (UTC) time; since + is a restricted character, + and - are substituted by P and M in the codes that follow Order Acknowledgement Time Code ES Eastern Standard Time

Segment: PO1 Baseline Item Data

Position: 010

Loop: PO1 Optional

Level: Detail

Usage: Optional

Max Use: 1

Purpose: To specify basic and most frequently used line item data

Syntax Notes:

1. If PO103 is present, then PO102 is required.
2. If PO105 is present, then PO104 is required.
3. If either PO106 or PO107 is present, then the other is required.
4. If either PO108 or PO109 is present, then the other is required.
5. If either PO110 or PO111 is present, then the other is required.
6. If either PO112 or PO113 is present, then the other is required.
7. If either PO114 or PO115 is present, then the other is required.
8. If either PO116 or PO117 is present, then the other is required.
9. If either PO118 or PO119 is present, then the other is required.
10. If either PO120 or PO121 is present, then the other is required.
11. If either PO122 or PO123 is present, then the other is required.
12. If either PO124 or PO125 is present, then the other is required.

Semantic Notes:

Comments:

1. See the Data Element Dictionary for a complete list of IDs.
2. PO101 is the line item identification.
3. PO106 through PO125 provide for ten different product/service IDs per each item. For example: Case, Color, Drawing No., U.P.C. No., ISBN No., Model No., or SKU.

Data Element Summary

| Ref. Des. | Data Element | Name | Attributes |
|---|---|---|---|
| **PO101** | **350** | **Assigned Identification**<br>Alphanumeric characters assigned for differentiation within a transaction set | **O AN 1/20** |
| **PO102** | **330** | **Quantity Ordered**<br>Quantity ordered | **X R 1/15** |
| **PO104** | **212** | **Unit Price**<br>Price per unit of product, service, commodity, etc. | **X R 1/17** |

| | | | |
|---|---|---|---|
| PO106 | 235 | **Product/Service ID Qualifier**<br>Code identifying the type/source of the descriptive number used in Product/Service ID (234)<br>SO System Identifier | X ID 2/2 |
| PO107 | 234 | **Product/Service ID**<br>Identifying number for a product or service<br>System ID. | X AN 1/48 |

Segment: ACK Line Item Acknowledgment
Position: 270
Loop: ACK Optional
Level: Detail
Usage: Optional
Max Use: 1
Purpose: To acknowledge the ordered quantities and specify the ready date for a specific line item
Syntax Notes:
1 If either ACK02 or ACK03 is present, then the other is required.
2 If ACK04 is present, then ACK05 is required.
3 If either ACK07 or ACK08 is present, then the other is required.
4 If either ACK09 or ACK10 is present, then the other is required.
5 If either ACK11 or ACK12 is present, then the other is required.
6 If either ACK13 or ACK14 is present, then the other is required.
7 If either ACK15 or ACK16 is present, then the other is required.
8 If either ACK17 or ACK18 is present, then the other is required.
9 If either ACK19 or ACK20 is present, then the other is required.
10 If either ACK21 or ACK22 is present, then the other is required.
11 If either ACK23 or ACK24 is present, then the other is required.
12 If either ACK25 or ACK26 is present, then the other is required.
13 If either ACK27 or ACK28 is present, then the other is required.
14 If ACK28 is present, then both ACK27 and ACK29 are required.
Semantic Notes:
1 ACK29 Industry Reason Code may be used to identify the item status. In addition, it may be used in conjunction with ACK01 to further clarify the status.
Comments:

Data Element Summary

| | Ref. Des. | Data Element | Name | Attributes |
|---|---|---|---|---|
| M | ACK01 | 668 | **Line Item Status Code**<br>Code specifying the action taken by the seller on a line item requested by the buyer<br>IA Item Accepted<br>IR Item Rejected | M ID 2/2 |
| | ACK02 | 380 | **Quantity**<br>Numeric value of quantity<br>Line item error counter if status is IR. | X R 1/15 |

| | |
|---|---|
| **Segment:** | **N9 Reference Identification** |
| **Position:** | 350 |
| **Loop:** | N9 Optional |
| **Level:** | Detail |
| **Usage:** | Optional |
| **Max Use:** | 1 |
| **Purpose:** | To transmit identifying information as specified by the Reference Identification Qualifier |
| **Syntax Notes:** | **1** At least one of N902 or N903 is required. |
| | **2** If N906 is present, then N905 is required. |
| | **3** If either C04003 or C04004 is present, then the other is required. |
| | **4** If either C04005 or C04006 is present, then the other is required. |
| **Semantic Notes:** | **1** N906 reflects the time zone which the time reflects. |
| | **2** N907 contains data relating to the value cited in N902. |
| **Comments:** | |
| **Notes:** | This loop will occur at the end of all acknowledgements and provide all the Dell Order Numbers and the ship dates. |

Data Element Summary

| | Ref. Des. | Data Element | Name | Attributes |
|---|---|---|---|---|
| M | N901 | 128 | **Reference Identification Qualifier**<br>Code qualifying the Reference Identification<br>OQ Order Number<br>Qualifies a code that identifies the authorizing documentation for a household goods | M ID 2/3 |
| | N902 | 127 | **Reference Identification**<br>Reference information as defined for a particular Transaction Set or as specified by the Reference Identification Qualifier<br>Dell Order Number | X AN 1/30 |

| | |
|---|---|
| **Segment:** | **DTM Date/Time Reference** |
| **Position:** | 355 |
| **Loop:** | N9 Optional |
| **Level:** | Detail |
| **Usage:** | Optional |
| **Max Use:** | >1 |
| **Purpose:** | To specify pertinent dates and times |
| **Syntax Notes:** | **1** At least one of DTM02 DTM03 or DTM05 is required. |
| | **2** If DTM04 is present, then DTM03 is required. |
| | **3** If either DTM05 or DTM06 is present, then the other is required. |
| **Semantic Notes:** | |
| **Comments:** | |

Data Element Summary

| | Ref. Des. | Data Element | Name | Attributes |
|---|---|---|---|---|
| M | DTM01 | 374 | **Date/Time Qualifier**<br>Code specifying type of date or time, or both date and time<br>011 Shipped | M ID 3/3 |
| | DTM02 | 373 | **Date**<br>Date expressed as CCYYMMDD<br>Ship Date | X DT 8/8 |

Segment: SLN Subline Item Detail
Position: 490
Loop: SLN Optional
Level: Detail
Usage: Optional
Max Use: 1
Purpose: To specify product subline detail item data
Syntax Notes:
1 If either SLN04 or SLN05 is present, then the other is required.
2 If SLN07 is present, then SLN06 is required.
3 If SLN08 is present, then SLN06 is required.
4 If either SLN09 or SLN10 is present, then the other is required.
5 If either SLN11 or SLN12 is present, then the other is required.
6 If either SLN13 or SLN14 is present, then the other is required.
7 If either SLN15 or SLN16 is present, then the other is required.
8 If either SLN17 or SLN18 is present, then the other is required.
9 If either SLN19 or SLN20 is present, then the other is required.
10 If either SLN21 or SLN22 is present, then the other is required.
11 If either SLN23 or SLN24 is present, then the other is required.
12 If either SLN25 or SLN26 is present, then the other is required.
13 If either SLN27 or SLN28 is present, then the other is required.

Semantic Notes:
1 SLN01 is the identifying number for the subline item.
2 SLN02 is the identifying number for the subline level. The subline level is analogous to the level code used in a bill of materials.
3 SLN03 is the configuration code indicating the relationship of the subline item to the baseline item.
4 SLN08 is a code indicating the relationship of the price or amount to the associated segment.

Comments:
1 See the Data Element Dictionary for a complete list of IDs.
2 SLN01 is related to (but not necessarily equivalent to) the baseline item number. Example: 1.1 or 1A might be used as a subline number to relate to baseline number 1.
3 SLN09 through SLN28 provide for ten different product/service IDs for each item. For example: Case, Color, Drawing No., U.P.C. No., ISBN No., Model No., or SKU.

Data Element Summary

| | Ref. Des. | Data Element | Name | Attributes |
|---|---|---|---|---|
| M | SLN01 | 350 | **Assigned Identification**<br>Alphanumeric characters assigned for differentiation within a transaction set | M AN 1/20 |
| M | SLN03 | 662 | **Relationship Code**<br>Code indicating the relationship between entities<br>O Information Only<br>Charges which relate to but may not be included in or added to the unit price of the SLN. (i.e., compute WATS calculation based upon usage amounts) | M ID 1/1 |
| | SLN04 | 380 | **Quantity**<br>Numeric value of quantity | X R 1/15 |
| | SLN06 | 212 | **Unit Price**<br>Price per unit of product, service, commodity, etc. | X R 1/17 |
| | SLN09 | 235 | **Product/Service ID Qualifier**<br>Code identifying the type/source of the descriptive number used in Product/Service ID (234)<br>ZZ Mutually Defined | X ID 2/2 |
| | SLN10 | 234 | **Product/Service ID**<br>Identifying number for a product or service<br>Option Legend Code | X AN 1/48 |

Segment: ACK Line Item Acknowledgment
Position: 530
Loop: SLN Optional
Level: Detail
Usage: Optional
Max Use: 104
Purpose: To acknowledge the ordered quantities and specify the ready date for a specific line item

Syntax Notes:
1 If either ACK02 or ACK03 is present, then the other is required.
2 If ACK04 is present, then ACK05 is required.
3 If either ACK07 or ACK08 is present, then the other is required.
4 If either ACK09 or ACK10 is present, then the other is required.
5 If either ACK11 or ACK12 is present, then the other is required.
6 If either ACK13 or ACK14 is present, then the other is required.
7 If either ACK15 or ACK16 is present, then the other is required.
8 If either ACK17 or ACK18 is present, then the other is required.
9 If either ACK19 or ACK20 is present, then the other is required.
10 If either ACK21 or ACK22 is present, then the other is required.
11 If either ACK23 or ACK24 is present, then the other is required.
12 If either ACK25 or ACK26 is present, then the other is required.
13 If either ACK27 or ACK28 is present, then the other is required.
14 If ACK28 is present, then both ACK27 and ACK29 are required.

Semantic Notes:
1 ACK29 Industry Reason Code may be used to identify the item status. In addition, it may be used in conjunction with ACK01 to further clarify the status.

Data Element Summary

| | Ref. Des. | Data Element | Name | Attributes |
|---|---|---|---|---|
| M | ACK01 | 668 | **Line Item Status Code**<br>Code specifying the action taken by the seller on a line item requested by the buyer<br>IA Item Accepted<br>IR Item Rejected | M ID 2/2 |
| | ACK02 | 380 | **Quantity**<br>Numeric value of quantity<br>Line item error counter if status is IR. | X R 1/15 |

Segment: CTT Transaction Totals
Position: 010
Loop: CTT Optional
Level: Summary
Usage: Optional
Max Use: 1
Purpose: To transmit a hash total for a specific element in the transaction set
Syntax Notes: 1 If either CTT03 or CTT04 is present, then the other is required.
2 If either CTT05 or CTT06 is present, then the other is required.
Semantic Notes:
Comments: 1 This segment is intended to provide hash totals to validate transaction completeness and correctness.

Data Element Summary

| | Ref. Des. | Data Element | Name | Attributes |
|---|---|---|---|---|
| M | CTT01 | 354 | **Number of Line Items**<br>Total number of line items in the transaction set | M N0 1/6 |

Segment: AMT Monetary Amount
Position: 020
Loop: CTT Optional
Level: Summary
Usage: Optional
Max Use: 1
Purpose: To indicate the total monetary amount
Syntax Notes:
Semantic Notes:
Comments:

Data Element Summary

| | Ref. Des. | Data Element | Name | Attributes |
|---|---|---|---|---|
| M | AMT01 | 522 | **Amount Qualifier Code**<br>Code to qualify amount<br>ZZ Mutually Defined | M ID 1/3 |
| M | AMT02 | 782 | **Monetary Amount**<br>Monetary amount<br>Total Order Amount<br>This value includes shipping and tax. | M R 1/18 |
| | AMT03 | 478 | **Credit/Debit Flag Code**<br>Code indicating whether amount is a credit or debit | O ID 1/1 |

Segment: SE Transaction Set Trailer
Position: 030
Loop:
Level: Summary
Usage: Mandatory
Max Use: 1
Purpose: To indicate the end of the transaction set and provide the count of the transmitted segments (including the beginning (ST) and ending (SE) segments)
Syntax Notes:
Semantic Notes:
Comments: 1 SE is the last segment of each transaction set.

Data Element Summary

| | Ref. Des. | Data Element | Name | Attributes |
|---|---|---|---|---|
| M | SE01 | 96 | **Number of Included Segments**<br>Total number of segments included in a transaction set including ST and SE segments | M N0 1/10 |
| M | SE02 | 329 | **Transaction Set Control Number**<br>Identifying control number that must be unique within the transaction set functional group assigned by the originator for a transaction set | M AN 4/9 |

What is claimed is:

1. A computer program in combination with a computer readable media, the computer program for providing a catalog from a manufacturer to a customer, the computer program being encoded to enable a customer to perform an automated order entry process, the computer program comprising:

a catalog header record portion storing catalog header record data, the catalog header portion being stored on the computer readable media;

a system identification portion storing system identification data, the system identification portion being stored on the computer readable media, the system identification data including a system type element, the system type element indicating whether a system is one of a bundled system and a custom system, the system type element allowing the customer to determine whether the system is a bundled system or a custom system during the automated order entry process; and a system option record portion storing system option record data, the system option record portion being stored on the computer readable media.

2. The computer program in combination with the computer readable media of claim 1 wherein the catalog header data applies to an entire catalog.

3. The computer program in combination with the computer readable media of claim 1 wherein the system option data includes a plurality of relationship indicator elements.

4. The computer program in combination with the computer readable media of claim 3 wherein the plurality of relationship indicator elements include a relationship identification element, the relationship identification element providing an indicator that communicates for a component, a relationship of the component to other components.

5. A computer program in combination with a computer readable media, the computer program for providing a catalog from a manufacturer to a customer, the computer program being encoded to enable a customer to perform an automated order entry process, the computer program comprising:

a catalog header record portion storing catalog header record data, the catalog header portion being stored on the computer readable media, the catalog header data applying to the catalog;

a system identification portion storing system identification data, the system identification portion being stored on the computer readable media, the system identification portion applying once for each system type, the system identification data including a system type indicator, the system type indicator indicating whether a system is one of a bundled system and a custom system, the system type indicator allowing the customer to determine whether the system is a bundled system or a custom system during the automated order entry process; and a system option record portion storing system option record data, the system option record portion being stored on the computer readable media, the system option record portion including a plurality of system option record entries, each of the plurality of system option record entries applying to a respective system option.

6. The computer program in combination with the computer readable media of claim 5 wherein the system identification record data includes a system identification effective date element, the system identification effective data element providing an effective date that a particular configuration is allowed to be purchased.

7. The computer program in combination with the computer readable media of claim 5 wherein the system identification record data includes a system identification action element, the system identification action element programmably informing a customer what function to perform on a system.

8. The computer program in combination with the computer readable media of claim 7 wherein the functions to be performed include an add function, a replace function and a discontinue function.

9. The computer program in combination with the computer readable media of claim 5 wherein the system option data includes a plurality of relationship indicator elements.

10. The computer program in combination with the computer readable media of claim 9 wherein the plurality of relationship indicator elements include a relationship identification element, the relationship identification element providing an indicator that communicates for a component, a relationship of the component to other components.

11. The computer program in combination with the computer readable media of claim 5 wherein the catalog header record data includes a catalog type, a catalog version number, a catalog data, a catalog time.

12. The computer program in combination with the computer readable media of claim 5 wherein the system identification data includes a system identifier, a system identifier effective date and a system identifier purchase price.

13. The computer program in combination with the computer readable media of claim 5 wherein the system option record data includes a relationship identifier, an option indicator and an option action code.

* * * * *